US007856248B1

(12) United States Patent
Fujisaki

(10) Patent No.: US 7,856,248 B1
(45) Date of Patent: Dec. 21, 2010

(54) COMMUNICATION DEVICE

(76) Inventor: Iwao Fujisaki, 1-3-14 Park Heim A103, Mitakashi Inokashira, Tokyo (JP) 181-0001

( * ) Notice: Subject to any disclaimer, the term of this patent is extended or adjusted under 35 U.S.C. 154(b) by 503 days.

(21) Appl. No.: 11/688,913

(22) Filed: Mar. 21, 2007

Related U.S. Application Data

(63) Continuation of application No. 10/710,600, filed on Jul. 23, 2004.

(60) Provisional application No. 60/481,426, filed on Sep. 26, 2003.

(51) Int. Cl.
*H04M 1/00* (2006.01)

(52) U.S. Cl. ................. 455/556.1; 455/414.1; 455/555; 455/566; 455/466

(58) Field of Classification Search .............. 455/556.1, 455/566, 414.1, 555; 370/338
See application file for complete search history.

(56) References Cited

U.S. PATENT DOCUMENTS

| | | | |
|---|---|---|---|
| 4,934,773 | A | 6/1990 | Becker |
| 4,937,570 | A | 6/1990 | Matsukawa et al. |
| 5,113,427 | A | 5/1992 | Ryoichi et al. |
| 5,272,638 | A | 12/1993 | Martin et al. |
| 5,353,376 | A | 10/1994 | Oh et al. |
| 5,388,147 | A | 2/1995 | Grimes |
| 5,405,152 | A | 4/1995 | Katanics et al. |
| 5,414,461 | A | 5/1995 | Kishi et al. |
| 5,446,904 | A | 8/1995 | Belt et al. |
| 5,532,741 | A | 7/1996 | Tsutsumi |
| 5,542,557 | A | 8/1996 | Koyama et al. |
| 5,543,789 | A | 8/1996 | Behr et al. |
| 5,648,768 | A | 7/1997 | Bouve |
| 5,675,630 | A | 10/1997 | Beatty |
| 5,687,331 | A | 11/1997 | Volk et al. |
| 5,732,383 | A | 3/1998 | Foladare et al. |
| 5,772,586 | A | 6/1998 | Heinonen et al. |
| 5,778,304 | A | 7/1998 | Grube et al. |
| 5,802,460 | A | 9/1998 | Parvulescu et al. |
| 5,805,672 | A | 9/1998 | Barkat et al. |
| 5,812,930 | A | 9/1998 | Zavrel |
| 5,844,824 | A | 12/1998 | Newman et al. |
| 5,902,349 | A | 5/1999 | Endo et al. |
| 5,916,024 | A | 6/1999 | Von Kohorn |
| 5,918,180 | A | 6/1999 | Dimino |
| 5,959,661 | A | 9/1999 | Isono |
| 6,009,336 | A | 12/1999 | Harris et al. |
| 6,011,973 | A | 1/2000 | Valentine et al. |
| 6,043,752 | A | 3/2000 | Hisada et al. |
| 6,081,265 | A | 6/2000 | Nakayama et al. |
| 6,115,597 | A | 9/2000 | Kroll et al. |
| 6,128,594 | A | 10/2000 | Gulli et al. |
| 6,144,848 | A | 11/2000 | Walsh et al. |
| 6,148,212 | A | 11/2000 | Park et al. |
| 6,198,942 | B1 | 3/2001 | Hayashi et al. |
| 6,202,060 | B1 | 3/2001 | Tran |
| 6,216,013 | B1 | 4/2001 | Moore et al. |

(Continued)

FOREIGN PATENT DOCUMENTS

| | | | |
|---|---|---|---|
| JP | 02002252691 | * | 9/2002 |

*Primary Examiner*—David Q Nguyen

(57) ABSTRACT

A communication device which includes a voice communicating means, an automobile controlling means, and an OCR means, which further includes a caller ID means, a call blocking means, an auto time adjusting means, a calculating means, a word processing means, a startup software means, a stereo audio data output means, a digital camera means, a multiple language displaying means, a caller's information displaying means, a communication device remote controlling means, and a shortcut icon displaying means.

3 Claims, 210 Drawing Sheets

U.S. PATENT DOCUMENTS 6,216,158 B1 4/2001 Luo et al.
6,225,944 B1 5/2001 Hayes
6,236,832 B1 5/2001 Ito
6,243,039 B1 6/2001 Elliot
6,249,720 B1 6/2001 Kubota et al.
6,253,075 B1 6/2001 Beghtol et al.
6,265,988 B1 7/2001 LeMense et al.
6,285,317 B1 9/2001 Ong
6,292,666 B1 9/2001 Siddiqui et al.
6,292,747 B1 9/2001 Amro et al.
6,311,077 B1 10/2001 Bien
6,332,122 B1 12/2001 Ortega et al.
6,333,684 B1 12/2001 Kang
6,366,782 B1 4/2002 Fumarolo et al.
6,374,221 B1 4/2002 Haimi-Cohen
6,385,466 B1 5/2002 Hirai et al.
6,405,033 B1 6/2002 Kennedy, III et al.
6,411,198 B1 6/2002 Hirai et al.
6,411,822 B1 6/2002 Kraft
6,415,138 B2 7/2002 Sirola et al.
6,421,602 B1 7/2002 Bullock et al.
6,430,498 B1 8/2002 Maruyama et al.
6,445,802 B1 9/2002 Dan
6,477,387 B1 11/2002 Jackson et al.
6,486,867 B1 11/2002 Kopp et al.
6,487,422 B1 11/2002 Lee
6,512,919 B2 1/2003 Ogasawara
6,519,566 B1 2/2003 Boyer et al.
6,526,293 B1 2/2003 Matsuo
6,529,742 B1 3/2003 Yang
6,538,558 B2 3/2003 Sakazume et al.
6,542,750 B2 4/2003 Hendrey et al.
6,542,814 B2 4/2003 Polidi et al.
6,553,310 B1 4/2003 Lopke
6,567,745 B2 5/2003 Fuchs et al.
6,567,984 B1 5/2003 Allport
6,600,975 B2 7/2003 Moriguchi et al.
6,606,504 B1 8/2003 Mooney et al.
6,611,753 B1 8/2003 Millington
6,615,186 B1 9/2003 Kolls
6,618,704 B2 9/2003 Kanevsky et al.
6,622,018 B1 9/2003 Erekson
6,631,271 B1 10/2003 Logan
6,647,251 B1 11/2003 Siegle et al.
6,650,877 B1 11/2003 Tarbouriech et al.
6,650,894 B1 11/2003 Berstis et al.
6,658,272 B1 12/2003 Lenchik et al.
6,662,023 B1 12/2003 Helle
6,690,932 B1 2/2004 Barnier et al.
6,701,148 B1 3/2004 Wilson et al.
6,707,942 B1 3/2004 Cortopassi et al.
6,711,399 B1 3/2004 Renault
6,725,022 B1 4/2004 Clayton et al.
6,728,531 B1 4/2004 Lee et al.
6,738,643 B1 5/2004 Harris
6,738,711 B2 5/2004 Ohmura et al.
6,763,226 B1 7/2004 McZeal, Jr.
6,772,174 B1 8/2004 Pettersson
6,779,030 B1 8/2004 Dugan et al.
6,788,928 B2 9/2004 Kohinata et al.
6,795,715 B1 9/2004 Kubo et al.
6,812,954 B1 11/2004 Priestman et al.
6,819,939 B2 11/2004 Masamura
6,820,055 B2 11/2004 Saindon et al.
6,836,654 B2 12/2004 Decotignie
6,865,372 B2 3/2005 Mauney et al.
6,883,000 B1 4/2005 Gropper
6,891,525 B2 5/2005 Ogoro
6,895,084 B1 5/2005 Saylor et al.
6,895,256 B2 5/2005 Harma et al.
6,895,259 B1 5/2005 Blank nee Keller et al.
6,898,321 B1 5/2005 Knee et al.
6,898,765 B2 5/2005 Matthews, III et al.
6,901,383 B1 5/2005 Ricketts et al.
6,912,544 B1 6/2005 Weiner
6,922,630 B2 7/2005 Maruyama et al.
6,937,868 B2 8/2005 Himmel et al.
6,947,728 B2 9/2005 Tagawa et al.
6,954,645 B2 10/2005 Tsai et al.
6,958,675 B2 10/2005 Maeda et al.
6,961,559 B1 11/2005 Chow et al.
6,968,206 B1 11/2005 Whitsey-Anderson
6,992,699 B1 1/2006 Vance et al.
6,999,802 B2 2/2006 Kim
7,003,598 B2 2/2006 Heinonen et al.
7,007,239 B1 2/2006 Hawkins et al.
7,012,999 B2 3/2006 Ruckart
7,028,077 B2 4/2006 Toshimitsu et al.
7,035,666 B2 4/2006 Silberfenig
7,058,356 B2 6/2006 Slotznick
7,076,052 B2 7/2006 Yoshimura
7,081,832 B2 7/2006 Nelson et al.
7,085,739 B1 8/2006 Winter et al.
7,089,298 B2 8/2006 Nyman et al.
7,117,152 B1 10/2006 Mukherji et al.
7,117,504 B2 10/2006 Smith et al.
7,126,951 B2 10/2006 Belcea et al.
7,127,238 B2 10/2006 Vandermeijden et al.
7,127,271 B1 10/2006 Fujisaki
7,130,630 B1 10/2006 Enzmann et al.
7,142,810 B2 11/2006 Oesterling
7,190,880 B2 3/2007 Cookson et al.
7,218,916 B2 5/2007 Nonami
7,224,851 B2 5/2007 Garnett et al.
7,233,795 B1 6/2007 Ryden
7,239,742 B2 7/2007 Ohtani et al.
7,251,255 B1 7/2007 Young
7,260,416 B2 8/2007 Shippee
7,266,186 B1 9/2007 Henderson
7,274,952 B2 9/2007 Hayashi
7,489,768 B1 2/2009 Strietzel
7,551,899 B1 6/2009 Nicolas et al.
2001/0000249 A1 4/2001 Oba et al.
2001/0011293 A1 8/2001 Murakami et al.
2001/0029425 A1* 10/2001 Myr .......................... 701/200
2001/0035829 A1 11/2001 Yu et al.
2001/0037191 A1 11/2001 Furuta et al.
2001/0041590 A1 11/2001 Silberfenig et al.
2002/0002705 A1 1/2002 Byrnes et al.
2002/0004701 A1 1/2002 Nakano
2002/0016724 A1 2/2002 Yang et al.
2002/0026348 A1 2/2002 Fowler et al.
2002/0028690 A1 3/2002 McKenna et al.
2002/0031120 A1 3/2002 Rakib
2002/0034292 A1 3/2002 Tuoriniemi
2002/0036642 A1 3/2002 Kwon et al.
2002/0038219 A1 3/2002 Yanay et al.
2002/0047787 A1 4/2002 Mikkola et al.
2002/0055350 A1 5/2002 Gupte et al.
2002/0058497 A1 5/2002 Jeong
2002/0058531 A1 5/2002 Terasaki et al.
2002/0065037 A1 5/2002 Messina et al.
2002/0065604 A1 5/2002 Sekiyama
2002/0066115 A1 5/2002 Wendelrup
2002/0068585 A1 6/2002 Chan et al.
2002/0068599 A1 6/2002 Rodriguez et al.
2002/0082059 A1 6/2002 Nariai et al.
2002/0094806 A1 7/2002 Kamimura
2002/0098857 A1 7/2002 Ishii
2002/0102960 A1 8/2002 Lechner
2002/0103872 A1 8/2002 Watanabe
2002/0110246 A1 8/2002 Gosior et al.
2002/0115469 A1 8/2002 Rekimoto et al.
2002/0120589 A1 8/2002 Aoki 2002/0120718 A1 8/2002 Lee
2002/0123336 A1 9/2002 Kamada
2002/0127997 A1 9/2002 Karlstedt et al.
2002/0133342 A1 9/2002 McKenna
2002/0137470 A1 9/2002 Baron et al.
2002/0137526 A1 9/2002 Shinohara
2002/0142763 A1 10/2002 Kolsky
2002/0147645 A1 10/2002 Alao et al.
2002/0151326 A1 10/2002 Awada et al.
2002/0151327 A1 10/2002 Levitt
2002/0165850 A1 11/2002 Roberts et al.
2002/0168959 A1 11/2002 Noguchi et al.
2002/0173344 A1 11/2002 Cupps et al.
2002/0177407 A1 11/2002 Mitsumoto
2002/0178225 A1 11/2002 Madenberg et al.
2002/0183045 A1 12/2002 Emmerson et al.
2002/0191951 A1 12/2002 Sodeyama et al.
2002/0196378 A1 12/2002 Slobodin et al.
2002/0198813 A1 12/2002 Patterson, Jr. et al.
2002/0198936 A1 12/2002 McIntyre et al.
2003/0003967 A1 1/2003 Ito
2003/0007556 A1 1/2003 Oura et al.
2003/0013483 A1 1/2003 Ausems et al.
2003/0014286 A1 1/2003 Cappellini
2003/0017857 A1 1/2003 Kitson et al.
2003/0018744 A1 1/2003 Johanson et al.
2003/0032389 A1 2/2003 Kim et al.
2003/0032406 A1 2/2003 Minear et al.
2003/0033214 A1 2/2003 Mikkelsen et al.
2003/0045301 A1 3/2003 Wollrab
2003/0045311 A1 3/2003 Larikka et al.
2003/0045329 A1 3/2003 Kinoshita
2003/0045996 A1 3/2003 Yamazaki et al.
2003/0050776 A1 3/2003 Blair
2003/0052964 A1 3/2003 Priestman et al.
2003/0055994 A1 3/2003 Herrmann et al.
2003/0063732 A1 4/2003 Mcknight
2003/0065784 A1 4/2003 Herrod
2003/0065805 A1 4/2003 Barnes, Jr.
2003/0069693 A1 4/2003 Snapp et al.
2003/0073432 A1 4/2003 Meade, II
2003/0083055 A1 5/2003 Riordan et al.
2003/0093503 A1 5/2003 Yamaki et al.
2003/0093790 A1 5/2003 Logan et al.
2003/0099367 A1* 5/2003 Okamura .................... 381/77
2003/0100326 A1 5/2003 Grube et al.
2003/0107580 A1 6/2003 Egawa et al.
2003/0109251 A1 6/2003 Fujito et al.
2003/0114191 A1 6/2003 Nishimura
2003/0117316 A1 6/2003 Tischer
2003/0119485 A1 6/2003 Ogasawara
2003/0119562 A1 6/2003 Kokubo
2003/0122779 A1 7/2003 Martin et al.
2003/0132928 A1 7/2003 Kori
2003/0135563 A1 7/2003 Bodin et al.
2003/0148772 A1 8/2003 Ben-Ari
2003/0153364 A1 8/2003 Osann, Jr.
2003/0157929 A1 8/2003 Janssen et al.
2003/0166399 A1 9/2003 Tokkonen et al.
2003/0174685 A1 9/2003 Hasebe
2003/0181201 A1 9/2003 Bomze et al.
2003/0220835 A1 11/2003 Barnes, Jr.
2003/0222762 A1 12/2003 Beigl et al.
2003/0224760 A1 12/2003 Day
2003/0227570 A1 12/2003 Kim et al.
2003/0229900 A1 12/2003 Reisman
2003/0236866 A1 12/2003 Light
2004/0003307 A1 1/2004 Tsuji
2004/0029640 A1 2/2004 Masuyama et al.
2004/0033795 A1 2/2004 Walsh et al.
2004/0034692 A1 2/2004 Eguchi et al.
2004/0082321 A1 4/2004 Kontianinen
2004/0103303 A1 5/2004 Yamauchi et al.
2004/0107072 A1 6/2004 Dietrich et al.
2004/0114732 A1 6/2004 Choe et al.
2004/0117108 A1 6/2004 Nemeth
2004/0137893 A1 7/2004 Muthuswamy et al.
2004/0137983 A1 7/2004 Kerr et al.
2004/0142678 A1 7/2004 Krasner
2004/0157664 A1 8/2004 Link
2004/0166832 A1 8/2004 Portman et al.
2004/0166879 A1 8/2004 Meadows et al.
2004/0174863 A1 9/2004 Caspi et al.
2004/0183937 A1 9/2004 Viinikanoja et al.
2004/0203490 A1 10/2004 Kaplan
2004/0203520 A1 10/2004 Schirtzinger et al.
2004/0203577 A1 10/2004 Forman et al.
2004/0203904 A1 10/2004 Gwon et al.
2004/0203909 A1 10/2004 Koster
2004/0204035 A1 10/2004 Raghuram et al.
2004/0204126 A1 10/2004 Reyes et al.
2004/0204821 A1 10/2004 Tu
2004/0204848 A1 10/2004 Matsuo et al.
2004/0216037 A1 10/2004 Hishida et al.
2004/0219951 A1 11/2004 Holder
2004/0222988 A1 11/2004 Donnelly
2004/0235520 A1 11/2004 Cadiz et al.
2004/0242269 A1 12/2004 Fadell
2004/0248586 A1 12/2004 Patel et al.
2004/0252197 A1 12/2004 Fraley et al.
2004/0257208 A1 12/2004 Huang et al.
2005/0004749 A1 1/2005 Park
2005/0020301 A1 1/2005 Lee
2005/0026629 A1 2/2005 Contractor
2005/0048987 A1 3/2005 Glass
2005/0070257 A1 3/2005 Saarinen et al.
2005/0097038 A1 5/2005 Yu et al.
2005/0107119 A1 5/2005 Lee et al.
2005/0113080 A1 5/2005 Nishimura
2005/0120225 A1 6/2005 Kirsch et al.
2005/0136949 A1 6/2005 Barnes et al.
2005/0153745 A1 7/2005 Smethers
2005/0164684 A1 7/2005 Chen et al.
2005/0165871 A1 7/2005 Barrs, II et al.
2005/0166242 A1 7/2005 Matsumoto et al.
2005/0186954 A1 8/2005 Kenney
2005/0191969 A1 9/2005 Mousseau
2005/0235312 A1 10/2005 Karaoguz et al.
2005/0261945 A1 11/2005 Mougin et al.
2006/0015819 A1 1/2006 Hawkins et al.
2006/0031407 A1 2/2006 Dispensa et al.
2006/0041923 A1 2/2006 McQuaide
2006/0052100 A1 3/2006 Almgren
2006/0133590 A1 6/2006 Jiang
2006/0140387 A1 6/2006 Boldt
2006/0143655 A1 6/2006 Ellis et al.
2006/0166650 A1 7/2006 Berger et al.
2006/0206913 A1 9/2006 Jerding et al.
2006/0234758 A1 10/2006 Parupudi et al.
2006/0284732 A1 12/2006 Brock-Fisher
2007/0061845 A1 3/2007 Barnes, Jr.
2007/0109262 A1 5/2007 Oshima et al.
2007/0142047 A1 6/2007 Heeschen
2007/0204014 A1 8/2007 Greer et al.
2007/0262848 A1 11/2007 Berstis et al.
2008/0014917 A1 1/2008 Rhoads et al.
2008/0016526 A1 1/2008 Asmussen
2008/0016534 A1 1/2008 Ortiz et al.
2008/0058005 A1 3/2008 Zicker et al.
2008/0242283 A1 10/2008 Ruckart
2008/0250459 A1 10/2008 Roman
2009/0197641 A1 8/2009 Rofougaran et al.
2010/0099457 A1 4/2010 Kim

* cited by examiner

Fig. 11

Table #1

| | |
|---|---|
| Audio Info #1 | Scott |
| Audio Info #2 | Carol |
| Audio Info #3 | Peter |
| Audio Info #4 | Amy |
| Audio Info #5 | Brian |

Fig. 12

Table #2

| | |
|---|---|
| Scott | (916) 411-2526 |
| Carol | (418) 675-6566 |
| Peter | (220) 890-1567 |
| Amy | (615) 125-3411 |
| Brian | (042) 645-2097 |

Table #A

| | |
|---|---|
| Audio Info #1 | (916) 411-2526 |
| Audio Info #2 | (418) 675-6566 |
| Audio Info #3 | (220) 890-1567 |
| Audio Info #4 | (615) 125-3411 |
| Audio Info #5 | (042) 645-2097 |

RAM 206

Table C

| | | |
|---|---|---|
| Phone #1 | Color A | Sound E |
| Phone #2 | Color B | Sound F |
| Phone #3 | Color C | Sound G |
| Phone #4 | Color D | Sound H |

Fig. 81

TV Program Info
Storage Area H18b

| CH | Title | Sum | Start | Stop | Cat |
|---|---|---|---|---|---|
| 1 | XXX | XXXXX | XX:XX | XX:XX | XXX |
| 1 | XXX | XXXXX | XX:XX | XX:XX | XXX |
| 1 | XXX | XXXXX | XX:XX | XX:XX | XXX |
| 1 | XXX | XXXXX | XX:XX | XX:XX | XXX |
| 1 | XXX | XXXXX | XX:XX | XX:XX | XXX |
| 2 | XXX | XXXXX | XX:XX | XX:XX | XXX |
| 2 | XXX | XXXXX | XX:XX | XX:XX | XXX |
| 2 | XXX | XXXXX | XX:XX | XX:XX | XXX |
| 2 | XXX | XXXXX | XX:XX | XX:XX | XXX |
| 2 | XXX | XXXXX | XX:XX | XX:XX | XXX |
| 3 | XXX | XXXXX | XX:XX | XX:XX | XXX |
| 3 | XXX | XXXXX | XX:XX | XX:XX | XXX |
| 3 | XXX | XXXXX | XX:XX | XX:XX | XXX |
| 3 | XXX | XXXXX | XX:XX | XX:XX | XXX |
| 3 | XXX | XXXXX | XX:XX | XX:XX | XXX |
| 4 | XXX | XXXXX | XX:XX | XX:XX | XXX |
| 4 | XXX | XXXXX | XX:XX | XX:XX | XXX |
| 4 | XXX | XXXXX | XX:XX | XX:XX | XXX |
| 4 | XXX | XXXXX | XX:XX | XX:XX | XXX |
| 4 | XXX | XXXXX | XX:XX | XX:XX | XXX |

Fig. 82

TV Program Listing
Storage Area H18c

| CH | Title | Start | Stop |
|---|---|---|---|
| 1 | XXX | XX:XX | XX:XX |
| 1 | XXX | XX:XX | XX:XX |
| 1 | XXX | XX:XX | XX:XX |
| 1 | XXX | XX:XX | XX:XX |
| 1 | XXX | XX:XX | XX:XX |
| 2 | XXX | XX:XX | XX:XX |
| 2 | XXX | XX:XX | XX:XX |
| 2 | XXX | XX:XX | XX:XX |
| 2 | XXX | XX:XX | XX:XX |
| 2 | XXX | XX:XX | XX:XX |
| 3 | XXX | XX:XX | XX:XX |
| 3 | XXX | XX:XX | XX:XX |
| 3 | XXX | XX:XX | XX:XX |
| 3 | XXX | XX:XX | XX:XX |
| 3 | XXX | XX:XX | XX:XX |
| 4 | XXX | XX:XX | XX:XX |
| 4 | XXX | XX:XX | XX:XX |
| 4 | XXX | XX:XX | XX:XX |
| 4 | XXX | XX:XX | XX:XX |
| 4 | XXX | XX:XX | XX:XX |

Police Department Location Data Storage Area H29b1

| Police Dept ID | Location Data | Phone # |
|---|---|---|
| H29PD #1 | H29LD #1 | H29PN #1 |
| H29PD #2 | H29LD #2 | H29PN #2 |
| H29PD #3 | H29LD #3 | H29PN #3 |
| H29PD #4 | H29LD #4 | H29PN #4 |

Fig. 149

Message Data Storage Area 20632b2

- Start Message Text Data 20632b2a
- Stop Message Text Data 20632b2b
- Pause Message Text Data 20632b2c
- Resume Message Text Data 20632b2c1
- Slow Replay Message Text Data 20632b2d
- Fast-Forward Message Text Data 20632b2e
- Fast-Rewind Message Text Data 20632b2f
- Next Message Text Data 20632b2g
- Previous Message Text Data 20632b2h

Fig. 150

Audiovisual Playback Software Storage Area 20632c

- Audiovisual Start Software 20632c1
- Audiovisual Stop Software 20632c2
- Audiovisual Pause Software 20632c3
- Audiovisual Resume Software 20632c3a
- Audiovisual Slow Replay Software 20632c4
- Audiovisual Fast-Forward Software 20632c5
- Audiovisual Fast-Rewind Software 20632c6
- Audiovisual Next Software 20632c7
- Audiovisual Previous Software 20632c8
- Audiovisual Selecting Software 20632c9

Start --> Start Message Text Data 20632b2a
Stop --> Stop Message Text Data 20632b2b
Pause --> Pause Message Text Data 20632b2c
Resume --> Resume Message Text Data 20632b2c1
Slow Reply --> Slow Replay Message Text Data 20632b2d
Fast-Forward --> Fast-Forward Message Text Data 20632b2e
Fast-Rewind --> Fast-Rewind Message Text Data 20632b2f
Next --> Next Message Text Data 20632b2g
Previous --> Previous Message Text Data 20632b2h

Fig. 167

Audio Playback Software Storage Area 20633c

Audio Start Software 20633c1
Audio Stop Software 20633c2
Audio Pause Software 20633c3
Audio Resume Software 20633c3a
Audio Slow Replay Software 20633c4
Audio Fast-Forward Software 20633c5
Audio Fast-Rewind Software 20633c6
Audio Next Software 20633c7
Audio Previous Software 20633c8
Audio Selecting Software 20633c9

Fig. 168

LCD 201

Start
Stop
Pause
Resume
Slow Reply
Fast-Forward
Fast-Rewind
Next
Previous

| | | |
|---|---|---|
| Start | --> | Start Message Text Data 20633b2a |
| Stop | --> | Stop Message Text Data 20633b2b |
| Pause | --> | Pause Message Text Data 20633b2c |
| Resume | --> | Resume Message Text Data 20633b2c1 |
| Slow Reply | --> | Slow Replay Message Text Data 20633b2d |
| Fast-Forward | --> | Fast-Forward Message Text Data 20633b2e |
| Fast-Rewind | --> | Fast-Rewind Message Text Data 20633b2f |
| Next | --> | Next Message Text Data 20633b2g |
| Previous | --> | Previous Message Text Data 20633b2h |

Photo Data Storage Area 20646b1

| Photo ID | Photo Data |
|---|---|
| Photo #1 | 46PD1 |
| Photo #2 | 46PD2 |
| Photo #3 | 46PD3 |
| Photo #4 | 46PD4 |
| Photo #5 | 46PD5 |

Fig. 201

Language Tables Storage Area 20654b1

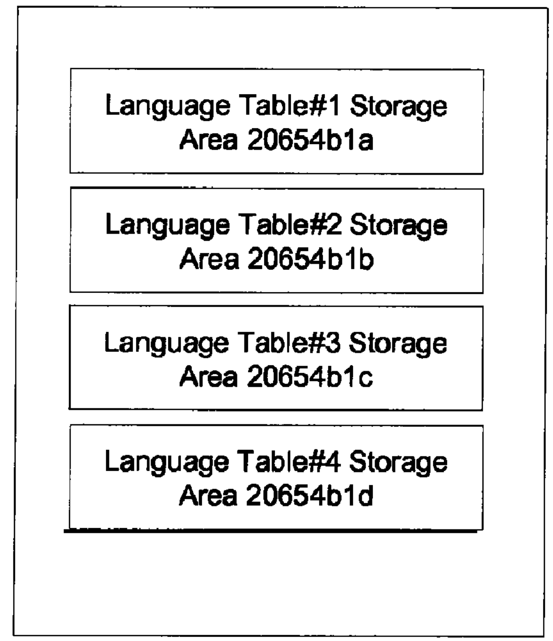

Fig. 202

Language Table#1 Storage Area 20654b1a

| Language Item ID | Language Text |
|---|---|
| Language Item#1 | Open file |
| Language Item#2 | Close file |
| Language Item#3 | Delete |
| Language Item#4 | Copy |
| Language Item#5 | Cut |
| Language Item#6 | Paste |
| Language Item#7 | Insert |
| Language Item#8 | File |
| Language Item#9 | Edit |
| Language Item#10 | View |
| Language Item#11 | Format |
| Language Item#12 | Tools |
| Language Item#13 | Window |
| Language Item#14 | Help |
| Language Item#15 | My Network |
| Language Item#16 | Trash |
| Language Item#17 | Local Disk |
| Language Item#18 | Save |
| Language Item#19 | Yes |
| Language Item#20 | No |
| Language Item#21 | Cancel |

Fig. 203

Language Table#2 Storage Area
20654b1b

| Language Item ID | Language Text |
|---|---|
| Language Item#1 | 開く |
| Language Item#2 | 閉じる |
| Language Item#3 | 削除 |
| Language Item#4 | コピー |
| Language Item#5 | 切り取り |
| Language Item#6 | 貼り付け |
| Language Item#7 | 挿入 |
| Language Item#8 | ファイル |
| Language Item#9 | 編集 |
| Language Item#10 | 表示 |
| Language Item#11 | 書式 |
| Language Item#12 | ツール |
| Language Item#13 | ウィンドウ |
| Language Item#14 | ヘルプ |
| Language Item#15 | マイ ネットワーク |
| Language Item#16 | ごみ箱 |
| Language Item#17 | ローカル ディスク |
| Language Item#18 | 保存 |
| Language Item#19 | はい |
| Language Item#20 | いいえ |
| Language Item#21 | キャンセル |

Fig. 204

Language Table#3 Storage Area
20654b1c

| Language Item ID | Language Text |
|---|---|
| Language Item#1 | French#1 |
| Language Item#2 | French#2 |
| Language Item#3 | French#3 |
| Language Item#4 | French#4 |
| Language Item#5 | French#5 |
| Language Item#6 | French#6 |
| Language Item#7 | French#7 |
| Language Item#8 | French#8 |
| Language Item#9 | French#9 |
| Language Item#10 | French#10 |
| Language Item#11 | French#11 |
| Language Item#12 | French#12 |
| Language Item#13 | French#13 |
| Language Item#14 | French#14 |
| Language Item#15 | French#15 |
| Language Item#16 | French#16 |
| Language Item#17 | French#17 |
| Language Item#18 | French#18 |
| Language Item#19 | French#19 |
| Language Item#20 | French#20 |
| Language Item#21 | French#21 |

Fig. 205

Language Table#4 Storage Area
20654b1d

| Language Item ID | Language Text |
|---|---|
| Language Item#1 | German#1 |
| Language Item#2 | German#2 |
| Language Item#3 | German#3 |
| Language Item#4 | German#4 |
| Language Item#5 | German#5 |
| Language Item#6 | German#6 |
| Language Item#7 | German#7 |
| Language Item#8 | German#8 |
| Language Item#9 | German#9 |
| Language Item#10 | German#10 |
| Language Item#11 | German#11 |
| Language Item#12 | German#12 |
| Language Item#13 | German#13 |
| Language Item#14 | German#14 |
| Language Item#15 | German#15 |
| Language Item#16 | German#16 |
| Language Item#17 | German#17 |
| Language Item#18 | German#18 |
| Language Item#19 | German#19 |
| Language Item#20 | German#20 |
| Language Item#21 | German#21 |

Fig. 206

Language Type Data Storage Area
20654b2

| Language Table ID | Language Type |
|---|---|
| Language Table#1 | English |
| Language Table#2 | Japanese |
| Language Table#3 | French |
| Language Table#4 | German |

Fig. 207

Language Item Data Storage Area 20654b3

| Language Item ID | Language Item |
|---|---|
| Language Item#1 | Open file |
| Language Item#2 | Close file |
| Language Item#3 | Delete |
| Language Item#4 | Copy |
| Language Item#5 | Cut |
| Language Item#6 | Paste |
| Language Item#7 | Insert |
| Language Item#8 | File |
| Language Item#9 | Edit |
| Language Item#10 | View |
| Language Item#11 | Format |
| Language Item#12 | Tools |
| Language Item#13 | Window |
| Language Item#14 | Help |
| Language Item#15 | My Network |
| Language Item#16 | Trash |
| Language Item#17 | Local Disk |
| Language Item#18 | Save |
| Language Item#19 | Yes |
| Language Item#20 | No |
| Language Item#21 | Cancel |

Fig. 208

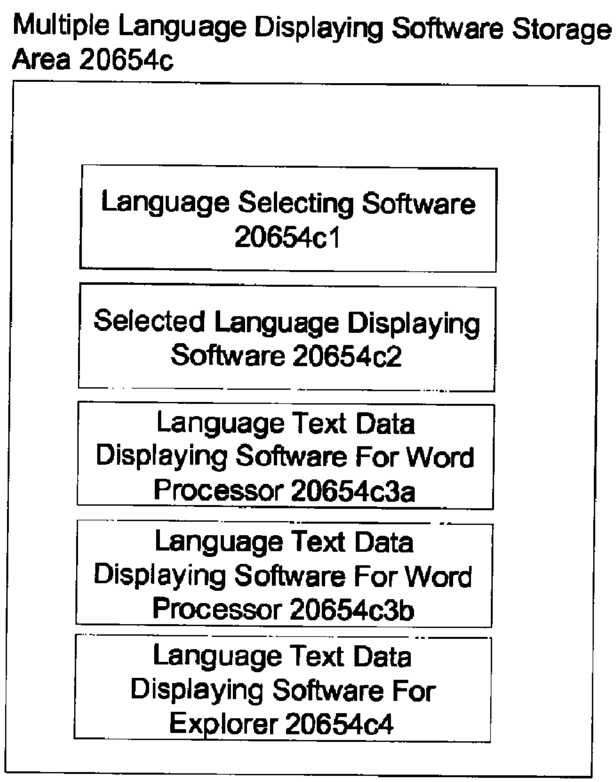

Fig. 245

Callee's Audiovisual Data Storage Area 20655b2

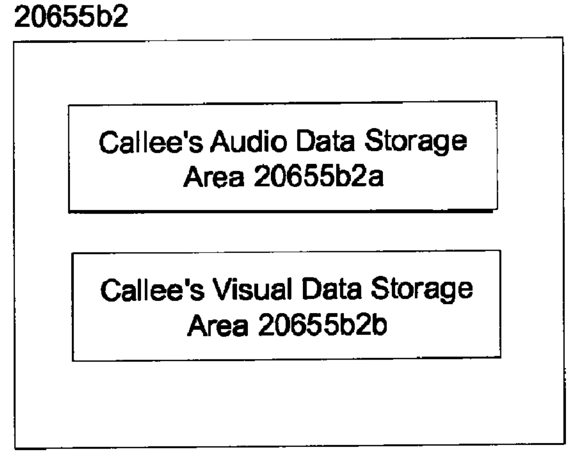

Fig. 246

Caller's Personal Data Storage Area 20655b3

| **Caller's Personal Data** | **Permitted Caller's Personal Data Flag** |
|---|---|
| Caller's Name | 1 |
| Caller's Phone Number | 1 |
| Caller's Email Address | 1 |
| Caller's Home Address | 1 |
| Caller's Business Address | 0 |
| Caller's Title | 0 |
| Caller's Hobby | 0 |
| Caller's Blood Type | 0 |
| Caller's Gender | 0 |
| Caller's Age | 0 |
| Caller's Date Of Birth | 0 |

Fig. 248

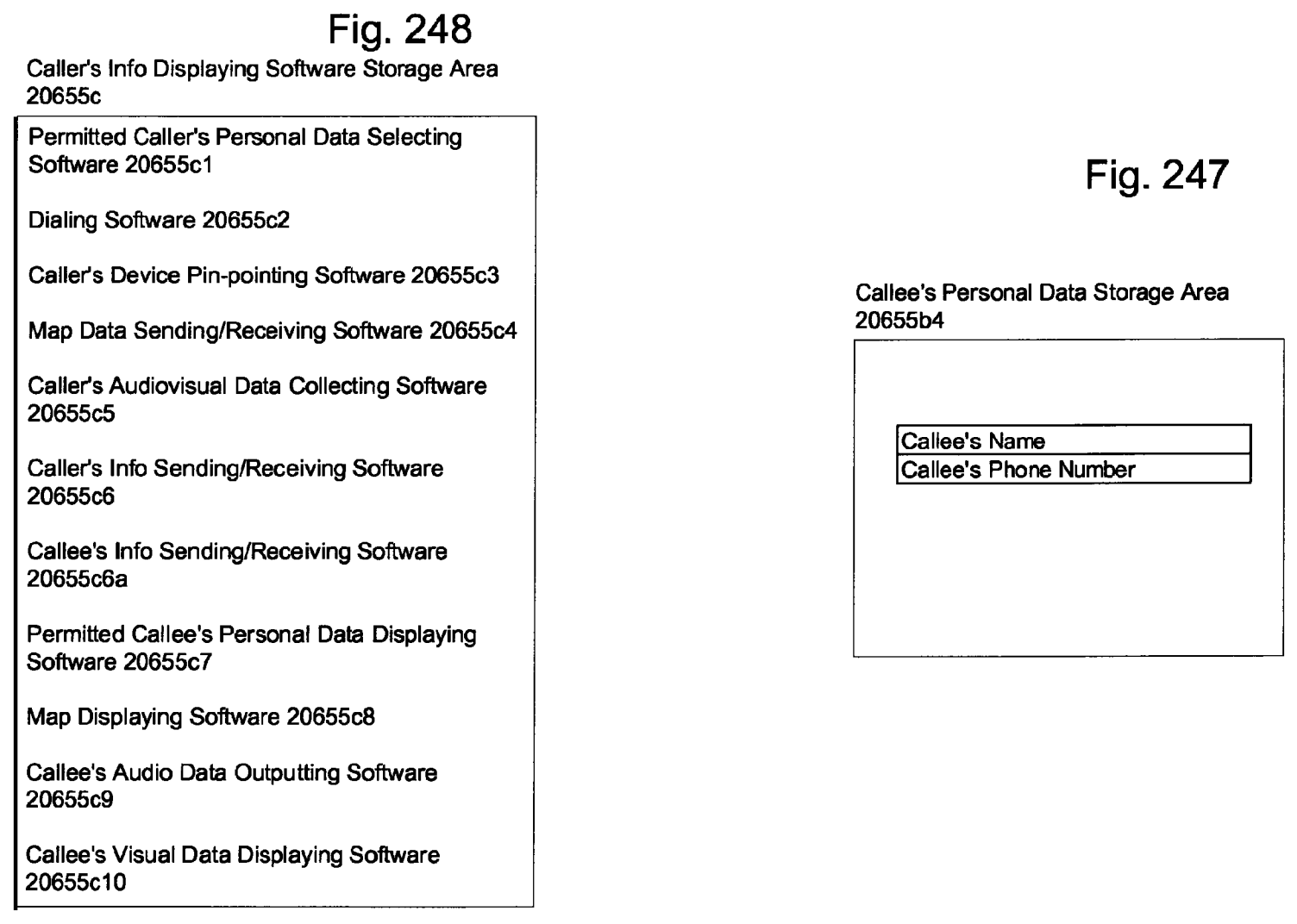

Caller's Info Displaying Software Storage Area 20655c

- Permitted Caller's Personal Data Selecting Software 20655c1
- Dialing Software 20655c2
- Caller's Device Pin-pointing Software 20655c3
- Map Data Sending/Receiving Software 20655c4
- Caller's Audiovisual Data Collecting Software 20655c5
- Caller's Info Sending/Receiving Software 20655c6
- Callee's Info Sending/Receiving Software 20655c6a
- Permitted Callee's Personal Data Displaying Software 20655c7
- Map Displaying Software 20655c8
- Callee's Audio Data Outputting Software 20655c9
- Callee's Visual Data Displaying Software 20655c10

Fig. 247

Callee's Personal Data Storage Area 20655b4

| |
|---|
| Callee's Name |
| Callee's Phone Number |

Fig. 255

Callee's Personal Data Storage Area 20655b4A

| Callee's Personal Data | Permitted Callee's Personal Data Flag |
|---|---|
| Callee's Name | 1 |
| Callee's Phone Number | 1 |
| Callee's Email Address | 0 |
| Callee's Home Address | 0 |
| Callee's Business Address | 0 |
| Callee's Title | 0 |
| Callee's Hobby | 0 |
| Callee's Blood Type | 0 |
| Callee's Gender | 0 |
| Callee's Age | 0 |
| Callee's Date Of Birth | 0 |

Fig. 256

Callee's Info Displaying Software Storage Area 20655cA

Permitted Callee's Personal Data Selecting Software 20655c1A

Dialing Software 20655c2A

Callee's Device Pin-pointing Software 20655c3A

Map Data Sending/Receiving Software 20655c4A

Callee's Audiovisual Data Collecting Software 20655c5A

Callee's Info Sending/Receiving Software 20655c6A

Caller's Info Sending/Receiving Software 20655c6aA

Permitted Caller's Personal Data Displaying Software 20655c7A

Map Displaying Software 20655c8A

Caller's Audio Data Outputting Software 20655c9A

Caller's Visual Data Displaying Software 20655c10A

Caller/Callee Data Storage Area H55b

Caller/Callee Software Storage Area H55c

Password Data Storage Area H58b1

| User ID | Password Data |
|---|---|
| User#1 | Password Data#1 |
| User#2 | Password Data#2 |
| User#3 | Password Data#3 |
| User#4 | Password Data#4 |
| User#5 | Password Data#5 |

Fig. 289

Phone Number Data Storage Area H58b2

| User ID | Phone Number Data |
|---|---|
| User#1 | Phone Number Data#1 |
| User#2 | Phone Number Data#2 |
| User#3 | Phone Number Data#3 |
| User#4 | Phone Number Data#4 |
| User#5 | Phone Number Data#5 |

Fig. 290

Web Display Data Storage Area H58b3

| Web Display ID | Web Display Data |
|---|---|
| Web Display#0 | Web Display Data#0 |
| Web Display#1 | Web Display Data#1 |
| Web Display#2 | Web Display Data#2 |
| Web Display#3 | Web Display Data#3 |
| Web Display#4 | Web Display Data#4 |
| Web Display#5 | Web Display Data#5 |
| Web Display#6 | Web Display Data#6 |

Com. Device Controlling Software Storage Area H58c

- User Authenticating Software H58c1
- Menu Introducing Software H58c2
- Line Connecting Software H58c3
- Manner Mode Deactivating Software H58c4
- Manner Mode Deactivating & Ringing Software H58c5
- Ringing Software H58c6
- Password Changing Software H58c7
- Device Locking Software H58c8
- Power Off Software H58c9

Fig. 297

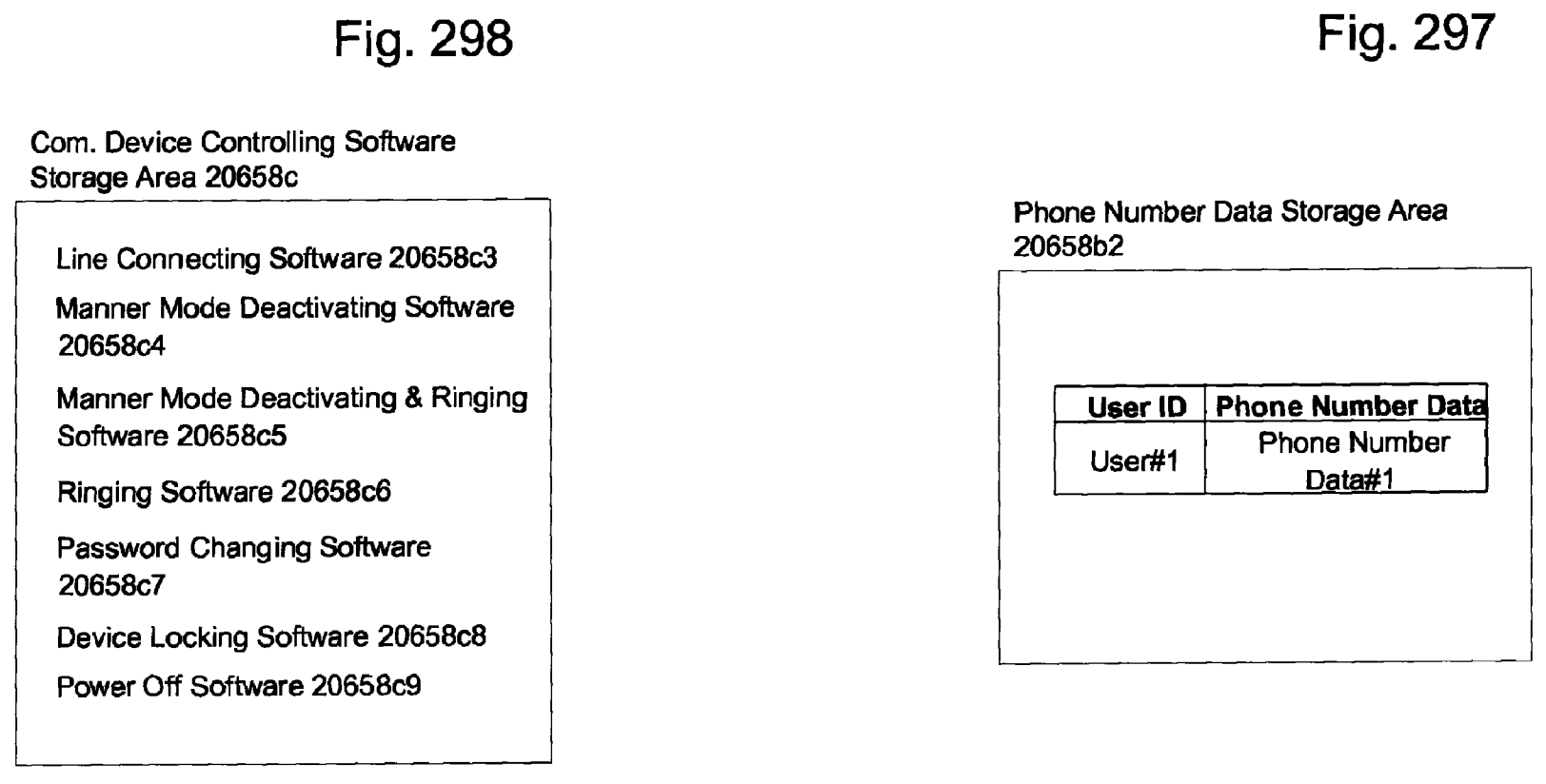

Phone Number Data Storage Area 20658b2

| User ID | Phone Number Data |
|---|---|
| User#1 | Phone Number Data#1 |

Fig. 298

Com. Device Controlling Software Storage Area 20658c

Line Connecting Software 20658c3

Manner Mode Deactivating Software 20658c4

Manner Mode Deactivating & Ringing Software 20658c5

Ringing Software 20658c6

Password Changing Software 20658c7

Device Locking Software 20658c8

Power Off Software 20658c9

Shortcut Icon Image Data Storage Area 20659b1

| Shortcut Icon ID | Shortcut Icon Image Data |
|---|---|
| Shortcut Icon#1 | Shortcut Icon Image Data#1 |
| Shortcut Icon#2 | Shortcut Icon Image Data#2 |
| Shortcut Icon#3 | Shortcut Icon Image Data#3 |
| Shortcut Icon#4 | Shortcut Icon Image Data#4 |

Fig. 313

Shortcut Icon Location Data Storage Area 20659b2

| **Shortcut Icon ID** | **Shortcut Icon Location Data** |
| --- | --- |
| Shortcut Icon#1 | Shortcut Icon Location Data#1 |
| Shortcut Icon#2 | Shortcut Icon Location Data#2 |
| Shortcut Icon#3 | Shortcut Icon Location Data#3 |
| Shortcut Icon#4 | Shortcut Icon Location Data#4 |

Fig. 314

Shortcut Icon Link Data Storage Area 20659b3

| **Shortcut Icon ID** | **Shortcut Icon Link Data** |
| --- | --- |
| Shortcut Icon#1 | Shortcut Icon Link Data#1 |
| Shortcut Icon#2 | Shortcut Icon Link Data#2 |
| Shortcut Icon#3 | Shortcut Icon Link Data#3 |
| Shortcut Icon#4 | Shortcut Icon Link Data#4 |

Software Programs Storage Area H59b1

| **Software ID** | **Software Program** |
|---|---|
| Software#3 | Software Program#3 |
| Software#4 | Software Program#4 |
| Software#5 | Software Program#5 |
| Software#6 | Software Program#6 |

Fig. 329

User Data Storage Area H61b1

| User ID | User Data |
|---|---|
| User#1 | User Data#1 |
| User#2 | User Data#2 |
| User#3 | User Data#3 |
| User#4 | User Data#4 |

Fig. 330

Channel Number Storage Area H61b2

| Channel ID | User ID |
|---|---|
| Channel#1 | User#1 |
| Channel#2 | |
| Channel#3 | User#3 |
| Channel#4 | User#4 |

Fig. 331

Channel Number Storage Area H61b2

| Channel ID | User ID |
|---|---|
| Channel#1 | User#1 |
| Channel#2 | User#1 |
| Channel#3 | User#3 |
| Channel#4 | User#4 |

Fig. 332

Signal Type Data Storage Area H61b3

| Channel ID | Signal Type Data |
|---|---|
| Channel#1 | cdma2000 |
| Channel#2 | cdma2000 |
| Channel#3 | W-CDMA |
| Channel#4 | cdma2000 |

Signal Type Data Storage Area H61b3

| Channel ID | Signal Type Data |
|---|---|
| Channel#1 | cdma2000 |
| Channel#2 | W-CDMA |
| Channel#3 | W-CDMA |
| Channel#4 | cdma2000 |

Multiple Channel Processing Software Storage Area H61c

Multiple Channel Processing Data Storage Area 20661b

User Data Storage Area 20661b1

| User ID | User Data |
|---|---|
| User#1 | User Data#1 |

Fig. 339

Channel Number Storage Area 20661b2

| Channel ID | User ID |
|---|---|
| Channel#1 | User#1 |

Fig. 340

Channel Number Storage Area 20661b2

| Channel ID | User ID |
|---|---|
| Channel#1 | User#1 |
| Channel#2 | User#1 |

Fig. 341

Signal Type Data Storage Area
20661b3

| Channel ID | Signal Type Data |
|---|---|
| Channel#1 | cdma2000 |
| Channel#2 | cdma2000 |

Fig. 342

Signal Type Data Storage Area
20661b3

| Channel ID | Signal Type Data |
|---|---|
| Channel#1 | cdma2000 |
| Channel#2 | W-CDMA |

Fig. 359

Window Data Storage Area 83565b2

| Window ID | Window Data |
|---|---|
| Window#1 | Window Data#1 |
| Window#2 | Window Data#2 |
| Window#3 | Window Data#3 |
| Window#4 | Window Data#4 |

Fig. 360

Door Data Storage Area 83565b3

| Door ID | Door Data |
|---|---|
| Door#1 | Door Data#1 |
| Door#2 | Door Data#2 |
| Door#3 | Door Data#3 |
| Door#4 | Door Data#4 |

Fig. 361

Radio Channel Data Storage Area
83565b4

| Radio Channel ID | Radio Channel Data |
|---|---|
| Radio Channel#1 | Radio Channel Data#1 |
| Radio Channel#2 | Radio Channel Data#2 |
| Radio Channel#3 | Radio Channel Data#3 |
| Radio Channel#4 | Radio Channel Data#4 |

Fig. 362

TV Channel Data Storage Area
83565b5

| TV Channel ID | TV Channel Data |
|---|---|
| TV Channel#1 | TV Channel Data#1 |
| TV Channel#2 | TV Channel Data#2 |
| TV Channel#3 | TV Channel Data#3 |
| TV Channel#4 | TV Channel Data#4 |

Blinker Data Storage Area 83565b6

| **Blinker ID** | **Blinker Data** |
| --- | --- |
| Blinker#1 | Blinker Data#1 |
| Blinker#2 | Blinker Data#2 |

Fig. 365

Automobile Controller Storage Area 83565c1

Engine Controller 83565c1a
Direction Controller 83565c1b
Speed Controller 83565c1c
Window Controller 83565c1d
Door Controller 83565c1e
Radio Controller 83565c1f
TV Controller 83565c1g
Radio Channel Selector 83565c1h
TV Channel Selector 83565c1i
Blinker Controller 83565c1j
Emergency Lamp Controller 83565c1k
Cruise Control Controller 83565c1l
Speaker Volume Controller 83565c1m

Fig. 366

Remote Controlling Software Storage Area 83565c2

Engine Controlling Software 83565c2a
Direction Controlling Software 83565c2b
Speed Controlling Software 83565c2c
Window Controlling Software 83565c2d
Door Controlling Software 83565c2e
Radio Controlling Software 83565c2f
TV Controlling Software 83565c2g
Radio Channel Selecting Software 83565c2h
TV Channel Selecting Software 83565c2i
Blinker Controlling Software 83565c2j
Emergency Lamp Controlling Software 83565c2k
Cruise Control Controlling Software 83565c2l
Speaker Volume Controlling Software 83565c2m
Controller Reinstalling Software 83565c2n
Data Reinstalling Software 83565c2o
User Access Authenticating Software 83565c2p

Fig. 371

Window Data Storage Area 20665b2

| **Window ID** | **Window Data** |
|---|---|
| Window#1 | Window Data#1 |
| Window#2 | Window Data#2 |
| Window#3 | Window Data#3 |
| Window#4 | Window Data#4 |

Fig. 372

Door Data Storage Area 20665b3

| **Door ID** | **Door Data** |
|---|---|
| Door#1 | Door Data#1 |
| Door#2 | Door Data#2 |
| Door#3 | Door Data#3 |
| Door#4 | Door Data#4 |

Fig. 374

TV Channel Data Storage Area
20665b5

| **TV Channel ID** | **TV Channel Data** |
|---|---|
| TV Channel#1 | TV Channel Data#1 |
| TV Channel#2 | TV Channel Data#2 |
| TV Channel#3 | TV Channel Data#3 |
| TV Channel#4 | TV Channel Data#4 |

Fig. 373

Radio Channel Data Storage Area
20665b4

| **Radio Channel ID** | **Radio Channel Data** |
|---|---|
| Radio Channel#1 | Radio Channel Data#1 |
| Radio Channel#2 | Radio Channel Data#2 |
| Radio Channel#3 | Radio Channel Data#3 |
| Radio Channel#4 | Radio Channel Data#4 |

Blinker Data Storage Area 20665b6

| **Blinker ID** | **Blinker Data** |
| --- | --- |
| Blinker#1 | Blinker Data#1 |
| Blinker#2 | Blinker Data#2 |

Automobile Controlling Software Storage Area 20665c

Fig. 377

Automobile Controller Storage Area 20665c1

- Engine Controller 20665c1a
- Direction Controller 20665c1b
- Speed Controller 20665c1c
- Window Controller 20665c1d
- Door Controller 20665c1e
- Radio Controller 20665c1f
- TV Controller 20665c1g
- Radio Channel Selector 20665c1h
- TV Channel Selector 20665c1i
- Blinker Controller 20665c1j
- Emergency Lamp Controller 20665c1k
- Cruise Control Controller 20665c1l
- Speaker Volume Controller 20665c1m

Fig. 378

Remote Controlling Software Storage Area 20665c2

- Engine Controlling Software 20665c2a
- Direction Controlling Software 20665c2b
- Speed Controlling Software 20665c2c
- Window Controlling Software 20665c2d
- Door Controlling Software 20665c2e
- Radio Controlling Software 20665c2f
- TV Controlling Software 20665c2g
- Radio Channel Selecting Software 20665c2h
- TV Channel Selecting Software 20665c2i
- Blinker Controlling Software 20665c2j
- Emergency Lamp Controlling Software 20665c2k
- Cruise Control Controlling Software 20665c2l
- Speaker Volume Controlling Software 20665c2m
- Controller Reinstalling Software 20665c2n
- Data Reinstalling Software 20665c2o
- User Access Authenticating Software 20665c2p OCR Data Storage Area 20666b Web Address Data Storage Area 20666b1

| **Web Address ID** | **Web Address Data** |
|---|---|
| Web Address#1 | Web Address Data #1 |
| Web Address#2 | Web Address Data #2 |
| Web Address#3 | Web Address Data #3 |
| Web Address#4 | Web Address Data #4 |

Fig. 399

Email Address Data Storage Area 20666b2

| Email Address ID | Email Address Data |
|---|---|
| Email Address#1 | Email Address Data#1 |
| Email Address#2 | Email Address Data#2 |
| Email Address#3 | Email Address Data#3 |
| Email Address#4 | Email Address Data#4 |

Fig. 400

Phone Data Storage Area 20666b3

| Phone ID | Phone Data |
|---|---|
| Phone#1 | Phone Data#1 |
| Phone#2 | Phone Data#2 |
| Phone#3 | Phone Data#3 |
| Phone#4 | Phone Data#4 |

Fig. 402

Image Data Storage Area 20666b5

| Image ID | Image Data |
|---|---|
| Image#1 | Image Data#1 |
| Image#2 | Image Data#2 |
| Image#3 | Image Data#3 |
| Image#4 | Image Data#4 |

Fig. 401

Alphanumeric Data Storage Area 20666b4

| Alphanumeric ID | Alphanumeric Data |
|---|---|
| Alphanumeric#1 | Alphanumeric Data #1 |
| Alphanumeric#2 | Alphanumeric Data #2 |
| Alphanumeric#3 | Alphanumeric Data #3 |
| Alphanumeric#4 | Alphanumeric Data #4 |

Fig. 403

OCR Software Storage Area 20666c

Image Data Scanning Software 20666c1
Image Data Storing Software 20666c2
OCR Software 20666c3
Alphanumeric Data Storing Software 20666c4
Web Address Data Identifying Software 20666c5a
Web Address Data Correcting Software 20666c5b
Web Address Data Storing Software 20666c5c
Web Address Accessing Software 20666c5d

Fig. 404

OCR Software Storage Area 20666c (cont.)

Email Address Data Identifying Software 20666c6a
Email Address Data Correcting Software 20666c6b
Email Address Data Storing Software 20666c6c
Email Editing Software 20666c6d
Phone Data Identifying Software 20666c7a
Phone Data Correcting Software 20666c7b
Phone Data Storing Software 20666c7c
Dialing Software 20666c7d

COMMUNICATION DEVICE

CROSS REFERENCE TO RELATED APPLICATIONS

This application is a continuation of U.S. Ser. No. 10/710,600, filed Jul. 23, 2004, which claims the benefit of U.S. Provisional Application No. 60/481,426, filed Sep. 26, 2003, both of which are hereby incorporated herein by reference in their entirety.

BACKGROUND OF INVENTION

The invention relates to a communication device and more particularly to the communication device which has a capability to communicate with another communication device in a wireless fashion.

U.S. Patent Publication No. 20030045301 is introduced as a prior art of the present invention of which the summary is the following: "The present invention is directed to an electronic system and method for managing location, calendar, and event information. The system comprises at least two hand portable electronic devices, each having a display device to display personal profile, location, and event information, and means for processing, storing, and wirelessly communicating data. A software program running in the electronic device can receive local and remote input data; store, process, and update personal profile, event, time, and location information; and convert location information into coordinates of a graphic map display. The system additionally includes at least one earth orbiting satellite device using remote sensing technology to determine the location coordinates of the electronic device. The electronic devices receive synchronization messages broadcast by the satellite device, causing the software program to update the personal profile, event, time, and location information stored in each hand portable electronic device." However, this prior art does not disclose the communication device which includes a voice communicating means, an automobile controlling means, a caller ID means, a call blocking means, an auto time adjusting means, a calculating means, a word processing means, a startup software means, a stereo audio data output means, a digital camera means, a multiple language displaying means, a caller's information displaying means, a communication device remote controlling means, and a shortcut icon displaying means.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior arts.

It is another object of the present invention to provide a device capable to implement a plurality of functions.

The present invention introduces the communication device which includes a voice communicating means, an automobile controlling means, a caller ID means, a call blocking means, an auto tune adjusting means, a calculating means, a word processing means, a startup software means, a stereo audio data output means, a digital camera means, a multiple language displaying means, a caller's information displaying means, a communication device remote controlling means, and a shortcut icon displaying means.

BRIEF DESCRIPTION OF DRAWINGS

The above and other aspects, features, and advantages of the invention will be better understood by reading the following more particular description of the invention, presented in conjunction with the following drawing(s), wherein:

FIG. 11 is a simplified illustration illustrating an exemplary embodiment of the present invention.

FIG. 12 is a simplified illustration illustrating an exemplary embodiment of the present invention.

FIG. 81 is a block diagram illustrating an exemplary embodiment of the present invention.

FIG. 82 is a block diagram illustrating an exemplary embodiment of the present invention.

FIG. 119 is a flowchart illustrating an exemplary embodiment of the present invention.

FIG. 120 is a flowchart illustrating an exemplary embodiment of the present invention.

FIG. 121 is a block diagram illustrating an exemplary embodiment of the present invention.

FIG. 122 is a block diagram illustrating an exemplary embodiment of the present invention.

FIG. 123 is a block diagram illustrating an exemplary embodiment of the present invention.

FIG. 124 is a block diagram illustrating an exemplary embodiment of the present invention.

FIG. 125 is a flowchart illustrating an exemplary embodiment of the present invention.

FIG. 126 is a simplified illustration of data utilized in the present invention.

FIG. 127 is a block diagram illustrating an exemplary embodiment of the present invention.

FIG. 128 is a block diagram illustrating an exemplary embodiment of the present invention.

FIG. 129 is a block diagram illustrating an exemplary embodiment of the present invention.

FIG. 130 is a block diagram illustrating an exemplary embodiment of the present invention.

Figure 131:
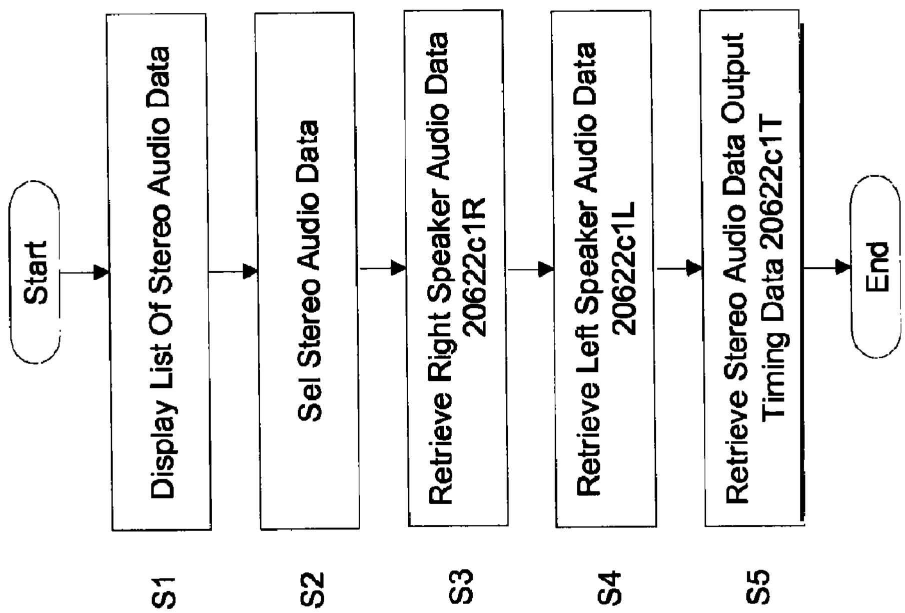

FIG. 131 is a flowchart illustrating an exemplary embodiment of the present invention.

Figure 132:
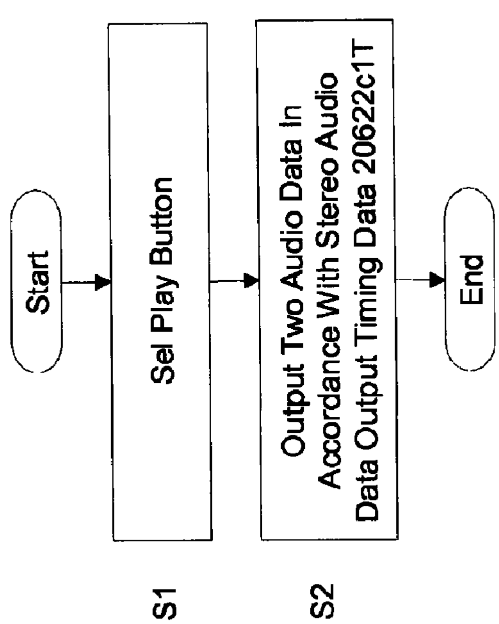

FIG. 132 is a flowchart illustrating an exemplary embodiment of the present invention.

Figure 133:
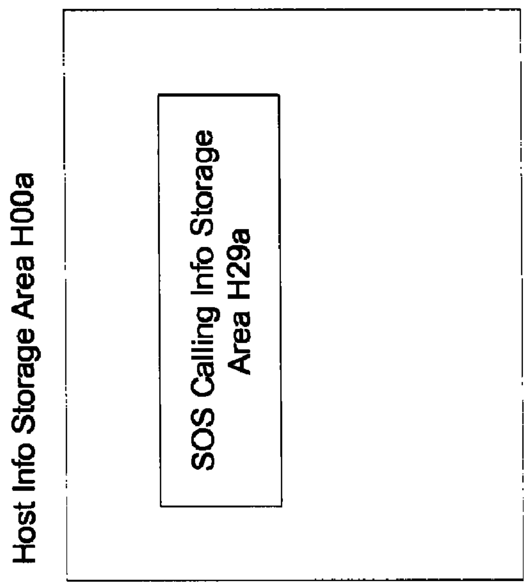

FIG. 133 is a block diagram illustrating an exemplary embodiment of the present invention.

Figure 134:
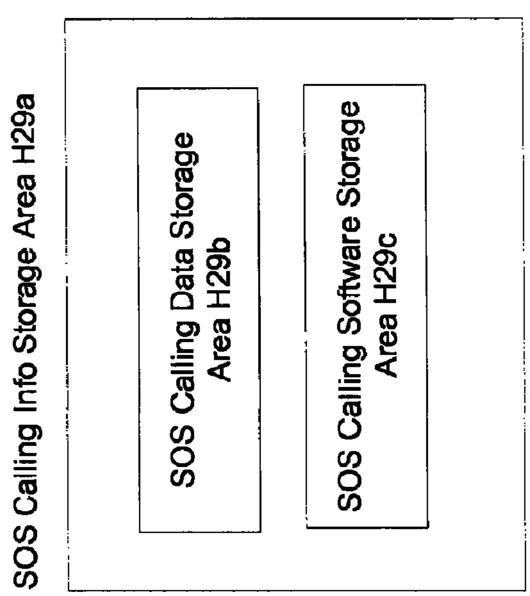

FIG. 134 is a block diagram illustrating an exemplary embodiment of the present invention.

Figures 135, 136:
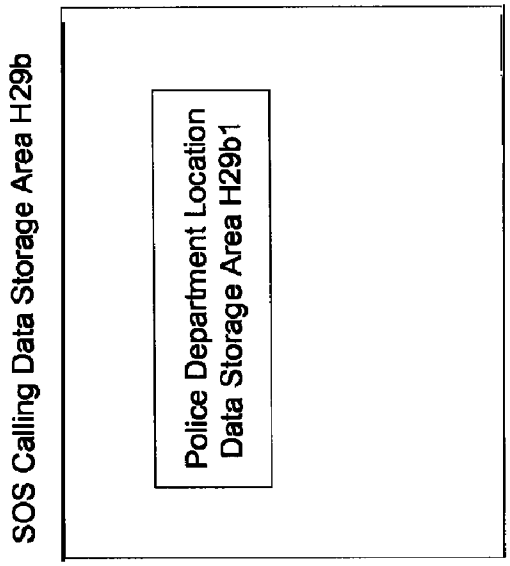

FIG. 135 is a block diagram illustrating an exemplary embodiment of the present invention.

FIG. 136 is a block diagram illustrating an exemplary embodiment of the present invention.

Figure 137:
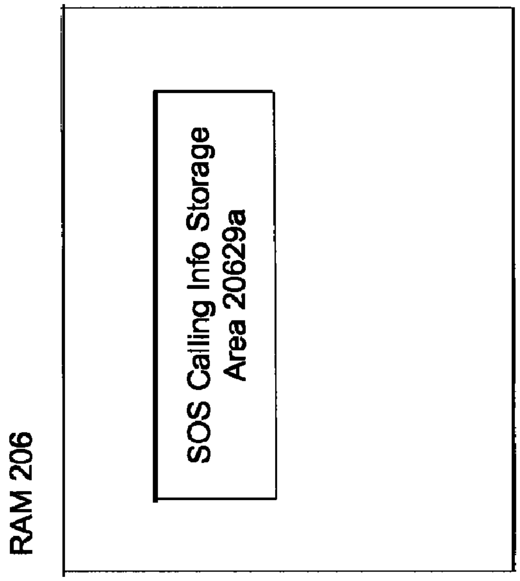

FIG. 137 is a block diagram illustrating an exemplary embodiment of the present invention.

Figure 138:
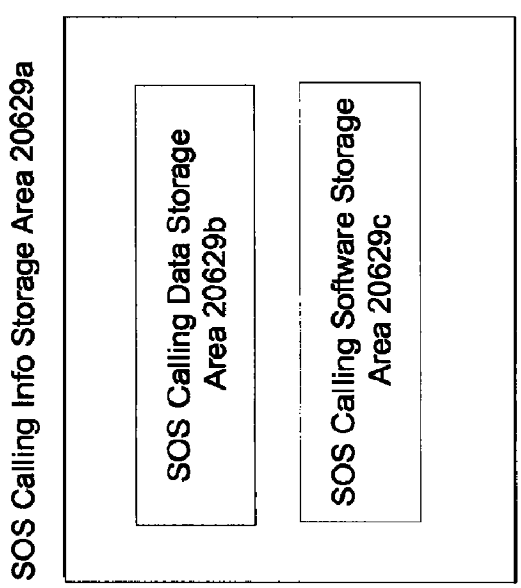

FIG. 138 is a block diagram illustrating an exemplary embodiment of the present invention.

Figure 139:
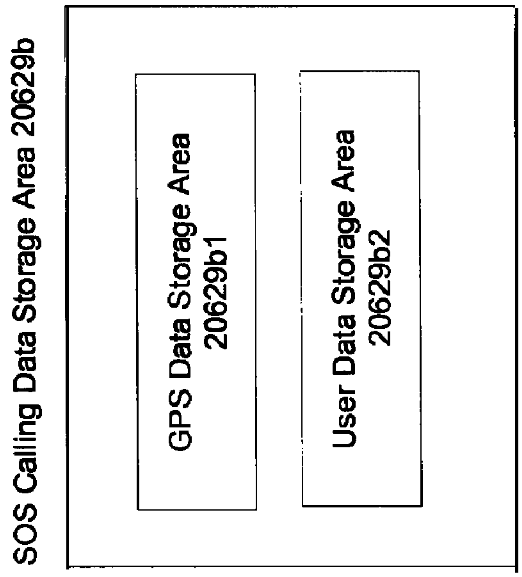

FIG. 139 is a block diagram illustrating an exemplary embodiment of the present invention.

Figure 140:
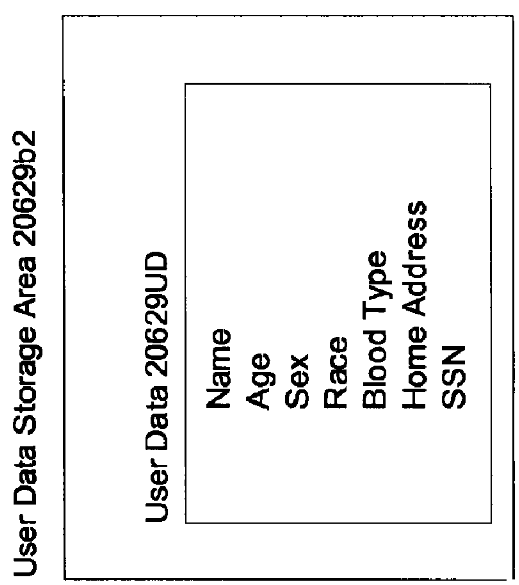

FIG. 140 is a block diagram illustrating an exemplary embodiment of the present invention.

Figure 141:
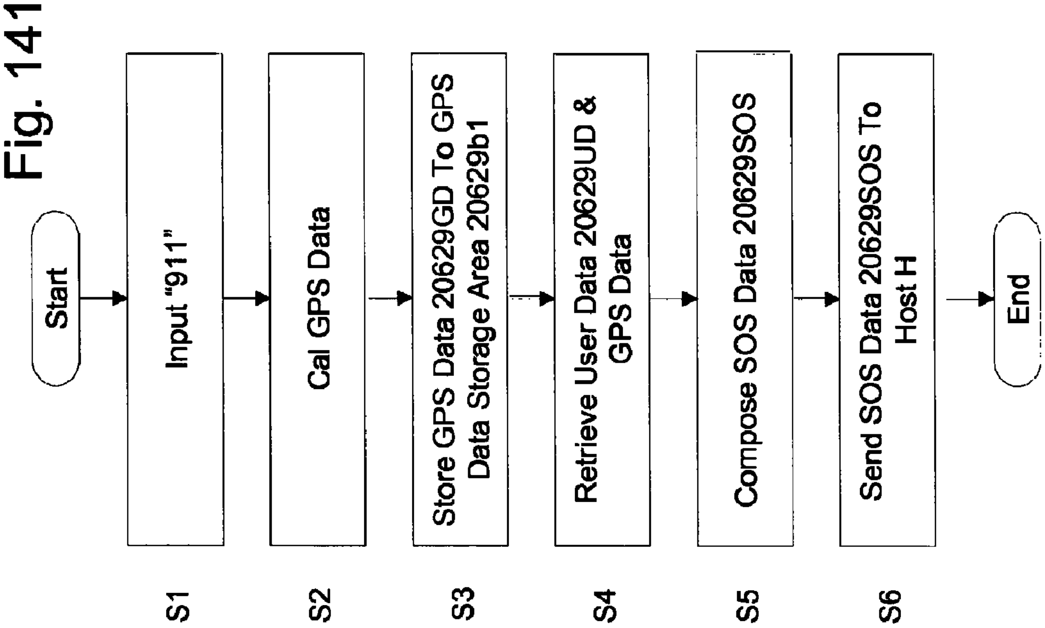

FIG. 141 is a flowchart illustrating an exemplary embodiment of the present invention.

Figure 142:
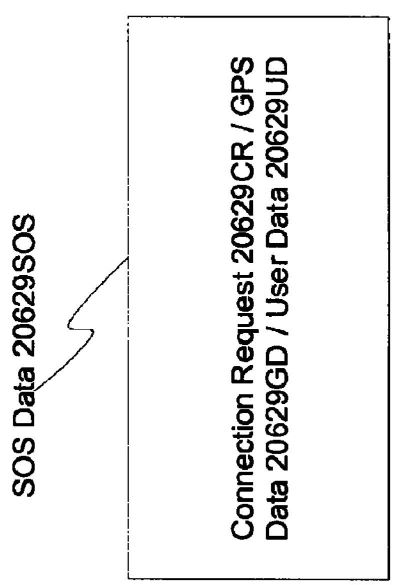

FIG. 142 is a simplified illustration of data utilized in the present invention.

Figure 143:
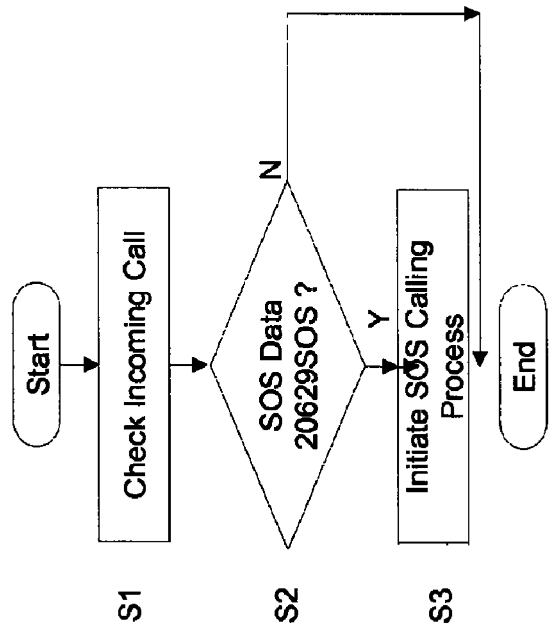

FIG. 143 is a flowchart illustrating an exemplary embodiment of the present invention.

Figure 144:
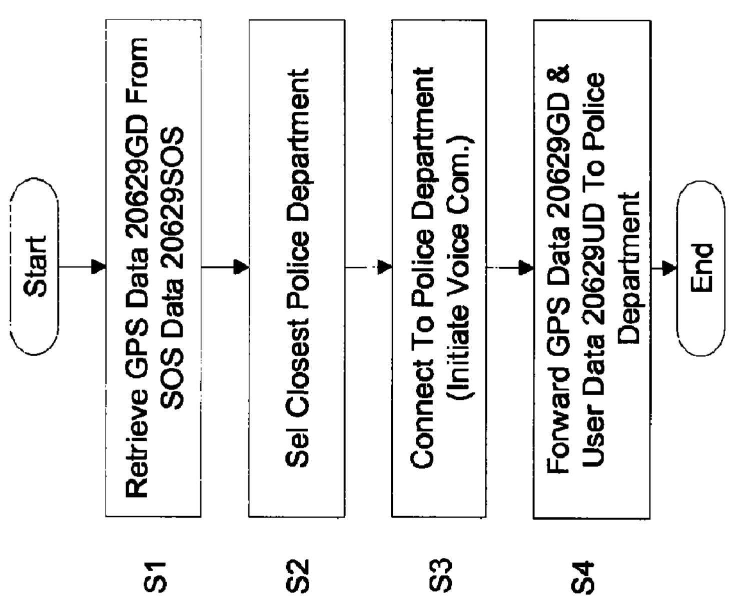

FIG. 144 is a flowchart illustrating an exemplary embodiment of the present invention.

Figure 145:
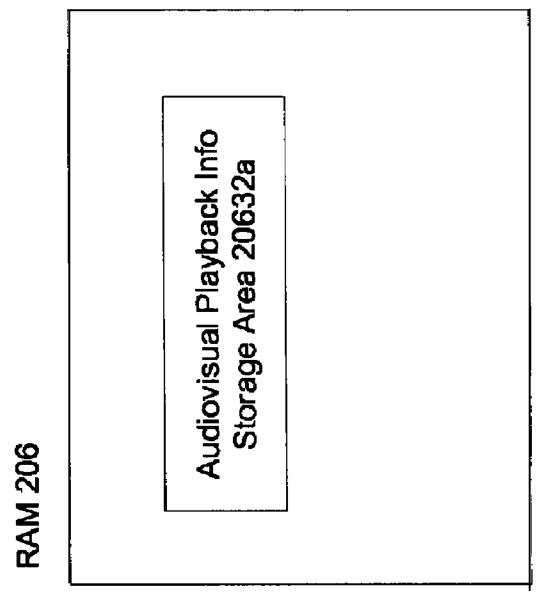

FIG. 145 is a block diagram illustrating an exemplary embodiment of the present invention.

Figure 146:
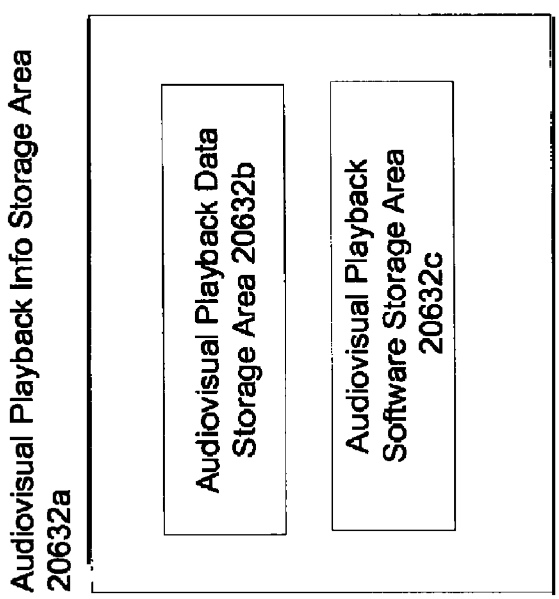

FIG. 146 is a block diagram illustrating an exemplary embodiment of the present invention.

Figure 147:
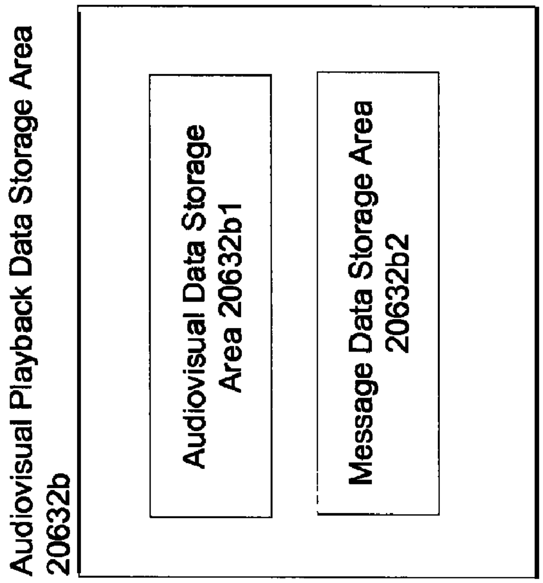

FIG. 147 is a block diagram illustrating an exemplary embodiment of the present invention.

Figure 148:
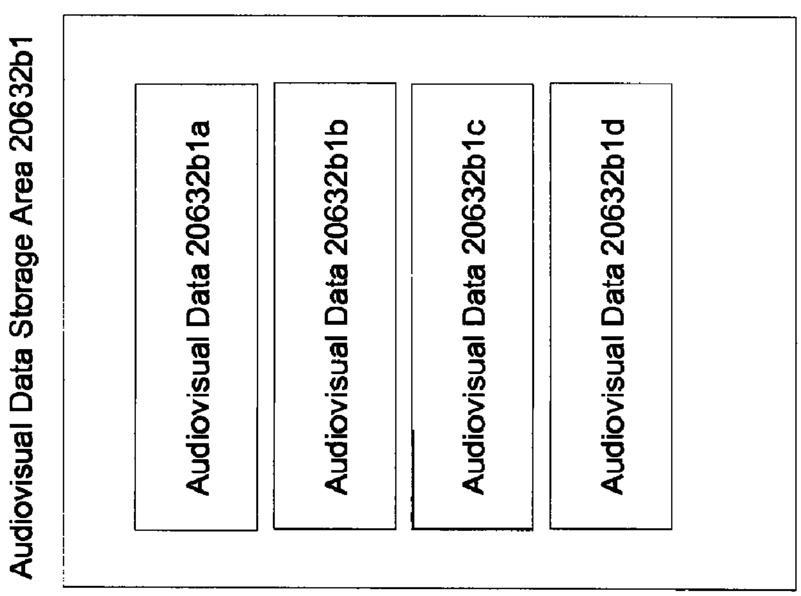

FIG. 148 is a block diagram illustrating an exemplary embodiment of the present invention.

FIG. 149 is a block diagram illustrating an exemplary embodiment of the present invention.

FIG. 150 is a block diagram illustrating an exemplary embodiment of the present invention.

Figure 151:
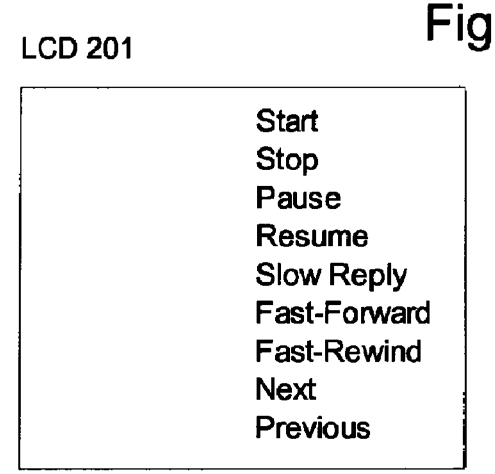

FIG. 151 is a simplified illustration illustrating an exemplary embodiment of the present invention.

Figure 152:
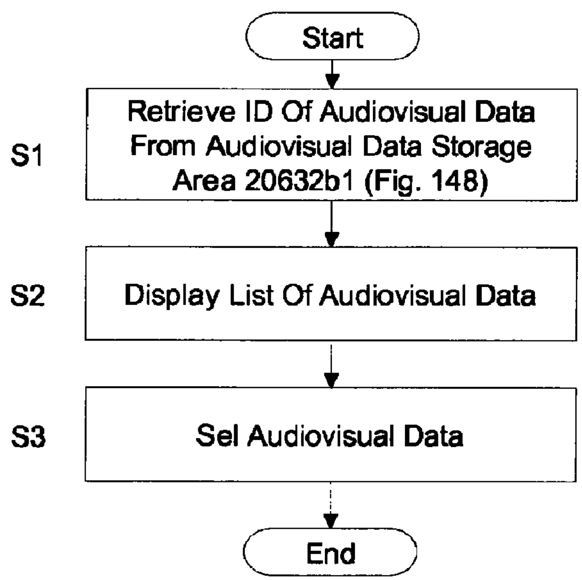

FIG. 152 is a flowchart illustrating an exemplary embodiment of the present invention.

Figure 153:
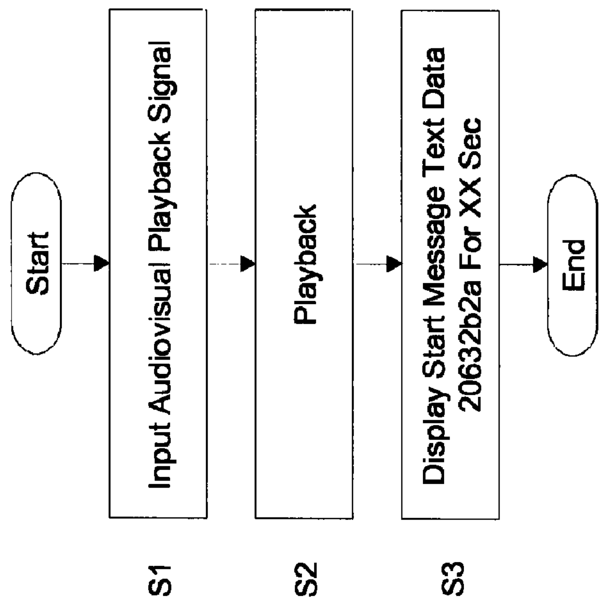

FIG. 153 is a flowchart illustrating an exemplary embodiment of the present invention.

Figure 154:
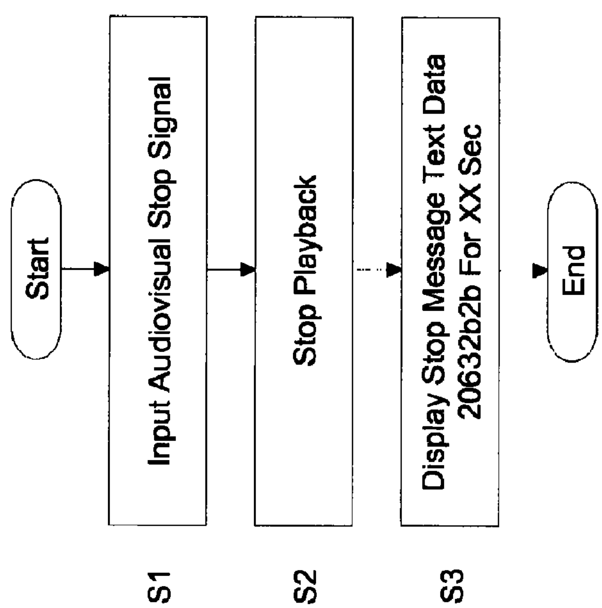

FIG. 154 is a flowchart illustrating an exemplary embodiment of the present invention.

Figure 155:
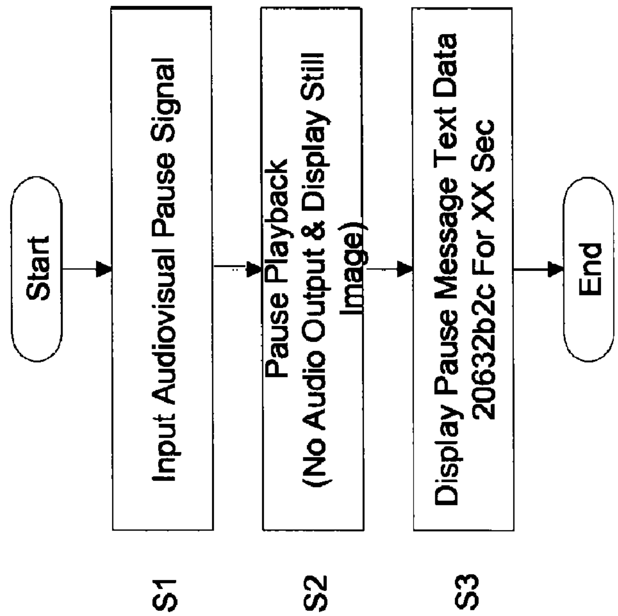

FIG. 155 is a flowchart illustrating an exemplary embodiment of the present invention.

Figure 156:
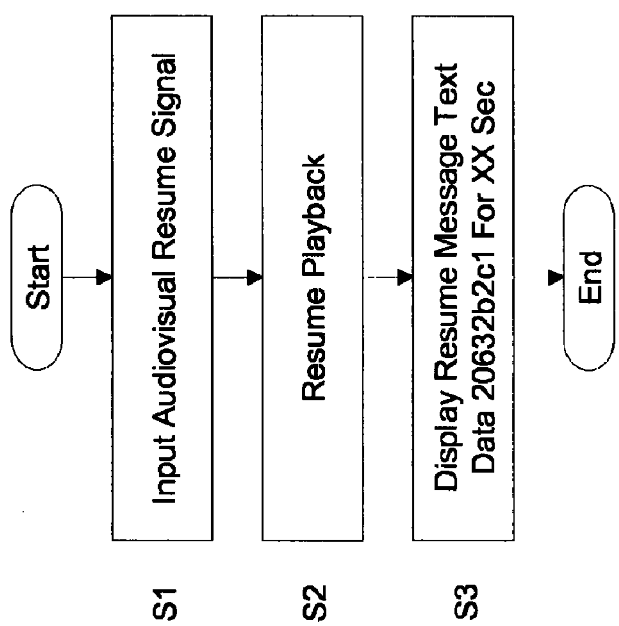

FIG. 156 is a flowchart illustrating an exemplary embodiment of the present invention.

Figure 157:
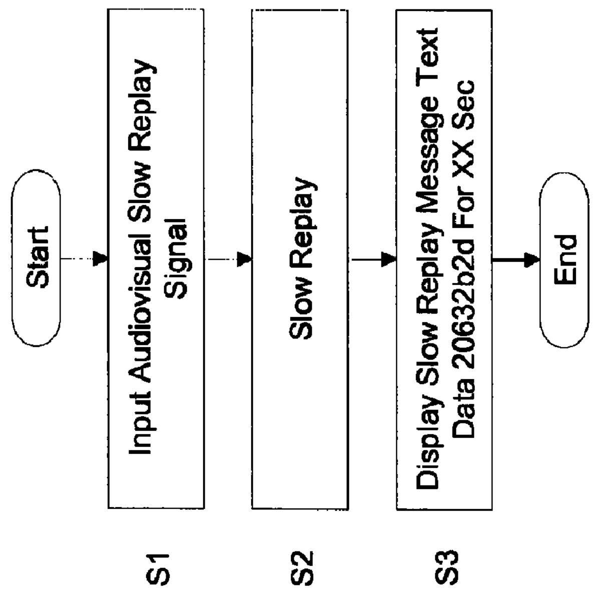

FIG. 157 is a flowchart illustrating an exemplary embodiment of the present invention.

Figure 158:
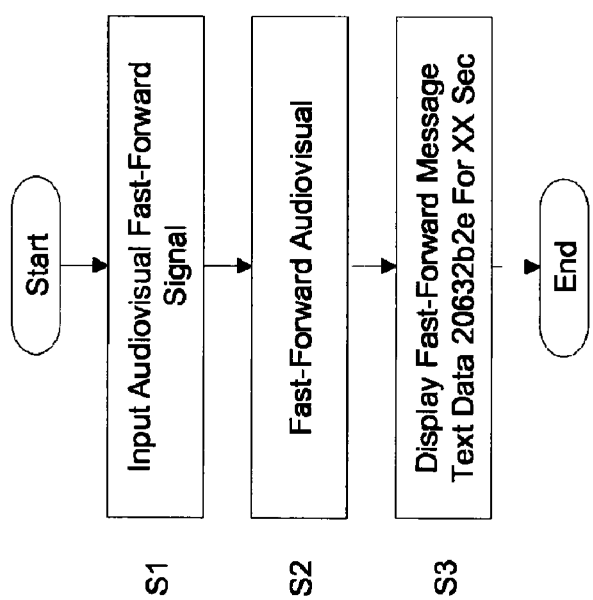

FIG. 158 is a flowchart illustrating an exemplary embodiment of the present invention.

Figure 159:
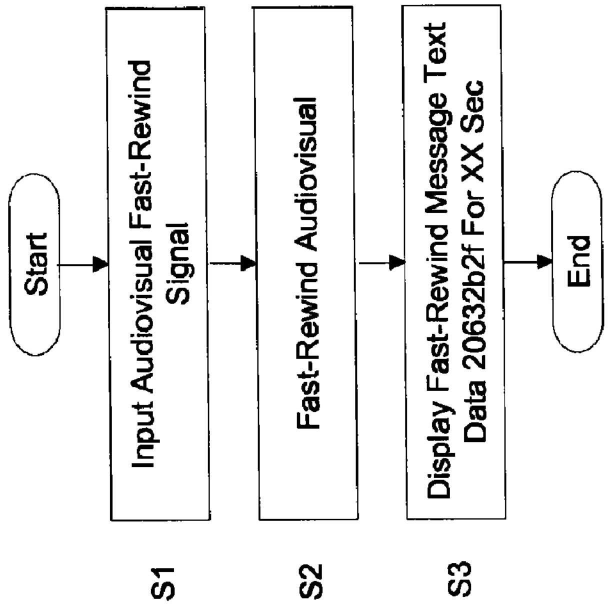

FIG. 159 is a flowchart illustrating an exemplary embodiment of the present invention.

Figure 160:
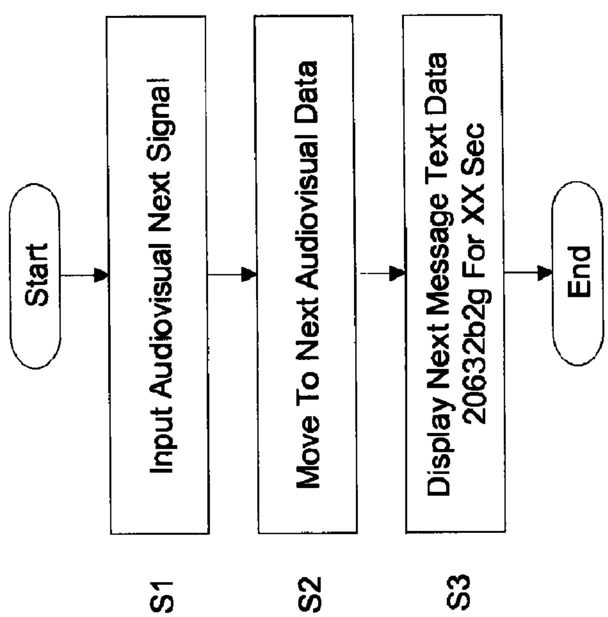

FIG. 160 is a flowchart illustrating an exemplary embodiment of the present invention.

Figure 161:
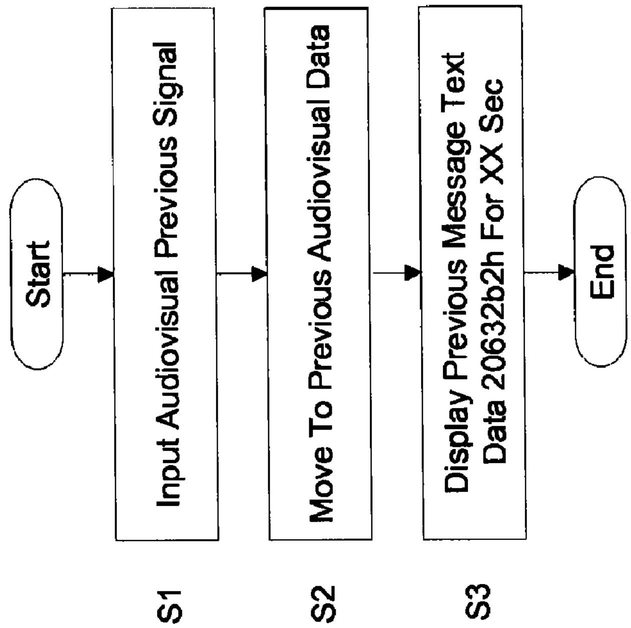

FIG. 161 is a flowchart illustrating an exemplary embodiment of the present invention.

Figure 162:
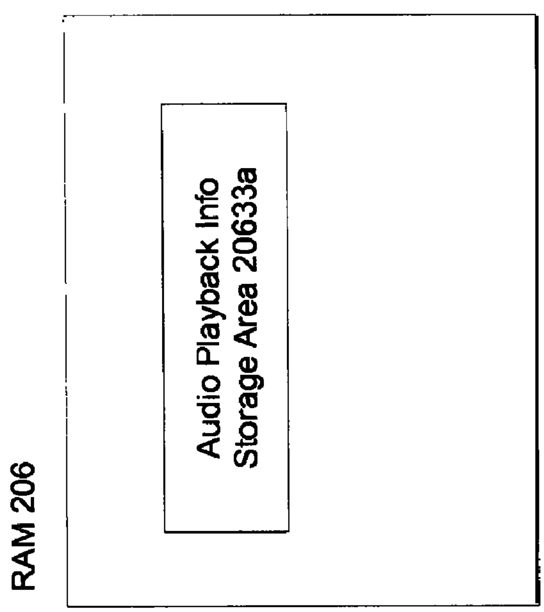

FIG. 162 is a block diagram illustrating an exemplary embodiment of the present invention.

Figure 163:
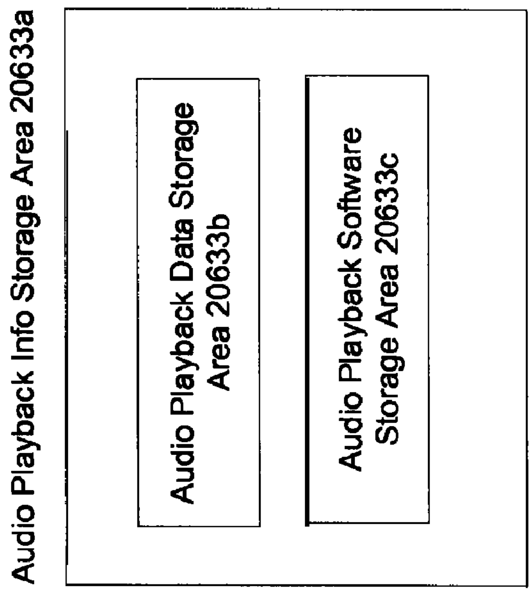

FIG. 163 is a block diagram illustrating an exemplary embodiment of the present invention.

Figure 164:
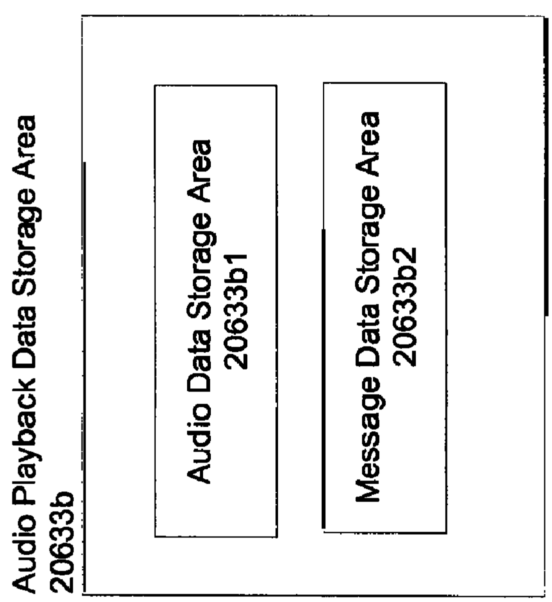

FIG. 164 is a block diagram illustrating an exemplary embodiment of the present invention.

Figure 165:
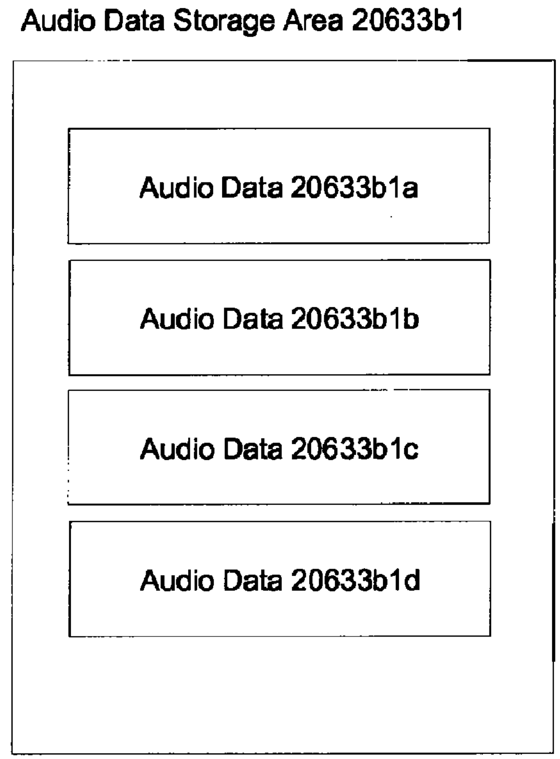

FIG. 165 is a block diagram illustrating an exemplary embodiment of the present invention.

Figure 166:
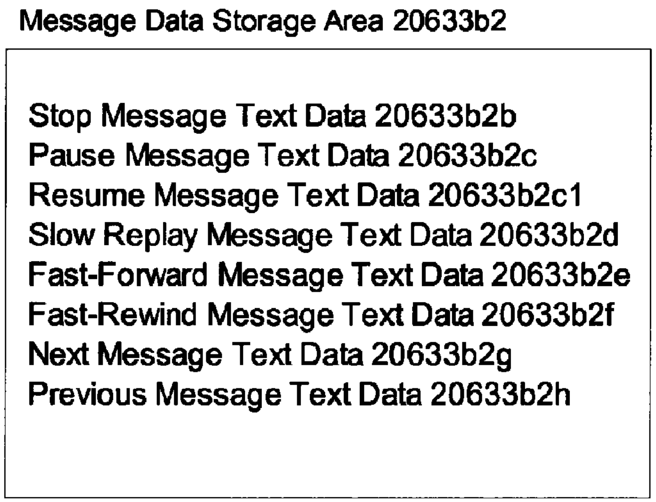

FIG. 166 is a block diagram illustrating an exemplary embodiment of the present invention.

FIG. 167 is a block diagram illustrating an exemplary embodiment of the present invention.

FIG. 168 is a simplified illustration illustrating an exemplary embodiment of the present invention.

Figure 169:
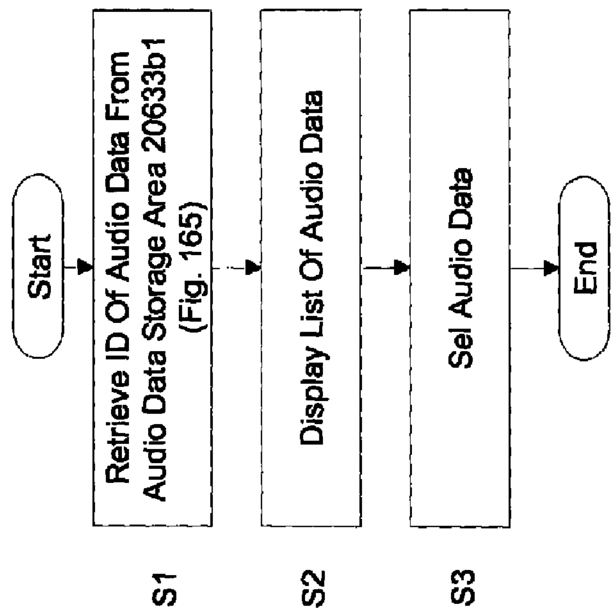

FIG. 169 is a flowchart illustrating an exemplary embodiment of the present invention.

Figure 170:
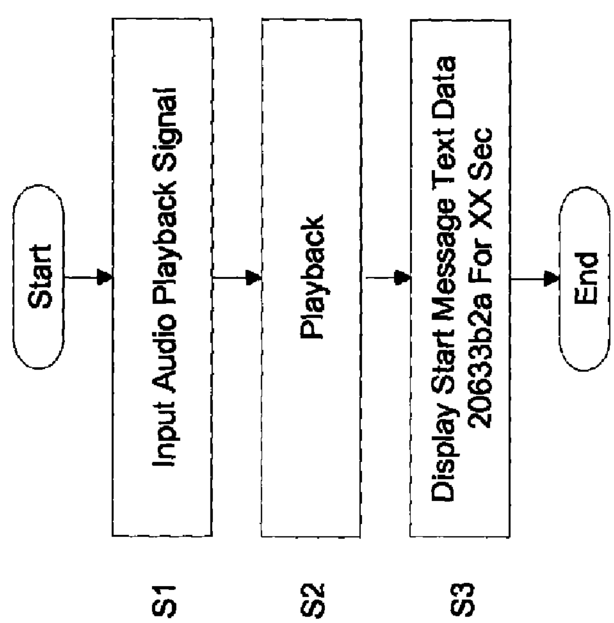

FIG. 170 is a flowchart illustrating an exemplary embodiment of the present invention.

Figure 171:
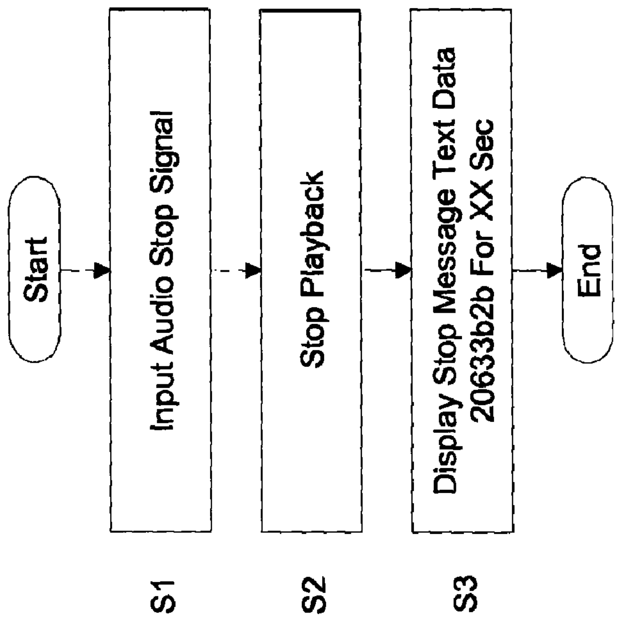

FIG. 171 is a flowchart illustrating an exemplary embodiment of the present invention.

Figure 172:
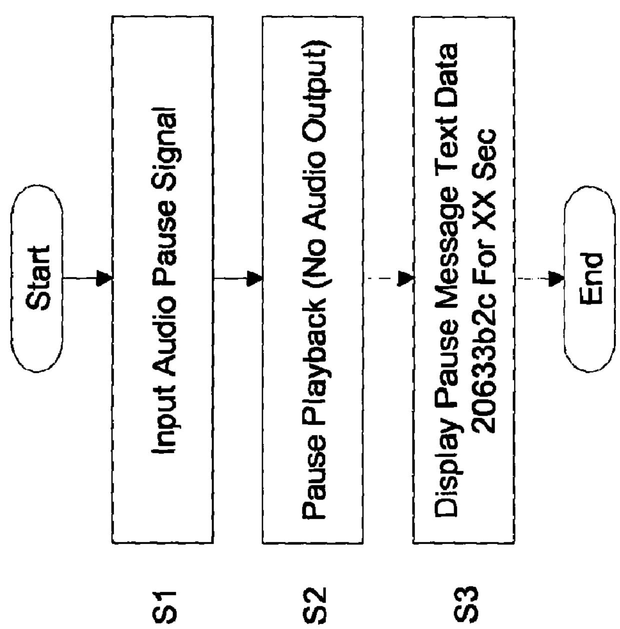

FIG. 172 is a flowchart illustrating an exemplary embodiment of the present invention.

Figure 173:
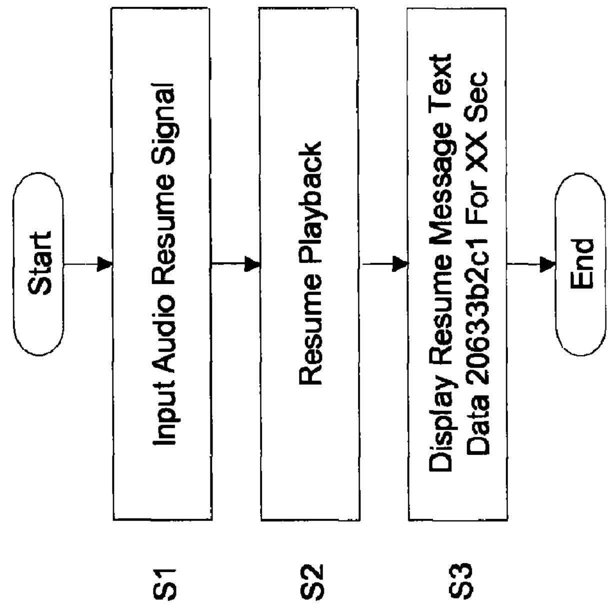

FIG. 173 is a flowchart illustrating an exemplary embodiment of the present invention.

Figure 174:
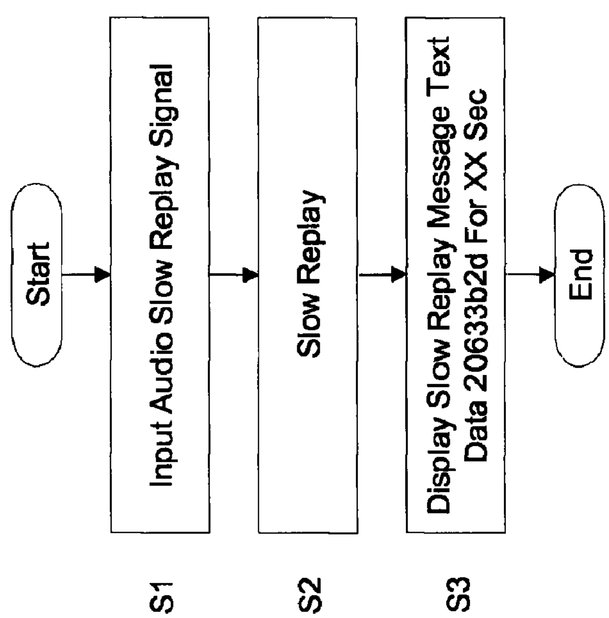

FIG. 174 is a flowchart illustrating an exemplary embodiment of the present invention.

Figure 175:
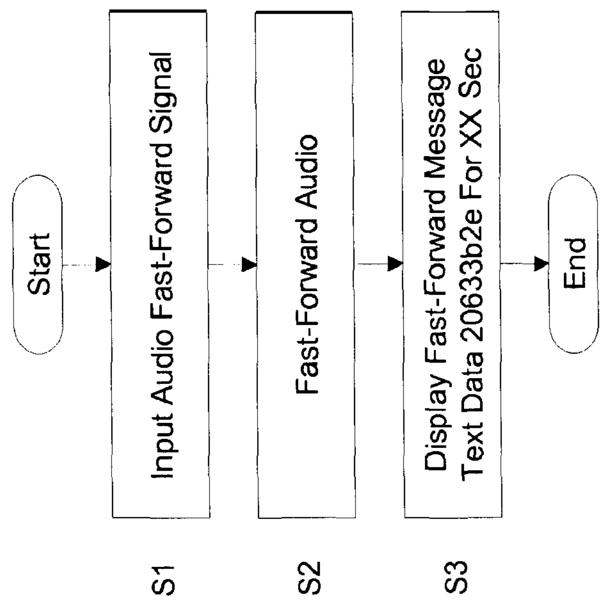

FIG. 175 is a flowchart illustrating an exemplary embodiment of the present invention.

Figure 176:
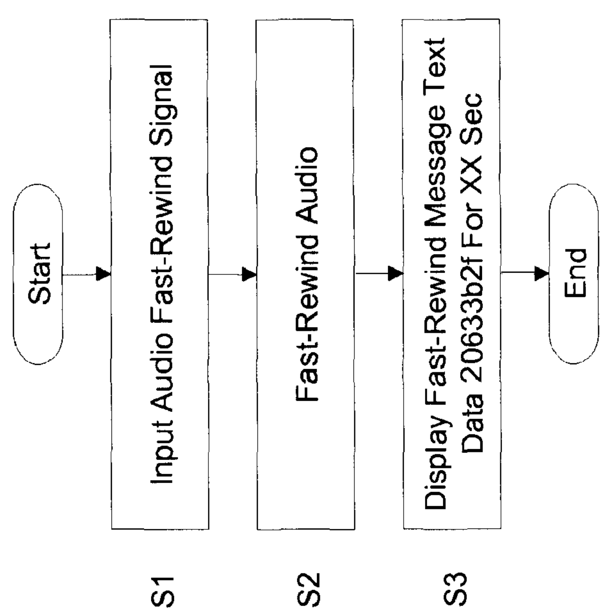

FIG. 176 is a flowchart illustrating an exemplary embodiment of the present invention.

Figure 177:
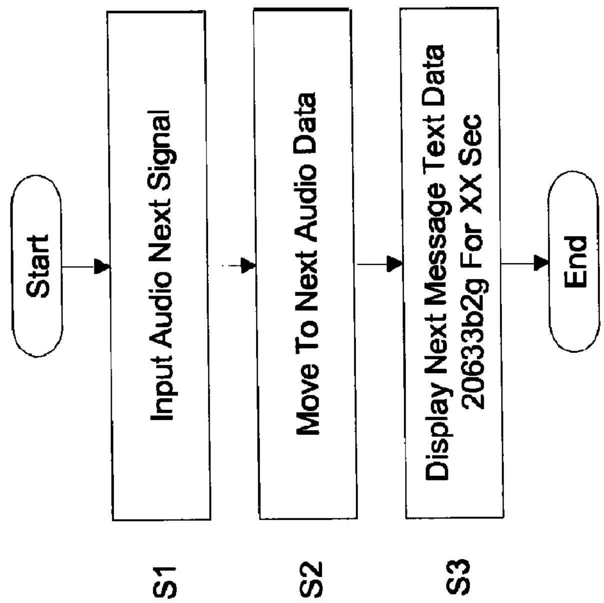

FIG. 177 is a flowchart illustrating an exemplary embodiment of the present invention.

Figure 178:
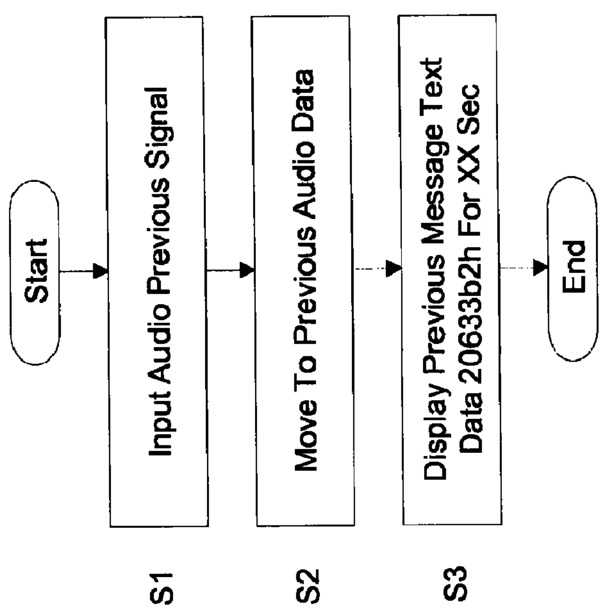

FIG. 178 is a flowchart illustrating an exemplary embodiment of the present invention.

Figure 179:
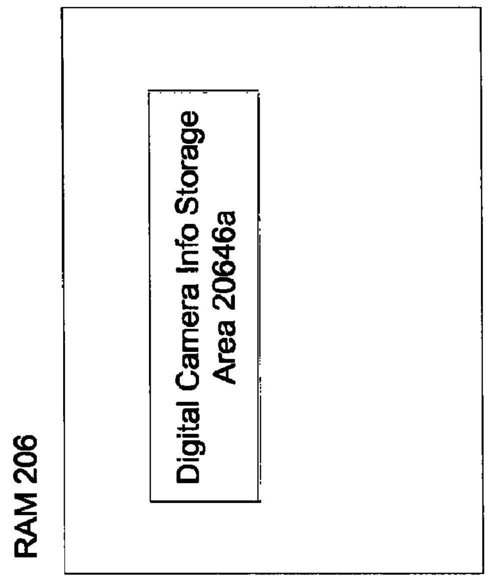

FIG. 179 is a block diagram illustrating an exemplary embodiment of the present invention.

Figure 180:
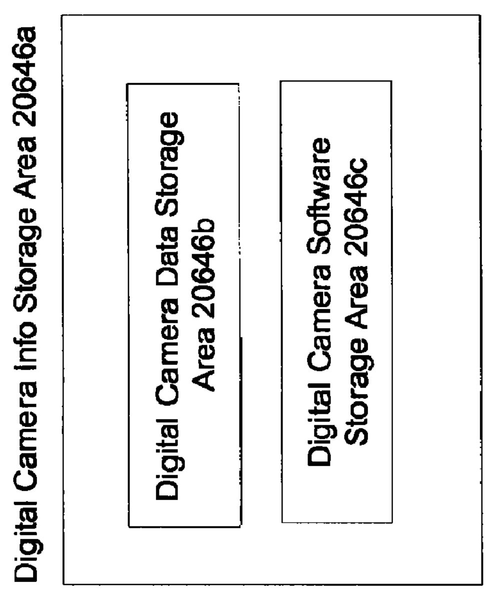

FIG. 180 is a block diagram illustrating an exemplary embodiment of the present invention.

Figures 181, 182:
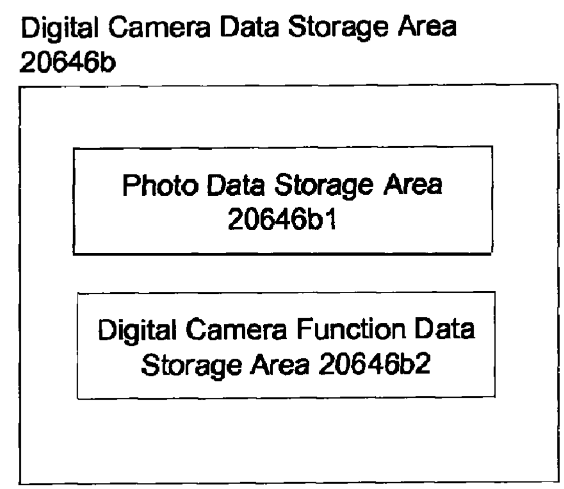

FIG. 181 is a block diagram illustrating an exemplary embodiment of the present invention.

FIG. 182 is a block diagram illustrating an exemplary embodiment of the present invention.

Figure 183:
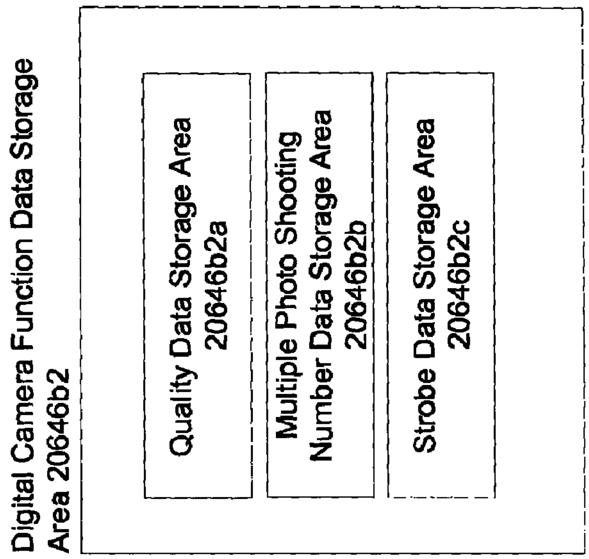

FIG. 183 is a block diagram illustrating an exemplary embodiment of the present invention.

Figure 184:
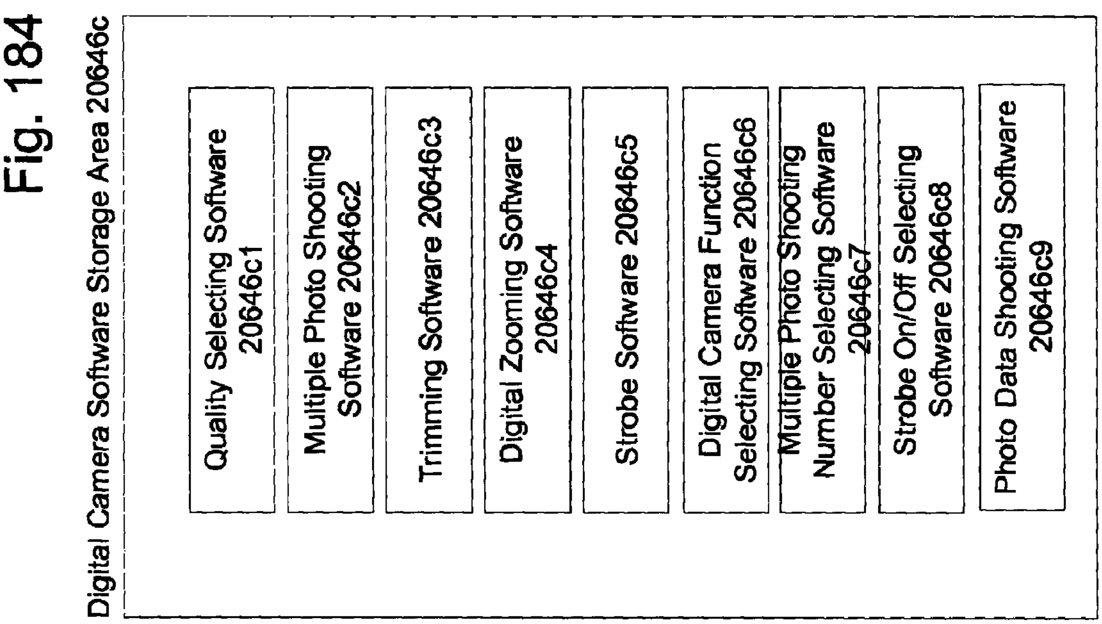

FIG. 184 is a block diagram illustrating an exemplary embodiment of the present invention.

Figure 185:
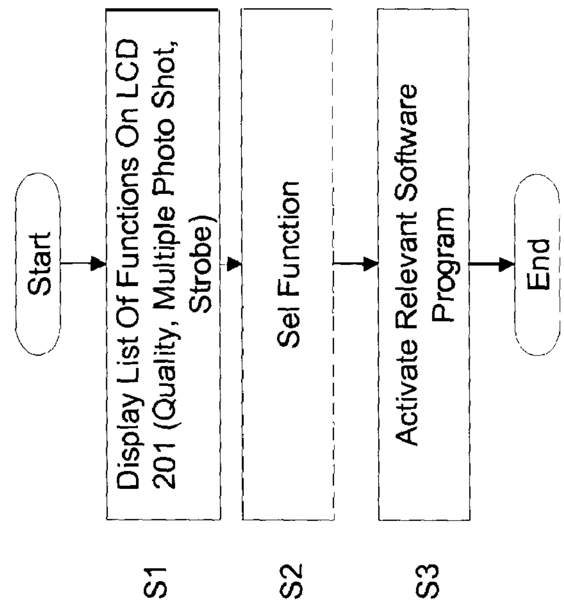

FIG. 185 is a flowchart illustrating an exemplary embodiment of the present invention.

Figure 186:
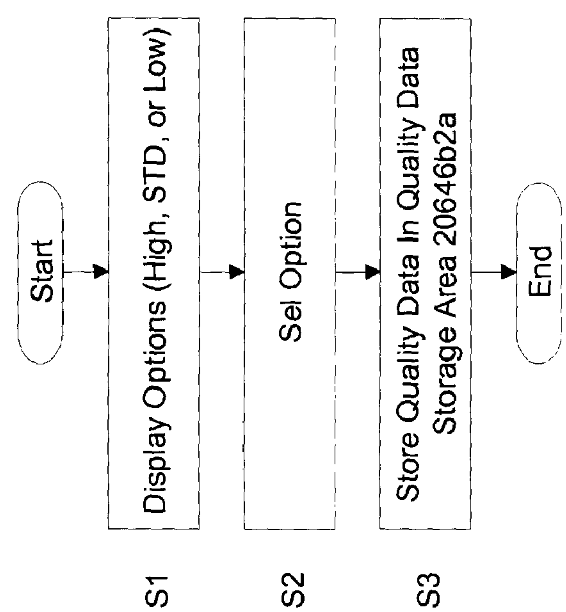

FIG. 186 is a flowchart illustrating an exemplary embodiment of the present invention.

Figure 187:
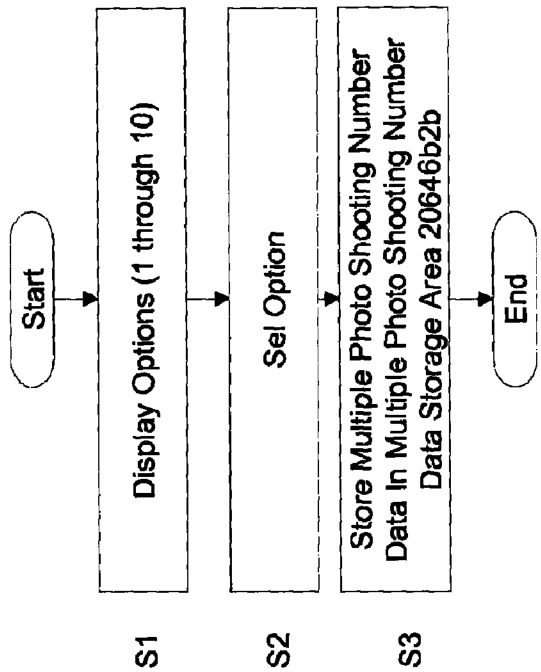

FIG. 187 is a flowchart illustrating an exemplary embodiment of the present invention.

Figure 188:
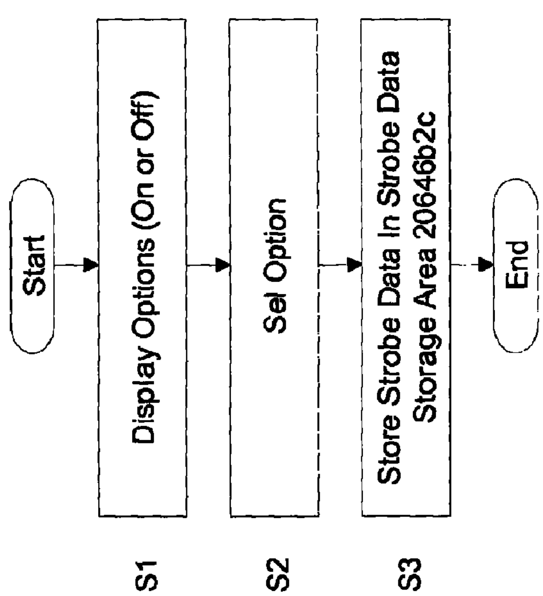

FIG. 188 is a flowchart illustrating an exemplary embodiment of the present invention.

Figure 189:
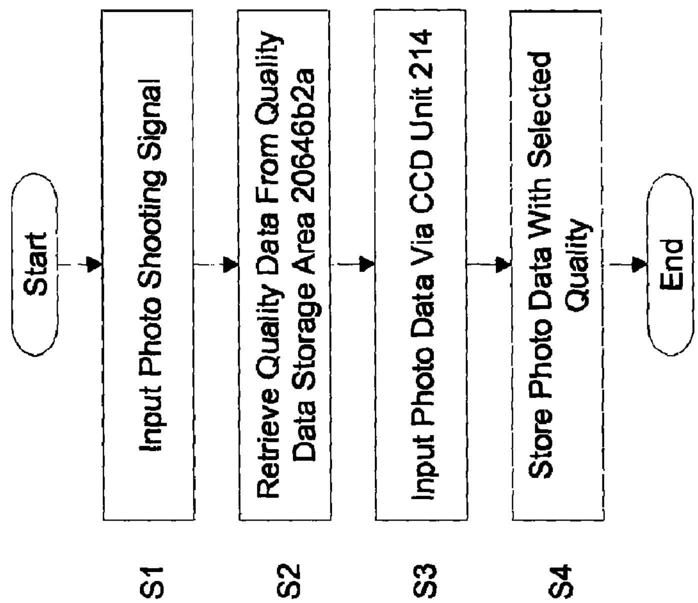

FIG. 189 is a flowchart illustrating an exemplary embodiment of the present invention.

Figure 190:
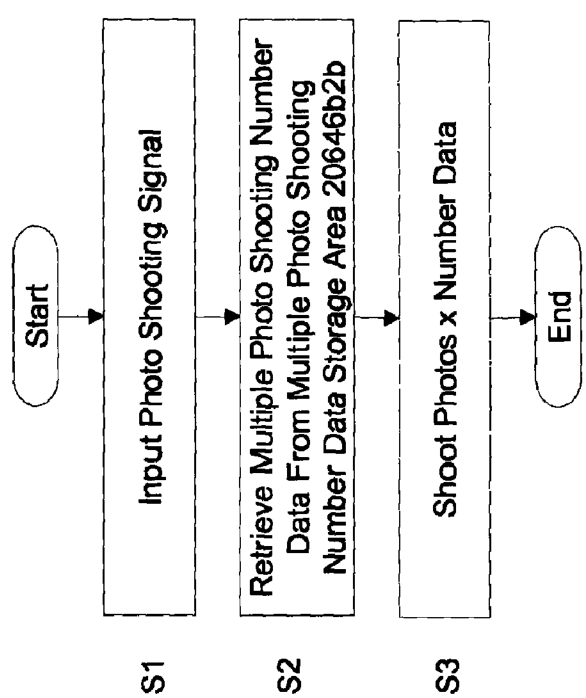

FIG. 190 is a flowchart illustrating an exemplary embodiment of the present invention.

Figure 191:
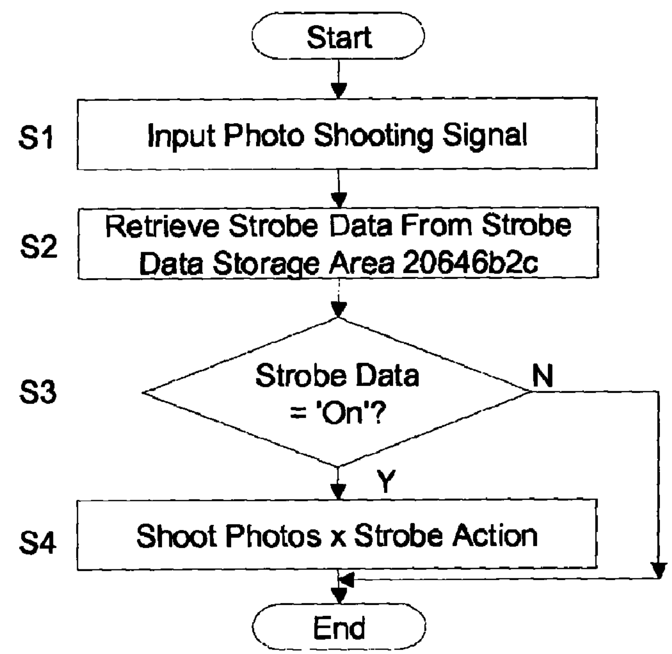

FIG. 191 is a flowchart illustrating an exemplary embodiment of the present invention.

Figure 192:
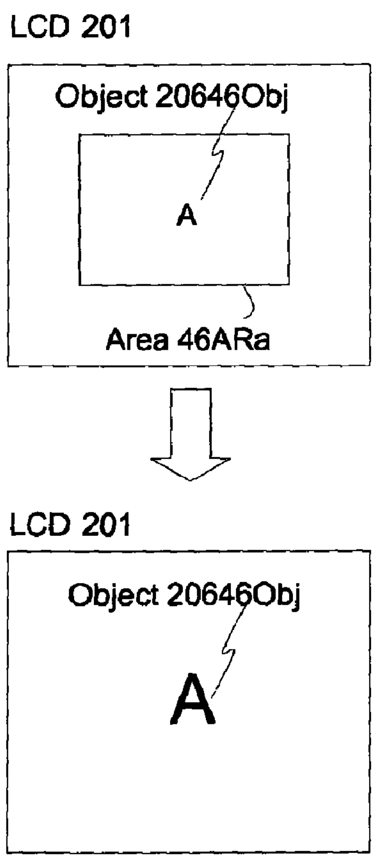

FIG. 192 is a simplified illustration illustrating an exemplary embodiment of the present invention.

Figure 193:
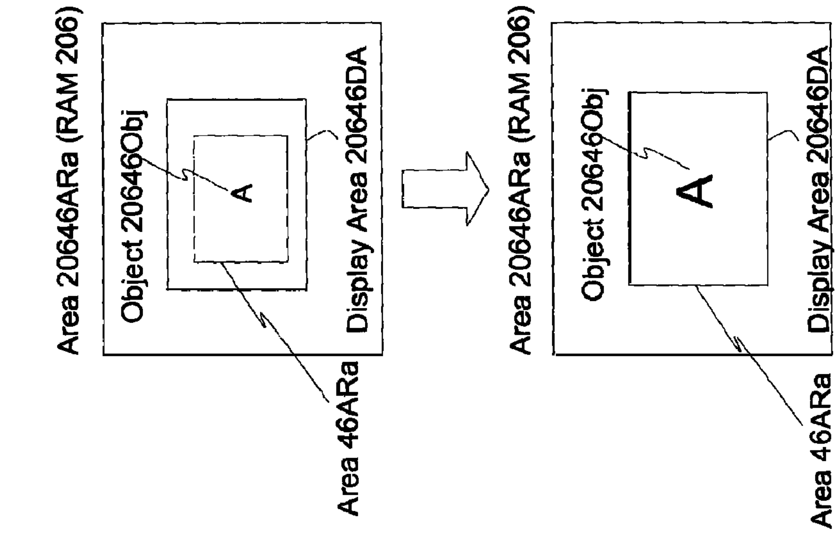

FIG. 193 is a simplified illustration illustrating an exemplary embodiment of the present invention.

Figure 194:
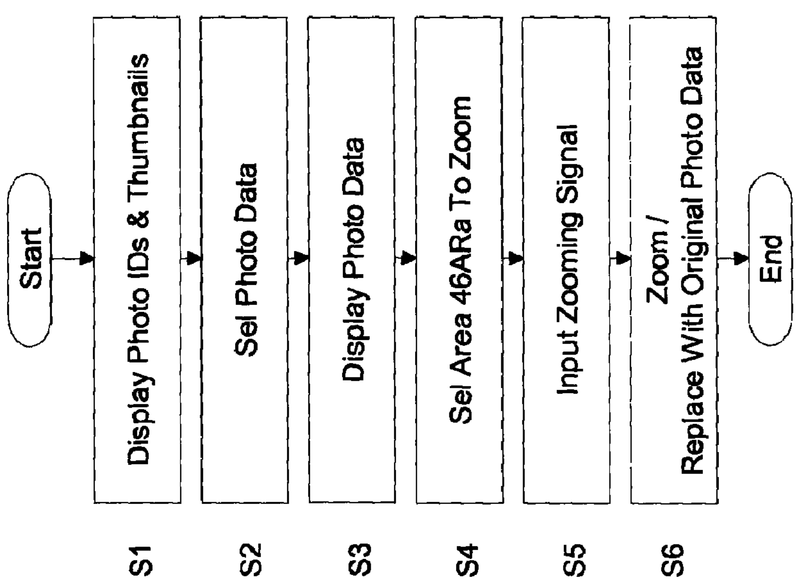

FIG. 194 is a flowchart illustrating an exemplary embodiment of the present invention.

Figure 195:
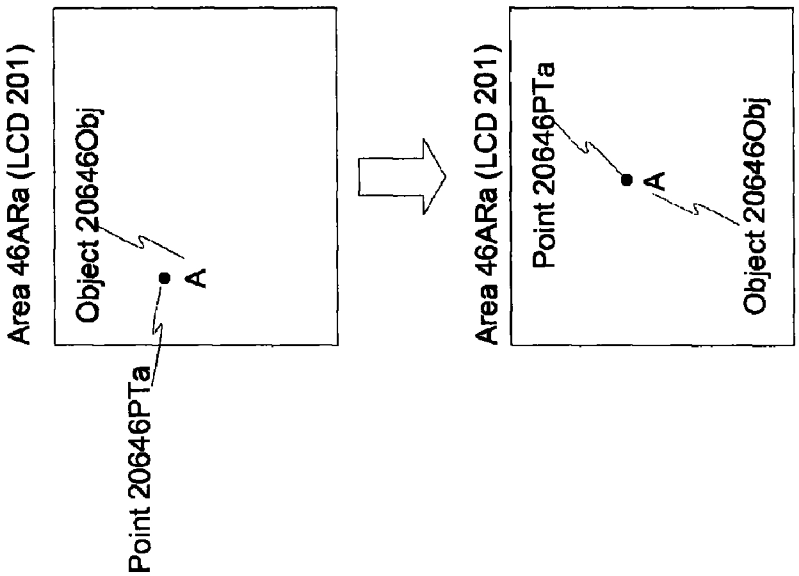

FIG. 195 is a simplified illustration illustrating an exemplary embodiment of the present invention.

Figure 196:
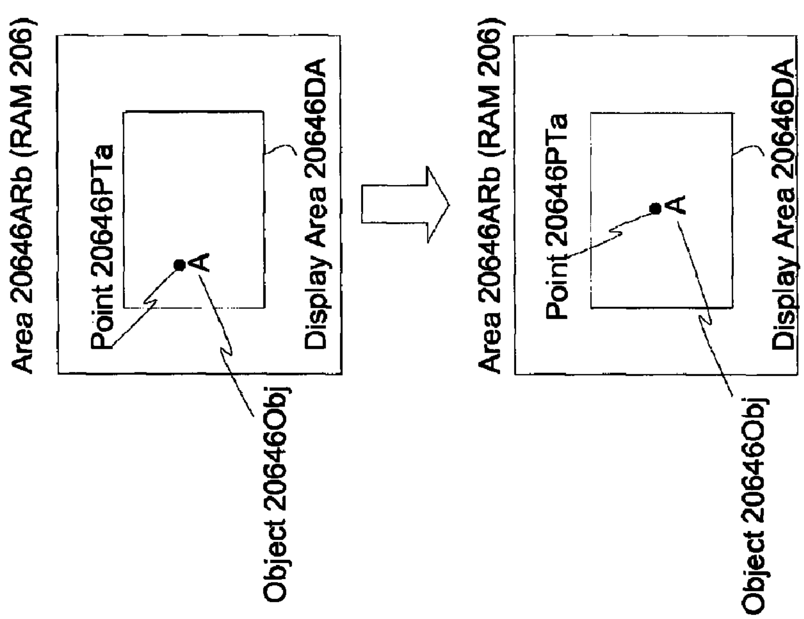

FIG. 196 is a simplified illustration illustrating an exemplary embodiment of the present invention.

Figure 197:
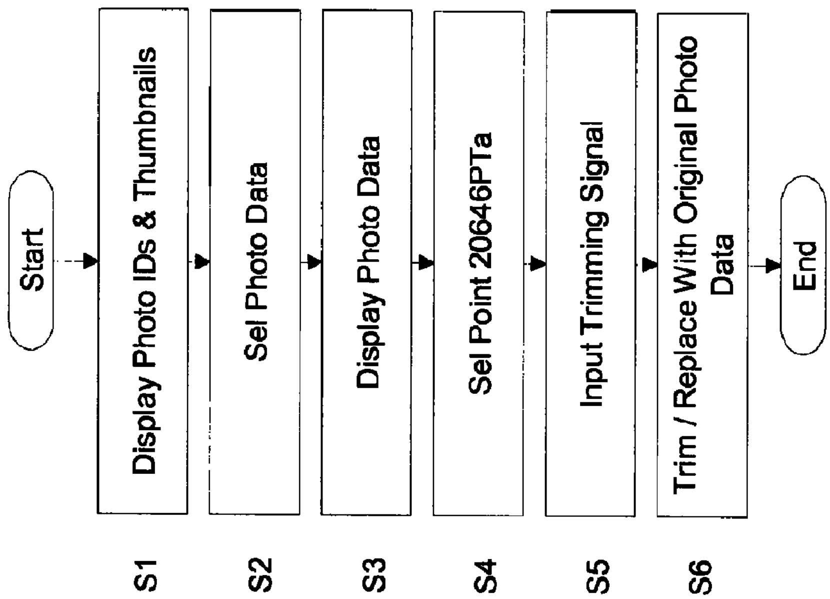

FIG. 197 is a flowchart illustrating an exemplary embodiment of the present invention.

Figure 198:
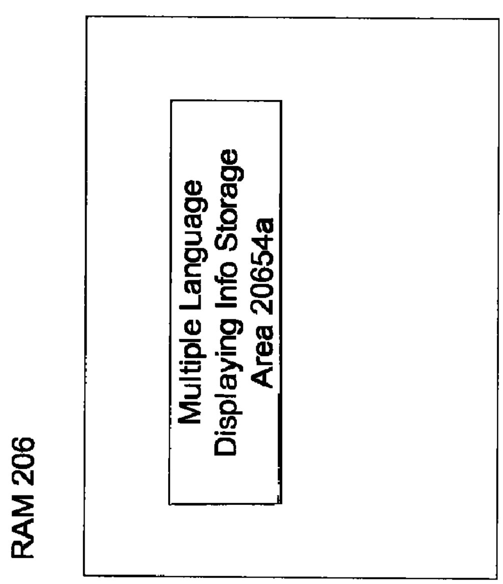

FIG. 198 is a block diagram illustrating an exemplary embodiment of the present invention.

Figure 199:
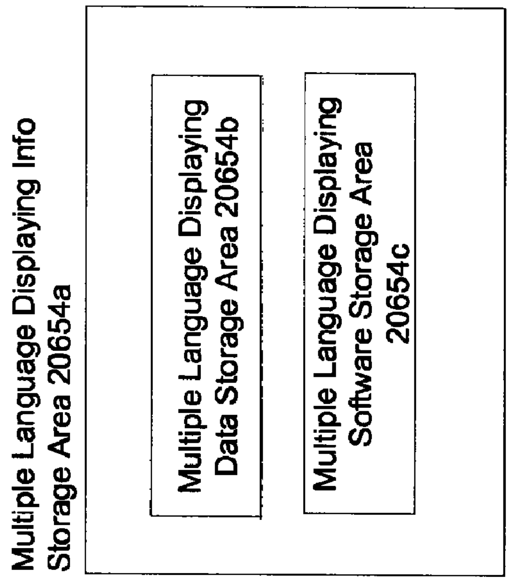

FIG. 199 is a block diagram illustrating an exemplary embodiment of the present invention.

Figure 200:
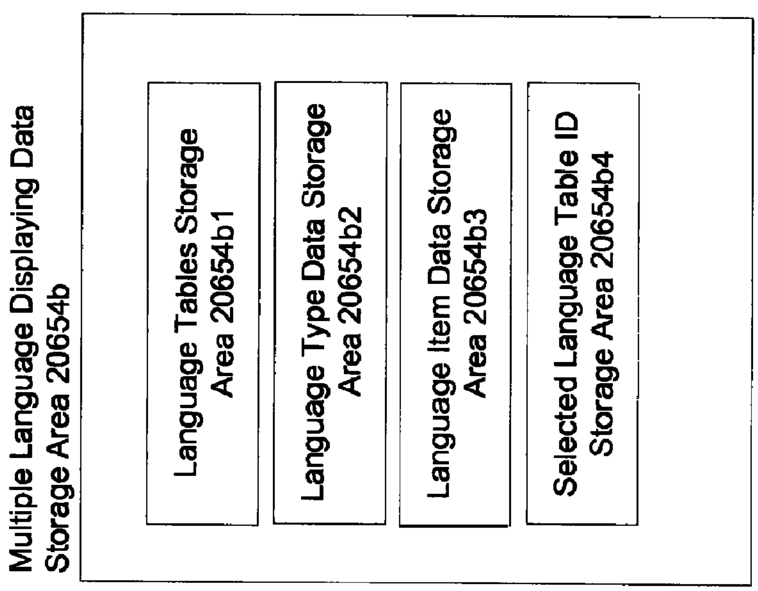

FIG. 200 is a block diagram illustrating an exemplary embodiment of the present invention.

FIG. 201 is a block diagram illustrating an exemplary embodiment of the present invention.

FIG. 202 is a block diagram illustrating an exemplary embodiment of the present invention.

FIG. 203 is a block diagram illustrating an exemplary embodiment of the present invention.

FIG. 204 is a block diagram illustrating an exemplary embodiment of the present invention.

FIG. 205 is a block diagram illustrating an exemplary embodiment of the present invention.

FIG. 206 is a block diagram illustrating an exemplary embodiment of the present invention.

FIG. 207 is a block diagram illustrating an exemplary embodiment of the present invention.

FIG. 208 is a block diagram illustrating an exemplary embodiment of the present invention.

Figure 209:
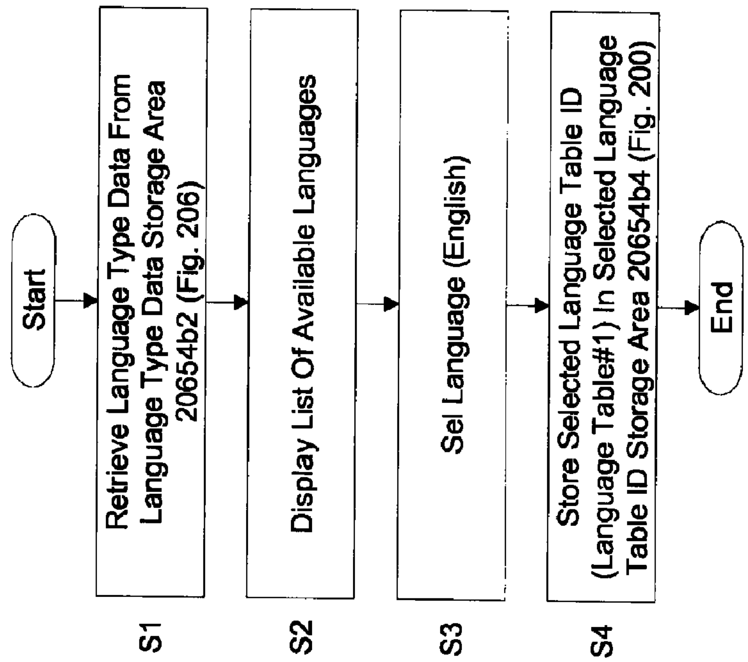

FIG. 209 is a flowchart illustrating an exemplary embodiment of the present invention.

Figure 210:
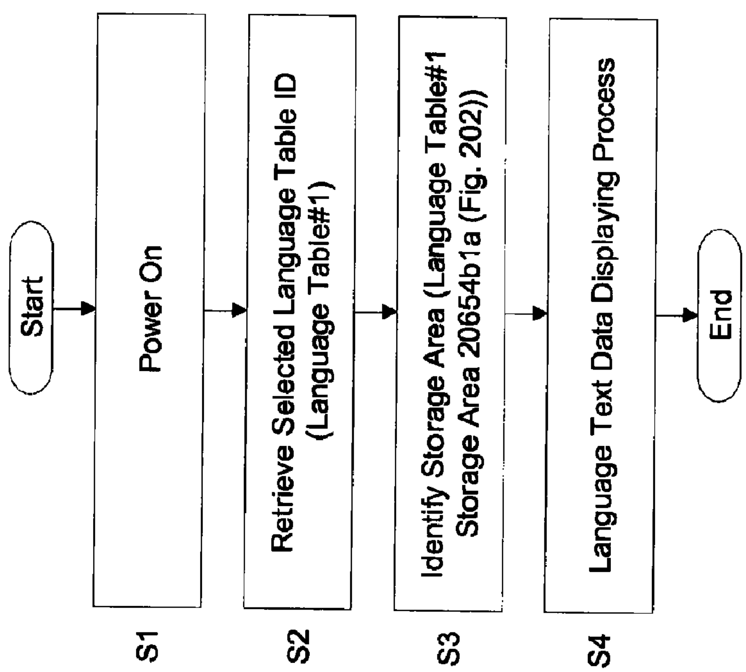

FIG. 210 is a flowchart illustrating an exemplary embodiment of the present invention.

Figure 211:
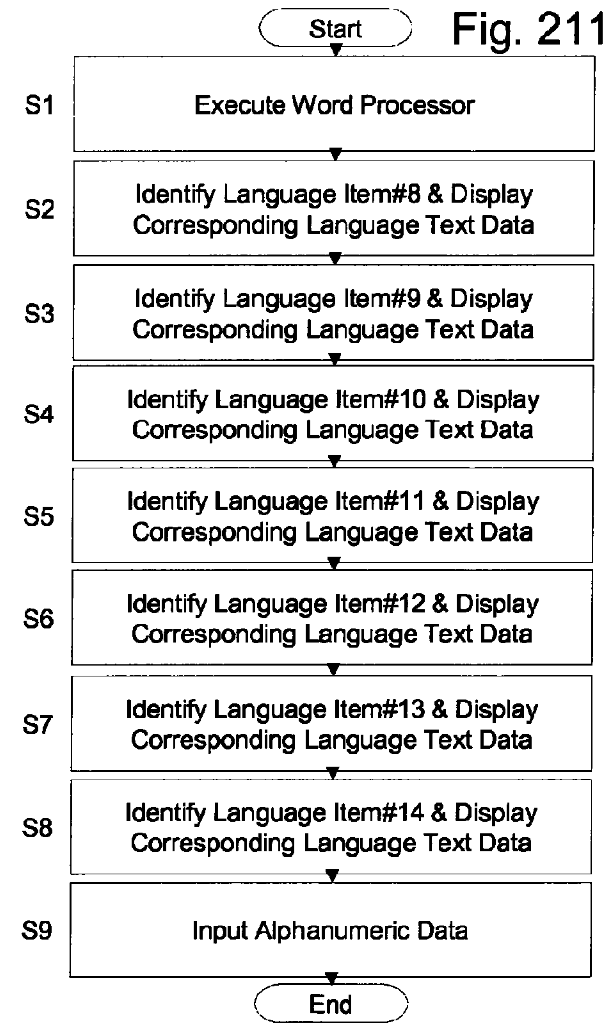

FIG. 211 is a flowchart illustrating an exemplary embodiment of the present invention.

Figure 212:
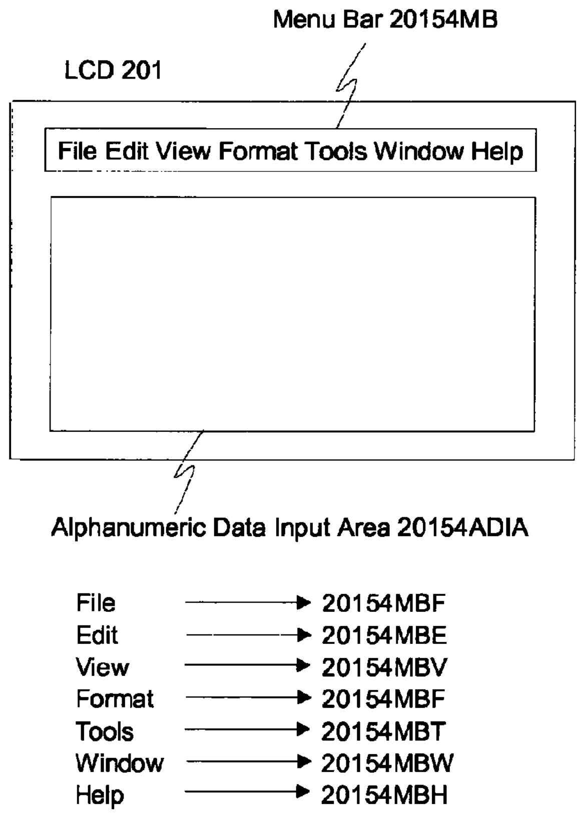

FIG. 212 is a simplified illustration illustrating an exemplary embodiment of the present invention.

Figure 213:
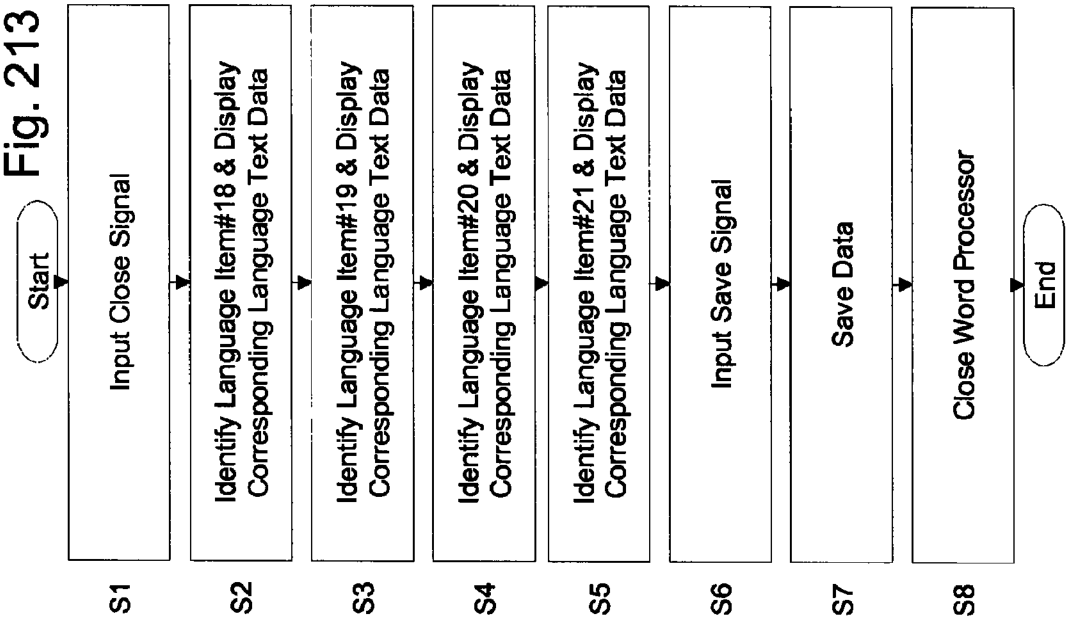

FIG. 213 is a flowchart illustrating an exemplary embodiment of the present invention.

Figure 214:
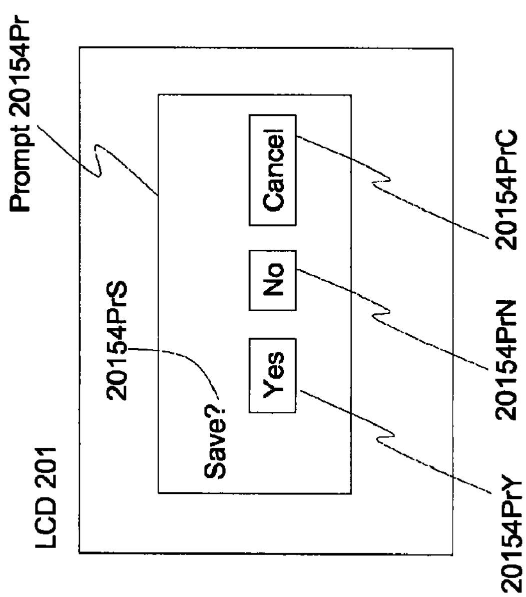

FIG. 214 is a simplified illustration illustrating an exemplary embodiment of the present invention.

Figure 215:
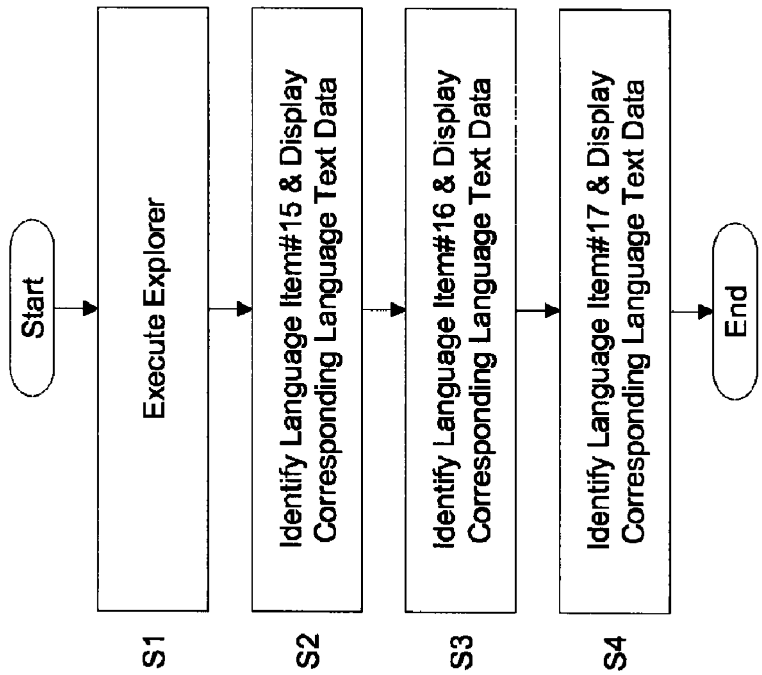

FIG. 215 is a flowchart illustrating an exemplary embodiment of the present invention.

Figure 216:
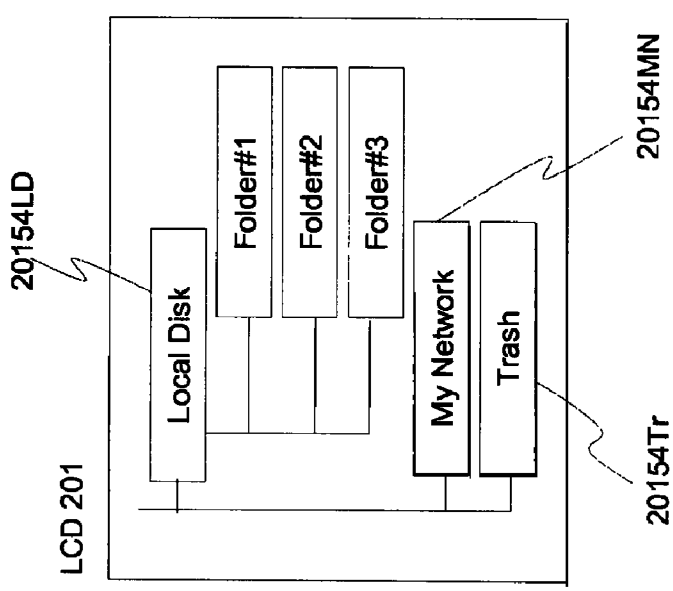

FIG. 216 is a simplified illustration illustrating an exemplary embodiment of the present invention.

Figure 217:
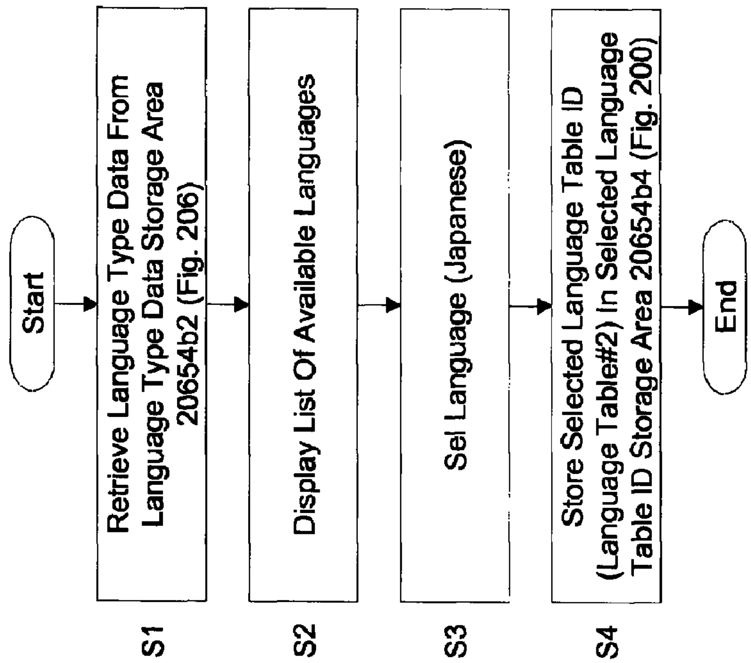

FIG. 217 is a flowchart illustrating an exemplary embodiment of the present invention.

Figure 218:
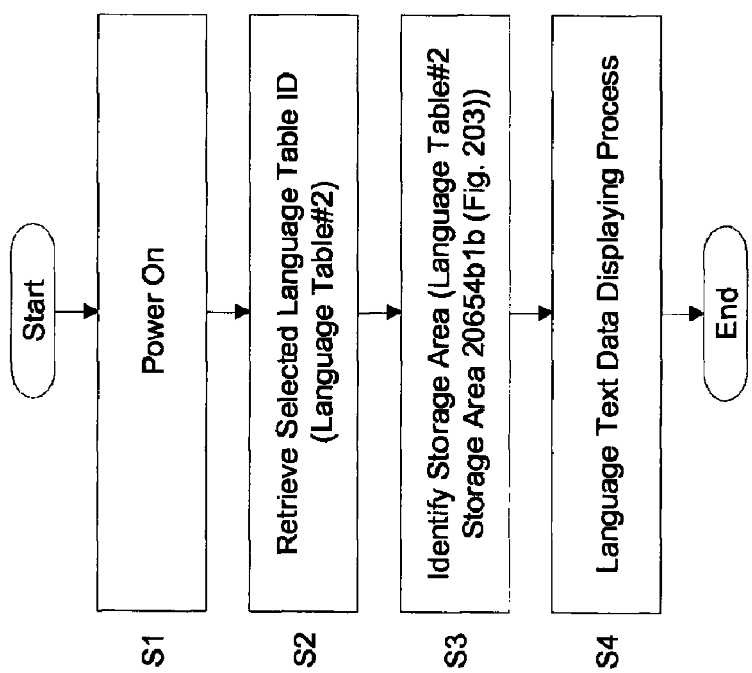

FIG. 218 is a flowchart illustrating an exemplary embodiment of the present invention.

Figure 219:
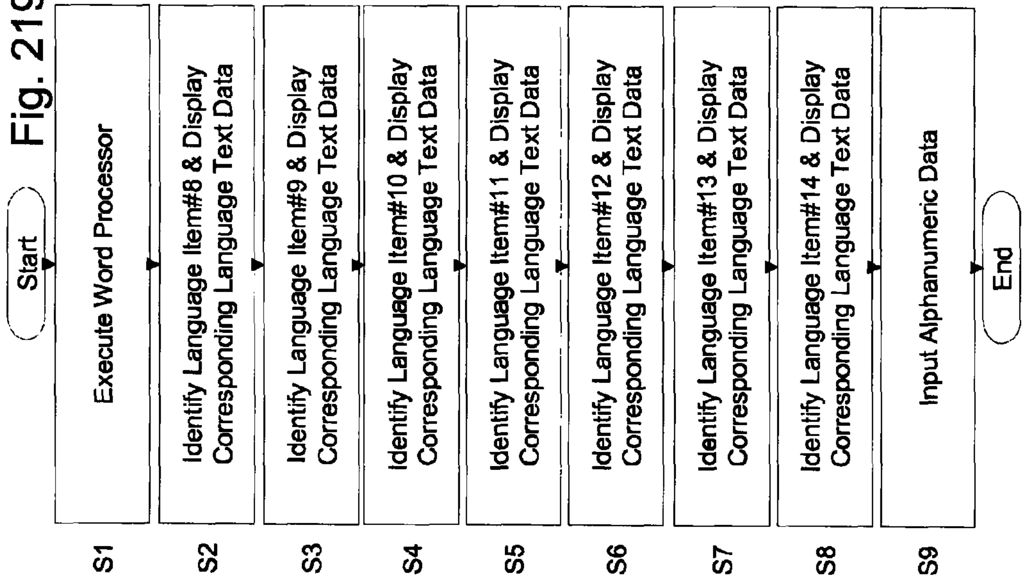

FIG. 219 is a flowchart illustrating an exemplary embodiment of the present invention.

Figure 220:
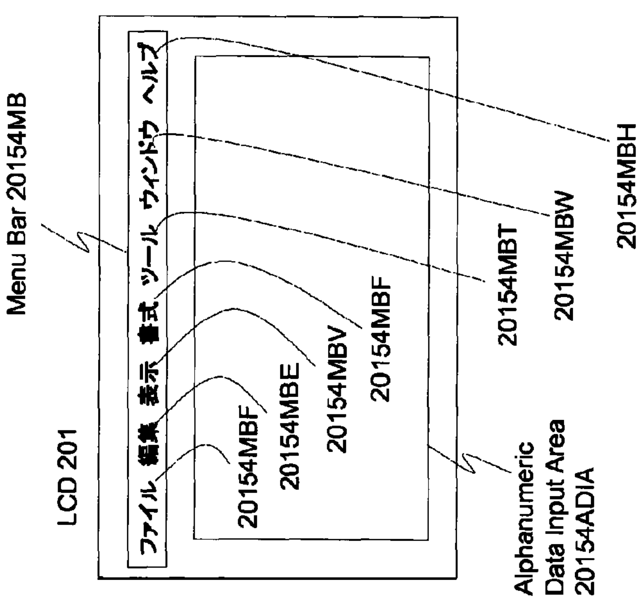

FIG. 220 is a simplified illustration illustrating an exemplary embodiment of the present invention.

Figure 221:
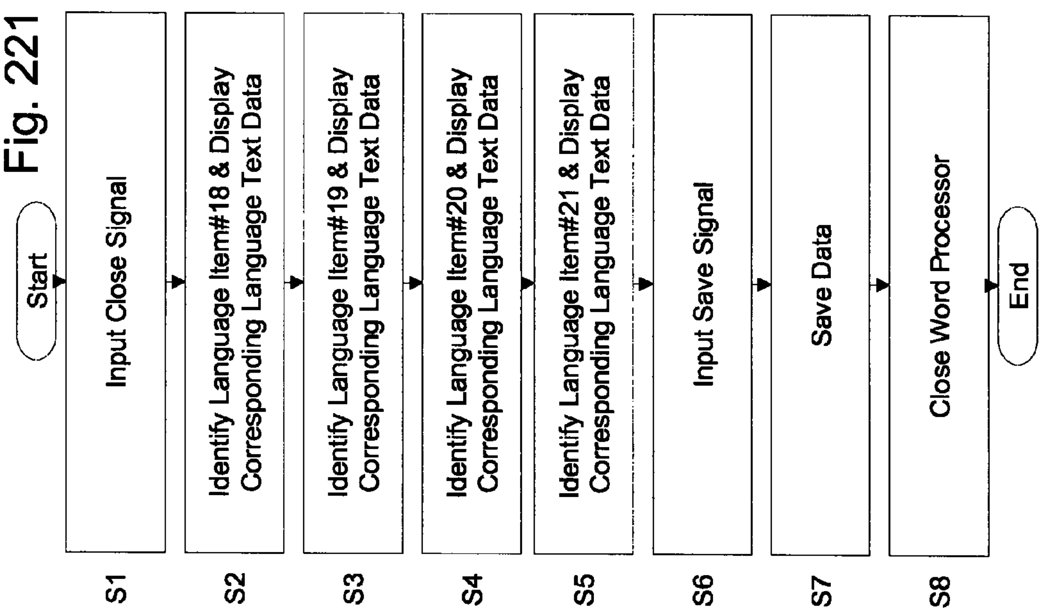

FIG. 221 is a flowchart illustrating an exemplary embodiment of the present invention.

Figure 222:
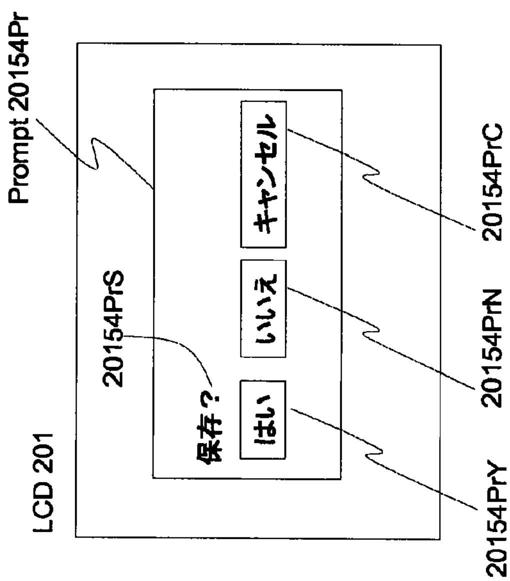

FIG. 222 is a simplified illustration illustrating an exemplary embodiment of the present invention.

Figure 223:
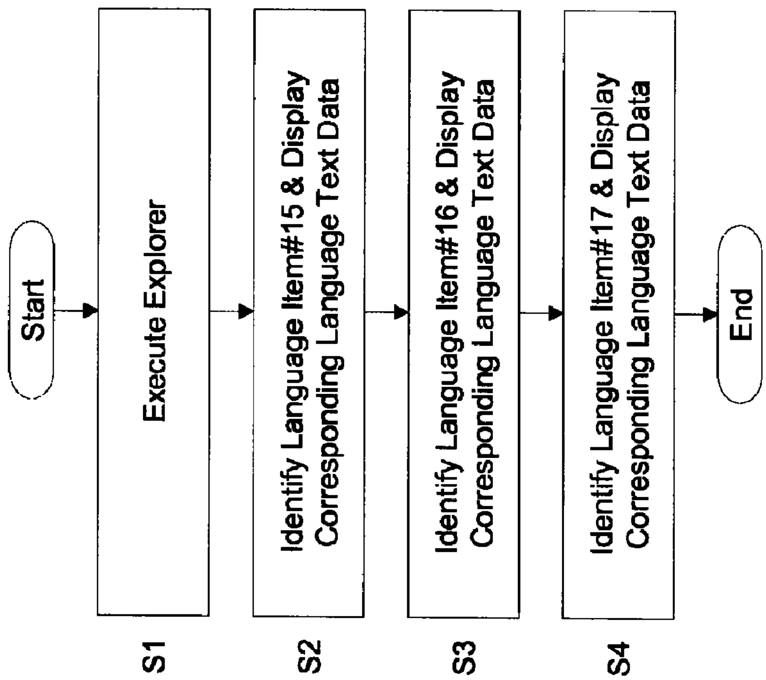

FIG. 223 is a flowchart illustrating an exemplary embodiment of the present invention.

Figure 224:
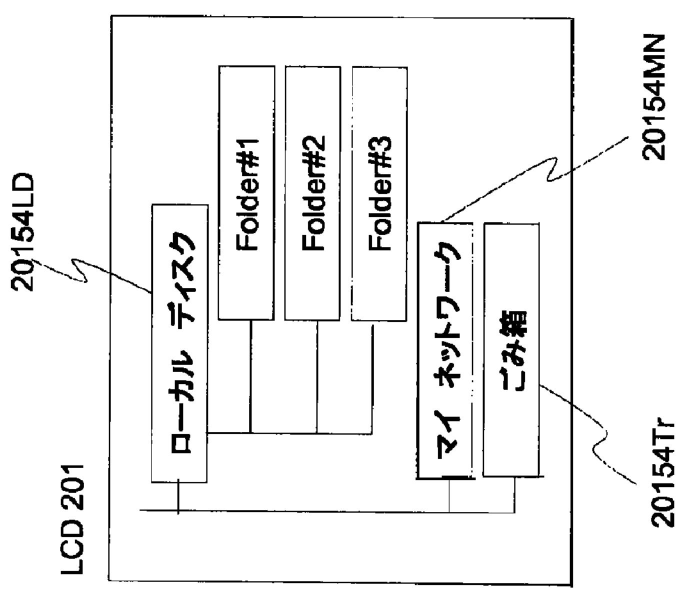

FIG. 224 is a simplified illustration illustrating an exemplary embodiment of the present invention.

Figure 225:
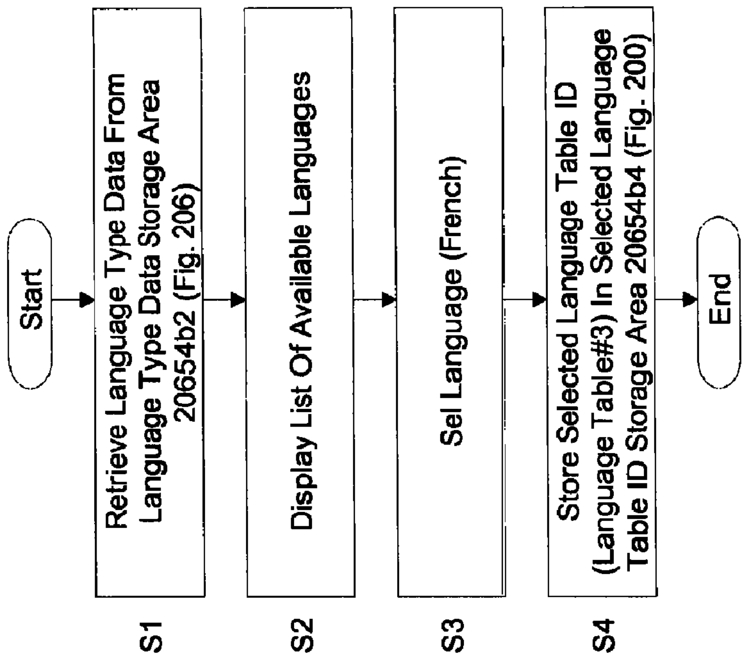

FIG. 225 is a flowchart illustrating an exemplary embodiment of the present invention.

Figure 226:
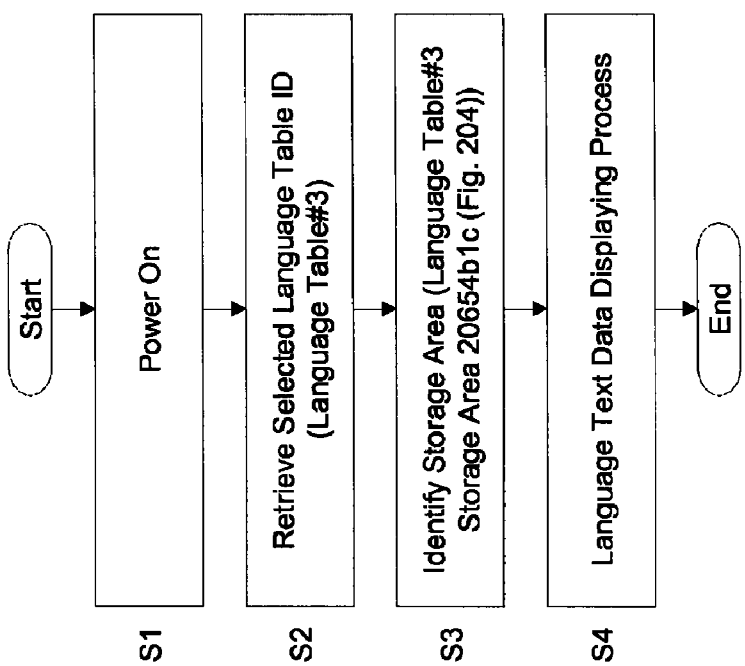

FIG. 226 is a flowchart illustrating an exemplary embodiment of the present invention.

Figure 227:
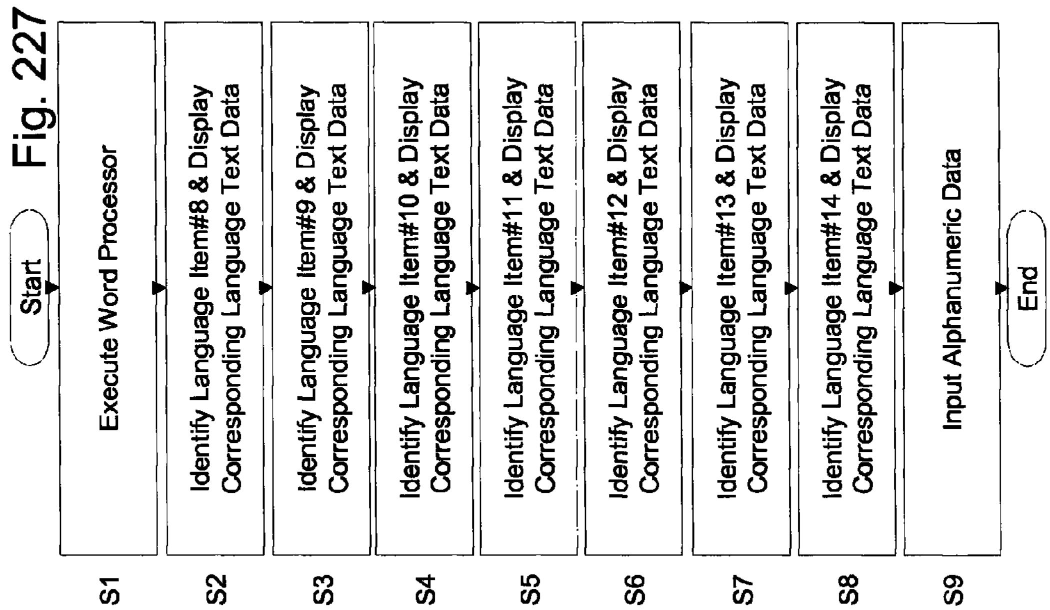

FIG. 227 is a flowchart illustrating an exemplary embodiment of the present invention.

Figure 228:
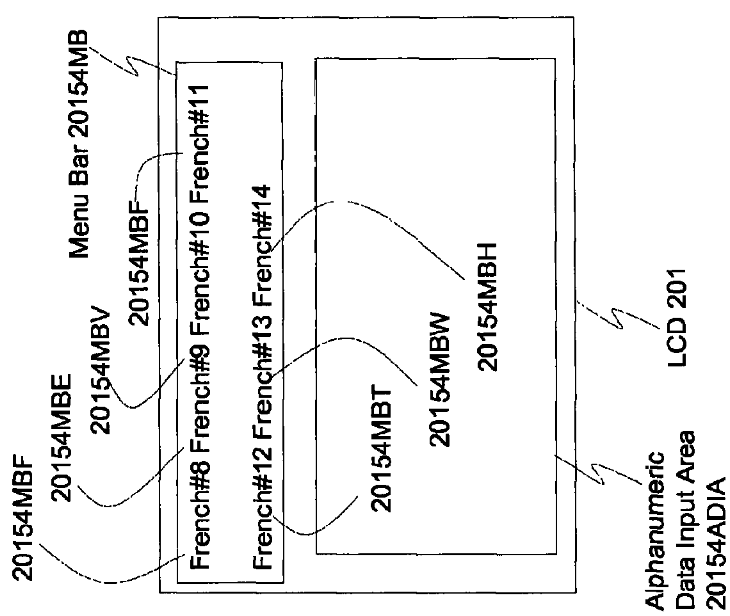

FIG. 228 is a simplified illustration illustrating an exemplary embodiment of the present invention.

Figure 229:
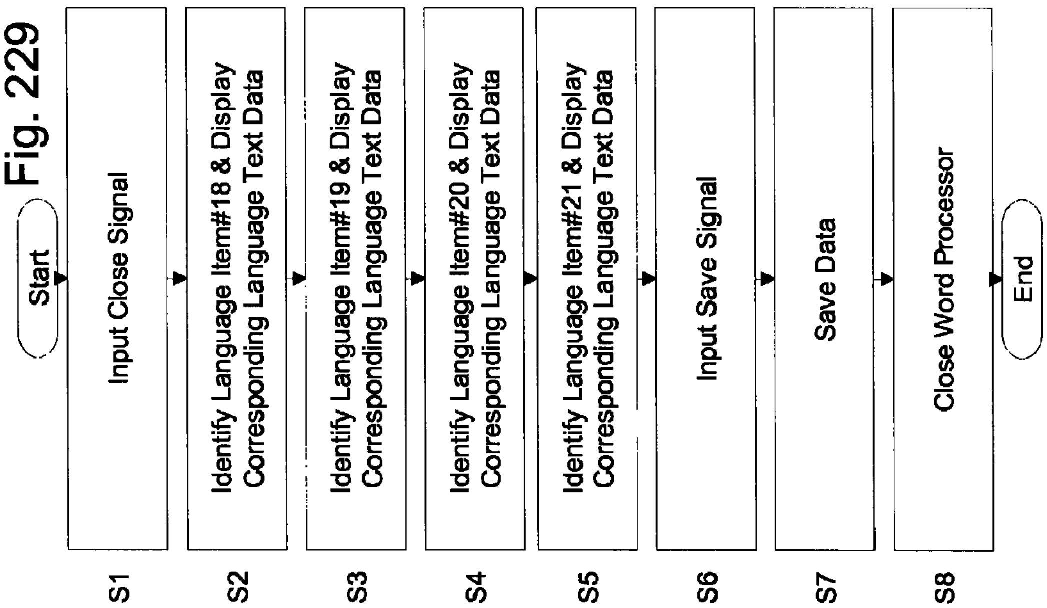

FIG. 229 is a flowchart illustrating an exemplary embodiment of the present invention.

Figure 230:
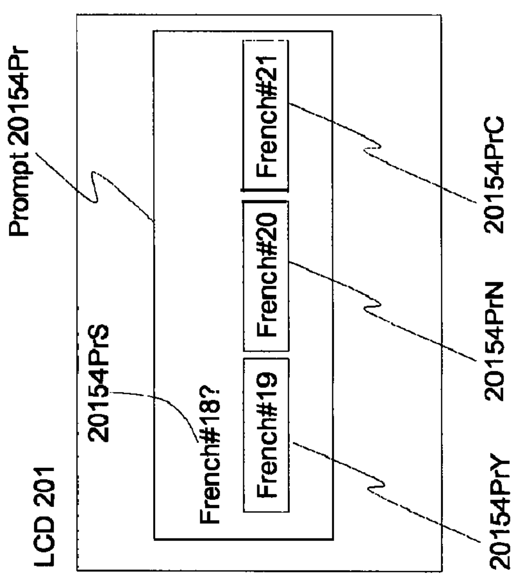

FIG. 230 is a simplified illustration illustrating an exemplary embodiment of the present invention.

Figure 231:
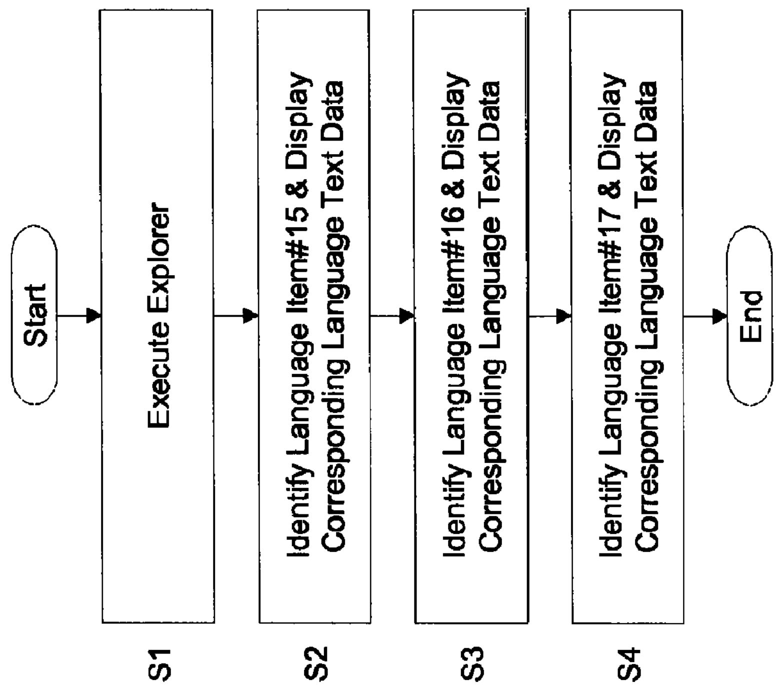

FIG. 231 is a flowchart illustrating an exemplary embodiment of the present invention.

Figure 232:
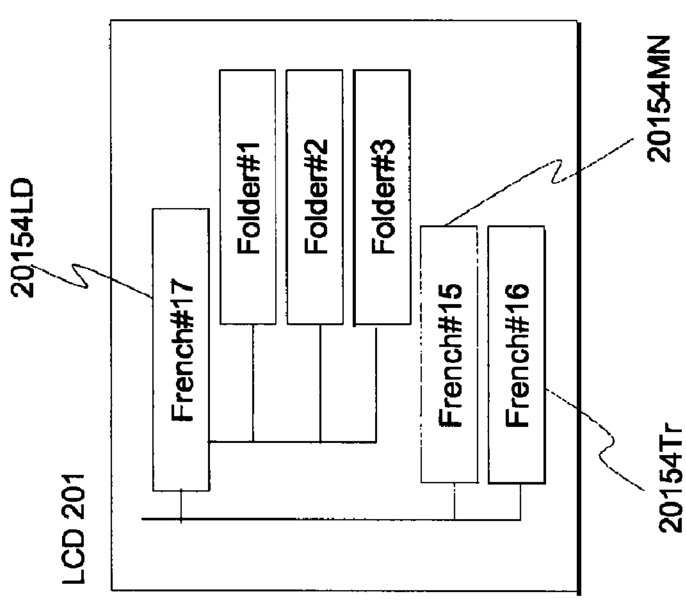

FIG. 232 is a simplified illustration illustrating an exemplary embodiment of the present invention.

Figure 233:
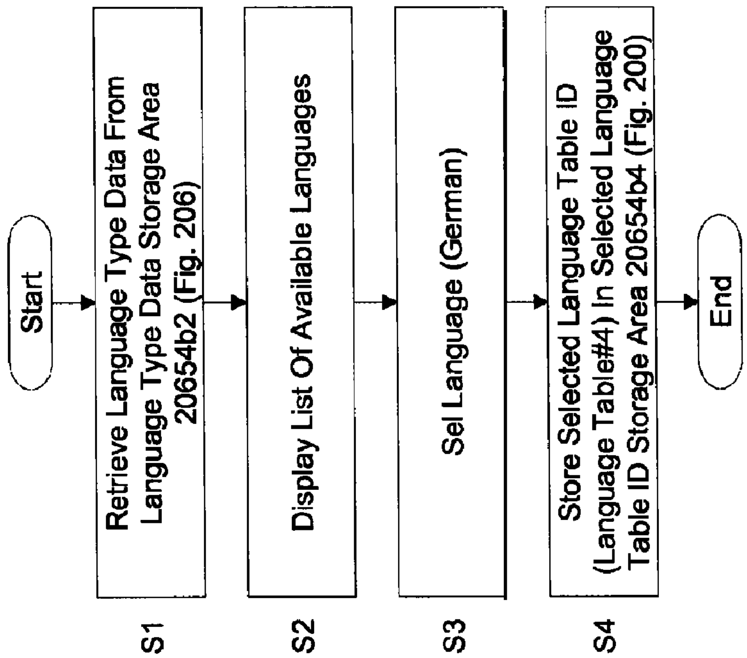

FIG. 233 is a flowchart illustrating an exemplary embodiment of the present invention.

Figure 234:
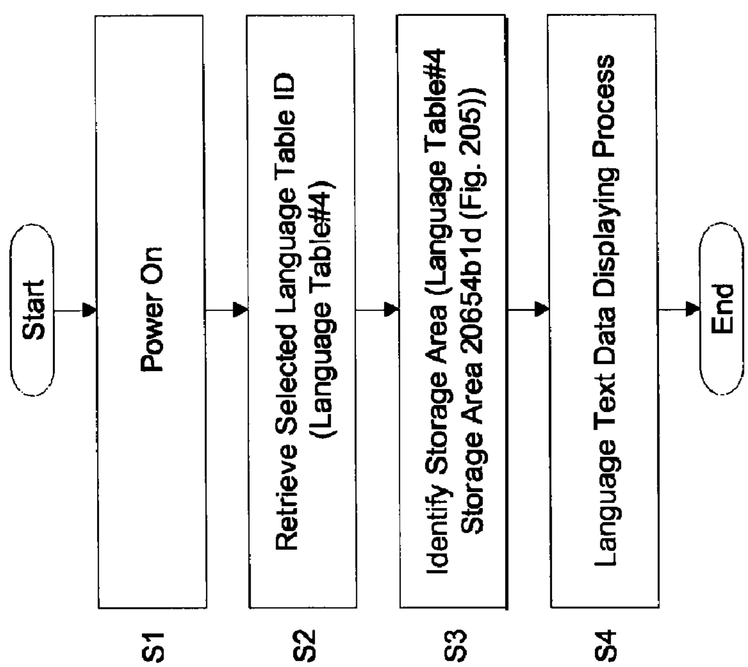

FIG. 234 is a flowchart illustrating an exemplary embodiment of the present invention.

Figure 235:
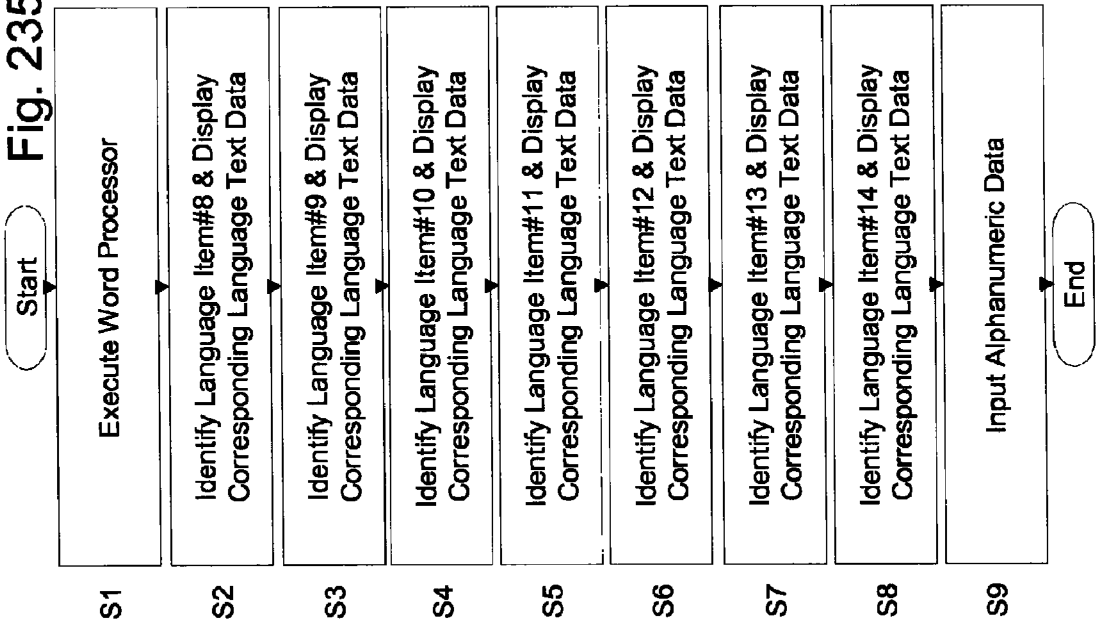

FIG. 235 is a flowchart illustrating an exemplary embodiment of the present invention.

Figure 236:
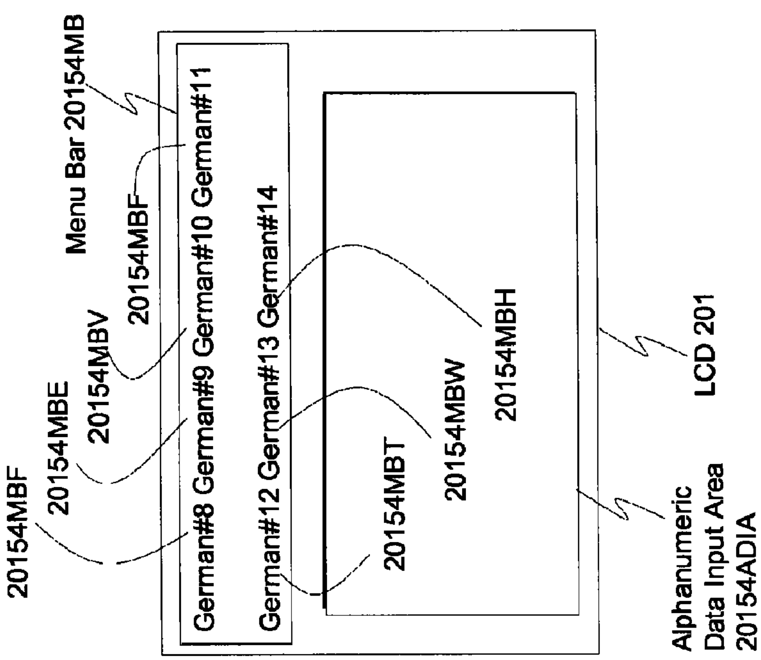

FIG. 236 is a simplified illustration illustrating an exemplary embodiment of the present invention.

Figure 237:
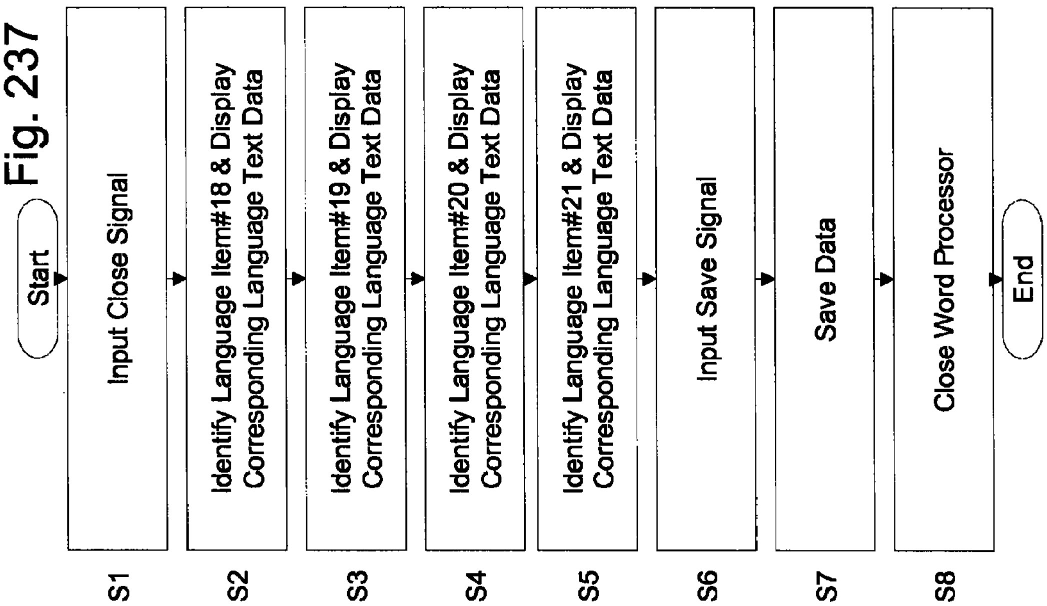

FIG. 237 is a flowchart illustrating an exemplary embodiment of the present invention.

Figure 238:
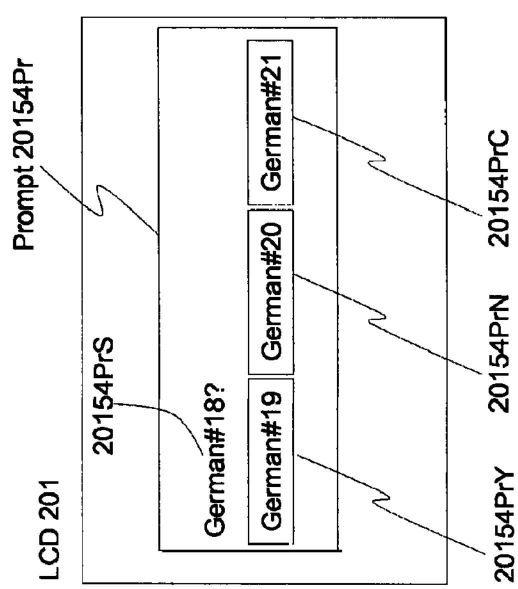

FIG. 238 is a simplified illustration illustrating an exemplary embodiment of the present invention.

Figure 239:
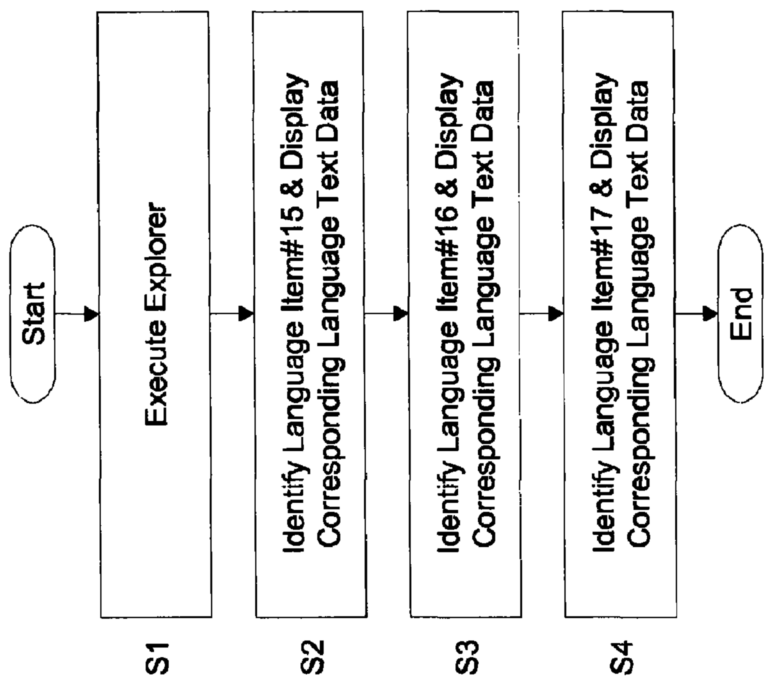

FIG. 239 is a flowchart illustrating an exemplary embodiment of the present invention.

Figure 240:
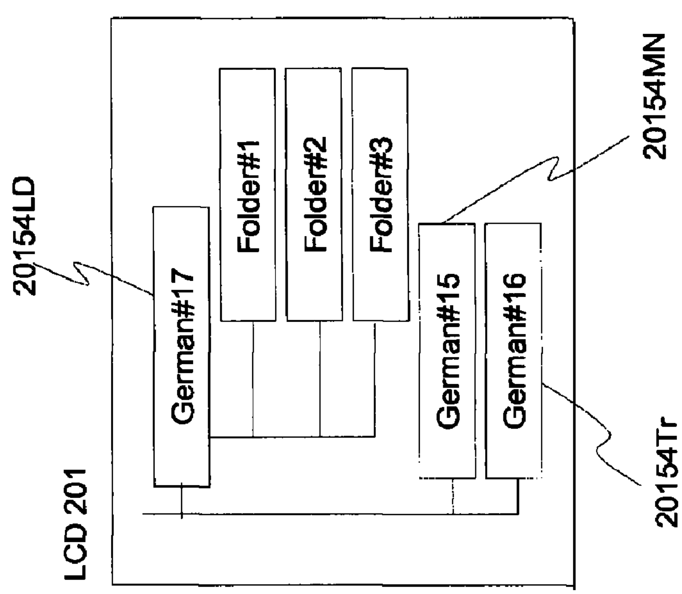

FIG. 240 is a simplified illustration illustrating an exemplary embodiment of the present invention.

Figure 241:
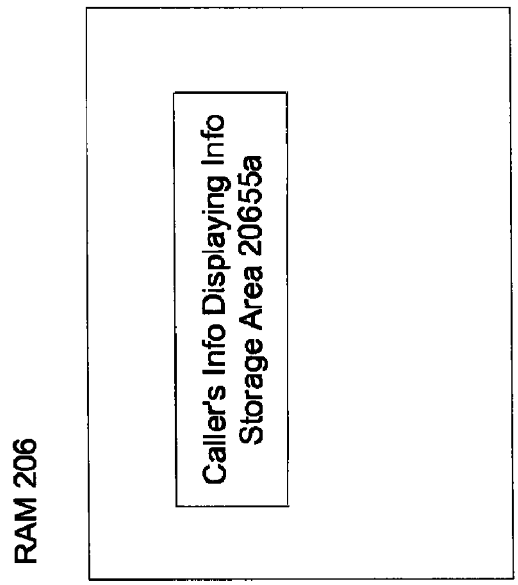

FIG. 241 is a block diagram illustrating an exemplary embodiment of the present invention.

Figure 242:
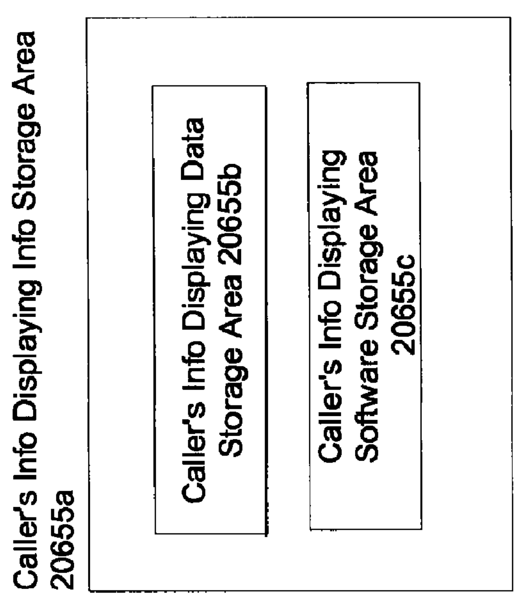

FIG. 242 is a block diagram illustrating an exemplary embodiment of the present invention.

Figure 243:
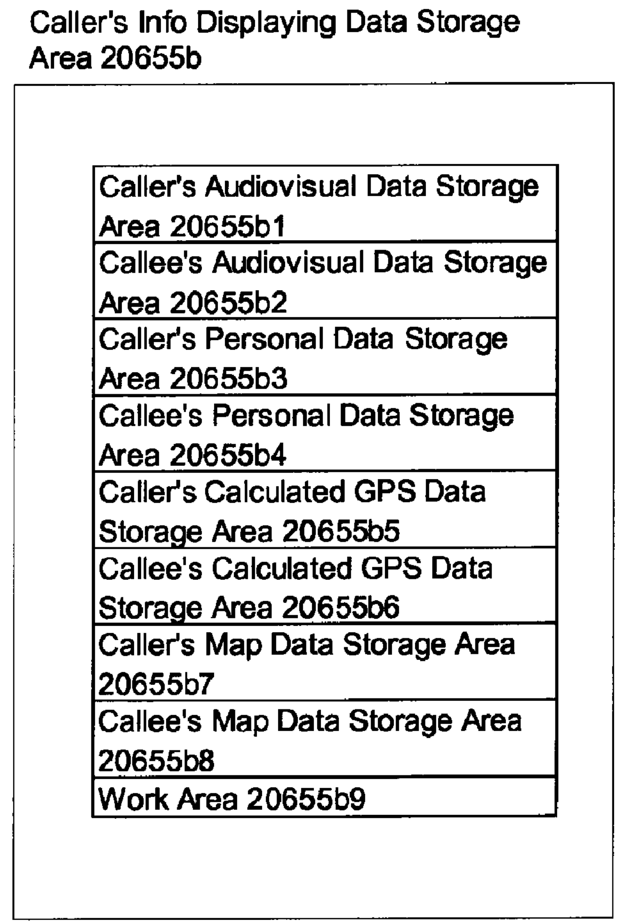

FIG. 243 is a block diagram illustrating an exemplary embodiment of the present invention.

Figure 244:
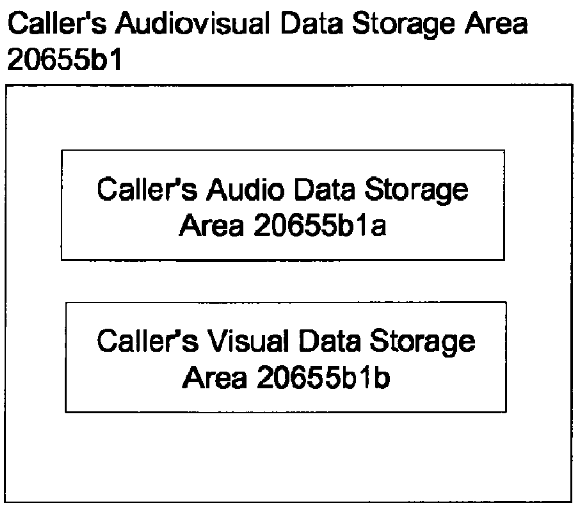

FIG. 244 is a block diagram illustrating an exemplary embodiment of the present invention.

FIG. 245 is a block diagram illustrating an exemplary embodiment of the present invention.

FIG. 246 is a block diagram illustrating an exemplary embodiment of the present invention.

FIG. 247 is a block diagram illustrating an exemplary embodiment of the present invention.

FIG. 248 is a block diagram illustrating an exemplary embodiment of the present invention.

Figure 249:
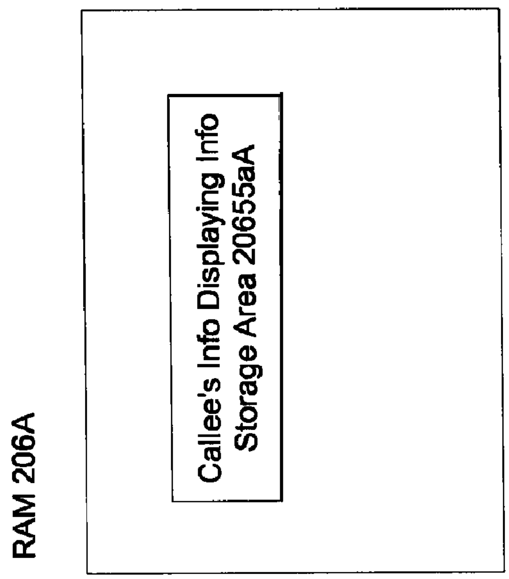

FIG. 249 is a block diagram illustrating an exemplary embodiment of the present invention.

Figure 250:
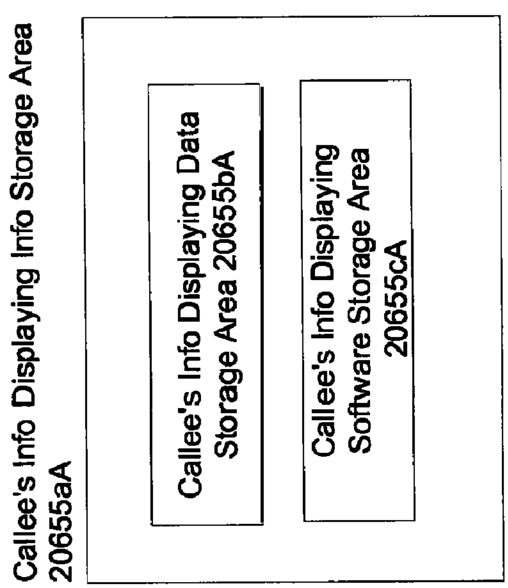

FIG. 250 is a block diagram illustrating an exemplary embodiment of the present invention.

Figure 251:
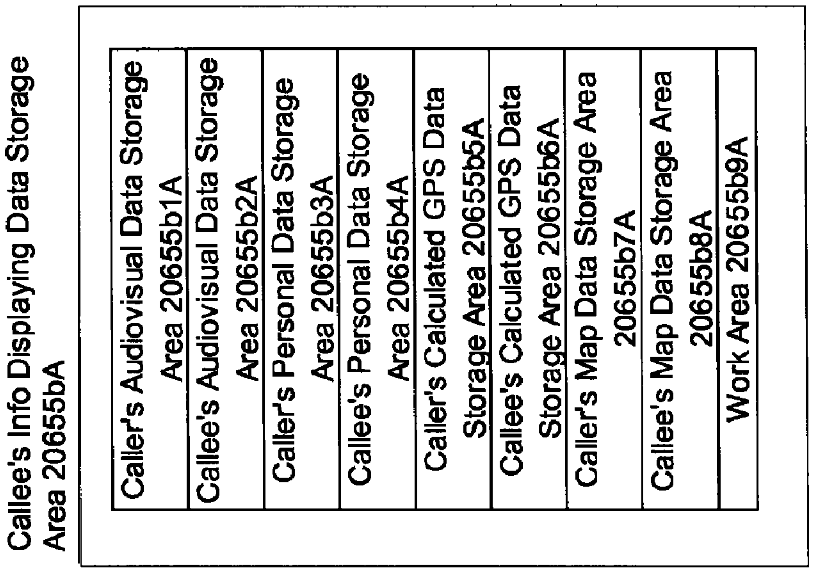

FIG. 251 is a block diagram illustrating an exemplary embodiment of the present invention.

Figure 252:
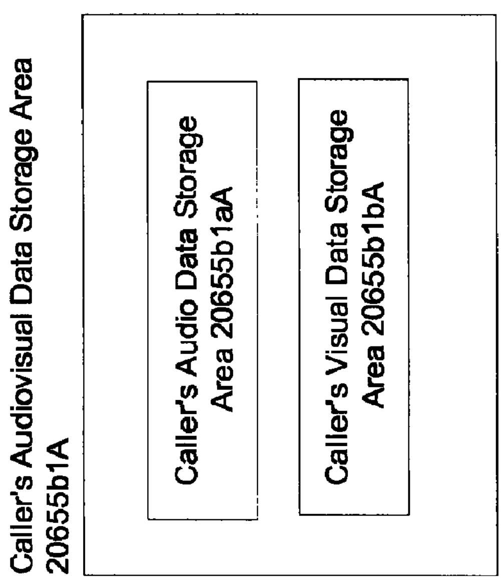

FIG. 252 is a block diagram illustrating an exemplary embodiment of the present invention.

Figure 253:
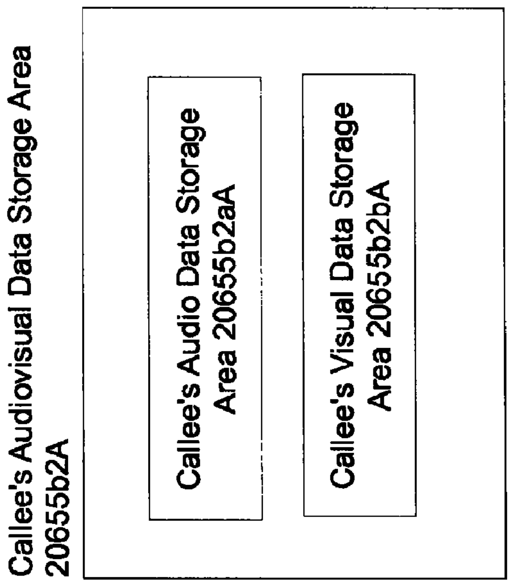

FIG. 253 is a block diagram illustrating an exemplary embodiment of the present invention.

Figure 254:
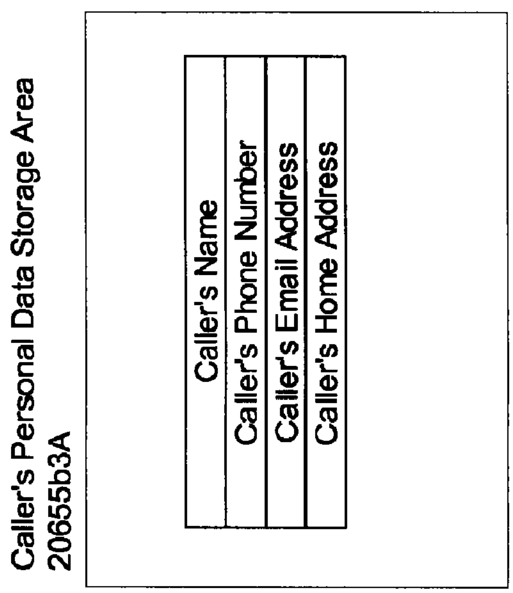

FIG. 254 is a block diagram illustrating an exemplary embodiment of the present invention.

FIG. 255 is a block diagram illustrating an exemplary embodiment of the present invention.

FIG. 256 is a block diagram illustrating an exemplary embodiment of the present invention.

Figure 257:
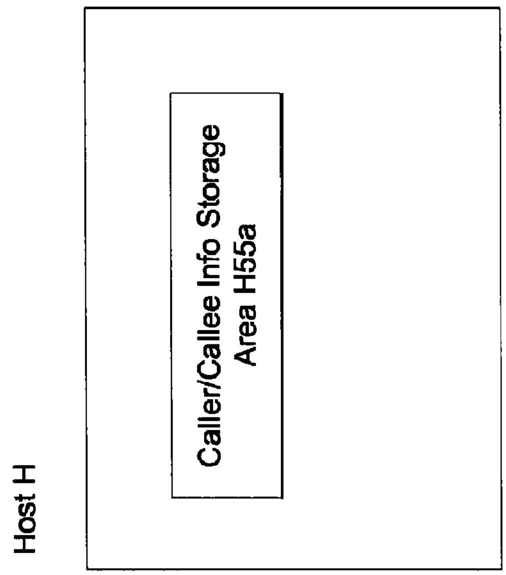

FIG. 257 is a block diagram illustrating an exemplary embodiment of the present invention.

Figure 258:
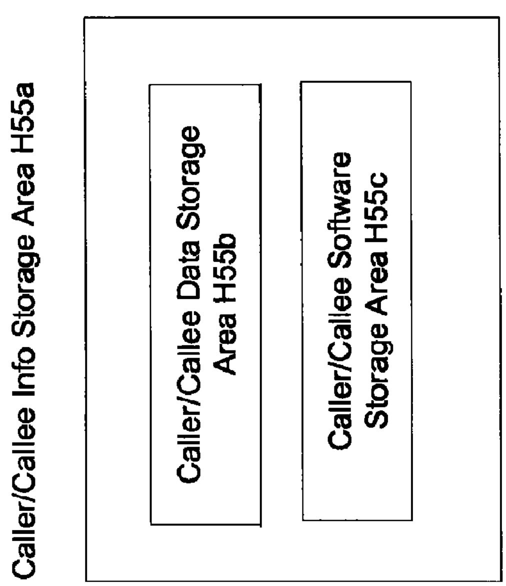

FIG. 258 is a block diagram illustrating an exemplary embodiment of the present invention.

Figure 259:
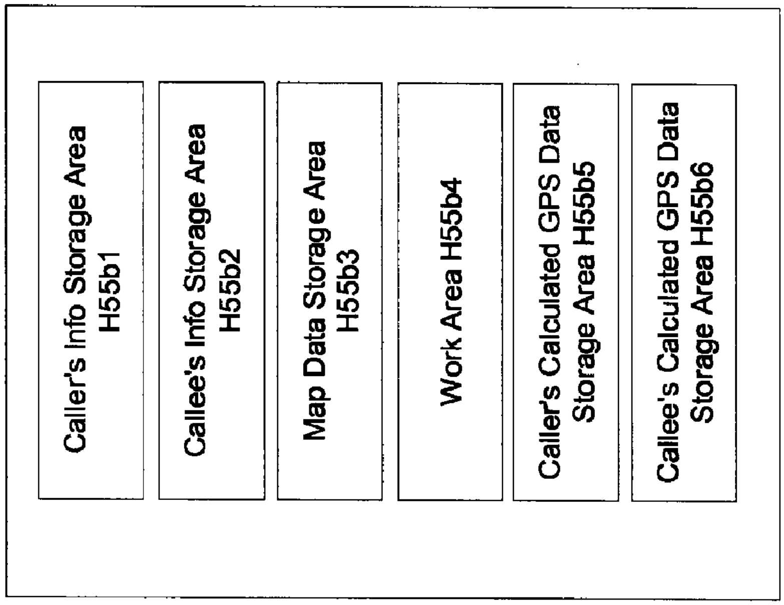

FIG. 259 is a block diagram illustrating an exemplary embodiment of the present invention.

Figure 260:
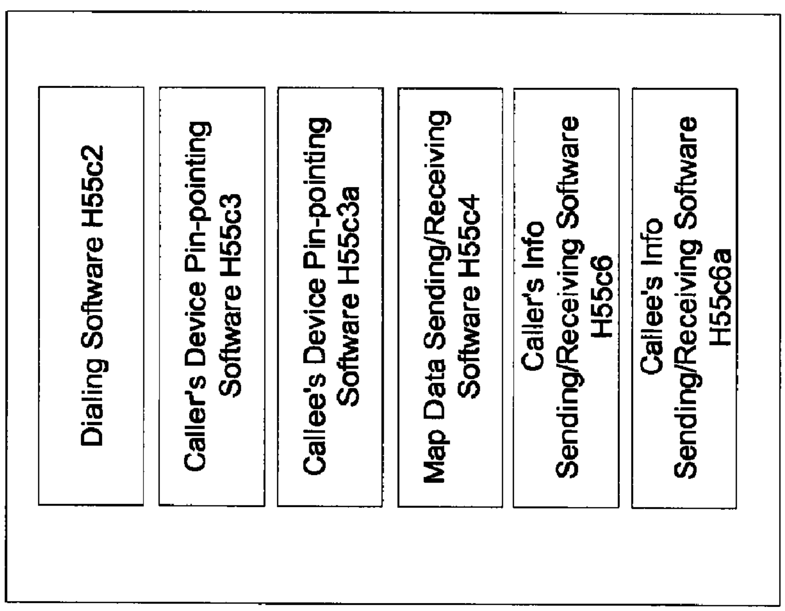

FIG. 260 is a block diagram illustrating an exemplary embodiment of the present invention.

Figure 261:
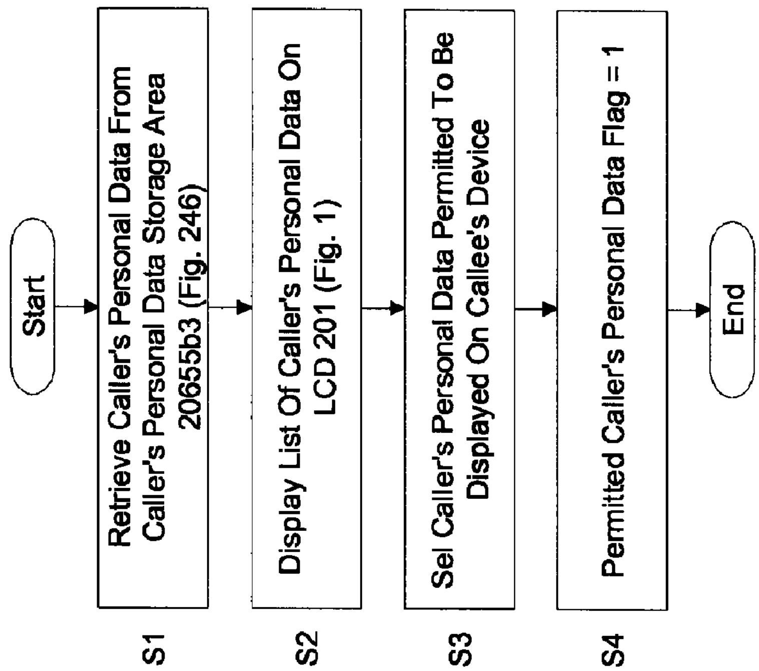

FIG. 261 is a flowchart illustrating an exemplary embodiment of the present invention.

Figure 262:
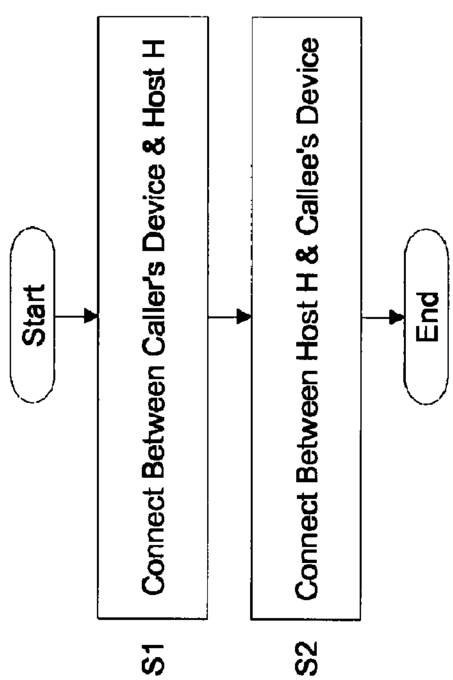

FIG. 262 is a flowchart illustrating an exemplary embodiment of the present invention.

Figure 263:
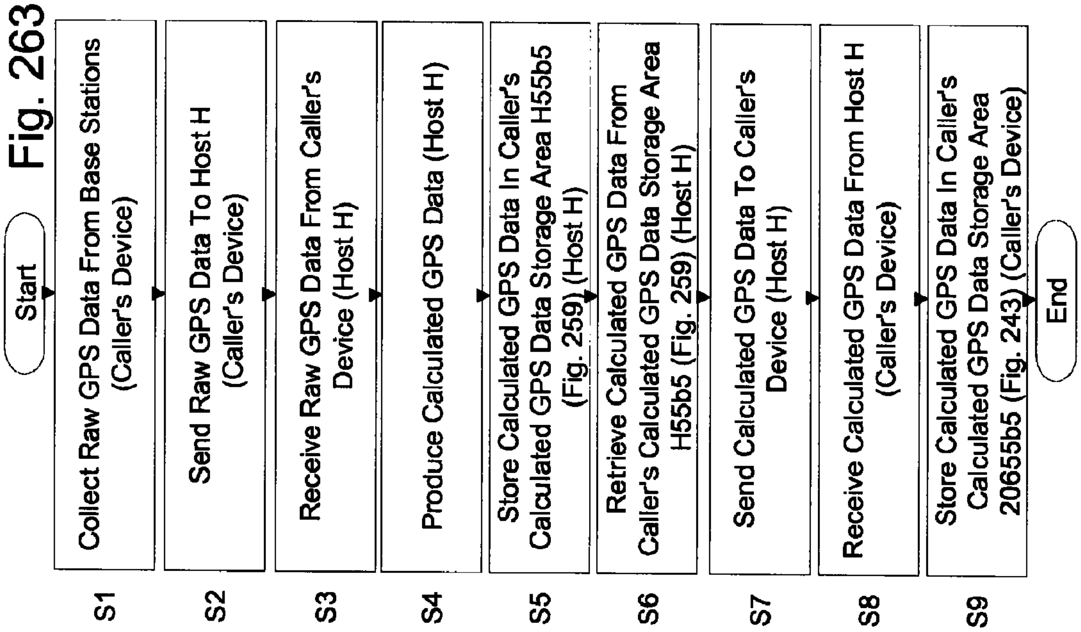

FIG. 263 is a flowchart illustrating an exemplary embodiment of the present invention.

Figure 264:
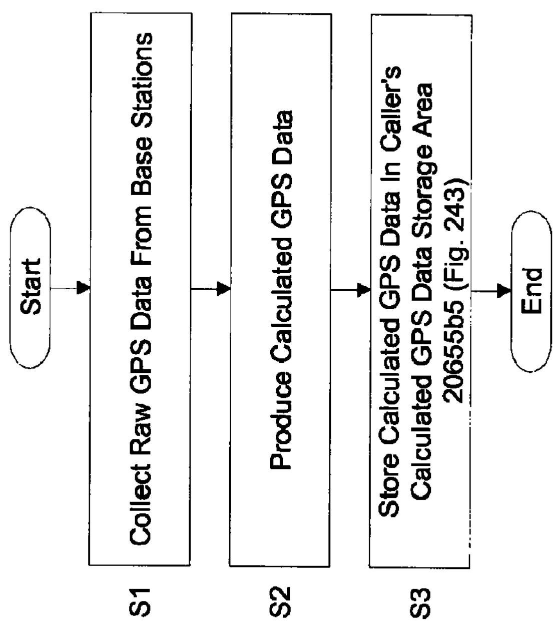

FIG. 264 is a flowchart illustrating an exemplary embodiment of the present invention.

Figure 265:
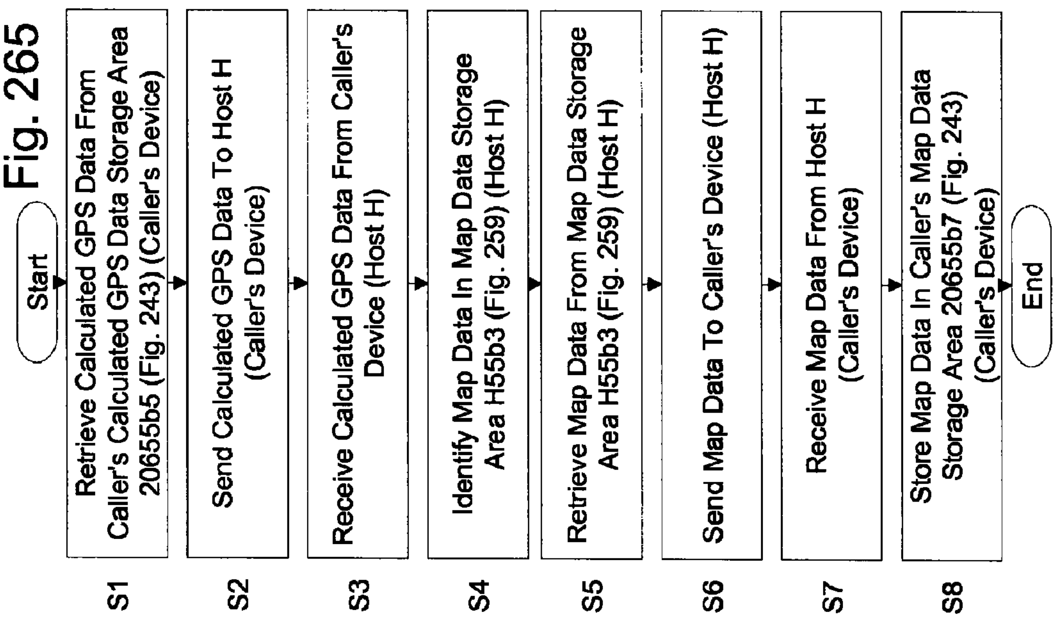

FIG. 265 is a flowchart illustrating an exemplary embodiment of the present invention.

Figure 266:
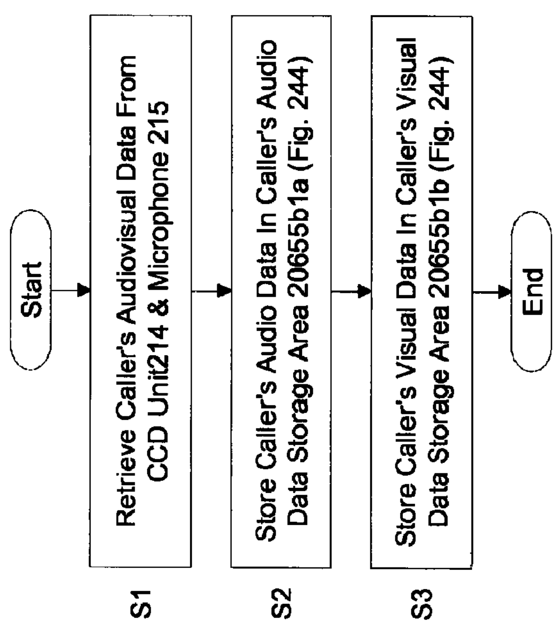

FIG. 266 is a flowchart illustrating an exemplary embodiment of the present invention.

Figure 267:
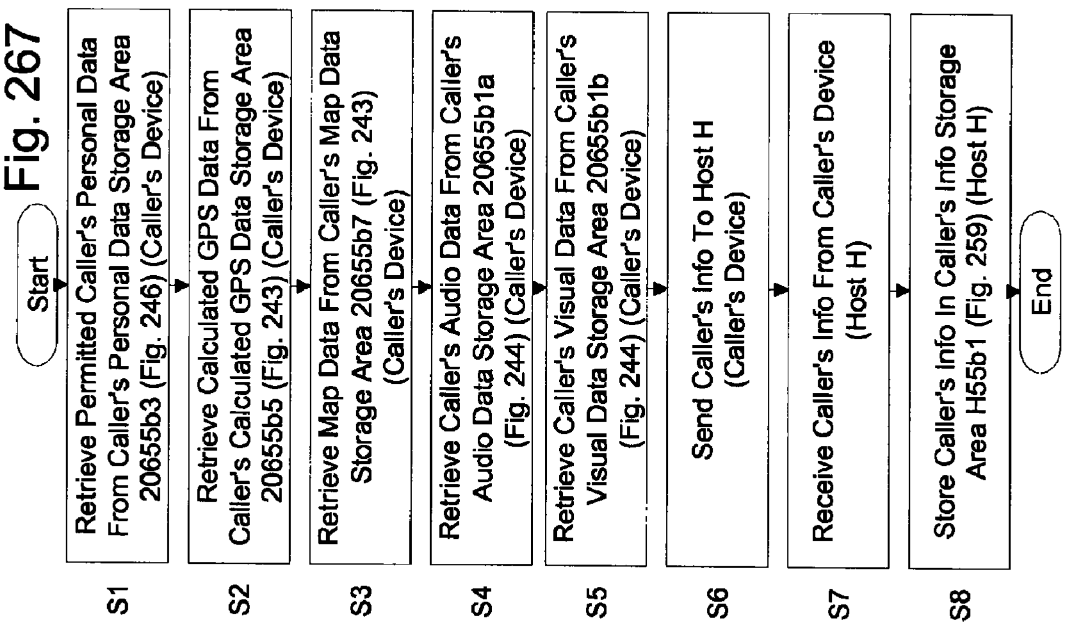

FIG. 267 is a flowchart illustrating an exemplary embodiment of the present invention.

Figure 268:
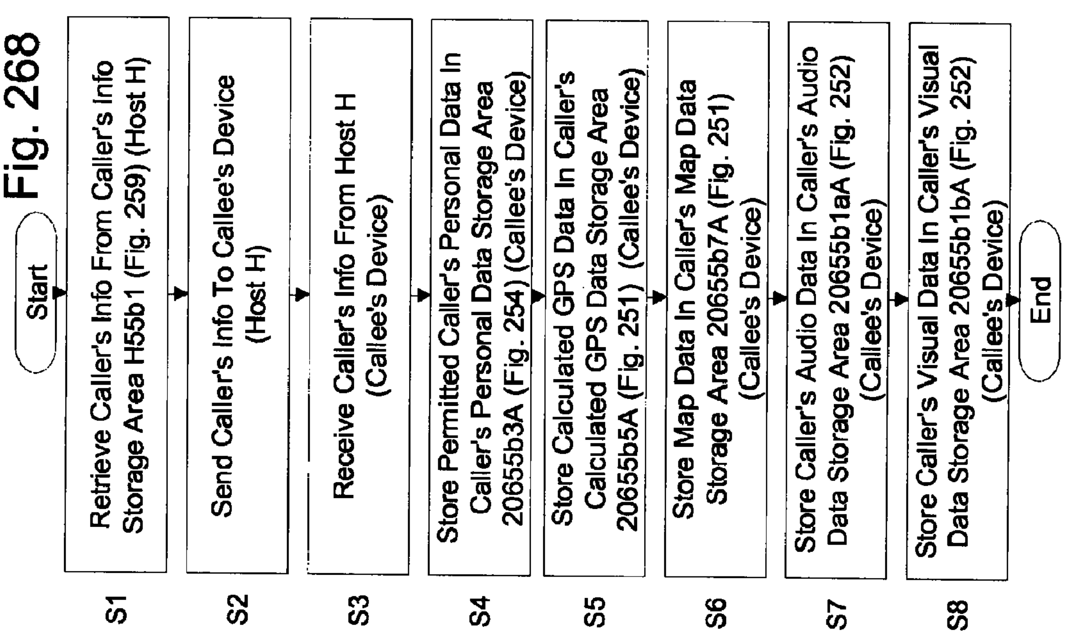

FIG. 268 is a flowchart illustrating an exemplary embodiment of the present invention.

Figure 269:
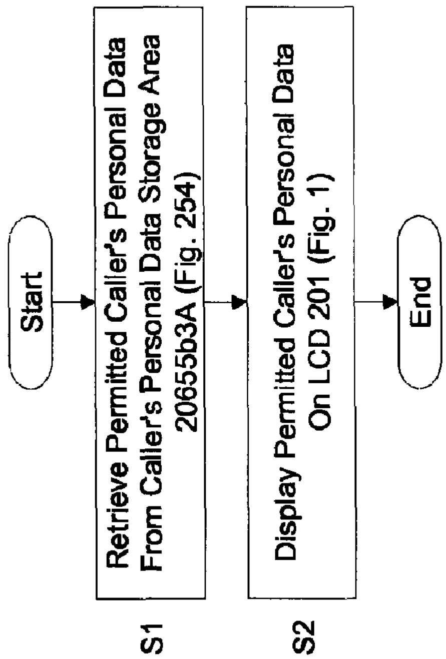

FIG. 269 is a flowchart illustrating an exemplary embodiment of the present invention.

Figure 270:
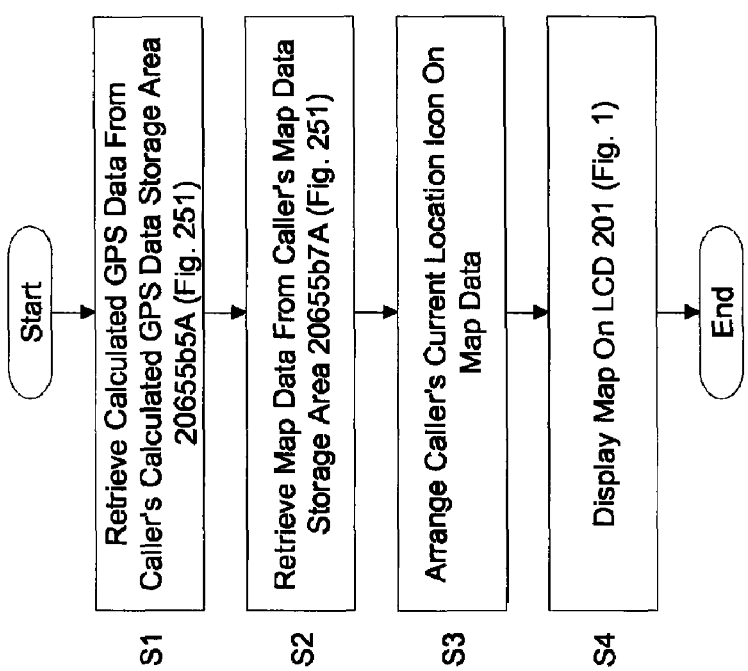

FIG. 270 is a flowchart illustrating an exemplary embodiment of the present invention.

Figure 271:
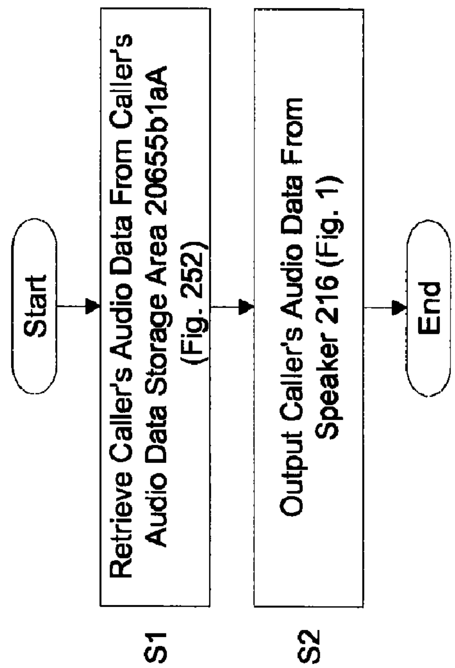

FIG. 271 is a flowchart illustrating an exemplary embodiment of the present invention.

Figure 272:
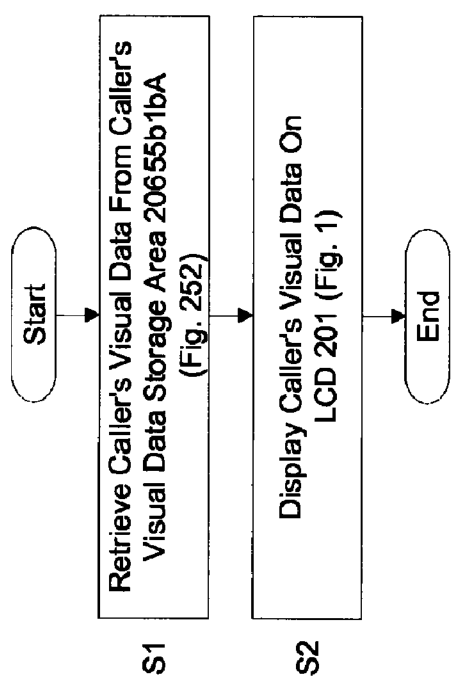

FIG. 272 is a flowchart illustrating an exemplary embodiment of the present invention.

Figure 273:
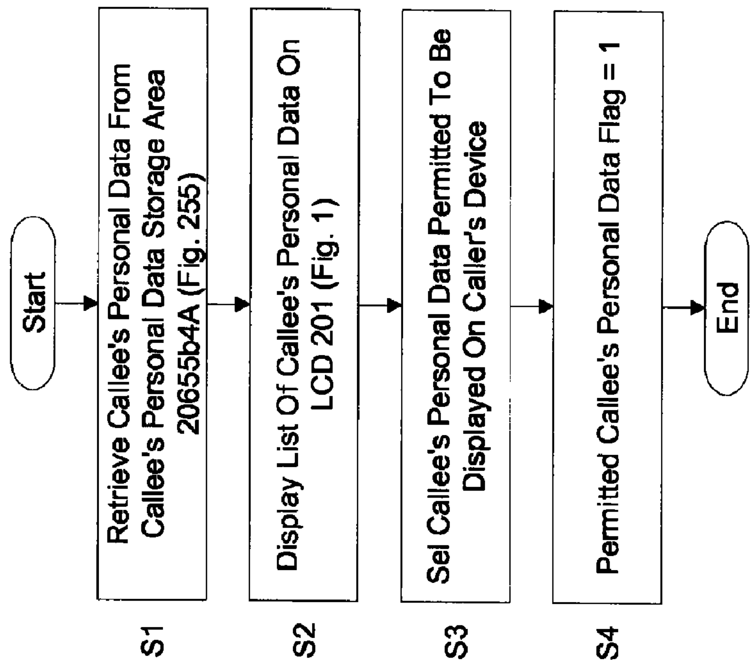

FIG. 273 is a flowchart illustrating an exemplary embodiment of the present invention.

Figure 274:
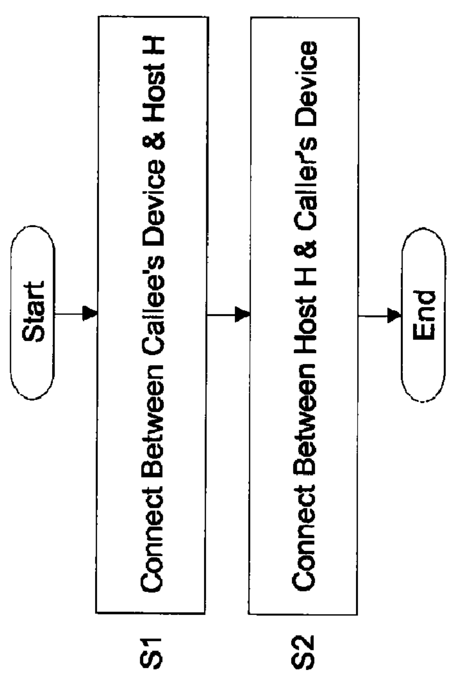

FIG. 274 is a flowchart illustrating an exemplary embodiment of the present invention.

Figure 275:
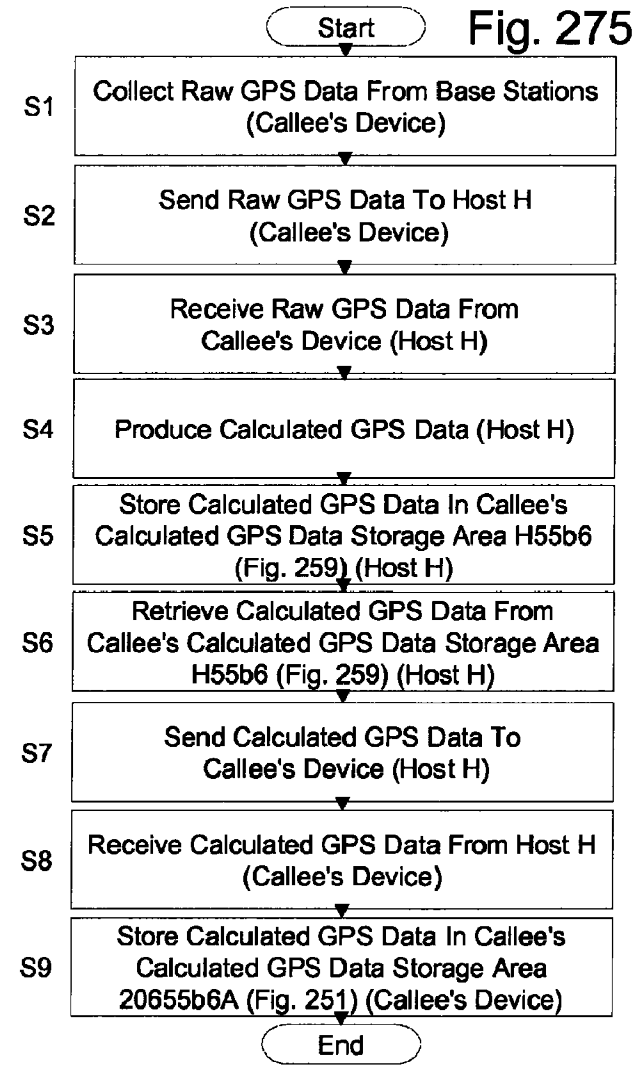

FIG. 275 is a flowchart illustrating an exemplary embodiment of the present invention.

Figure 276:
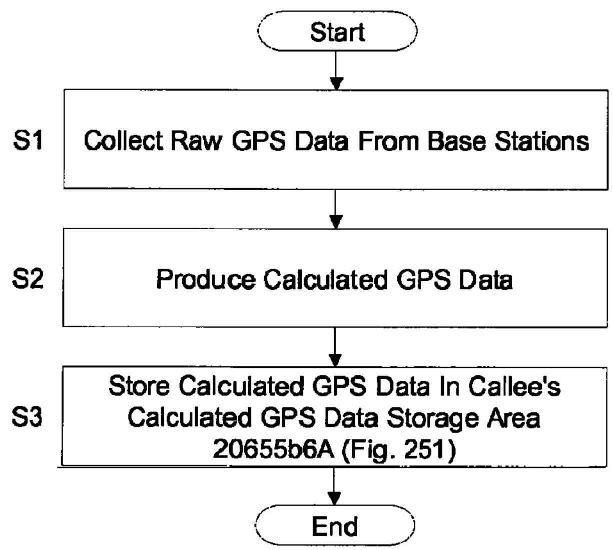

FIG. 276 is a flowchart illustrating an exemplary embodiment of the present invention.

Figure 277:
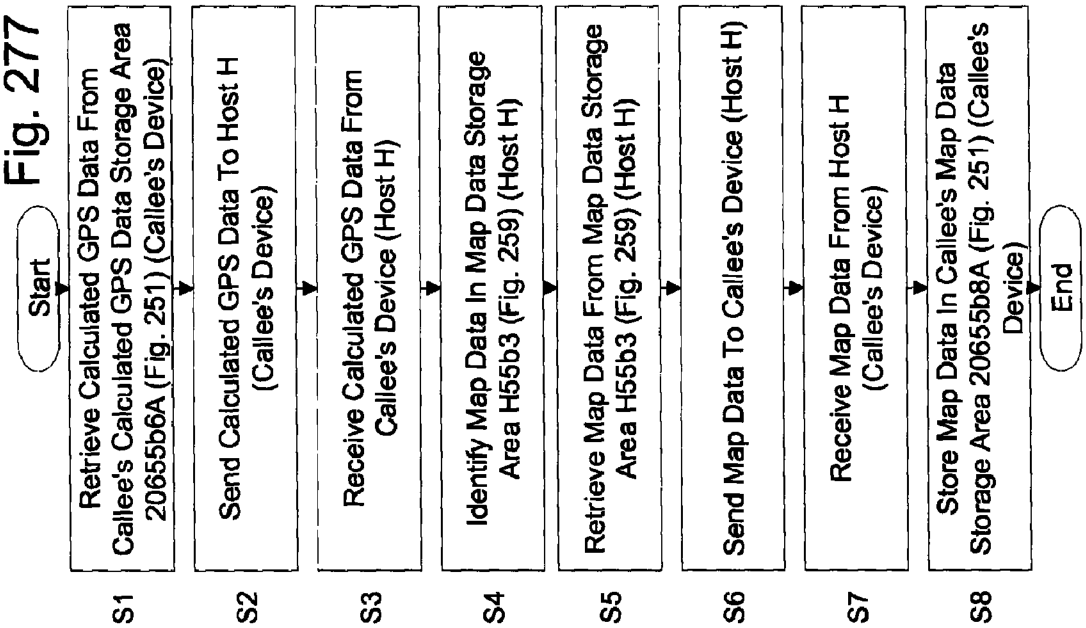

FIG. 277 is a flowchart illustrating an exemplary embodiment of the present invention.

Figure 278:
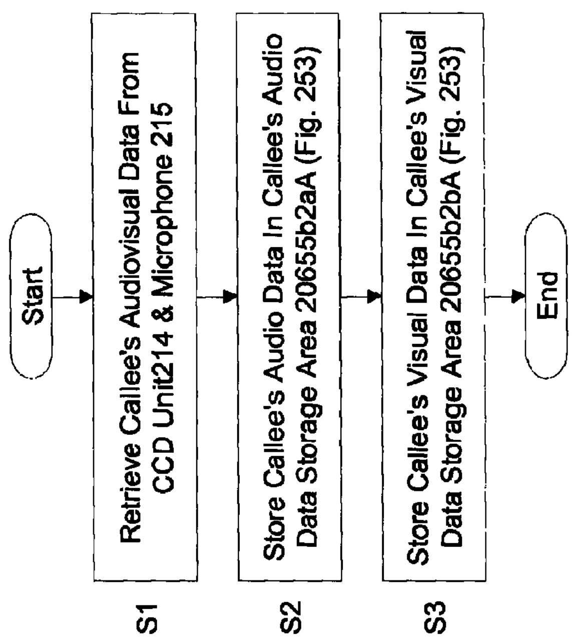

FIG. 278 is a flowchart illustrating an exemplary embodiment of the present invention.

Figure 279:
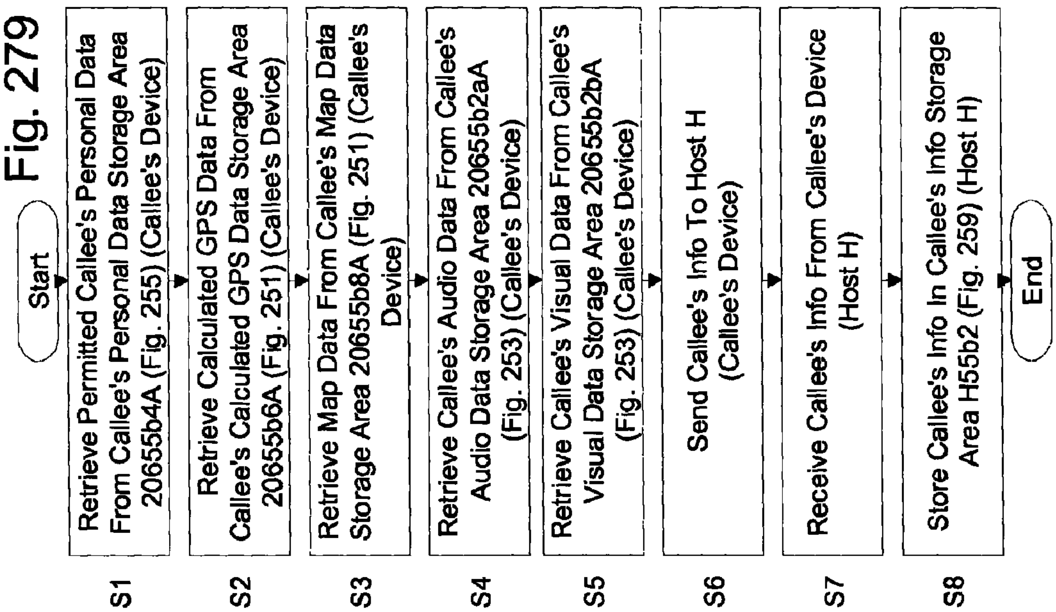

FIG. 279 is a flowchart illustrating an exemplary embodiment of the present invention.

Figure 280:
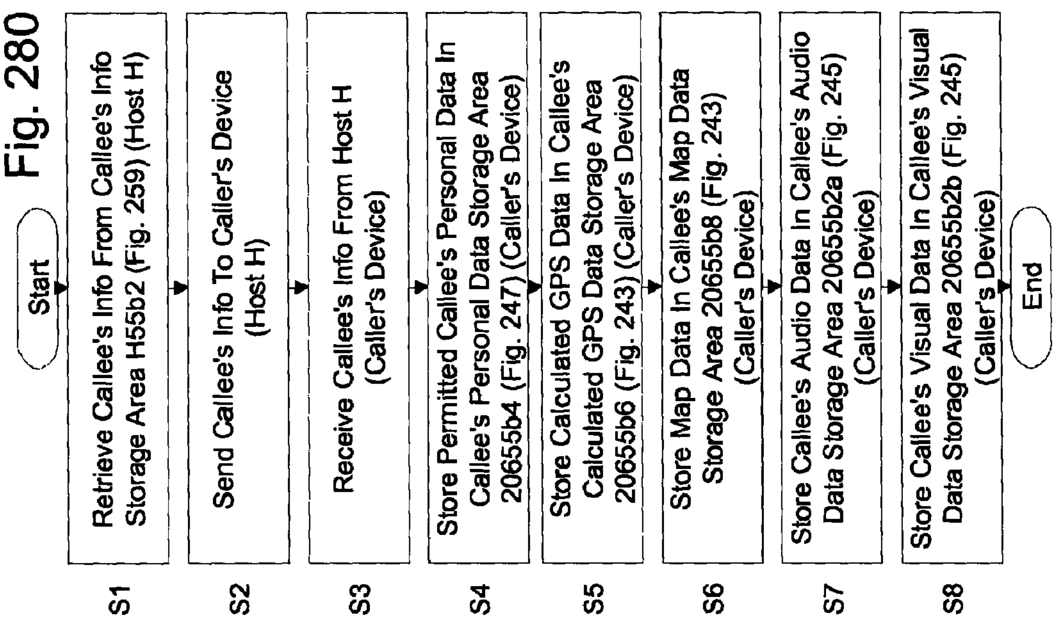

FIG. 280 is a flowchart illustrating an exemplary embodiment of the present invention.

Figure 281:
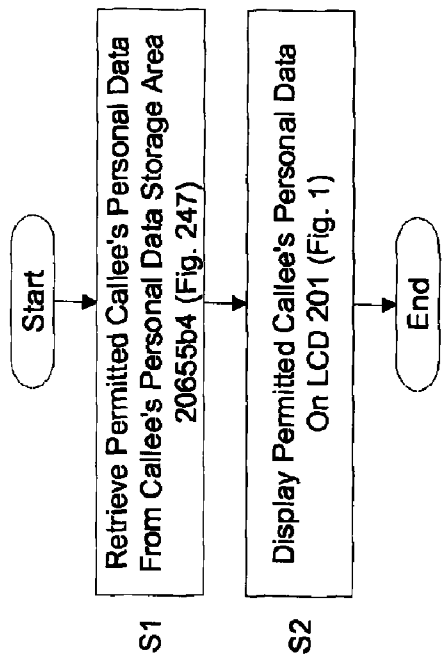

FIG. 281 is a flowchart illustrating an exemplary embodiment of the present invention.

Figure 282:
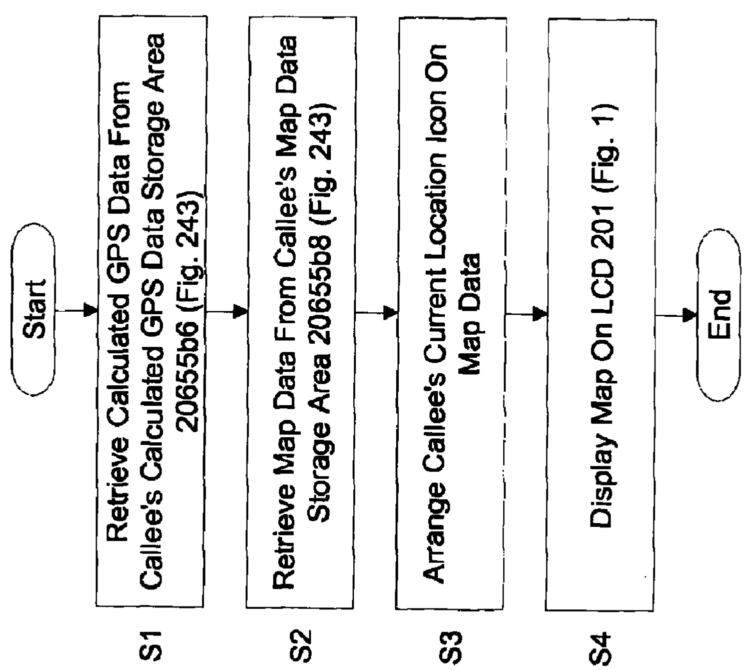

FIG. 282 is a flowchart illustrating an exemplary embodiment of the present invention.

Figure 283:
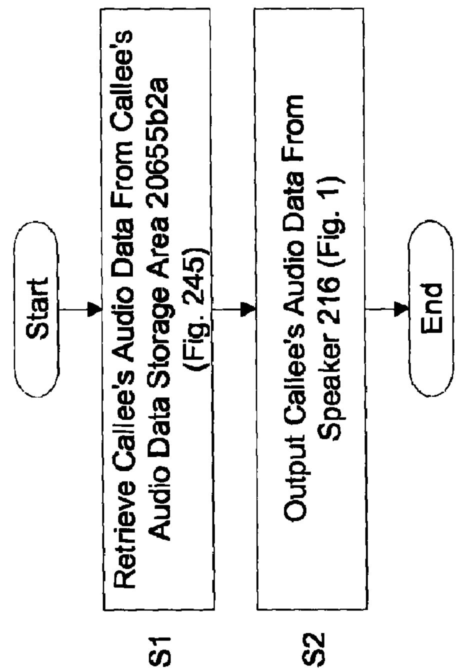

FIG. 283 is a flowchart illustrating an exemplary embodiment of the present invention.

Figure 284:
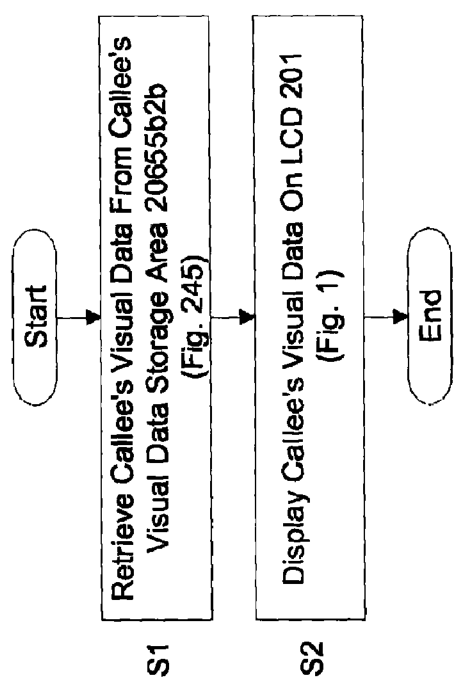

FIG. 284 is a flowchart illustrating an exemplary embodiment of the present invention.

Figure 285:
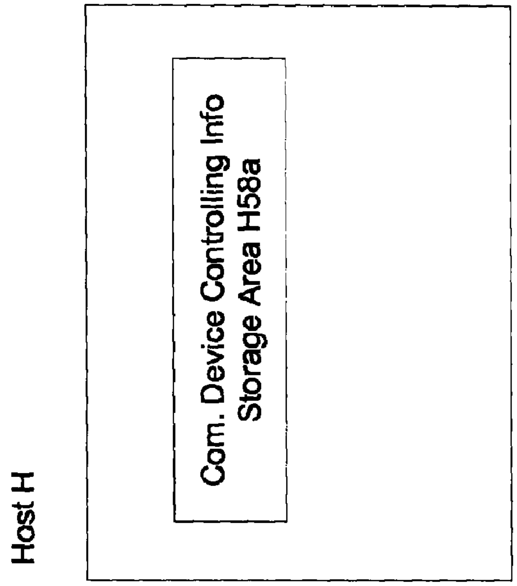

FIG. 285 is a block diagram illustrating an exemplary embodiment of the present invention.

Figure 286:
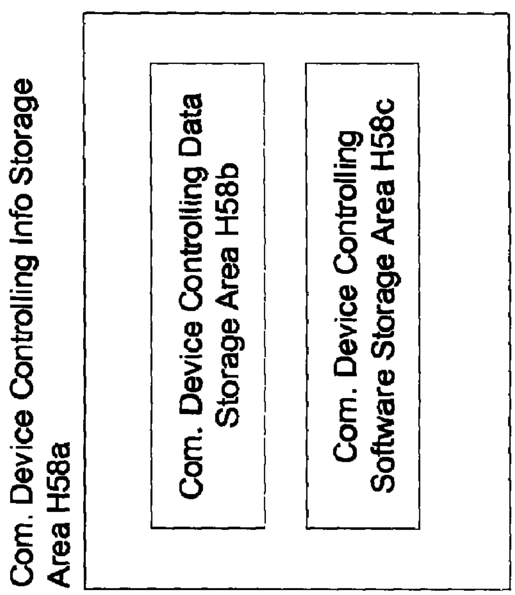

FIG. 286 is a block diagram illustrating an exemplary embodiment of the present invention.

Figures 287, 288:
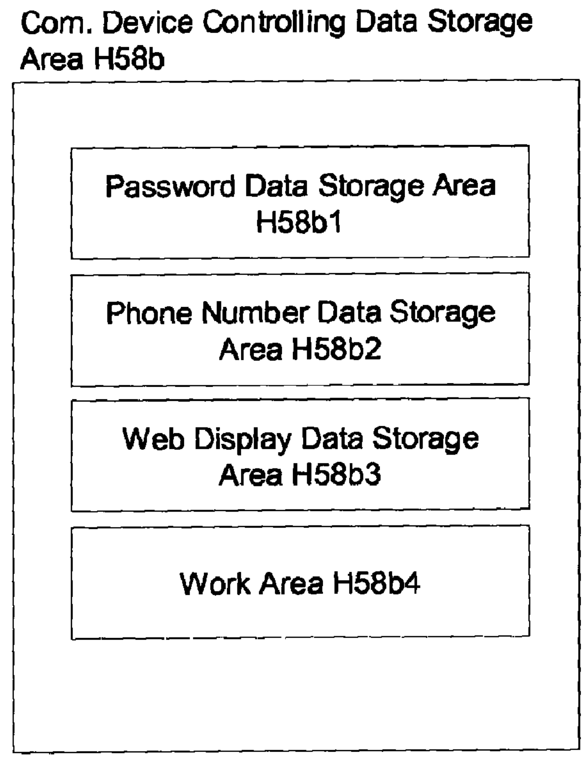

FIG. 287 is a block diagram illustrating an exemplary embodiment of the present invention.

FIG. 288 is a block diagram illustrating an exemplary embodiment of the present invention.

FIG. 289 is a block diagram illustrating an exemplary embodiment of the present invention.

FIG. 290 is a block diagram illustrating an exemplary embodiment of the present invention.

Figures 291, 292:
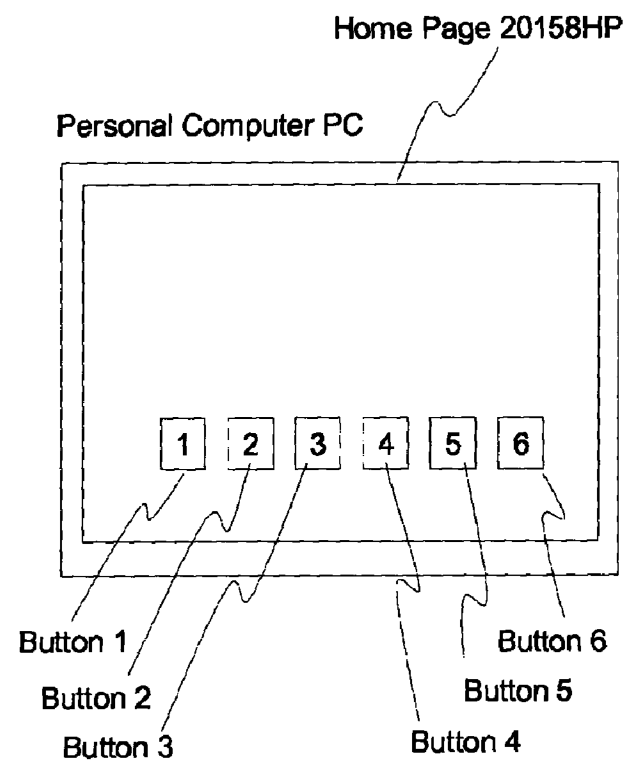

FIG. 291 is a simplified illustration illustrating an exemplary embodiment of the present invention.

FIG. 292 is a block diagram illustrating an exemplary embodiment of the present invention.

Figure 293:
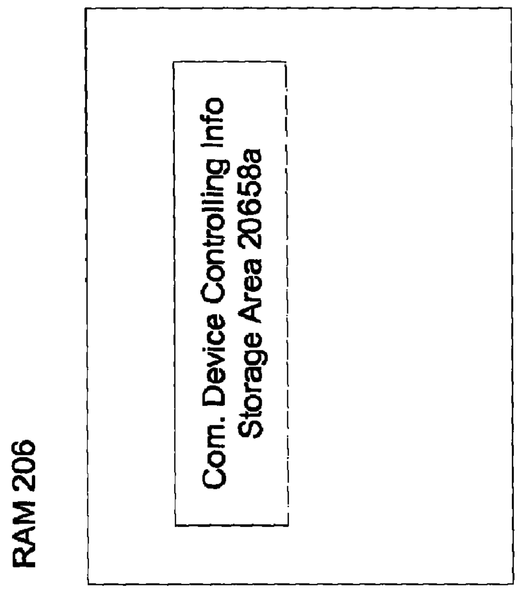

FIG. 293 is a block diagram illustrating an exemplary embodiment of the present invention.

Figure 294:
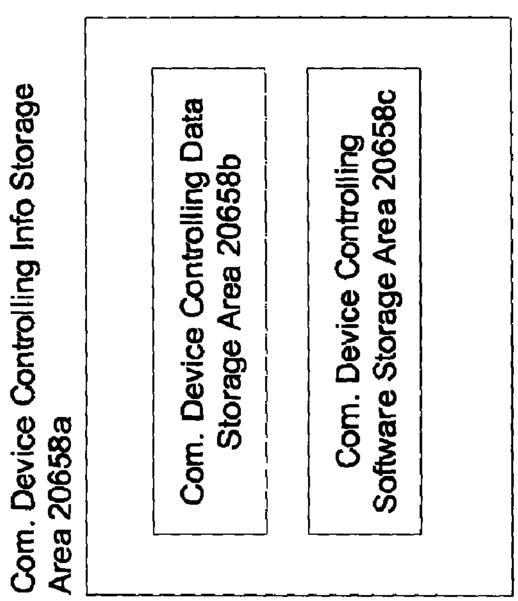

FIG. 294 is a block diagram illustrating an exemplary embodiment of the present invention.

Figure 295:
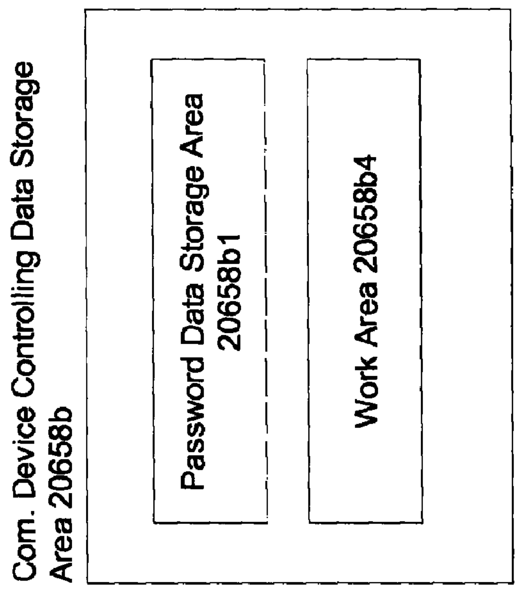

FIG. 295 is a block diagram illustrating an exemplary embodiment of the present invention.

Figure 296:
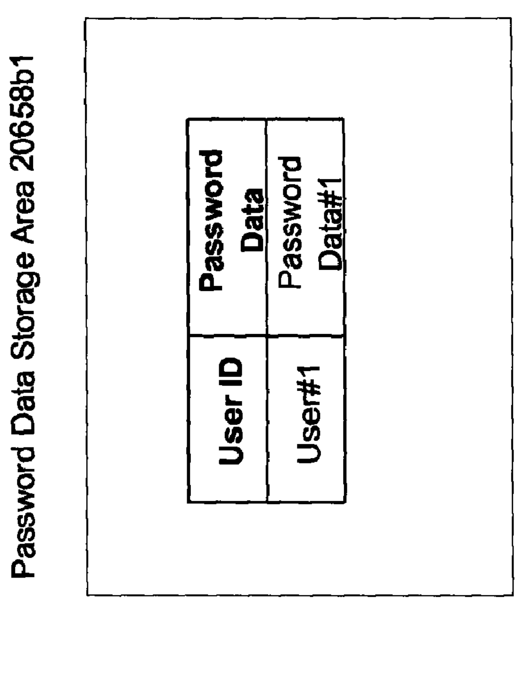

FIG. 296 is a block diagram illustrating an exemplary embodiment of the present invention.

FIG. 297 is a block diagram illustrating an exemplary embodiment of the present invention.

FIG. 298 is a block diagram illustrating an exemplary embodiment of the present invention.

Figure 299:
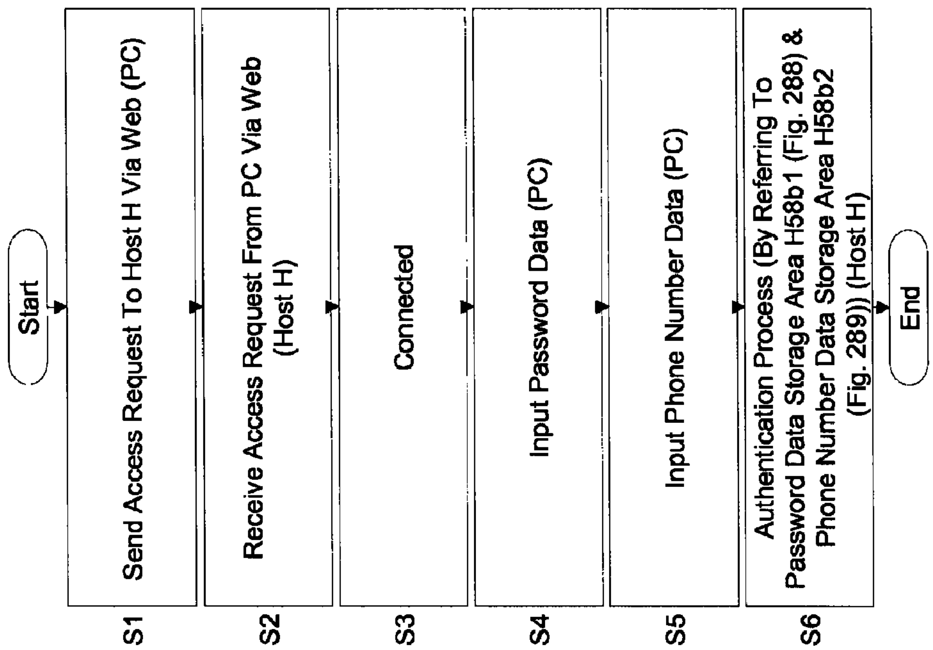

FIG. 299 is a flowchart illustrating an exemplary embodiment of the present invention.

Figure 300:
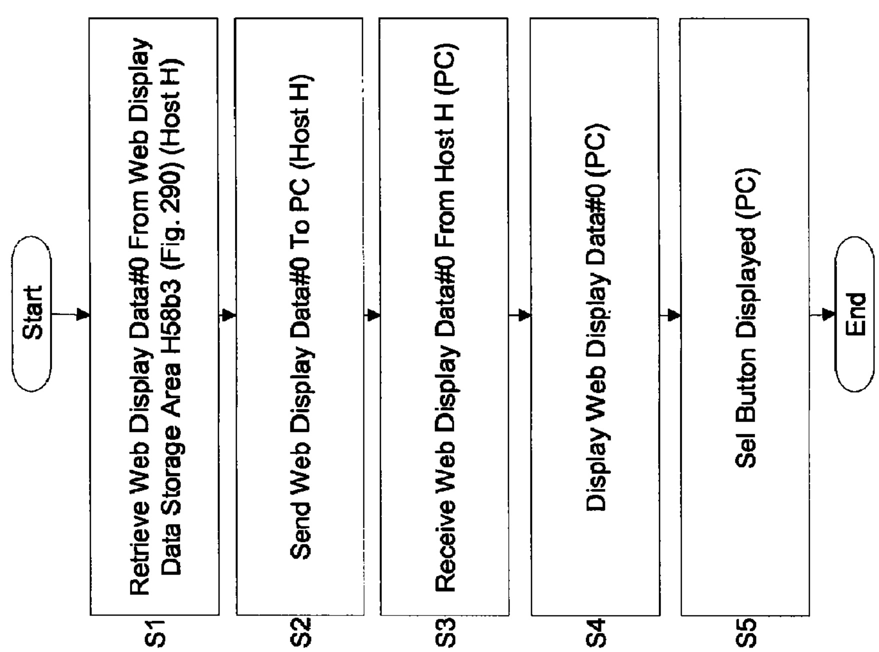

FIG. 300 is a flowchart illustrating an exemplary embodiment of the present invention.

Figure 301:
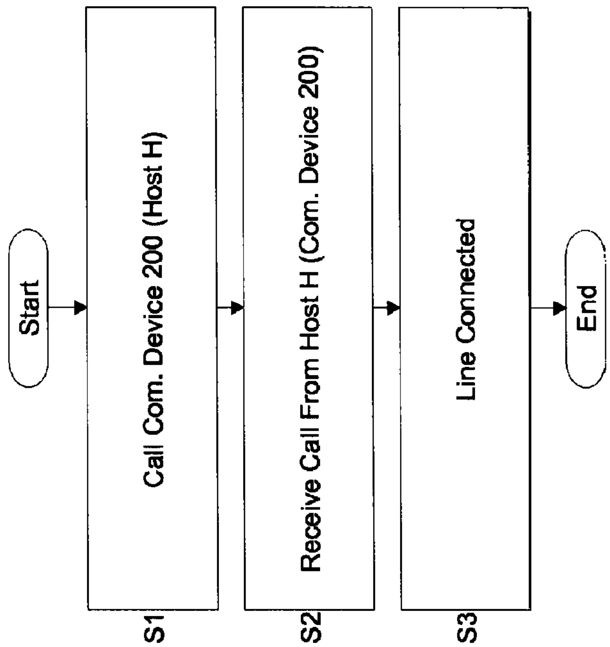

FIG. 301 is a flowchart illustrating an exemplary embodiment of the present invention.

Figure 302:
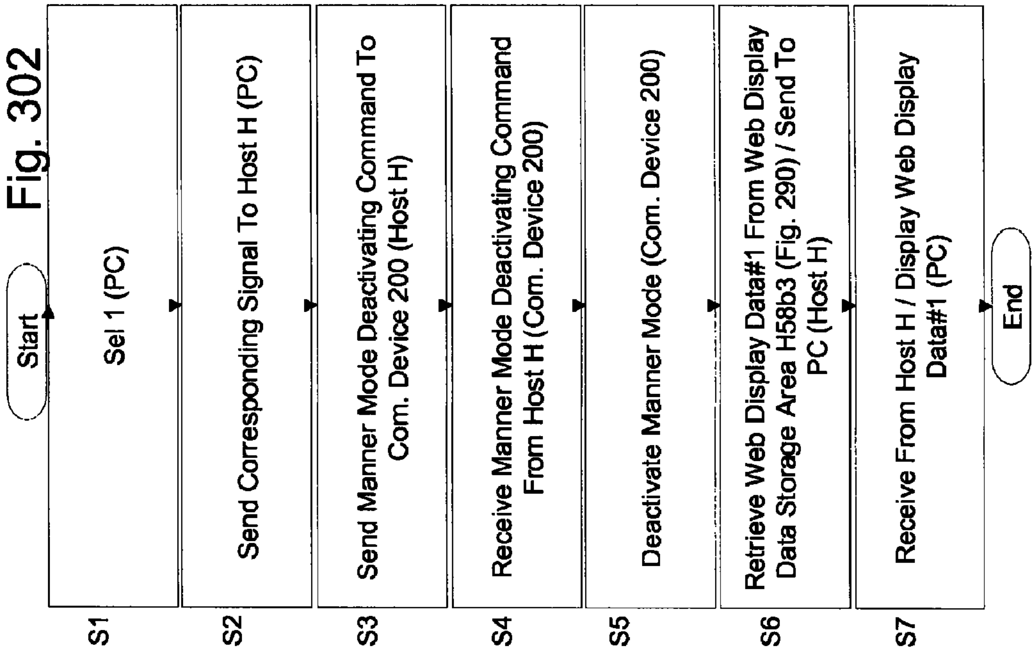

FIG. 302 is a flowchart illustrating an exemplary embodiment of the present invention.

Figure 303:
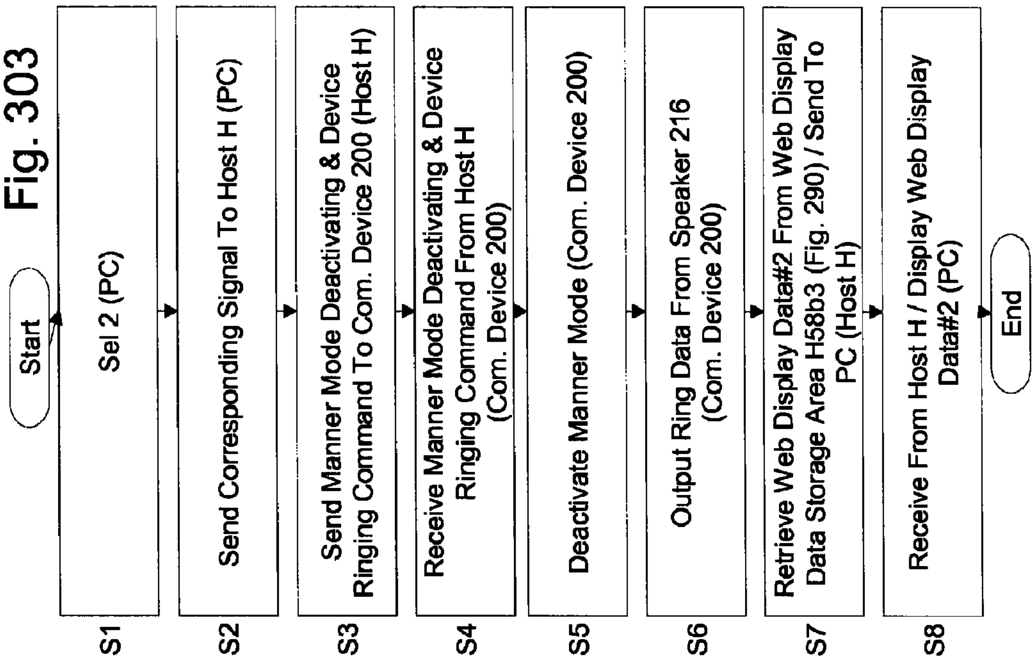

FIG. 303 is a flowchart illustrating an exemplary embodiment of the present invention.

Figure 304:
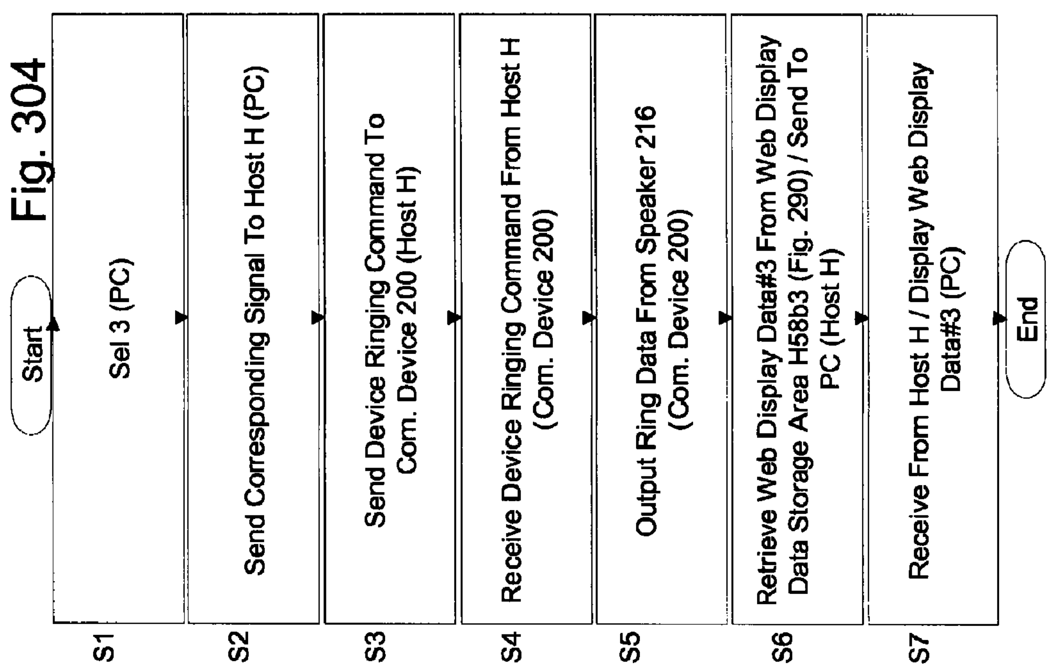

FIG. 304 is a flowchart illustrating an exemplary embodiment of the present invention.

Figure 305:
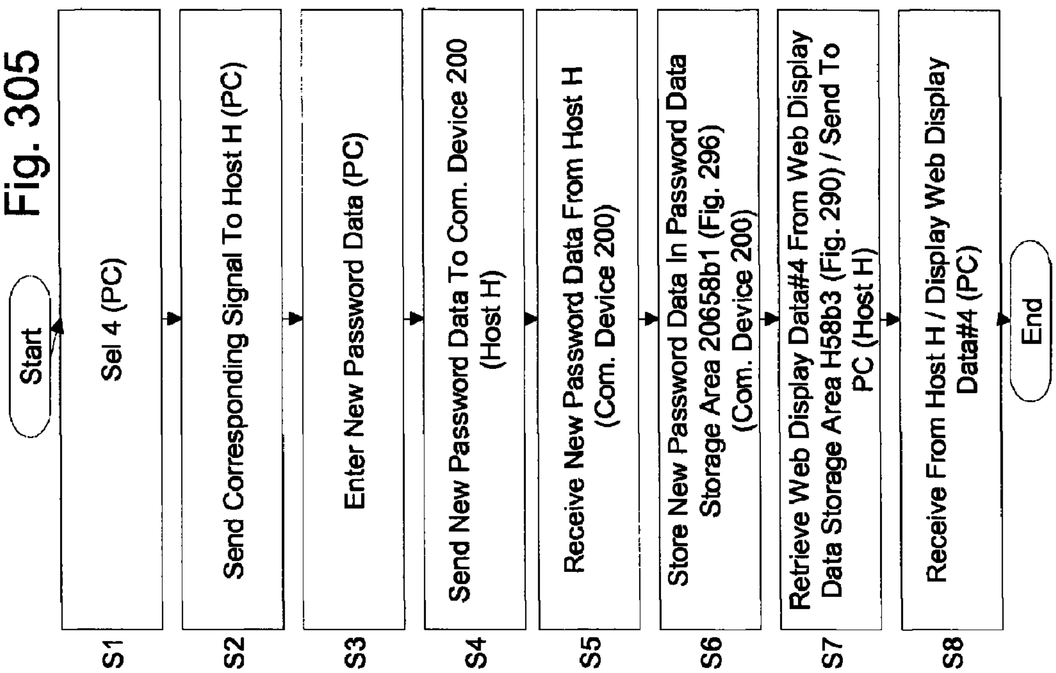

FIG. 305 is a flowchart illustrating an exemplary embodiment of the present invention.

Figure 306:
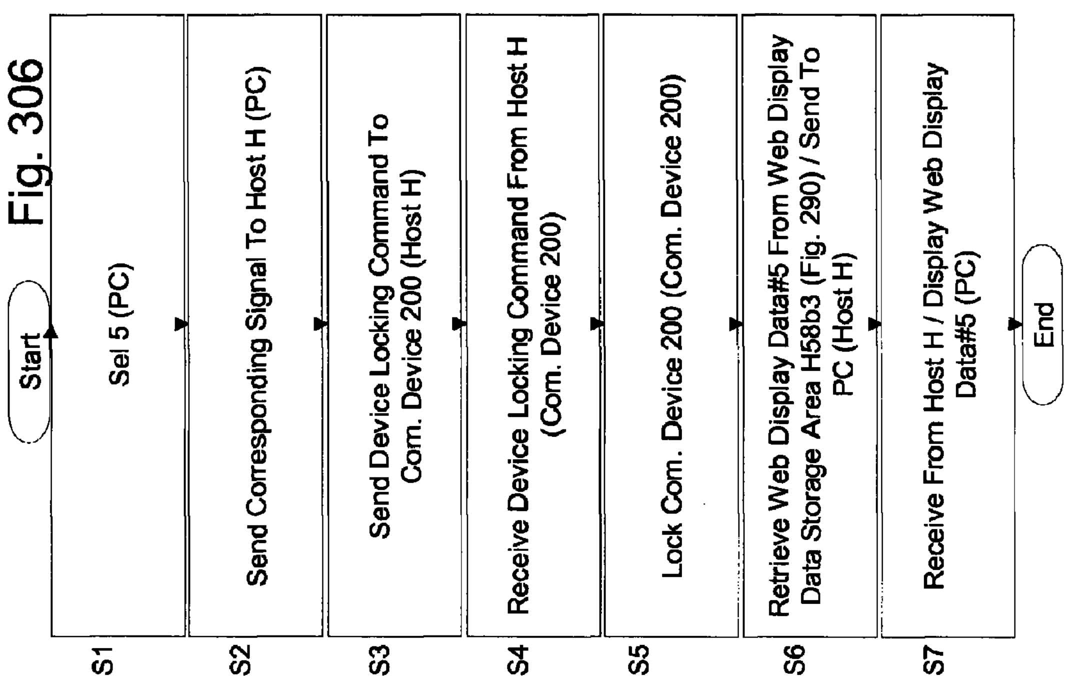

FIG. 306 is a flowchart illustrating an exemplary embodiment of the present invention.

Figure 307:
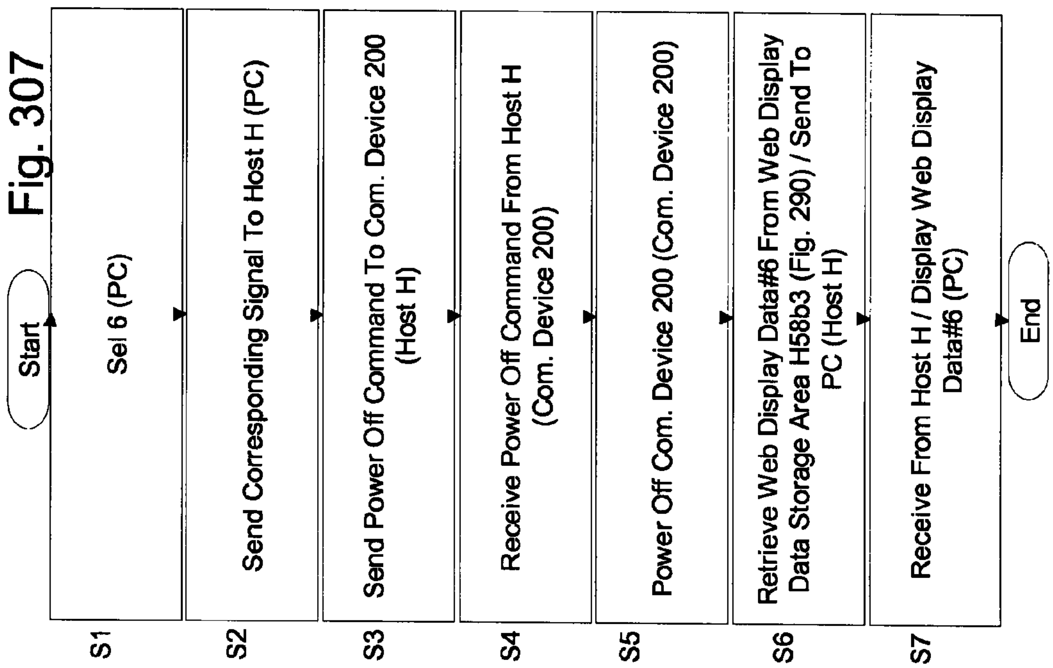

FIG. 307 is a flowchart illustrating an exemplary embodiment of the present invention.

Figure 308:
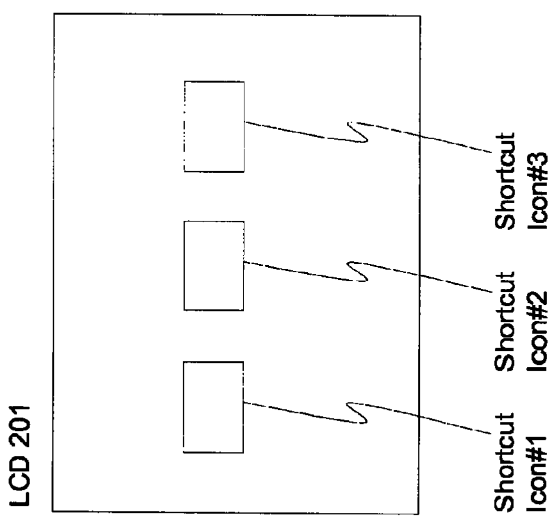

FIG. 308 is a simplified illustration illustrating an exemplary embodiment of the present invention.

Figure 309:
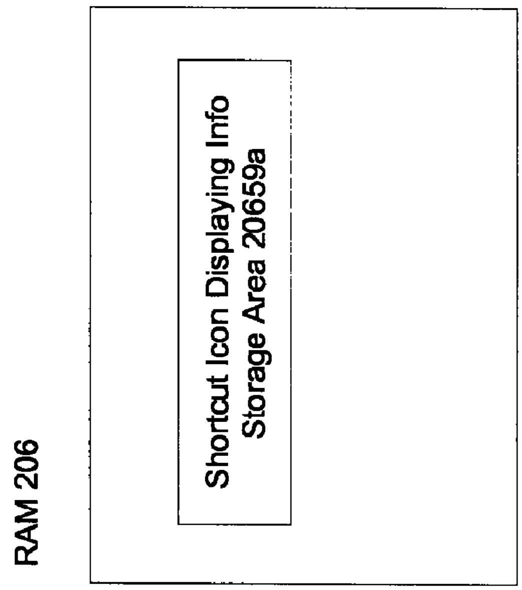

FIG. 309 is a block diagram illustrating an exemplary embodiment of the present invention.

Figure 310:
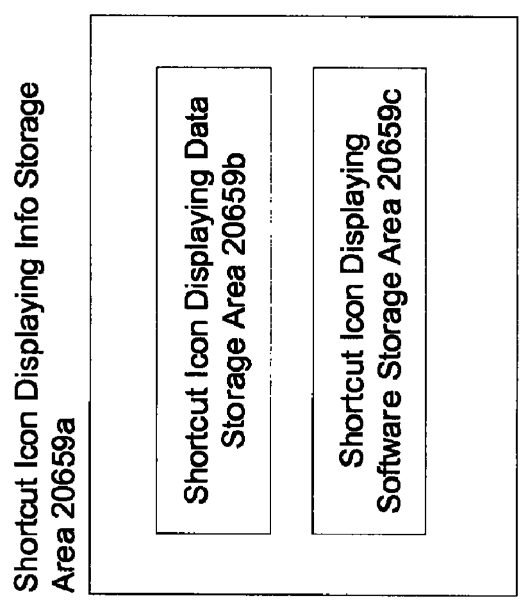

FIG. 310 is a block diagram illustrating an exemplary embodiment of the present invention.

Figures 311, 312:
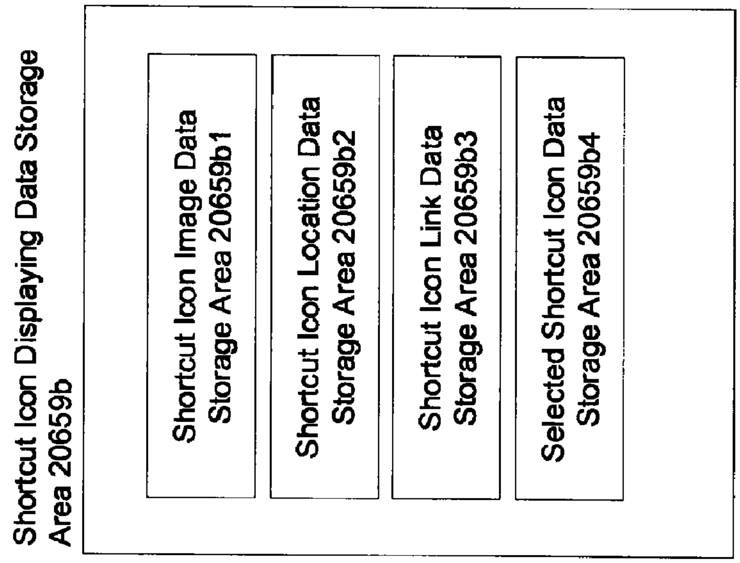

FIG. 311 is a block diagram illustrating an exemplary embodiment of the present invention.

FIG. 312 is a block diagram illustrating an exemplary embodiment of the present invention.

FIG. 313 is a block diagram illustrating an exemplary embodiment of the present invention.

FIG. 314 is a block diagram illustrating an exemplary embodiment of the present invention.

Figure 315:
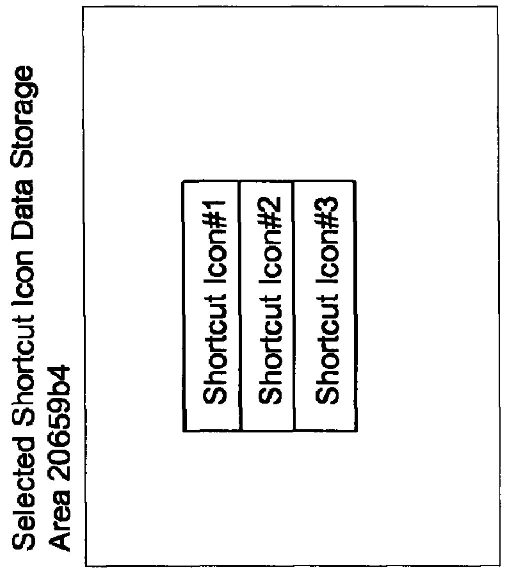

FIG. 315 is a block diagram illustrating an exemplary embodiment of the present invention.

Figure 316:
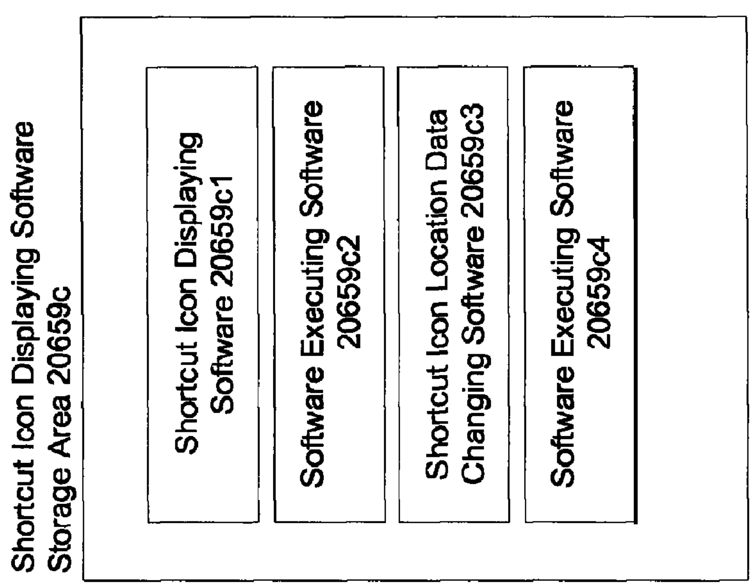

FIG. 316 is a block diagram illustrating an exemplary embodiment of the present invention.

Figure 317:
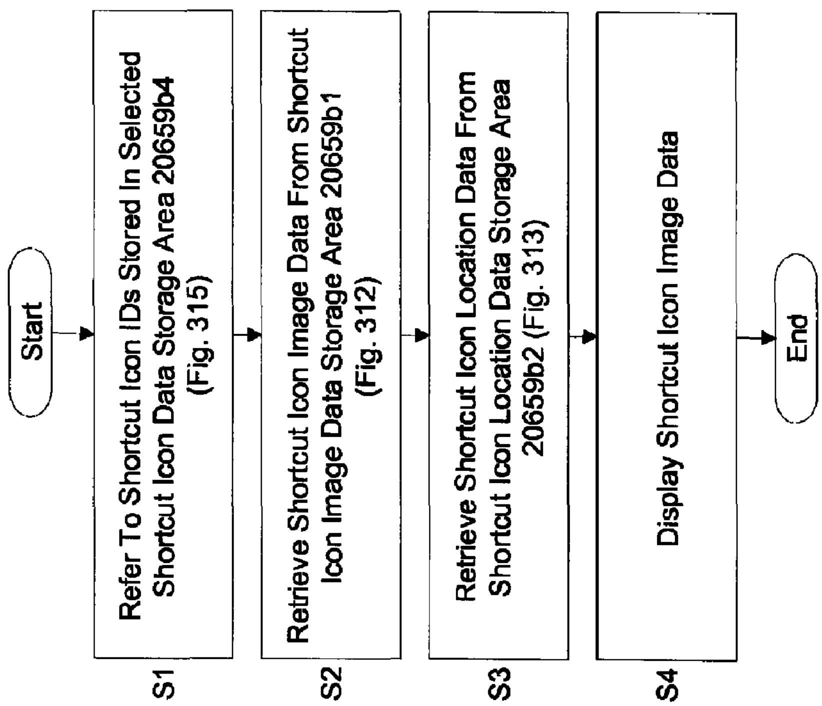

FIG. 317 is a flowchart illustrating an exemplary embodiment of the present invention.

Figure 318:
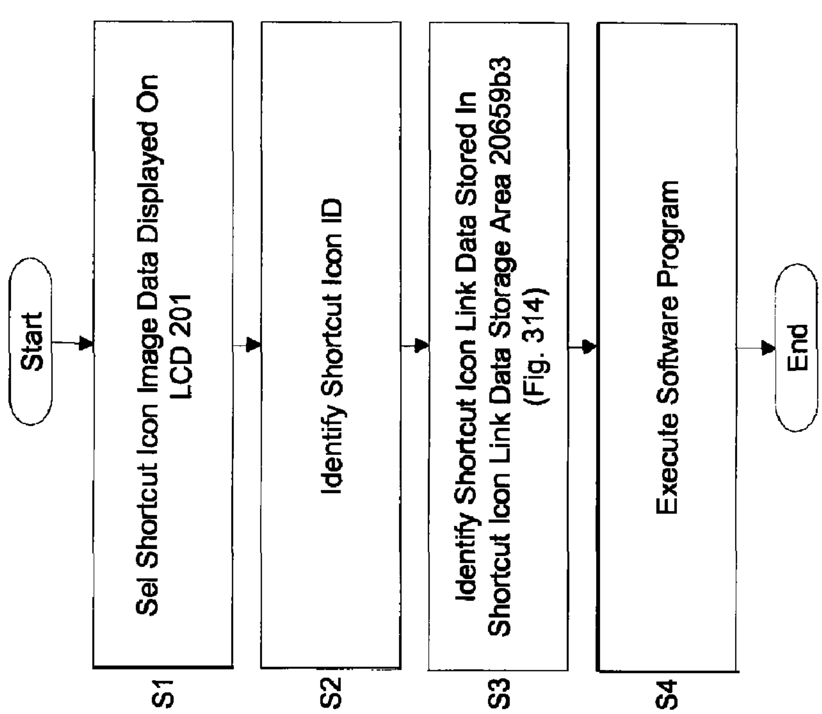

FIG. 318 is a flowchart illustrating an exemplary embodiment of the present invention.

Figure 319:
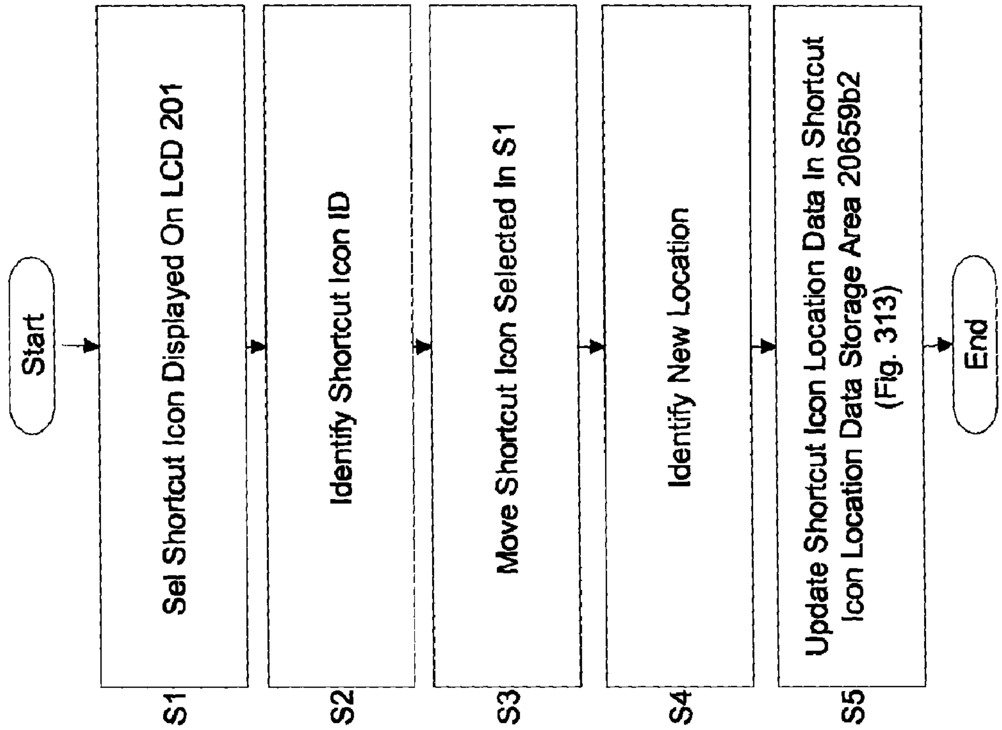

FIG. 319 is a flowchart illustrating an exemplary embodiment of the present invention.

Figure 320:
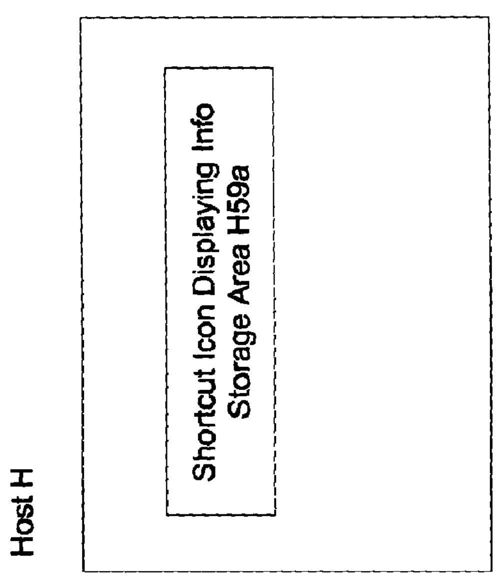

FIG. 320 is a block diagram illustrating an exemplary embodiment of the present invention.

Figure 321:
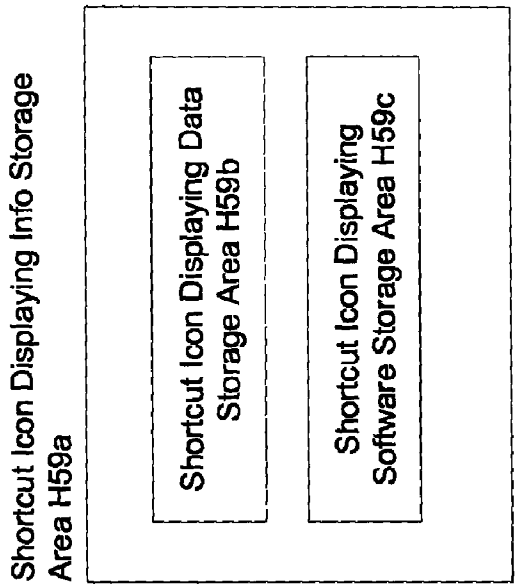

FIG. 321 is a block diagram illustrating an exemplary embodiment of the present invention.

Figure 322:
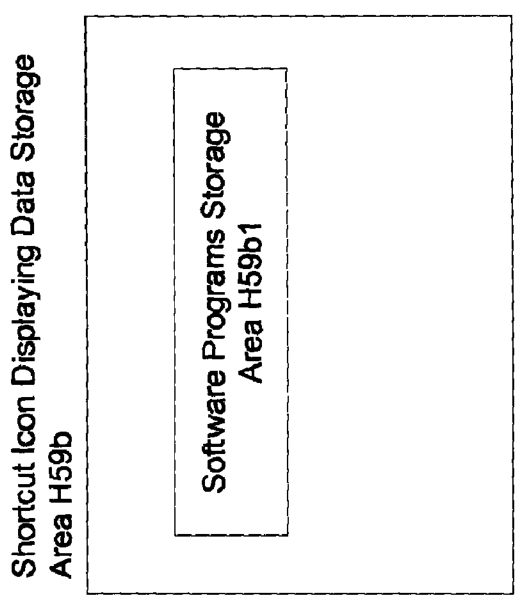

FIG. 322 is a block diagram illustrating an exemplary embodiment of the present invention.

Figures 323, 324:
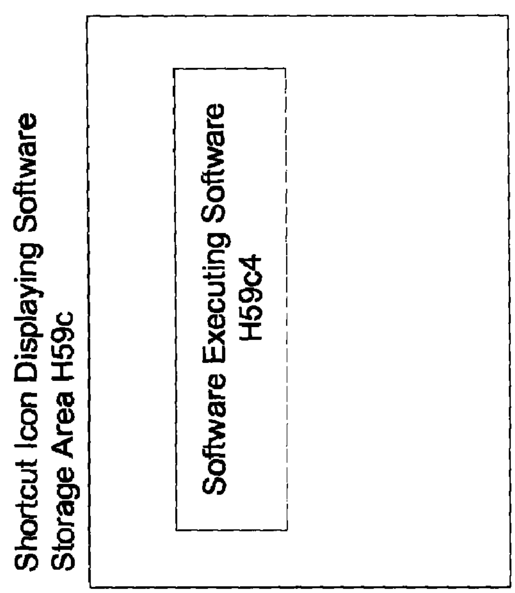

FIG. 323 is a block diagram illustrating an exemplary embodiment of the present invention.

FIG. 324 is a block diagram illustrating an exemplary embodiment of the present invention.

Figure 325:
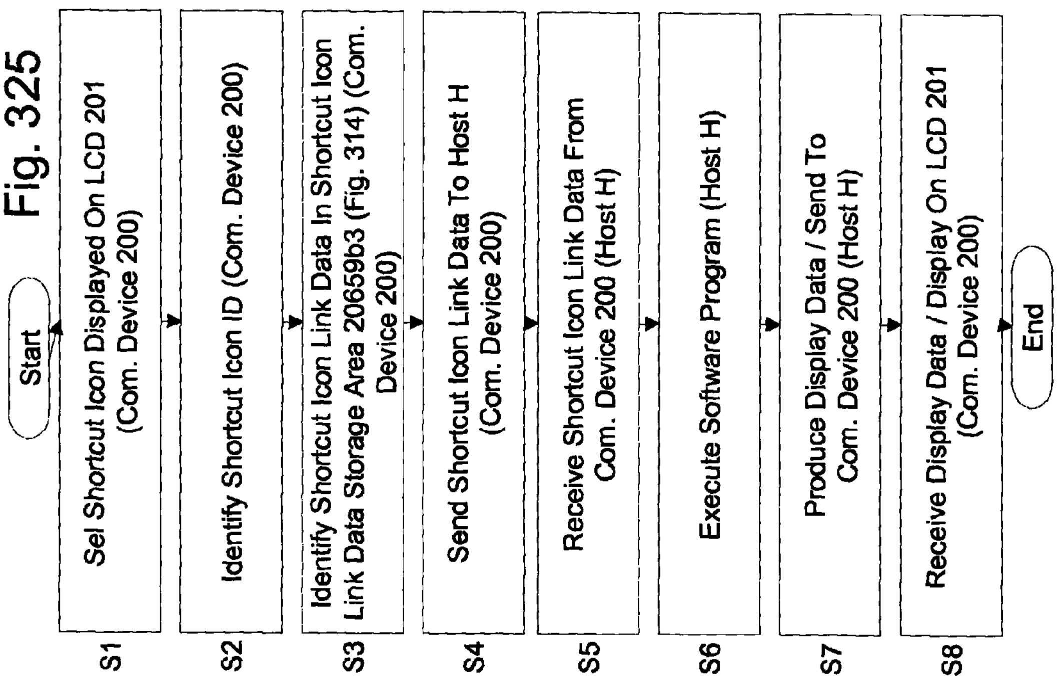

FIG. 325 is a flowchart illustrating an exemplary embodiment of the present invention.

Figure 326:
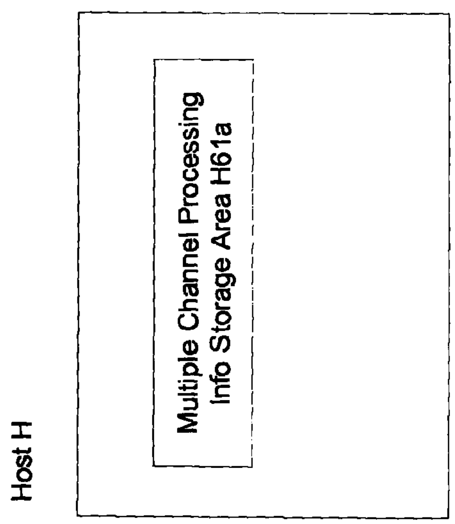

FIG. 326 is a block diagram illustrating an exemplary embodiment of the present invention.

Figure 327:
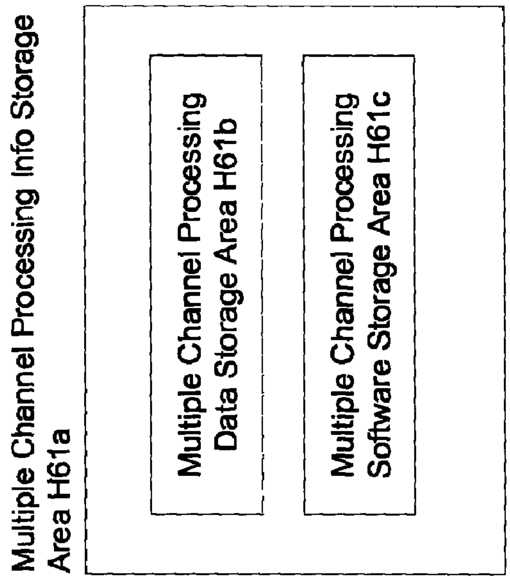

FIG. 327 is a block diagram illustrating an exemplary embodiment of the present invention.

Figure 328:
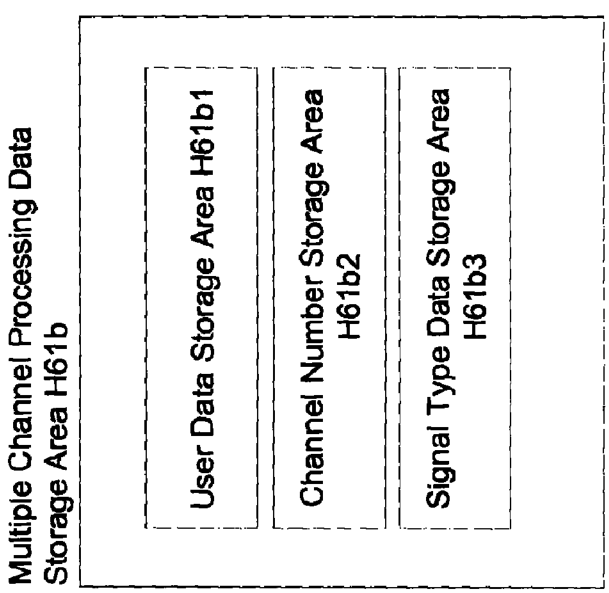

FIG. 328 is a block diagram illustrating an exemplary embodiment of the present invention.

FIG. 329 is a block diagram illustrating an exemplary embodiment of the present invention.

FIG. 330 is a block diagram illustrating an exemplary embodiment of the present invention.

FIG. 331 is a block diagram illustrating an exemplary embodiment of the present invention.

FIG. 332 is a block diagram illustrating an exemplary embodiment of the present invention.

Figures 333, 334:
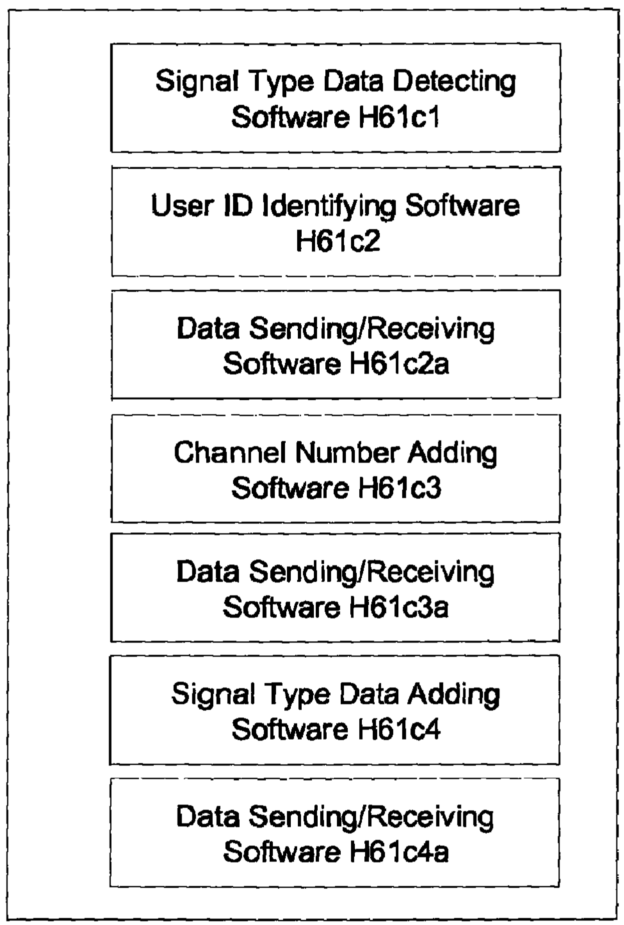

FIG. 333 is a block diagram illustrating an exemplary embodiment of the present invention.

FIG. 334 is a block diagram illustrating an exemplary embodiment of the present invention.

Figure 335:
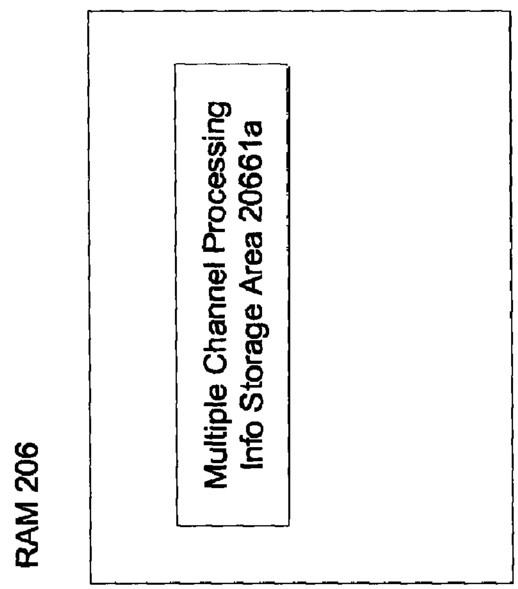

FIG. 335 is a block diagram illustrating an exemplary embodiment of the present invention.

Figure 336:
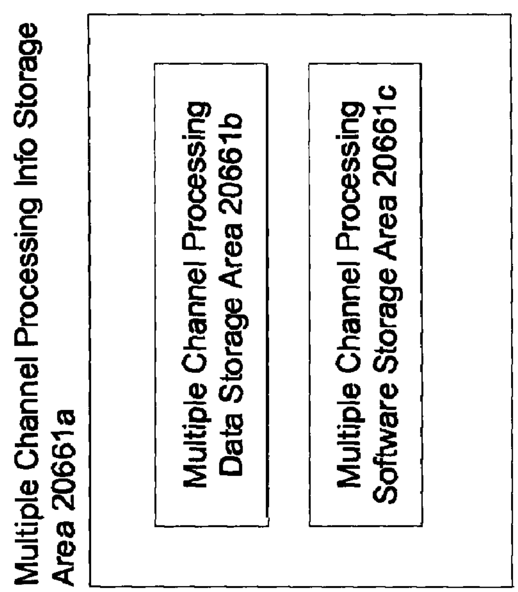

FIG. 336 is a block diagram illustrating an exemplary embodiment of the present invention.

Figures 337, 338:
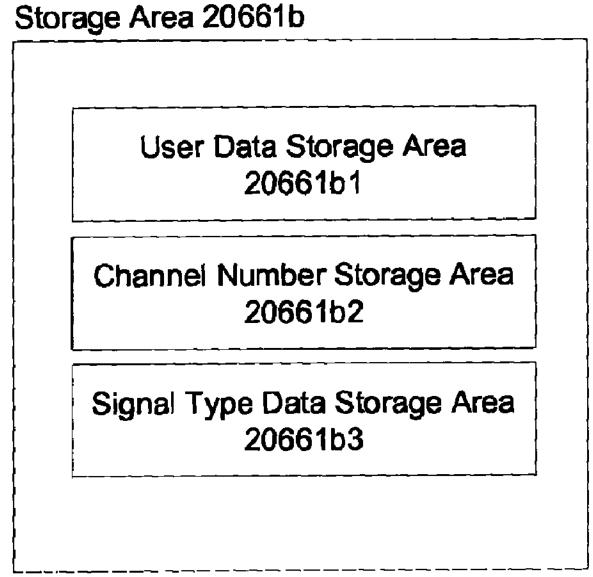

FIG. 337 is a block diagram illustrating an exemplary embodiment of the present invention.

FIG. 338 is a block diagram illustrating an exemplary embodiment of the present invention.

FIG. 339 is a block diagram illustrating an exemplary embodiment of the present invention.

FIG. 340 is a block diagram illustrating an exemplary embodiment of the present invention.

FIG. 341 is a block diagram illustrating an exemplary embodiment of the present invention.

FIG. 342 is a block diagram illustrating an exemplary embodiment of the present invention.

Figure 343:
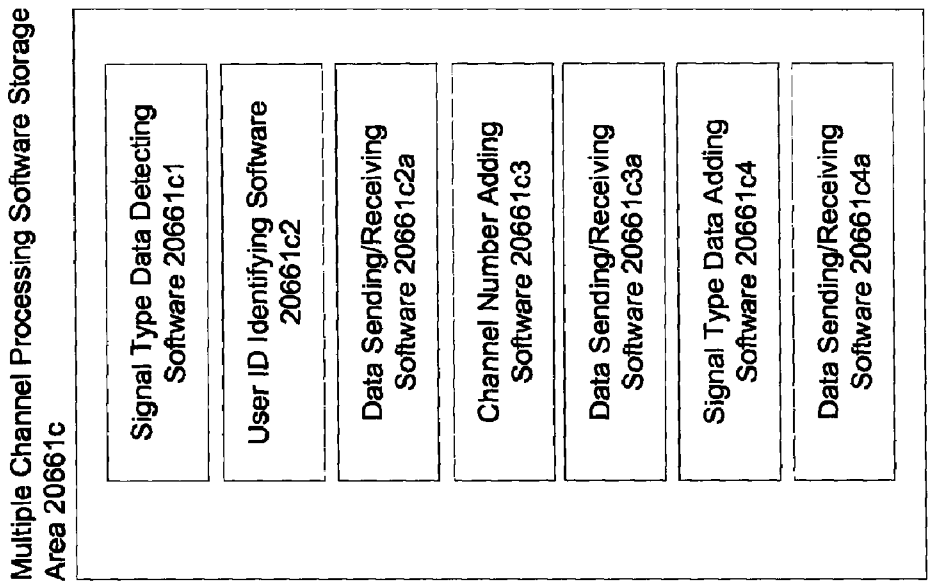

FIG. 343 is a block diagram illustrating an exemplary embodiment of the present invention.

Figure 344:
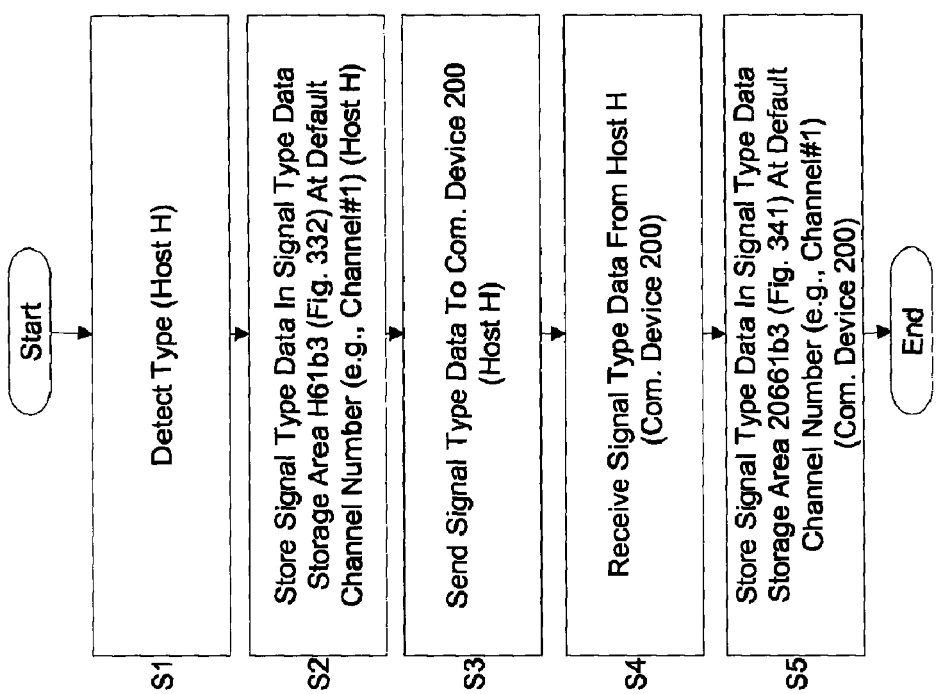

FIG. 344 is a flowchart illustrating an exemplary embodiment of the present invention.

Figure 345:
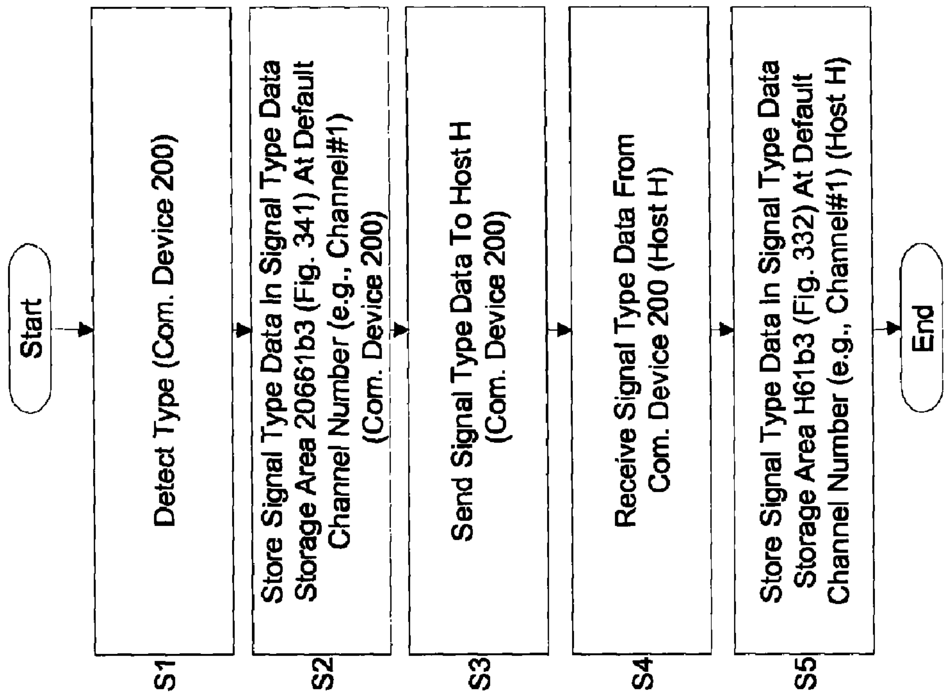

FIG. 345 is a flowchart illustrating an exemplary embodiment of the present invention.

Figure 346:
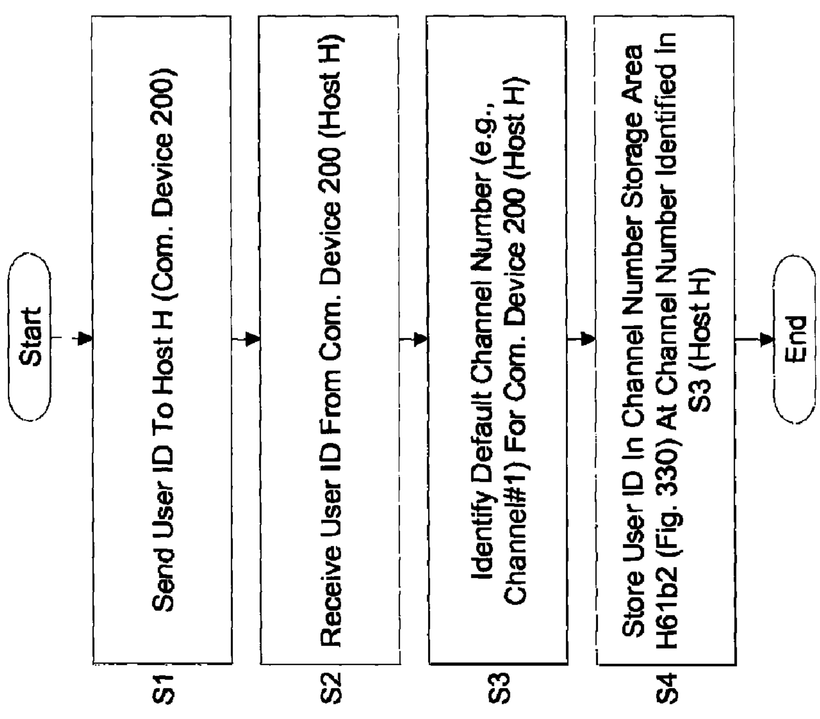

FIG. 346 is a flowchart illustrating an exemplary embodiment of the present invention.

Figure 347:
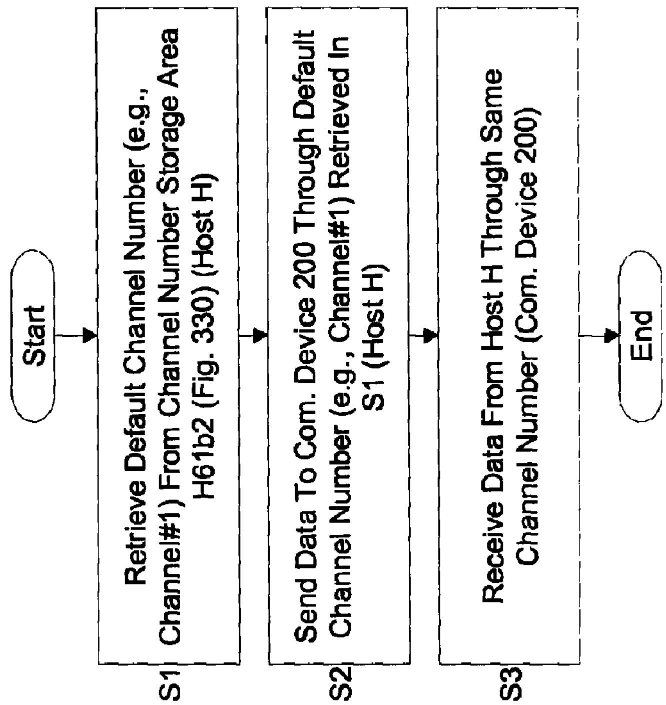

FIG. 347 is a flowchart illustrating an exemplary embodiment of the present invention.

Figure 348:
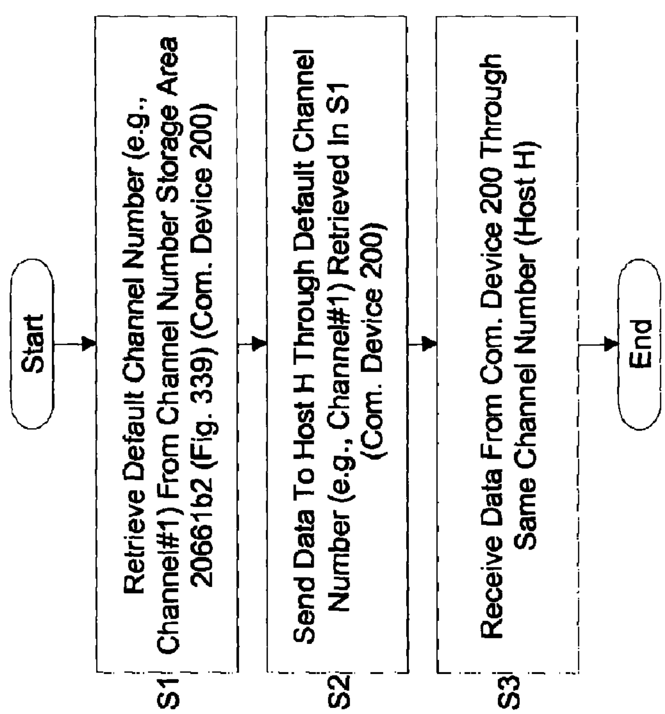

FIG. 348 is a flowchart illustrating an exemplary embodiment of the present invention.

Figure 349:
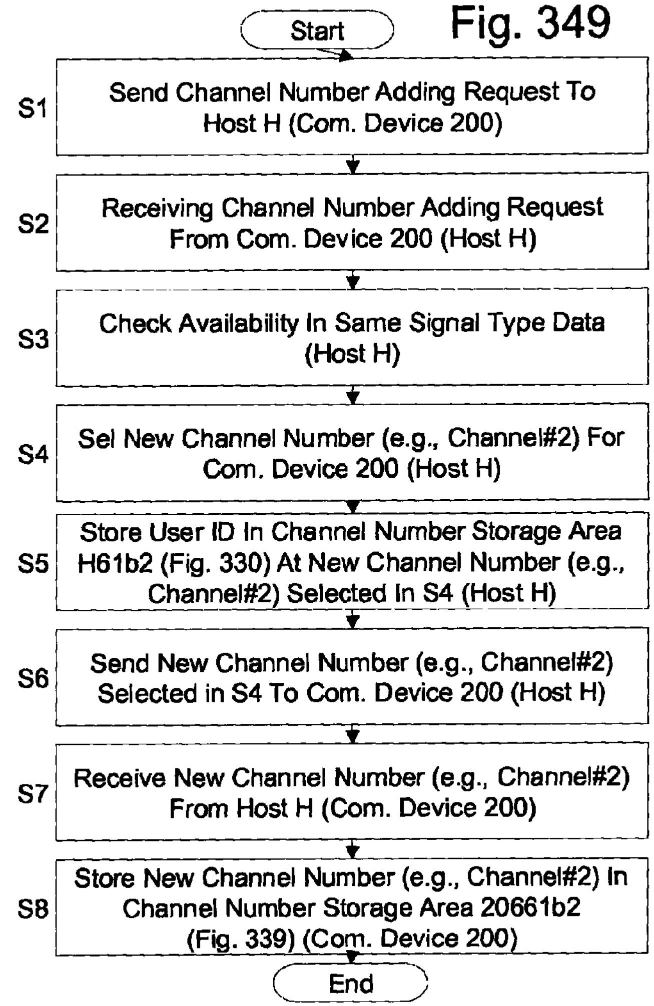

FIG. 349 is a flowchart illustrating an exemplary embodiment of the present invention.

Figure 350:
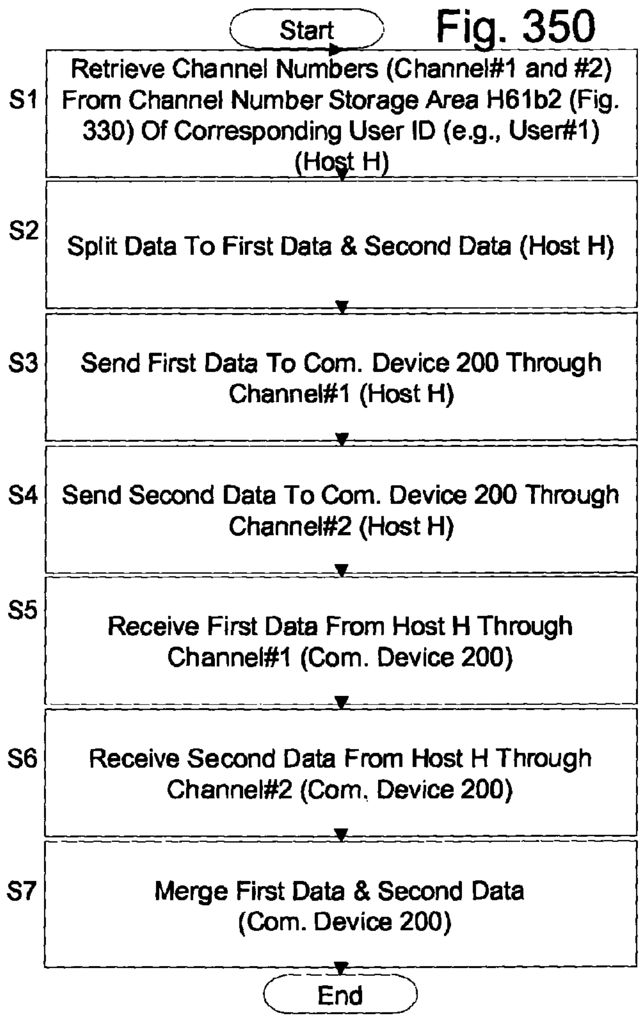

FIG. 350 is a flowchart illustrating an exemplary embodiment of the present invention.

Figure 351:
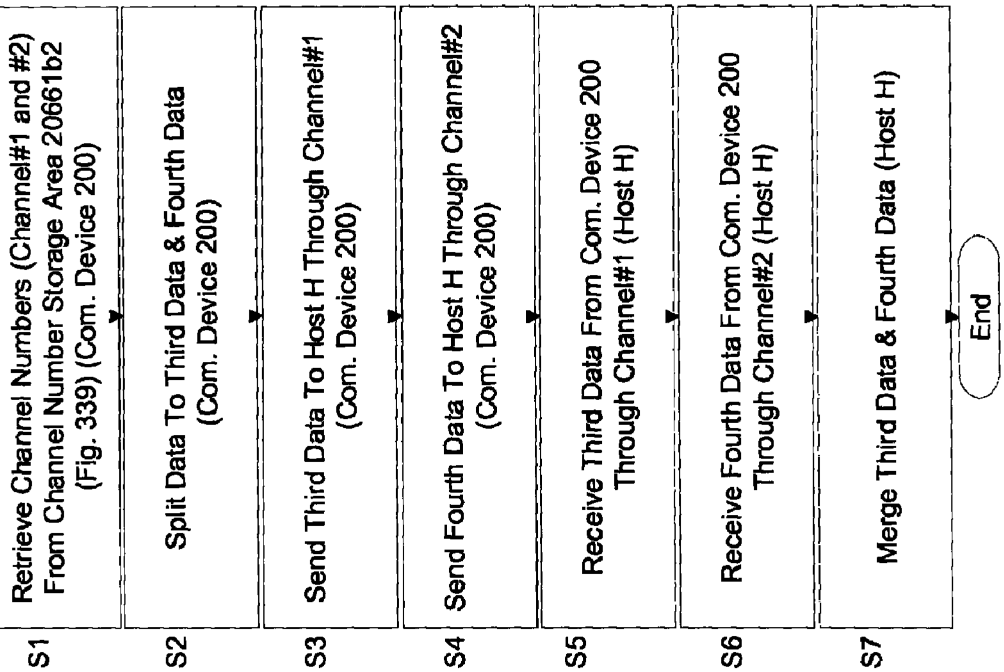

FIG. 351 is a flowchart illustrating an exemplary embodiment of the present invention.

Figure 352:
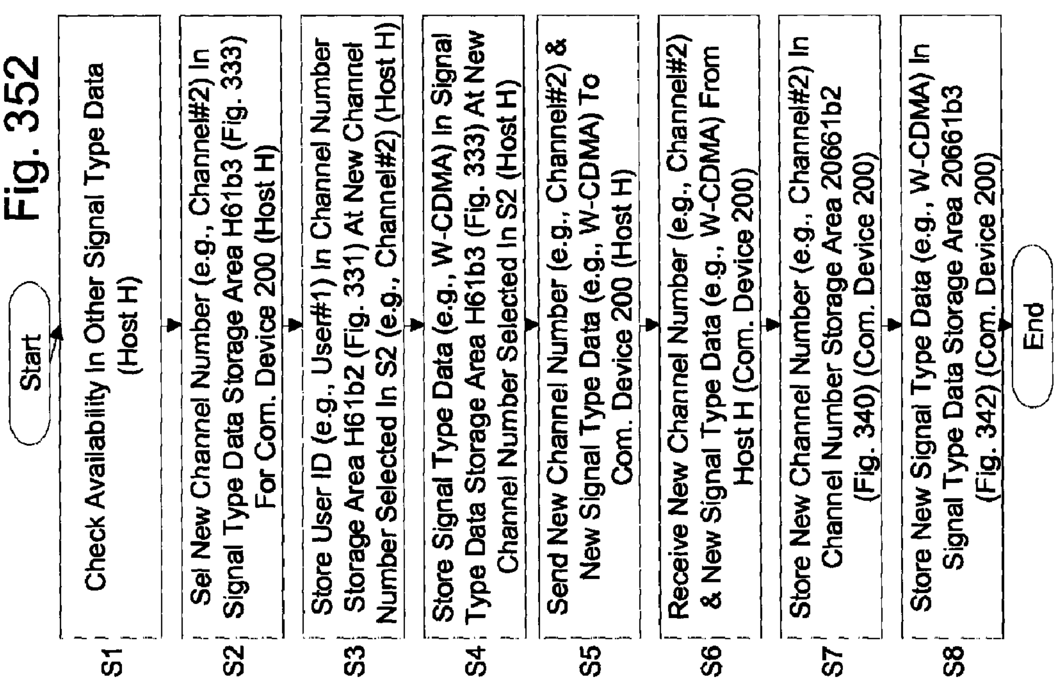

FIG. 352 is a flowchart illustrating an exemplary embodiment of the present invention.

Figure 353:
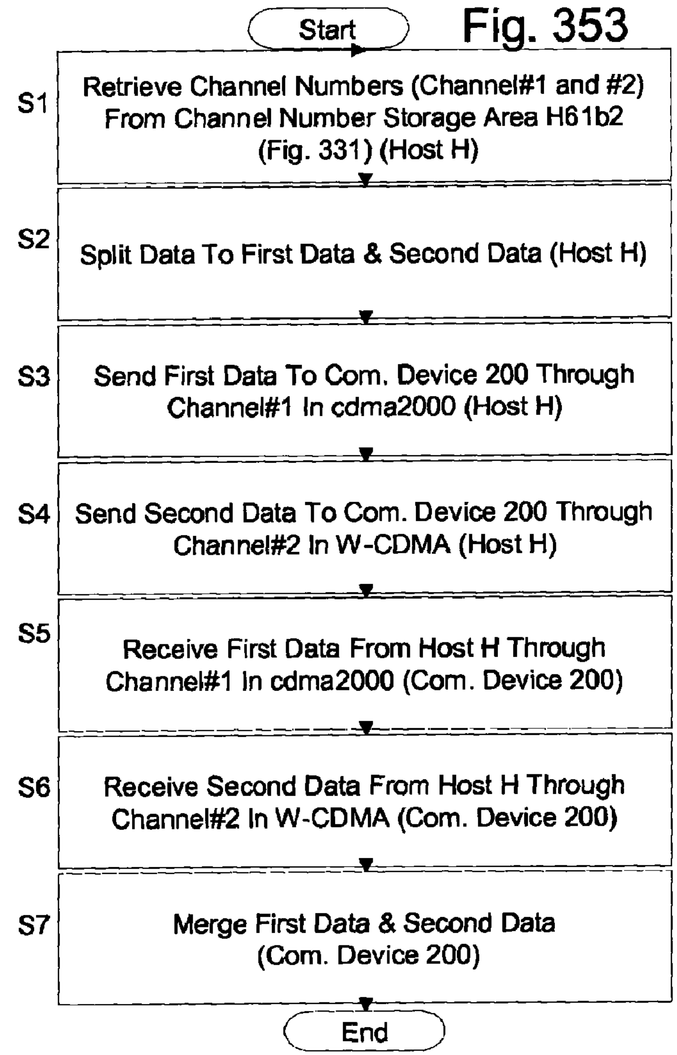

FIG. 353 is a flowchart illustrating an exemplary embodiment of the present invention.

Figure 354:
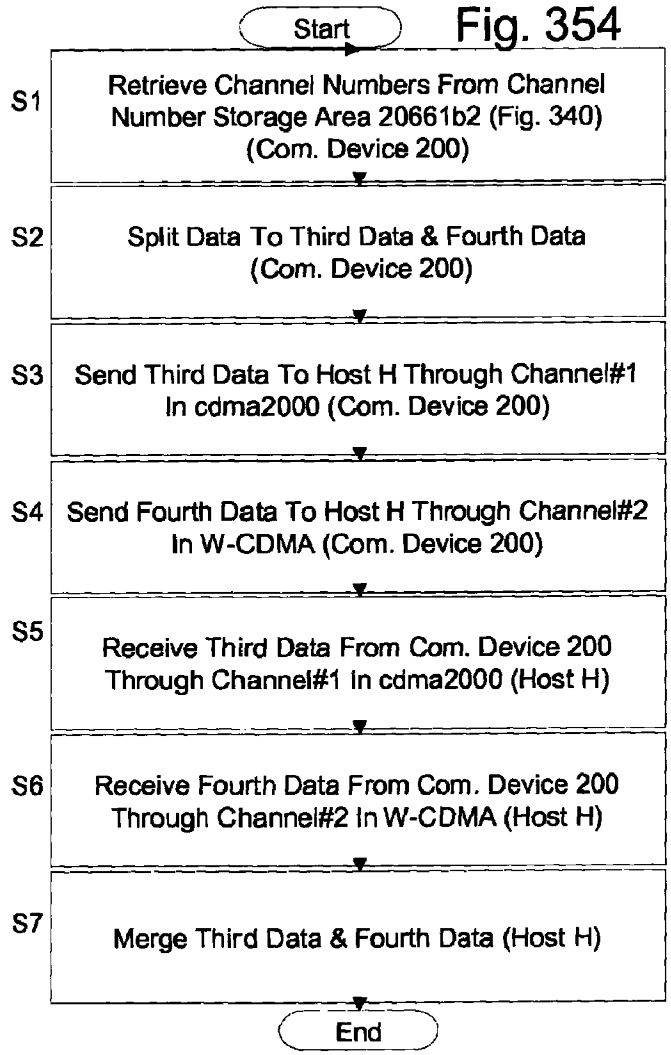

FIG. 354 is a flowchart illustrating an exemplary embodiment of the present invention.

Figure 355:
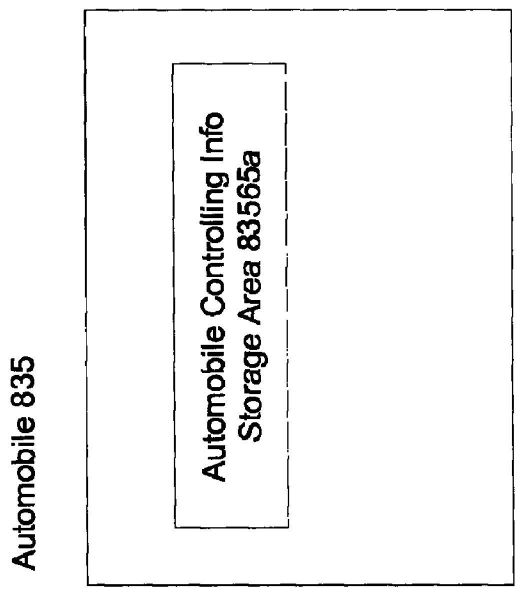

FIG. 355 is a block diagram illustrating an exemplary embodiment of the present invention.

Figure 356:
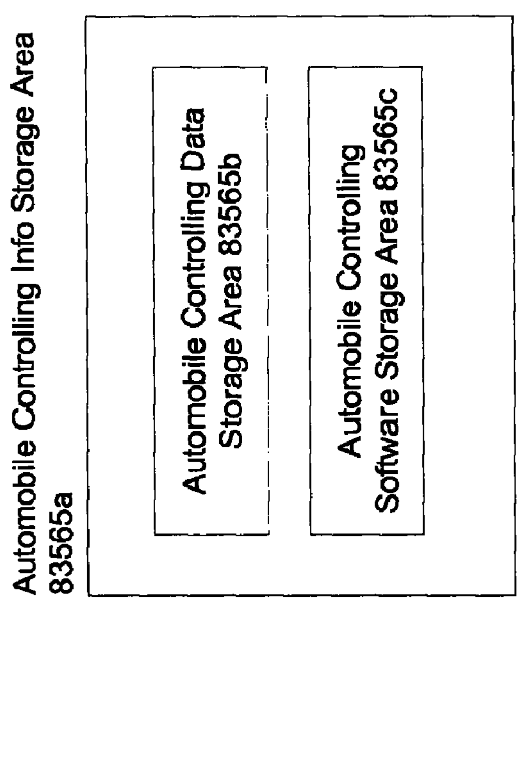

FIG. 356 is a block diagram illustrating an exemplary embodiment of the present invention.

Figure 357:
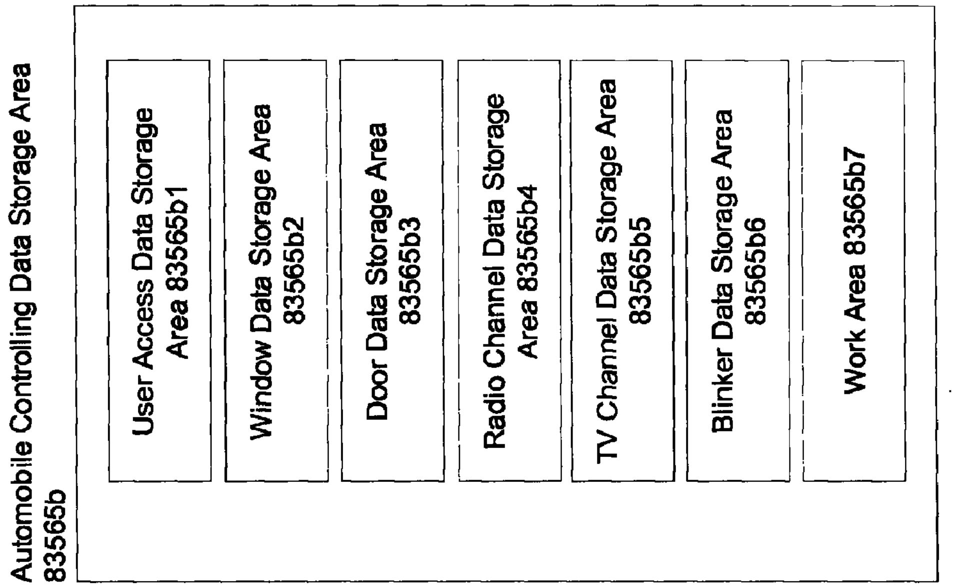

FIG. 357 is a block diagram illustrating an exemplary embodiment of the present invention.

Figure 358:
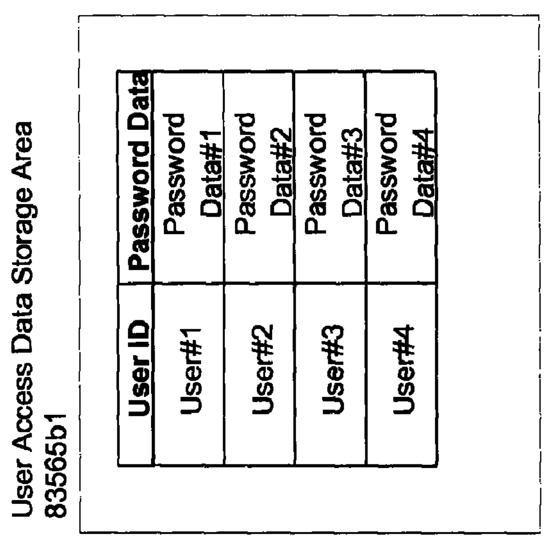

FIG. 358 is a block diagram illustrating an exemplary embodiment of the present invention.

FIG. 359 is a block diagram illustrating an exemplary embodiment of the present invention.

FIG. 360 is a block diagram illustrating an exemplary embodiment of the present invention.

FIG. 361 is a block diagram illustrating an exemplary embodiment of the present invention.

FIG. 362 is a block diagram illustrating an exemplary embodiment of the present invention.

Figures 363, 364:
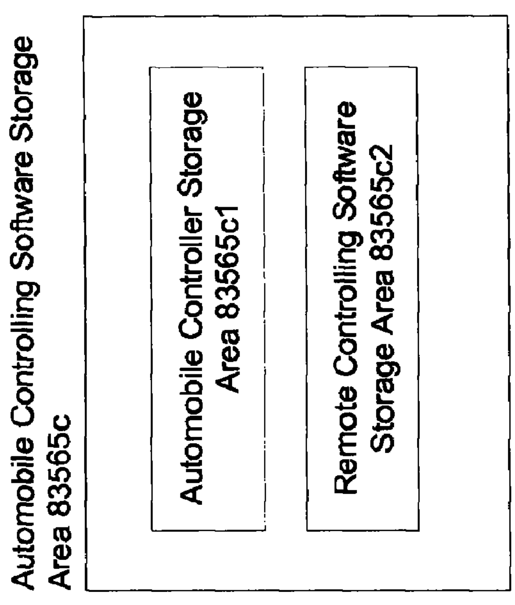

FIG. 363 is a block diagram illustrating an exemplary embodiment of the present invention.

FIG. 364 is a block diagram illustrating an exemplary embodiment of the present invention.

FIG. 365 is a block diagram illustrating an exemplary embodiment of the present invention.

FIG. 366 is a block diagram illustrating an exemplary embodiment of the present invention.

Figure 367:
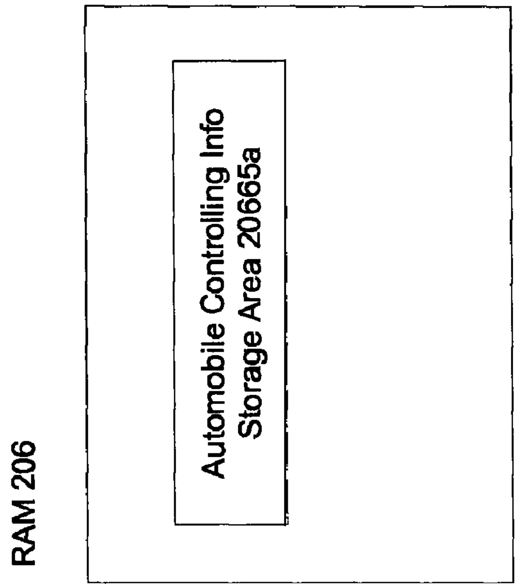

FIG. 367 is a block diagram illustrating an exemplary embodiment of the present invention.

Figure 368:
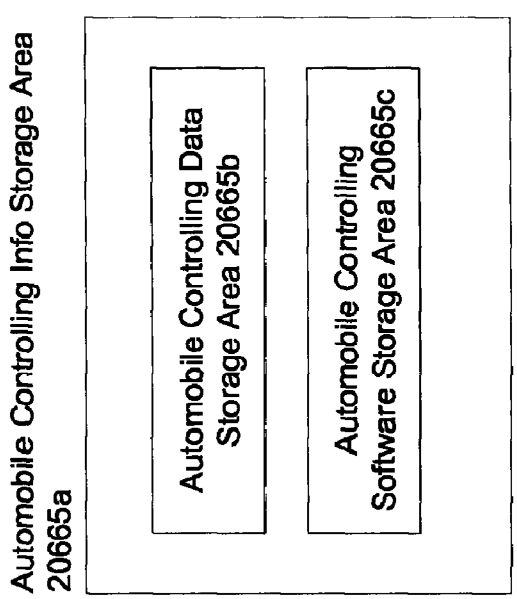

FIG. 368 is a block diagram illustrating an exemplary embodiment of the present invention.

Figure 369:
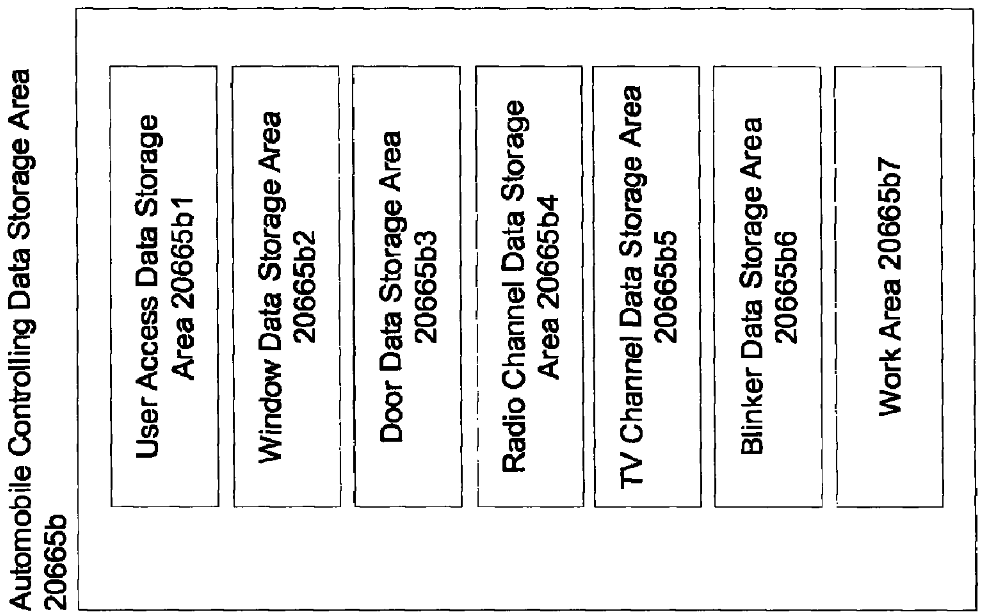

FIG. 369 is a block diagram illustrating an exemplary embodiment of the present invention.

Figure 370:
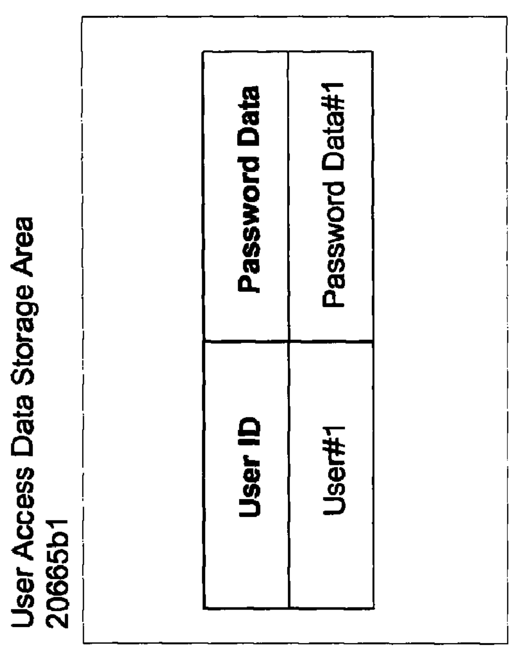

FIG. 370 is a block diagram illustrating an exemplary embodiment of the present invention.

FIG. 371 is a block diagram illustrating an exemplary embodiment of the present invention.

FIG. 372 is a block diagram illustrating an exemplary embodiment of the present invention.

FIG. 373 is a block diagram illustrating an exemplary embodiment of the present invention.

FIG. 374 is a block diagram illustrating an exemplary embodiment of the present invention.

Figures 375, 376:
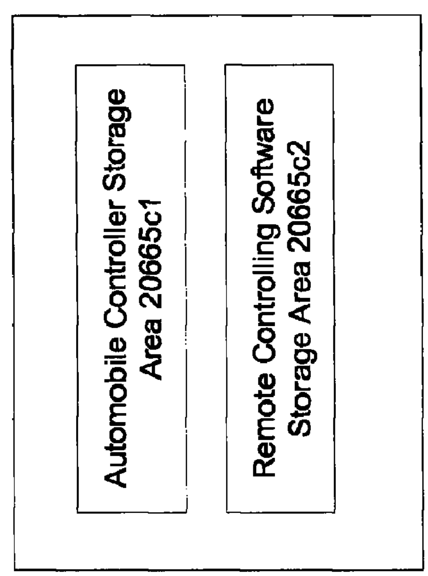

FIG. 375 is a block diagram illustrating an exemplary embodiment of the present invention.

FIG. 376 is a block diagram illustrating an exemplary embodiment of the present invention.

FIG. 377 is a block diagram illustrating an exemplary embodiment of the present invention.

FIG. 378 is a block diagram illustrating an exemplary embodiment of the present invention.

Figure 379:
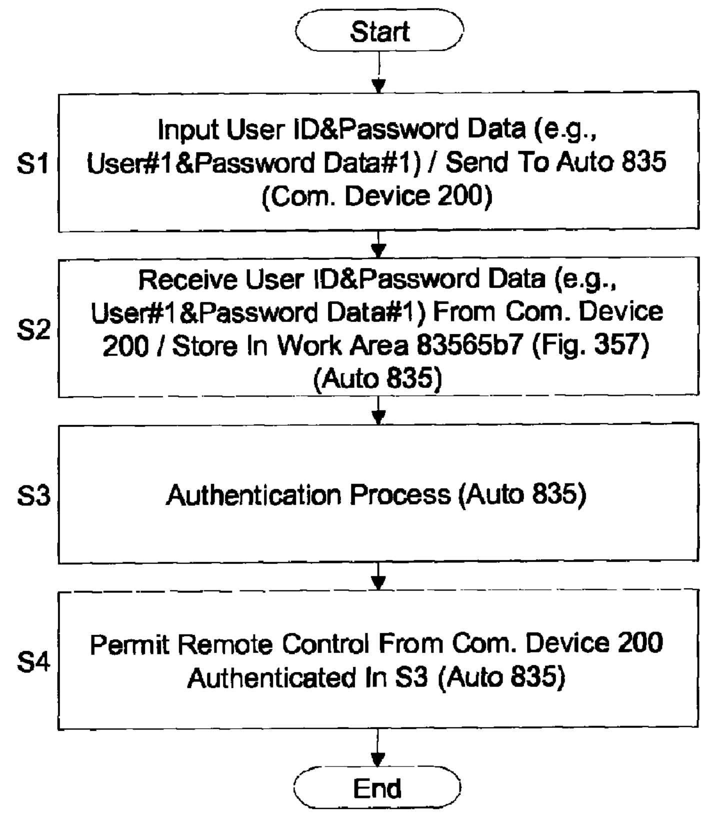

FIG. 379 is a flowchart illustrating an exemplary embodiment of the present invention.

Figure 380:
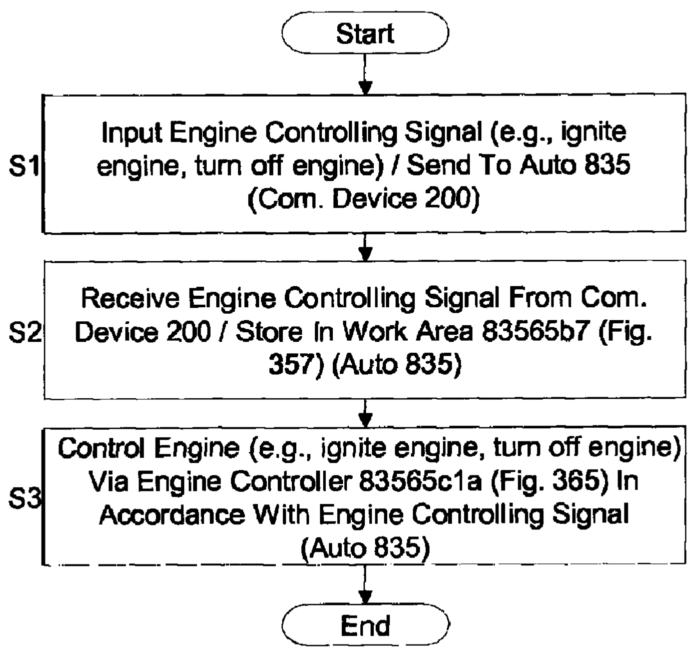

FIG. 380 is a flowchart illustrating an exemplary embodiment of the present invention.

Figure 381:
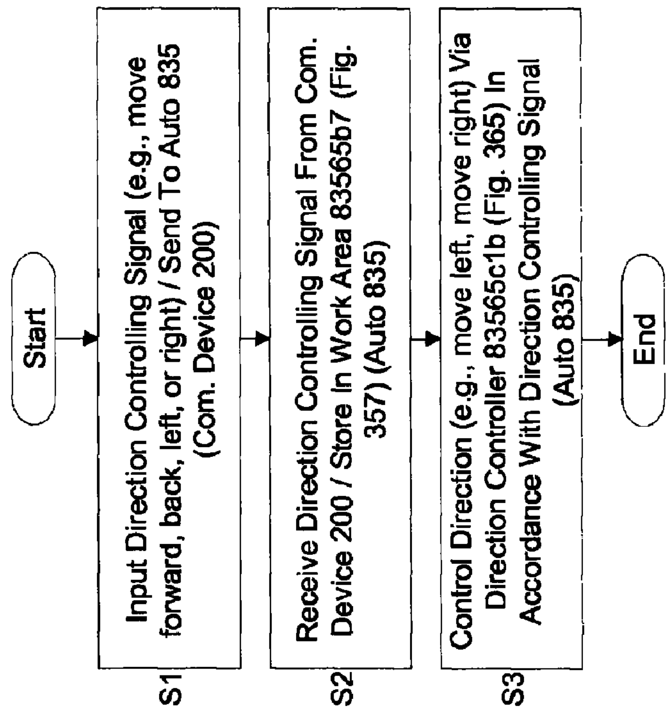

FIG. 381 is a flowchart illustrating an exemplary embodiment of the present invention.

Figure 382:
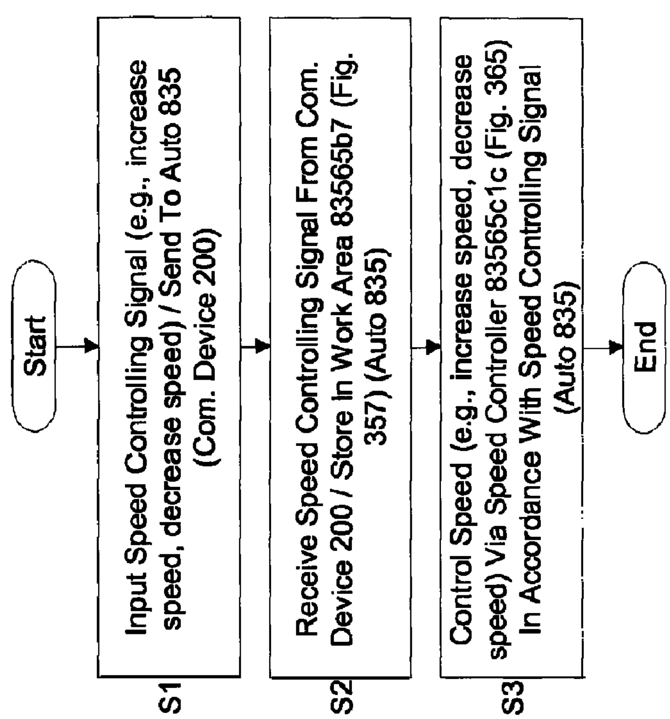

FIG. 382 is a flowchart illustrating an exemplary embodiment of the present invention.

Figure 383:
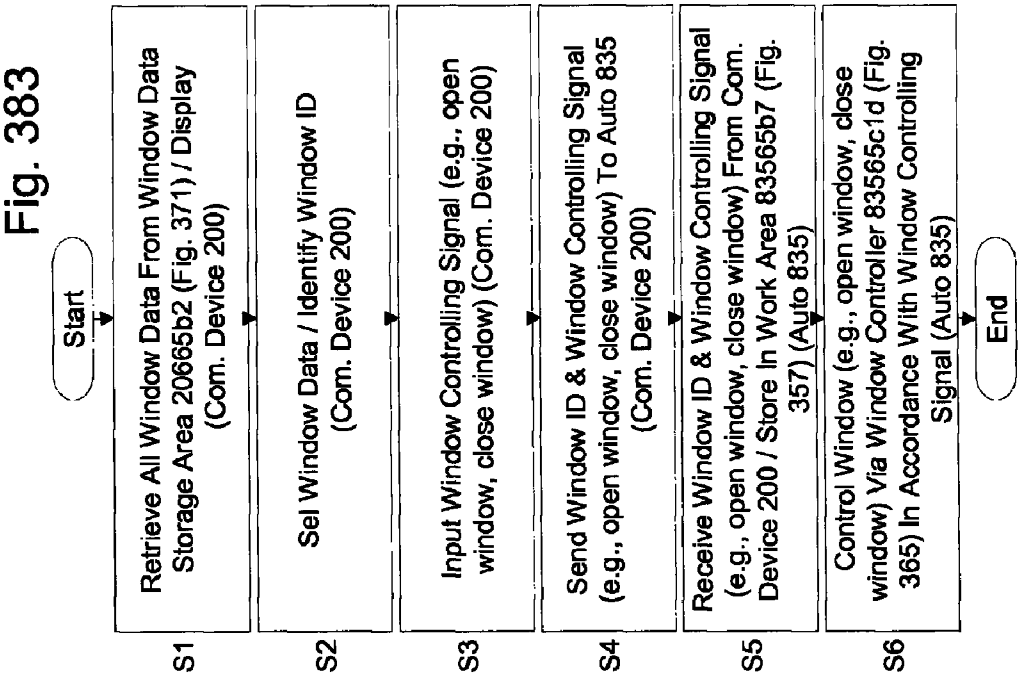

FIG. 383 is a flowchart illustrating an exemplary embodiment of the present invention.

Figure 384:
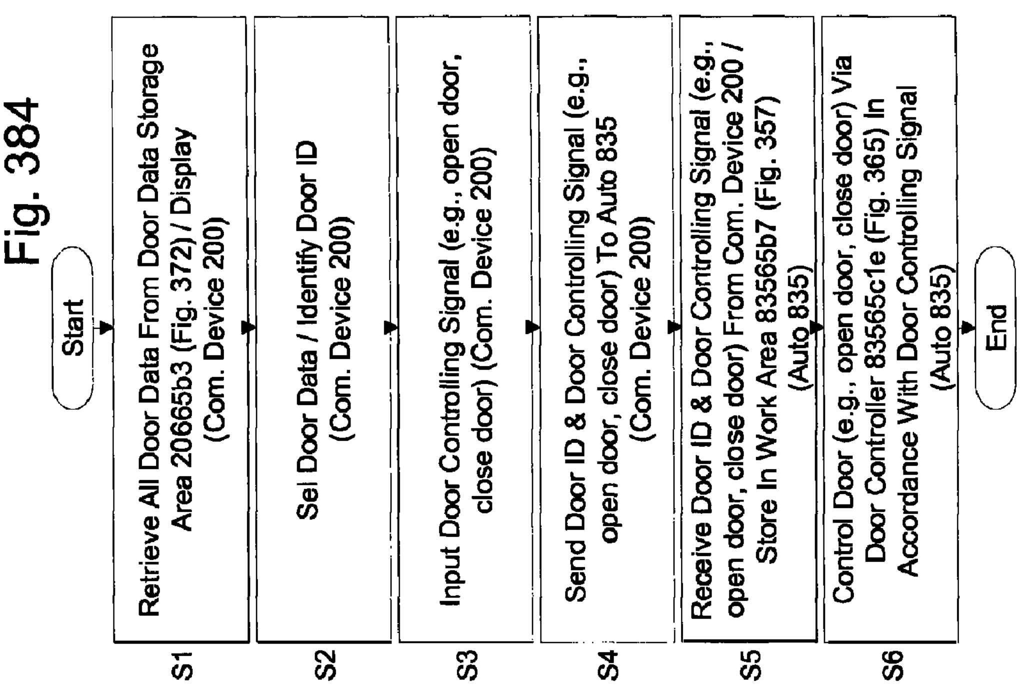

FIG. 384 is a flowchart illustrating an exemplary embodiment of the present invention.

Figure 385:
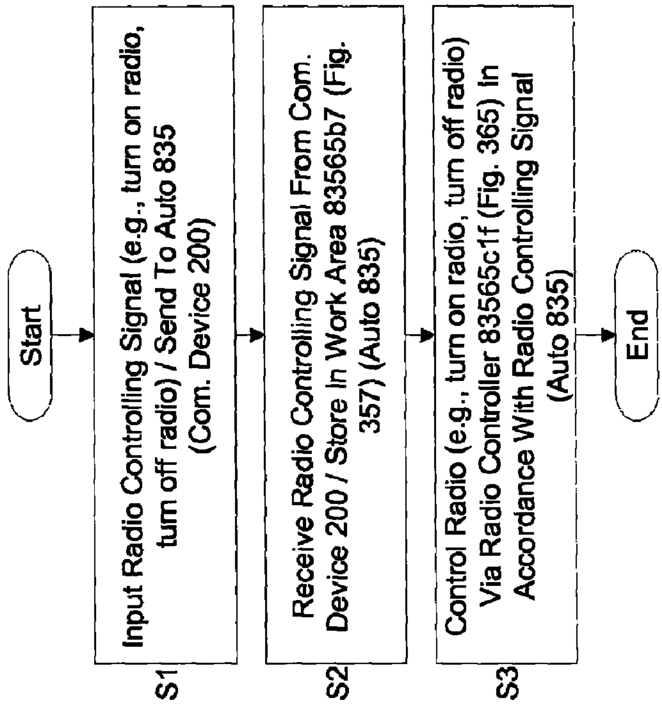

FIG. 385 is a flowchart illustrating an exemplary embodiment of the present invention.

Figure 386:
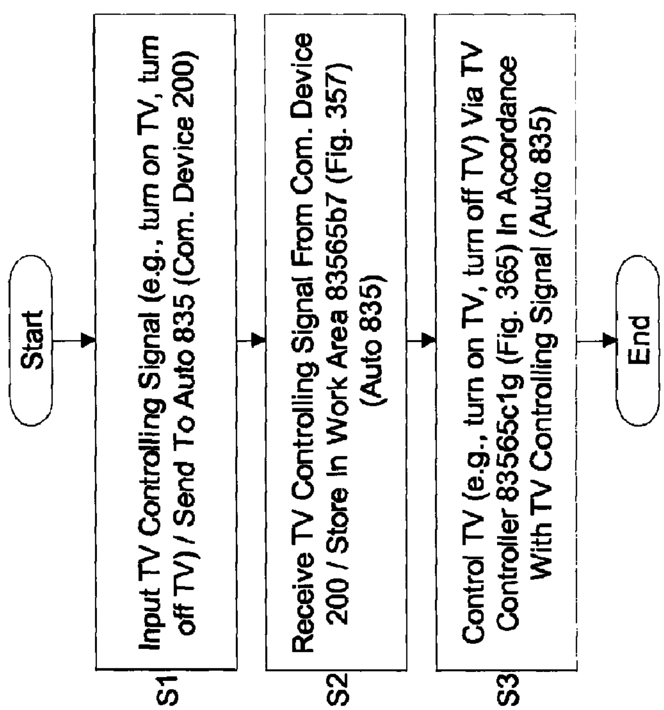

FIG. 386 is a flowchart illustrating an exemplary embodiment of the present invention.

Figure 387:
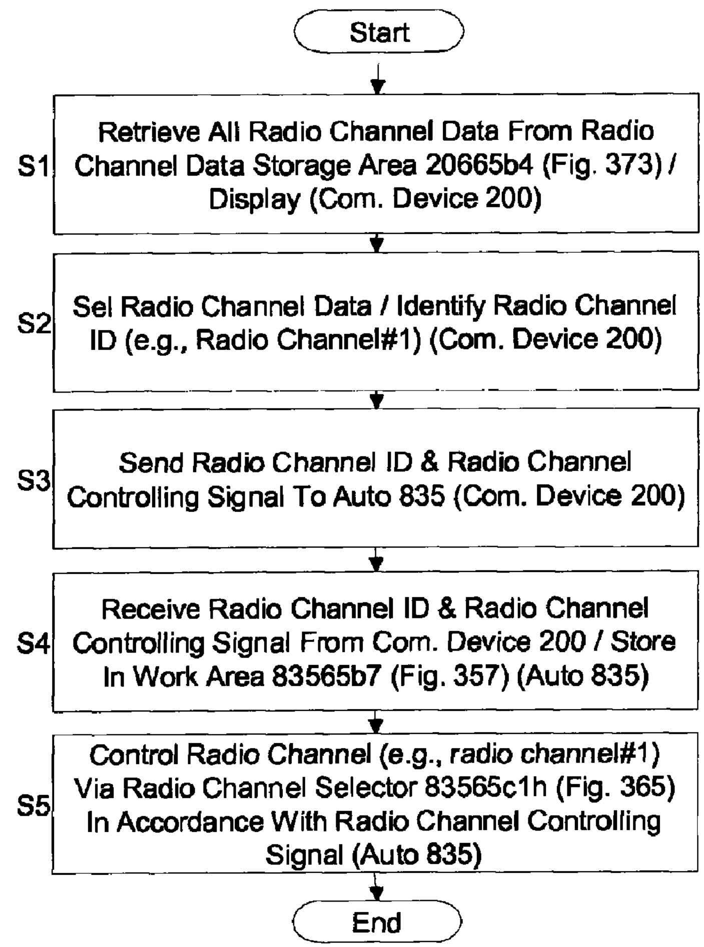

FIG. 387 is a flowchart illustrating an exemplary embodiment of the present invention.

Figure 388:
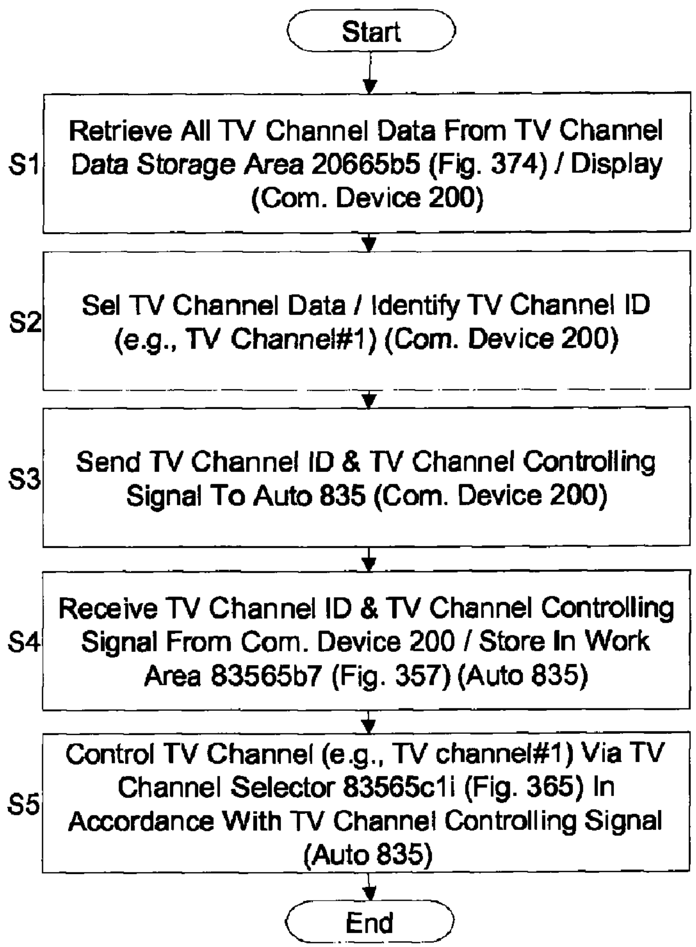

FIG. 388 is a flowchart illustrating an exemplary embodiment of the present invention.

Figure 389:
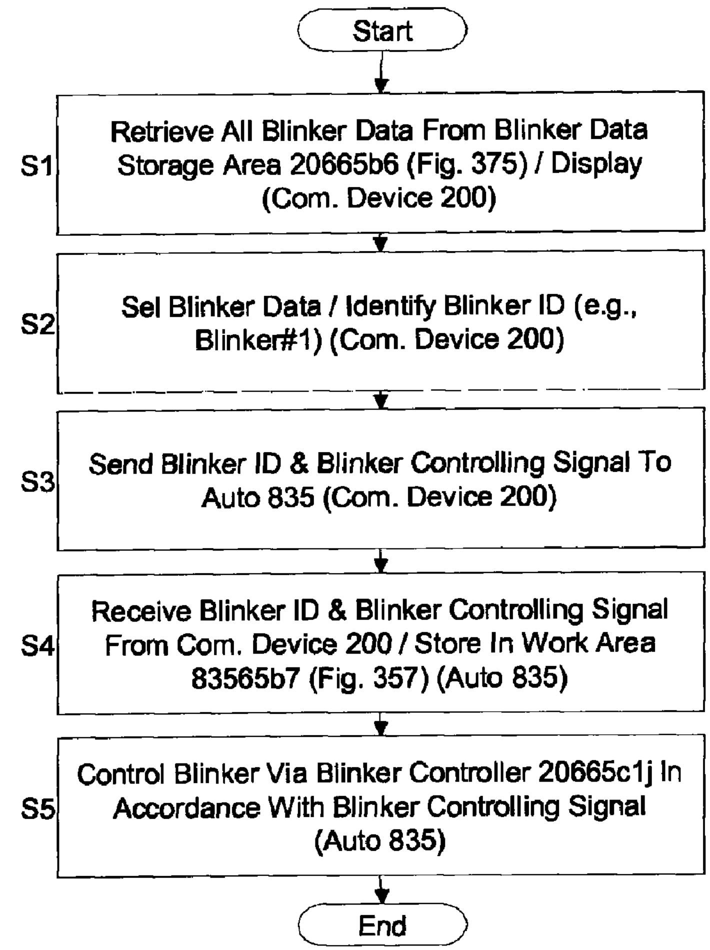

FIG. 389 is a flowchart illustrating an exemplary embodiment of the present invention.

Figure 390:
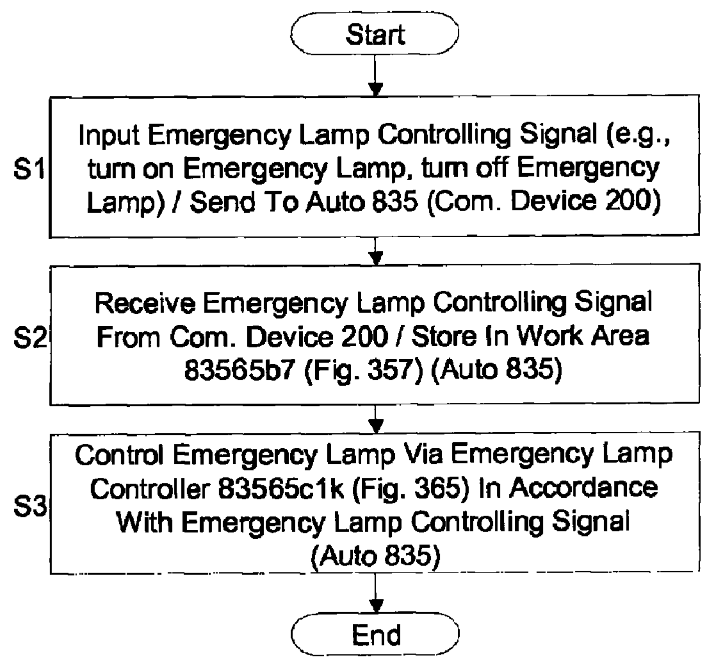

FIG. 390 is a flowchart illustrating an exemplary embodiment of the present invention.

Figure 391:
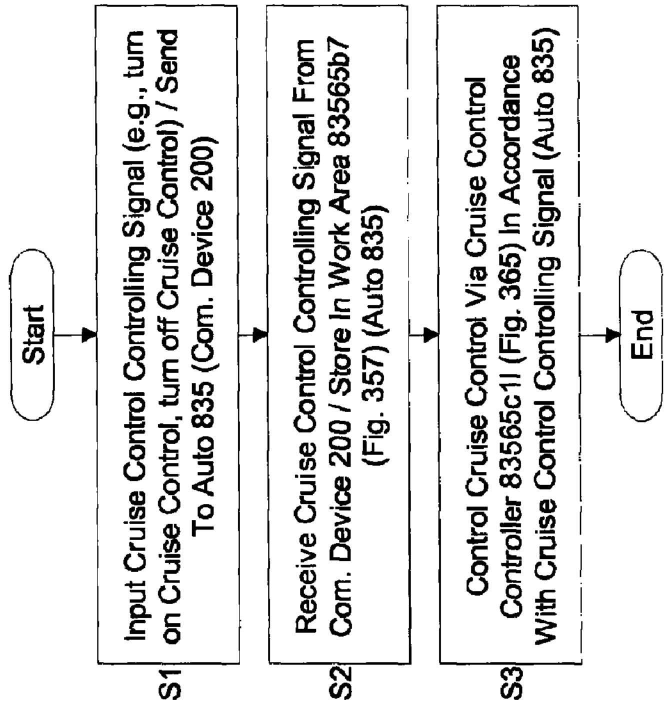

FIG. 391 is a flowchart illustrating an exemplary embodiment of the present invention.

Figure 392:
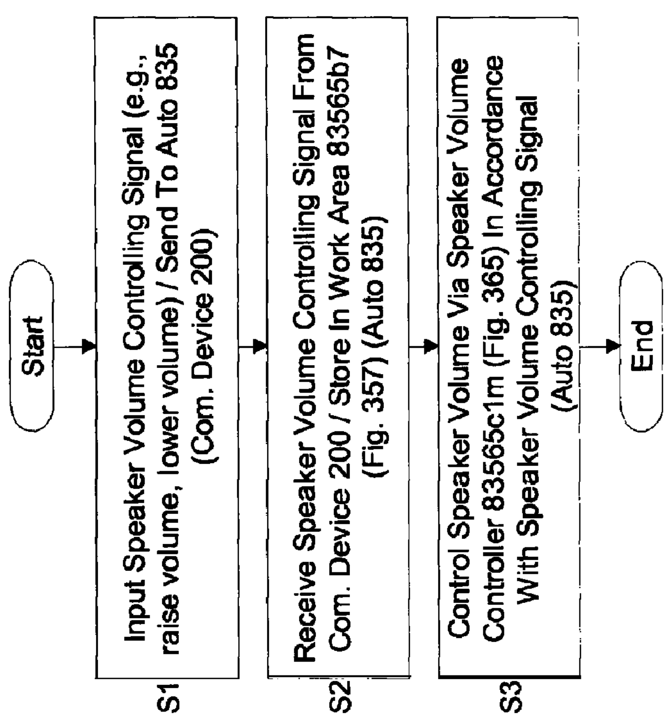

FIG. 392 is a flowchart illustrating an exemplary embodiment of the present invention.

Figure 393:
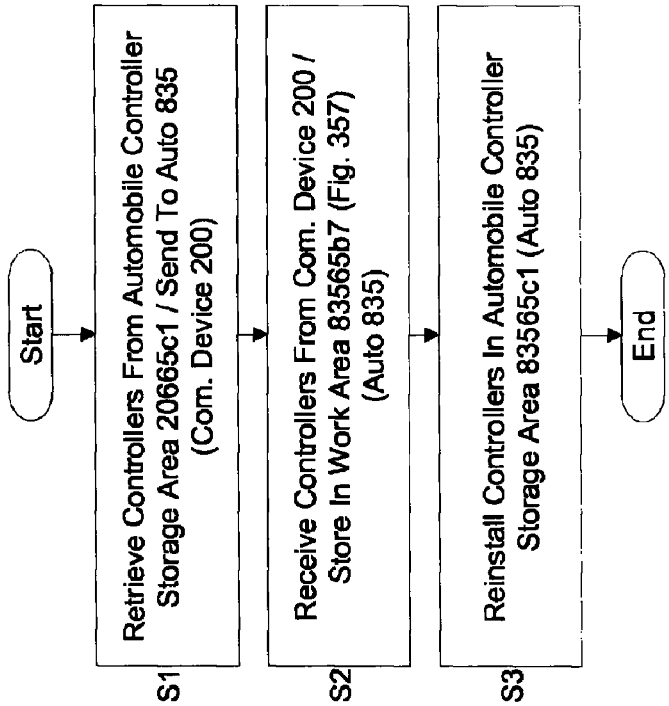

FIG. 393 is a flowchart illustrating an exemplary embodiment of the present invention.

Figure 394:
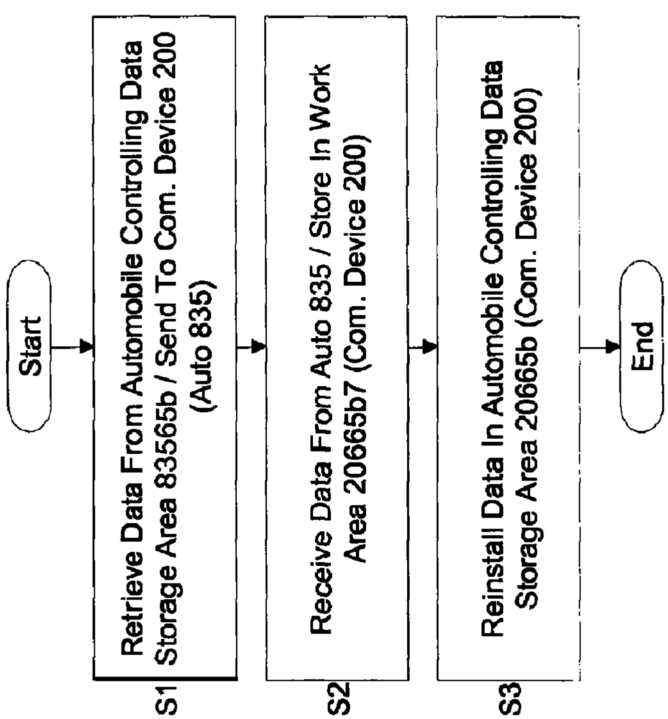

FIG. 394 is a flowchart illustrating an exemplary embodiment of the present invention.

Figure 395:
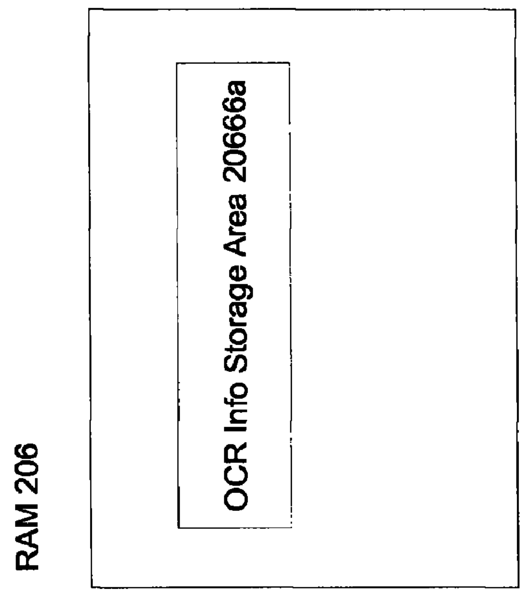

FIG. 395 is a block diagram illustrating an exemplary embodiment of the present invention.

Figure 396:
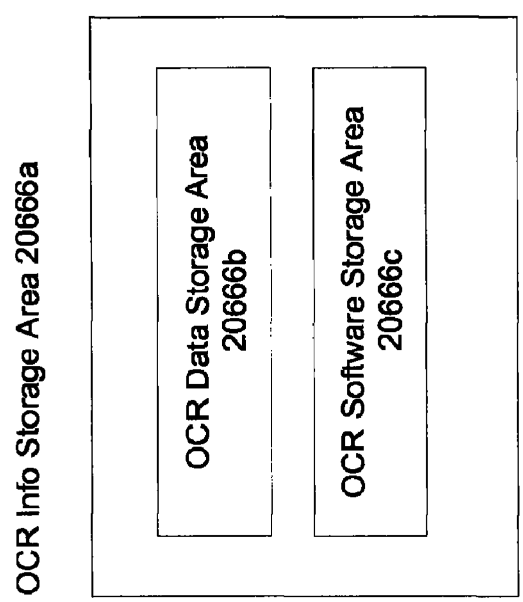

FIG. 396 is a block diagram illustrating an exemplary embodiment of the present invention.

Figures 397, 398:
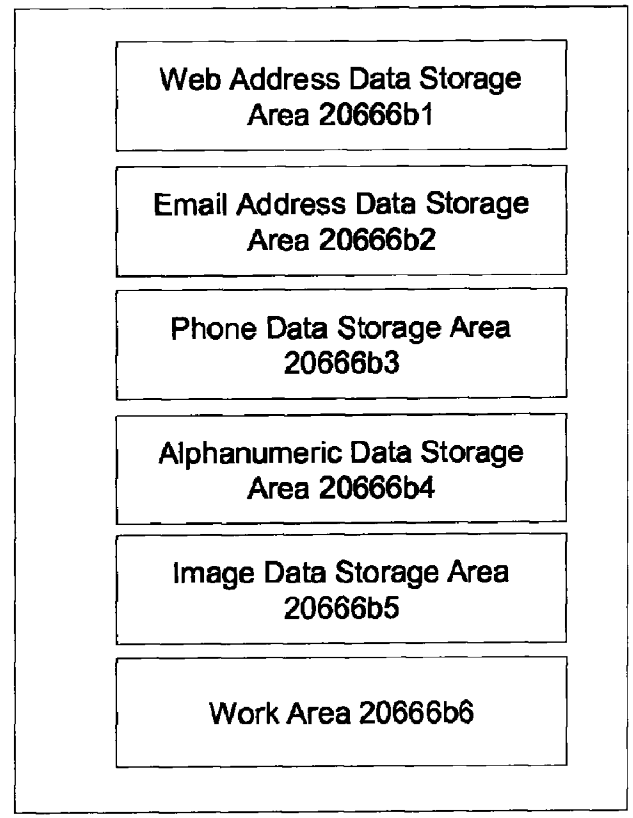

FIG. 397 is a block diagram illustrating an exemplary embodiment of the present invention.

FIG. 398 is a block diagram illustrating an exemplary embodiment of the present invention.

FIG. 399 is a block diagram illustrating an exemplary embodiment of the present invention.

FIG. 400 is a block diagram illustrating an exemplary embodiment of the present invention.

FIG. 401 is a block diagram illustrating an exemplary embodiment of the present invention.

FIG. 402 is a block diagram illustrating an exemplary embodiment of the present invention.

FIG. 403 is a block diagram illustrating an exemplary embodiment of the present invention.

FIG. 404 is a block diagram illustrating an exemplary embodiment of the present invention.

Figure 405:
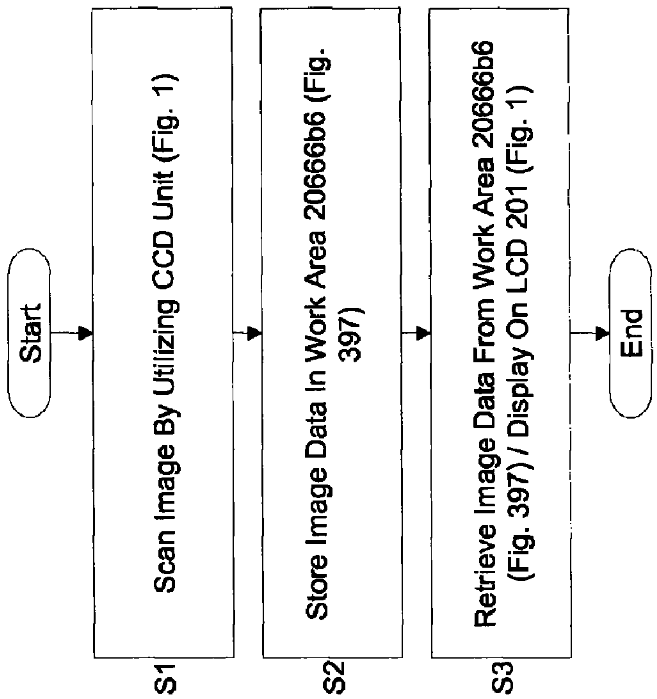

FIG. 405 is a flowchart illustrating an exemplary embodiment of the present invention.

Figure 406:
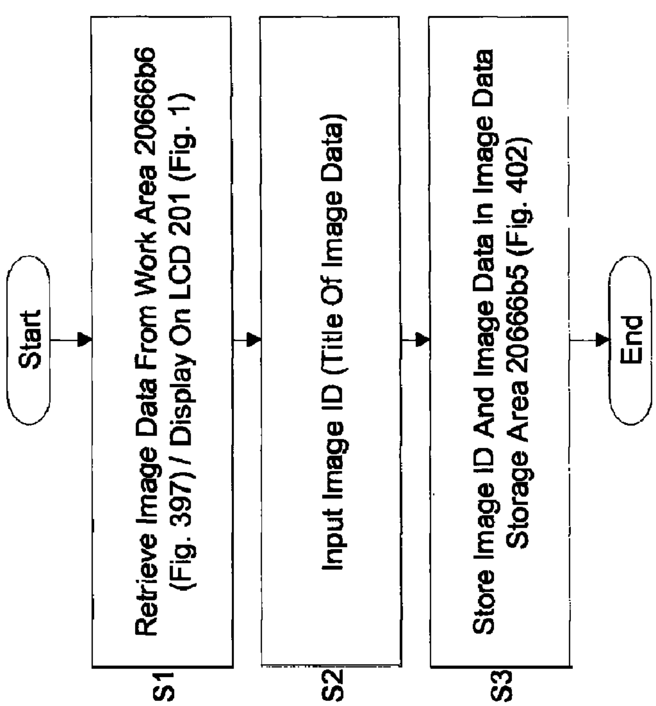

FIG. 406 is a flowchart illustrating an exemplary embodiment of the present invention.

Figure 407:
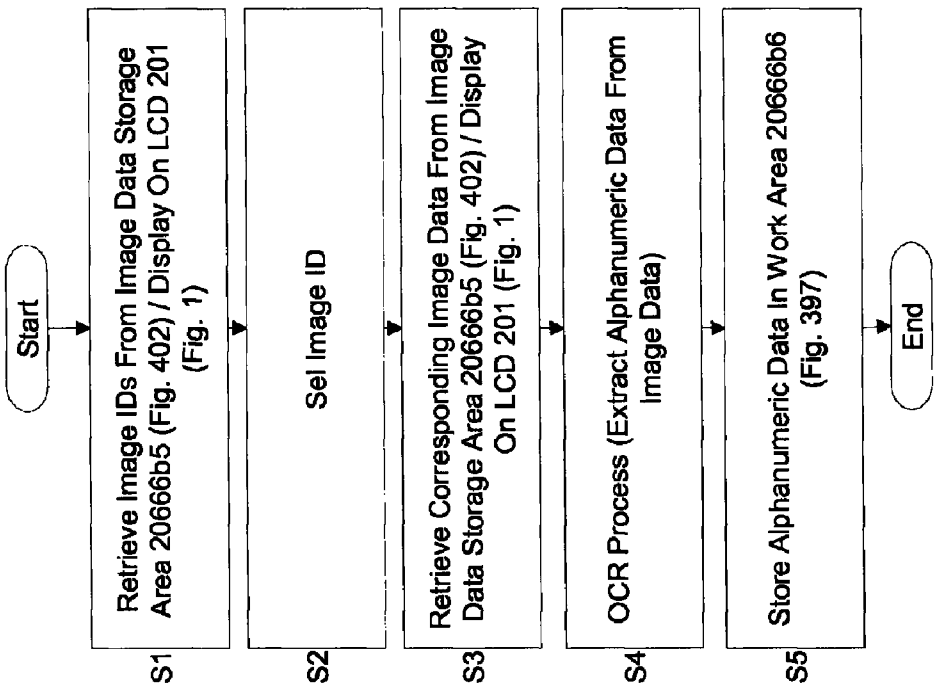

FIG. 407 is a flowchart illustrating an exemplary embodiment of the present invention.

Figure 408:
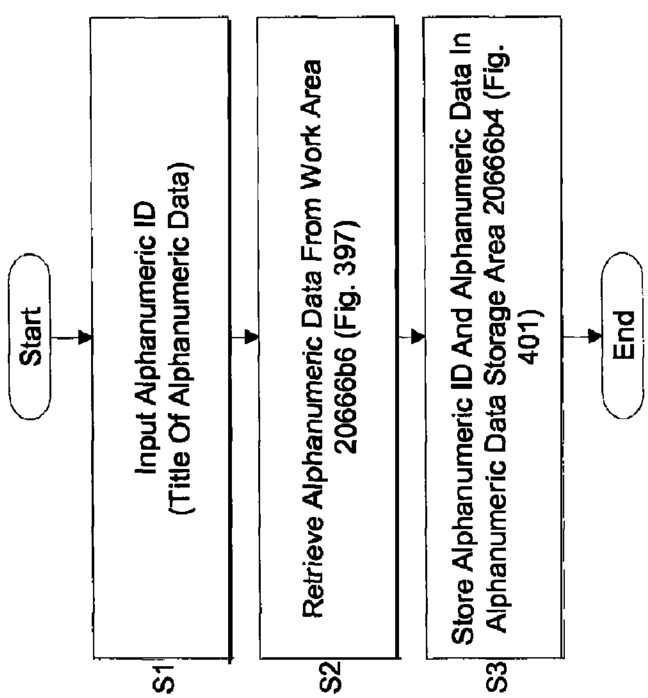

FIG. 408 is a flowchart illustrating an exemplary embodiment of the present invention.

Figure 409:
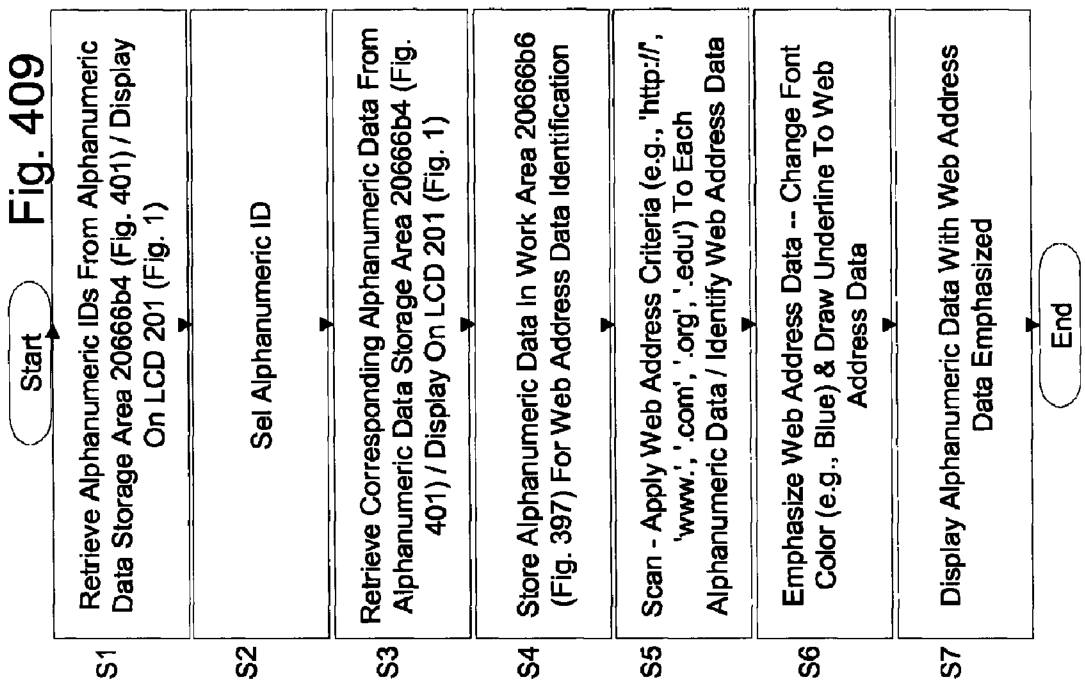

FIG. 409 is a flowchart illustrating an exemplary embodiment of the present invention.

Figure 410:
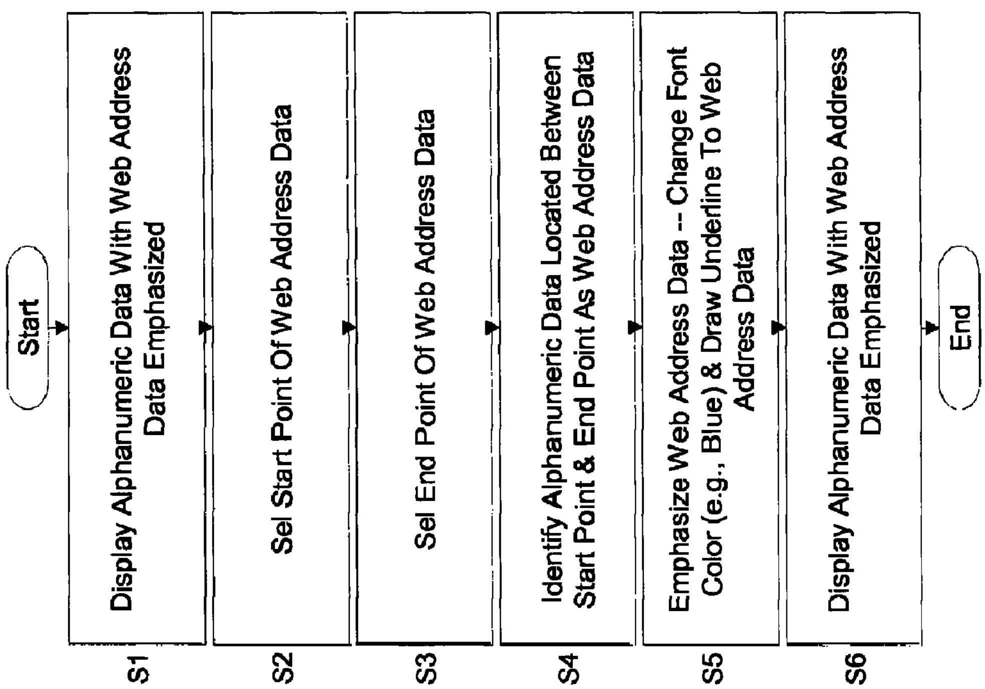

FIG. 410 is a flowchart illustrating an exemplary embodiment of the present invention.

Figure 411:
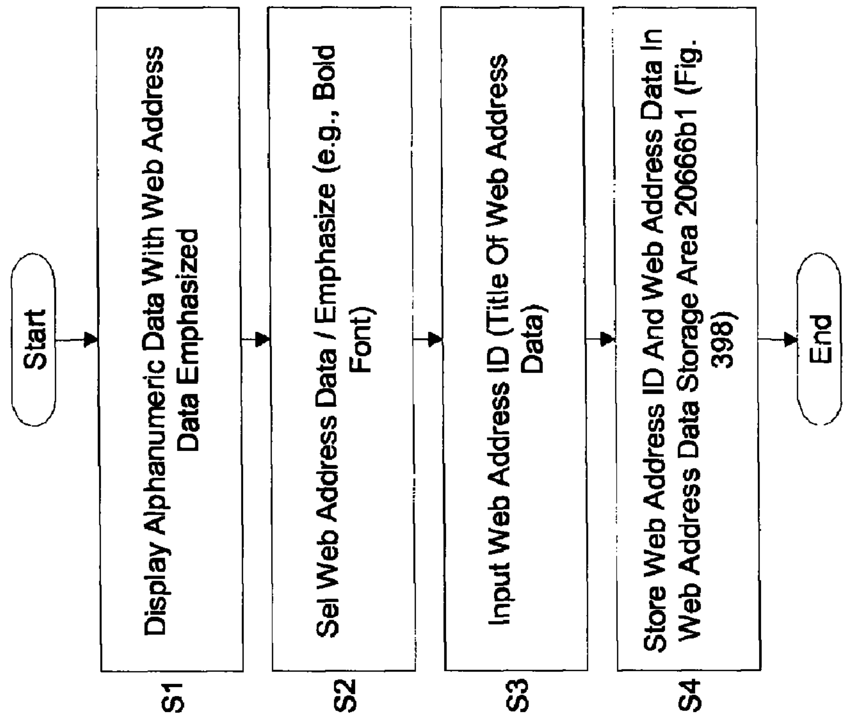

FIG. 411 is a flowchart illustrating an exemplary embodiment of the present invention.

Figure 412:
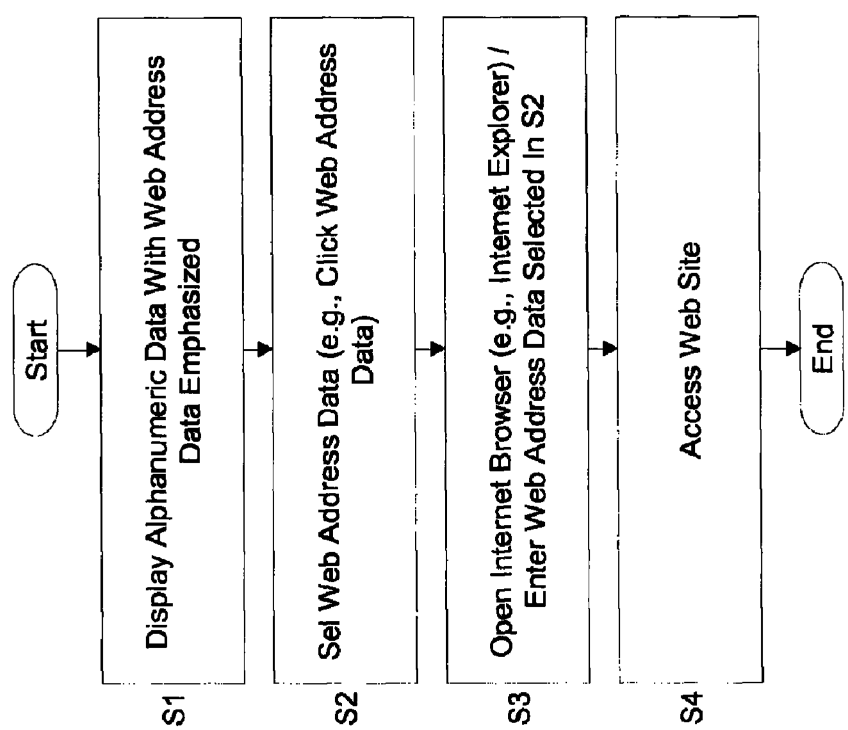

FIG. 412 is a flowchart illustrating an exemplary embodiment of the present invention.

Figure 413:
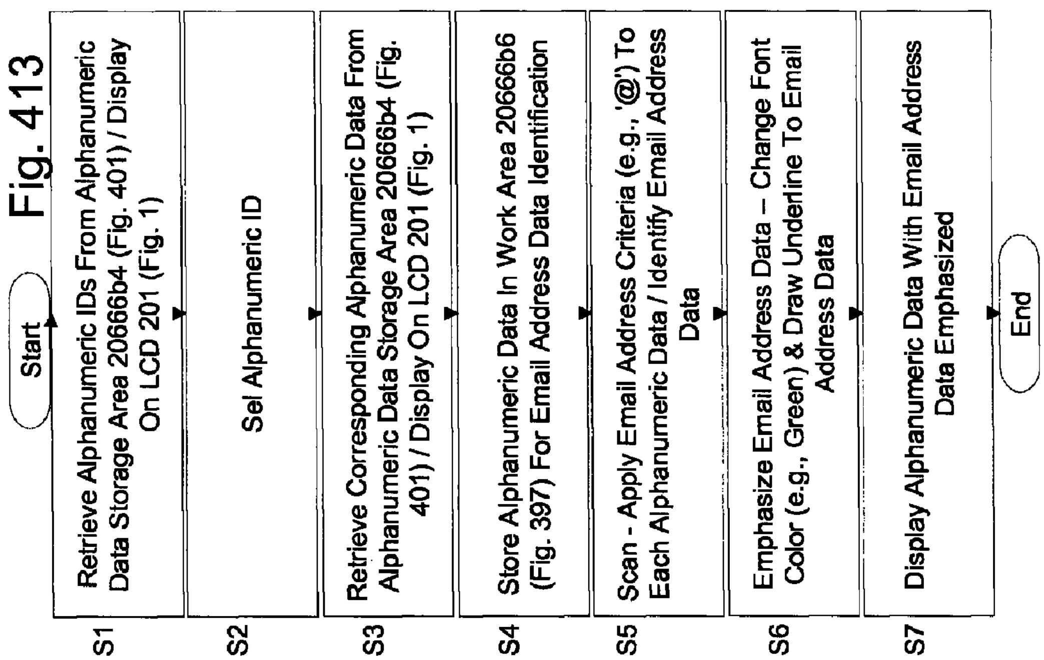

FIG. 413 is a flowchart illustrating an exemplary embodiment of the present invention.

Figure 414:
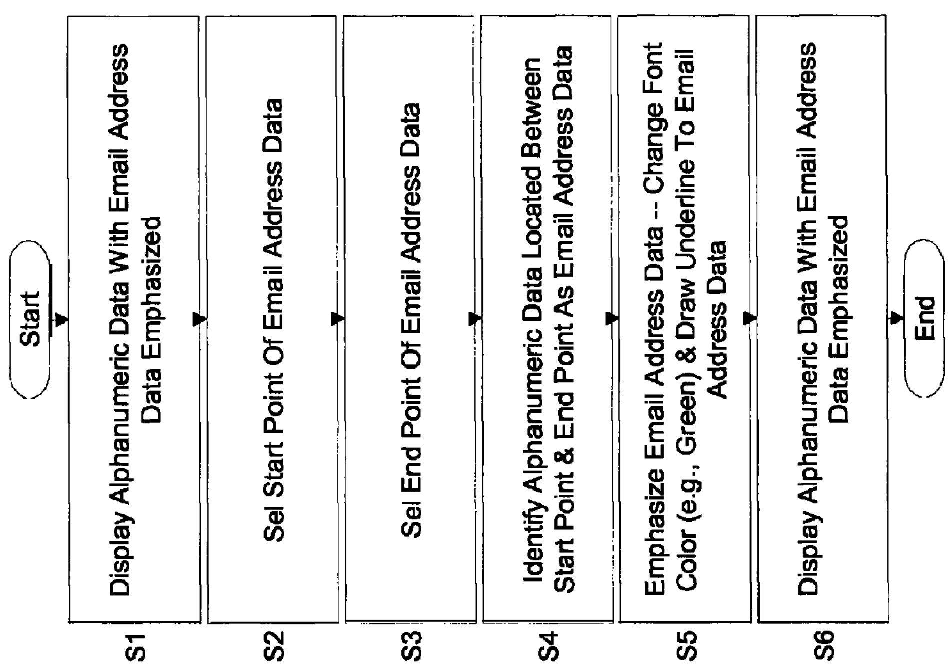

FIG. 414 is a flowchart illustrating an exemplary embodiment of the present invention.

Figure 415:
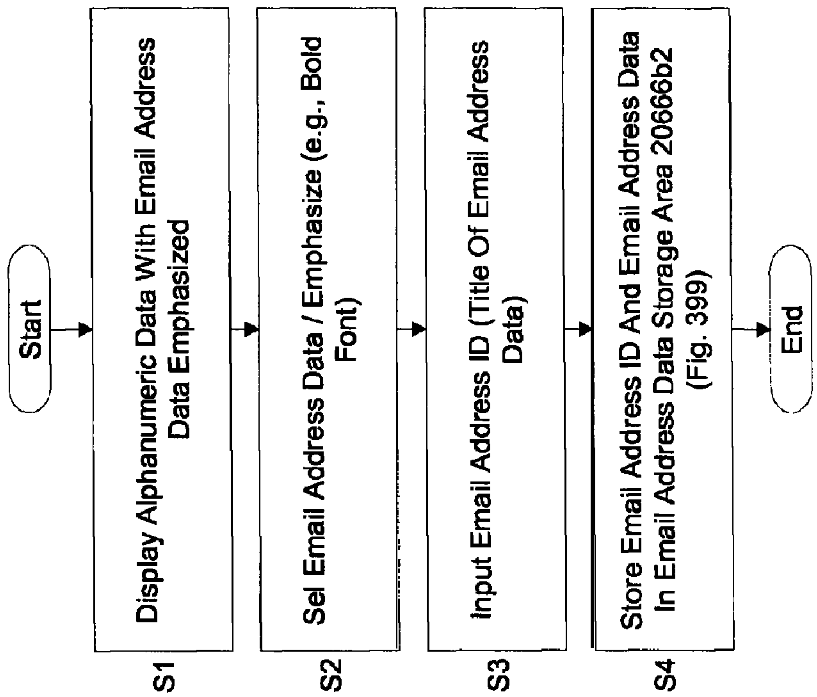

FIG. 415 is a flowchart illustrating an exemplary embodiment of the present invention.

Figure 416:
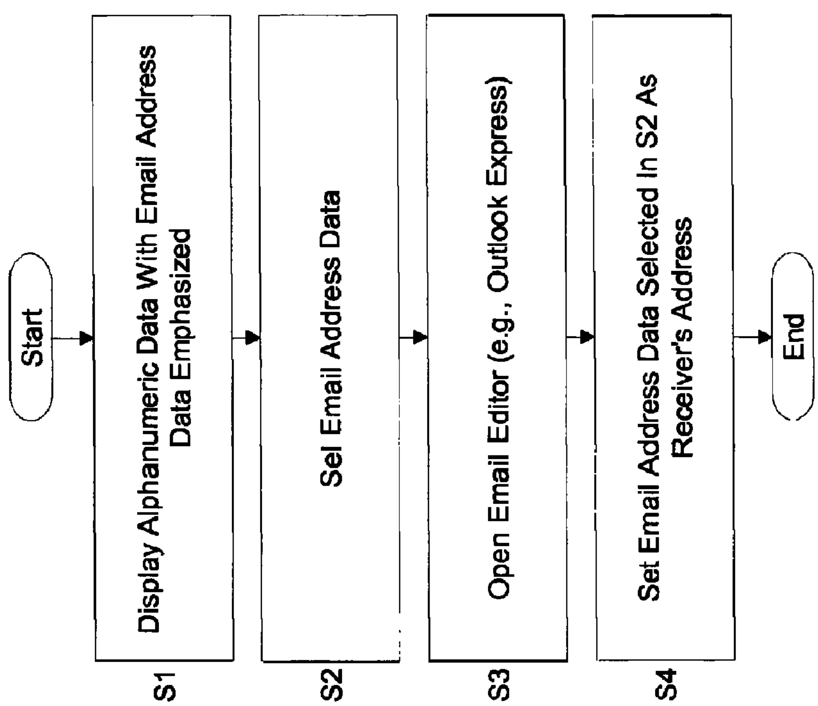

FIG. 416 is a flowchart illustrating an exemplary embodiment of the present invention.

Figure 417:
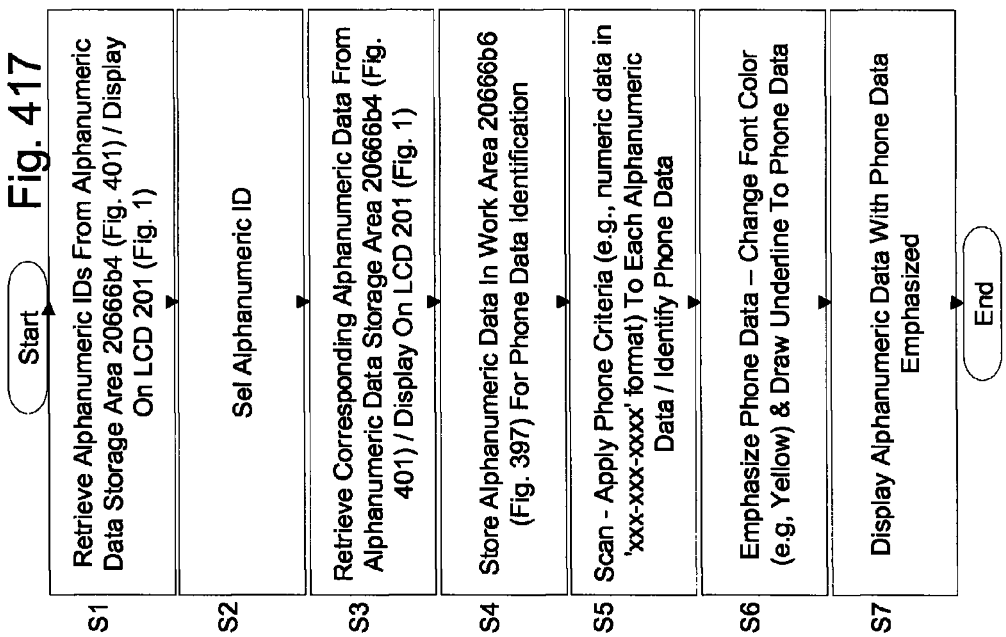

FIG. 417 is a flowchart illustrating an exemplary embodiment of the present invention.

Figure 418:
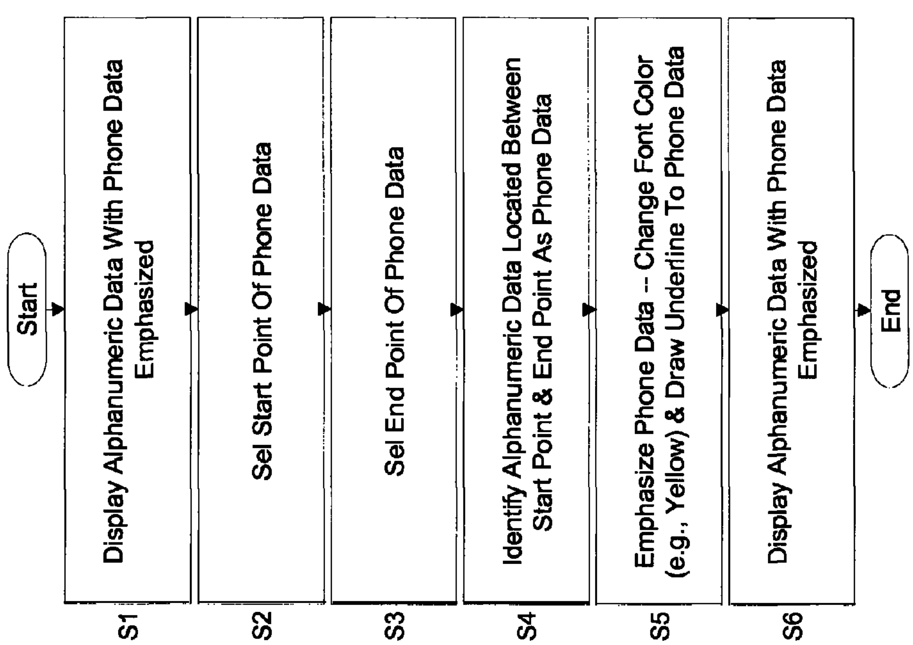

FIG. 418 is a flowchart illustrating an exemplary embodiment of the present invention.

Figure 419:
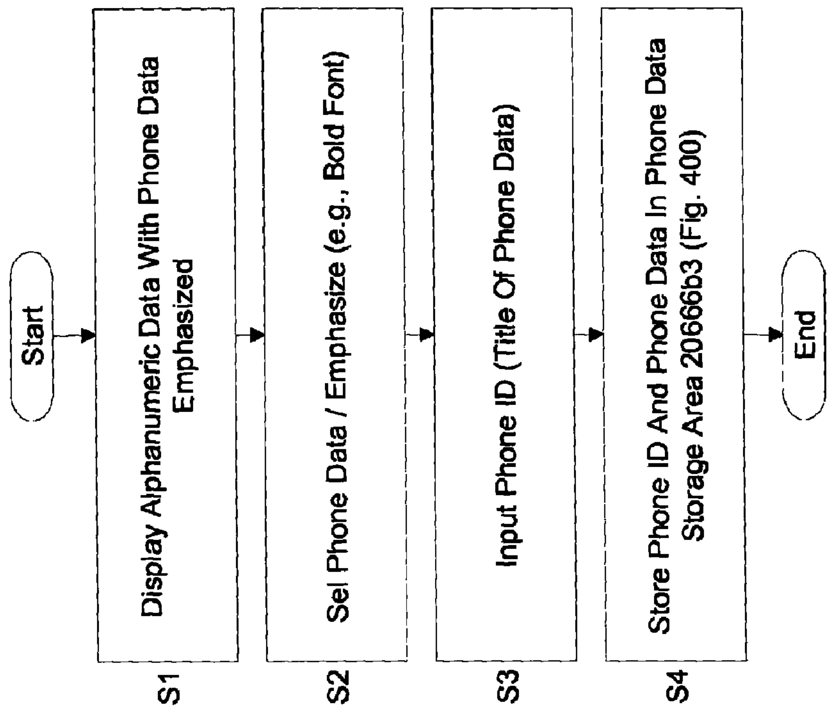

FIG. 419 is a flowchart illustrating an exemplary embodiment of the present invention.

Figure 420:
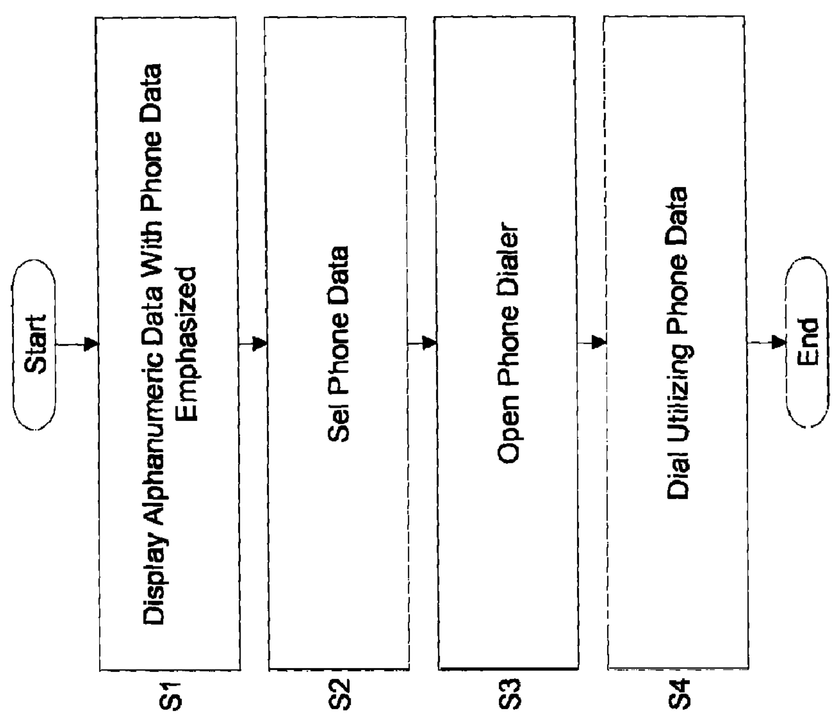

FIG. 420 is a flowchart illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the figure number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

<<Voice Communication Mode>>

Figure 1:
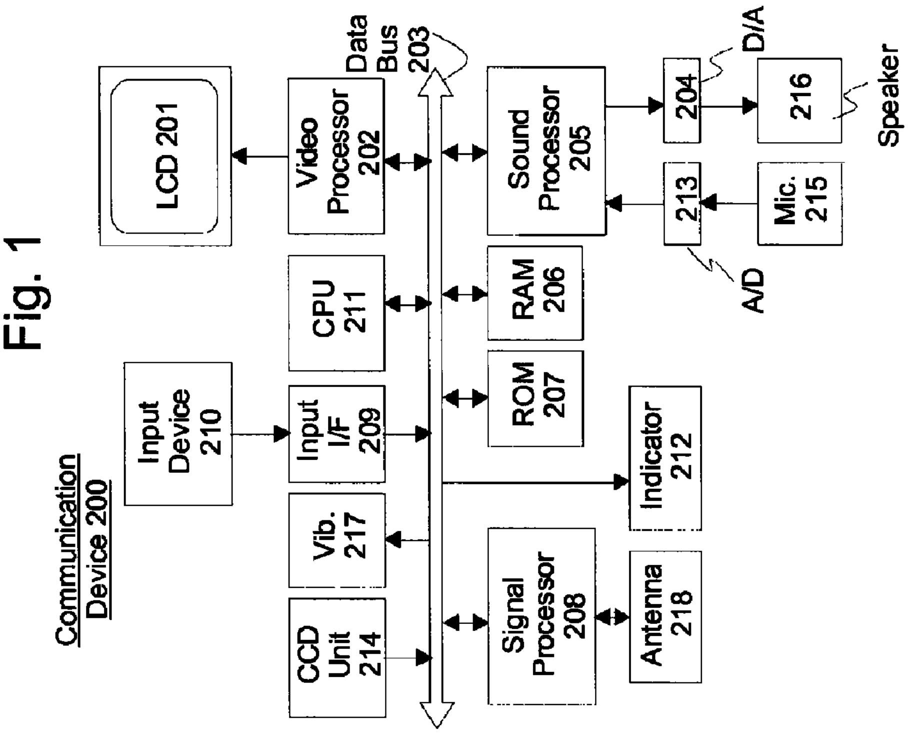
FIG. 1 is a block diagram illustrating an exemplary embodiment of the present invention.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable as described in the following patents: U.S. Pat. No. 6,496,161; U.S. Pat. No. 6,487,021; U.S. Pat. No. 6,462,882; U.S. Pat. No. 6,452,572; U.S. Pat. No. 6,448,944; U.S. Pat. No. 6,445,364; U.S. Pat. No. 6,445,363; U.S. Pat. No. 6,424,321; U.S. Pat. No. 6,421,183; U.S. Pat. No. 6,417,820; U.S. Pat. No. 6,388,814; U.S. Pat. No. 6,388,640; U.S. Pat. No. 6,369,952; U.S. Pat. No. 6,359,603; U.S. Pat. No. 6,359,602; U.S. Pat. No. 6,356,392; U.S. Pat. No. 6,353,503; U.S. Pat. No. 6,349,001; U.S. Pat. No. 6,329,965; U.S. Pat. No. 6,304,303; U.S. Pat. No. 6,271,808; U.S. Pat. No. 6,246,383; U.S. Pat. No. 6,239,771; U.S. Pat. No. 6,232,934; U.S. Pat. No. 6,222,675; U.S. Pat. No. 6,219,186; U.S. Pat. No. 6,204,974; U.S. Pat. No. 6,181,304; U.S. Pat. No. 6,160,666; U.S. Pat. No. 6,157,291; U.S. Pat. No. 6,147,807; U.S. Pat. No. 6,147,805; U.S. Pat. No. 6,140,980; U.S. Pat. No. 6,127,990; U.S. Pat. No. 6,124,837; U.S. Pat. No. 6,115,007; U.S. Pat. No. 6,097,543; U.S. Pat. No. 6,094,309; U.S. Pat. No. 6,094,242; U.S. Pat. No. 6,091,546; U.S. Pat. No. 6,084,556; U.S. Pat. No. 6,072,445; U.S. Pat. No. 6,055,110; U.S. Pat. No. 6,055,109; U.S. Pat. No. 6,050,717; U.S. Pat. No. 6,040,945; U.S. Pat. No. 6,034,653; U.S. Pat. No. 6,023,372; U.S. Pat. No. 6,011,653; U.S. Pat. No. 5,995,071; U.S. Pat. No. 5,991,085; U.S. Pat. No. 5,982,343; U.S. Pat. No. 5,971,538; U.S. Pat. No. 5,966,242; U.S. Pat. No. 5,959,780; U.S. Pat. No. 5,954,642; U.S. Pat. No. 5,949,583; U.S. Pat. No. 5,943,171; U.S. Pat. No. 5,923,476; U.S. Pat. No. 5,903,396; U.S. Pat. No. 5,903,395; U.S. Pat. No. 5,900,849; U.S. Pat. No. 5,880,773; U.S. Pat. No. 5,864,326; U.S. Pat. No. 5,844,656; U.S. Pat. No. 5,844,530; U.S. Pat. No. 5,838,490; U.S. Pat. No. 5,835,279; U.S. Pat. No. 5,822,127; U.S. Pat. No. 5,808,802; U.S. Pat. No. 5,808,801; U.S. Pat. No. 5,774,096; U.S. Pat. No. 5,767,820; U.S. Pat. No. 5,757,339; U.S. Pat. No. 5,751,493; U.S. Pat. No. 5,742,264; U.S. Pat. No. 5,739,955; U.S. Pat. No. 5,739,797; U.S. Pat. No. 5,708,449; U.S. Pat. No. 5,673,059; U.S. Pat. No. 5,670,970; U.S. Pat. No. 5,642,221; U.S. Pat. No. 5,619,377; U.S. Pat. No. 5,619,373; U.S. Pat. No. 5,606,458; U.S. Pat. No. 5,572,229; U.S. Pat. No. 5,546,099; U.S. Pat. No. 5,543,816; U.S. Pat. No. 5,539,422; U.S. Pat. No. 5,537,253; U.S. Pat. No. 5,526,184; U.S. Pat. No. 5,486,841; U.S. Pat. No. 5,483,307; U.S. Pat. No. 5,341,242; U.S. Pat. No. 5,281,957; and U.S. Pat. No. 5,003,300.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

Figure 2:
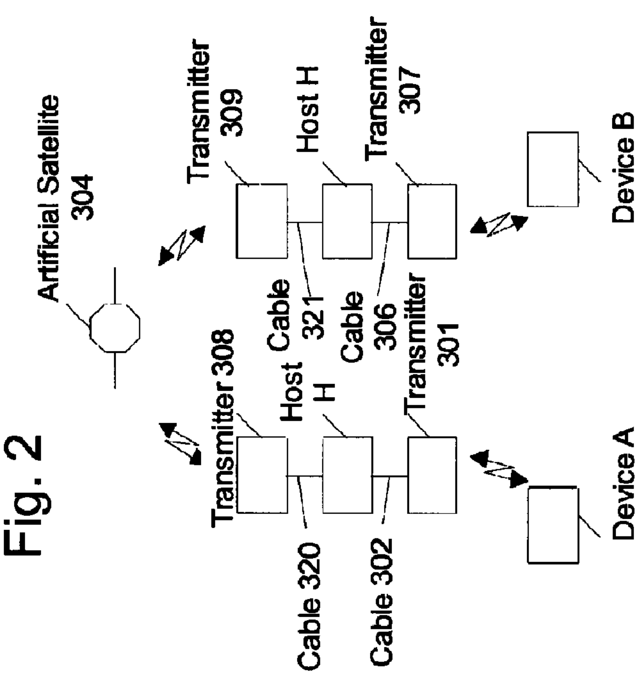
FIG. 2 is a simplified illustration illustrating an exemplary embodiment of the present invention.

FIG. 2 illustrates one of the preferred methods of the communication between two Communication Device 200. In FIG. 2, both Device A and Device B represents Communication Device 200 in FIG. 1. Device A transfers wireless data to Transmitter 301 which Relays the data to Host H via Cable 302. The data is transferred to Transmitter 308 (e.g., a satellite dish) via Cable 320 and then to Artificial Satellite 304. Artificial Satellite 304 transfers the data to Transmitter 309 which transfers the data to Host H via Cable 321. The data is then transferred to Transmitter 307 via Cable 306 and to Device B in a wireless fashion. Device B transfers wireless data to Device A in the same manner.

Figure 3:
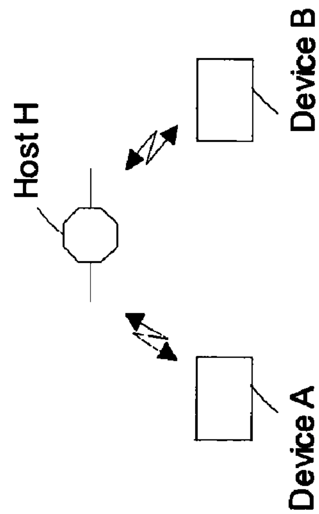
FIG. 3 is a simplified illustration illustrating an exemplary embodiment of the present invention.

FIG. 3 illustrates another preferred method of the communication between two Communication Devices 200. In this example, Device A directly transfers the wireless data to Host H, an artificial satellite, which transfers the data directly to Device B. Device B transfers wireless data to Device A in the same manner.

Figure 4:
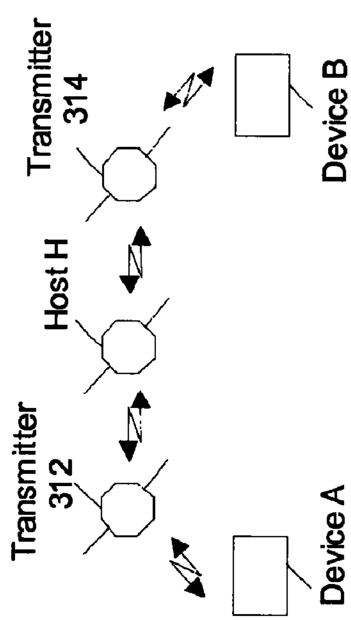
FIG. 4 is a simplified illustration illustrating an exemplary embodiment of the present invention.

FIG. 4 illustrates another preferred method of the communication between two Communication Devices 200. In this example, Device A transfers wireless data to Transmitter 312, an artificial satellite, which Relays the data to Host H, which is also an artificial satellite, in a wireless fashion. The data is transferred to Transmitter 314, an artificial satellite, which Relays the data to Device B in a wireless fashion. Device B transfers wireless data to Device A in the same manner.

<<Voice Recognition System>>

Communication Device 200 (FIG. 1) has the function to operate the device by the user's voice or convert the user's voice into a text format (i.e., the voice recognition). Such function can be enabled by the technologies primarily introduced in the following inventions and the references cited thereof: U.S. Pat. No. 06,282,268; U.S. Pat. No. 06,278,772; U.S. Pat. No. 06,269,335; U.S. Pat. No. 06,269,334; U.S. Pat. No. 06,260,015; U.S. Pat. No. 06,260,014; U.S. Pat. No. 06,253,177; U.S. Pat. No. 06,253,175; U.S. Pat. No. 06,249,763; U.S. Pat. No. 06,246,990; U.S. Pat. No. 06,233,560; U.S. Pat. No. 06,219,640; U.S. Pat. No. 06,219,407; U.S. Pat. No. 06,199,043; U.S. Pat. No. 06,199,041; U.S. Pat. No. 06,195,641; U.S. Pat. No. 06,192,343; U.S. Pat. No. 06,192,337; U.S. Pat. No. 06,188,976; U.S. Pat. No. 06,185,530; U.S. Pat. No. 06,185,529; U.S. Pat. No. 06,185,527; U.S. Pat. No. 06,182,037; U.S. Pat. No. 06,178,401; U.S. Pat. No. 06,175,820; U.S. Pat. No. 06,163,767; U.S. Pat. No. 06,157,910; U.S. Pat. No. 06,119,086; U.S. Pat. No. 06,119,085; U.S. Pat. No. 06,101,472; U.S. Pat. No. 06,100,882; U.S. Pat. No. 06,092,039; U.S. Pat. No. 06,088,669; U.S. Pat. No. 06,078,807; U.S. Pat. No. 06,075,534; U.S. Pat. No. 06,073,101; U.S. Pat. No. 06,073,096; U.S. Pat. No. 06,073,091; U.S. Pat. No. 06,067,517; U.S. Pat. No. 06,067,514; U.S. Pat. No. 06,061,646; U.S. Pat. No. 06,044,344; U.S. Pat. No. 06,041,300; U.S. Pat. No. 06,035,271; U.S. Pat. No. 06,006,183; U.S. Pat. No. 05,995,934; U.S. Pat. No. 05,974,383; U.S. Pat. No. 05,970,239; U.S. Pat. No. 05,963,905; U.S. Pat. No. 05,956,671; U.S. Pat. No. 05,953,701; U.S. Pat. No. 05,953,700; U.S. Pat. No. 05,937,385; U.S. Pat. No. 05,937,383; U.S. Pat. No. 05,933,475; U.S. Pat. No. 05,930,749; U.S. Pat. No. 05,909,667; U.S. Pat. No. 05,899,973; U.S. Pat. No. 05,895,447; U.S. Pat. No. 05,884,263; U.S. Pat. No. 05,878,117; U.S. Pat. No. 05,864,819; U.S. Pat. No. 05,848,163; U.S. Pat. No. 05,819,225; U.S. Pat. No. 05,805,832; U.S. Pat. No. 05,802,251; U.S. Pat. No. 05,799,278; U.S. Pat. No. 05,797,122; U.S. Pat. No. 05,787,394; U.S. Pat. No. 05,768,603; U.S. Pat. No. 05,751,905; U.S. Pat. No. 05,729,656; U.S. Pat. No. 05,704,009; U.S. Pat. No. 05,671,328; U.S. Pat. No. 05,649,060; U.S. Pat. No. 05,615,299; U.S. Pat. No. 05,615,296; U.S. Pat. No. 05,544,277; U.S. Pat. No. 05,524,169; U.S. Pat. No. 05,522,011; U.S. Pat. No. 05,513,298; U.S. Pat. No. 05,502,791; U.S. Pat. No. 05,497,447; U.S. Pat. No. 05,477,451; U.S. Pat. No. 05,475,792; U.S. Pat. No. 05,465,317; U.S. Pat. No. 05,455,889; U.S. Pat. No. 05,440,663; U.S. Pat. No. 05,425,129; U.S. Pat. No. 05,353,377; U.S. Pat. No. 05,333,236; U.S. Pat. No. 05,313,531; U.S. Pat. No. 05,293,584; U.S. Pat. No. 05,293,451; U.S. Pat. No. 05,280,562; U.S. Pat. No. 05,278,942; U.S. Pat. No. 05,276,766; U.S. Pat. No. 05,267,345; U.S. Pat. No. 05,233,681; U.S. Pat. No. 05,222,146; U.S. Pat. No. 05,195,167; U.S. Pat. No. 05,182,773; U.S. Pat. No. 05,165,007; U.S. Pat. No. 05,129,001; U.S. Pat. No. 05,072,452; U.S. Pat. No. 05,067,166; U.S. Pat. No. 05,054,074; U.S. Pat. No. 05,050,215; U.S. Pat. No. 05,046,099; U.S. Pat. No. 05,033,087; U.S. Pat. No. 05,031,217; U.S. Pat. No. 05,018,201; U.S. Pat. No. 04,980,918; U.S. Pat. No. 04,977,599; U.S. Pat. No. 04,926,488; U.S. Pat. No. 04,914,704; U.S. Pat. No. 04,882,759; U.S. Pat. No. 04,876,720; U.S. Pat. No. 04,852,173; U.S. Pat. No. 04,833,712; U.S. Pat. No. 04,829,577; U.S. Pat. No. 04,827,521; U.S. Pat. No. 04,759,068; U.S. Pat. No. 04,748,670; U.S. Pat. No. 04,741,036; U.S. Pat. No. 04,718,094; U.S. Pat. No. 04,618,984; U.S. Pat. No. 04,348,553; U.S. Pat. No. 06,289,140; U.S. Pat. No. 06,275,803; U.S. Pat. No. 06,275,801; U.S. Pat. No. 06,272,146; U.S. Pat. No. 06,266,637; U.S. Pat. No. 06,266,571; U.S. Pat. No. 06,223,153; U.S. Pat. No. 06,219,638; U.S. Pat. No. 06,163,535; U.S. Pat. No. 06,115,820; U.S. Pat. No. 06,107,935; U.S. Pat. No. 06,092,034; U.S. Pat. No. 06,088,361; U.S. Pat. No. 06,073,103; U.S. Pat. No. 06,073,095; U.S. Pat. No. 06,067,084; U.S. Pat. No. 06,064,961; U.S. Pat. No. 06,055,306; U.S. Pat. No. 06,047,301; U.S. Pat. No. 06,023,678; U.S. Pat. No. 06,023,673; U.S. Pat. No. 06,009,392; U.S. Pat. No. 05,995,933; U.S. Pat. No. 05,995,931; U.S. Pat. No. 05,995,590; U.S. Pat. No. 05,991,723; U.S. Pat. No. 05,987,405; U.S. Pat. No. 05,974,382; U.S. Pat. No. 05,943,649; U.S. Pat. No. 05,916,302; U.S. Pat. No. 05,897,616; U.S. Pat. No. 05,897,614; U.S. Pat. No. 05,893,133; U.S. Pat. No. 05,873,064; U.S. Pat. No. 05,870,616; U.S. Pat. No. 05,864,805; U.S. Pat. No. 05,857,099; U.S. Pat. No. 05,809,471; U.S. Pat. No. 05,805,907; U.S. Pat. No. 05,799,273; U.S. Pat. No. 05,764,852; U.S. Pat. No. 05,715,469; U.S. Pat. No. 05,682,501; U.S. Pat. No. 05,680,509; U.S. Pat. No. 05,668,854; U.S. Pat. No. 05,664,097; U.S. Pat. No. 05,649,070; U.S. Pat. No. 05,640,487; U.S. Pat. No. 05,621,809; U.S. Pat. No. 05,577,249; U.S. Pat. No. 05,502,774; U.S. Pat. No. 05,471,521; U.S. Pat. No. 05,467,425; U.S. Pat. No. 05,444,617; U.S. Pat. No. 04,991,217; U.S. Pat. No. 04,817,158; U.S. Pat. No. 04,725,885; U.S. Pat. No. 04,528,659; U.S. Pat. No. 03,995,254; U.S. Pat. No. 03,969,700; U.S. Pat. No. 03,925,761; U.S. Pat. No. 03,770,892. The voice recognition function can be performed in terms of software by using Area 261, the voice recognition working area, of RAM 206 (FIG. 1) which is specifically allocated to perform such function as described in FIG. 5, or can also be performed in terms of hardware circuit where such space is specifically allocated in Area 282 of Sound Processor 205 (FIG. 1) for the voice recognition system as described in FIG. 6.

Figure 5:
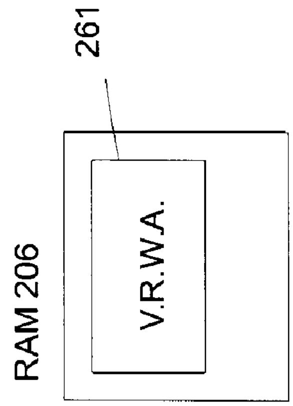
FIG. 5 is a block diagram illustrating an exemplary embodiment of the present invention.
Figure 6:
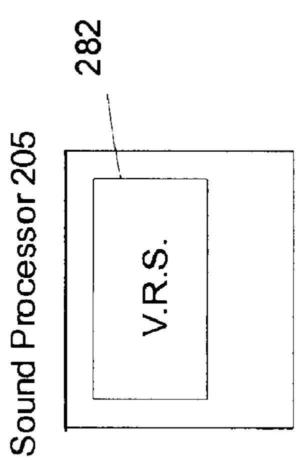
FIG. 6 is a block diagram illustrating an exemplary embodiment of the present invention.
Figure 7:
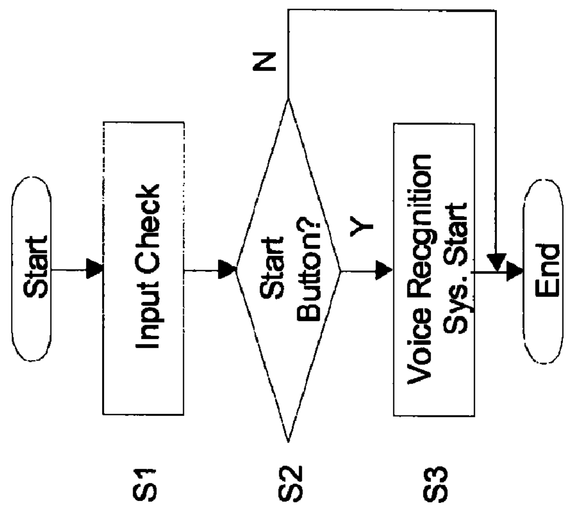
FIG. 7 is a flowchart illustrating an exemplary embodiment of the present invention.

FIG. 7 illustrates how the voice recognition function is activated. CPU 211 (FIG. 1) periodically checks the input status of Input Device 210 (FIG. 1) (S1). If CPU 211 detects a specific signal input from Input Device 210 (S2) the voice recognition system which is described in FIG. 2, FIG. 3, FIG. 4, and/or FIG. 5 is activated. As another embodiment, the voice recognition system can also be activated by entering predetermined phrase, such as 'start voice recognition system' via Microphone 215 (FIG. 1).

<<Voice Recognition—Dialing/Auto-Off During Call Function>>

Figure 8:
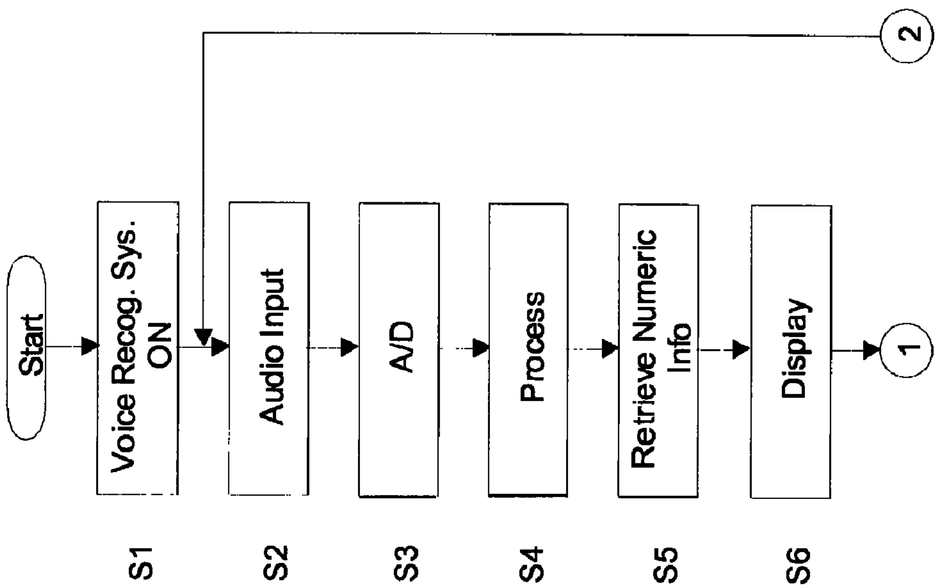
FIG. 8 is a flowchart illustrating an exemplary embodiment of the present invention.
Figure 9:
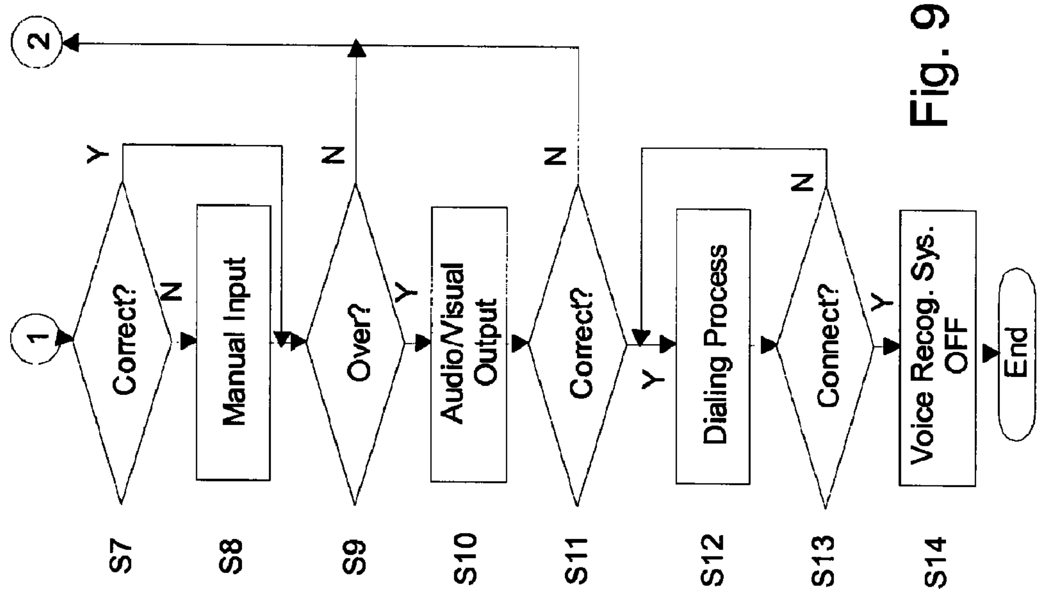
FIG. 9 is a flowchart illustrating an exemplary embodiment of the present invention.

FIG. 8 and FIG. 9 illustrate the operation of the voice recognition in the present invention. Once the voice recognition system is activated (S1) the analog audio data is input from Microphone 215 (FIG. 1) (S2). The analog audio data is converted into digital data by A/D 213 (FIG. 1) (S3). The digital audio data is processed by Sound Processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using Input Device 210 (FIG. 1) (S8). Once the sequence of inputting the numeric information is completed and after the confirmation process is over (S9), the entire numeric information is displayed on LCD 201 and the sound is output from Speaker 216 under control of CPU 211 (S10). If the numeric information is correct (S11), Communication Device 200 (FIG. 1) initiates the dialing process by utilizing the numeric information (S12). The dialing process continues until Communication Device 200 is connected to another device (S13). Once CPU 211 detects that the line is connected it automatically deactivates the voice recognition system (S14).

Figure 10:
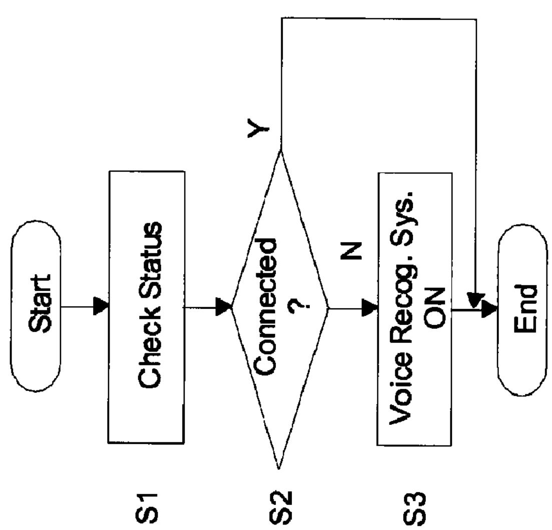
FIG. 10 is a flowchart illustrating an exemplary embodiment of the present invention.

As described in FIG. 10, CPU 211 (FIG. 1) checks the status of Communication Device 200 periodically (S1) and remains the voice recognition system offline during call (S2). If the connection is severed, i.e., user hangs up, then CPU 211 reactivates the voice recognition system (S3).

<<Voice Recognition Tag Function>>

FIG. 11 through FIG. 15 describes the method of inputting the numeric information in a convenient manner.

Figures 13, 14:
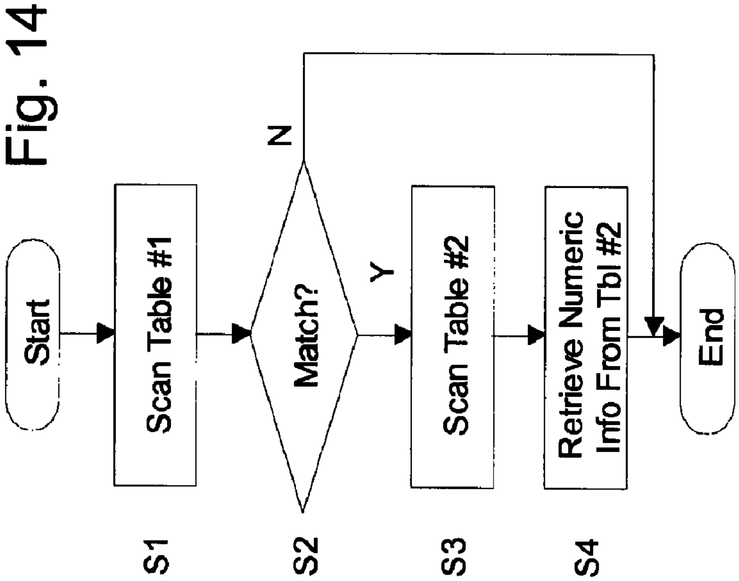
FIG. 13 is a simplified illustration illustrating an exemplary embodiment of the present invention.
FIG. 14 is a flowchart illustrating an exemplary embodiment of the present invention.

As described in FIG. 11, RAM 206 includes Table #1 (FIG. 11) and Table #2 (FIG. 12). In FIG. 11, audio information #1 corresponds to tag 'Scott.' Namely audio information, such as wave data, which represents the sound of 'Scott' (sounds like 'S-ko-t') is registered in Table #1, which corresponds to tag 'Scott'. In the same manner audio information #2 corresponds to tag 'Carol'; audio information #3 corresponds to tag 'Peter'; audio information #4 corresponds to tag 'Amy'; and audio information #5 corresponds to tag 'Brian.' In FIG. 12, tag 'Scott' corresponds to numeric information '(916) 411-2526'; tag 'Carol' corresponds to numeric information '(418) 675-6566'; tag 'Peter' corresponds to numeric information '(220) 890-1567'; tag 'Amy' corresponds to numeric information '(615) 125-3411'; and tag 'Brian' corresponds to numeric information '(042) 645-2097.' FIG. 14 illustrates how CPU 211 (FIG. 1) operates by utilizing both Table #1 and Table #2. Once the audio data is processed as described in S4 of FIG. 8, CPU 211 scans Table #1 (S1). If the retrieved audio data matches with one of the audio information registered in Table #1 (S2), CPU 211 scans Table #2 (S3) and retrieves the corresponding numeric information from Table #2 (S4).

Figure 15:
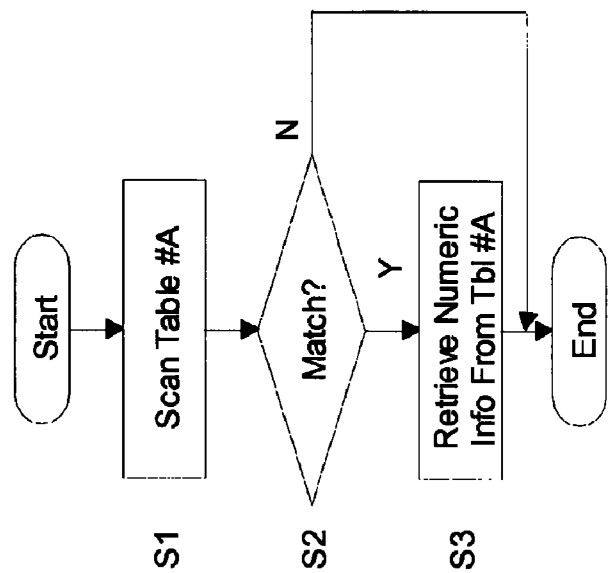
FIG. 15 is a flowchart illustrating an exemplary embodiment of the present invention.

FIG. 13 illustrates another embodiment of the present invention. Here, RAM 206 includes Table #A instead of Table #1 and Table #2 described above. In this embodiment, audio info #1 (i.e., wave data which represents the sound of 'Scot') directly corresponds to numeric information '(916) 411-2526.' In the same manner audio info #2 corresponds to numeric information '(410) 675-6566'; audio info #3 corresponds to numeric information '(220) 890-1567'; audio info #4 corresponds to numeric information '(615) 125-3411'; and audio info #5 corresponds to numeric information '(042) 645-2097.' FIG. 15 illustrates how CPU 211 (FIG. 1) operates by utilizing Table #A. Once the audio data is processed as described in S4 of FIG. 8 and FIG. 9, CPU 211 scans Table #A (S1). If the retrieved audio data matches with one of the audio information registered in Table #A (S2), it retrieves the corresponding numeric information therefrom (S3).

As another embodiment, RAM 206 may contain only Table #2 and tag can be retrieved from the voice recognition system explained in FIG. 5 through FIG. 10. Namely, once the audio data is processed by CPU 211 (FIG. 1) as described in S4 of FIG. 8 and retrieves the text data therefrom and detects one of the tags registered in Table #2 (e.g., 'Scot'), CPU 211 retrieves the corresponding numeric information (e.g., '(916) 411-2526') from the same table.

<<Voice Recognition Noise Filtering Function>>

FIG. 16 through FIG. 19 describes the method of minimizing the undesired effect of the background noise when utilizing the voice recognition system.

Figure 16:
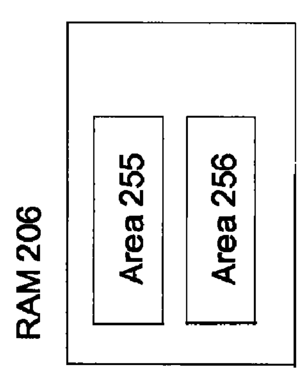
FIG. 16 is a block diagram illustrating an exemplary embodiment of the present invention.

As described in FIG. 16, RAM 206 (FIG. 1) includes Area 255 and Area 256. Sound audio data which represents background noise is stored in Area 255, and sound audio data which represents the beep, ringing sound and other sounds which are emitted from the Communication Device 200 are stored in Area 256.

Figure 17:
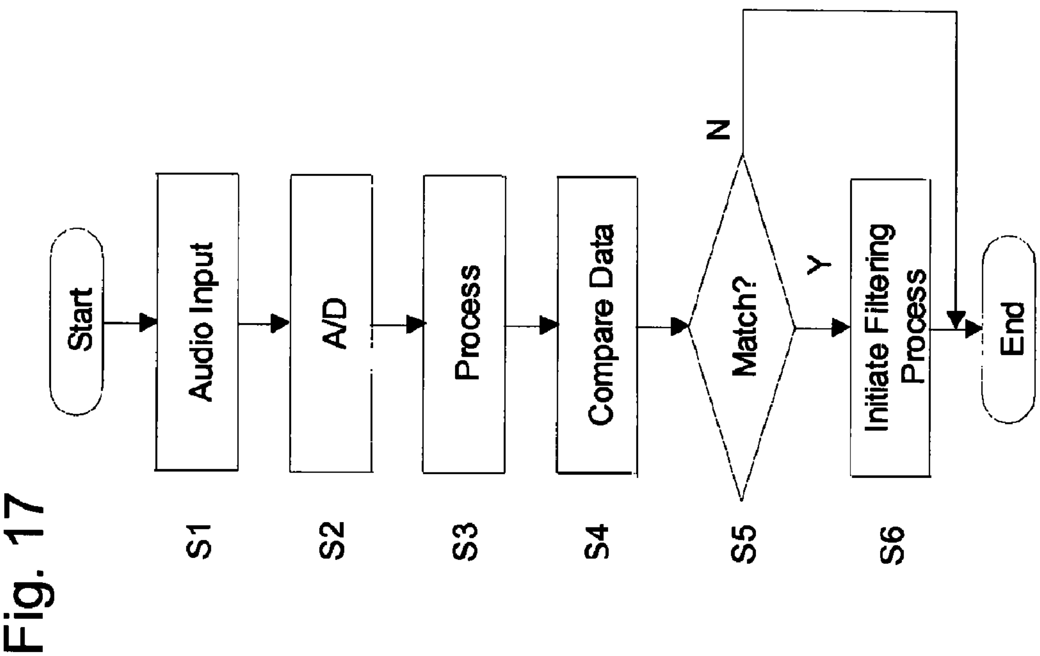
FIG. 17 is a flowchart illustrating an exemplary embodiment of the present invention.

FIG. 17 describes the method to utilize the data stored in Area 255 and Area 256 described in FIG. 16. When the voice recognition system is activated as described in FIG. 7, the analog audio data is input from Microphone 215 (FIG. 1) (S1). The analog audio data is converted into digital data by A/D 213 (FIG. 1) (S2). The digital audio data is processed by Sound Processor 205 (FIG. 1) (S3) and compared to the data stored in Area 255 and Area 256 (S4). Such comparison can be done by either Sound Processor 205 or CPU 211 (FIG. 1). If the digital audio data matches to the data stored in Area 255 and/or Area 256, the filtering process is initiated and the matched portion of the digital audio data is deleted as background noise. Such sequence of process is done before retrieving text and numeric information from the digital audio data.

Figure 18:
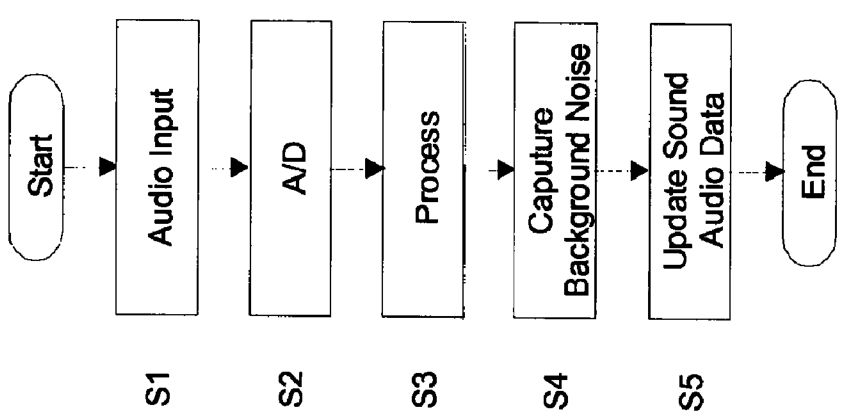
FIG. 18 is a flowchart illustrating an exemplary embodiment of the present invention.

FIG. 18 describes the method of updating Area 255. When the voice recognition system is activated as described in FIG. 7, the analog audio data is input from Microphone 215 (FIG. 1) (S1). The analog audio data is converted into digital data by A/D 213 (FIG. 1) (S2). The digital audio data is processed by Sound Processor 205 (FIG. 1) or CPU 211 (FIG. 1) (S3) and the background noise is captured (S4). CPU 211 (FIG. 1) scans Area 255 and if the captured background noise is not registered in Area 255, it updates the sound audio data stored therein (S5).

Figure 19:
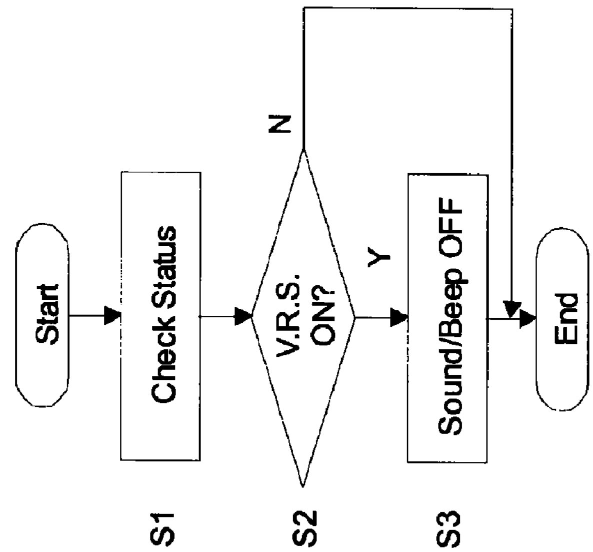
FIG. 19 is a flowchart illustrating an exemplary embodiment of the present invention.

FIG. 19 describes another embodiment of the present invention. CPU 211 (FIG. 1) routinely checks whether the voice recognition system is activated (S1). If the system is activated (S2), the beep, ringing sound, and other sounds which are emitted from Communication Device 200 are automatically turned off in order to minimize the miss recognition process of the voice recognition system (S3).

<<Voice Recognition Auto-Off Function>>

Figure 20:
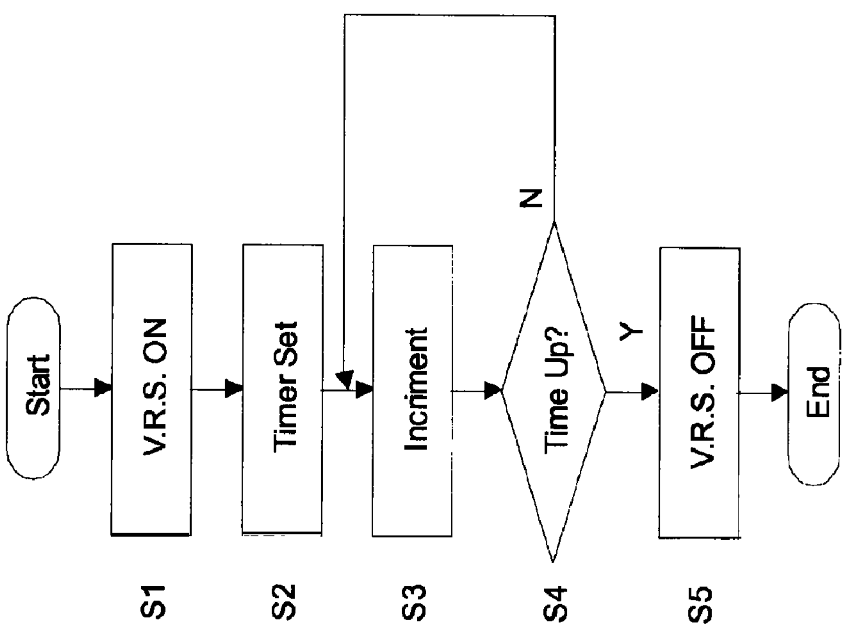
FIG. 20 is a flowchart illustrating an exemplary embodiment of the present invention.

The voice recognition system can be automatically turned off to avoid glitch as described in FIG. 20. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

<<Voice Recognition Email Function (1)>>

Figure 21:
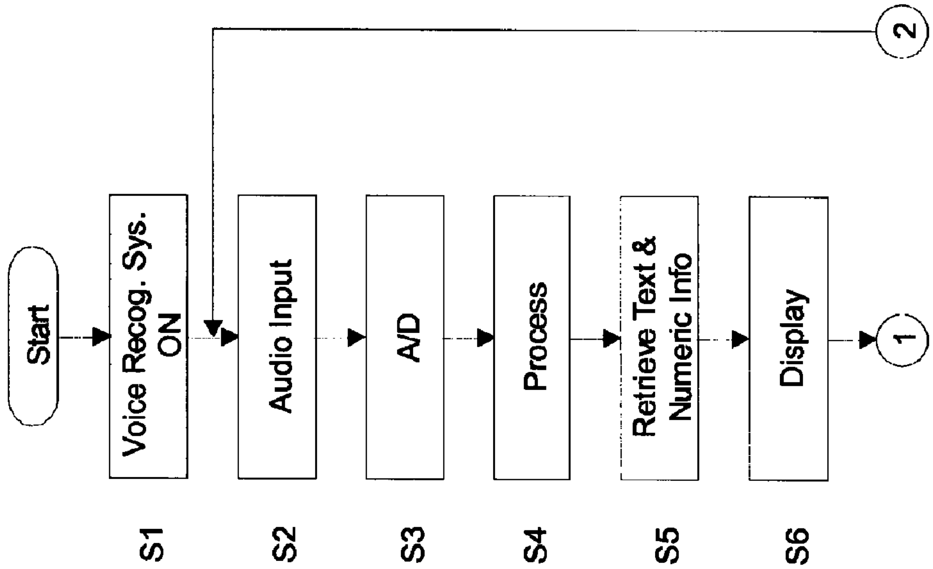
FIG. 21 is a flowchart illustrating an exemplary embodiment of the present invention.
Figure 22:
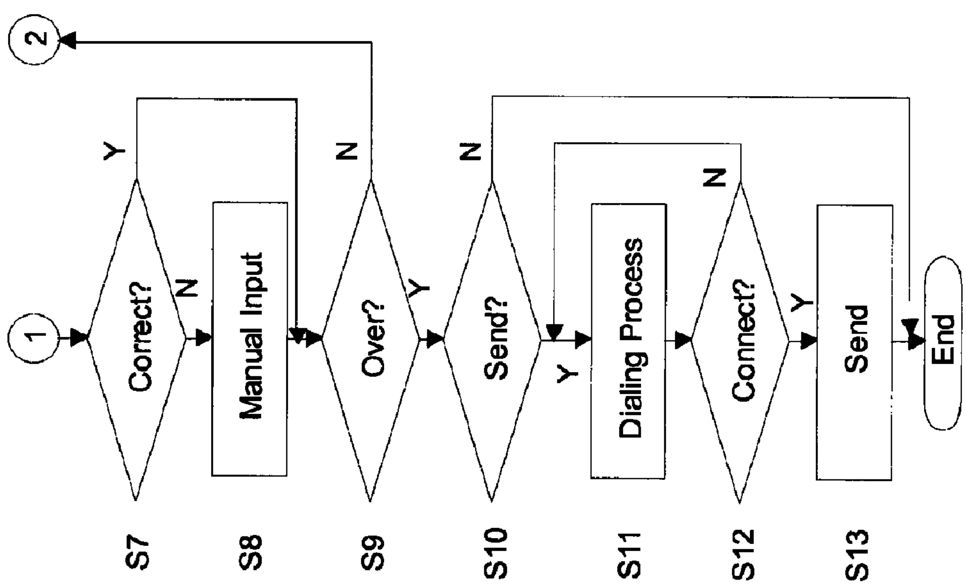
FIG. 22 is a flowchart illustrating an exemplary embodiment of the present invention.

FIG. 21 and FIG. 22 illustrate the first embodiment of the function of typing and sending e-mails by utilizing the voice recognition system. Once the voice recognition system is activated (S1), the analog audio data is input from Microphone 215 (FIG. 1) (S2). The analog audio data is converted into digital data by A/D 213 (FIG. 1) (S3). The digital audio data is processed by Sound Processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the Input Device 210 (FIG. 1) (S8). If inputting the text and numeric information is completed (S9) and CPU 211 detects input signal from Input Device 210 to send the e-mail (S10), the dialing process is initiated (S11). The dialing process is repeated until Communication Device 200 is connected to Host H (S12), and the e-mail is sent to the designated address (S13).

<<Voice Recognition—Speech-to-Text Function>>

Figure 23:
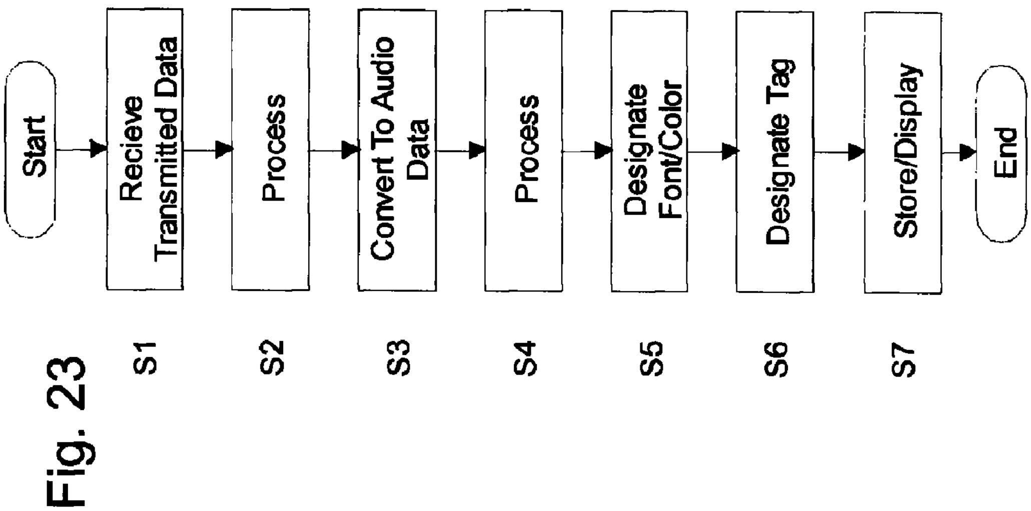
FIG. 23 is a flowchart illustrating an exemplary embodiment of the present invention.

FIG. 23 illustrates the speech-to-text function of Communication Device 200 (FIG. 1).

Once Communication Device 200 receives a transmitted data from another device via Antenna 218 (FIG. 1) (S1), Signal Processor 208 (FIG. 1) processes the data (e.g., wireless signal error check and decompression) (S2), and the transmitted data is converted into digital audio data (S3). Such conversion can be rendered by either CPU 211 (FIG. 1) or Signal Processor 208. The digital audio data is transferred to Sound Processor 205 (FIG. 1) via Data Bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

Figure 24:
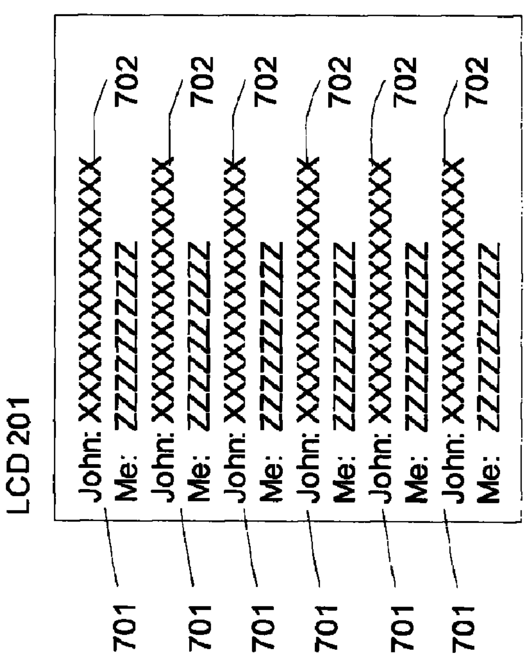
FIG. 24 is a simplified illustration illustrating an exemplary embodiment of the present invention.

FIG. 24 illustrates how the text and numeric information as well as the tag are displayed. On LCD 201 the text and numeric information 702 ('XXXXXXXXX') are displayed with the predetermined font and color as well as with the tag 701 ('John').

<<Audio/Video Data Capturing System>>

FIG. 25 through FIG. 31 illustrate the audio/video capturing system of Communication Device 200 (FIG. 1).

Assuming that Device A, a Communication Device 200, captures audio/video data and transfers such data to Device B, another Communication Device 200, via a host (not shown). Primarily video data is input from CCD Unit 214 (FIG. 1) and audio data is input from Microphone 215 of (FIG. 1) of Device A.

Figure 25:
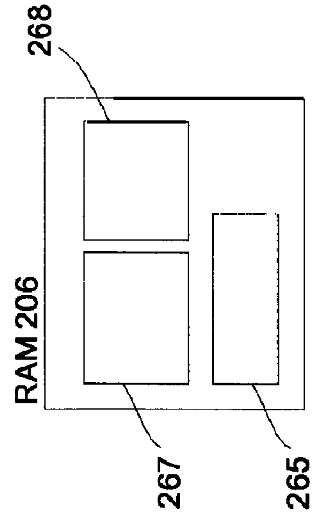
FIG. 25 is a block diagram illustrating an exemplary embodiment of the present invention.

As illustrated in FIG. 25, RAM 206 (FIG. 1) includes Area 267 which stores video data, Area 268 which stores audio data, and Area 265 which is a work area utilized for the process explained hereinafter.

Figure 26:
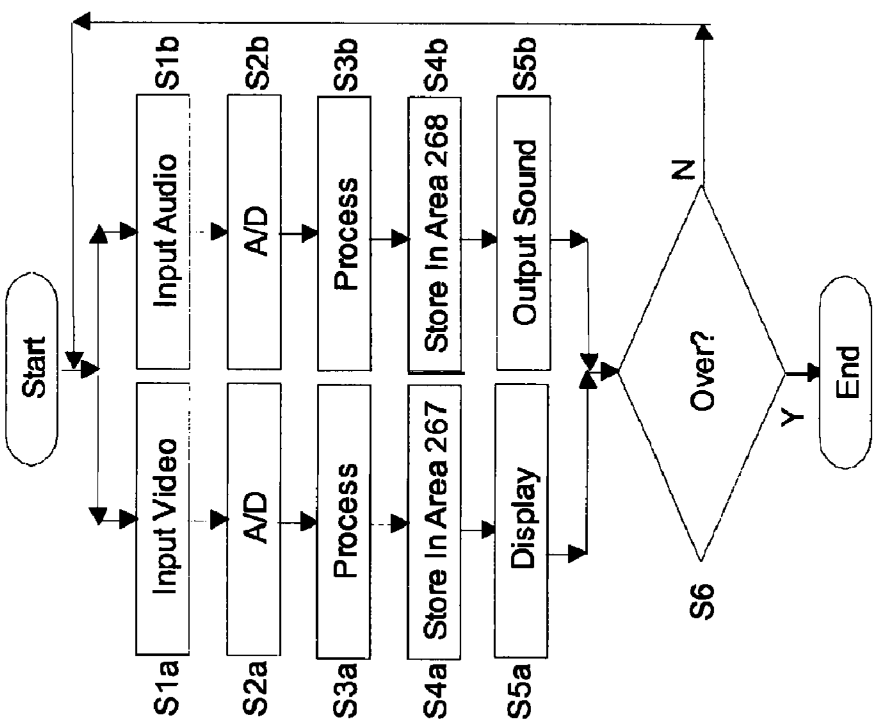
FIG. 26 is a flowchart illustrating an exemplary embodiment of the present invention.

As described in FIG. 26, the video data input from CCD Unit 214 (FIG. 1) (S1*a*) is converted from analog data to digital data (S2*a*) and is processed by Video Processor 202 (FIG. 1) (S3*a*). Area 265 (FIG. 25) is used as work area for such process. The processed video data is stored in Area 267 (FIG. 25) of RAM 206 (S4*a*) and is displayed on LCD 201 (FIG. 1) (S5*a*). As described in the same drawing, the audio data input from Microphone 215 (FIG. 1) (S1*b*) is converted from analog data to digital data by A/D 213 (FIG. 1) (S2*b*) and is processed by Sound Processor 205 (FIG. 1) (S3*b*). Area 265 is used as work area for such process. The processed audio data is stored in Area 268 (FIG. 25) of RAM 206 (S4*b*) and is transferred to Sound Processor 205 and is output from Speaker 216 (FIG. 1) via D/A 204 (FIG. 1) (S5*b*). The sequences of S1*a* through S5*a* and S1*b* through S5*b* are continued until a specific signal indicating to stop such sequence is input from Input Device 210 (FIG. 1) or by the voice recognition system (S6).

Figure 27:
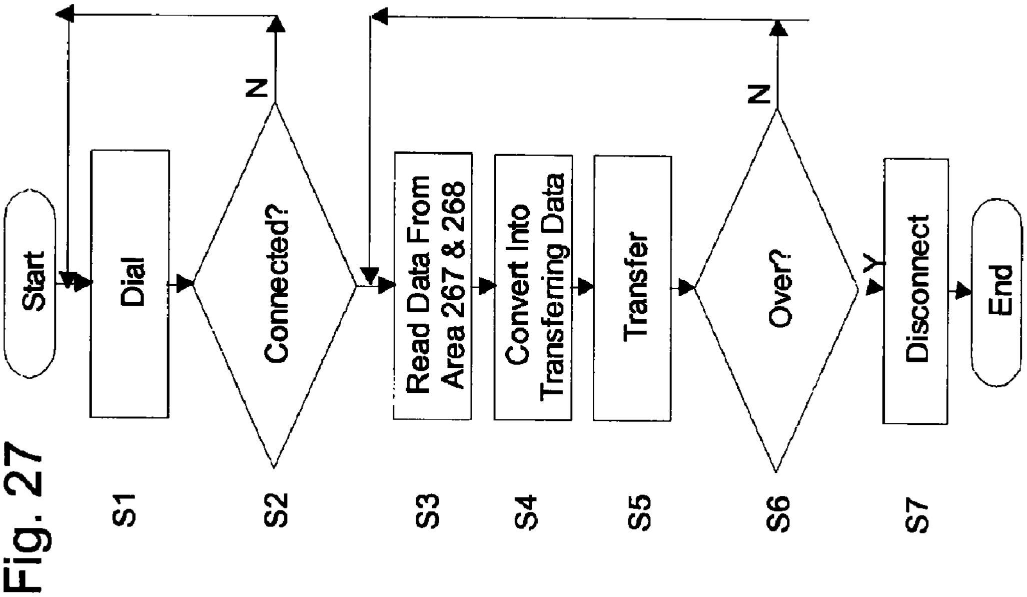
FIG. 27 is a flowchart illustrating an exemplary embodiment of the present invention.

FIG. 27 illustrates the sequence to transfer the video data and the audio data via Antenna 218 (FIG. 1) in a wireless fashion. As described in FIG. 27, CPU 211 (FIG. 1) of Device A initiates a dialing process (S1) until the line is connected to a host (not shown) (S2). As soon as the line is connected, CPU 211 reads the video data and the audio data stored in Area 267 (FIG. 25) and Area 268 (FIG. 25) (S3) and transfer them to Signal Processor 208 (FIG. 1) where the data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

Figure 28:
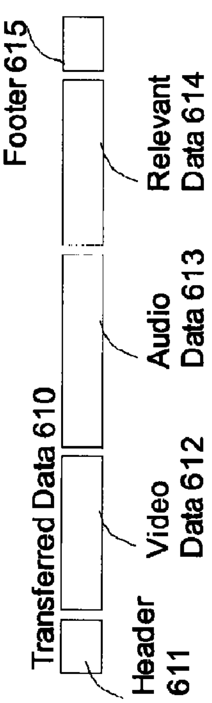
FIG. 28 is a simplified illustration illustrating an exemplary embodiment of the present invention.

FIG. 28 illustrates the basic structure of the transferred data which is transferred from Device A as described in S4 and S5 of FIG. 27. Transferred data 610 is primarily composed of Header 611, video data 612, audio data 613, relevant data 614, and Footer 615. Video data 612 corresponds to the video data stored in Area 267 (FIG. 25) of RAM 206, and audio data 613 corresponds to the audio data stored in Area 268 (FIG. 25) of RAM 206. Relevant Data 614 includes various types of data, such as the identification numbers of Device A (i.e., transferor device) and Device B (i.e., the transferee device), a location data which represents the location of Device A, email data transferred from Device A to Device B, etc. Header 611 and Footer 615 represent the beginning and the end of Transferred Data 610 respectively.

Figure 29:
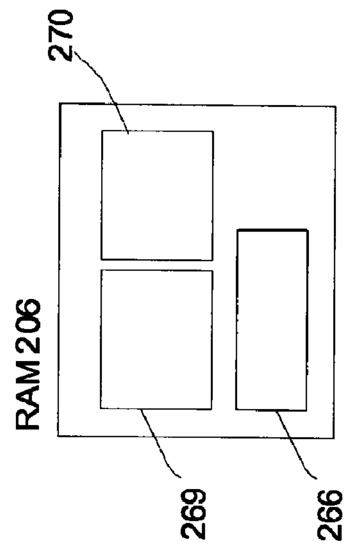
FIG. 29 is a block diagram illustrating an exemplary embodiment of the present invention.

FIG. 29 illustrates the data contained in RAM 206 (FIG. 1) of Device B. As illustrated in FIG. 29, RAM 206 includes Area 269 which stores video data, Area 270 which stores audio data, and Area 266 which is a work area utilized for the process explained hereinafter.

Figure 30:
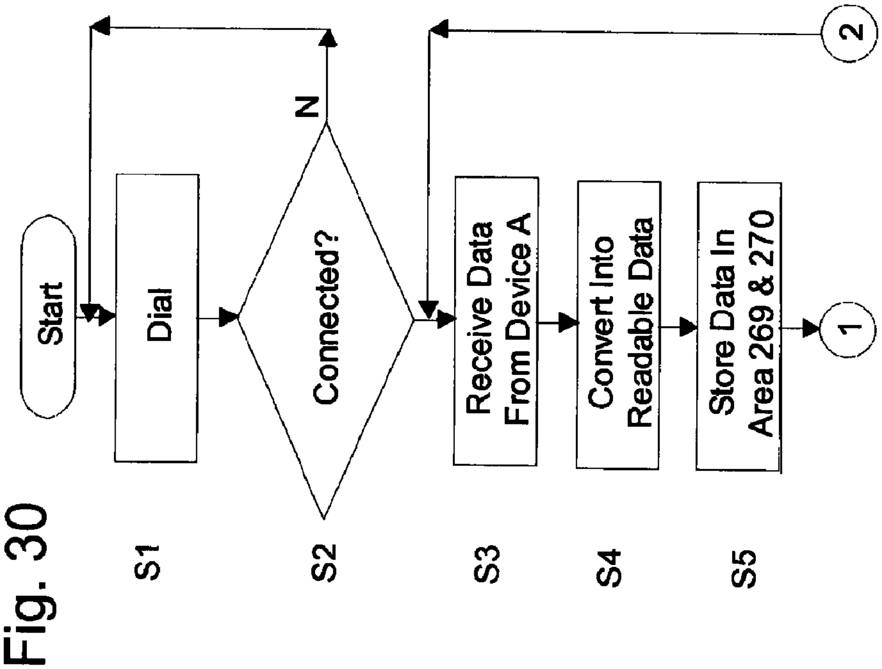
FIG. 30 is a flowchart illustrating an exemplary embodiment of the present invention.
Figures 31, 32:
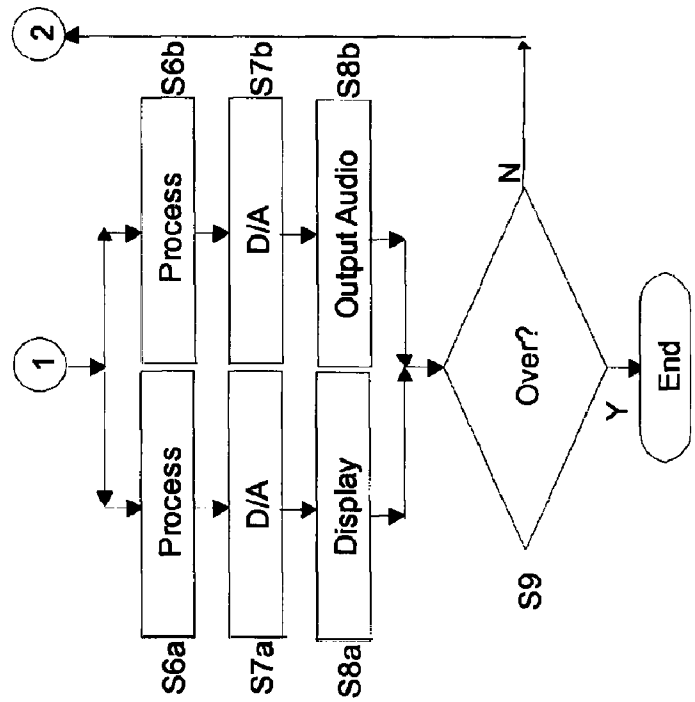
FIG. 31 is a flowchart illustrating an exemplary embodiment of the present invention.
FIG. 32 is a block diagram illustrating an exemplary embodiment of the present invention.

As described in FIG. 30 and FIG. 31, CPU 211 (FIG. 1) of Device B initiates a dialing process (S1) until Device B is connected to a host (not shown) (S2). Transferred Data 610 is received by Antenna 218 (FIG. 1) of Device B (S3) and is converted by Signal Processor 208 (FIG. 1) into data readable by CPU 211 (S4). Video data and audio data are retrieved from Transferred Data 610 and stored into Area 269 (FIG. 29) and Area 270 (FIG. 29) of RAM 206 respectively (S5). The video data stored in Area 269 is processed by Video Processor 202 (FIG. 1) (S6*a*). The processed video data is converted into an analog data (S7*a*) and displayed on LCD 201 (FIG. 1) (S8*a*). S7*a* may not be necessary depending on the type of LCD 201 used. The audio data stored in Area 270 is processed by Sound Processor 205 (FIG. 1) (S6*b*). The processed audio data is converted into analog data by D/A 204 (FIG. 1) (S7*b*) and output from Speaker 216 (FIG. 1) (S8*b*). The sequences of S6*a* through S8*a* and S6*b* through S8*b* are continued until a specific signal indicating to stop such sequence is input from Input Device 210 (FIG. 1) or via the voice recognition system (S9).

<<Caller ID System>>

Figure 33:
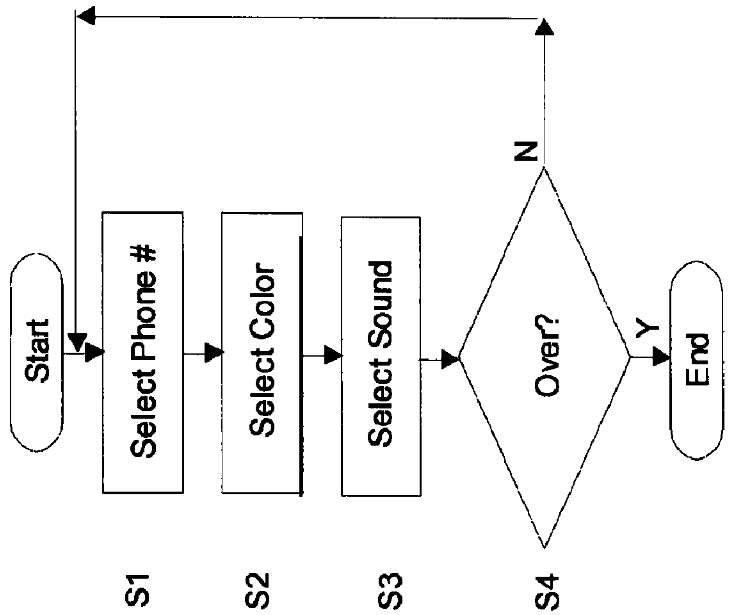
FIG. 33 is a flowchart illustrating an exemplary embodiment of the present invention.
Figure 34:
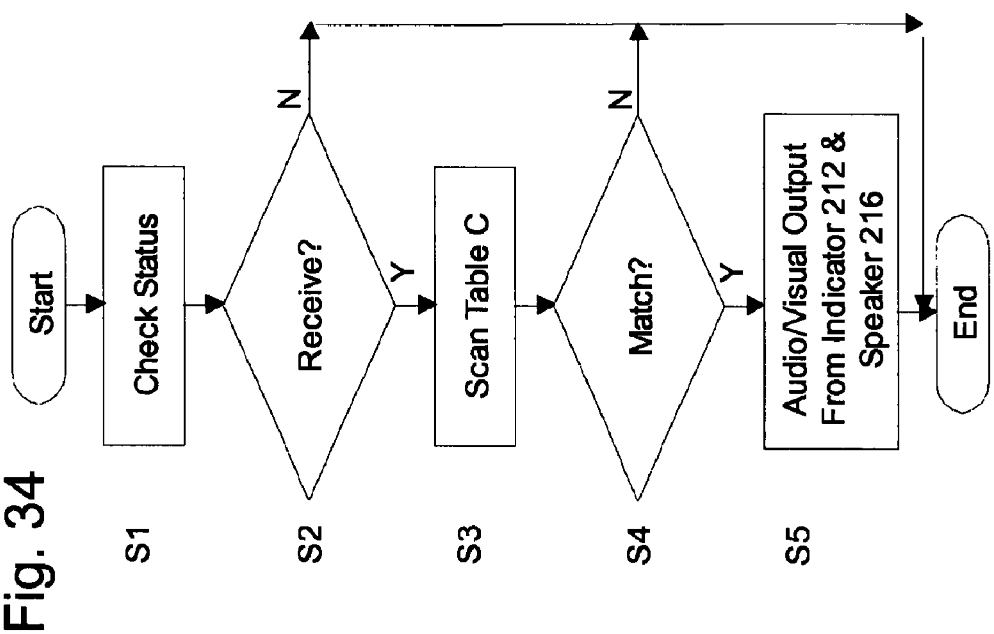
FIG. 34 is a flowchart illustrating an exemplary embodiment of the present invention.

FIG. 32 through FIG. 34 illustrate the caller ID system of Communication Device 200 (FIG. 1).

As illustrated in FIG. 32, RAM 206 includes Table C. As shown in the drawing, each phone number corresponds to a specific color and sound. For example Phone #1 corresponds to Color A and Sound E; Phone #2 corresponds to Color B and Sound F; Phone #3 corresponds to Color C and Sound G; and Phone #4 corresponds to color D and Sound H.

As illustrated in FIG. 33, the user of Communication Device 200 selects or inputs a phone number (S1) and selects a specific color (S2) and a specific sound (S3) designated for that phone number by utilizing Input Device 210 (FIG. 1). Such sequence can be repeated until there is a specific input signal from Input Device 210 ordering to do otherwise (S4).

As illustrated in FIG. 34, CPU 211 (FIG. 1) periodically checks whether it has received a call from other communication devices (S1). If it receives a call (S2), CPU 211 scans Table C (FIG. 32) to see whether the phone number of the caller device is registered in the table (S3). If there is a match (S4), the designated color is output from Indicator 212 (FIG.

1) and the designated sound is output from Speaker 216 (FIG. 1) (S5). For example if the incoming call is from Phone #1, Color A is output from Indicator 212 and Sound E is output from Speaker 216.

<<Call Blocking Function>>

Figure 35:
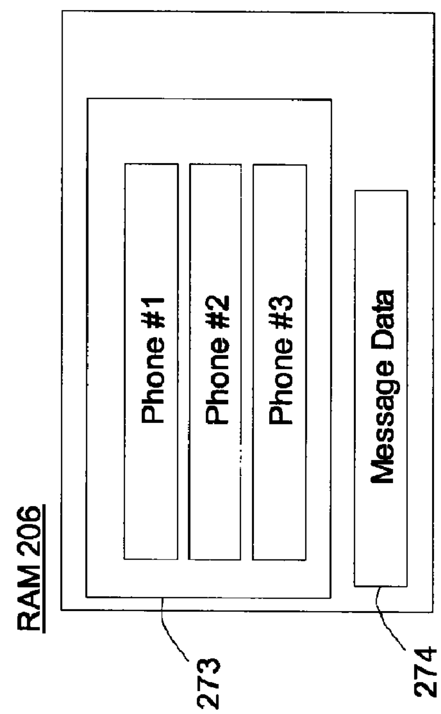
FIG. 35 is a block diagram illustrating an exemplary embodiment of the present invention.
Figure 36:
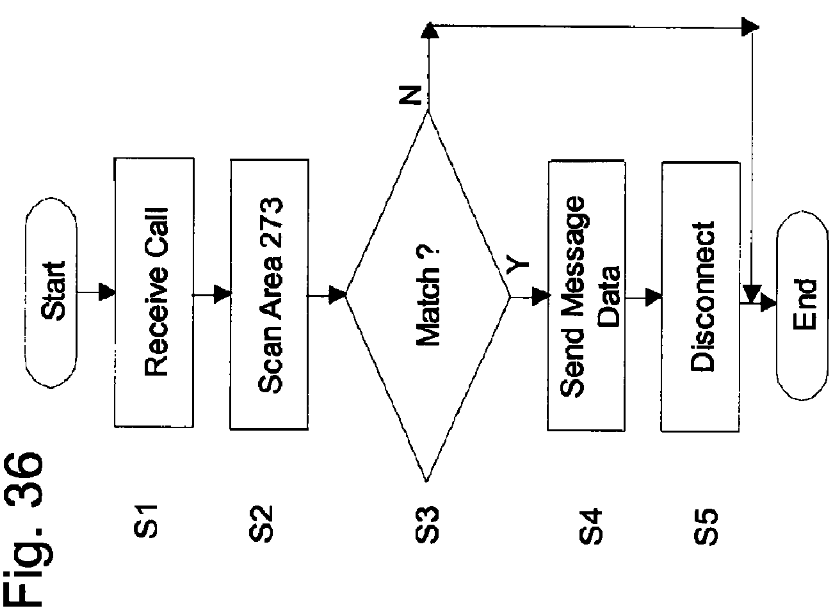
FIG. 36 is a flowchart illustrating an exemplary embodiment of the present invention.
Figure 37:
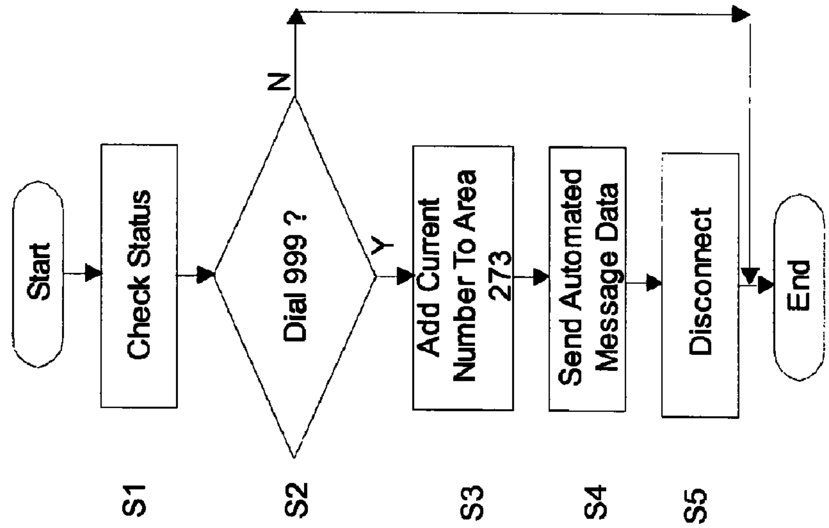
FIG. 37 is a flowchart illustrating an exemplary embodiment of the present invention.

FIG. 35 through FIG. 37 illustrates the so-called 'call blocking' function of Communication Device 200 (FIG. 1).

As illustrated in FIG. 35, RAM 206 (FIG. 1) includes Area 273 and Area 274. Area 273 stores phone numbers that should be blocked. In the example illustrated in FIG. 35, Phone #1, Phone #2, and Phone #3 are blocked. Area 274 stores a message data, preferably a wave data, stating that the phone can not be connected.

FIG. 36 illustrates the operation of Communication Device 200. When Communication Device 200 receives a call (S1), CPU 211 (FIG. 1) scans Area 273 (FIG. 35) of RAM 206 (S2). If the phone number of the incoming call matches one of the phone numbers stored in Area 273 (S3), CPU 211 sends the message data stored in Area 274 (FIG. 35) of RAM 206 to the caller device (S4) and disconnects the line (S5).

FIG. 37 illustrates the method of updating Area 273 (FIG. 35) of RAM 206. Assuming that the phone number of the incoming call does not match any of the phone numbers stored in Area 273 of RAM 206 (see S3 of FIG. 36). In that case, Communication Device 200 is connected to the caller device. However, the user of Communication Device 200 may decide to have such number 'blocked' after all. If that is the case, the user dials '999' while the line is connected. Technically CPU 211 (FIG. 1) periodically checks the signals input from Input Device 210 (FIG. 1) (S1). If the input signal represents a numerical data '999' from Input Device 210 (S2), CPU 211 adds the phone number of the pending call to Area 273 (S3) and sends the message data stored in Area 274 (FIG. 35) of RAM 206 to the caller device (S4). The line is disconnected thereafter (S5).

Figure 38:
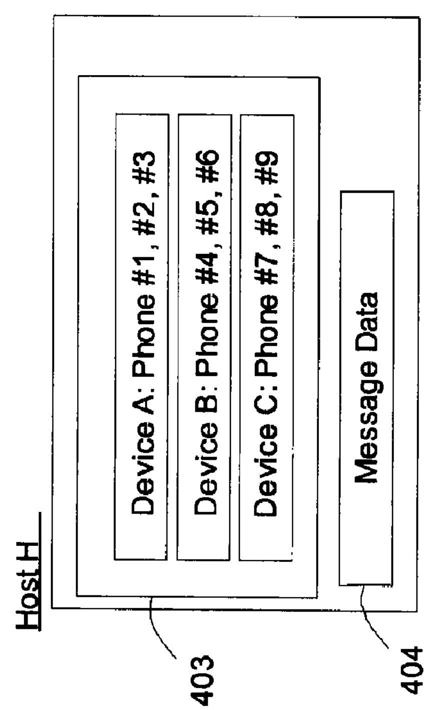
FIG. 38 is a block diagram illustrating an exemplary embodiment of the present invention.
Figure 39:
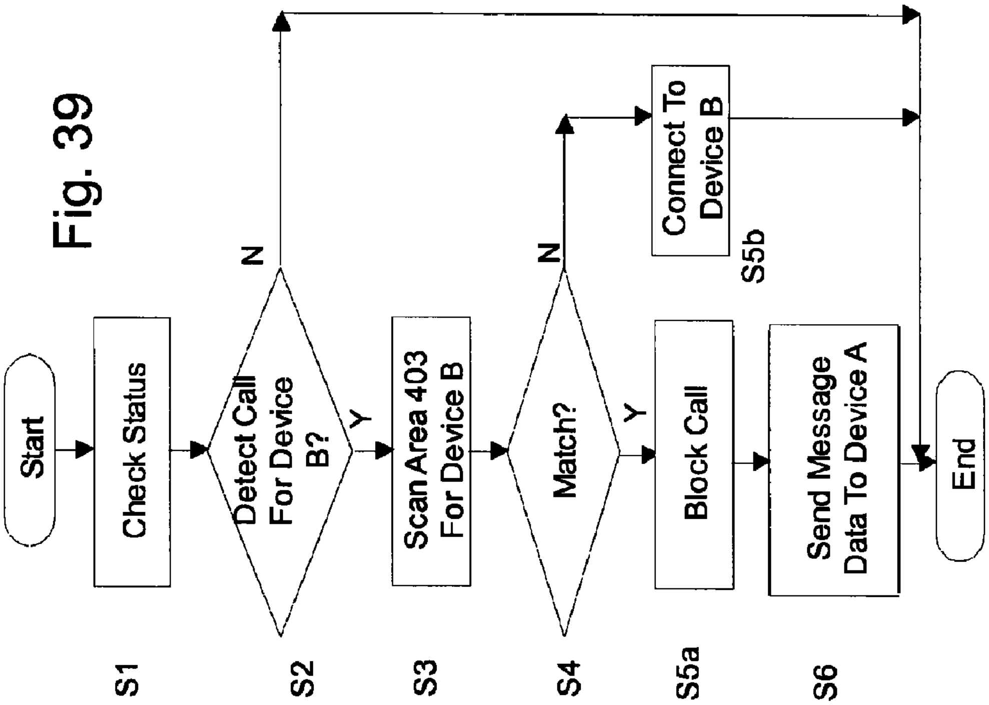
FIG. 39 is a flowchart illustrating an exemplary embodiment of the present invention.
Figure 40:
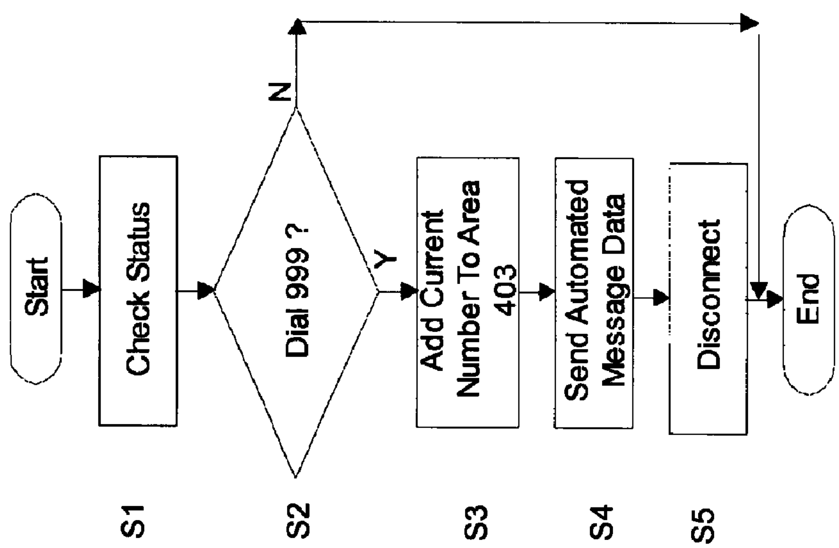
FIG. 40 is a flowchart illustrating an exemplary embodiment of the present invention.

FIG. 38 through FIG. 40 illustrate another embodiment of the present invention.

As illustrated in FIG. 38, Host H (not shown) includes Area 403 and Area 404. Area 403 stores phone numbers that should be blocked to be connected to Communication Device 200. In the example illustrated in FIG. 38, Phone #1, Phone #2, and Phone #3 are blocked for Device A; Phone #4, Phone #5, and Phone #6 are blocked for Device B; and Phone #7, Phone #8, and Phone #9 are blocked for Device C. Area 404 stores a message data stating that the phone can not be connected.

FIG. 39 illustrates the operation of Host H (not shown). Assuming that the caller device is attempting to connect to Device B, Communication Device 200. Host H periodically checks the signals from all Communication Device 200 (S1). If Host H detects a call for Device B (S2), it scans Area 403 (FIG. 38) (S3) and checks whether the phone number of the incoming call matches one of the phone numbers stored therein for Device B (S4). If the phone number of the incoming call does not match any of the phone numbers stored in Area 403, the line is connected to Device B (S5*b*). On the other hand, if the phone number of the incoming call matches one of the phone numbers stored in Area 403, the line is 'blocked,' i.e., not connected to Device B (S5*a*) and Host H sends the massage data stored in Area 404 (FIG. 38) to the caller device (S6).

FIG. 40 illustrates the method of updating Area 403 (FIG. 38) of Host H. Assuming that the phone number of the incoming call does not match any of the phone numbers stored in Area 403 (see S4 of FIG. 39). In that case, Host H allows the connection between the caller device and Communication Device 200, however, the user of Communication Device 200 may decide to have such number 'blocked' after all. If that is the case, the user simply dials '999' while the line is connected. Technically Host H (FIG. 38) periodically checks the signals input from Input Device 210 (FIG. 1) (S1). If the input signal represents '999' from Input Device 210 (FIG. 1) (S2), Host H adds the phone number of the pending call to Area 403 (S3) and sends the message data stored in Area 404 (FIG. 38) to the caller device (S4). The line is disconnected thereafter (S5).

As another embodiment of the method illustrated in FIG. 40, Host H (FIG. 38) may delegate some of its tasks to Communication Device 200 (this embodiment is not shown in drawings). Namely, Communication Device 200 periodically checks the signals input from Input Device 210 (FIG. 1). If the input signal represents a numeric data '999' from Input Device 210, Communication Device 200 sends to Host H a block request signal as well as with the phone number of the pending call. Host H, upon receiving the block request signal from Communication Device 200, adds the phone number of the pending call to Area 403 (FIG. 38) and sends the message data stored in Area 404 (FIG. 38) to the caller device. The line is disconnected thereafter.

<<Navigation System>>

FIG. 41 through FIG. 50 illustrate the navigation system of Communication Device 200 (FIG. 1).

Figure 41:
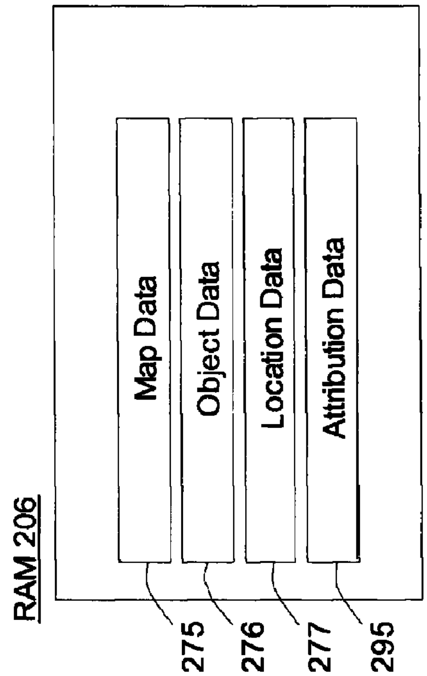
FIG. 41 is a block diagram illustrating an exemplary embodiment of the present invention.

As illustrated in FIG. 41, RAM 206 (FIG. 1) includes Area 275, Area 276, Area 277, and Area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called 'texture mapping' which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in Area 276. Area 277 also stores a plurality of data representing the street address of each object stored in Area 276. In addition, Area 277 stores the current position data of Communication Device 200 and the Destination Data which are explained in details hereafter. The map data stored in Area 275 and the location data stored in Area 277 are linked each other. Area 295 stores a plurality of attribution data attributing to the map data stored in Area 275 and location data stored in Area 277, such as road blocks, traffic accidents, and road constructions, and traffic jams. The attribution data stored in Area 295 is updated periodically by receiving an updated data from a host (not shown).

Figure 42:
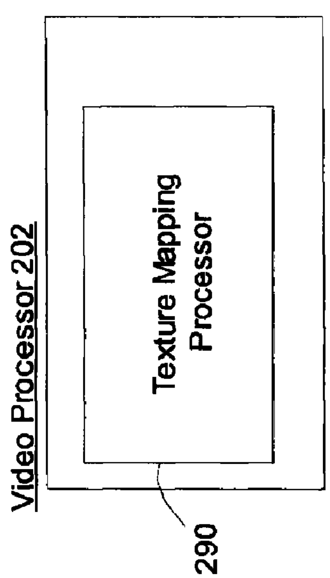
FIG. 42 is a block diagram illustrating an exemplary embodiment of the present invention.

As illustrated in FIG. 42, Video Processor 202 (FIG. 1) includes texture mapping processor 290. Texture mapping processor 290 produces polygons in a three-dimensional space and 'pastes' textures to each polygon. The concept of such method is described in the following patents and the references cited thereof: U.S. Pat. No. 5,870,101, U.S. Pat. No. 6,157,384, U.S. Pat. No. 5,774,125, U.S. Pat. No. 5,375,206, and/or U.S. Pat. No. 5,925,127.

Figure 43:
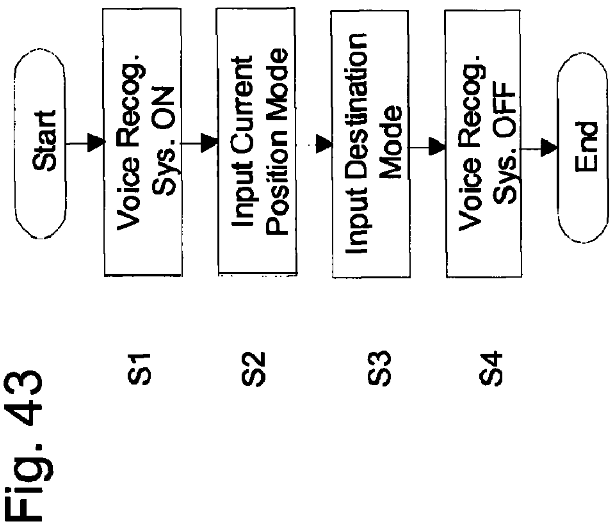
FIG. 43 is a flowchart illustrating an exemplary embodiment of the present invention.

As illustrated in FIG. 43, the voice recognition system is activated when CPU 211 (FIG. 1) detects a specific signal input from Input Device 210 (FIG. 1) (S1). After the voice recognition system is activated, the input current position mode starts and the current position of Communication Device 200 is input by voice recognition system explained in FIG. 5, FIG. 6, FIG. 7, FIG. 16, FIG. 17, FIG. 18, FIG. 19, FIG. 20 and/or FIG. 17 (S2). The current position can also be input from Input Device 210. As another embodiment of the present invention, the current position can automatically be detected by the method so-called 'global positioning system' and input the current data therefrom. After the process of inputting the current data is completed, the input destination mode starts and the destination is input by the voice recognition system explained above or by the Input Device 210 (S3), and the voice recognition system is deactivated after the process of inputting the Destination Data is completed by utilizing such system (S4).

Figure 44:
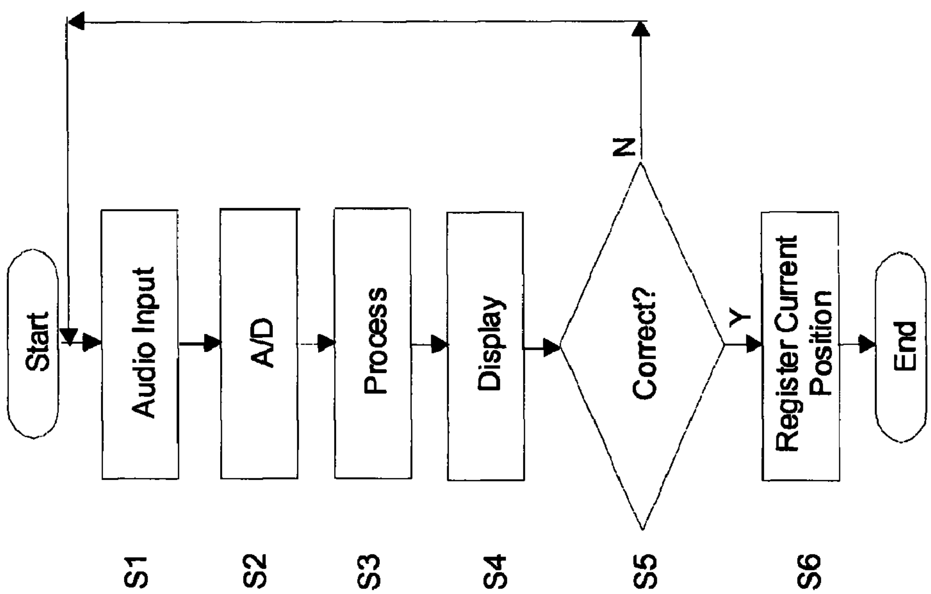
FIG. 44 is a flowchart illustrating an exemplary embodiment of the present invention.

FIG. 44 illustrates the sequence of the input current position mode described in S2 of FIG. 43. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by Input Device 210 (FIG. 1) and/or can be automatically input by utilizing the method so-called 'global positioning system' or 'GPS' as described hereinbefore.

Figure 45:
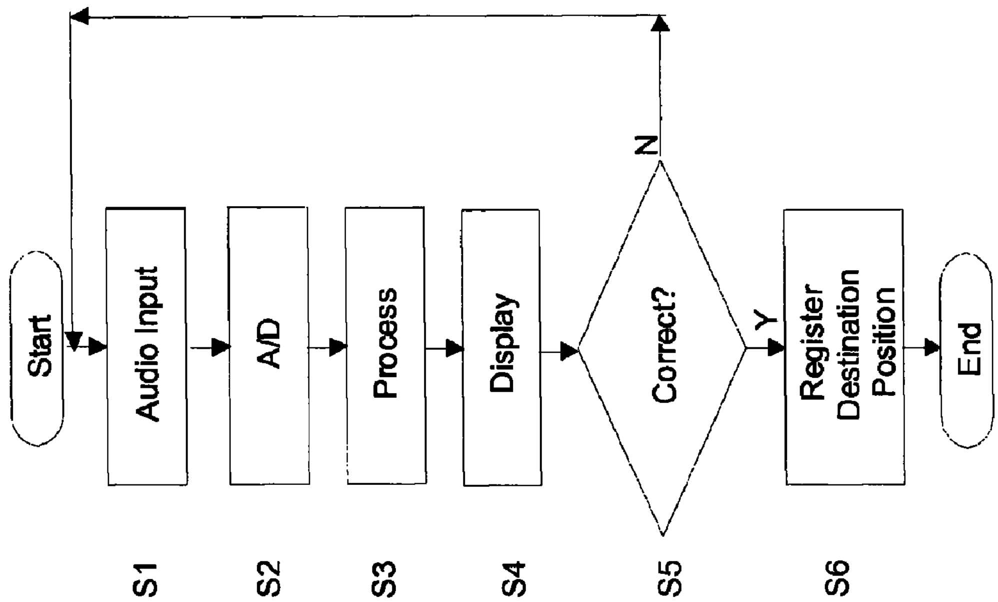
FIG. 45 is a flowchart illustrating an exemplary embodiment of the present invention.

FIG. 45 illustrates the sequence of the input destination mode described in S3 of FIG. 43. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as Destination Data (S6).

Figure 46:
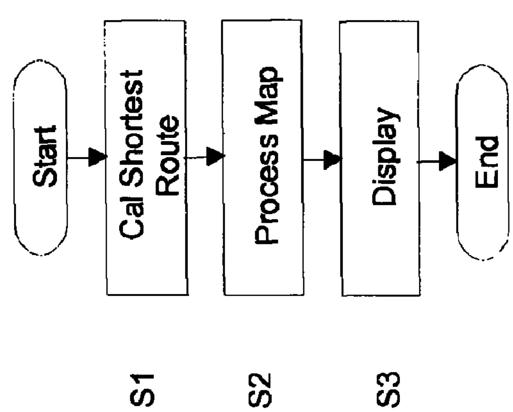
FIG. 46 is a flowchart illustrating an exemplary embodiment of the present invention.

FIG. 46 illustrates the sequence of displaying the shortest route from the current position to the destination. CPU 211 (FIG. 1) retrieves both the current position data and the Destination Data which are input by the method described in FIG. 43 through FIG. 45 from Area 277 (FIG. 41) of RAM 206 (FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from Area 275 (FIG. 41) of RAM 206 (S2).

As another embodiment of the present invention, by way of utilizing the location data stored in Area 277, CPU 211 may produce a three-dimensional map by composing the three dimensional objects (by method so-called 'texture mapping' as described above) which are stored in Area 276 (FIG. 41) of RAM 206. The two-dimensional map and/or the three dimensional map is displayed on LCD 201 (FIG. 1) (S3).

As another embodiment of the present invention, the attribution data stored in Area 295 (FIG. 41) of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of Communication Device 200 to easily recognize such route on LCD 201 (FIG. 1).

As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from Area 277 (FIG. 41) of RAM 206. Then CPU 211 retrieves a plurality of object data which correspond to such location data from Area 276 (FIG. 41) of RAM 206 and displays a plurality of objects on LCD 201 based on such object data in a manner the user of Communication Device 200 may observe from the current location.

Figure 47:
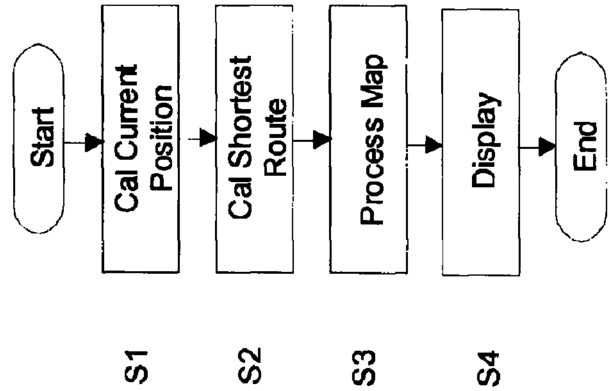
FIG. 47 is a flowchart illustrating an exemplary embodiment of the present invention.

FIG. 47 illustrates the sequence of updating the shortest route to the destination while Communication Device 200 is moving. By way of periodically and automatically inputting the current position by the method so-called 'global positioning system' or 'GPS' as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from Area 275 (FIG. 41) of RAM 206 (S3). Instead, by way of utilizing the location data stored in Area 277 (FIG. 41), CPU 211 may produce a three-dimensional map by composing the three dimensional objects by method so-called 'texture mapping' which are stored in Area 276 (FIG. 41) of RAM 206. The two-dimensional map and/or the three-dimensional map is displayed on LCD 201 (FIG. 1) (S4). The shortest route to the destination is re-highlighted by a significant color (such as red) to enable the user of Communication Device 200 to easily recognize the updated route on LCD 201.

Figure 48:
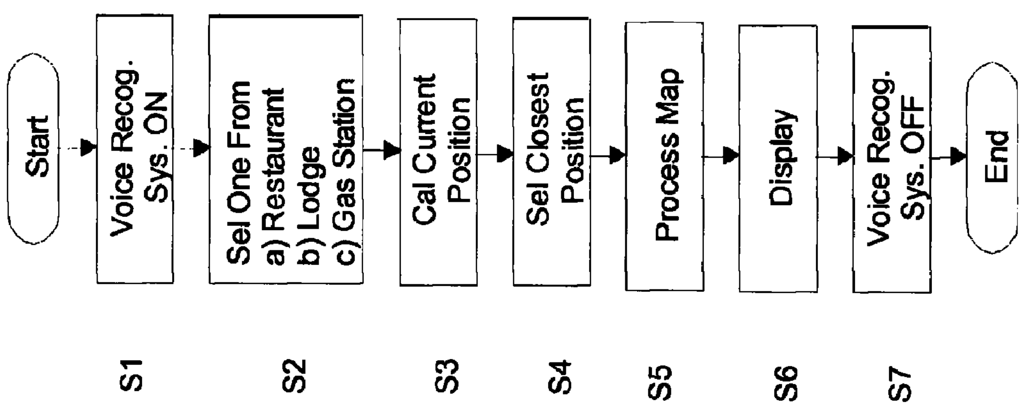
FIG. 48 is a flowchart illustrating an exemplary embodiment of the present invention.

FIG. 48 illustrates the method of finding the shortest location of the desired facility, such as restaurant, hotel, gas station, etc. The voice recognition system is activated in the manner described in FIG. 43 (S1). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described in FIG. 44 and/or FIG. 47 (S3). From the data selected in S2, CPU 211 scans Area 277 (FIG. 41) of RAM 206 and searches the location of the facilities of the selected category (such as restaurant) which is the closest to the current position (S4). CPU 211 then retrieves the relevant two-dimensional map data which should be displayed on LCD 201 from Area 275 of RAM 206 (FIG. 41) (S5). Instead, by way of utilizing the location data stored in 277 (FIG. 41), CPU 211 may produce a three-dimensional map by composing the three dimensional objects by method so-called 'texture mapping' which are stored in Area 276 (FIG. 41) of RAM 206. The two-dimensional map and/or the three dimensional map is displayed on LCD 201 (FIG. 1) (S6). The shortest route to the destination is re-highlighted by a significant color (such as red) to enable the user of Communication Device 200 to easily recognize the updated route on LCD 201. The voice recognition system is deactivated thereafter (S7).

Figure 49:
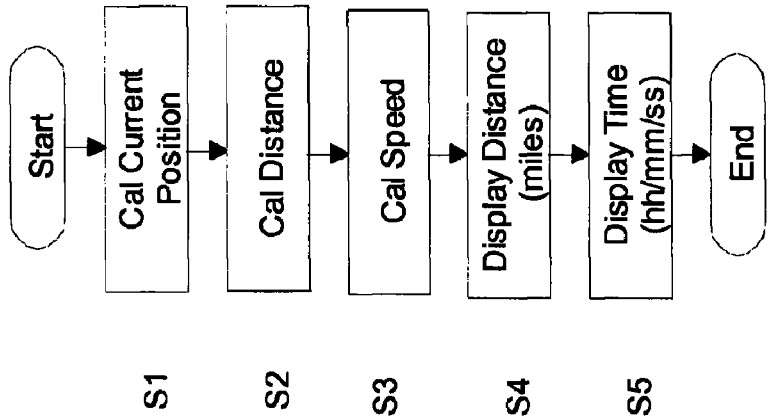
FIG. 49 is a flowchart illustrating an exemplary embodiment of the present invention.

FIG. 49 illustrates the method of displaying the time and distance to the destination. As illustrated in FIG. 49, CPU 211 (FIG. 1) calculates the current position wherein the source data can be input from the method described in FIG. 44 and/or FIG. 47 (S1). The distance is calculated from the method described in FIG. 46 (S2). The speed is calculated from the distance which Communication Device 200 has proceeded within specific period of time (S3). The distance to the destination and the time left are displayed on LCD 201 (FIG. 1) (S4 and S5).

Figure 50:
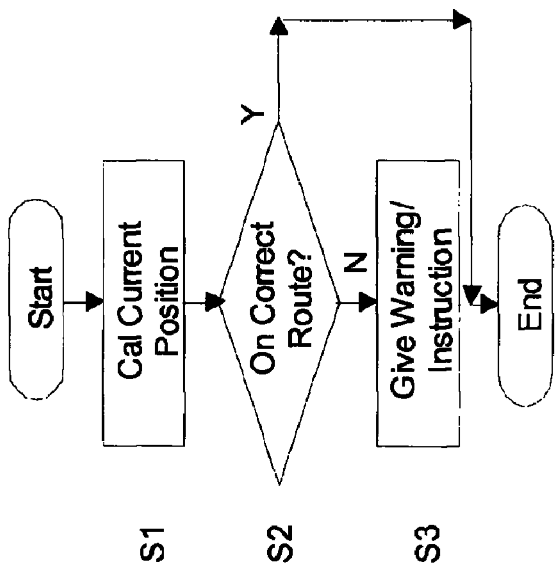
FIG. 50 is a flowchart illustrating an exemplary embodiment of the present invention.

FIG. 50 illustrates the method of warning and giving instructions when the user of Communication Device 200 deviates from the correct route. By way of periodically and automatically inputting the current position by the method so-called 'global positioning system' or 'GPS' as described hereinbefore, the current position is continuously updated (S1). If the current position deviates from the correct route (S2), a warning is given from Speaker 216 (FIG. 1) and/or on LCD 201 (FIG. 1) (S3). The method described in FIG. 50 is repeated for a certain period of time. If the deviation still exists after such period of time has passed, CPU 211 (FIG. 1) initiates the sequence described in FIG. 46 and calculates the shortest route to the destination and display it on LCD 201. The details of such sequence is as same as the one explained in FIG. 46.

Figure 51:
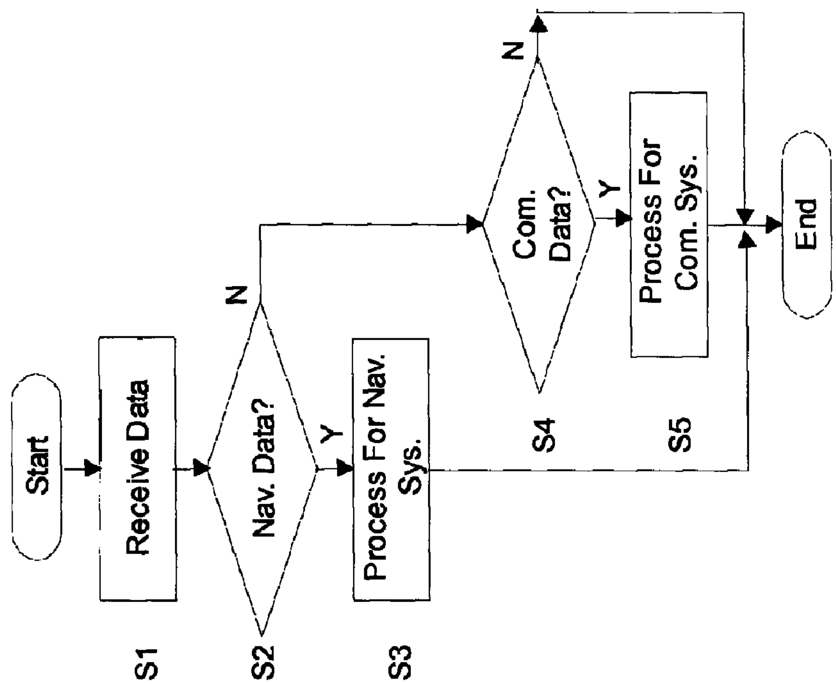
FIG. 51 is a flowchart illustrating an exemplary embodiment of the present invention.

FIG. 51 illustrates the overall operation of Communication Device 200 regarding the navigation system and the communication system. When Communication Device 200 receives data from Antenna 218 (FIG. 1) (S1), CPU 211 (FIG. 1) determines whether the data is navigation data, i.e., data necessary to operate the navigation system (S2). If the data received is a navigation data, the navigation system described in FIG. 43 through FIG. 50 is performed (S3). On the other hand, if the data received is a communication data (S4), the communication system, i.e., the system necessary for wireless communication which is mainly described in FIG. 1 is performed (S5).

<<Auto Time Adjust Function>>

Figure 52:
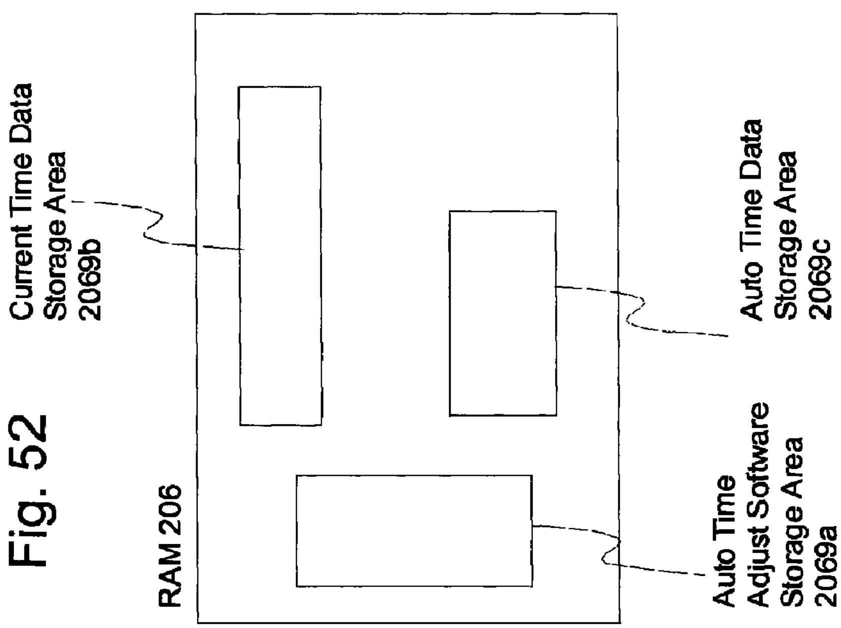
FIG. 52 is a block diagram illustrating an exemplary embodiment of the present invention.
Figure 53:
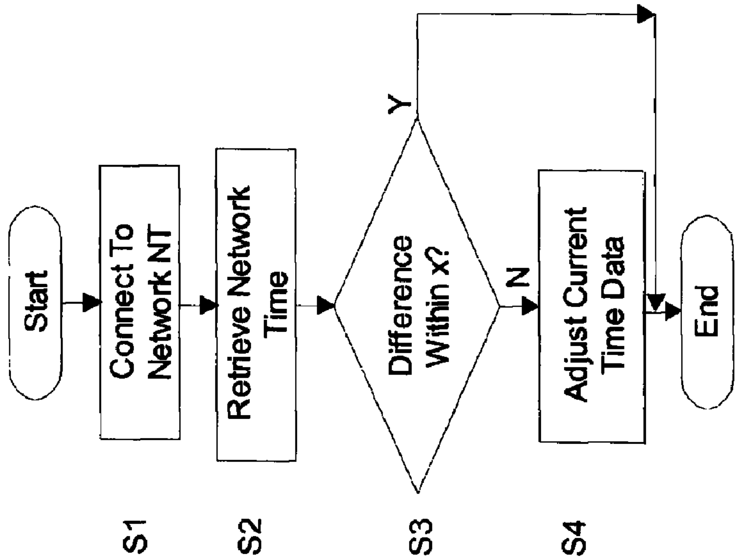
FIG. 53 is a flowchart illustrating an exemplary embodiment of the present invention.
Figure 54:
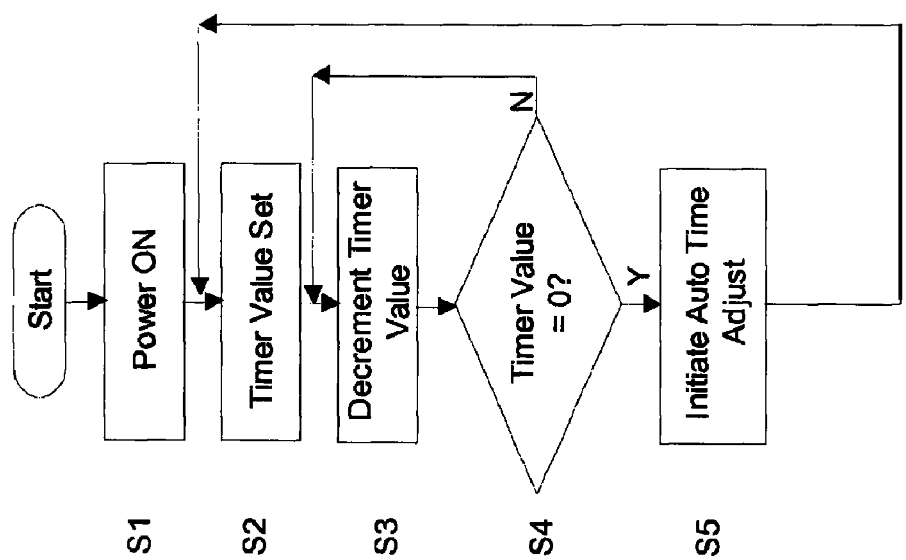
FIG. 54 is a flowchart illustrating an exemplary embodiment of the present invention.

FIG. 52 to FIG. 54 illustrate the automatic time adjust function, i.e., a function which automatically adjusts the clock of Communication Device 200.

FIG. 52 illustrates the data stored in RAM 206 (FIG. 1). As described in FIG. 52, RAM 206 includes Auto Time Adjust Software Storage Area 2069*a*, Current Time Data Storage Area 2069*b*, and Auto Time Data Storage Area 2069*c*. Auto Time Adjust Software Storage Area 2069*a* stores software program to implement the present function which is explained in details hereinafter, Current Time Data Storage Area 2069*b* stores the data which represents the current time, and Auto Time Data Storage Area 2069*c* is a working area assigned for implementing the present function.

FIG. 53 illustrates a software program stored in Auto Time Adjust Software Storage Area 2069*a* (FIG. 52). First of all, Communication Device 200 is connected to Network NT (e.g., the Internet) via Antenna 218 (FIG. 1) (S1). CPU 211 (FIG. 1) then retrieves an atomic clock data from Network NT (S2) and the current time data from Current Time Data Storage Area 2069*b* (FIG. 52), and compares both data. If the difference between both data is not within the predetermined value X (S3), CPU 211 adjusts the current time data (S4). The method to adjust the current data can be either simply overwrite the data stored in Current Time Data Storage Area 2069*b* with the atomic clock data retrieved from Network NT or calculate the difference of the two data and add or subtract the difference to or from the current time data stored in Current Time Data Storage Area 2069*b* by utilizing Auto Time Data Storage Area 2069*c* (FIG. 52) as a working area.

FIG. 54 illustrates another software program stored in Auto Time Adjust Software Storage Area 2069*a* (FIG. 52). When the power of Communication Device 200 is turned on (S1), CPU 211 (FIG. 1) stores a predetermined timer value in Auto Time Data Storage Area 2069*c* (FIG. 52) (S2). The timer value is decremented periodically (S3). When the timer value equals to zero (S4), the automatic timer adjust function is activated (S5) and CPU 211 performs the sequence described in FIG. 53, and the sequence of S2 through S4 is repeated thereafter.

<<Calculator Function>>

FIG. 55 through FIG. 58 illustrate the calculator function of Communication Device 200. Communication Device 200 can be utilized as a calculator to perform mathematical calculation by implementing the present function.

Figure 55:
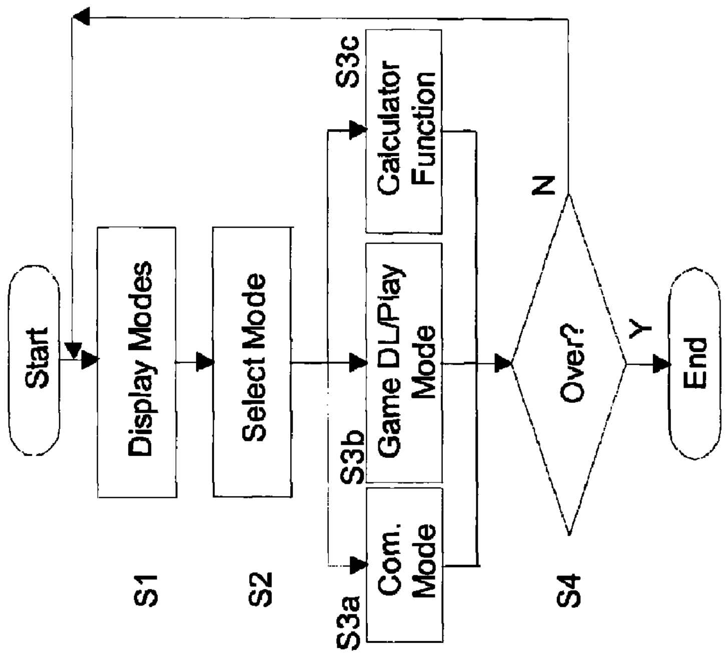
FIG. 55 is a flowchart illustrating an exemplary embodiment of the present invention.

FIG. 55 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 167, and the calculator function is activated (S3*c*) when the calculator function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Figure 56:
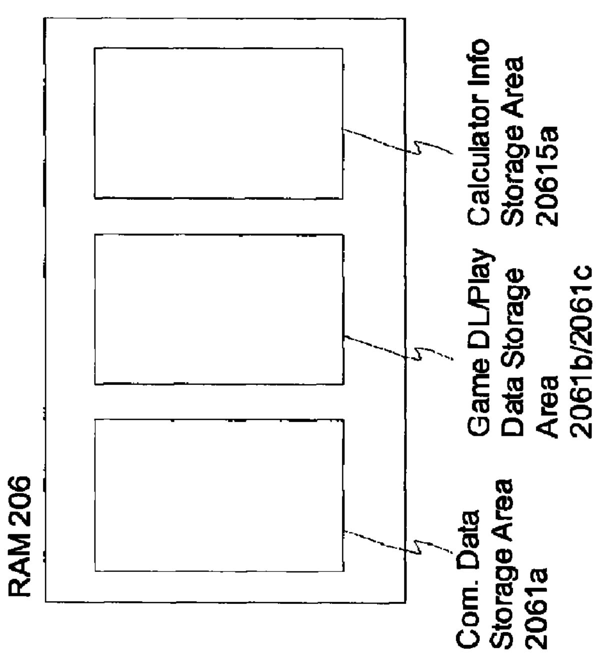
FIG. 56 is a block diagram illustrating an exemplary embodiment of the present invention.

FIG. 56 illustrates the data stored in RAM 206 (FIG. 1). As described in FIG. 56, the data to activate (as described in S3*a* of the previous figure) and to perform the communication mode is stored in Communication Data Storage Area 2061*a*, the data to activate (as described in S1*b* of the previous figure) and to perform the game download mode and the game play mode are stored in Game DL/Play Data Storage Area 2061*b*/2061*c* of which the details are described in FIG. 168, and the data to activate (as described in S3*c* of the previous figure) and to perform the calculator function is stored in Calculator Information Storage Area 20615*a*.

Figure 57:
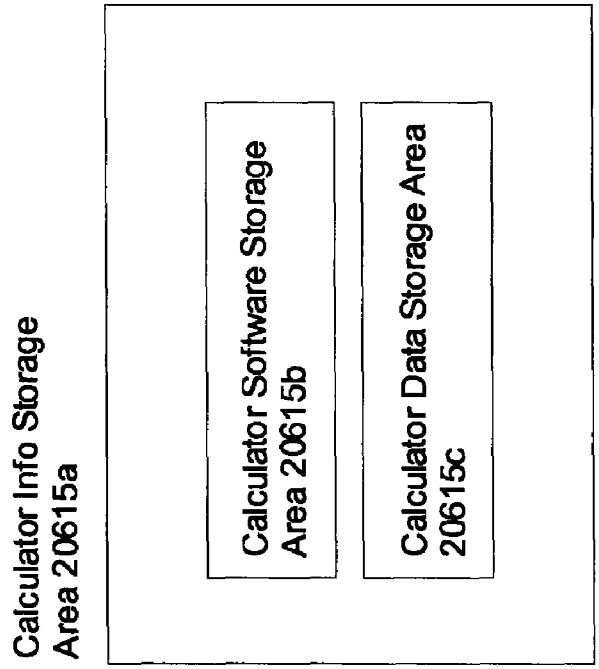
FIG. 57 is a block diagram illustrating an exemplary embodiment of the present invention.

FIG. 57 illustrates the data stored in Calculator Information Storage Area 20615*a* (FIG. 56). As described in FIG. 57, Calculator Information Storage Area 20615*a* includes Calculator Software Storage Area 20615*b* and Calculator Data Storages Area 20615*c*. Calculator Software Storage Area 20615*b* stores the software programs to implement the present function, such as the one explained in FIG. 58, and Calculator Data Storage Area 20615*c* stores a plurality of data necessary to execute the software programs stored in Calculator Software Storage Area 20615*b* and to implement the present function.

Figure 58:
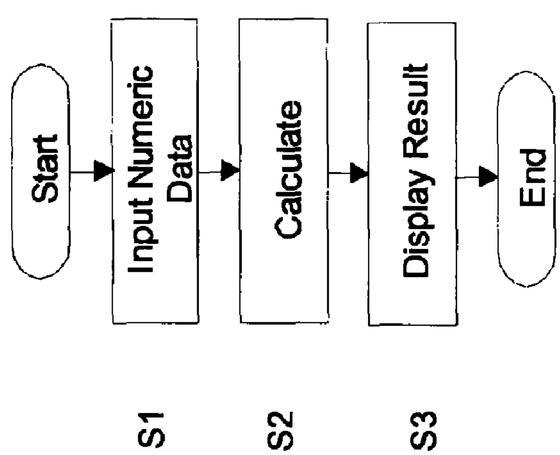
FIG. 58 is a flowchart illustrating an exemplary embodiment of the present invention.

FIG. 58 illustrates the software program stored in Calculator Storage Area 20615*b* (FIG. 57). Referring to FIG. 58, one or more of numeric data are input by utilizing Input Device 210 (FIG. 1) or via voice recognition system as well as the arithmetic operators (e.g., '+', '−', and '×'), which are temporarily stored in Calculator Data Storage Area 20615*c* (S1). By utilizing the data stored in Calculator Data Storage Area 20615*c*, CPU 211 (FIG. 1) performs the calculation by executing the software program stored in Calculator Software Storage Area 20615*b* (FIG. 57) (S2). The result of the calculation is displayed on LCD 201 (FIG. 1) thereafter (S3).

<<Spreadsheet Function>>

FIG. 59 through FIG. 62 illustrate the spreadsheet function of Communication Device 200. Here, the spreadsheet is composed of a plurality of cells which are aligned in matrix. In other words, the spreadsheet is divided into a plurality of rows and columns in which alphanumeric data is capable to be input. Microsoft Excel is the typical example of the spreadsheet.

Figure 59:
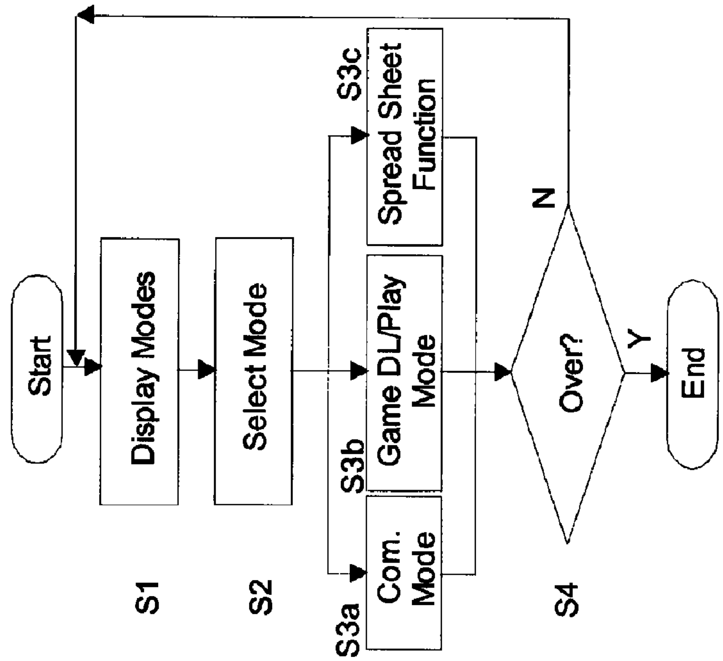
FIG. 59 is a flowchart illustrating an exemplary embodiment of the present invention.

FIG. 59 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in FIG. 167, and the spreadsheet function is activated (S3c) when the spreadsheet function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Figure 60:
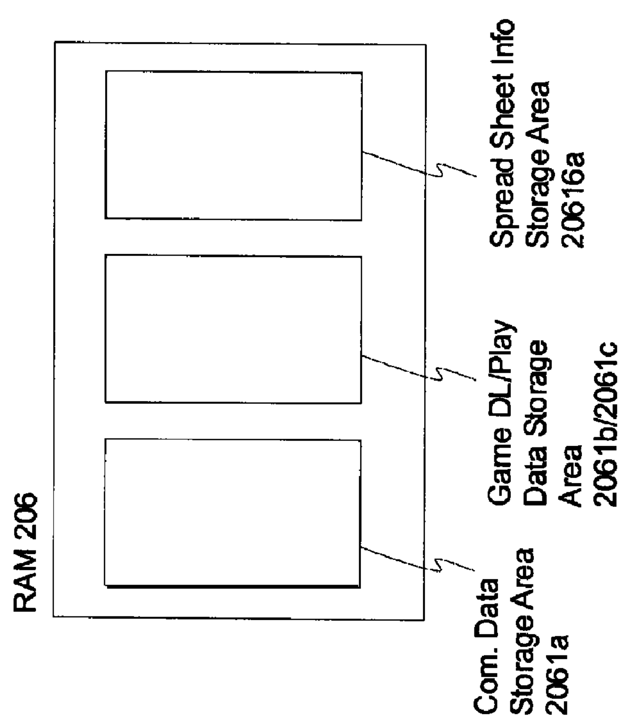
FIG. 60 is a block diagram illustrating an exemplary embodiment of the present invention.

FIG. 60 illustrates the data stored in RAM 206 (FIG. 1). As described in FIG. 60, the data to activate (as described in S3a of the previous figure) and to perform the communication mode is stored in Communication Data Storage Area 2061a, the data to activate (as described in S3b of the previous figure) and to perform the game download mode and the game play mode are stored in Game DL/Play Data Storage Area 2061b/2061c of which the details are described in FIG. 168, and the data to activate (as described in S3c of the previous figure) and to perform the spreadsheet function is stored in Spreadsheet Information Storage Area 20616a.

Figure 61:
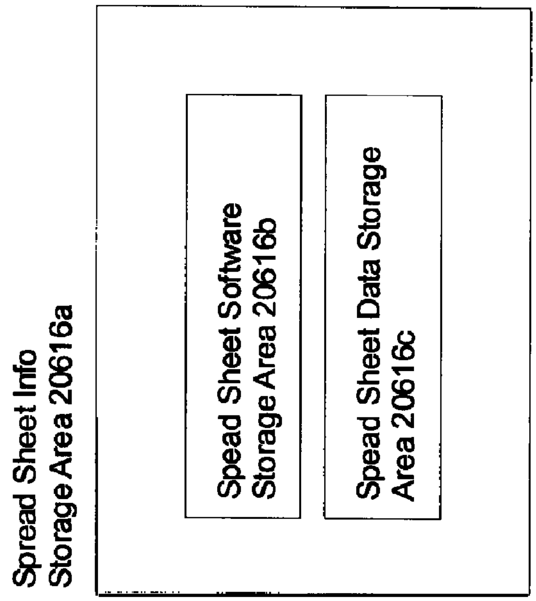
FIG. 61 is a block diagram illustrating an exemplary embodiment of the present invention.

FIG. 61 illustrates the data stored in Spreadsheet Information Storage Area 20616a (FIG. 60). As described in FIG. 61, Spreadsheet Information Storage Area 20616a includes Spreadsheet Software Storage Area 20616b and Spreadsheet Data Storage Area 20616c. Spreadsheet Software Storage Area 20616b stores the software programs to implement the present function, such as the one explained in FIG. 62, and Spreadsheet Data Storage Area 20616c stores a plurality of data necessary to execute the software programs stored in Spreadsheet Software Storage Area 20616b and to implement the present function.

Figure 62:
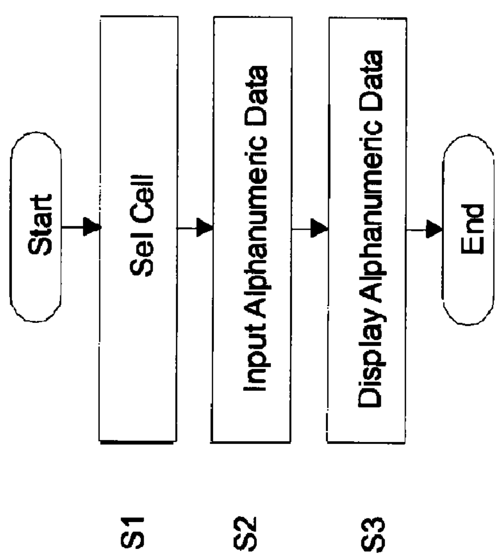
FIG. 62 is a flowchart illustrating an exemplary embodiment of the present invention.

FIG. 62 illustrates the software program stored in Spreadsheet Software Storage Area 20616b (FIG. 61). Referring to FIG. 62, a certain cell of a plurality of cells displayed on LCD 201 (FIG. 1) is selected by utilizing Input Device 210 (FIG. 1) or via voice recognition system. The selected cell is highlighted by a certain manner, and CPU 211 (FIG. 1) stores the location of the selected cell in Spreadsheet Data Storage Area 20616c (FIG. 61) (S1). One or more of alphanumeric data are input by utilizing Input Device 210 or via voice recognition system into the cell selected in S1, and CPU 211 stores the alphanumeric data in Spreadsheet Data Storage Area 20616c (S2). CPU 211 displays the alphanumeric data on LCD 201 thereafter (S3). The sequence of S1 through S3 can be repeated for a numerous amount of times and saved and closed thereafter.

<<Word Processing Function>>

FIG. 63 through FIG. 76 illustrate the word processing function of Communication Device 200. By way of implementing such function, Communication Device 200 can be utilized as a word processor which has the similar functions to Microsoft Words. The word processing function primarily includes the following functions: the bold formatting function, the italic formatting function, the image pasting function, the font formatting function, the spell check function, the underlining function, the page numbering function, and the bullets and numbering function. Here, the bold formatting function makes the selected alphanumeric data bold. The italic formatting function makes the selected alphanumeric data italic. The image pasting function pastes the selected image to a document to the selected location. The font formatting function changes the selected alphanumeric data to the selected font. The spell check function fixes spelling and grammatical errors of the alphanumeric data in the document. The underlining function adds underlines to the selected alphanumeric data. The page numbering function adds page numbers to each page of a document at the selected location. The bullets and numbering function adds the selected type of bullets and numbers to the selected paragraphs.

Figure 63:
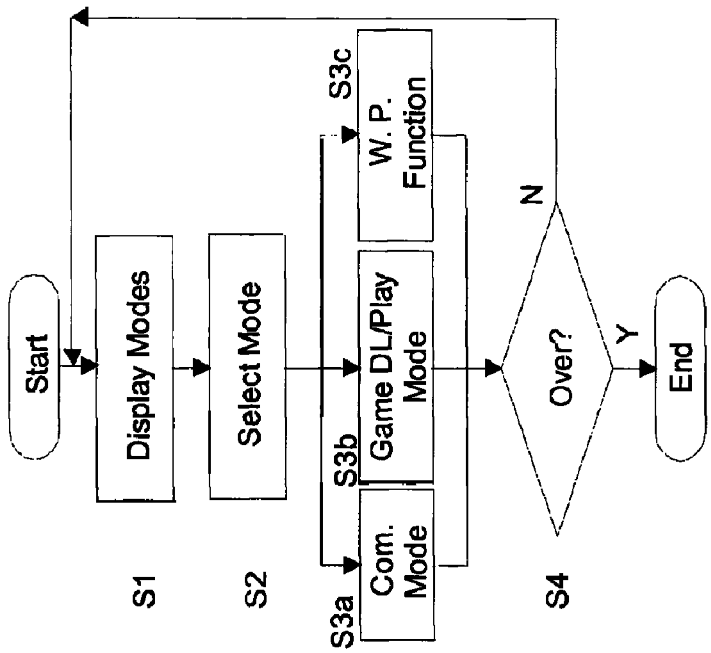
FIG. 63 is a flowchart illustrating an exemplary embodiment of the present invention.

FIG. 63 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in FIG. 167, and the word processing function is activated (S3c) when the word processing function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Figure 64:
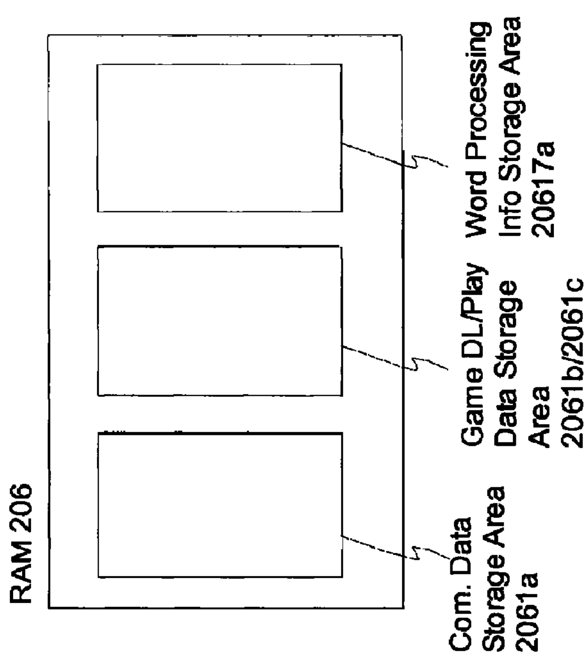
FIG. 64 is a block diagram illustrating an exemplary embodiment of the present invention.

FIG. 64 illustrates the data stored in RAM 206 (FIG. 1). As described in FIG. 64, the data to activate (as described in S3a of the previous figure) and to perform the communication mode is stored in Communication Data Storage Area 2061a, the data to activate (as described in S3b of the previous figure) and to perform the game download mode and the game play mode are stored in Game DL/Play Data Storage Area 2061b/2061c of which the details are described in FIG. 168, and the data to activate (as described in S3c of the previous figure) and to perform the word processing function is stored in Word Processing Information Storage Area 20617a.

Figure 65:
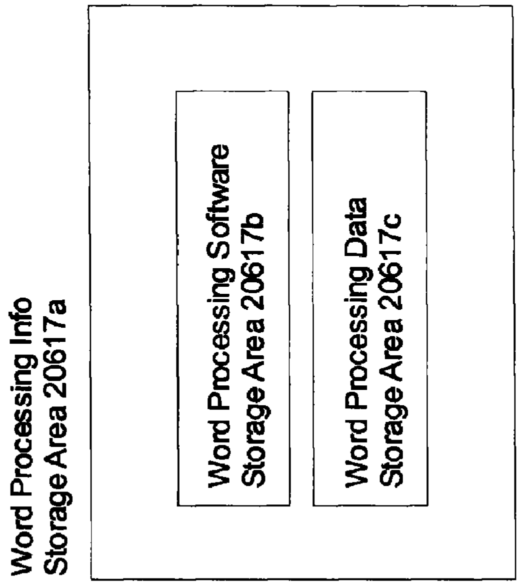
FIG. 65 is a block diagram illustrating an exemplary embodiment of the present invention.

FIG. 65 illustrates the data stored in Word Processing Information Storage Area 20617a (FIG. 64). As described in FIG. 65, Word Processing Information Storage Area 20617a includes Word Processing Software Storage Area 20617b and Word Processing Data Storage Area 20617c. Word processing Software Storage Area 20617b stores the software programs described in FIG. 66 hereinafter, and Word Processing Data Storage Area 20617c stores a plurality of data described in FIG. 67 hereinafter.

Figure 66:
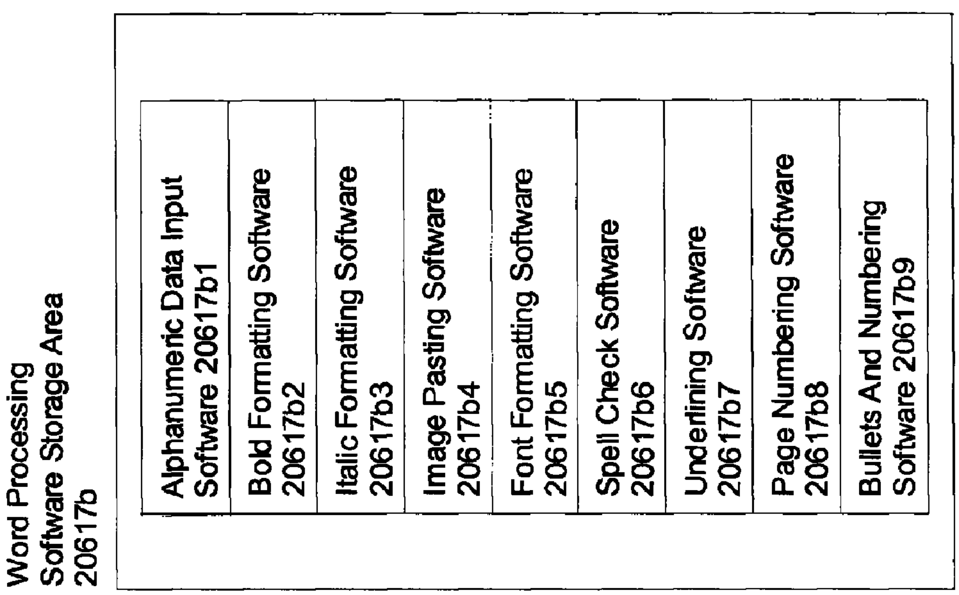
FIG. 66 is a block diagram illustrating an exemplary embodiment of the present invention.

FIG. 66 illustrates the software programs stored in Word Processing Software Storage Area 20617b (FIG. 65). As described in FIG. 66, Word Processing Software Storage Area 20617b stores Alphanumeric Data Input Software 20617b1, Bold Formatting Software 20617b2, Italic Formatting Software 20617b3, Image Pasting Software 20617b4, Font Formatting Software 20617b5, Spell Check Software 20617b6, Underlining Software 20617b7, Page Numbering Software 20617b8, and Bullets And Numbering Software 20617b9.

Alphanumeric Data Input Software **20617*b*1 inputs to a document a series of alphanumeric data in accordance to the input signals produced by utilizing Input Device 210 (FIG. 1) or via voice recognition system. Bold Formatting Software 20617*b*2 implements the bold formatting function which makes the selected alphanumeric data bold of which the sequence is described in FIG. 69. Italic Formatting Software 20617*b*3 implements the italic formatting function which makes the selected alphanumeric data italic of which the sequence is described in FIG. 70. Image Pasting Software 20617*b*4 implements the image pasting function which pastes the selected image to a document to the selected location of which the sequence is described in FIG. 71. Font Formatting Software 20617*b*5 implements the font formatting function which changes the selected alphanumeric data to the selected font of which the sequence is described in FIG. 72. Spell Check Software 20617*b*6 implements the spell check function which fixes spelling and grammatical errors of the alphanumeric data in a document of which the sequence is described in FIG. 73. Underlining Software 20617*b*7 implements the underlining function which adds the selected underlines to the selected alphanumeric data of which the sequence is described in FIG. 74. Page Numbering Software 20617*b*8 implements the page numbering function which adds page numbers at the selected location to each page of a document of which the sequence is described in FIG. 75. Bullets And Numbering Software 20617*b*9 implements the bullets and numbering function which adds the selected type of bullets and numbers to the selected paragraphs of which the sequence is described in FIG. 76**.

Figure 67:
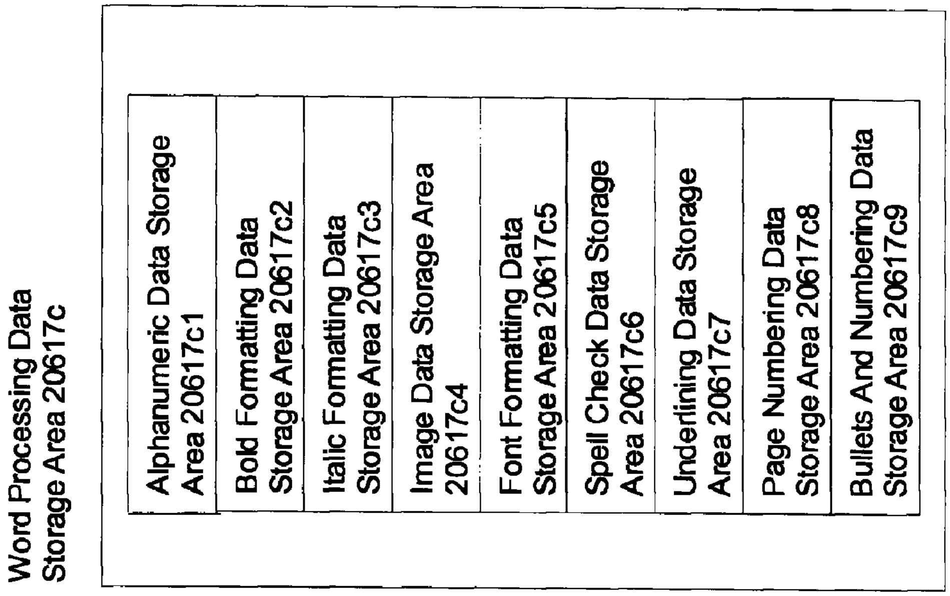
FIG. 67 is a block diagram illustrating an exemplary embodiment of the present invention.

FIG. 67 illustrates the data stored in Word Processing Data Storage Area **20617*c* (FIG. 65). As described in FIG. 67, Word Processing Data Storage Area 20617*c* includes Alphanumeric Data Storage Area 20617*c*1, Bold Formatting Data Storage Area 20617*c*2, Italic Formatting Data Storage Area 20617*c*3, Image Data Storage Area 20617*c*4, Font Formatting Data Storage Area 20617*c*5, Spell Check Data Storage Area 20617*c*6, Underlining Data Storage Area 20617*c*7, Page Numbering Data Storage Area 20617*c*8, and Bullets And Numbering Data Storage Area 20617*c*9. Alphanumeric Data Storage Area 20617*c*1 stores the basic text and numeric data which are not decorated by bold and/or italic (the default font may be courier new). Bold Formatting Data Storage Area 20617*c*2 stores the text and numeric data which are decorated by bold. Italic Formatting Data Storage Area 20617*c*3 stores the text and numeric data which are decorated by italic. Image Data Storage Area 20617*c*4 stores the data representing the location of the image data pasted in a document and the image data itself. Font Formatting Data Storage Area 20617*c*5 stores a plurality of types of fonts, such as arial, century, courier new, tahoma, and times new roman, of all text and numeric data stored in Alphanumeric Data Storage Area 20617*c*1. Spell check Data Storage Area 20617*c*6 stores a plurality of spell check data, i.e., a plurality of correct text and numeric data for purposes of being compared with the alphanumeric data input in a document and a plurality of pattern data for purposes of checking the grammatical errors therein. Underlining Data Storage Area 20617*c*7 stores a plurality of data representing underlines of different types. Page Numbering Data Storage Area 20617*c*8 stores the data representing the location of page numbers to be displayed in a document and the page number of each page of a document. Bullets And Numbering Data Storage Area 20617*c*9** stores a plurality of data representing different types of bullets and numbering and the location which they are added.

Figure 68:
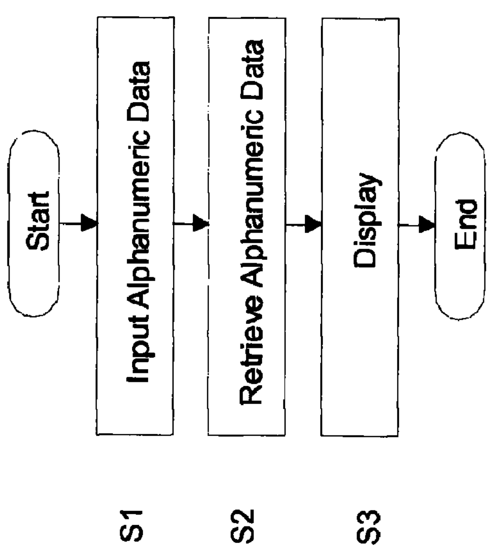
FIG. 68 is a flowchart illustrating an exemplary embodiment of the present invention.

FIG. 68 illustrates the sequence of the software program stored in Alphanumeric Data Input Software **20617*b*1. As described in FIG. 68, a plurality of alphanumeric data is input by utilizing Input Device 210 (FIG. 1) or via voice recognition system (S1). The corresponding alphanumeric data is retrieved from Alphanumeric Data Storage Area 20617*c*1 (FIG. 67) (S2), and the document including the alphanumeric data retrieved in S2 is displayed on LCD 201 (FIG. 1) (S3**).

Figure 69:
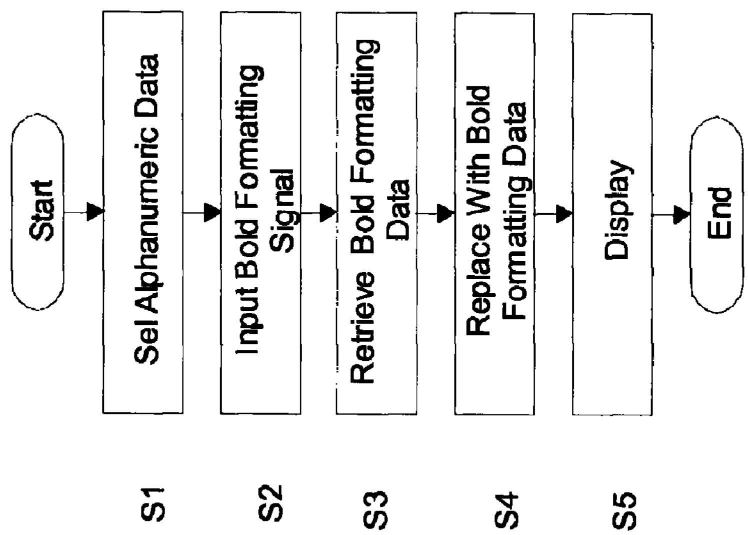
FIG. 69 is a flowchart illustrating an exemplary embodiment of the present invention.

FIG. 69 illustrates the sequence of the software program stored in Bold Formatting Software **20617*b*2. As described in FIG. 69, one or more of alphanumeric data are selected by utilizing Input Device 210 (FIG. 1) or via voice recognition system (S1). Next, a bold formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the bold formatting data from Bold Formatting Data Storage Area 20617*c*2 (FIG. 67) (S3), and replaces the alphanumeric data selected in S1 with the bold formatting data retrieved in S3 (S4). The document with the replaced bold formatting data is displayed on LCD 201 thereafter (S5**).

Figure 70:
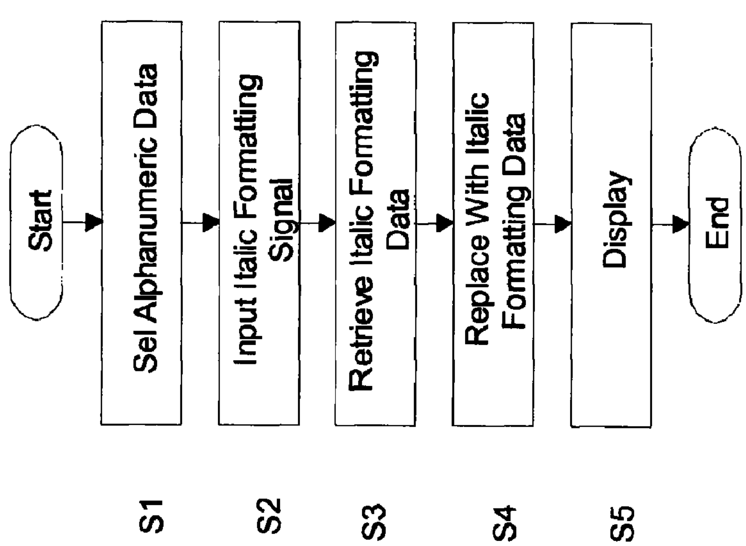
FIG. 70 is a flowchart illustrating an exemplary embodiment of the present invention.

FIG. 70 illustrates the sequence of the software program stored in Italic Formatting Software **20617*b*3. As described in FIG. 70, one or more of alphanumeric data are selected by utilizing Input Device 210 (FIG. 1) or via voice recognition system (S1). Next, an italic formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the italic formatting data from Italic Formatting Data Storage Area 20617*c*3 (FIG. 67) (S3), and replaces the alphanumeric data selected in S1 with the italic formatting data retrieved in S3 (S4). The document with the replaced italic formatting data is displayed on LCD 201 thereafter (S5**).

Figure 71:
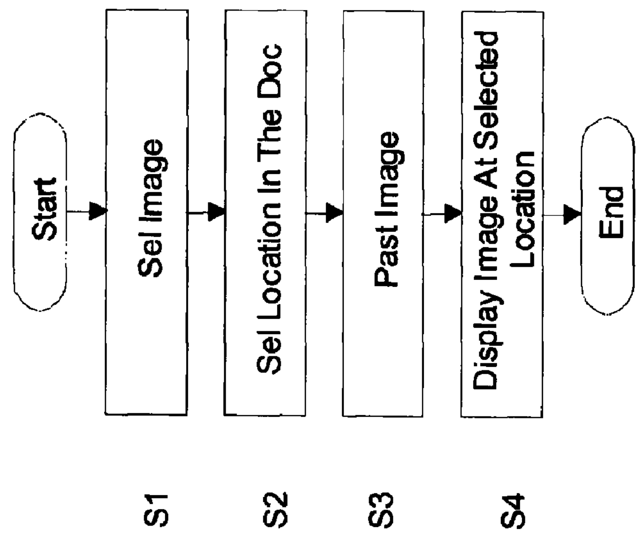
FIG. 71 is a flowchart illustrating an exemplary embodiment of the present invention.

FIG. 71 illustrates the sequence of the software program stored in Image Pasting Software **20617*b*4. As described in FIG. 71, the image to be pasted is selected by utilizing Input Device 210 (FIG. 1) or via voice recognition system (S1). Here, the image may be of any type, such as JPEG, GIF, and TIFF. Next the location in a document where the image is to be pasted is selected by utilizing Input Device 210 or via voice recognition system (S2). The data representing the location is stored in Image Pasting Data Storage Area 20617*c*4 (FIG. 67). The image is pasted at the location selected in S2 and the image is stored in Image Pasting Data Storage Area 20617*c*4 (S3). The document with the pasted image is displayed on LCD 201 (FIG. 1) thereafter (S4**).

Figure 72:
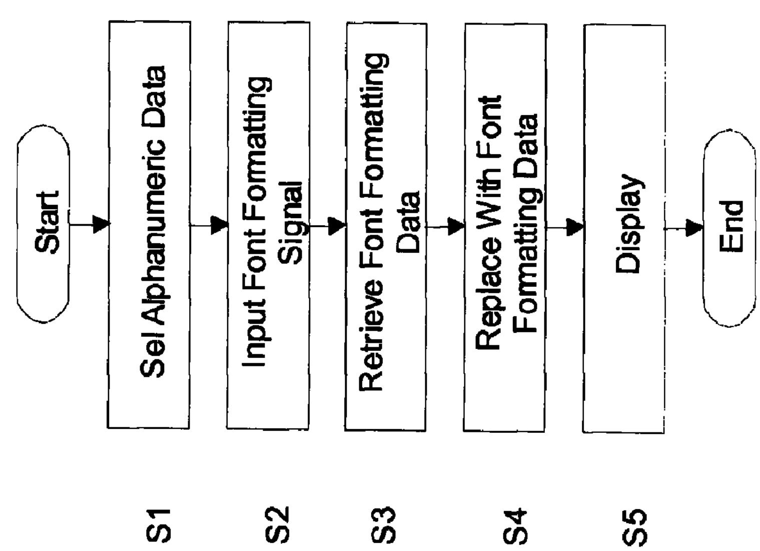
FIG. 72 is a flowchart illustrating an exemplary embodiment of the present invention.

FIG. 72 illustrates the sequence of the software program stored in Font Formatting Software **20617*b*5. As described in FIG. 72, one or more of alphanumeric data are selected by utilizing Input Device 210 (FIG. 1) or via voice recognition system (S1). Next, a font formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the font formatting data from Italic Formatting Data Storage Area 20617*c*5 (FIG. 67) (S3), and replaces the alphanumeric data selected in S1 with the font formatting data retrieved in S3 (S4). The document with the replaced font formatting data is displayed on LCD 201 thereafter (S5**).

Figure 73:
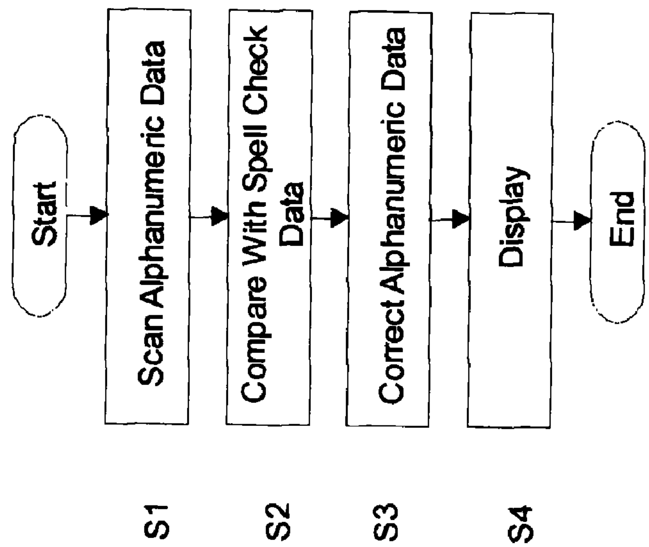
FIG. 73 is a flowchart illustrating an exemplary embodiment of the present invention.

FIG. 73 illustrates the sequence of the software program stored in Spell Check Software **20617*b*6. As described in FIG. 73, CPU 211 (FIG. 1) scans all alphanumeric data in a document (S1). CPU 211 then compares the alphanumeric data with the spell check data stored in Spell Check Data Storage Area 20617*c*6 (FIG. 67), i.e., a plurality of correct text and numeric data for purposes of being compared with the alphanumeric data input in a document and a plurality of pattern data for purposes of checking the grammatical errors therein (S2). CPU 211 corrects the alphanumeric data and/or corrects the grammatical errors (S3), and the document with the corrected alphanumeric data is displayed on LCD 201 (FIG. 1) (S4**).

Figure 74:
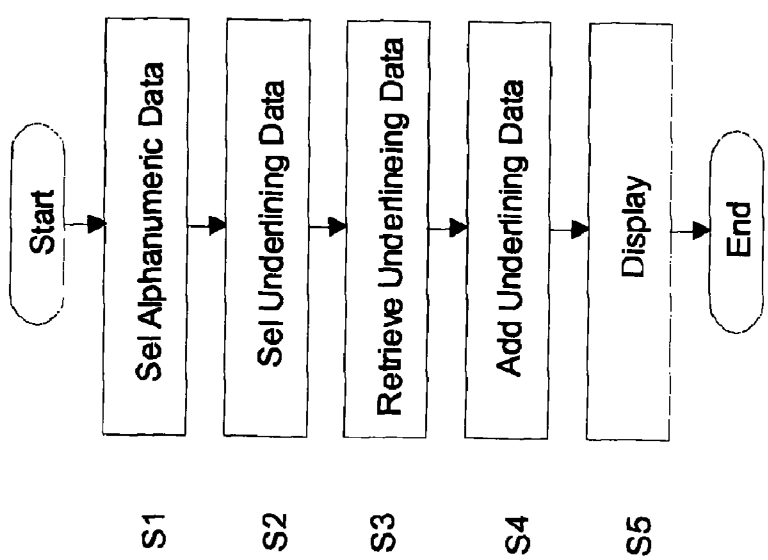
FIG. 74 is a flowchart illustrating an exemplary embodiment of the present invention.

FIG. 74 illustrates the sequence of the software program stored in Underlining Software 20617*b*7. As described in FIG. 74, one or more of alphanumeric data are selected by utilizing Input Device 210 (FIG. 1) or via voice recognition system (S1). Next, an underlining signal is input by utilizing Input Device 210 (e.g., selecting a specific icon displayed on LCD 201 (FIG. 1) or selecting a specific item from a pulldown menu) or via voice recognition system to select the type of the underline to be added (S2). CPU 211 (FIG. 1) then retrieves the underlining data from Underlining Data Storage Area 20617*c*7 (FIG. 67) (S3), and adds to the alphanumeric data selected in S1 (S4). The document with underlines added to the selected alphanumeric data is displayed on LCD 201 thereafter (S5).

Figure 75:
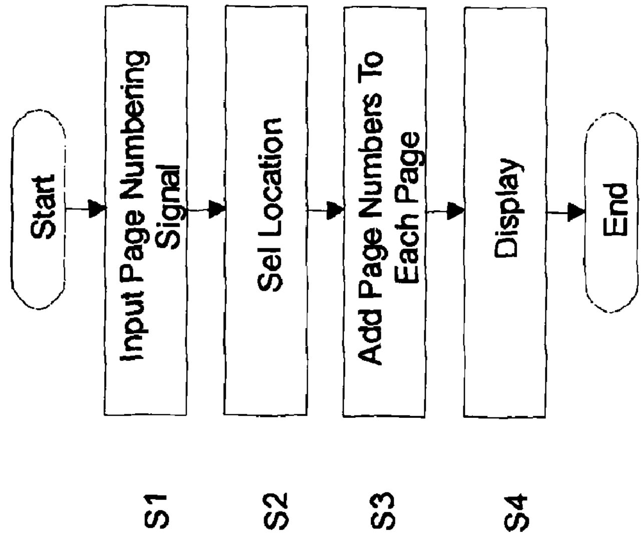
FIG. 75 is a flowchart illustrating an exemplary embodiment of the present invention.

FIG. 75 illustrates the sequence of the software program stored in Page Numbering Software 20617*b*8. As described in FIG. 75, a page numbering signal is input by utilizing Input Device 210 (FIG. 1) or via voice recognition system (S1). Next, the location to display the page number is selected by utilizing Input Device 210 or via voice recognition system (S2). CPU 211 (FIG. 1) then stores the location of the page number to be displayed in Page Numbering Storage Area 20617*c*8 (FIG. 67), and adds the page number to each page of a document at the selected location (S3). The document with page numbers is displayed on LCD 201 thereafter (S4).

Figure 76:
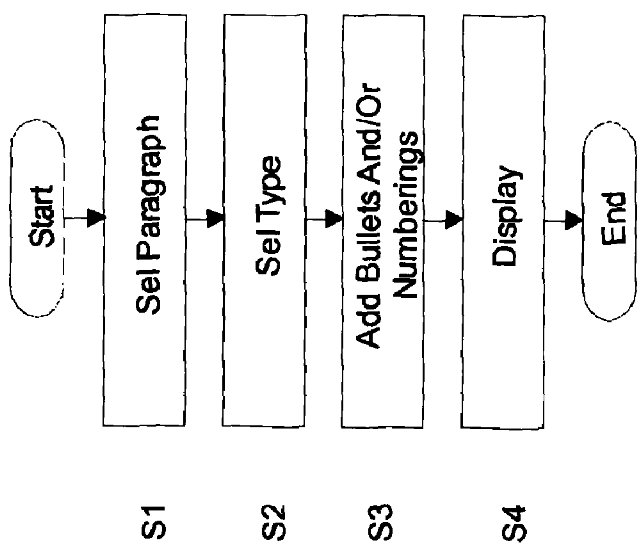
FIG. 76 is a flowchart illustrating an exemplary embodiment of the present invention.

FIG. 76 illustrates the sequence of the software program stored in Bullets And Numbering Software 20617*b*9. As described in FIG. 76, a paragraph is selected by utilizing input device 210 (FIG. 1) or via voice recognition system (S1). Next, the type of the bullets and/or numbering is selected by utilizing Input Device 210 or via voice recognition system (S2). CPU 211 (FIG. 1) then stores the identification data of the paragraph selected in S1 and the type of the bullets and/or numbering in Bullets And Numbering Data Storage Area 20617*c*9 (FIG. 67), and adds the bullets and/or numbering to the selected paragraph of a document (S3). The document with the bullets and/or numbering is displayed on LCD 201 thereafter (S4).

<<TV Remote Controller Function>>

FIG. 77 through FIG. 97 illustrate the TV remote controller function which enables Communication Device 200 to be utilized as a TV remote controller.

Figure 77:
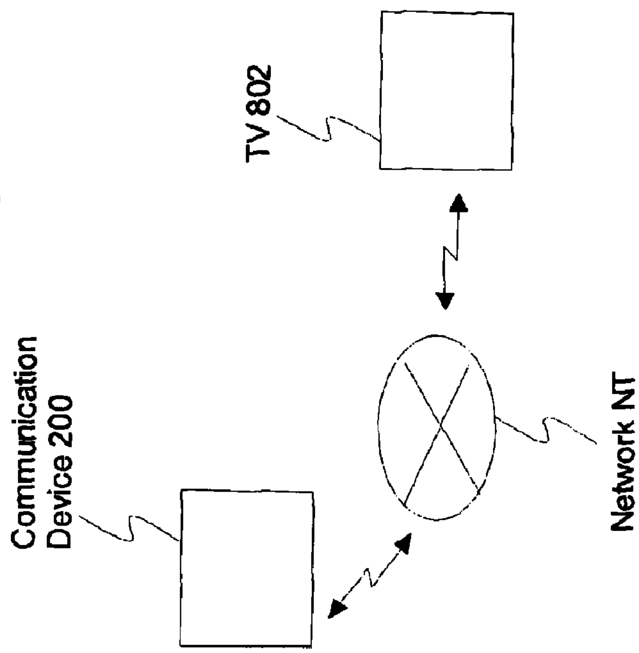
FIG. 77 is a simplified illustration illustrating an exemplary embodiment of the present invention.

FIG. 77 illustrates the connection between Communication Device 200 and TV 802. As described in FIG. 77, Communication Device 200 is connected in a wireless fashion to Network NT, such as the Internet, and Network NT is connected to TV 802 in a wireless fashion. Communication Device 200 may be connected to TV 802 via one or more of artificial satellites, for example, in the manner described in FIG. 2, FIG. 3, and FIG. 4. Communication Device 200 may also be connected to TV 802 via Sub-host as described in FIG. 105.

Figure 78:
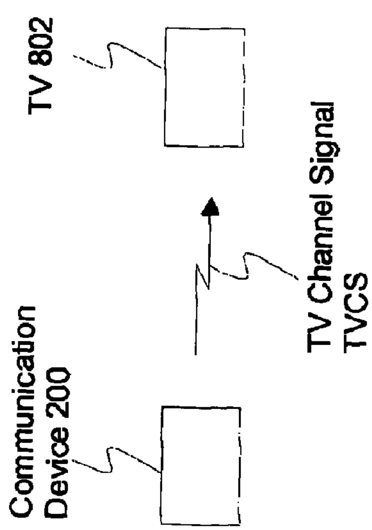
FIG. 78 is a simplified illustration illustrating an exemplary embodiment of the present invention.

FIG. 78 illustrates another embodiment of connecting Communication Device 200 with TV 802. As described in FIG. 78, Communication Device 200 may directly connect to TV 802 in a wireless fashion. Here, Communication Device 200 may utilize Antenna 218 (FIG. 1) and/or LED 219 as described in FIG. 83 hereinafter to be connected with TV 802 in a wireless fashion.

Figure 79:
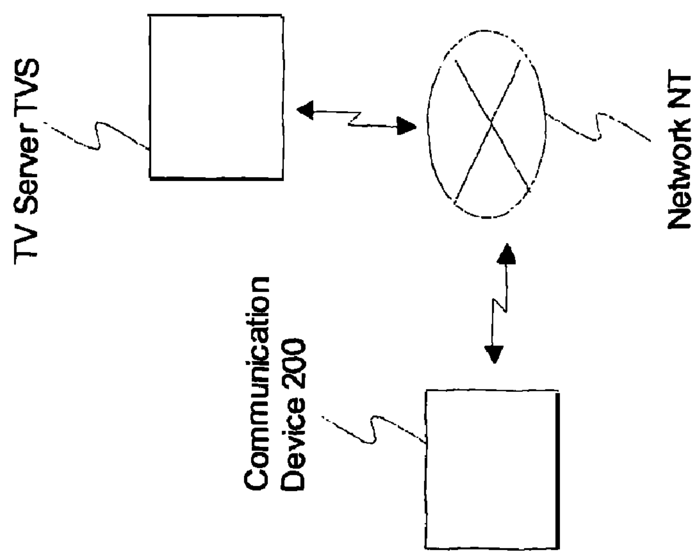
FIG. 79 is a simplified illustration illustrating an exemplary embodiment of the present invention.

FIG. 79 illustrates the connection between Communication Device 200 and TV Server TVS. As described in FIG. 79, Communication Device 200 is connected in a wireless fashion to Network NT, such as the Internet, and Network NT is connected to TV Server TVS in a wireless fashion. Communication Device 200 may be connected to TV Server TVS via one or more of artificial satellites and/or TV Server TVS may be carried by an artificial satellite, for example, in the manner described in FIG. 2, FIG. 3, and FIG. 4.

Figure 80:
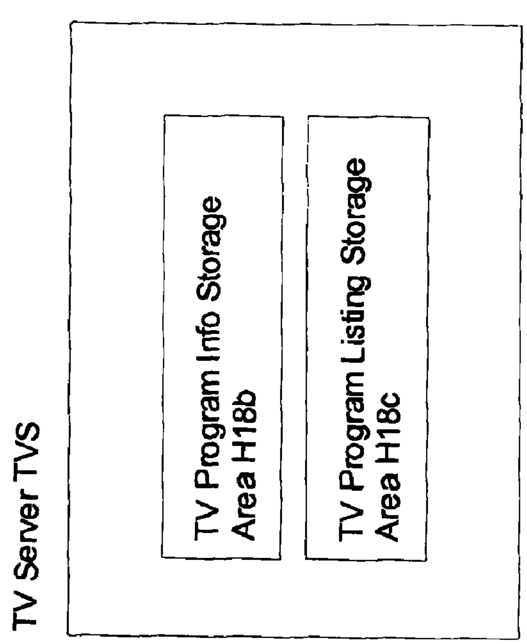
FIG. 80 is a block diagram illustrating an exemplary embodiment of the present invention.

FIG. 80 illustrates the data stored in TV Server TVS (FIG. 79). As described in FIG. 80, TV Server TVS includes TV Program Information Storage Area H18*b* of which the details are explained in FIG. 81 hereinafter, and TV Program Listing Storage Area H18*c* of which the details are explained in FIG. 82 hereinafter.

FIG. 81 illustrates the data stored in TV Program Information Storage Area H18*b* (FIG. 80). As described in FIG. 81, TV Program Information Storage Area H18*b* includes five types of data: 'CH', 'Title', 'Sum', 'Start', 'Stop', and 'Cat'. Here, 'CH' represents the channel number of the TV programs available on TV 802 (FIG. 78); 'Title' represents the title of each TV program; 'Sum' represents the summary of each TV program; 'Start' represents the starting time of each TV program; 'Stop' represents the ending time of each TV program, and 'Cat' represents the category to which each TV program pertains.

FIG. 82 illustrates the data stored in TV Program Listing Storage Area H18*c* (FIG. 80). As described in FIG. 82, TV Program Listing Storage Area H18*c* includes four types of data: 'CH', 'Title', 'Start', and 'Stop'. Here, 'CH' represents the channel number of the TV programs available on TV 802 (FIG. 78); 'Title' represents the title of each TV program; 'Start' represents the starting time of each TV program; and 'Stop' represents the ending time of each TV program. The data stored in TV Program Listing Storage Area H18*c* are designed to be 'clipped' and to be displayed on LCD 201 (FIG. 1) of Communication Device 200 in the manner described in FIG. 92 and FIG. 94. As another embodiment, TV Program Listing Storage Area H18*c* may be combined with TV Program Information Storage Area H18*b* (FIG. 81) and extract the data of 'CH', 'Title', 'Start', and 'Stop' therefrom.

Figure 83:
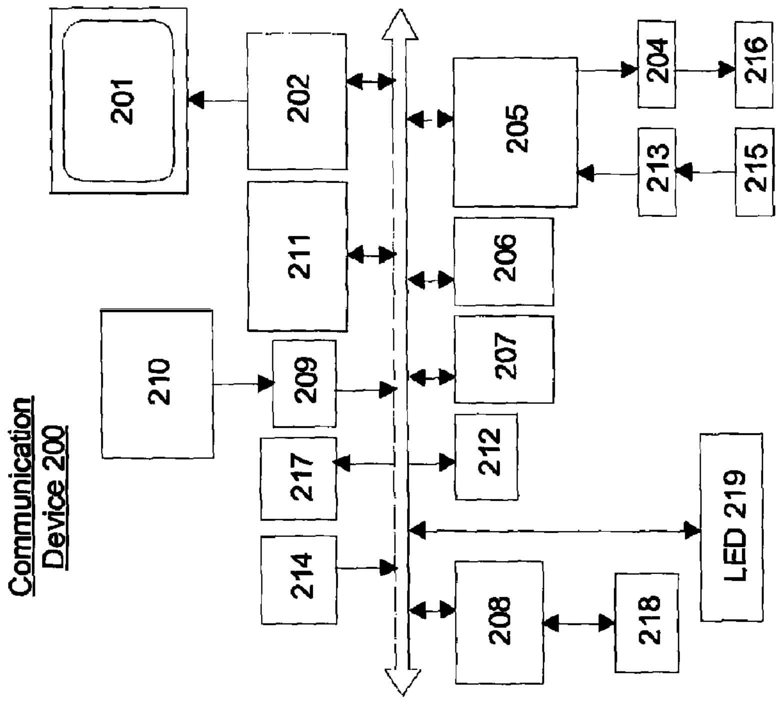
FIG. 83 is a block diagram illustrating an exemplary embodiment of the present invention.

FIG. 83 illustrates the elements of Communication Device 200. The elements of Communication Device 200 described in FIG. 83 is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to FIG. 83 in this specification.

Figure 84:
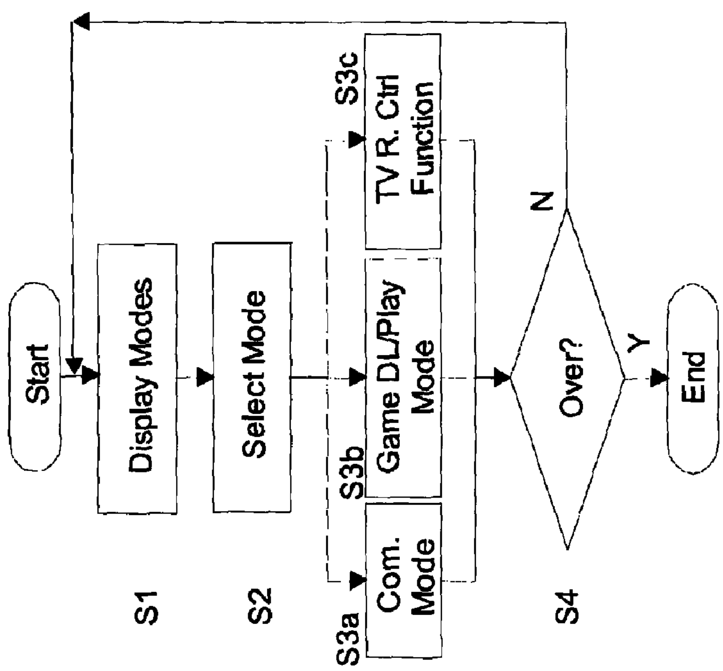
FIG. 84 is a flowchart illustrating an exemplary embodiment of the present invention.

FIG. 84 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 167, and the TV remote controller function is activated (S3*c*) when the TV remote controller function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

Figure 85:
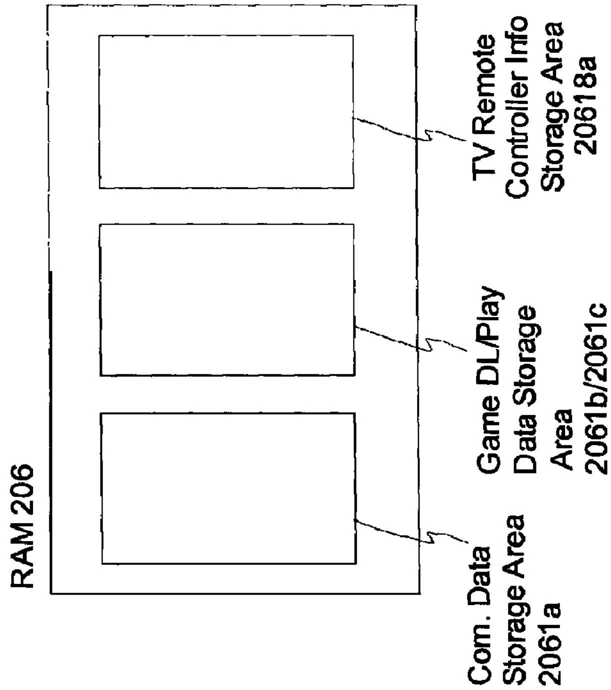
FIG. 85 is a block diagram illustrating an exemplary embodiment of the present invention.

FIG. 85 illustrates the data stored in RAM 206 (FIG. 1). As described in FIG. 85, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 168, and the data to activate (as described in S3*c* of the previous figure) and to perform the TV remote controller function is stored in TV Remote Controller Information Storage Area 20618*a*.

Figure 86:
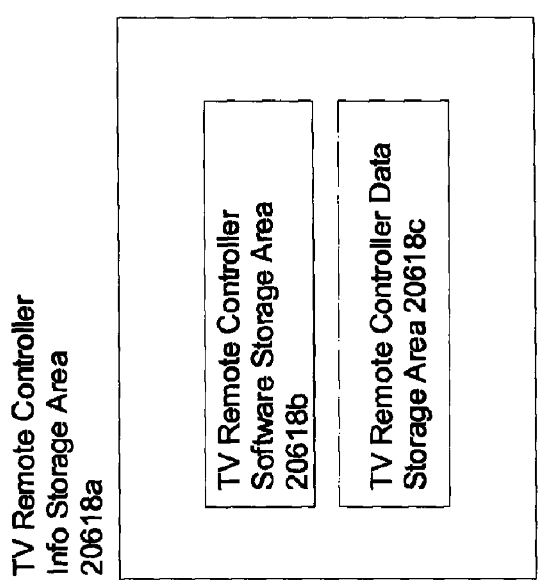
FIG. 86 is a block diagram illustrating an exemplary embodiment of the present invention.

FIG. 86 illustrates the data stored in TV Remote Controller Information Storage Area 20618*a*. As described in FIG. 86, TV Remote Controller Information Storage Area 20618*a* includes TV Remote Controller Software Storage Area 20618*b* and TV Remote Controller Data Storage Area 20618*c*. TV Remote Controller Software Storage Area 20618*b* stores a plurality of software programs to implement the present function, such as the ones described in FIG. 89, FIG. 91, FIG. 93, FIG. 95, and FIG. 97, and TV Remote Controller Data Storage Area 20618*c* stores a plurality of data to implement the present function such as the ones described in FIG. 87 hereinafter.

Figure 87:
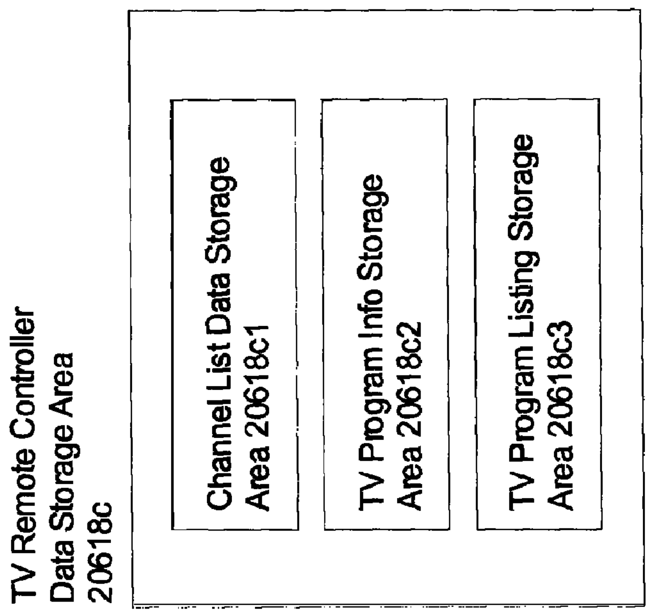
FIG. 87 is a block diagram illustrating an exemplary embodiment of the present invention.

FIG. 87 illustrates the data stored in TV Remote Controller Data Storage Area 20618*c* (FIG. 86). As described in FIG. 87, TV Remote Controller Data Storage Area 20618*c* includes, Channel List Data Storage Area 20618*c*1, TV Program Information Storage Area 20618*c*2, and TV Program Listing Storage Area 20618*c*3. Channel list Data Storage Area 20618*c*1 stores a list of channel numbers available on TV 802 (FIG. 78). TV Program Information Storage Area 20618*c*2 stores the data transferred from TV Program Information Storage Area H18*b* of TV Server TVS (FIG. 80). The data stored in TV Program Information Storage Area 20618*c*2 is identical to the ones stored in TV Program Information Storage Area H18*b* or may be the portion thereof. TV Program Listing Storage Area 20618*c*3 stores the data transferred from TV Program Listing Storage Area H18*c* of TV Server TVS. The data stored in TV Program Listing Storage Area 20618*c*3 is identical to the ones stored in TV Program Listing Storage Area H18*c* or may be the portion thereof.

Figure 88:
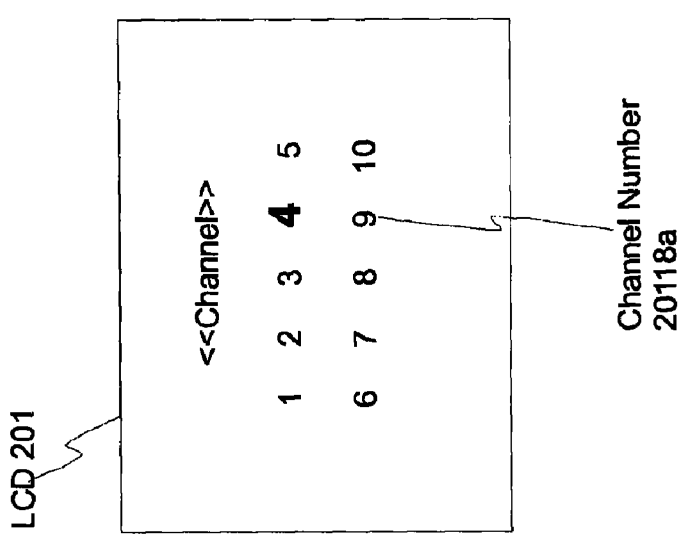
FIG. 88 is a simplified illustration illustrating an exemplary embodiment of the present invention.

FIG. 88 illustrates the Channel Numbers 20118*a* displayed on LCD 201 (FIG. 83). Referring to FIG. 88, ten channel numbers are displayed on LCD 201, i.e., channel numbers '1' through '10'. The highlighted Channel Number 20118*a* is the one which is currently displayed on TV 802 (FIG. 78). In the present example, channel number 20188*a* '4' is highlighted, therefore, Channel 4 is currently shown on TV 802.

Figure 89:
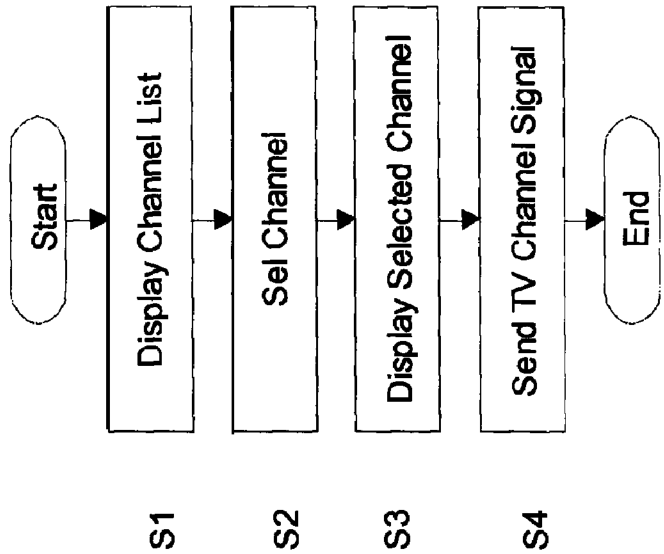
FIG. 89 is a flowchart illustrating an exemplary embodiment of the present invention.

FIG. 89 illustrates one of the software programs stored in TV Remote Controller Software Storage Area 20618*b* (FIG. 86) to display and select Channel Number 20118*a* (FIG. 88). As described in FIG. 89, CPU 211 (FIG. 83) displays a channel list comprising a plurality of Channel Numbers 20118*a* on LCD 201 (FIG. 83) (S1). In the example described in FIG. 87, ten channel numbers are displayed on LCD 201, i.e., channel numbers '1' through '10'. The user of Communication Device 200 inputs a channel selecting signal by utilizing Input Device 210 (FIG. 83) or via voice recognition system (S2). CPU 211 highlights the selected channel in the manner described in FIG. 88 (S3), and sends to TV 802 (FIG. 78) via LED 209 in a wireless fashion the TV channel signal (S4). The TV program of Channel 4 is displayed on TV 802 (FIG. 78) thereafter.

Figure 90:
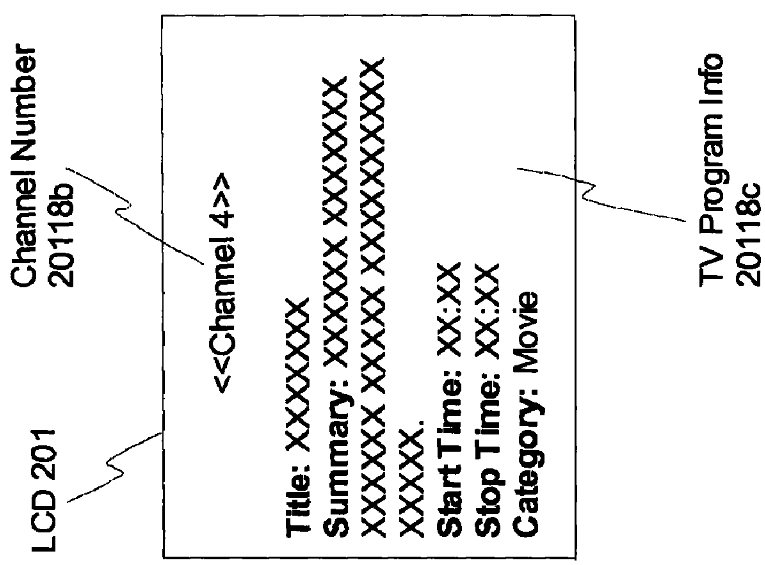
FIG. 90 is a simplified illustration illustrating an exemplary embodiment of the present invention.

FIG. 90 illustrates TV Program Information 20118*c* displayed on LCD 201 (FIG. 83). Referring to FIG. 90, when the user of Communication Device 200 inputs a specific signal utilizing Input Device 210 (FIG. 83) or via voice recognition system, TV Program Information 20118*c* currently shown on Channel Number 20118*b* selected in S2 of FIG. 89 is displayed on LCD 201. TV Program Information 20118*c* includes Channel Number 20118*b*, 'Title', 'Summary', 'Start Time', 'Stop Time', and 'Category'. Here, Channel Number 20118*b* represents the channel number of the TV program currently shown on Channel Number 20118*b* (i.e., the channel number selected in S2 of FIG. 89), 'Title' represents the title of the TV program currently shown on Channel Number 20118*b*, 'Summary' represents the summary of the TV program currently shown on Channel Number 20118*b*, 'Start Time' represents the starting time of the TV program currently shown on Channel Number 20118*b*, 'Stop Time' represents the ending time of the TV program currently shown on Channel Number 20118*b*, and 'Category' represents the category to which the TV program currently shown on Channel Number 20118*b* pertains.

Figure 91:
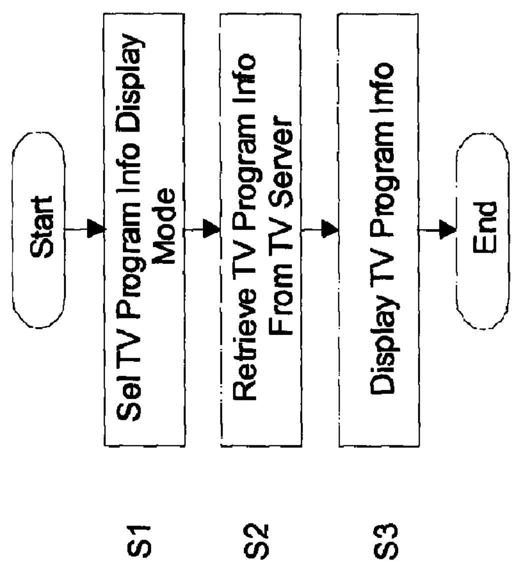
FIG. 91 is a flowchart illustrating an exemplary embodiment of the present invention.

FIG. 91 illustrates one of the software programs stored in TV Remote Controller Software Storage Area 20618*b* (FIG. 86) which displays TV Program Information 20118*c* (FIG. 90) on LCD 201 (FIG. 83). When the user of Communication Device 200 selects the TV program information display mode by utilizing Input Device 210 (FIG. 83) or via voice recognition system (S1), CPU 211 (FIG. 83) accesses TV Server TVS (FIG. 79) and retrieves the data (i.e., 'Title', 'Summary', 'Start Time', 'Stop Time', and 'Category' described in FIG. 90) of TV program currently shown on Channel Number 20118*b* (FIG. 90) from TV Program Information Storage Area H18*b* (FIG. 81) (S2), and displays as TV Program Information 20118*c* on LCD 201 as described in FIG. 90 (S3). TV Program Information 20118*c* may be web-based.

Figure 92:
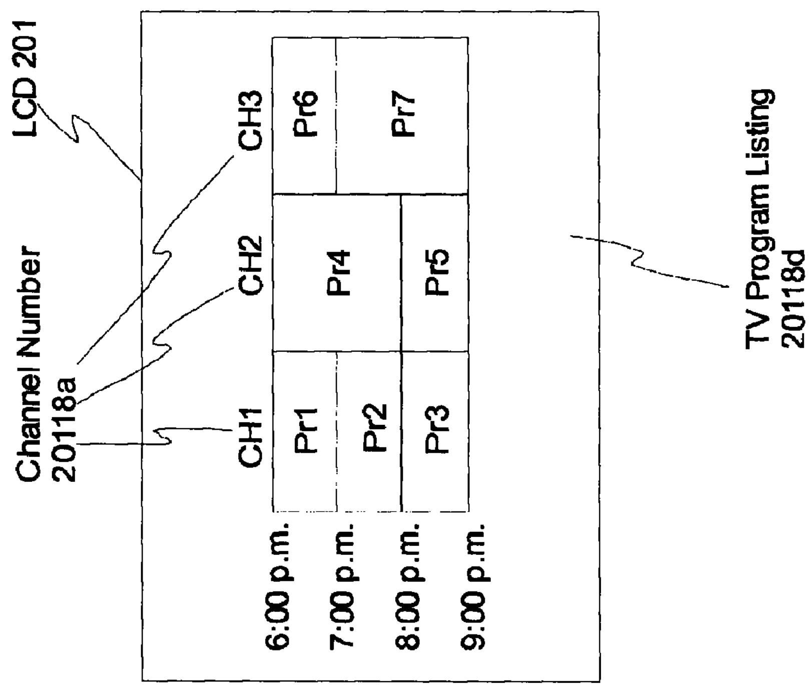
FIG. 92 is a simplified illustration illustrating an exemplary embodiment of the present invention.

FIG. 92 illustrates TV Program Listing 20118*d* displayed on LCD 201 (FIG. 1). In FIG. 92, 'PRn' represents a title of a TV program, and 'CHn' represents Channel Number 20118*a*. Referring to the example described in FIG. 92, TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on Channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (FIG. 83)

is selected by way of moving the cursor displayed thereon by utilizing Input Device 210 (FIG. 83) or via voice recognition system. In the present example, the cursor is located on TV Program Pr 2.

Figure 93:
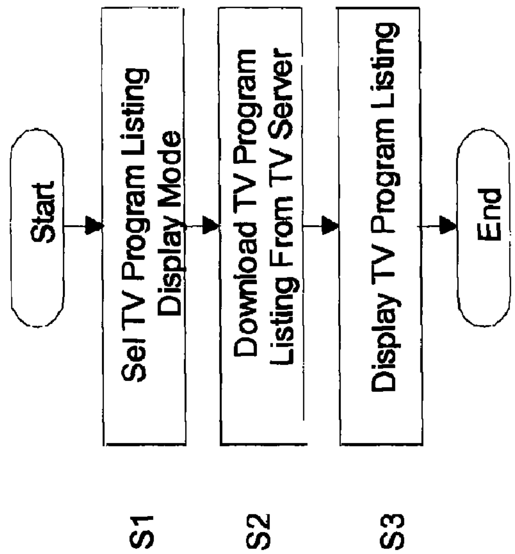
FIG. 93 is a flowchart illustrating an exemplary embodiment of the present invention.

FIG. 93 illustrates one of the software programs stored in TV Remote Controller Software Storage Area 20618*b* (FIG. 86) which displays TV Program Listing 20118*d* (FIG. 92) on LCD 201 (FIG. 83). As described in FIG. 93, when the user of Communication Device 200 selects TV program listing display mode by utilizing Input Device 210 (FIG. 83) or via voice recognition system (S1), CPU 211 (FIG. 83) accesses TV Server TVS (FIG. 79) and retrieves data (i.e., 'Title', 'Start Time', and 'Stop Time') from TV Program Listing Storage Area H18*c* (FIG. 82) (S2), and displays TV Program Listing 20118*d* (FIG. 92) on LCD 201 (S3). TV Program Listing 20118*d* may be web-based.

Figure 94:
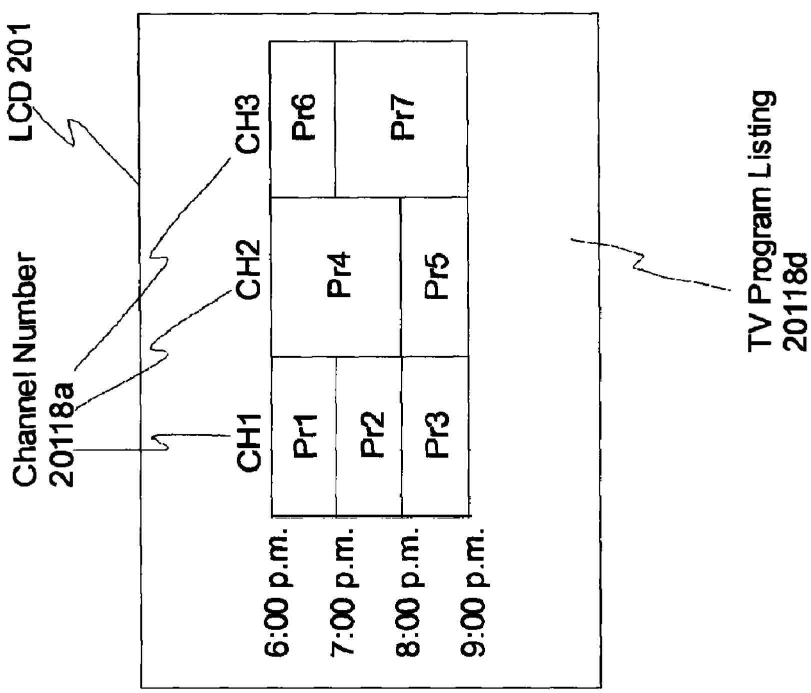
FIG. 94 is a simplified illustration illustrating an exemplary embodiment of the present invention.

FIG. 94 illustrates TV Program Listing 20118*d* displayed on LCD 201 (FIG. 1) which enables to display TV Program Information 20118*c* of a selected TV program described in FIG. 96 hereinafter. In FIG. 94, 'PRn' represents a title of a TV program, and 'CHn' represents Channel Number 20118*a*. Referring to the example described in FIG. 92, TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (FIG. 1) is selected by way of utilizing the cursor displayed thereon. The cursor can be moved from one TV program to another one by utilizing Input Device 210 (FIG. 83) or via voice recognition system. In the present example, the cursor located on Pr 2 (as described in FIG. 92) is moved to Pr4.

Figure 95:
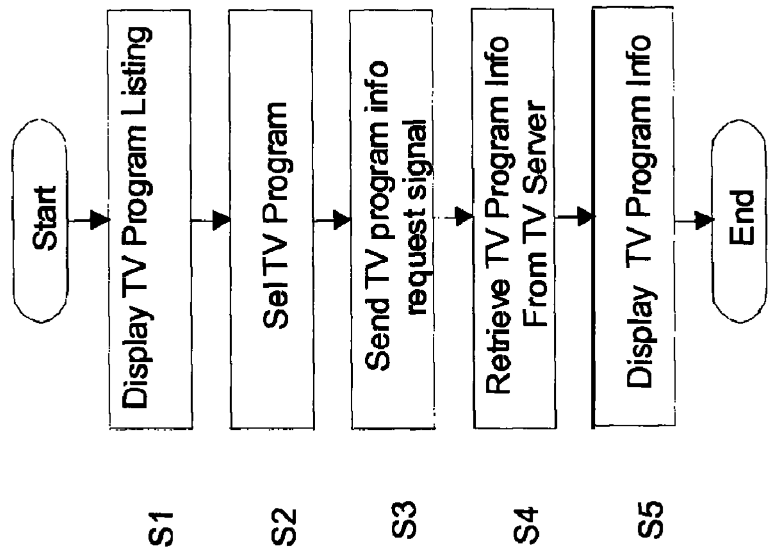
FIG. 95 is a flowchart illustrating an exemplary embodiment of the present invention.

FIG. 95 illustrates the sequence of displaying TV Program Information 20118*c* (FIG. 96) from TV Program Listing 20118*d* (FIG. 94). First, CPU 211 (FIG. 83) displays TV Program Listing 20118*d* (FIG. 94) on LCD 201 (FIG. 83) (S1). Next, the user of Communication Device 200 selects one of the TV programs listed in TV Program Listing 20118*d* by moving the cursor displayed on LCD 201 (S2). CPU 211 sends via Antenna 218 (FIG. 83) to TV Server TVS (FIG. 79) a TV program information request signal indicating TV Server TVS to send TV Program Information 20118*c* of the selected TV program (S3). CPU 211 retrieves TV Program Information 20118*c* from TV Server TVS via Antenna 218 (S4), and displays on LCD 201 thereafter as described in FIG. 96 (S5).

Figure 96:
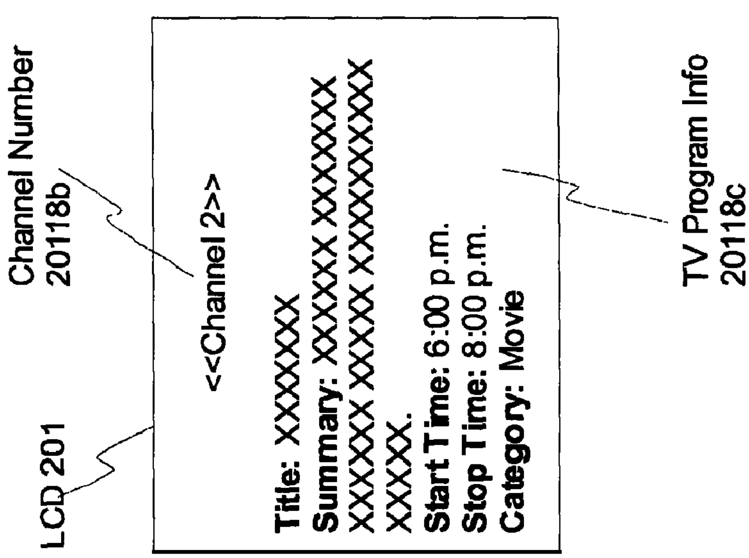
FIG. 96 is a simplified illustration illustrating an exemplary embodiment of the present invention.

FIG. 96 illustrates TV Program Information 20118*c* displayed on LCD 201 (FIG. 83) which is retrieved in S4 of FIG. 95 hereinbefore. Referring to FIG. 96, TV Program Information 20118*c* includes Channel Number 20118*b*, 'Title', 'Summary', 'Start Time', 'Stop Time', and 'Category'. Here, Channel Number 20118*b* represents the channel number of the TV program selected in S2 of FIG. 95, 'Title' represents the title of the TV program selected in S2 of FIG. 95, 'Summary' represents the summary of the TV program selected in S2 of FIG. 95, 'Start Time' represents the starting time of the TV program selected in S2 of FIG. 95, 'Stop Time' represents the ending time of the TV program selected in S2 of FIG. 95, and 'Category' represents the category to which the TV program selected in S2 of FIG. 95 pertains.

Figure 97:
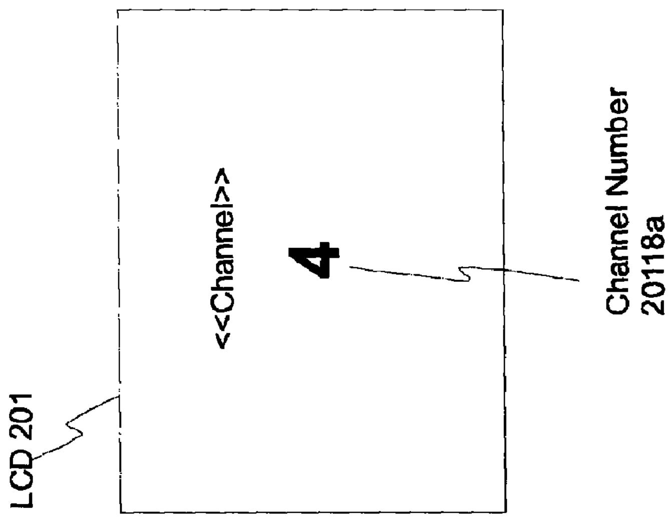
FIG. 97 is a simplified illustration illustrating an exemplary embodiment of the present invention.

FIG. 97 illustrates another embodiment of the method to display Channel Number 20118*a*. Instead of displaying all the available Channel Numbers 20118*a* as described in FIG. 88, only Channel Number 20118*a* currently shown on TV 802 (FIG. 78) may be displayed on LCD 201 (FIG. 83), Channel Number 20118*a* '4' in the present example.

<<Start Up Software Function>>

FIG. 111 through FIG. 120 illustrate the start up software program function which enables Communication Device 200 to automatically activate (or start up) the registered software programs when the power is on.

Figure 111:
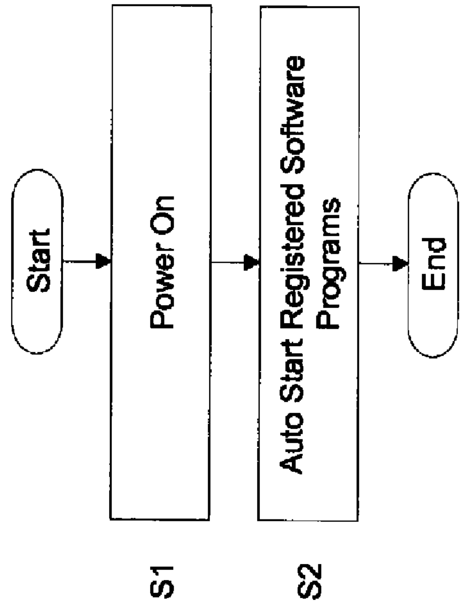
FIG. 111 is a simplified illustration illustrating an exemplary embodiment of the present invention.

FIG. 111 illustrates the overall sequence of the present function. Referring to FIG. 111, the user of Communication Device 200 presses the power button of Communication Device 200 (S1). Then the predetermined software programs automatically activate (or start up) without having any instructions from the user of Communication Device 200 (S2).

Figure 112:
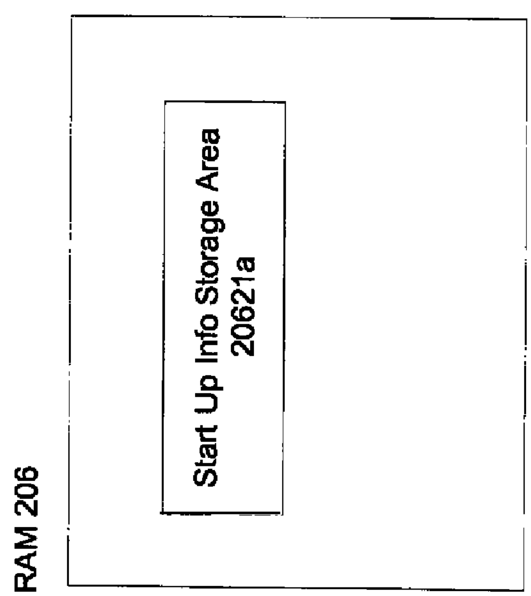
FIG. 112 is a block diagram illustrating an exemplary embodiment of the present invention.

FIG. 112 illustrates the storage area included RAM 206 (FIG. 1). As described in FIG. 112, RAM 206 includes Start Up Information Storage Area 20621*a* which is described in FIG. 113 hereinafter.

Figure 113:
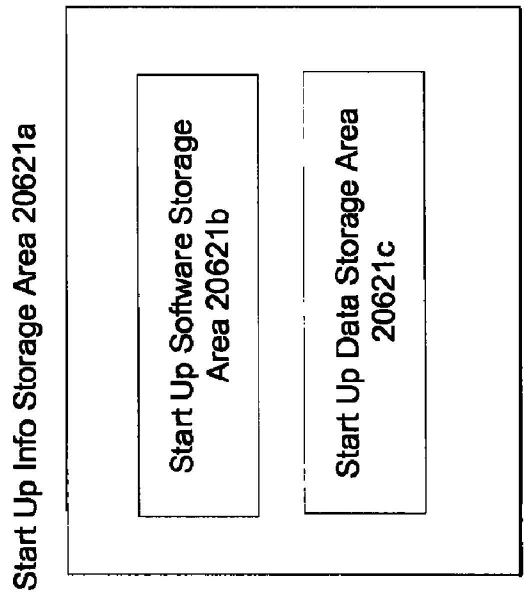
FIG. 113 is a block diagram illustrating an exemplary embodiment of the present invention.

FIG. 113 illustrates the storage areas included in Start Up Information Storage Area 20621*a* (FIG. 112). As described in FIG. 113, Start Up Information Storage Area 20621*a* includes Start Up Software Storage Area 20621*b* and Start Up Data Storage Area 20621*c*. Start Up Software Storage Area 20621*b* stores the software programs necessary to implement the present function, such as the ones described in FIG. 114 hereinafter. Start Up Data Storage Area 20621*c* stores the data necessary to implement the present function, such as the ones described in FIG. 116 hereinafter.

Figure 114:
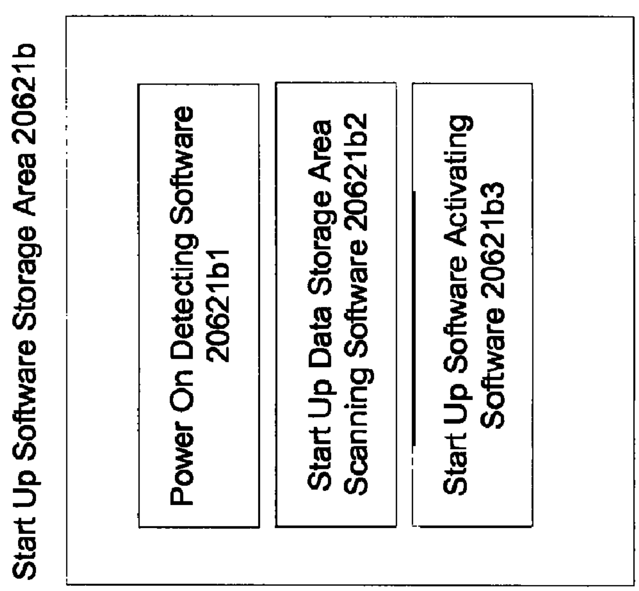
FIG. 114 is a block diagram illustrating an exemplary embodiment of the present invention.

FIG. 114 illustrates the software programs stored in Start Up Software Storage Area 20621*b* (FIG. 113). As described in FIG. 114, Start Up Software Storage Area 20621*b* stores Power On Detecting Software 20621*b*1, Start Up Data Storage Area Scanning Software 20621*b*2, and Start Up Software Activating Software 20621*b*3. Power On Detecting Software 20621*b*1 detects whether the power of Communication Device 200 is on of which the sequence is described in FIG. 117 hereinafter, Start Up Data Storage Area Scanning Software 20621*b*2 identifies the software programs which are automatically activated of which the sequence is described in FIG. 118 hereinafter, and Start Up Software Activating Software 20621*b*3 activates the identified software programs identified by Start Up Data Storage Area Scanning Software 20621*b*2 of which the sequence is described in FIG. 119 hereinafter.

Figure 115:
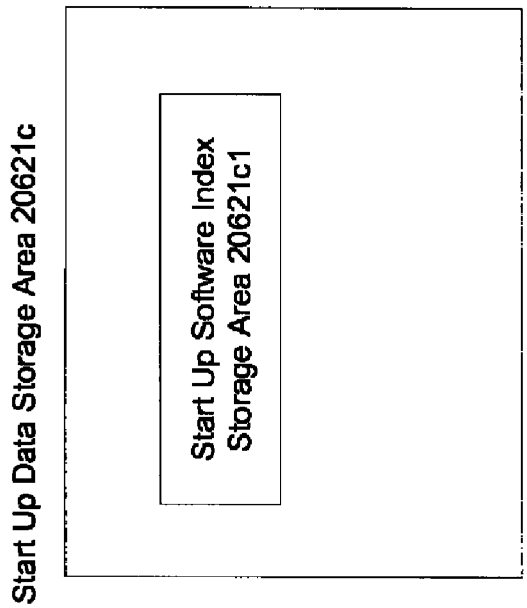
FIG. 115 is a block diagram illustrating an exemplary embodiment of the present invention.

FIG. 115 illustrates the storage area included in Start Up Data Storage Area 20621*c* (FIG. 113). As described in FIG. 115, Start Up Data Storage Area 20621*c* includes Start Up Software Index Storage Area 20621*c*1. Here, Start Up Software Index Storage Area 20621*c*1 stores the software program indexes, wherein a software program index is an unique information assigned to each software program as an identifier (e.g., title of a software program) of which the details are explained in FIG. 116 hereinafter.

Figure 116:
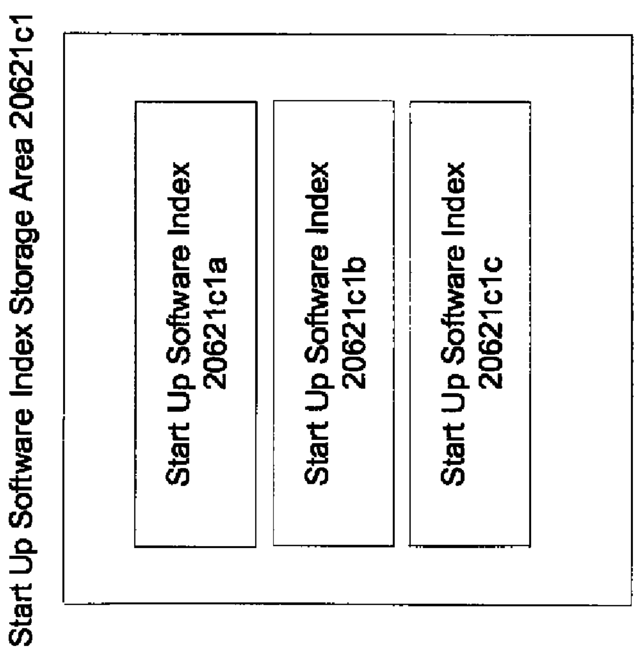
FIG. 116 is a block diagram illustrating an exemplary embodiment of the present invention.

FIG. 116 illustrates the data stored in Start Up Software Index Storage Area 20621*c*1 (FIG. 115). Referring to FIG. 116, Start Up Software Index Storage Area 20621*c*1 stores the software program indexes of the software programs which are automatically activated by the present function. Here, the software programs may be any software programs explained in this specification, and the storage areas where these software programs are stored are explained in the relevant drawing figures thereto. Three software program indexes, i.e., Start Up Software Index 20621*c*1*a*, Start Up Software Index 20621*c*1*b*, and Start Up Software Index 20621*c*1*c*, are stored in Start Up Software Index Storage Area 20621*c*1 in the present example. The software program indexes can be created and store in Start Up Software Index Storage Area 20621*c*1 manually by utilizing input device 210 (FIG. 1) or via voice recognition system.

Figure 117:
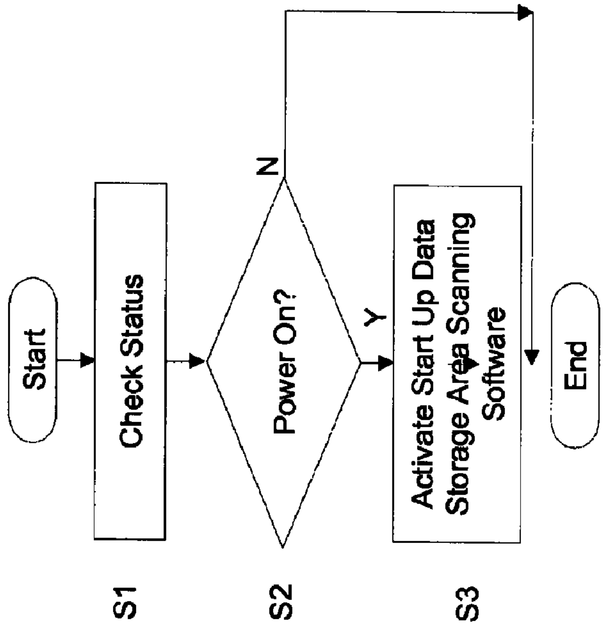
FIG. 117 is a flowchart illustrating an exemplary embodiment of the present invention.

FIG. 117 illustrates the sequence of Power On Detecting Software 20621*b*1 stored in Start Up Software Storage Area 20621*b* (FIG. 114). As described in FIG. 117, CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 activates Start Up Data Storage Area Scanning Software 20621*b*2 (FIG. 114) of which the sequence is explained in FIG. 118 hereinafter.

Figure 118:
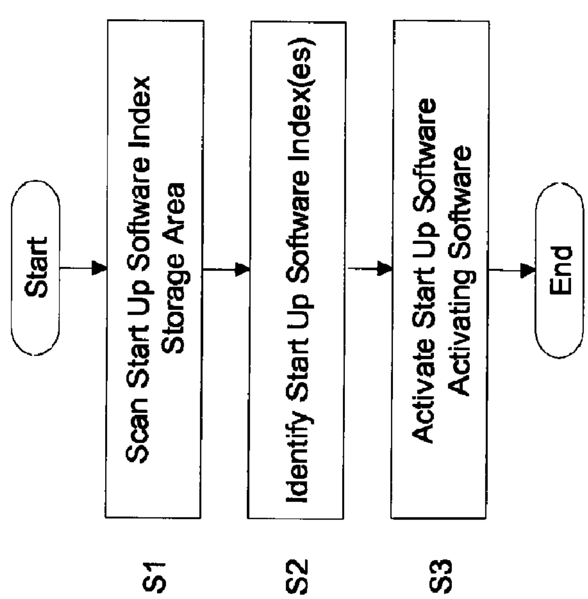
FIG. 118 is a flowchart illustrating an exemplary embodiment of the present invention.

FIG. 118 illustrates the sequence of Start Up Data Storage Area Scanning Software 20621*b*2 stored in Start Up Software Storage Area 20621*b* (FIG. 114). As described in FIG. 118, CPU 211 (FIG. 1) scans Start Up Software Index Storage Area 20621*c*1 (FIG. 116) (S1), and identifies the software programs which are automatically activated (S2). CPU 211 activates Start Up Software Activating Software 20621*b*3 (FIG. 114) thereafter of which the sequence is explained in FIG. 119 hereinafter (S3).

Figure 119:
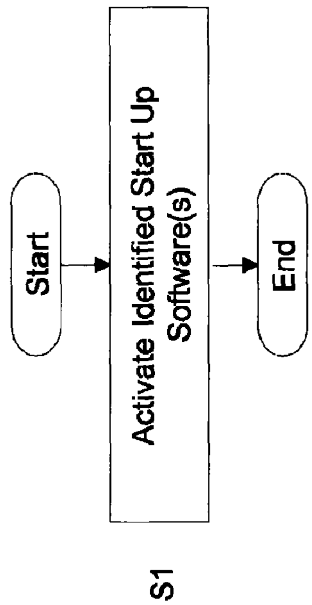

FIG. 119 illustrates the sequence of Start Up Software Activating Software 20621*b*3 stored in Start Up Software Storage Area 20621*b* (FIG. 114). As described in FIG. 119, CPU 211 (FIG. 1) activates the software programs of which the software program indexes are identified in S2 of FIG. 118 hereinbefore (S1).

Figure 120:
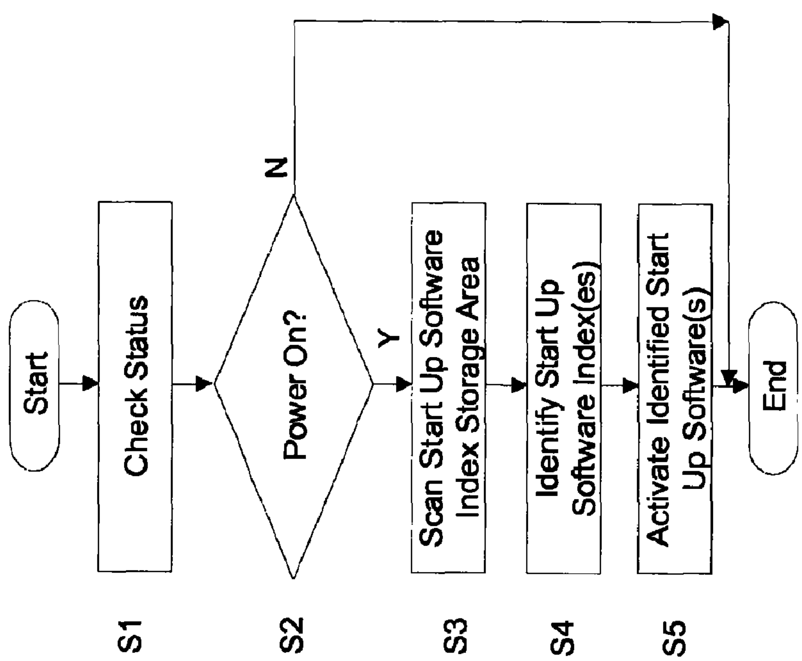

FIG. 120 illustrates another embodiment wherein the three software programs stored in Start Up Software Storage Area 20621*b* (FIG. 114) (i.e., Power On Detecting Software 20621*b*1, Start Up Data Storage Area Scanning Software 20621*b*2, Start Up Software Activating Software 20621*b*3) is integrated into one software program stored therein. Referring to FIG. 120, CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 scans Start Up Software Index Storage Area 20621*c*1 (FIG. 115) (S3), and identifies the software programs which are automatically activated (S4). CPU 211 activates the software programs thereafter of which the software program indexes are identified in S4 (S5).

As another embodiment, the software programs per se (not the software program indexes as described in FIG. 116) may be stored in a specific storage area which are activated by the present function.

As another embodiment, the present function may be implemented at the time the user of Communication Device 200 logs on instead of at the time the Communication Device 200 is powered as described in S2 of FIG. 117.

<<Stereo Audio Data Output Function>>

FIG. 121 through FIG. 132 illustrate the stereo audio data output function which enables Communication Device 200 to output audio data from Speakers 216L and 216R (FIG. 337*c*) in a stereo fashion.

Figure 121:
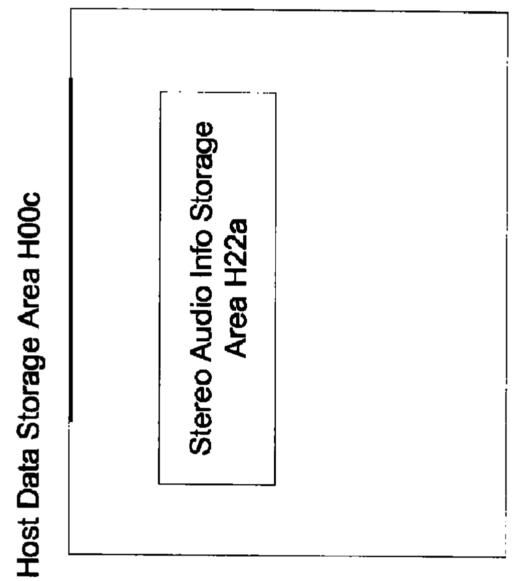

FIG. 121 illustrates the storage area included in Host Data Storage Area H00*c* (FIG. 290) of Host H (FIG. 289). As described in FIG. 121, Host Data Storage Area H00*c* includes Stereo Audio Information Storage Area H22*a*. Stereo Audio Information Storage Area H22*a* stores the software programs and data necessary to implement the present function as described in details hereinafter.

Figure 122:
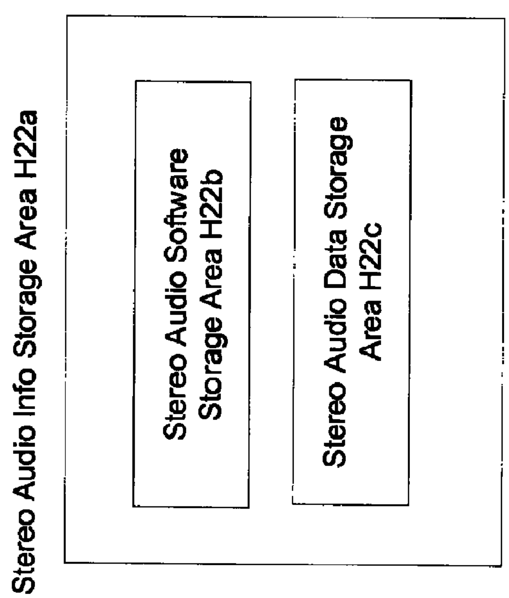

FIG. 122 illustrates the storage areas included in Stereo Audio Information Storage Area H22*a* (FIG. 121). As described in FIG. 122, Stereo Audio Information Storage Area H22*a* includes Stereo Audio Software Storage Area H22*b* and Stereo Audio Data Storage Area H22*c*. Stereo Audio Software Storage Area H22*b* stores the software programs necessary to implement the present function, such as the one described in FIG. 125 hereinafter. Stereo Audio Data Storage Area H22*c* stores the data necessary to implement the present function, such as the ones described in FIG. 123 hereinafter.

Figure 123:
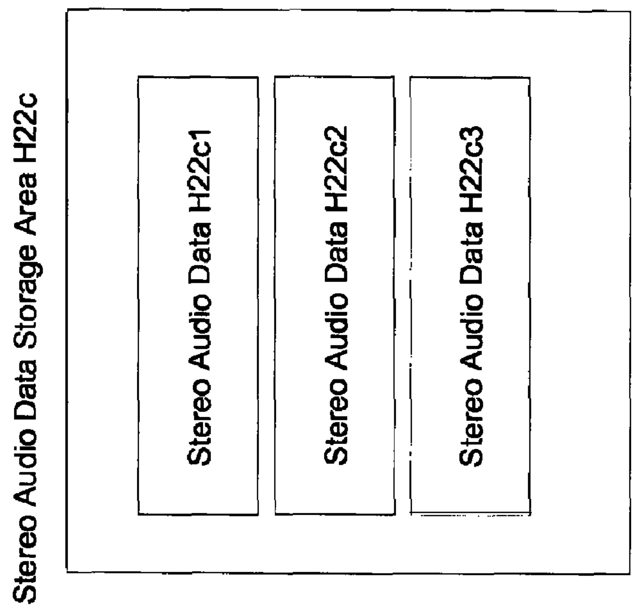

FIG. 123 illustrates the stereo audio data stored in Stereo Audio Data Storage Area H22*c* (FIG. 122). A plurality of stereo audio data are stored in Stereo Audio Data Storage Area H22*c*. In the example described in FIG. 123, three stereo audio data, i.e., Stereo Audio Data H22*c*1, Stereo Audio Data H22*c*2, and Stereo Audio Data H22*c*3 are stored therein.

Figure 124:
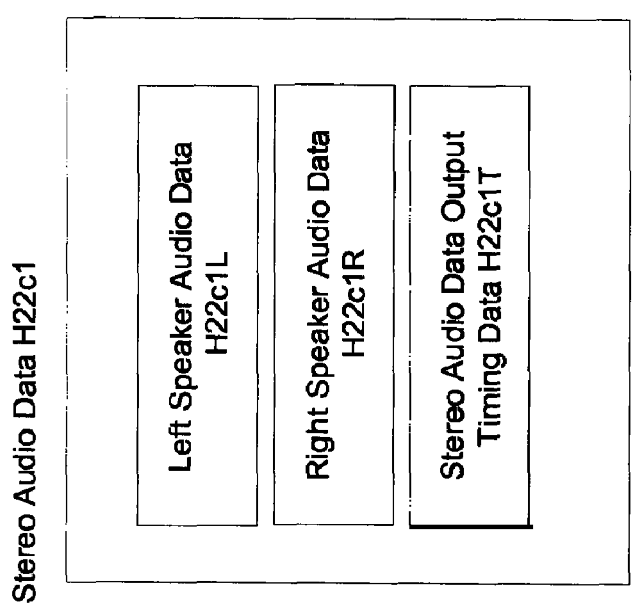

FIG. 124 illustrates the components of the stereo audio data stored in Stereo Audio Data Storage Area H22*c* (FIG. 123). FIG. 124 describes the components of Stereo Audio Data H22*c*1 (FIG. 123) as an example. As described in FIG. 124, Stereo Audio Data H22*c*1 includes Left Speaker Audio Data H22*c*1L, Right Speaker Audio Data H22*c*1R, and Stereo Audio Data Output Timing Data H22*c*1T. Left Speaker Audio Data H22*c*1L is an audio data which is designed to be output from Speaker 216L (FIG. 337*c*). Right Speaker Audio Data H22*c*1R is an audio data which is designed to be output from Speaker 216R (FIG. 337*c*). Stereo Audio Data Output Timing Data H22*c*1T is a timing data which is utilized to synchronize the output of both Left Speaker Audio Data H22*c*1L and Right Speaker Audio Data H22*c*1R from Speaker 216R and Speaker 216L respectively.

Figure 125:
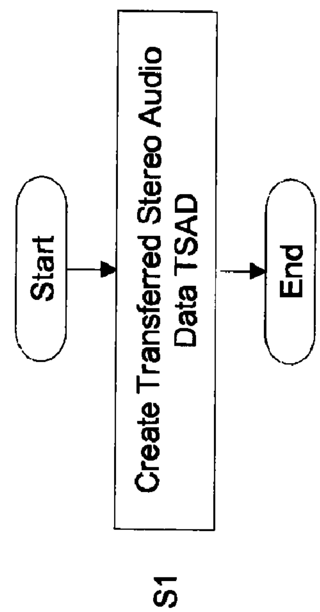

FIG. 125 illustrates the sequence of the software program stored in Stereo Audio Software Storage Area H22*b* (FIG. 122). Referring to FIG. 125, the software program stored in Stereo Audio Software Storage Area H22*b* extracts one of the stereo audio data stored in Stereo Audio Data Storage Area H22*c* (FIG. 123) and creates Transferred Stereo Audio Data TSAD for purposes of transferring the extracted stereo audio data to Communication Device 200 (S1).

Figure 126:
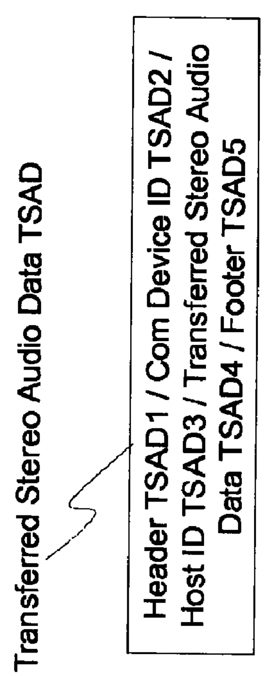

FIG. 126 illustrates the components of Transferred Stereo Audio Data TSAD created by the software program stored in Stereo Audio Software Storage Area H22*b* (FIG. 125). As described in FIG. 126, Transferred Stereo Audio Data TSAD is composed of Header TSAD1, Com Device ID TSAD2, Host ID TSAD3, Transferred Stereo Audio Data TSAD4, and Footer TSAD5. Com Device ID TSAD2 indicates the identification of Communication Device 200, Host ID TSAD3 indicates the identification of Host H (FIG. 289), and Transferred Stereo Audio Data TSAD4 is the stereo audio data extracted in the manner described in FIG. 125. Header TSAD1 and Footer TSAD5 indicate the beginning and the end of Transferred Stereo Audio Data TSAD.

Figure 127:
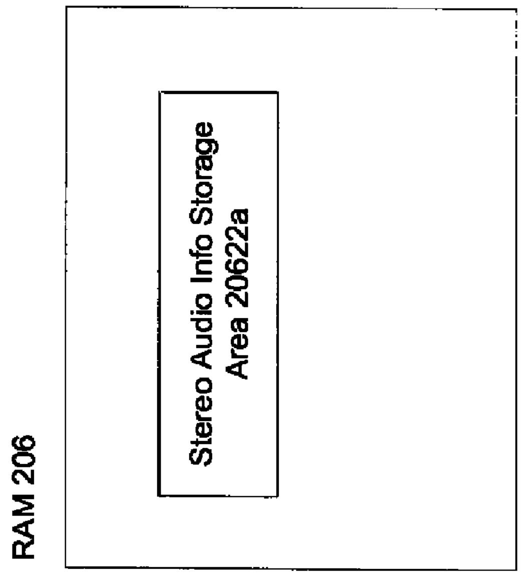

FIG. 127 illustrates the storage area included in RAM 206 (FIG. 1) of Communication Device 200 (FIG. 289). As described in FIG. 127, RAM 206 includes Stereo Audio Information Storage Area 20622*a*. Stereo Audio Information Storage Area 20622*a* stores the software programs and data necessary to implement the present function as described in details hereinafter.

Figure 128:
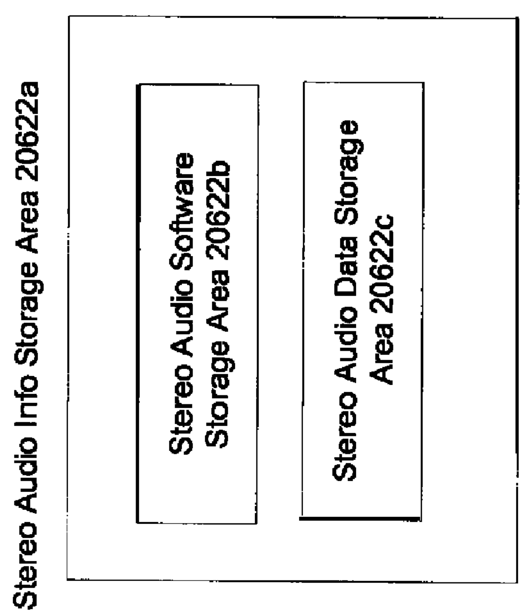

FIG. 128 illustrates the storage areas included in Stereo Audio Information Storage Area 20622*a* (FIG. 127). As described in FIG. 128, Stereo Audio Information Storage Area 20622*a* includes Stereo Audio Software Storage Area 20622*b* and Stereo Audio Data Storage Area 20622*c*. Stereo Audio Software Storage Area 20622*b* stores the software programs necessary to implement the present function, such as the ones described in FIG. 131 and FIG. 132 hereinafter.

Stereo Audio Data Storage Area 20622*c* stores the data necessary to implement the present function, such as the ones described in FIG. 129 hereinafter.

Figure 129:
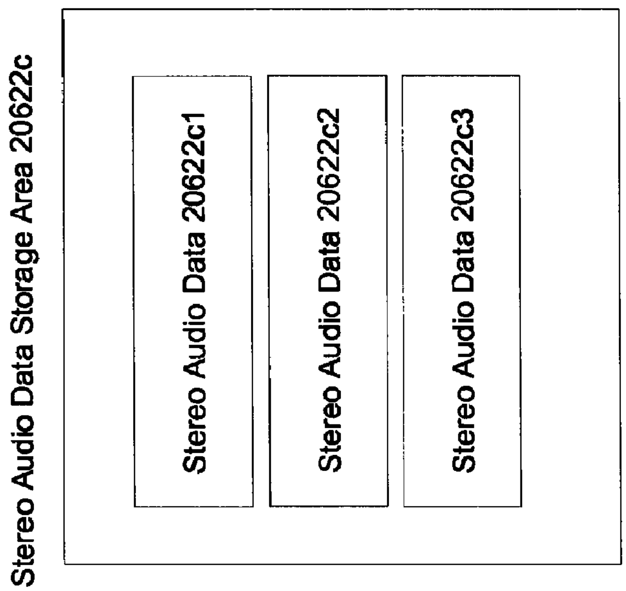

FIG. 129 illustrates the stereo audio data stored in Stereo Audio Data Storage Area 20622*c* (FIG. 128). A plurality of stereo audio data are stored in Stereo Audio Data Storage Area 20622*c*. In the example described in FIG. 129, three stereo audio data, i.e., Stereo Audio Data 20622*c*1, Stereo Audio Data 20622*c*2, and Stereo Audio Data 20622*c*3 are stored therein.

Figure 130:
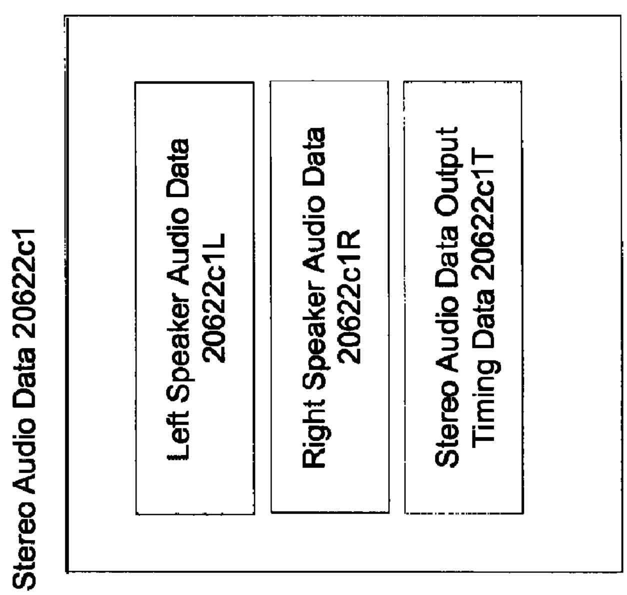

FIG. 130 illustrates the components of the stereo audio data stored in Stereo Audio Data Storage Area 20622*c* (FIG. 129). FIG. 130 describes the components of Stereo Audio Data 20622*c*1 (FIG. 129) as an example. As described in FIG. 130, Stereo Audio Data 20622*c*1 includes Left Speaker Audio Data 20622*c*1L, Right Speaker Audio Data 20622*c*1R, and Stereo Audio Data Output Timing Data 20622*c*1T. Left Speaker Audio Data 20622*c*1L is an audio data which is designed to be output from Speaker 216L (FIG. 337*c*). Right Speaker Audio Data 20622*c*1R is an audio data which is designed to be output from Speaker 216R (FIG. 337*c*). Stereo Audio Data Output Timing Data 20622*c*1T is a timing data which is utilized to synchronize the output of both Left Speaker Audio Data 20622*c*1L and Right Speaker Audio Data 20622*c*1R from Speaker 216R and Speaker 216L respectively.

With regard to the process of selecting and downloading the stereo audio data to Communication Device 200, the concept illustrated in FIG. 104 through FIG. 110 applies hereto. The downloaded stereo audio data are stored in specific area(s) of Stereo Audio Data Storage Area 20622*c* (FIG. 129).

FIG. 131 illustrates the sequence of selecting and preparing to output the stereo audio data from Speakers 216L and 216R (FIG. 337*c*) in a stereo fashion. As described in FIG. 131, a list of stereo audio data is displayed on LCD 201 (FIG. 1) (S1). The user of Communication Device 200 selects one stereo audio data by utilizing Input Device 210 (FIG. 1) or via voice recognition system (S2). Assuming Stereo Audio Data 20622*c*1 is selected (FIG. 129) in S2, CPU 211 (FIG. 1) retrieves Left Speaker Audio Data 20622*c*1L (S3), Right Speaker Audio Data 20622*c*1R (S4), and Stereo Audio Data Output Timing Data 20622*c*1T from Stereo Audio Data Storage Area 20622*c* (FIG. 129) (S5).

FIG. 132 illustrates the sequence of outputting the stereo audio data from Speakers 216L and 216R (FIG. 337*c*) in a stereo fashion. As described in FIG. 132, the user of Communication Device 200 inputs a specific signal to output the stereo audio data by utilizing Input Device 210 (FIG. 1) or via voice recognition system (S1). Assuming Audio Data 20622*c*1 (FIG. 129) is selected in S2 of FIG. 131, CPU 211 outputs Left Speaker Audio Data 20622*c*1L (FIG. 130) and Right Speaker Audio Data 20622*c*1R (FIG. 130) from Speakers 216L and 216R respectively in a stereo fashion in accordance with Stereo Audio Data Output Timing Data 20622*c*1T (FIG. 130) (S2).

<<SOS Calling Function>>

FIG. 133 through FIG. 144 illustrate the SOS calling function which enables Communication Device 200 to notify the police department the current location of Communication Device 200 and the personal information of the user of Communication 200 when a 911 call is dialed from Communication Device 200.

FIG. 133 illustrates the storage area included in Host Information Storage Area H00*a* (FIG. 289). As described in FIG. 133, Host Information Storage Area H00*a* includes SOS Calling Information Storage Area H29*a* of which the data stored therein are described in FIG. 134.

FIG. 134 illustrates the storage areas included in SOS Calling Information Storage Area H29*a* (FIG. 133). As described in FIG. 134, SOS Calling Information Storage Area H29*a* includes SOS Calling Data Storage Area H29*b* and SOS Calling Software Storage Area H29*c*. SOS Calling Data Storage Area H29*b* stores the data necessary to implement the present function, such as the ones described in FIG. 135 and FIG. 136. SOS Calling Software Storage Area H29*c* stores the software programs necessary to implement the present function, such as the ones described in FIG. 143 and FIG. 144.

FIG. 135 illustrates the storage area included in SOS Calling Data Storage Area H29*b* (FIG. 134). As described in FIG. 135, SOS Calling Data Storage Area H29*b* includes Police Department Location Data Storage Area H29*b*1 of which the data stored therein are described in FIG. 136.

FIG. 136 illustrates the data stored in Police Department Location Data Storage Area H29*b*1 (FIG. 135). As illustrated in FIG. 136, Police Department Location Data Storage Area H29*b*1 includes three columns, i.e., Police Dept ID, Location Data, and Phone #. Police Dept ID represents the identification of a police department (e.g., NYPD). Location Data represents the geographical location data (in x, y, z format) of the police department of the corresponding Police Dept ID. Phone # represents the phone number of the police department of the corresponding Police Dept ID. In the example described in FIG. 136, H29PD #1 is an identification of the police department of which the geographical location is H29LD #1 and of which the phone number is H29PN #1; H29PD #2 is an identification of the police department of which the geographical location is H29LD #2 and of which the phone number is H29PN #2; H29PD #3 is an identification of the police department of which the geographical location is H29LD #3 and of which the phone number is H29PN #3; and H29PD #4 is an identification of the police department of which the geographical location is H29LD #4 and of which the phone number is H29PN #4.

The data and/or the software programs necessary to implement the present function on the side of Communication Device 200 as described hereinafter may be downloaded from Host H (FIG. 289) to Communication Device 200 in the manner described in FIG. 104 through FIG. 110.

FIG. 137 illustrates the storage area included in RAM 206 (FIG. 1) of Communication Device 200. As described in FIG. 137, RAM 206 includes SOS Calling Information Storage Area 20629*a* of which the details are described in FIG. 138.

FIG. 138 illustrates the storage areas included in SOS Calling Information Storage Area 20629*a* (FIG. 137). As described in FIG. 138, SOS Calling Information Storage Area 20629*a* includes SOS Calling Data Storage Area 20629*b* and SOS Calling Software Storage Area 20629*c*. SOS Calling Data Storage Area 20629*b* includes data necessary to implement the present function, such as the ones described in FIG. 139 and FIG. 140. SOS Calling Software Storage Area 20629*c* stores the software programs necessary to implement the present function, such as the one described in FIG. 141.

FIG. 139 illustrates storage areas included in SOS Calling Data Storage Area 20629*b* (FIG. 138). As described in FIG. 139, SOS Calling Data Storage Area 20629*b* includes GPS Data Storage Area 20629*b*1 and User Data Storage Area 20629*b*2. GPS Data Storage Area 20629*b*1 stores the data regarding the current geographical location produced by the method so-called GPS as described hereinbefore. User Data Storage Area 20629*b*2 stores the data regarding the personal information of the user of Communication Device 200 as described in FIG. 140.

FIG. 140 illustrates the data stored in User Data Storage Area 20629*b*2 (FIG. 139). As described in FIG. 140, User Data Storage Area 20629*b*2 includes User Data 20629UD which includes data regarding the personal information of the user of Communication Device 200. In the example described in FIG. 140, User Data 20629UD comprises Name, Age, Sex, Race, Blood Type, Home Address, and SSN. Name represents the name of the user of Communication Device 200; Age represents the age of the user of Communication Device 200; Sex represents the sex of the user of Communication Device 200; Race represents the race of the user of Communication Device 200; Blood Type represents the blood type of the user of Communication Device 200; Home Address represents the home address of the user of Communication Device 200; and SSN represents the social security number of the user of Communication Device 200.

FIG. 141 illustrates the software program stored in SOS Calling Software Storage Area 20629*c* (FIG. 138). Referring to FIG. 141, when the user of Communication Device 200 inputs 911 by utilizing Input Device 210 (FIG. 1) or via voice recognition system (S1), CPU 211 (FIG. 1) calculates the GPS data, i.e., the current geographical location data by utilizing the method so-called GPS as described hereinbefore (S2), and stores the GPS data in GPS Data Storage Area 20629*b*1 (FIG. 139) (S3). CPU 211 then retrieves User Data 20629UD from User Data Storage Area 20629*b*2 (FIG. 140) and the GPS data from GPS Data Storage Area 20629*b*1 (FIG. 139) (S4), and composes SOS Data 20629SOS therefrom (S5), which is sent thereafter to Host H (FIG. 289) (S6).

FIG. 142 illustrates the elements of SOS Data 20629SOS (FIG. 141). As described in FIG. 142, SOS Data 20629SOS comprises Connection Request 20629CR, GPS Data 20629GD, and User Data 20629UD. Connection Request 20629CR represents a request to Host H (FIG. 289) to forward the 911 call to a police department. GPS Data 20629GD is a data retrieved from GPS Data Storage Area 20629*b*1 (FIG. 140) as described in S4 of FIG. 141. User Data 20629UD is a data retrieved from User Data Storage Area 20629*b*2 (FIG. 140) as described in S4 of FIG. 141.

FIG. 143 illustrates the software program stored in SOS Calling Software Storage Area H29*c* (FIG. 134) of Host H (FIG. 289). Referring to FIG. 143, Host H periodically checks the incoming call (S1). If the incoming call is SOS Data 20629SOS (FIG. 142) (S2), Host H initiates the SOS calling process as described in FIG. 144 (S3).

FIG. 144 illustrates the software program stored in SOS Calling Software Storage Area H29*c* (FIG. 134) of Host H (FIG. 289). Referring to FIG. 144, Host H retrieves GPS Data 20629GD from SOS Data 20629SOS (FIG. 142) (S1), and selects the closest police department by comparing GPS Data 20629GD and the data stored in column Location Data of Police Department Location Data Storage Area H29*b*1 (FIG. 136) of Host H (S2). Host H then retrieves the corresponding phone number stored in column Phone # and connects the line between the corresponding police department and Communication Device 200 in order to initiate a voice communication therebetween (S3). Host H forwards to the police department thereafter GPS Data 20629GD and User Data 20629UD retrieved in S1 (S4).

As another embodiment, User Data 20629UD stored in User Data Storage Area 20629*b*2 (FIG. 140) may be stored in SOS Calling Data Storage Area H29*b* (FIG. 134) of Host H (FIG. 289). In this embodiment, SOS Data 20629SOS (FIG. 141) primarily comprises Connection Request 20629CR and GPS Data 20629GD, and User Data 20629UD is retrieved from SOS Calling Data Storage Area H29*b* of Host H, which is sent to the police department in S4 of FIG. 144.

<<Audiovisual Playback Function>>

FIG. 145 through FIG. 161 illustrate the audiovisual playback function which enables Communication Device 200 to playback audiovisual data, such as movies, soap operas, situation comedies, news, and any type of TV programs.

FIG. 145 illustrates the information stored in RAM 206 (FIG. 1). As described in FIG. 145, RAM 206 includes Audiovisual Playback Information Storage Area 20632*a* of which the information stored therein are described in FIG. 146.

The data and/or the software programs necessary to implement the present function may be downloaded to Communication Device 200 from Host H (FIG. 289) in the manner described in FIG. 104 through FIG. 110.

FIG. 146 illustrates the data and software programs stored in Audiovisual Playback Information Storage Area 20632*a* (FIG. 145). As described in FIG. 146, Audiovisual Playback Information Storage Area 20632*a* includes Audiovisual Playback Data Storage Area 20632*b* and Audiovisual Playback Software Storage Area 20632*c*. Audiovisual Playback Data Storage Area 20632*b* stores the data necessary to implement the present function, such as the ones described in FIG. 147 through FIG. 149. Audiovisual Playback Software Storage Area 20632*c* stores the software programs necessary to implement the present function, such as the ones described in FIG. 150.

FIG. 147 illustrates the data stored in Audiovisual Playback Data Storage Area 20632*b* (FIG. 146). As described in FIG. 147, Audiovisual Playback Data Storage Area 20632*b* includes Audiovisual Data Storage Area 20632*b*1 and Message Data Storage Area 20632*b*2. Audiovisual Data Storage Area 20632*b*1 stores a plurality of audiovisual data described in FIG. 148. Message Data Storage Area 20632*b*2 stores a plurality of message data described in FIG. 149.

FIG. 148 illustrates the audiovisual data stored in Audiovisual Data Storage Area 20632*b*1 (FIG. 147). As described in FIG. 148, Audiovisual Data Storage Area 20632*b*1 stores a plurality of audiovisual data wherein the audiovisual data stored therein in the present example are: Audiovisual Data 20632*b*1*a*, Audiovisual Data 20632*b*1*b*, Audiovisual Data 20632*b*1*c*, and Audiovisual Data 20632*b*1*d*, all of which are primarily composed of video data and audio data. Audiovisual Data 20632*b*1*a* is a movie, Audiovisual Data 20632*b*1*b* is a soap opera, Audiovisual Data 20632*b*1*c* is a situation comedy, Audiovisual Data 20632*b*1*d* is TV news in the present embodiment. The data stored in Audiovisual Data Storage Area 20632*b*1 may be the same or similar to the ones described in TV Data Storage Area 206*f* (FIG. 129). As another embodiment, Audiovisual Data 20632*b*1*d* may be an audiovisual data taken via CCD Unit 214 (FIG. 1) and Microphone 215 (FIG. 1).

FIG. 149 illustrates the data stored in Message Data Storage Area 20632*b*2 (FIG. 147). As described in FIG. 149, Message Data Storage Area 20632*b*2 includes Start Message Text Data 20632*b*2*a*, Stop Message Text Data 20632*b*2*b*, Pause Message Text Data 20632*b*2*c*, Resume Message Text Data 20632*b*2*c*1, Slow Replay Message Text Data 20632*b*2*d*, Forward Message Text Data 20632*b*2*e*, Rewind Message Text Data 20632*b*2*f*, Next Message Text Data 20632*b*2*g*, and Previous Message Text Data 20632*b*2*h*. Start Message Text Data 20632*b*2*a* is a text data which is displayed on LCD 201 (FIG. 1) and which indicates that the playback of an audiovisual data is initiated. Stop Message Text Data 20632*b*2*b* is a text data which is displayed on LCD 201 and which indicates that the playback process of an audiovisual data is stopped. Pause Message Text Data 20632*b*2*c* is a text data which is displayed on LCD 201 and which indicates that the playback process of an audiovisual data is paused. Resume Message Text Data **20632*b*2*c*1 is a text data which is displayed on LCD 201 and which indicates that the playback process of an audiovisual data is resumed from the point it is paused. Slow Replay Message Text Data 20632*b*2*d* is a text data which is displayed on LCD 201 and which indicates that the playback process of an audiovisual data is implemented in a slow motion. Fast-Forward Message Text Data 20632*b*2*e* is a text data which is displayed on LCD 201 and which indicates that an audiovisual data is fast-forwarded. Fast-Rewind Message Text Data 20632*b*2*f* is a text data which is displayed on LCD 201 and which indicates that an audiovisual data is fast-rewinded. Next Message Text Data 20632*b*2*g* is a text data which is displayed on LCD 201 and which indicates that the playback process of the next audiovisual data stored in Audiovisual Data Storage Area 20632*b*1 (FIG. 148) is initiated. Previous Message Text Data 20632*b*2*h* is a text data which is displayed on LCD 201 and which indicates that the playback process of the previous audiovisual data stored in Audiovisual Data Storage Area 20632*b*1 (FIG. 148**) is initiated.

FIG. 150 illustrates the software programs stored in Audiovisual Playback Software Storage Area **20632*c* (FIG. 146). As described in FIG. 150, Audiovisual Playback Software Storage Area 20632*c* includes Audiovisual Start Software 20632*c*1, Audiovisual Stop Software 20632*c*2, Audiovisual Pause Software 20632*c*3, Audiovisual Resume Software 20632*c*3*a*, Audiovisual Slow Replay Software 20632*c*4, Audiovisual Fast-Forward Software 20632*c*5, Audiovisual Fast-Rewind Software 20632*c*6, Audiovisual Next Software 20632*c*7, and Audiovisual Previous Software 20632*c*8. Audiovisual Start Software 20632*c*1 is a software program which initiates the playback process of an audiovisual data. Audiovisual Stop Software 20632*c*2 is a software program which stops the playback process of an audiovisual data. Audiovisual Pause Software 20632*c*3 is a software program which pauses the playback process of an audiovisual data. Audiovisual Resume Software 20632*c*3*a* is a software program which resumes the playback process of the audiovisual data from the point it is paused by Audiovisual Pause Software 20632*c*3. Audiovisual Slow Replay Software 20632*c*4 is a software program which implements the playback process of an audiovisual data in a slow motion. Audiovisual Fast-Forward Software 20632*c*5 is a software program which fast-forwards an audiovisual data. Audiovisual Fast-Rewind Software 20632*c*6 is a software program which fast-rewinds an audiovisual data. Audiovisual Next Software 20632*c*7 is a software program which initiates the playback process of the next audiovisual data stored in Audiovisual Data Storage Area 20632*b*1 (FIG. 148). Audiovisual Previous Software 20632*c*8 is a software program which initiates the playback process of the previous audiovisual data stored in Audiovisual Data Storage Area 20632*b*1**.

FIG. 151 illustrates the messages displayed on LCD 201 (FIG. 1). As described in FIG. 151, eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data **20632*b*2*a*, 'Stop' is Stop Message Text Data 20632*b*2*b*, 'Pause' is Pause Message Text Data 20632*b*2*c*, 'Resume' is Resume Message Text Data 20632*b*2*c*1, 'Slow Reply' is Slow Replay Message Text Data 20632*b*2*d*, 'Fast-Forward' is Fast-Forward Message Text Data 20632*b*2*e*, 'Fast-Rewind' is Fast-Rewind Message Text Data 20632*b*2*f*, 'Next' is Next Message Text Data 20632*b*2*g*, 'Previous' is Previous Message Text Data 20632*b*2*h* described in FIG. 149** hereinbefore.

FIG. 152 illustrates Audiovisual Selecting Software **20632*c*9 stored in Audiovisual Playback Software Storage Area 20632*c* (FIG. 146) in preparation of executing the software programs described in FIG. 153 through FIG. 161. Referring to FIG. 152, CPU 211 (FIG. 1) retrieves the identifications of the audiovisual data stored in Audiovisual Data Storage Area 20632*b*1 (FIG. 148) (S1). CPU 211 then displays a list of the identifications on LCD 201 (FIG. 1) (S2). A particular audiovisual data is selected by utilizing Input Device 210 (FIG. 1) or via voice recognition system (S3**).

FIG. 153 through FIG. 161 illustrates the software programs stored in Audiovisual Playback Software Storage Area **20632*c* (FIG. 146). As described in each drawing figure hereinafter, nine types of input signals can be input by utilizing Input Device 210 (FIG. 1) or via voice recognition system, i.e., the audiovisual playback signal, the audiovisual stop signal, the audiovisual pause signal, the audiovisual resume signal, the audiovisual slow replay signal, the audiovisual fast-forward signal, the audiovisual fast-rewind signal, the audiovisual next signal, and the audiovisual previous signal. The audiovisual playback signal indicates to initiate the playback process of the audiovisual data selected in S3 of FIG. 152. The audiovisual stop signal indicates to stop the playback process of the audiovisual data selected in S3 of FIG. 152. The audiovisual pause signal indicates to pause the playback process of the audiovisual data selected in S3 of FIG. 152. The audiovisual resume signal indicates to resume the playback process of the audiovisual data selected in S3 of FIG. 152 from the point the audio data is paused. The audiovisual slow replay signal indicates to implement the playback process of the audiovisual data selected in S3 of FIG. 152 in a slow motion. The audiovisual fast-forward signal indicates to fast-forward the audiovisual data selected in S3 of FIG. 152. The audiovisual fast-rewind signal indicates to fast-rewind the audiovisual data selected in S3 of FIG. 152. The audiovisual next signal indicates to initiate the playback process of the next audiovisual data of the audiovisual data selected in S3 of FIG. 152 both of which are stored in Audiovisual Data Storage Area 20632*b*1 (FIG. 148). The audiovisual previous signal indicates to initiate the playback process of the previous audiovisual data of the audiovisual data selected in S3 of FIG. 152 both of which are stored in Audiovisual Data Storage Area 20632*b*1**.

FIG. 153 illustrates Audiovisual Start Software **20632*c*1 stored in Audiovisual Playback Software Storage Area 20632*c* (FIG. 146) which initiates the playback process of the audiovisual data selected in S3 of FIG. 152. Referring to FIG. 153, the audiovisual playback signal is input by utilizing Input Device 210 (FIG. 1) or via voice recognition system (S1). CPU 211 (FIG. 1) then initiates the playback process (i.e., outputs the audio data from Speaker 216 (FIG. 1) and display the video data on LCD 201 (FIG. 1)) of the audiovisual data selected in S3 of FIG. 152 (S2), and retrieves Start Message Text Data 20632*b*2*a* from Message Data Storage Area 20632*b*2 (FIG. 147) and displays the data on LCD 201 (FIG. 1) for a specified period of time (S3**).

FIG. 154 illustrates Audiovisual Stop Software **20632*c*2 stored in Audiovisual Playback Software Storage Area 20632*c* (FIG. 146) which stops the playback process of the audiovisual data selected in S3 of FIG. 152. Referring to FIG. 154, the audiovisual stop signal is input by utilizing Input Device 210 (FIG. 1) or via voice recognition system (S1). CPU 211 (FIG. 1) then stops the playback process of the audiovisual data selected in S3 of FIG. 152 (S2), and retrieves Stop Message Text Data 20632*b*2*b* from Message Data Storage Area 20632*b*2 (FIG. 147) and displays the data on LCD 201 (FIG. 1) for a specified period of time (S3**).

FIG. 155 illustrates Audiovisual Pause Software **20632*c*3** stored in Audiovisual Playback Software Storage Area

20632*c* (FIG. 146) which pauses the playback process of the audiovisual data selected in S3 of FIG. 152. Referring to FIG. 155, the audiovisual pause signal is input by utilizing Input Device 210 (FIG. 1) or via voice recognition system (S1). CPU 211 (FIG. 1) then pauses the playback process of the audiovisual data selected in S3 of FIG. 152 (S2), and retrieves Pause Message Text Data 20632*b*2*c* from Message Data Storage Area 20632*b*2 (FIG. 147) and displays the data on LCD 201 (FIG. 1) for a specified period of time (S3) When the playback process is paused in S2, the audio data included in the audiovisual data is refrained from being output from Speaker 216 (FIG. 1) and a still image composing the video data included in the audiovisual data is displayed on LCD 201 (FIG. 1).

FIG. 156 illustrates Audiovisual Resume Software 20632*c*3*a* stored in Audiovisual Playback Software Storage Area 20632*c* (FIG. 146) which resumes the playback process of the audiovisual data selected in S3 of FIG. 152 from the point the audiovisual data is paused in S2 of FIG. 155. Referring to FIG. 156, the audiovisual resume signal is input by utilizing Input Device 210 (FIG. 1) or via voice recognition system (S1). CPU 211 (FIG. 1) then resumes the playback process of the audiovisual data selected in S3 of FIG. 152 (S2) from the point it is paused in S2 of FIG. 155, and retrieves Resume Message Text Data 20632*b*2*c*1 from Message Data Storage Area 20632*b*2 (FIG. 147) and displays the data on LCD 201 (FIG. 1) for a specified period of time (S3) When the playback process is resumed in S2, the audio data included in the audiovisual data is resumed to be output from Speaker 216 (FIG. 1) and the video data included in the audiovisual data is resumed to be displayed on LCD 201 (FIG. 1).

FIG. 157 illustrates Audiovisual Slow Replay Software 20632*c*4 stored in Audiovisual Playback Software Storage Area 20632*c* (FIG. 146) which implements the playback process of the audiovisual data selected in S3 of FIG. 152 in a slow motion. Referring to FIG. 157, the audiovisual slow replay signal is input by utilizing Input Device 210 (FIG. 1) or via voice recognition system (S1). CPU 211 (FIG. 1) then initiates the playback process of the audiovisual data selected in S3 of FIG. 152 in a slow motion (S2), and retrieves Slow Replay Message Text Data 20632*b*2*d* from Message Data Storage Area 20632*b*2 (FIG. 147) and displays the data on LCD 201 (FIG. 1) for a specified period of time (S3).

FIG. 158 illustrates Audiovisual Fast-Forward Software 20632*c*5 stored in Audiovisual Playback Software Storage Area 20632*c* (FIG. 146) which fast-forwards the audiovisual data selected in S3 of FIG. 152. Referring to FIG. 158, the audiovisual fast-forward signal is input by utilizing Input Device 210 (FIG. 1) or via voice recognition system (S1). CPU 211 (FIG. 1) then fast-forwards the audiovisual data selected in S3 of FIG. 152 (S2), and retrieves Fast-Forward Message Text Data 20632*b*2*e* from Message Data Storage Area 20632*b*2 (FIG. 147) and displays the data on LCD 201 (FIG. 1) for a specified period of time (S3).

FIG. 159 illustrates Audiovisual Fast-Rewind Software 20632*c*6 stored in Audiovisual Playback Software Storage Area 20632*c* (FIG. 146) which fast-rewinds the audiovisual data selected in S3 of FIG. 152. Referring to FIG. 159, the audiovisual fast-rewind signal is input by utilizing Input Device 210 (FIG. 1) or via voice recognition system (S1). CPU 211 (FIG. 1) then fast-rewinds the audiovisual data selected in S3 of FIG. 152 (S2), and retrieves Fast-Rewind Message Text Data 20632*b*2*f* from Message Data Storage Area 20632*b*2 (FIG. 147) and displays the data on LCD 201 (FIG. 1) for a specified period of time (S3).

FIG. 160 illustrates Audiovisual Next Software 20632*c*7 stored in Audiovisual Playback Software Storage Area 20632*c* (FIG. 146) which initiates the playback process of the next audiovisual data stored in Audiovisual Data Storage Area 20632*b*1 (FIG. 148). Referring to FIG. 160, the audiovisual next signal is input by utilizing Input Device 210 (FIG. 1) or via voice recognition system (S1). CPU 211 (FIG. 1) then initiates the playback process of the next audiovisual data of the audiovisual data selected in S3 of FIG. 152 both of which are stored in Audiovisual Data Storage Area 20632*b*1 (FIG. 148) (S2), and retrieves Next Message Text Data 20632*b*2*g* from Message Data Storage Area 20632*b*2 (FIG. 147) and displays the data on LCD 201 (FIG. 1) for a specified period of time (S3).

FIG. 161 illustrates Audiovisual Previous Software 20632*c*8 is a software program which initiates the playback process of the previous audiovisual data stored in Audiovisual Data Storage Area 20632*b*1 (FIG. 148). Referring to FIG. 161, the audiovisual previous signal is input by utilizing Input Device 210 (FIG. 1) or via voice recognition system (S1). CPU 211 (FIG. 1) then initiates the playback process of the previous audiovisual data of the audiovisual data selected in S3 of FIG. 152 both of which are stored in Audiovisual Data Storage Area 20632*b*1 (FIG. 148) (S2), and retrieves Previous Message Text Data 20632*b*2*h* from Message Data Storage Area 20632*b*2 (FIG. 147) and displays the data on LCD 201 (FIG. 1) for a specified period of time (S3).

As another embodiment, the audiovisual data stored in Audiovisual Data Storage Area 20632*b*1 (FIG. 148) may be stored in Host H (FIG. 289) and retrieved therefrom when the software programs described in FIG. 153 through FIG. 161 are executed. In this embodiment, the audio data is temporarily stored in RAM 206 (FIG. 1) and is erased from the portion which is playbacked.

<<Audio Playback Function>>

FIG. 162 through FIG. 178 illustrate the audio playback function which enables Communication Device 200 to playback audio data, such as jazz music, rock music, classic music, pops music, and any other types of audio data.

FIG. 162 illustrates the information stored in RAM 206 (FIG. 1). As described in FIG. 162, RAM 206 includes Audio Playback Information Storage Area 20633*a* of which the information stored therein are described in FIG. 163.

The data and/or the software programs necessary to implement the present function may be downloaded to Communication Device 200 from Host H (FIG. 289) in the manner described in FIG. 104 through FIG. 110.

FIG. 163 illustrates the data and software programs stored in Audio Playback Information Storage Area 20633*a* (FIG. 162). As described in FIG. 163, Audio Playback Information Storage Area 20633*a* includes Audio Playback Data Storage Area 20633*b* and Audio Playback Software Storage Area 20633*c*. Audio Playback Data Storage Area 20633*b* stores the data necessary to implement the present function, such as the ones described in FIG. 164 through FIG. 166. Audio Playback Software Storage Area 20633*c* stores the software programs necessary to implement the present function, such as the ones described in FIG. 167.

FIG. 164 illustrates the data stored in Audio Playback Data Storage Area 20633*b* (FIG. 163). As described in FIG. 164, Audio Playback Data Storage Area 20633*b* includes Audio Data Storage Area 20633*b*1 and Message Data Storage Area 20633*b*2. Audio Data Storage Area 20633*b*1 stores a plurality of audio data described in FIG. 165. Message Data Storage Area 20633*b*2 stores a plurality of message data described in FIG. 166.

FIG. 165 illustrates the audio data stored in Audio Data Storage Area 20633*b*1 (FIG. 164). As described in FIG. 165, Audio Data Storage Area 20633*b*1 stores a plurality of audio data wherein the audio data stored therein in the present example are: Audio Data **20633*b*1*a*, Audio Data 20633*b*1*b*, Audio Data 20633*b*1*c*, and Audio Data 20633*b*1*d*, all of which are primarily composed of video data and audio data. Audio Data 20633*b*1*a* is a jazz music, Audio Data 20633*b*1*b* is a rock music, Audio Data 20633*b*1*c* is a classic music, Audio Data 20633*b*1*d* is a pops music in the present embodiment. The data stored in Audio Data Storage Area 20633*b*1 may be the same or similar to the ones described in TV Data Storage Area 206*f* (FIG. 129). As another embodiment, Audio Data 20633*b*1*d* may be an audio data taken via CCD Unit 214 (FIG. 1) and Microphone 215 (FIG. 1**).

FIG. 166 illustrates the data stored in Message Data Storage Area **20633*b*2 (FIG. 164). As described in FIG. 166, Message Data Storage Area 20633*b*2 includes Start Message Text Data 20633*b*2*a*, Stop Message Text Data 20633*b*2*b*, Pause Message Text Data 20633*b*2*c*, Resume Message Text Data 20633*b*2*c*1, Slow Replay Message Text Data 20633*b*2*d*, Forward Message Text Data 20633*b*2*e*, Rewind Message Text Data 20633*b*2*f*, Next Message Text Data 20633*b*2*g*, and Previous Message Text Data 20633*b*2*h*. Start Message Text Data 20633*b*2*a* is a text data which is displayed on LCD 201 (FIG. 1) and which indicates that the playback of an audio data is initiated. Stop Message Text Data 20633*b*2*b* is a text data which is displayed on LCD 201 and which indicates that the playback process of an audio data is stopped. Pause Message Text Data 20633*b*2*c* is a text data which is displayed on LCD 201 and which indicates that the playback process of an audio data is paused. Resume Message Text Data 20633*b*2*c*1 is a text data which is displayed on LCD 201 and which indicates that the playback process of an audio data is resumed from the point it is paused. Slow Replay Message Text Data 20633*b*2*d* is a text data which is displayed on LCD 201 and which indicates that the playback process of an audio data is implemented in a slow motion. Fast-Forward Message Text Data 20633*b*2*e* is a text data which is displayed on LCD 201 and which indicates that an audio data is fast-forwarded. Fast-Rewind Message Text Data 20633*b*2*f* is a text data which is displayed on LCD 201 and which indicates that an audio data is fast-rewinded. Next Message Text Data 20633*b*2*g* is a text data which is displayed on LCD 201 and which indicates that the playback process of the next audio data stored in Audio Data Storage Area 20633*b*1 (FIG. 165) is initiated. Previous Message Text Data 20633*b*2*h* is a text data which is displayed on LCD 201 and which indicates that the playback process of the previous audio data stored in Audio Data Storage Area 20633*b*1 (FIG. 165**) is initiated.

FIG. 167 illustrates the software programs stored in Audio Playback Software Storage Area **20633*c* (FIG. 163). As described in FIG. 167, Audio Playback Software Storage Area 20633*c* includes Audio Start Software 20633*c*1, Audio Stop Software 20633*c*2, Audio Pause Software 20633*c*3, Audio Resume Software 20633*c*3*a*, Audio Slow Replay Software 20633*c*4, Audio Fast-Forward Software 20633*c*5, Audio Fast-Rewind Software 20633*c*6, Audio Next Software 20633*c*7, and Audio Previous Software 20633*c*8. Audio Start Software 20633*c*1 is a software program which initiates the playback process of an audio data. Audio Stop Software 20633*c*2 is a software program which stops the playback process of an audio data. Audio Pause Software 20633*c*3 is a software program which pauses the playback process of an audio data. Audio Resume Software 20633*c*3*a* is a software program which resumes the playback process of the audio data from the point it is paused by Audio Pause Software 20633*c*3. Audio Slow Replay Software 20633*c*4 is a software program which implements the playback process of an audio data in a slow motion. Audio Fast-Forward Software 20633*c*5 is a software program which fast-forwards an audio data. Audio Fast-Rewind Software 20633*c*6 is a software program which fast-rewinds an audio data. Audio Next Software 20633*c*7 is a software program which initiates the playback process of the next audio data stored in Audio Data Storage Area 20633*b*1 (FIG. 165). Audio Previous Software 20633*c*8 is a software program which initiates the playback process of the previous audio data stored in Audio Data Storage Area 20633*b*1**.

FIG. 168 illustrates the messages displayed on LCD 201 (FIG. 1). As described in FIG. 168, eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data **20633*b*2*a*, 'Stop' is Stop Message Text Data 20633*b*2*b*, 'Pause' is Pause Message Text Data 20633*b*2*c*, 'Resume' is Resume Message Text Data 20633*b*2*c*1, 'Slow Reply' is Slow Replay Message Text Data 20633*b*2*d*, 'Fast-Forward' is Fast-Forward Message Text Data 20633*b*2*e*, 'Fast-Rewind' is Fast-Rewind Message Text Data 20633*b*2*f*, 'Next' is Next Message Text Data 20633*b*2*g*, 'Previous' is Previous Message Text Data 20633*b*2*h* described in FIG. 166** hereinbefore.

FIG. 169 illustrates Audio Selecting Software **20633*c*9 stored in Audio Playback Software Storage Area 20633*c* (FIG. 163) in preparation of executing the software programs described in FIG. 170 through FIG. 178. Referring to FIG. 169, CPU 211 (FIG. 1) retrieves the identifications of the audio data stored in Audio Data Storage Area 20633*b*1 (FIG. 165) (S1). CPU 211 then displays a list of the identifications on LCD 201 (FIG. 1) (S2). A particular audio data is selected by utilizing Input Device 210 (FIG. 1) or via voice recognition system (S3**).

FIG. 170 through FIG. 178 illustrates the software programs stored in Audio Playback Software Storage Area **20633*c* (FIG. 163). As described in each drawing figure hereinafter, eight types of input signals can be input by utilizing Input Device 210 (FIG. 1) or via voice recognition system, i.e., the audio playback signal, the audio stop signal, the audio pause signal, the audio resume signal, the audio slow replay signal, the audio fast-forward signal, the audio fast-rewind signal, the audio next signal, and the audio previous signal. The audio playback signal indicates to initiate the playback process of the audio data selected in S3 of FIG. 169. The audio stop signal indicates to stop the playback process of the audio data selected in S3 of FIG. 169. The audio pause signal indicates to pause the playback process of the audio data selected in S3 of FIG. 169. The audio resume signal indicates to resume the playback process of the audio data selected in S3 of FIG. 169 from the point the audio data is paused. The audio slow replay signal indicates to implement the playback process of the audio data selected in S3 of FIG. 169 in a slow motion. The audio fast-forward signal indicates to fast-forward the audio data selected in S3 of FIG. 169. The audio fast-rewind signal indicates to fast-rewind the audio data selected in S3 of FIG. 169. The audio next signal indicates to initiate the playback process of the next audio data of the audio data selected in S3 of FIG. 169 both of which are stored in Audio Data Storage Area 20633*b*1 (FIG. 165). The audio previous signal indicates to initiate the playback process of the previous audio data of the audio data selected in S3 of FIG. 169 both of which are stored in Audio Data Storage Area 20633*b*1 FIG. 170 illustrates Audio Start Software 20633*c*1 stored in Audio Playback Software Storage Area 20633*c* (FIG. 163) which initiates the playback process of the audio data selected in S3 of FIG. 169. Referring to FIG. 170, the audio playback signal is input by utilizing Input Device 210 (FIG. 1) or via voice recognition system (S1). CPU 211** (FIG.

1) then initiates the playback process (i.e., outputs the audio data from Speaker 216 (FIG. 1)) of the audio data selected in S3 of FIG. 169 (S2), and retrieves Start Message Text Data **20633*b*2*a* from Message Data Storage Area 20633*b*2 (FIG. 164) and displays the data on LCD 201 (FIG. 1**) for a specified period of time (S3).

FIG. 171 illustrates Audio Stop Software **20633*c*2 stored in Audio Playback Software Storage Area 20633*c* (FIG. 163) which stops the playback process of the audio data selected in S3 of FIG. 169. Referring to FIG. 171, the audio stop signal is input by utilizing Input Device 210 (FIG. 1) or via voice recognition system (S1). CPU 211 (FIG. 1) then stops the playback process of the audio data selected in S3 of FIG. 169 (S2), and retrieves Stop Message Text Data 20633*b*2*b* from Message Data Storage Area 20633*b*2 (FIG. 164) and displays the data on LCD 201 (FIG. 1**) for a specified period of time (S3).

FIG. 172 illustrates Audio Pause Software **20633*c*3 stored in Audio Playback Software Storage Area 20633*c* (FIG. 163) which pauses the playback process of the audio data selected in S3 of FIG. 169. Referring to FIG. 172, the audio pause signal is input by utilizing Input Device 210 (FIG. 1) or via voice recognition system (S1). CPU 211 (FIG. 1) then pauses the playback process of the audio data selected in S3 of FIG. 169 (S2), and retrieves Pause Message Text Data 20633*b*2*c* from Message Data Storage Area 20633*b*2 (FIG. 164) and displays the data on LCD 201 (FIG. 1) for a specified period of time (S3) When the playback process is paused in S2, the audio data included in the audio data is refrained from being output from Speaker 216 (FIG. 1**).

FIG. 173 illustrates Audio Resume Software **20633*c*3*a* stored in Audio Playback Software Storage Area 20633*c* (FIG. 163) which resumes the playback process of the audio data selected in S3 of FIG. 169 from the point the audiovisual data is paused in S2 of FIG. 172. Referring to FIG. 173, the audio resume signal is input by utilizing Input Device 210 (FIG. 1) or via voice recognition system (S1). CPU 211 (FIG. 1) then resumes the playback process of the audio data selected in S3 of FIG. 169 from the point the audiovisual data is paused in S2 of FIG. 172 (S2), and retrieves Resume Message Text Data 20633*b*2*c*1 from Message Data Storage Area 20633*b*2 (FIG. 164) and displays the data on LCD 201 (FIG. 1**) for a specified period of time (S3).

FIG. 174 illustrates Audio Slow Replay Software **20633*c*4 stored in Audio Playback Software Storage Area 20633*c* (FIG. 163) which implements the playback process of the audio data selected in S3 of FIG. 169 in a slow motion. Referring to FIG. 174, the audio slow replay signal is input by utilizing Input Device 210 (FIG. 1) or via voice recognition system (S1). CPU 211 (FIG. 1) then initiates the playback process of the audio data selected in S3 of FIG. 169 in a slow motion (S2), and retrieves Slow Replay Message Text Data 20633*b*2*d* from Message Data Storage Area 20633*b*2 (FIG. 164) and displays the data on LCD 201 (FIG. 1**) for a specified period of time (S3).

FIG. 175 illustrates Audio Fast-Forward Software **20633*c*5 stored in Audio Playback Software Storage Area 20633*c* (FIG. 163) which fast-forwards the audio data selected in S3 of FIG. 169. Referring to FIG. 175, the audio fast-forward signal is input by utilizing Input Device 210 (FIG. 1) or via voice recognition system (S1). CPU 211 (FIG. 1) then fast-forwards the audio data selected in S3 of FIG. 169 (S2), and retrieves Fast-Forward Message Text Data 20633*b*2*e* from Message Data Storage Area 20633*b*2 (FIG. 164) and displays the data on LCD 201 (FIG. 1**) for a specified period of time (S3).

FIG. 176 illustrates Audio Fast-Rewind Software **20633*c*6 stored in Audio Playback Software Storage Area 20633*c* (FIG. 163) which fast-rewinds the audio data selected in S3 of FIG. 169. Referring to FIG. 176, the audio fast-rewind signal is input by utilizing Input Device 210 (FIG. 1) or via voice recognition system (S1). CPU 211 (FIG. 1) then fast-rewinds the audio data selected in S3 of FIG. 169 (S2), and retrieves Fast-Rewind Message Text Data 20633*b*2*f* from Message Data Storage Area 20633*b*2 (FIG. 164) and displays the data on LCD 201 (FIG. 1**) for a specified period of time (S3).

FIG. 177 illustrates Audio Next Software **20633*c*7 stored in Audio Playback Software Storage Area 20633*c* (FIG. 163) which initiates the playback process of the next audio data stored in Audio Data Storage Area 20633*b*1 (FIG. 165). Referring to FIG. 177, the audio next signal is input by utilizing Input Device 210 (FIG. 1) or via voice recognition system (S1). CPU 211 (FIG. 1) then initiates the playback process of the next audio data of the audio data selected in S3 of FIG. 169 both of which are stored in Audio Data Storage Area 20633*b*1 (FIG. 165) (S2), and retrieves Next Message Text Data 20633*b*2*g* from Message Data Storage Area 20633*b*2 (FIG. 164) and displays the data on LCD 201 (FIG. 1**) for a specified period of time (S3).

FIG. 178 illustrates Audio Previous Software **20633*c*8 is a software program which initiates the playback process of the previous audio data stored in Audio Data Storage Area 20633*b*1 (FIG. 165). Referring to FIG. 178, the audio previous signal is input by utilizing Input Device 210 (FIG. 1) or via voice recognition system (S1). CPU 211 (FIG. 1) then initiates the playback process of the previous audio data of the audio data selected in S3 of FIG. 169 both of which are stored in Audio Data Storage Area 20633*b*1 (FIG. 165) (S2), and retrieves Previous Message Text Data 20633*b*2*h* from Message Data Storage Area 20633*b*2 (FIG. 164) and displays the data on LCD 201 (FIG. 1**) for a specified period of time (S3).

As another embodiment, the audio data stored in Audio Data Storage Area **20633*b*1 (FIG. 165) may be stored in Host H (FIG. 289) and retrieved therefrom when the software programs described in FIG. 170 through FIG. 178 are executed. In this embodiment, the audio data is temporarily stored in RAM 206 (FIG. 1**) and is erased from the portion which is playbacked.

<<Digital Camera Function>>

FIG. 179 through FIG. 197 illustrate the digital camera function which enables Communication Device 200 to take digital photos by utilizing CCD Unit 214 (FIG. 1).

FIG. 179 illustrates the storage area included in RAM 206 (FIG. 1). As described in the present drawing, RAM 206 includes Digital Camera Information Storage Area **20646*a* of which the data and the software programs stored therein are described in FIG. 180**.

The data and software programs stored in Digital Camera Information Storage Area **20646*a* (FIG. 179) may be downloaded from Host H (FIG. 289) in the manner described in FIG. 104 through FIG. 110**.

FIG. 180 illustrates the storage areas included in Digital Camera Information Storage Area **20646*a* (FIG. 179). As described in the present drawing, Digital Camera Information Storage Area 20646*a* includes Digital Camera Data Storage Area 20646*b* and Digital Camera Software Storage Area 20646*c*. Digital Camera Data Storage Area 20646*b* stores the data necessary to implement the present function, such as the ones described in FIG. 181 through FIG. 183. Digital Camera Software Storage Area 20646*c* stores the software programs necessary to implement the present function, such as the ones described in FIG. 184**.

FIG. 181 illustrates the storage areas included in Digital Camera Data Storage Area 20646*b* (FIG. 180). As described in the present drawing, Digital Camera Data Storage Area 20646*b* includes Photo Data Storage Area 20646*b*1 and Digital Camera Function Data Storage Area 20646*b*2. Photo Data Storage Area 20646*b*1 stores the data described in FIG. 182. Digital Camera Function Data Storage Area 20646*b*2 stores the data stored in FIG. 183.

FIG. 182 illustrates the data stored in Photo Data Storage Area 20646*b*1 (FIG. 181). As described in the present drawing, Photo Data Storage Area 20646*b*1 comprises two columns, i.e., 'Photo ID' and 'Photo Data'. Column 'Photo ID' stores the identifications of the photo data, and column 'Photo Data' stores a plurality of photo data taken by implementing the present function. In the example described in the present drawing, Photo Data Storage Area 20646*b*1 stores the following data: 'Photo ID' Photo #1 of which the 'Photo Data' is 46PD1; 'Photo ID' Photo #2 of which the 'Photo Data' is 46PD2; 'Photo ID' Photo #3 of which the 'Photo Data' is 46PD3; 'Photo ID' Photo #4 of which the 'Photo Data' is 46PD4; and 'Photo ID' Photo #5 of which the 'Photo Data' is 46PD5.

FIG. 183 illustrates the storage areas included in Digital Camera Function Data Storage Area 20646*b*2 (FIG. 181). As described in the present drawing, Digital Camera Function Data Storage Area 20646*b*2 includes Quality Data Storage Area 20646*b*2*a*, Multiple Photo Shooting Number Data Storage Area 20646*b*2*b*, and Strobe Data Storage Area 20646*b*2*c*. Quality Data Storage Area 20646*b*2*a* stores the data selected in S2 of FIG. 186. Multiple Photo Shooting Number Data Storage Area 20646*b*2*b* stores the data selected in S2 of FIG. 187. Strobe Data Storage Area 20646*b*2*c* stores the data selected in S2 of FIG. 188.

FIG. 184 illustrates the software programs stored in Digital Camera Software Storage Area 20646*c* (FIG. 180). As described in the present drawing, Digital Camera Software Storage Area 20646*c* stores Quality Selecting Software 20646*c*1, Multiple Photo Shooting Software 20646*c*2, Trimming Software 20646*c*3, Digital Zooming Software 20646*c*4, Strobe Software 20646*c*5, Digital Camera Function Selecting Software 20646*c*6, Multiple Photo Shooting Number Selecting Software 20646*c*7, Strobe On/Off Selecting Software 20646*c*8, Photo Data Shooting Software 20646*c*9, and Multiple Photo Shooting Software 20646*c*10. Quality Selecting Software 20646*c*1 is the software program described in FIG. 186. Multiple Photo Shooting Software 20646*c*2 is the software program described in FIG. 190. Trimming Software 20646*c*3 is the software program described in FIG. 197. Digital Zooming Software 20646*c*4 is the software program described in FIG. 194. Strobe Software 20646*c*5 is the software program described in FIG. 191. Digital Camera Function Selecting Software 20646*c*6 is the software program described in FIG. 185. Multiple Photo Shooting Number Selecting Software 20646*c*7 is the software program described in FIG. 187. Strobe On/Off Selecting Software 20646*c*8 is the software program described in FIG. 188. Photo Data Shooting Software 20646*c*9 is the software program described in FIG. 189.

FIG. 185 illustrates Digital Camera Function Selecting Software 20646*c*6 stored in Digital Camera Software Storage Area 20646*c* (FIG. 184) which administers the overall flow of displaying the functions and selecting the option for each function. Referring to the present drawing, a list of functions is displayed on LCD 201 (FIG. 1) (S1). The items displayed on LCD 201 are 'Quality', 'Multiple Photo', and 'Strobe'. A function is selected by utilizing Input Device 210 (FIG. 1) or via voice recognition system (S2), and the relevant software program is activated thereafter (S3). In the present embodiment, Quality Selecting Software 20646*c*1 described in FIG. 186 is activated when 'Quality' displayed on LCD 201 is selected in S2. Multiple Photo Shooting Number Selecting Software 20646*c*7 described in FIG. 187 is activated when 'Multiple Photo' is selected in S2. Strobe On/Off Selecting Software 20646*c*8 described in FIG. 188 is activated when 'Strobe' is selected in S2.

FIG. 186 illustrates Quality Selecting Software 20646*c*1 stored in Digital Camera Software Storage Area 20646*c* (FIG. 184) which selects the quality of the photo data taken by implementing the present function. Referring to the present drawing, a list of options is displayed on LCD 201 (FIG. 1) (S1). The options displayed on LCD 201 are 'High', 'STD', and 'Low' in the present embodiment. One of the options is selected by utilizing Input Device 210 (FIG. 1) or via voice recognition system (S2). The resolution of the photo data taken is high if 'High' is selected; the resolution of the photo taken is standard if 'STD' is selected; and the resolution of the photo taken is low if 'Low' is selected. The selected option is stored as the quality data in Quality Data Storage Area 20646*b*2*a* (FIG. 183) (S3).

FIG. 187 illustrates Multiple Photo Shooting Number Selecting Software 20646*c*7 stored in Digital Camera Software Storage Area 20646*c* (FIG. 184) which selects the number of photos taken by a single photo shooting signal. Referring to the present drawing, a list of options is displayed on LCD 201 (FIG. 1) (S1). The options displayed on LCD 201 are figures from '1' through '10'. Only one photo is taken by a photo shooting signal if '1' is selected; two photos are taken by a photo shooting signal if '2' is selected; three photos are taken by a photo shooting signal if '3' is selected; four photos are taken by a photo shooting signal if '4' is selected; five photos are taken by a photo shooting signal if '5' is selected; six photos are taken by a photo shooting signal if '6' is selected; seven photos are taken by a photo shooting signal if '7' is selected; eight photos are taken by a photo shooting signal if '8' is selected; nine photos are taken by a photo shooting signal if '9' is selected; and ten photos are taken by a photo shooting signal if '10' is selected. A digit from '1' through '10' is selected by utilizing Input Device 210 (FIG. 1) or via voice recognition system (S2). The selected digital is stored as the multiple photo shooting number data in Multiple Photo Shooting Number Data Storage Area 20646*b*2*b* (FIG. 183) (S3).

FIG. 188 illustrates Strobe On/Off Selecting Software 20646*c*8 stored in Digital Camera Software Storage Area 20646*c* (FIG. 184) which selects Flash Light Unit 220 (FIG. 337*a*) to be activated or not when a photo is taken. Referring to the present drawing, a list of options is displayed on LCD 201 (FIG. 1) (S1). The options displayed on LCD 201 are 'On' and 'Off'. Flash Light Unit 220 is activated at the time photo is taken if 'On' is selected; and Flash Light Unit 220 is not activated at the time photo is taken if 'Off' is selected. One of the two options is selected by utilizing Input Device 210 (FIG. 1) or via voice recognition system (S2). The selected option is stored as the strobe data in Strobe Data Storage Area 20646*b*2*c* (FIG. 183) (S3).

FIG. 189 illustrates Photo Data Shooting Software 20646*c*9 stored in Digital Camera Software Storage Area 20646*c* (FIG. 184) which takes photo(s) in accordance with the options selected in FIG. 186. Referring to the present drawing, a photo shooting signal is input by utilizing Input Device 210 (FIG. 1) or via voice recognition system (S1). Here, the photo shooting signal indicates CPU 211 (FIG. 1) to input photo data to CCD Unit 214 (FIG. 1) and store the data in Photo Data Storage Area 20646*b*1 (FIG. 182). CPU 211 then retrieves the quality data from Quality Data Storage Area 20646*b2a* (FIG. 183) (S2). The photo data is input via CCD Unit 214 (S3), and the data is stored in Photo Data Storage Area 20646*b*1 (FIG. 182) with new photo ID in accordance with the quality data retrieved in S2 (S4).

FIG. 190 illustrates Multiple Photo Shooting Software 20646*c*2 stored in Digital Camera Software Storage Area 20646*c* (FIG. 184) which takes photo(s) in accordance with the options selected in FIG. 187. Referring to the present thawing, a photo shooting signal is input by utilizing Input Device 210 (FIG. 1) or via voice recognition system (S1). CPU 211 (FIG. 1) retrieves the multiple photo shooting number data from Multiple Photo Shooting Number Data Storage Area 20646*b2b* (FIG. 183) (S2). CPU 211 then takes photos in accordance with the multiple photo shooting number data retrieved in S2 (S3). Namely, only one photo is taken by a photo shooting signal if the multiple photo shooting number data retrieved in S2 is '1'; two photos are taken by a photo shooting signal if the multiple photo shooting number data retrieved in S2 is '2'; three photos are taken by a photo shooting signal if the multiple photo shooting number data retrieved in S2 is '3'; four photos are taken by a photo shooting signal if the multiple photo shooting number data retrieved in S2 is '4'; five photos are taken by a photo shooting signal if the multiple photo shooting number data retrieved in S2 is '5'; six photos are taken by a photo shooting signal if the multiple photo shooting number data retrieved in S2 is '6'; seven photos are taken by a photo shooting signal if the multiple photo shooting number data retrieved in S2 is '7'; eight photos are taken by a photo shooting signal if the multiple photo shooting number data retrieved in S2 is '8'; nine photos are taken by a photo shooting signal if the multiple photo shooting number data retrieved in S2 is '9'; and ten photos are taken by a photo shooting signal if the multiple photo shooting number data retrieved in S2 is '10'.

FIG. 191 illustrates Strobe Software 20646*c*5 stored in Digital Camera Software Storage Area 20646*c* (FIG. 184) which takes photo(s) in accordance with the options selected in FIG. 188. Referring to the present drawing, a photo shooting signal is input by utilizing Input Device 210 (FIG. 1) or via voice recognition system (S1). CPU 211 (FIG. 1) retrieves the strobe data from Strobe Data Storage Area 20646*b2c* (FIG. 183) (S2). If the strobe data is 'On' (S3), CPU 211 activates Flash Light Unit 220 (FIG. 337*a*) each time a photo is taken (S4). In other words, Strobe Software 20646*c*5 is harmonized with Multiple Photo Shooting Software 20646*c*2 described in FIG. 190. Namely, Flash Light Unit 220 is activated for one time if one photo is taken by a single photo shooting signal. Flash Light Unit 220 is activated for two times if two photos are taken by a single photo shooting signal. Flash Light Unit 220 is activated for three times if three photos are taken by a single photo shooting signal. Flash Light Unit 220 is activated for four times if four photos are taken by a single photo shooting signal. Flash Light Unit 220 is activated for five times if five photos are taken by a single photo shooting signal. Flash Light Unit 220 is activated for six times if six photos are taken by a single photo shooting signal. Flash Light Unit 220 is activated for seven times if seven photos are taken by a single photo shooting signal. Flash Light Unit 220 is activated for eight times if eight photos are taken by a single photo shooting signal. Flash Light Unit 220 is activated for nine times if nine photos are taken by a single photo shooting signal. Flash Light Unit 220 is activated for ten times if ten photos are taken by a single photo shooting signal.

FIG. 192 illustrates one embodiment of the zooming function which zooms the photo data stored in Photo Data Storage Area 20646*b*1 (FIG. 182). Referring to the present drawing, a certain photo selected by the user of Communication Device 200 is displayed on LCD 201 (FIG. 1). Assuming that the user intends to zoom Object 20646Obj, the object displayed on LCD 201, to a larger size. The user selects Area 46ARa which includes Object 20646Obj by utilizing Input Device 210 (FIG. 1) or via voice recognition system, and the selected area is zoomed to fit the size of LCD 201. The zoomed photo is replaced with the original photo.

FIG. 193 illustrates the operation performed in RAM 206 (FIG. 1) to implement the zooming function described in FIG. 192. A certain photo data selected by the user of Communication Device 200 is stored in Area 20646ARa of RAM 206. Here, the size of the photo data is as same as that of Area 20646ARa. Referring to the present drawing, Display Area 20646DA is the area which is displayed on LCD 201 (FIG. 1). Area 46ARa is the area which is selected by the user of Communication Device 200. Object 20646Obj is the object included in the photo data. Area 46ARa which includes Object 20646Obj is selected by utilizing Input Device 210 (FIG. 1) or via voice recognition system, and the photo data stored in Area 20646ARa is zoomed to the size in which the size of Area 46ARa equals to that of Display Area 20646DA. The zoomed photo data is replaced with the original photo data and stored in Photo Data Storage Area 20646*b*1 (FIG. 182). The portion of the photo data which does not fit Area 20646ARa is cropped.

FIG. 194 illustrates Digital Zooming Software 20646*c*4 stored in Digital Camera Software Storage Area 20646*c* (FIG. 184) which implements the operation described in FIG. 193. Referring to the present drawing, CPU 211 (FIG. 1) displays a list of the photo IDs representing the photo data stored in Photo Data Storage Area 20646*b*1 (FIG. 182) as well as the thumbnails (S1). A certain photo data is selected by utilizing Input Device 210 (FIG. 1) or via voice recognition system (S2), and the selected photo data is displayed on LCD 201 (FIG. 1) as described in FIG. 192 (S3). Area 46ARa described in FIG. 192 is selected by utilizing Input Device 210 or via voice recognition system (S4). When a zooming signal is input by utilizing Input Device 210 or via voice recognition system (S5), CPU 211 (FIG. 1) implements the process described in FIG. 193 and replaces the original photo data with the zoomed photo data, which is stored in Photo Data Storage Area 20646*b*1 (FIG. 182) (S6).

FIG. 195 illustrates one embodiment of the trimming function which trims the photo data stored in Photo Data Storage Area 20646*b*1 (FIG. 182) and thereby moves the selected object to the center of the photo data. Referring to the present drawing, a certain photo selected by the user of Communication Device 200 is displayed on LCD 201 (FIG. 1). Point 20646PTa adjacent to Object 20646Obj is selected by utilizing Input Device 210 (FIG. 1) or via voice recognition system, and the photo is centered at Point 20646PTa. The trimmed photo is replaced with the original photo.

FIG. 196 illustrates the operation performed in RAM 206 (FIG. 1) to implement the trimming function described in FIG. 195. Referring to the present drawing, Display Area 20646DA is the portion of the photo data which is displayed on LCD 201 (FIG. 1). Object 20646Obj is the object included in the photo data. Point 20646PTa is the point selected by the user of Communication Device 200 adjacent to Object 20646Obj which is centered by the present function. Referring to the present drawing, a certain photo data selected by the user of Communication Device 200 is stored in Area 20646ARb of RAM 206. Here, the size of the photo data is as same as that of Area 20646ARb. Point 20646PTa is selected by utilizing Input Device 210 (FIG. 1) or via voice recognition system, and the photo data is centered at Point 20646PTa by sliding the entire photo data to the right. The trimmed photo data is replaced with the original photo data and stored in Photo Data Storage Area 20646*b*1 (FIG. 182). The portion of the photo data which does not fit Area 20646ARa is cropped.

FIG. 197 illustrates Trimming Software 20646*c*3 stored in Digital Camera Software Storage Area 20646*c* (FIG. 184) which implements the operation described in FIG. 196. Referring to the present drawing, CPU 211 (FIG. 1) displays a list of the photo IDs representing the photo data stored in Photo Data Storage Area 20646*b*1 (FIG. 182) as well as the thumbnails (S1). A certain photo data is selected by utilizing Input Device 210 (FIG. 1) or via voice recognition system (S2), and the selected photo data is displayed on LCD 201 (FIG. 1) as described in FIG. 195 (S3). Point 20646PTa described in FIG. 195 is selected by utilizing Input Device 210 or via voice recognition system (S4). When a trimming signal is input by utilizing Input Device 210 or via voice recognition system (S5), CPU 211 (FIG. 1) centers the photo data at Point 20646PTa as described in FIG. 457 and replaces the original photo data with the trimmed photo data, which is stored in Photo Data Storage Area 20646*b*1 (FIG. 182) (S6).

<<Multiple Language Displaying Function>>

FIG. 198 through FIG. 224 illustrate the multiple language displaying function wherein a language is selected from a plurality of languages, such as English, Japanese, French, and German, which is utilized to operate Communication Device 200.

FIG. 198 illustrates the storage area included in RAM 206 (FIG. 1). As described in the present drawing, RAM 206 includes Multiple Language Displaying Info Storage Area 20654*a* of which the data and the software programs stored therein are described in FIG. 199.

The data and/or the software programs stored in Multiple Language Displaying Info Storage Area 20654*a* (FIG. 198) may be downloaded from Host H (FIG. 289) in the manner described in FIG. 104 through FIG. 110.

FIG. 199 illustrates the storage areas included in Multiple Language Displaying Info Storage Area 20654*a* (FIG. 198). As described in the present drawing, Multiple Language Displaying Info Storage Area 20654*a* includes Multiple Language Displaying Data Storage Area 20654*b* and Multiple Language Displaying Software Storage Area 20654*c*. Multiple Language Displaying Data Storage Area 20654*b* stores the data necessary to implement the present function, such as the ones described in FIG. 200 through FIG. 207. Multiple Language Displaying Software Storage Area 20654*c* stores the software programs necessary to implement the present function, such as the ones described in FIG. 208.

FIG. 200 illustrates the storage areas included in Multiple Language Displaying Data Storage Area 20654*b* (FIG. 199). As described in the present drawing, Multiple Language Displaying Data Storage Area 20654*b* includes Language Tables Storage Area 20654*b*1, Language Type Data Storage Area 20654*b*2, Language Item Data Storage Area 20654*b*3, and Selected Language Table ID Storage Area 20654*b*4. Language Tables Storage Area 20654*b*1 stores the data described in FIG. 201. Language Type Data Storage Area 20654*b*2 stores the data described in FIG. 206. Language Item Data Storage Area 20654*b*3 stores the data described in FIG. 207. Selected Language Table ID Storage Area 20654*b*4 stores the language table ID selected in S4*s* of FIG. 209, FIG. 217, FIG. 225, and FIG. 233.

FIG. 201 illustrates the storage areas included in Language Tables Storage Area 20654*b*1 (FIG. 200). As described in the present drawing, Language Tables Storage Area 20654*b*1 includes Language Table #1 Storage Area 20654*b*1*a*, Language Table #2 Storage Area 20654*b*1*b*, Language Table #3 Storage Area 20654*b*1*c*, and Language Table #4 Storage Area 20654*b*1*d*. Language Table #1 Storage Area 20654*b*1*a* stores the data described in FIG. 202. Language Table #2 Storage Area 20654*b*1*b* stores the data described in FIG. 203. Language Table #3 Storage Area 20654*b*1*c* stores the data described in FIG. 204. Language Table #4 Storage Area 20654*b*1*d* stores the data described in FIG. 205.

FIG. 202 illustrates the data stored in Language Table #1 Storage Area 20654*b*1*a* (FIG. 201). As described in the present drawing, Language Table #1 Storage Area 20654*b*1*a* comprises two columns, i.e., 'Language Item ID' and 'Language Text Data'. Column 'Language Item ID' stores the language item IDs, and each language item ID represents the identification of the corresponding language text data.

Column 'Language Text Data' stores the language text data, and each language text data represents the English text data displayed on LCD 201 (FIG. 1). In the example described in the present drawing, Language Table #1 Storage Area 20654*b*1*a* stores the following data: the language item ID 'Language Item #1' and the corresponding language text data 'Open file'; the language item ID 'Language Item #2' and the corresponding language text data 'Close file'; the language item ID 'Language Item #3' and the corresponding language text data 'Delete'; the language item ID 'Language Item #4' and the corresponding language text data 'Copy'; the language item ID 'Language Item #5' and the corresponding language text data 'Cut'; the language item ID 'Language Item #6' and the corresponding language text data 'Paste'; the language item ID 'Language Item #7' and the corresponding language text data 'Insert'; the language item ID 'Language Item #8' and the corresponding language text data 'File'; the language item ID 'Language Item #9' and the corresponding language text data 'Edit'; the language item ID 'Language Item #10' and the corresponding language text data 'View'; the language item ID 'Language Item #11' and the corresponding language text data 'Format'; the language item ID 'Language Item #12' and the corresponding language text data 'Tools'; the language item ID 'Language Item #13' and the corresponding language text data 'Window'; the language item ID 'Language Item #14' and the corresponding language text data 'Help'; the language item ID 'Language Item #15' and the corresponding language text data 'My Network'; the language item ID 'Language Item #16' and the corresponding language text data 'Trash'; the language item ID 'Language Item #17' and the corresponding language text data 'Local Disk'; the language item ID 'Language Item #18' and the corresponding language text data 'Save'; the language item ID 'Language Item #19' and the corresponding language text data 'Yes'; the language item ID 'Language Item #20' and the corresponding language text data 'No'; and the language item ID 'Language Item #21' and the corresponding language text data 'Cancel'.

FIG. 203 illustrates the data stored in Language Table #1 Storage Area 20654*b*1*b* (FIG. 201). As described in the present drawing, Language Table #1 Storage Area 20654*b*1*b* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the Japanese text data displayed on LCD 201 (FIG. 1). In the example described in the present drawing, Language Table #1 Storage Area 20654*b*1*b* stores the following data: the language item ID 'Language Item #1' and the corresponding language text data meaning 'Open file' in Japanese; the language item ID 'Language Item #2' and the corresponding language text data meaning 'Close file' in Japanese; the language item ID 'Language Item #3' and the corresponding language text data meaning 'Delete' in Japanese; the language item ID 'Language Item #4' and the corresponding language text data meaning 'Copy' in Japanese; the language item ID 'Language Item #5' and the corresponding language text data meaning 'Cut' in Japanese; the language item ID 'Language Item #6' and the corresponding language text data meaning 'Paste' in Japanese; the language item ID 'Language Item #7' and the corresponding language text data meaning 'Insert' in Japanese; the language item ID 'Language Item #8' and the corresponding language text data meaning 'File' in Japanese; the language item ID 'Language Item #9' and the corresponding language text data meaning 'Edit' in Japanese; the language item ID 'Language Item #10' and the corresponding language text data meaning 'View' in Japanese; the language item ID 'Language Item #11' and the corresponding language text data meaning 'Format' in Japanese; the language item ID 'Language Item #12' and the corresponding language text data meaning 'Tools' in Japanese; the language item ID 'Language Item #13' and the corresponding language text data meaning 'Window' in Japanese; the language item ID 'Language Item #14' and the corresponding language text data meaning 'Help' in Japanese; the language item ID 'Language Item #15' and the corresponding language text data meaning 'My Network' in Japanese; the language item ID 'Language Item #16' and the corresponding language text data meaning 'Trash' in Japanese; the language item ID 'Language Item #17' and the corresponding language text data meaning 'Local Disk' in Japanese; the language item ID 'Language Item #18' and the corresponding language text data meaning 'Save' in Japanese; the language item ID 'Language Item #19' and the corresponding language text data meaning 'Yes' in Japanese; the language item ID 'Language Item #20' and the corresponding language text data meaning 'No' in Japanese; and the language item ID 'Language Item #21' and the corresponding language text data meaning 'Cancel' in Japanese.

FIG. 204 illustrates the data stored in Language Table #1 Storage Area 20654*b*1*c* (FIG. 201). As described in the present drawing, Language Table #1 Storage Area 20654*b*1*c* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the French text data displayed on LCD 201 (FIG. 1). In the example described in the present drawing, Language Table #1 Storage Area 20654*b*1*c* stores the following data: the language item ID 'Language Item #1' and the corresponding language text data 'French #1' meaning 'Open file' in French; the language item ID 'Language Item #2' and the corresponding language text data 'French #2' meaning 'Close file' in French; the language item ID 'Language Item #3' and the corresponding language text data 'French #3' meaning 'Delete' in French; the language item ID 'Language Item #4' and the corresponding language text data 'French #4' meaning 'Copy' in French; the language item ID 'Language Item #5' and the corresponding language text data 'French #5' meaning 'Cut' in French; the language item ID 'Language Item #6' and the corresponding language text data 'French #6' meaning 'Paste' in French; the language item ID 'Language Item #7' and the corresponding language text data 'French #7' meaning 'Insert' in French; the language item ID 'Language Item #8' and the corresponding language text data 'French #8' meaning 'File' in French; the language item ID 'Language Item #9' and the corresponding language text data 'French #9' meaning 'Edit' in French; the language item ID 'Language Item #10' and the corresponding language text data 'French #10' meaning 'View' in French; the language item ID 'Language Item #11' and the corresponding language text data 'French #11' meaning 'Format' in French; the language item ID 'Language Item #12' and the corresponding language text data 'French #12' meaning 'Tools' in French; the language item ID 'Language Item #13' and the corresponding language text data 'French #13' meaning 'Window' in French; the language item ID 'Language Item #14' and the corresponding language text data 'French #14' meaning 'Help' in French; the language item ID 'Language Item #15' and the corresponding language text data 'French #15' meaning 'My Network' in French; the language item ID 'Language Item #16' and the corresponding language text data 'French #16' meaning 'Trash' in French; the language item ID 'Language Item #17' and the corresponding language text data 'French #17' meaning 'Local Disk' in French; the language item ID 'Language Item #18' and the corresponding language text data 'French #18' meaning 'Save' in French; the language item ID 'Language Item #19' and the corresponding language text data 'French #19' meaning 'Yes' in French; the language item ID 'Language Item #20' and the corresponding language text data 'French #20' meaning 'No' in French; and the language item ID 'Language Item #21' and the corresponding language text data 'French #21' meaning 'Cancel' in French.

FIG. 205 illustrates the data stored in Language Table #1 Storage Area 20654*b*1*d* (FIG. 201). As described in the present drawing, Language Table #1 Storage Area 20654*b*1*d* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the German text data displayed on LCD 201 (FIG. 1). In the example described in the present drawing, Language Table #1 Storage Area 20654*b*1*d* stores the following data: the language item ID 'Language Item #1' and the corresponding language text data 'German #1' meaning 'Open file' in German; the language item ID 'Language Item #2' and the corresponding language text data 'German #2' meaning 'Close file' in German, the language item ID 'Language Item #3' and the corresponding language text data 'German #3' meaning 'Delete' in German; the language item ID 'Language Item #4' and the corresponding language text data 'German #4' meaning 'Copy' in German; the language item ID 'Language Item #5' and the corresponding language text data 'German #5' meaning 'Cut' in German; the language item ID 'Language Item #6' and the corresponding language text data 'German #6' meaning 'Paste' in German, the language item ID 'Language Item #7' and the corresponding language text data 'German #7' meaning 'Insert' in German; the language item ID 'Language Item #8' and the corresponding language text data 'German #8' meaning 'File' in German; the language item ID 'Language Item #9' and the corresponding language text data 'German #9' meaning 'Edit' in German, the language item ID 'Language Item #10' and the corresponding language text data 'German #10' meaning 'View' in German, the language item ID 'Language Item #11' and the corresponding language text data 'German #11' meaning 'Format' in German; the language item ID 'Language Item #12' and the corresponding language text data 'German #12' meaning 'Tools' in German; the language item ID 'Language Item #13' and the corresponding language text data 'German #13' meaning 'Window' in German; the language item ID 'Language Item #14' and the corresponding language text data 'German #14' meaning 'Help' in German; the language item ID 'Language Item #15' and the corresponding language text data 'German #15' meaning 'My Network' in German; the language item ID 'Language Item #16' and the corresponding language text data 'German #16' meaning 'Trash' in German; the language item ID 'Language Item #17' and the corresponding language text data 'German #17' meaning 'Local Disk' in German; the language item ID 'Language Item #18' and the corresponding language text data 'German #18' meaning 'Save' in German; the language item ID 'Language Item #19' and the corresponding language text data 'German #19' meaning 'Yes' in German, the language item ID 'Language Item #20' and the corresponding language text data 'German #20' meaning 'No' in German; and the language item ID 'Language Item #21' and the corresponding language text data 'German #21' meaning 'Cancel' in German.

FIG. 206 illustrates data stored in Language Type Data Storage Area 20654*b*2 (FIG. 200). As described in the present drawing, Language Type Data Storage Area 20654*b*2 comprises two columns, i.e., 'Language Table ID' and 'Language Type Data'. Column 'Language Table ID' stores the language table ID, and each language table ID represents the identification of the storage areas included in Language Tables Storage Area 20654*b*1 (FIG. 201). Column 'Language Type Data' stores the language type data, and each language type data represents the type of the language utilized in the language table of the corresponding language table ID. In the example described in the present drawing, Language Type Data Storage Area 20654*b*2 stores the following data: the language table ID 'Language Table #1' and the corresponding language type data 'English'; the language table ID 'Language Table #2' and the corresponding language type data 'Japanese'; the language table ID 'Language Table #3' and the corresponding language type data 'French'; and the language table ID 'Language Table #4' and the corresponding language type data 'German'. Here, the language table ID 'Language Table #1' is an identification of Language Table #1 Storage Area 20654*b*1*a* (FIG. 202); the language table ID 'Language Table #2' is an identification of Language Table #2 Storage Area 20654*b*1*b* (FIG. 203); the language table ID 'Language Table #3' is an identification of Language Table #3 Storage Area 20654*b*1*c* (FIG. 204); and the language table ID 'Language Table #4' is an identification of Language Table #4 Storage Area 20654*b*1*d* (FIG. 205).

FIG. 207 illustrates the data stored in Language Item Data Storage Area 20654*b*3 (FIG. 200). As described in the present drawing, Language Item Data Storage Area 20654*b*3 comprises two columns, i.e., 'Language Item ID' and 'Language Item Data'. Column 'Language Item ID' stores the language item IDs, and each language item ID represents the identification of the corresponding language item data. Column 'Language Item Data' stores the language item data, and each language item data represents the content and/or the meaning of the language text data displayed on LCD 201 (FIG. 1). In the example described in the present drawing, Language Item Data Storage Area 20654*b*3 stores the following data: the language item ID 'Language Item #1' and the corresponding language item data 'Open file'; the language item ID 'Language Item #2' and the corresponding language item data 'Close file'; the language item ID 'Language Item #3' and the corresponding language item data 'Delete'; the language item ID 'Language Item #4' and the corresponding language item data 'Copy'; the language item ID 'Language Item #5' and the corresponding language item data 'Cut'; the language item ID 'Language Item #6' and the corresponding language item data 'Paste'; the language item ID 'Language Item #7' and the corresponding language item data 'Insert'; the language item ID 'Language Item #8' and the corresponding language item data 'File'; the language item ID 'Language Item #9' and the corresponding language item data 'Edit'; the language item ID 'Language Item #10' and the corresponding language item data 'View'; the language item ID 'Language Item #11' and the corresponding language item data 'Format'; the language item ID 'Language Item #12' and the corresponding language item data 'Tools'; the language item ID 'Language Item #13' and the corresponding language item data 'Window'; the language item ID 'Language Item #14' and the corresponding language item data 'Help'; the language item ID 'Language Item #15' and the corresponding language item data 'My Network'; the language item ID 'Language Item #16' and the corresponding language item data 'Trash'; the language item ID 'Language Item #17' and the corresponding language item data 'Local Disk'; the language item ID 'Language Item #18' and the corresponding language item data 'Save'; the language item ID 'Language Item #19' and the corresponding language item data 'Yes'; the language item ID 'Language Item #20' and the corresponding language item data 'No'; and the language item ID 'Language Item #21' and the corresponding language item data 'Cancel'. Primarily, the data stored in column 'Language Item Data' are same as the ones stored in column 'Language Text Data' of Language Table #1 Storage Area 20654*b*1*a* (FIG. 202).

FIG. 208 illustrates the software program stored in Multiple Language Displaying Software Storage Area 20654*c* (FIG. 199). As described in the present drawing, Multiple Language Displaying Software Storage Area 20654*c* stores Language Selecting Software 20654*c*1, Selected Language Displaying Software 20654*c*2, Language Text Data Displaying Software For Word Processor 20654*c*3*a*, Language Text Data Displaying Software For Word Processor 20654*c*3*b*, and Language Text Data Displaying Software For Explorer 20654*c*4. Language Selecting Software 20654*c*1 is the software program described in FIG. 209, FIG. 217, FIG. 225, and FIG. 233. Selected Language Displaying Software 20654*c*2 is the software program described in FIG. 210, FIG. 218, FIG. 226, and FIG. 234. Language Text Data Displaying Software For Word Processor 20654*c*3*a* is the software program described in FIG. 211, FIG. 219, FIG. 227, and FIG. 235. Language Text Data Displaying Software For Word Processor 20654*c*3*b* is the software program described in FIG. 213, FIG. 221, FIG. 229, and FIG. 237. Language Text Data Displaying Software For Explorer 20654*c*4 is the software program described in FIG. 215, FIG. 223, FIG. 231, and FIG. 239.

<<Multiple Language Displaying Function—Utilizing English>>

FIG. 209 illustrates Language Selecting Software 20654*c*1 stored in Multiple Language Displaying Software Storage Area 20654*c* (FIG. 208) which selects the language utilized to operate Communication Device 200 from a plurality of languages. Referring to the present drawing, CPU 211 (FIG. 1) of Communication Device 200 retrieves the language type data from Language Type Data Storage Area 20654*b*2 (FIG. 206) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'English' is selected in S3. CPU 211 then identifies the language table ID corresponding to the language type data in Language Type Data Storage Area 20654*b*2 (FIG. 206), and stores the language table ID (Language Table #1) in Selected Language Table ID Storage Area 20654*b*4 (FIG. 200) (S4).

FIG. 210 illustrates Selected Language Displaying Software 20654*c*2 stored in Multiple Language Displaying Software Storage Area 20654*c* (FIG. 208) which displays and operates with the language selected in S3 of FIG. 209 (i.e., English). Referring to the present drawing, when Communication Device 200 is powered on (S1), CPU 211 (FIG. 1) of Communication Device 200 retrieves the selected language table ID (Language Table #1) from Selected Language Table ID Storage Area 20654*b*4 (FIG. 200) (S2). CPU 211 then identifies the storage area corresponding to the language table ID selected in S2 (Language Table #1 Storage Area 20654*b*1*a* (FIG. 202)) in Language Tables Storage Area 20654*b*1 (FIG. 201) (S3). Language text data displaying process is initiated thereafter of which the details are described hereinafter (S4).

FIG. 211 illustrates Language Text Data Displaying Software For Word Processor 20654*c*3*a* stored in Multiple Language Displaying Software Storage Area 20654*c* (FIG. 208) which displays the language text data at the time a word processor, such as MS Word and WordPerfect is executed. Referring to the present drawing, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item #8' in Language Table #1 Storage Area 20654*b*1*a* (FIG. 202) and displays the corresponding language text data 'File' at the predetermined location in the word processor (S2). CPU 211 identifies the language item ID 'Language Item #9' in Language Table #1 Storage Area 20654*b*1*a* (FIG. 202) and displays the corresponding language text data 'Edit' at the predetermined location in the word processor (S3). CPU 211 identifies the language item ID 'Language Item #10' in Language Table #1 Storage Area 20654*b*1*a* (FIG. 202) and displays the corresponding language text data 'View' at the predetermined location in the word processor (S4). CPU 211 identifies the language item ID 'Language Item #11' in Language Table #1 Storage Area 20654*b*1*a* (FIG. 202) and displays the corresponding language text data 'Format' at the predetermined location in the word processor (S5). CPU 211 identifies the language item ID 'Language Item #12' in Language Table #1 Storage Area 20654*b*1*a* (FIG. 202) and displays the corresponding language text data 'Tools' at the predetermined location in the word processor (S6). CPU 211 identifies the language item ID 'Language Item #13' in Language Table #1 Storage Area 20654*b*1*a* (FIG. 202) and displays the corresponding language text data 'Window' at the predetermined location in the word processor (S7). CPU 211 identifies the language item ID 'Language Item #14' in Language Table #1 Storage Area 20654*b*1*a* (FIG. 202) and displays the corresponding language text data 'Help' at the predetermined location in the word processor (S8). Alphanumeric data is input to the word processor by utilizing Input Device 210 (FIG. 1) or via voice recognition system thereafter (S9).

FIG. 212 illustrates the data displayed on LCD 201 (FIG. 1) of Communication Device 200 at the time Language Text Data Displaying Software For Word Processor 20654*c*3*a* (FIG. 211) is implemented. As described in the present drawing, the word processor described in FIG. 211 is primarily composed of Menu Bar 20154MB and Alphanumeric Data Input Area 20154ADIA wherein the language text data described in S2 through S8 of FIG. 211 are displayed on Menu Bar 20154MB and alphanumeric data are input in Alphanumeric Data Input Area 20154ADIA. In the example described in the present drawing, 20154MBF is the language text data processed in S2 of the previous drawing; 20154MBE is the language text data processed in S3 of the previous drawing; 20154MBV is the language text data processed in S4 of the previous drawing; 20154MBF is the language text data processed in S5 of the previous drawing; 20154MBT is the language text data processed in S6 of the previous drawing; 20154MBW is the language text data processed in S7 of the previous drawing; and 20154MBH is the language text data processed in S8 of the previous drawing.

FIG. 213 illustrates Language Text Data Displaying Software For Word Processor 20654*c*3*b* stored in Multiple Language Displaying Software Storage Area 20654*c* (FIG. 208) which displays a prompt on LCD 201 (FIG. 1) at the time a word processor is closed. Referring to the present drawing, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item #18' in Language Table #1 Storage Area 20654*b*1*a* (FIG. 202) and displays the corresponding language text data 'Save' at the predetermined location in the word processor (S2). CPU 211 identifies the language item ID 'Language Item #19' in Language Table #1 Storage Area 20654*b*1*a* (FIG. 202) and displays the corresponding language text data 'Yes' at the predetermined location in the word processor (S3). CPU 211 identifies the language item ID 'Language Item #20' in Language Table #1 Storage Area 20654*b*1*a* (FIG. 202) and displays the corresponding language text data 'No' at the predetermined location in the word processor (S4). CPU 211 identifies the language item ID 'Language Item #21' in Language Table #1 Storage Area 20654*b*1*a* (FIG. 202) and displays the corresponding language text data 'Cancel' at the predetermined location in the word processor (S5). The save signal indicating to save the alphanumeric data input in S9 of FIG. 211 is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

FIG. 214 illustrates the data displayed on LCD 201 (FIG. 1) of Communication Device 200 at the time Language Text Data Displaying Software For Word Processor 20654*c*3*b* (FIG. 213) is implemented. As described in the present drawing, Prompt 20154Pr is displayed on LCD 201 (FIG. 1) at the time Language Text Data Displaying Software For Word Processor 20654*c*3*a* (FIG. 211) is closed. As described in the present drawing, Prompt 20154Pr is primarily composed of 20154PrS, 20154PrY, 20154PrN, and 20154PrC. In the example described in the present drawing, 20154PrS is the language text data processed in S2 of the previous drawing; 20154PrY is the language text data processed in S3 of the previous drawing; 20154PrN is the language text data processed in S4 of the previous drawing; and 20154PrC is the language text data processed in S5 of the previous drawing.

FIG. 215 illustrates Language Text Data Displaying Software For Explorer 20654*c*4 stored in Multiple Language Displaying Software Storage Area 20654*c* (FIG. 208) which displays the language text data at the time a Windows Explorer like software program which displays folders and/or directories and the structures thereof is executed. Referring to the present drawing, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the steps of S2 through S4 are implemented. Namely, CPU 211 identifies the language item ID 'Language Item #15' in Language Table #1 Storage Area 20654*b*1*a* (FIG. 202) and displays the corresponding language text data 'My Network' at the predetermined location in the Windows Explorer like software program (S2). CPU 211 identifies the language item ID 'Language Item #16' in Language Table #1 Storage Area 20654*b*1*a* (FIG. 202) and displays the corresponding language text data 'Trash' at the predetermined location in the Windows Explorer like software program (S3). CPU 211 identifies the language item ID 'Language Item #17' in Language Table #1 Storage Area 20654*b*1*a* (FIG. 202) and displays the corresponding language text data 'Local Disk' at the predetermined location in the Windows Explorer like software program (S4).

FIG. 216 illustrates the data displayed on LCD 201 (FIG. 1) of Communication Device 200 at the time Language Text Data Displaying Software For Explorer 20654*c*4 (FIG. 215) is executed. As described in the present drawing, 20154LD, 20154MN, and 20154Tr are displayed on LCD 201 (FIG. 1) at the time Language Text Data Displaying Software For Explorer 20654*c*4 is executed. As described in the present drawing, 20154LD is the language text data processed in S4 of the previous drawing; 20154MN is the language text data processed in S2 of the previous drawing; and 20154Tr is the language text data processed in S3 of the previous drawing.

<<Multiple Language Displaying Function—Utilizing Japanese>>

FIG. 217 illustrates Language Selecting Software 20654*c*1 stored in Multiple Language Displaying Software Storage Area 20654*c* (FIG. 208) which selects the language utilized to operate Communication Device 200 from a plurality of languages. Referring to the present drawing, CPU 211 (FIG. 1) of Communication Device 200 retrieves the language type data from Language Type Data Storage Area 20654*b*2 (FIG. 206) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'Japanese' is selected in S3. CPU 211 then identifies the language table ID corresponding to the language type data in Language Type Data Storage Area 20654*b*2 (FIG. 206), and stores the language table ID (Language Table #2) in Selected Language Table ID Storage Area 20654*b*4 (FIG. 200) (S4).

FIG. 218 illustrates Selected Language Displaying Software 20654*c*2 stored in Multiple Language Displaying Software Storage Area 20654*c* (FIG. 208) which displays and operates with the language selected in S3 of FIG. 217 (i.e., Japanese). Referring to the present drawing, when Communication Device 200 is powered on (S1), CPU 211 (FIG. 1) of Communication Device 200 retrieves the selected language table ID (Language Table #2) from Selected Language Table ID Storage Area 20654*b*4 (FIG. 200) (S2). CPU 211 then identifies the storage area corresponding to the language table ID selected in S2 (Language Table #2 Storage Area 20654*b*1*b* (FIG. 203)) in Language Tables Storage Area 20654*b*1 (FIG. 201) (S3). Language text data displaying process is initiated thereafter of which the details are described hereinafter (S4).

FIG. 219 illustrates Language Text Data Displaying Software For Word Processor 20654*c*3*a* stored in Multiple Language Displaying Software Storage Area 20654*c* (FIG. 208) which displays the language text data at the time a word processor, such as MS Word and WordPerfect is executed. Referring to the present drawing, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item #8' in Language Table #2 Storage Area 20654*b*1*b* (FIG. 203) and displays the corresponding language text data indicating 'File' in Japanese at the predetermined location in the word processor (S2). CPU 211 identifies the language item ID 'Language Item #9' in Language Table #2 Storage Area 20654*b*1*b* (FIG. 203) and displays the corresponding language text data indicating 'Edit' in Japanese at the predetermined location in the word processor (S3). CPU 211 identifies the language item ID 'Language Item #10' in Language Table #2 Storage Area 20654*b*1*b* (FIG. 203) and displays the corresponding language text data indicating 'View' in Japanese at the predetermined location in the word processor (S4). CPU 211 identifies the language item ID 'Language Item #11' in Language Table #2 Storage Area 20654*b*1*b* (FIG. 203) and displays the corresponding language text data indicating 'Format' in Japanese at the predetermined location in the word processor (S5). CPU 211 identifies the language item ID 'Language Item #12' in Language Table #2 Storage Area 20654*b*1*b* (FIG. 203) and displays the corresponding language text data indicating 'Tools' in Japanese at the predetermined location in the word processor (S6). CPU 211 identifies the language item ID 'Language Item #13' in Language Table #2 Storage Area 20654*b*1*b* (FIG. 203) and displays the corresponding language text data indicating 'Window' in Japanese at the predetermined location in the word processor (S7). CPU 211 identifies the language item ID 'Language Item #14' in Language Table #2 Storage Area 20654*b*1*b* (FIG. 203) and displays the corresponding language text data indicating 'Help' in Japanese at the predetermined location in the word processor (S8). Alphanumeric data is input to the word processor by utilizing Input Device 210 (FIG. 1) or via voice recognition system thereafter (S9).

FIG. 220 illustrates the data displayed on LCD 201 (FIG. 1) of Communication Device 200 at the time Language Text Data Displaying Software For Word Processor 20654*c*3*a* (FIG. 219) is implemented. As described in the present drawing, the word processor described in FIG. 219 is primarily composed of Menu Bar 20154MB and Alphanumeric Data Input Area 20154ADIA wherein the language text data described in S2 through S8 of FIG. 219 are displayed on Menu Bar 20154MB and alphanumeric data are input in Alphanumeric Data Input Area 20154ADIA. In the example described in the present drawing, 20154MBF is the language text data processed in S2 of the previous drawing; 20154MBE is the language text data processed in S3 of the previous drawing; 20154MBV is the language text data processed in S4 of the previous drawing; 20154MBF is the language text data processed in S5 of the previous drawing; 20154MBT is the language text data processed in S6 of the previous drawing; 20154MBW is the language text data processed in S7 of the previous drawing; and 20154MBH is the language text data processed in S8 of the previous drawing.

FIG. 221 illustrates Language Text Data Displaying Software For Word Processor 20654*c*3*b* stored in Multiple Language Displaying Software Storage Area 20654*c* (FIG. 208) which displays a prompt on LCD 201 (FIG. 1) at the time a word processor is closed. Referring to the present drawing, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item #18' in Language Table #2 Storage Area 20654*b*1*b* (FIG. 203) and displays the corresponding language text data indicating 'Save' in Japanese at the predetermined location in the word processor (S2). CPU 211 identifies the language item ID 'Language Item #19' in Language Table #2 Storage Area 20654*b*1*b* (FIG. 203) and displays the corresponding language text data indicating 'Yes' in Japanese at the predetermined location in the word processor (S3). CPU 211 identifies the language item ID 'Language Item #20' in Language Table #2 Storage Area 20654*b*1*b* (FIG. 203) and displays the corresponding language text data indicating 'No' in Japanese at the predetermined location in the word processor (S4). CPU 211 identifies the language item ID 'Language Item #21' in Language Table #2 Storage Area 20654*b*1*b* (FIG. 203) and displays the corresponding language text data indicating 'Cancel' in Japanese at the predetermined location in the word processor (S5). The save signal indicating to save the alphanumeric data input in S9 of FIG. 219 is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

FIG. 222 illustrates the data displayed on LCD 201 (FIG. 1) of Communication Device 200 at the time Language Text Data Displaying Software For Word Processor 20654*c*3*b* (FIG. 221) is implemented. As described in the present drawing, Prompt 20154Pr is displayed on LCD 201 (FIG. 1) at the time Language Text Data Displaying Software For Word Processor 20654*c*3*a* (FIG. 219) is closed. As described in the present drawing, Prompt 20154Pr is primarily composed of 20154PrS, 20154PrY, 20154PrN, and 20154PrC. In the example described in the present drawing, 20154PrS is the language text data processed in S2 of the previous drawing; 20154PrY is the language text data processed in S3 of the previous drawing; 20154PrN is the language text data processed in S4 of the previous drawing; and 20154PrC is the language text data processed in S5 of the previous drawing.

FIG. 223 illustrates Language Text Data Displaying Software For Explorer 20654*c*4 stored in Multiple Language Displaying Software Storage Area 20654*c* (FIG. 208) which displays the language text data at the time a Windows Explorer like software program which displays folders and/or directories and the structures thereof is executed. Referring to the present drawing, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item #15' in Language Table #2 Storage Area 20654*b*1*b* (FIG. 203) and displays the corresponding language text data indicating 'My Network' in Japanese at the predetermined location in the Windows Explorer like software program (S2). CPU 211 identifies the language item ID 'Language Item #16' in Language Table #2 Storage Area 20654*b*1*b* (FIG. 203) and displays the corresponding language text data indicating 'Trash' in Japanese at the predetermined location in the Windows Explorer like software program (S3). CPU 211 identifies the language item ID 'Language Item #17' in Language Table #2 Storage Area 20654*b*1*b* (FIG. 203) and displays the corresponding language text data indicating 'Local Disk' in Japanese at the predetermined location in the Windows Explorer like software program (S4).

FIG. 224 illustrates the data displayed on LCD 201 (FIG. 1) of Communication Device 200 at the time Language Text Data Displaying Software For Explorer 20654*c*4 (FIG. 223) is executed. As described in the present drawing, 20154LD, 20154MN, and 20154Tr are displayed on LCD 201 (FIG. 1) at the time Language Text Data Displaying Software For Explorer 20654*c*4 is executed. As described in the present drawing, 20154LD is the language text data processed in S4 of the previous drawing; 20154MN is the language text data processed in S2 of the previous drawing; and 20154Tr is the language text data processed in S3 of the previous drawing.

<<Caller's Information Displaying Function>>

FIG. 241 through FIG. 284 illustrate the Caller's Information displaying function which displays the Information regarding the caller (e.g., name, phone number, email address, and home address, etc.) on LCD 201 (FIG. 1) when Communication Device 200 is utilized as a 'TV phone'.

FIG. 241 through FIG. 248 illustrate the data and software programs stored in RAM 206 (FIG. 1) of Caller's Device, a Communication Device 200, utilized by the caller.

FIG. 249 through FIG. 256 illustrate the data and software programs stored in RAM 206 (FIG. 1) of Callee's Device, a Communication Device 200, utilized by the callee.

FIG. 257 through FIG. 260 illustrate the data and software programs stored in Host H (FIG. 289).

FIG. 241 illustrates the storage area included in RAM 206 (FIG. 1) of Caller's Device. As described in the present drawing, RAM 206 of Caller's Device includes Caller's Information Displaying Information Storage Area 20655*a* of which the data and the software programs stored therein are described in FIG. 242.

FIG. 242 illustrates the storage areas included in Caller's Information Displaying Information Storage Area 20655*a* (FIG. 241). As described in the present drawing, Caller's Information Displaying Information Storage Area 20655*a* includes Caller's Information Displaying Data Storage Area 20655*b* and Caller's Information Displaying Software Storage Area 20655*c*. Caller's Information Displaying Data Storage Area 20655*b* stores the data necessary to implement the present function on the side of Caller's Device, such as the ones described in FIG. 243 through FIG. 247. Caller's Information Displaying Software Storage Area 20655*c* stores the software programs necessary to implement the present function on the side of Caller's Device, such as the ones described in FIG. 248.

FIG. 243 illustrates the storage areas included in Caller's Information Displaying Data Storage Area 20655*b*. As described in the present drawing, Caller's Information Displaying Data Storage Area 20655*b* includes Caller's Audiovisual Data Storage Area 20655*b*1, Callee's Audiovisual Data Storage Area 20655*b*2, Caller's Personal Data Storage Area 20655*b*3, Callee's Personal Data Storage Area 20655*b*4, Caller's Calculated GPS Data Storage Area 20655*b*5, Callee's Calculated GPS Data Storage Area 20655*b*6, Caller's Map Data Storage Area 20655*b*7, Callee's Map Data Storage Area 20655*b*8, and Work Area 20655*b*9. Caller's Audiovisual Data Storage Area 20655*b*1 stores the data described in FIG. 244. Callee's Audiovisual Data Storage Area 20655*b*2 stores the data described in FIG. 245. Caller's Personal Data Storage Area 20655*b*3 stores the data described in FIG. 246. Callee's Personal Data Storage Area 20655*b*4 stores the data described in FIG. 247. Caller's Calculated GPS Data Storage Area **20655*b*5 stores the caller's calculated GPS data which represents the current geographic location of Caller's Device in (x, y, z) format. Callee's Calculated GPS Data Storage Area 20655*b*6 stores the callee's calculated GPS data which represents the current geographic location of Callee's Device in (x, y, z) format. Caller's Map Data Storage Area 20655*b*7 stores the map data representing the surrounding area of the location indicated by the caller's calculated GPS data. Callee's Map Data Storage Area 20655*b*8 stores the map data representing the surrounding area of the location indicated by the callee's calculated GPS data. Work Area 20655*b*9** is a storage area utilized to perform calculation and to temporarily store data.

FIG. 244 illustrates the storage areas included in Caller's Audiovisual Data Storage Area **20655*b*1 (FIG. 243). As described in the present drawing, Caller's Audiovisual Data Storage Area 20655*b*1 includes Caller's Audio Data Storage Area 20655*b*1*a* and Caller's Visual Data Storage Area 20655*b*1*b*. Caller's Audio Data Storage Area 20655*b*1*a* stores the caller's audio data which represents the audio data input via Microphone 215 (FIG. 1) of Caller's Device. Caller's Visual Data Storage Area 20655*b*1*b* stores the caller's visual data which represents the visual data input via CCD Unit 214 (FIG. 1**) of Caller's Device.

FIG. 245 illustrates the storage areas included in Callee's Audiovisual Data Storage Area **20655*b*2 (FIG. 243). As described in the present drawing, Callee's Audiovisual Data Storage Area 20655*b*2 includes Callee's Audio Data Storage Area 20655*b*2*a* and Callee's Visual Data Storage Area 20655*b*2*b*. Callee's Audio Data Storage Area 20655*b*2*a* stores the callee's audio data which represents the audio data sent from Callee's Device. Callee's Visual Data Storage Area 20655*b*2*b*** stores the callee's visual data which represents the visual data sent from Callee's Device.

FIG. 246 illustrates the data stored in Caller's Personal Data Storage Area **20655*b*3 (FIG. 243). As described in the present drawing, Caller's Personal Data Storage Area 20655*b*3 comprises two columns, i.e., 'Caller's Personal Data' and 'Permitted Caller's Personal Data Flag'. Column 'Caller's Personal Data' stores the caller's personal data which represent the personal data of the caller. Column 'Permitted Caller's Personal Data Flag' stores the permitted caller's personal data flag and each permitted caller's personal data flag represents whether the corresponding caller's personal data is permitted to be displayed on Callee's Device. The permitted caller's personal data flag is represented by either '1' or '0' wherein '1' indicates that the corresponding caller's personal data is permitted to be displayed on Callee's Device, and '0' indicates that the corresponding caller's personal data is not permitted to be displayed on Callee's Device. In the example described in the present drawing, Caller's Personal Data Storage Area 20655*b*3** stores the following data: the caller's name and the corresponding permitted caller's personal data flag '1'; the caller's phone number and the corresponding permitted caller's personal data flag '1'; the caller's email address and the corresponding permitted caller's personal data flag '1'; the caller's home address and the corresponding permitted caller's personal data flag '1'; the caller's business address and the corresponding permitted caller's personal data flag '0'; the caller's title and the corresponding permitted caller's personal data flag '0'; the caller's hobby and the corresponding permitted caller's personal data flag '0'; the caller's blood type and the corresponding permitted caller's personal data flag '0'; the caller's gender and the corresponding permitted caller's personal data flag '0'; the caller's age and the corresponding permitted caller's personal data flag '0'; and caller's date of birth and the corresponding permitted caller's personal data flag '0'.

FIG. 247 illustrates the data stored in Callee's Personal Data Storage Area **20655*b*4 (FIG. 243). As described in the present drawing, Callee's Personal Data Storage Area 20655*b*4 stores the callee's personal data which represent the personal data of the callee which are displayed on LCD 201 (FIG. 1) of Caller's Device. In the example described in the present drawing, Callee's Personal Data Storage Area 2065564** stores the callee's name and phone number.

FIG. 248 illustrates the software programs stored in Caller's Information Displaying Software Storage Area **20655*c* (FIG. 242). As described in the present drawing, Caller's Information Displaying Software Storage Area 20655*c* stores Permitted Caller's Personal Data Selecting Software 20655*c*1, Dialing Software 20655*e*2, Caller's Device Pin-pointing Software 20655*c*3, Map Data Sending/Receiving Software 20655*c*4, Caller's Audiovisual Data Collecting Software 20655*c*5, Caller's Information Sending/Receiving Software 20655*c*6, Callee's Information Sending/Receiving Software 20655*c*6*a*, Permitted Callee's Personal Data Displaying Software 20655*c*7, Map Displaying Software 20655*c*8, Callee's Audio Data Outputting Software 20655*c*9, and Callee's Visual Data Displaying Software 20655*c*10. Permitted Caller's Personal Data Selecting Software 20655*c*1 is the software program described in FIG. 261. Dialing Software 20655*e*2 is the software program described in FIG. 262. Caller's Device Pin-pointing Software 20655*c*3 is the software program described in FIG. 263 and FIG. 264. Map Data Sending/Receiving Software 20655*c*4 is the software program described in FIG. 265. Caller's Audiovisual Data Collecting Software 20655*c*5 is the software program described in FIG. 266. Caller's Information Sending/Receiving Software 20655*c*6 is the software program described in FIG. 267. Callee's Information Sending/Receiving Software 20655*c*6*a* is the software program described in FIG. 280. Permitted Callee's Personal Data Displaying Software 20655*c*7 is the software program described in FIG. 281. Map Displaying Software 20655*c*8 is the software program described in FIG. 282. Callee's Audio Data Outputting Software 20655*c*9 is the software program described in FIG. 283. Callee's Visual Data Displaying Software 20655*c*10 is the software program described in FIG. 284**.

FIG. 249 illustrates the storage area included in RAM 206A (FIG. 1) of Callee's Device. As described in the present drawing, RAM 206A of Callee's Device includes Callee's Information Displaying Information Storage Area **20655*a*A of which the data and the software programs stored therein are described in FIG. 250**.

FIG. 250 illustrates the storage areas included in Callee's Information Displaying Information Storage Area **20655*a*A (FIG. 249). As described in the present drawing, Callee's Information Displaying Information Storage Area 20655*a*A includes Callee's Information Displaying Data Storage Area 20655*b*A and Callee's Information Displaying Software Storage Area 20655*c*A. Callee's Information Displaying Data Storage Area 20655*b*A stores the data necessary to implement the present function on the side of Callee's Device, such as the ones described in FIG. 251 through FIG. 255. Callee's Information Displaying Software Storage Area 20655*c*A stores the software programs necessary to implement the present function on the side of Callee's Device, such as the ones described in FIG. 256**.

FIG. 251 illustrates the storage areas included in Callee's Information Displaying Data Storage Area **20655*b*A. As described in the present drawing, Callee's Information Displaying Data Storage Area 20655*b*A includes Caller's Audiovisual Data Storage Area 20655*b*1A, Callee's Audiovisual Data Storage Area 20655*b*2A, Caller's Personal Data Storage Area 20655*b*3A, Callee's Personal Data Storage Area 20655*b*4A, Caller's Calculated GPS Data Storage Area 20655*b*5A, Callee's Calculated GPS Data Storage Area 20655*b*6A, Caller's Map Data Storage Area 20655*b*7A, Callee's Map Data Storage Area 20655*b*8A, and Work Area 20655*b*9A. Caller's Audiovisual Data Storage Area 20655*b*1A stores the data described in FIG. 252. Callee's Audiovisual Data Storage Area 20655*b*2A stores the data described in FIG. 253. Caller's Personal Data Storage Area 20655*b*3A stores the data described in FIG. 254. Callee's Personal Data Storage Area 20655*b*4A stores the data described in FIG. 255. Caller's Calculated GPS Data Storage Area 20655*b*5A stores the caller's calculated GPS data which represents the current geographic location of Caller's Device in (x, y, z) format. Callee's Calculated GPS Data Storage Area 20655*b*6A stores the callee's calculated GPS data which represents the current geographic location of Callee's Device in (x, y, z) format. Caller's Map Data Storage Area 20655*b*7A stores the map data representing the surrounding area of the location indicated by the caller's calculated GPS data. Callee's Map Data Storage Area 20655*b*8A stores the map data representing the surrounding area of the location indicated by the callee's calculated GPS data. Work Area 20655*b*9**A is a storage area utilized to perform calculation and to temporarily store data.

FIG. 252 illustrates the storage areas included in Caller's Audiovisual Data Storage Area **20655*b*1A (FIG. 251). As described in the present drawing, Caller's Audiovisual Data Storage Area 20655*b*1A includes Caller's Audio Data Storage Area 20655*b*1*a*A and Caller's Visual Data Storage Area 20655*b*1*b*A. Caller's Audio Data Storage Area 20655*b*1*a*A stores the caller's audio data which represents the audio data sent from Caller's Device in a wireless fashion. Caller's Visual Data Storage Area 20655*b*1*b***A stores the caller's visual data which represents the visual data input sent from Caller's Device in a wireless fashion.

FIG. 253 illustrates the storage areas included in Callee's Audiovisual Data Storage Area **20655*b*2A (FIG. 251). As described in the present drawing, Callee's Audiovisual Data Storage Area 20655*b*2A includes Callee's Audio Data Storage Area 20655*b*2*a*A and Callee's Visual Data Storage Area 20655*b*2*b*A. Callee's Audio Data Storage Area 20655*b*2*a*A stores the callee's audio data which represents the audio data input via Microphone 215 (FIG. 1) of Callee's Device. Callee's Visual Data Storage Area 20655*b*2*b*A stores the callee's visual data which represents the visual data input via CCD Unit 214 (FIG. 1**) of Callee's Device.

FIG. 254 illustrates the data stored in Caller's Personal Data Storage Area **20655*b*3A (FIG. 251). As described in the present drawing, Caller's Personal Data Storage Area 20655*b*3A stores the caller's personal data which represent the personal data of the caller which are displayed on LCD 201 (FIG. 1) of Caller's Device. In the example described in the present drawing, Caller's Personal Data Storage Area 20655*b*3**A stores the caller's name, phone number, email address, and home address.

FIG. 255 illustrates the data stored in Callee's Personal Data Storage Area **20655*b*4A (FIG. 251). As described in the present drawing, Callee's Personal Data Storage Area 20655*b*4A comprises two columns, i.e., 'Callee's Personal Data' and 'Permitted Callee's Personal Data Flag'. Column 'Callee's Personal Data' stores the callee's personal data which represent the personal data of the callee. Column 'Permitted Callee's Personal Data Flag' stores the permitted callee's personal data flag and each permitted callee's personal data flag represents whether the corresponding callee's personal data is permitted to be displayed on Caller's Device. The permitted callee's personal data flag is represented by either '1' or '0' wherein '1' indicates that the corresponding callee's personal data is permitted to be displayed on Caller's Device, and '0' indicates that the corresponding callee's personal data is not permitted to be displayed on Caller's Device. In the example described in the present drawing, Callee's Personal Data Storage Area 20655*b*4**A stores the following data: callee's name and the corresponding permitted callee's personal data flag '1'; the callee's phone number and the corresponding permitted callee's personal data flag '1'; the callee's email address and the corresponding permitted caller's personal data flag '0'; the callee's home address and the corresponding permitted callee's personal data flag '0'; the callee's business address and the corresponding permitted callee's personal data flag '0'; the callee's title and the corresponding permitted callee's personal data flag '0'; the callee's hobby and the corresponding permitted callee's personal data flag '0'; the callee's blood type and the corresponding permitted callee's personal data flag '0'; the callee's gender and the corresponding permitted callee's personal data flag '0'; the callee's age and the corresponding permitted callee's personal data flag '0'; and callee's date of birth and the corresponding permitted callee's personal data flag '0'.

FIG. 256 illustrates the software programs stored in. Callee's Information Displaying Software Storage Area **20655*c*A (FIG. 250). As described in the present drawing, Callee's Information Displaying Software Storage Area 20655*c*A stores Permitted Callee's Personal Data Selecting Software 20655*c*1A, Dialing Software 20655*c*2A, Callee's Device Pin-pointing Software 20655*c*3A, Map Data Sending/Receiving Software 20655*c*4A, Callee's Audiovisual Data Collecting Software 20655*c*5A, Callee's Information Sending/Receiving Software 20655*c*6A, Caller's Information Sending/Receiving Software 20655*c*6*a*A, Permitted Caller's Personal Data Displaying Software 20655*c*7A, Map Displaying Software 20655*c*8A, Caller's Audio Data Outputting Software 20655*c*9A, and Caller's Visual Data Displaying Software 20655*c*10A. Permitted Callee's Personal Data Selecting Software 20655*c*1A is the software program described in FIG. 273. Dialing Software 20655*c*2A is the software program described in FIG. 274. Callee's Device Pin-pointing Software 20655*c*3A is the software program described in FIG. 275 and FIG. 276. Map Data Sending/Receiving Software 20655*c*4A is the software program described in FIG. 277. Callee's Audiovisual Data Collecting Software 20655*c*5A is the software program described in FIG. 278. Callee's Information Sending/Receiving Software 20655*c*6A is the software program described in FIG. 279. Caller's Information Sending/Receiving Software 20655*c*6*a*A is the software program described in FIG. 268. Permitted Caller's Personal Data Displaying Software 20655*c*7A is the software program described in FIG. 269. Map Displaying Software 20655*c*8A is the software program described in FIG. 270. Caller's Audio Data Outputting Software 20655*c*9A is the software program described in FIG. 271. Caller's Visual Data Displaying Software 20655*c*10A is the software program described in FIG. 272**.

FIG. 257 illustrates the storage area included in Host H (FIG. 289). As described in the present drawing, Host H includes Caller/Callee Information Storage Area H**55*a* of which the data and the software programs stored therein are described in FIG. 258**.

FIG. 258 illustrates the storage areas included in Caller/Callee Information Storage Area H**55*a*. As described in the present drawing, Caller/Callee Information Storage Area H55***a* includes Caller/Callee Data Storage Area H55*b* and Caller/Callee Software Storage Area H55*c*. Caller/Callee Data Storage Area H55*b* stores the data necessary to implement the present function on the side of Host H (FIG. 289), such as the ones described in FIG. 259. Caller/Callee Software Storage Area H55*c* stores the software programs necessary to implement the present function on the side of Host H, such as the ones described in FIG. 260.

FIG. 259 illustrates the storage areas included in Caller/Callee Data Storage Area H55*b*. As described in the present drawing, Caller/Callee Data Storage Area H55*b* includes Caller's Information Storage Area H55*b*1, Callee's Information Storage Area H55*b*2, Map Data Storage Area H55*b*3, Work Area h55*b*4, Caller's Calculated GPS Data Storage Area H55*b*5, and Callee's Calculated GPS Data Storage Area H55*b*6. Caller's Information Storage Area H55*b*1 stores the Caller's Information received Caller's Device. Callee's Information Storage Area H55*b*2 stores the Callee's Information received Callee's Device. Map Data Storage Area H55*b*3 stores the map data received from Caller's Device and Callee's Device. Work Area H55*b*4 is a storage area utilized to perform calculation and to temporarily store data. Caller's Calculated GPS Data Storage Area H55*b*5 stores the caller's calculated GPS data. Callee's Calculated GPS Data Storage Area H55*b*6 stores the callee's calculated GPS data.

FIG. 260 illustrates the software programs stored in Caller/Callee Software Storage Area H55*c* (FIG. 260). As described in the present drawing, Caller/Callee Software Storage Area H55*c* stores Dialing Software H55*c*2, Caller's Device Pin-pointing Software H55*c*3, Callee's Device Pin-pointing Software H55*c*3*a*, Map Data Sending/Receiving Software H55*c*4, Caller's Information Sending/Receiving Software H55*c*6, and Callee's Information Sending/Receiving Software H55*c*6*a*. Dialing Software H55*c*2 is the software program described in FIG. 262 and FIG. 274. Caller's Device Pin-pointing Software H55*c*3 is the software program described in FIG. 263. Callee's Device Pin-pointing Software H55*c*3*a* is the software program described in FIG. 275. Map Data Sending/Receiving Software H55*c*4 is the software program described in FIG. 265 and FIG. 277. Caller's Information Sending/Receiving Software H55*c*6 is the software program described in FIG. 267. Callee's Information Sending/Receiving Software H55*c*6*a* is the software program described in FIG. 279 and FIG. 280.

FIG. 261 through FIG. 272 primarily illustrate the sequence to output the Caller's Information (which is defined hereinafter) from Callee's Device.

FIG. 261 illustrates Permitted Caller's Personal Data Selecting Software 20655*c*1 stored in Caller's Information Displaying Software Storage Area 20655*c* (FIG. 248) of Caller's Device, which selects the permitted caller's personal data to be displayed on LCD 201 (FIG. 1) of Callee's Device. Referring to the present drawing, CPU 211 (FIG. 1) of Caller's Device retrieves all of the caller's personal data from Caller's Personal Data Storage Area 20655*b*3 (FIG. 246) (S1). CPU 211 then displays a list of caller's personal data on LCD 201 (FIG. 1) (S2). The caller selects, by utilizing Input Device 210 (FIG. 1) or via voice recognition system, the caller's personal data permitted to be displayed on Callee's Device (S3). The permitted caller's personal data flag of the data selected in S3 is registered as '1' (S4).

FIG. 262 illustrates Dialing Software H55*c*2 stored in Caller/Callee Software Storage Area H55*c* (FIG. 260) of Host H (FIG. 289), Dialing Software 20655*c*2 stored in Caller's Information Displaying Software Storage Area 20655*c* (FIG. 248) of Caller's Device, and Dialing Software 20655*c*2A stored in Callee's Information Displaying Software Storage Area 20655*c*A (FIG. 256) of Callee's Device, which enables to connect between Caller's Device and Callee's Device via Host H (FIG. 289) in a wireless fashion. Referring to the present drawing, a connection is established between Caller's Device and Host H (S1). Next, a connection is established between Host H and Callee's Device (S2). As a result, Caller's Device and Callee's Device are able to exchange audiovisual data, text data, and various types of data with each other. The connection is maintained until Caller's Device, Host H, or Callee's Device terminates the connection.

FIG. 263 illustrates Caller's Device Pin-pointing Software H55*c*3 (FIG. 260) stored in Caller/Callee Software Storage Area H55*c* (FIG. 260) of Host H (FIG. 289) and Caller's Device Pin-pointing Software 20655*c*3 stored in Caller's Information Displaying Software Storage Area 20655*c* (FIG. 248) of Caller's Device, which identifies the current geographic location of Caller's Device. Referring to the present drawing, CPU 211 (FIG. 1) of Caller's Device collects the GPS raw data from the near base stations (S1). CPU 211 sends the raw GPS data to Host H (S2). Upon receiving the raw GPS data (S3), Host H produces the caller's calculated GPS data by referring to the raw GPS data (S4). Host H stores the caller's calculated GPS data in Caller's Calculated GPS Data Storage Area H55*b*5 (FIG. 259) (S5). Host H then retrieves the caller's calculated GPS data from Caller's Calculated GPS Data Storage Area H55*b*5 (FIG. 259) (S6), and sends the data to Caller's Device (S7). Upon receiving the caller's calculated GPS data from Host H (S8), CPU 211 stores the data in Caller's Calculated GPS Data Storage Area 20655*b*5 (FIG. 243) (S9). Here, the GPS raw data are the primitive data utilized to produce the caller's calculated GPS data, and the caller's calculated GPS data is the data representing the location of Caller's Device in (x, y, z) format. The sequence described in the present drawing is repeated periodically.

FIG. 264 illustrates another embodiment of the sequence described in FIG. 263 in which the entire process is performed solely by Caller's Device Pin-pointing Software 20655*c*3 stored in Caller's Information Displaying Software Storage Area 20655*c* (FIG. 248) of Caller's Device. Referring to the present drawing, CPU 211 (FIG. 1) of Caller's Device collects the raw GPS data from the near base stations (S1). CPU 211 then produces the caller's calculated GPS data by referring to the raw GPS data (S2), and stores the caller's calculated GPS data in Caller's Calculated GPS Data Storage Area 20655*b*5 (FIG. 243) (S3). The sequence described in the present drawing is repeated periodically.

FIG. 265 illustrates Map Data Sending/Receiving Software H55*c*4 stored in Caller/Callee Software Storage Area H55*c* (FIG. 260) of Host H (FIG. 289) and Map Data Sending/Receiving Software 20655*c*4 stored in Caller's Information Displaying Software Storage Area 20655*c* (FIG. 248) of Caller's Device, which sends and receives the map data. Referring to the present drawing, CPU 211 (FIG. 1) of Caller's Device retrieves the caller's calculated GPS data from Caller's Calculated GPS Data Storage Area 20655*b*5 (FIG. 243) (S1), and sends the data to Host H (S2). Upon receiving the calculated GPS data from Caller's Device (S3), Host H identifies the map data in Map Data Storage Area H55*b*3 (FIG. 259) (S4). Here, the map data represents the surrounding area of the location indicated by the caller's calculated GPS data. Host H retrieves the map data from Map Data Storage Area H55*b*3 (FIG. 259) (S5), and sends the data to Caller's Device (S6). Upon receiving the map data from Host H (S7), Caller's Device stores the data in Caller's Map Data Storage Area 20655*b*7 (FIG. 243) (S8). The sequence described in the present drawing is repeated periodically.

FIG. 266 illustrates Caller's Audiovisual Data Collecting Software 20655*c*5 stored in Caller's Information Displaying Software Storage Area 20655*c* (FIG. 248) of Caller's Device, which collects the audiovisual data of the caller to be sent to Callee's Device via Antenna 218 (FIG. 1) thereof. CPU 211 (FIG. 1) of Caller's Device retrieves the caller's audiovisual data from CCD Unit 214 and Microphone 215 (S1). CPU 211 then stores the caller's audio data in Caller's Audio Data Storage Area 20655*b*1 a (FIG. 244) (S2), and the caller's visual data in Caller's Visual Data Storage Area 20655*b*1*b* (FIG. 244) (S3). The sequence described in the present drawing is repeated periodically.

FIG. 267 illustrates Caller's Information Sending/Receiving Software H55*c*6 stored in Caller/Callee Software Storage Area H55*c* (FIG. 260) of Host H (FIG. 289) and Caller's Information Sending/Receiving Software 20655*c*6 stored in Caller's Information Displaying Software Storage Area 20655*c* (FIG. 248) of Caller's Device, which sends and receives the Caller's Information (which is defined hereinafter) between Caller's Device and Host H. Referring to the present drawing, CPU 211 (FIG. 1) of Caller's Device retrieves the permitted caller's personal data from Caller's Personal Data Storage Area 20655*b*3 (FIG. 246) (S1). CPU 211 retrieves the caller's calculated GPS data from Caller's Calculated GPS Data Storage Area 20655*b*5 (FIG. 243) (S2). CPU 211 retrieves the map data from Caller's Map Data Storage Area 20655*b*7 (FIG. 243) (S3). CPU 211 retrieves the caller's audio data from Caller's Audio Data Storage Area 20655*b*1*a* (FIG. 244) (S4). CPU 211 retrieves the caller's visual data from Caller's Visual Data Storage Area 20655*b*1*b* (FIG. 244) (S5). CPU 211 then sends the data retrieved in S1 through S5 (collectively defined as the 'Caller's Information' hereinafter) to Host H (S6). Upon receiving the Caller's Information from Caller's Device (S7), Host H stores the Caller's Information in Caller's Information Storage Area H55*b*1 (FIG. 259) (S8). The sequence described in the present drawing is repeated periodically.

FIG. 268 illustrates Caller's Information Sending/Receiving Software H55*c*6 stored in Caller/Callee Software Storage Area H55*c* (FIG. 260) of Host H (FIG. 289) and Caller's Information Sending/Receiving Software 20655*c*6*a*A (FIG. 256) stored in Caller's Information Displaying Software Storage Area 20655*c* (FIG. 248) of Caller's Device, which sends and receives the Caller's Information between Host H and Callee's Device. Referring to the present drawing, Host H retrieves the Caller's Information from Caller's Information Storage Area H55*b*1 (FIG. 259) (S1), and sends the Caller's Information to Callee's Device (S2). CPU 211 (FIG. 1) of Callee's Device receives the Caller's Information from Host H (S3). CPU 211 stores the permitted caller's personal data in Caller's Personal Data Storage Area 20655*b*3A (FIG. 254) (S4). CPU 211 stores the caller's calculated GPS data in Caller's Calculated GPS Data Storage Area 20655*b*5A (FIG. 251) (S5). CPU 211 stores the map data in Caller's Map Data Storage Area 20655*b*7A (FIG. 251) (S6). CPU 211 stores the caller's audio data in Caller's Audio Data Storage Area 20655*b*1*a*A (FIG. 252) (S7). CPU 211 stores the caller's visual data in Caller's Visual Data Storage Area 20655*b*1*b*A (FIG. 252) (S8). The sequence described in the present drawing is repeated periodically.

FIG. 269 illustrates Permitted Caller's Personal Data Displaying Software 20655*c*7A stored in Callee's Information Displaying Software Storage Area 20655*c*A (FIG. 256) of Callee's Device, which displays the permitted caller's personal data on LCD 201 (FIG. 1) of Callee's Device. Referring to the present drawing, CPU 211 (FIG. 1) of Callee's Device retrieves the permitted caller's personal data from Caller's Personal Data Storage Area 20655*b*3A (FIG. 254) (S1). CPU 211 then displays the permitted caller's personal data on LCD 201 (FIG. 1) (S2). The sequence described in the present drawing is repeated periodically.

FIG. 270 illustrates Map Displaying Software 20655*c*8A stored in Callee's Information Displaying Software Storage Area 20655*c*A (FIG. 256) of Callee's Device, which displays the map representing the surrounding area of the location indicated by the caller's calculated GPS data. Referring to the present drawing, CPU 211 (FIG. 1) of Callee's Device retrieves the caller's calculated GPS data from Caller's Calculated GPS Data Storage Area 20655*b*5A (FIG. 251) (S1). CPU 211 then retrieves the map data from Caller's Map Data Storage Area 20655*b*7A (FIG. 251) (S2), and arranges on the map data the caller's current location icon in accordance with the caller's calculated GPS data (S3). Here, the caller's current location icon is an icon which represents the location of Caller's Device in the map data. The map with the caller's current location icon is displayed on LCD 201 (FIG. 1) (S4). The sequence described in the present drawing is repeated periodically.

FIG. 271 illustrates Caller's Audio Data Outputting Software 20655*c*9A stored in Caller's Information Displaying Software Storage Area 20655*c* (FIG. 248) of Caller's Device, which outputs the caller's audio data from Speaker 216 (FIG. 1) of Callee's Device. Referring to the present drawing, CPU 211 (FIG. 1) of Callee's Device retrieves the caller's audio data from Caller's Audio Data Storage Area 20655*b*1*a*A (FIG. 252) (S1). CPU 211 then outputs the caller's audio data from Speaker 216 (FIG. 1) (S2). The sequence described in the present drawing is repeated periodically.

FIG. 272 illustrates Caller's Visual Data Displaying Software 20655*c*10A stored in Callee's Information Displaying Software Storage Area 20655*c*A (FIG. 256) of Callee's Device, which displays the caller's visual data on LCD 201 (FIG. 1) of Callee's Device. Referring to the present drawing, CPU 211 (FIG. 1) of Callee's Device retrieves the caller's visual data from Caller's Visual Data Storage Area 20655*b*1*b*A (FIG. 252) (S1). CPU 211 then displays the caller's visual data on LCD 201 (FIG. 1) (S2). The sequence described in the present drawing is repeated periodically.

FIG. 273 through FIG. 284 primarily illustrate the sequence to output the Callee's Information (which is defined hereinafter) from Caller's Device.

FIG. 273 illustrates Permitted Callee's Personal Data Selecting Software 20655*c*1A stored in Callee's Information Displaying Software Storage Area 20655*c*A (FIG. 256) of Callee's Device, which selects the permitted callee's personal data to be displayed on LCD 201 (FIG. 1) of Caller's Device. Referring to the present drawing, CPU 211 (FIG. 1) of Callee's Device retrieves all of the callee's personal data from Callee's Personal Data Storage Area 20655*b*4A (FIG. 255) (S1). CPU 211 then displays a list of callee's personal data on LCD 201 (FIG. 1) (S2). The callee selects, by utilizing Input Device 210 (FIG. 1) or via voice recognition system, the callee's personal data permitted to be displayed on Caller's Device (S3). The permitted callee's personal data flag of the data selected in S3 is registered as '1' (S4).

FIG. 274 illustrates Dialing Software H55*c*2 stored in Caller/Callee Software Storage Area H55*c* (FIG. 260) of Host H (FIG. 289), Dialing Software 20655*c*2A stored in Callee's Information Displaying Software Storage Area 20655*c*A (FIG. 256) of Callee's Device, and Dialing Software 20655*c*2 stored in Caller's Information Displaying Software Storage Area 20655*c* (FIG. 248) of Caller's Device, which enables to connect between Callee's Device and Caller's Device via Host H (FIG. 289) in a wireless fashion. Referring to the present drawing, a connection is established between Callee's Device and Host H (S1). Next, a connection is established between Host H and Caller's Device (S2). As a result, Callee's Device and Caller's Device are able to exchange audiovisual data, text data, and various types of data with each other. The sequence described in the present drawing is not necessarily implemented if the connection between Caller's Device and Callee's Device is established as described in FIG. 262. The sequence described in the present drawing may be implemented if the connection is accidentally terminated by Callee's Device and the connection process is initiated by Callee's Device.

FIG. 275 illustrates Callee's Device Pin-pointing Software H55*c*3*a* stored in Caller/Callee Software Storage Area H55*c* (FIG. 260) of Host H (FIG. 289) and Callee's Device Pin-pointing Software 20655*c*3A stored in Callee's Information Displaying Software Storage Area 20655*c*A of Callee's Device, which identifies the current geographic location of Callee's Device. Referring to the present drawing, CPU 211 (FIG. 1) of Callee's Device collects the GPS raw data from the near base stations (S1). CPU 211 sends the raw GPS data to Host H (S2). Upon receiving the raw GPS data (S3), Host H produces the callee's calculated GPS data by referring to the raw GPS data (S4). Host H stores the callee's calculated GPS data in Callee's Calculated GPS Data Storage Area H55*b*6 (FIG. 259) (S5). Host H then retrieves the callee's calculated GPS data from Callee's Calculated GPS Data Storage Area H55*b*6 (FIG. 259) (S6), and sends the data to Callee's Device (S7). Upon receiving the callee's calculated GPS data from Host H (S8), CPU 211 stores the data in Callee's Calculated GPS Data Storage Area 20655*b*6A (FIG. 251) (S9). Here, the GPS raw data are the primitive data utilized to produce the callee's calculated GPS data, and the callee's calculated GPS data is the data representing the location of Callee's Device in (x, y, z) format. The sequence described in the present drawing is repeated periodically.

FIG. 276 illustrates another embodiment of the sequence described in FIG. 275 in which the entire process is performed solely by Callee's Device Pin-pointing Software 20655*c*3A stored in Callee's Information Displaying Software Storage Area 20655*c*A (FIG. 256) of Callee's Device. Referring to the present drawing, CPU 211 (FIG. 1) of Callee's Device collects the raw GPS data from the near base stations (S1). CPU 211 then produces the callee's calculated GPS data by referring to the raw GPS data (S2), and stores the callee's calculated GPS data in Callee's Calculated GPS Data Storage Area 20655*b*6A (FIG. 251) (S3). The sequence described in the present drawing is repeated periodically.

FIG. 277 illustrates Map Data Sending/Receiving Software H55*c*4 stored in Caller/Callee Software Storage Area H55*c* (FIG. 260) of Host H (FIG. 289) and Map Data Sending/Receiving Software 20655*c*4A stored in Callee's Information Displaying Software Storage Area 20655*c*A (FIG. 256) of Callee's Device, which sends and receives the map data. Referring to the present drawing, CPU 211 (FIG. 1) of Callee's Device retrieves the callee's calculated GPS data from Callee's Calculated GPS Data Storage Area 20655*b*6A (FIG. 251) (S1), and sends the data to Host H (S2). Upon receiving the calculated GPS data from Callee's Device (S3), Host H identifies the map data in Map Data Storage Area H55*b*3 (FIG. 259) (S4). Here, the map data represents the surrounding area of the location indicated by the callee's calculated GPS data. Host H retrieves the map data from Map Data Storage Area H55*b*3 (FIG. 259) (S5), and sends the data to Callee's Device (S6). Upon receiving the map data from Host H (S7), Callee's Device stores the data in Callee's Map Data Storage Area 20655*b*8A (FIG. 251) (S8). The sequence described in the present drawing is repeated periodically.

FIG. 278 illustrates Callee's Audiovisual Data Collecting Software 20655*c*5A stored in Callee's Information Displaying Software Storage Area 20655*c*A (FIG. 256) of Callee's Device, which collects the audiovisual data of the callee to be sent to Caller's Device via Antenna 218 (FIG. 1) thereof. CPU 211 (FIG. 1) of Callee's Device retrieves the callee's audiovisual data from CCD Unit 214 and Microphone 215 (S1). CPU 211 then stores the callee's audio data in Callee's Audio Data Storage Area 20655*b*2*a*A (FIG. 253) (S2), and the callee's visual data in Callee's Visual Data Storage Area 20655*b*2*b*A (FIG. 253) (S3). The sequence described in the present drawing is repeated periodically.

FIG. 279 illustrates Callee's Information Sending/Receiving Software H55*c*6*a* (FIG. 260) stored in Caller/Callee Software Storage Area H55*c* (FIG. 260) of Host H (FIG. 289) and Callee's Information Sending/Receiving Software 20655*c*6A (FIG. 256) stored in Callee's Information Displaying Software Storage Area 20655*c*A of Callee's Device, which sends and receives the Callee's Information (which is defined hereinafter) between Callee's Device and Host H. Referring to the present drawing, CPU 211 (FIG. 1) of Callee's Device retrieves the permitted callee's personal data from Callee's Personal Data Storage Area 20655*b*4A (FIG. 255) (S1). CPU 211 retrieves the callee's calculated GPS data from Callee's Calculated GPS Data Storage Area 20655*b*6A (FIG. 251) (S2). CPU 211 retrieves the map data from Callee's Map Data Storage Area 20655*b*8A (FIG. 251) (S3). CPU 211 retrieves the callee's audio data from Callee's Audio Data Storage Area 20655*b*2*a*A (FIG. 253) (S4). CPU 211 retrieves the callee's visual data from Callee's Visual Data Storage Area 20655*b*2*b*A (FIG. 253) (S5). CPU 211 then sends the data retrieved in S1 through S5 (collectively defined as the 'Callee's Information' hereinafter) to Host H (S6). Upon receiving the Callee's Information from Callee's Device (S7), Host H stores the Callee's Information in Callee's Information Storage Area H55*b*2 (FIG. 259) (S8). The sequence described in the present drawing is repeated periodically.

FIG. 280 illustrates Callee's Information Sending/Receiving Software H55*c*6*a* stored in Caller/Callee Software Storage Area H55*c* (FIG. 260) of Host H (FIG. 289) and Callee's Information Sending/Receiving Software 20655*c*6*a* stored in Caller's Information Displaying Software Storage Area 20655*c* (FIG. 248) of Caller's Device, which sends and receives the Callee's Information between Host H and Caller's Device. Referring to the present drawing, Host H retrieves the Callee's Information from Callee's Information Storage Area H55*b*2 (FIG. 259) (S1), and sends the Callee's Information to Caller's Device (S2). CPU 211 (FIG. 1) of Caller's Device receives the Callee's Information from Host H (S3). CPU 211 stores the permitted callee's personal data in Callee's Personal Data Storage Area 20655*b*4 (FIG. 247) (S4). CPU 211 stores the callee's calculated GPS data in Callee's Calculated GPS Data Storage Area 20655*b*6 (FIG. 243) (S5). CPU 211 stores the map data in Callee's Map Data Storage Area 20655*b*8 (FIG. 243) (S6). CPU 211 stores the callee's audio data in Callee's Audio Data Storage Area 20655*b*2*a* (FIG. 245) (S7). CPU 211 stores the callee's visual data in Callee's Visual Data Storage Area 20655*b*2*b* (FIG. 245) (S8). The sequence described in the present drawing is repeated periodically.

FIG. 281 illustrates Permitted Callee's Personal Data Displaying Software 20655*c*7 stored in Caller's Information Displaying Software Storage Area 20655*c* (FIG. 248) of Caller's Device, which displays the permitted callee's personal data on LCD 201 (FIG. 1) of Caller's Device. Referring to the present drawing, CPU 211 (FIG. 1) of Caller's Device retrieves the permitted callee's personal data from Callee's Personal Data Storage Area **20655*b*4 (FIG. 247) (S1). CPU 211 then displays the permitted callee's personal data on LCD 201 (FIG. 1) (S2**). The sequence described in the present drawing is repeated periodically.

FIG. 282 illustrates Map Displaying Software **20655*c*8 stored in Caller's Information Displaying Software Storage Area 20655*c* (FIG. 248) of Caller's Device, which displays the map representing the surrounding area of the location indicated by the callee's calculated GPS data. Referring to the present drawing, CPU 211 (FIG. 1) of Caller's Device retrieves the callee's calculated GPS data from Callee's Calculated GPS Data Storage Area 20655*b*6 (FIG. 243) (S1). CPU 211 then retrieves the map data from Callee's Map Data Storage Area 20655*b*8 (FIG. 243) (S2), and arranges on the map data the callee's current location icon in accordance with the callee's calculated GPS data (S3). Here, the callee's current location icon is an icon which represents the location of Callee's Device in the map data. The map with the callee's current location icon is displayed on LCD 201 (FIG. 1) (S4**). The sequence described in the present drawing is repeated periodically.

FIG. 283 illustrates Callee's Audio Data Outputting Software **20655*c*9 stored in Caller's Information Displaying Software Storage Area 20655*c* (FIG. 248) of Caller's Device, which outputs the callee's audio data from Speaker 216 (FIG. 1) of Caller's Device. Referring to the present drawing, CPU 211 (FIG. 1) of Caller's Device retrieves the callee's audio data from Callee's Audio Data Storage Area 20655*b*2*a* (FIG. 245) (S1). CPU 211 then outputs the caller's audio data from Speaker 216 (FIG. 1) (S2**). The sequence described in the present drawing is repeated periodically.

FIG. 284 illustrates Callee's Visual Data Displaying Software **20655*c*10 stored in Caller's Information Displaying Software Storage Area 20655*c* (FIG. 248) of Caller's Device, which displays the callee's visual data on LCD 201 (FIG. 1) of Caller's Device. Referring to the present drawing, CPU 211 (FIG. 1) of Caller's Device retrieves the callee's visual data from Callee's Visual Data Storage Area 20655*b*2*b* (FIG. 245) (S1). CPU 211 then displays the callee's visual data on LCD 201 (FIG. 1) (S2**). The sequence described in the present drawing is repeated periodically.

<<Communication Device Remote Controlling Function (by Web)>>

FIG. 285 through FIG. 307 illustrate the communication device remote controlling function (by web) which enables the user of Communication Device 200 to remotely control Communication Device 200 by an ordinary personal computer (Personal Computer PC) via the Internet, i.e., by accessing a certain web site. Here, Personal Computer PC may be any type of personal computer, including a desktop computer, lap top computer, and PDA.

FIG. 285 illustrates the storage areas included in Host H (FIG. 289). As described in the present drawing, Host H includes Communication Device Controlling Information Storage Area H**58*a* of which the data and the software programs stored therein are described in FIG. 286**.

FIG. 286 illustrates the storage areas included in Communication Device Controlling Information Storage Area H**58*a* (FIG. 285). As described in the present drawing, Communication Device Controlling Information Storage Area H58*a* includes Communication Device Controlling Data Storage Area H58*b* and Communication Device Controlling Software Storage Area H58*c*. Communication Device Controlling Data Storage Area H58*b* stores the data necessary to implement the present function on the side of Host H (FIG. 289), such as the ones described in FIG. 287 through FIG. 290. Communication Device Controlling Software Storage Area H58*c* stores the software programs necessary to implement the present function on the side of Host H, such as the ones described in FIG. 292**.

FIG. 287 illustrates the storage areas included in Communication Device Controlling Data Storage Area H**58*b* (FIG. 286). As described in the present drawing, Communication Device Controlling Data Storage Area H58*b* includes Password Data Storage Area H58*b*1, Phone Number Data Storage Area H58*b*2, Web Display Data Storage Area H58*b*3, and Work Area H58*b*4. Password Data Storage Area H58*b*1 stores the data described in FIG. 288. Phone Number Data Storage Area H58*b*2 stores the data described in FIG. 289. Web Display Data Storage Area H58*b*3 stores the data described in FIG. 290. Work Area H58*b*4** is utilized as a work area to perform calculation and to temporarily store data.

FIG. 288 illustrates the data stored in Password Data Storage Area H**58*b*1 (FIG. 287). As described in the present drawing, Password Data Storage Area H58*b*1 comprises two columns, i.e., 'User ID' and 'Password Data'. Column 'User ID' stores the user IDs, and each user ID represents the identification of the user of Communication Device 200. Column 'Password Data' stores the password data, and each password data represents the password set by the user of the corresponding user ID. Here, each password data is composed of alphanumeric data. In the example described in the present drawing, Password Data Storage Area H58*b*1 stores the following data: the user ID 'User #1' and the corresponding password data 'Password Data #1'; the user ID 'User #2' and the corresponding password data 'Password Data #2'; the user ID 'User #3' and the corresponding password data 'Password Data #3'; the user ID 'User #4' and the corresponding password data 'Password Data #4'; and the user ID 'User #5' and the corresponding password data 'Password Data #5**'.

FIG. 289 illustrates the data stored in Phone Number Data Storage Area H**58*b*2 (FIG. 287). As described in the present drawing, Phone Number Data Storage Area H58*b*2 comprises two columns, i.e., 'User ID' and 'Phone Number Data'. Column 'User ID' stores the user IDs, and each user ID represents the identification of the user of Communication Device 200. Column 'Phone Number Data' stores the phone number data, and each phone number data represents the phone number of the user of the corresponding user ID. Here, each phone number data is composed of numeric data. In the example described in the present drawing, Phone Number Data Storage Area H58*b*2 stores the following data: the user ID 'User #1' and the corresponding phone number data 'Phone Number Data #1'; the user ID 'User #2' and the corresponding phone number data 'Phone Number Data #2'; the user ID 'User #3' and the corresponding phone number data 'Phone Number Data #3'; the user ID 'User #4' and the corresponding phone number data 'Phone Number Data #4'; and the user ID 'User #5' and the corresponding phone number data 'Phone Number Data #5**'.

FIG. 290 illustrates the data stored in Web Display Data Storage Area H**58*b*3 (FIG. 287). As described in the present drawing, Web Display Data Storage Area H58*b*3 comprises two columns, i.e., 'Web Display ID' and 'Web Display Data'. Column 'Web Display ID' stores the web display IDs, and each web display ID represents the identification of the web display data stored in column 'Web Display Data'. Column 'Web Display Data' stores the web display data, and each web display data represents a message displayed on Personal Computer PC. In the example described in the present drawing, Web Display Data Storage Area H58*b*3 stores the following data: the web display ID 'Web Display #0' and the corresponding web display data 'Web Display Data #0'; the web display ID 'Web Display #1' and the corresponding web display data 'Web Display Data #1'; the web display ID 'Web Display #2' and the corresponding web display data 'Web Display Data #2'; the web display ID 'Web Display #3' and the corresponding web display data 'Web Display Data #3'; the web display ID 'Web Display #4' and the corresponding web display data 'Web Display Data #4'; the web display ID 'Web Display #5' and the corresponding web display data 'Web Display Data #5'; and the web display ID 'Web Display #6' and the corresponding web display data 'Web Display Data #6'. 'Web Display Data #0' represents the message: 'To deactivate manner mode, press 1. To deactivate manner mode and ring your mobile phone, press 2. To ring your mobile phone, press 3. To change password of your mobile phone, press 4. To lock your mobile phone, press 5. To power off your mobile phone, press 6.' 'Web Display Data #1' represents the message: 'The manner mode has been deactivated.' 'Web Display Data #2' represents the message: 'The manner mode has been deactivated and your mobile phone has been rung.' 'Web Display Data #3' represents the message: 'Your mobile phone has been rung.' 'Web Display Data #4' represents the message: 'The password of your mobile phone has been changed.' 'Web Display Data #5' represents the message: 'Your mobile phone has been changed.' 'Web Display Data #6' represents the message: 'Your mobile phone has been power-offed.' FIG. 291 illustrates the display of Personal Computer PC. Referring to the present drawing, Home Page 20158HP, i.e., a home page to implement the present function is displayed on Personal Computer PC. Home Page 20158HP is primarily composed of Web Display Data #0 (FIG. 290) and six buttons, i.e., Buttons 1 through 6. Following the instruction described in Web Display Data #0**, the user may select one of the buttons to implement the desired function as described hereinafter.

FIG. 292 illustrates the software programs stored in Communication Device Controlling Software Storage Area H58*c* (FIG. 286). As described in the present drawing, Communication Device Controlling Software Storage Area H58*c* stores User Authenticating Software H58*c*1, Menu Introducing Software H58*c*2, Line Connecting Software H58*c*3, Manner Mode Deactivating Software H58*c*4, Manner Mode Deactivating & Ringing Software H58*c*5, Ringing Software H58*c*6, Password Changing Software H58*c*7, Device Locking Software H58*c*8, and Power Off Software H58*c*9. User Authenticating Software H58*c*1 is the software program described in FIG. 299. Menu Introducing Software H58*c*2 is the software program described in FIG. 300. Line Connecting Software H58*c*3 is the software program described in FIG. 301. Manner Mode Deactivating Software H58*c*4 is the software program described in FIG. 302. Manner Mode Deactivating & Ringing Software H58*c*5 is the software program described in FIG. 303. Ringing Software H58*c*6 is the software program described in FIG. 304. Password Changing Software H58*c*7 is the software program described in FIG. 305. Device Locking Software H58*c*8 is the software program described in FIG. 306. Power Off Software H58*c*9 is the software program described in FIG. 307.

FIG. 293 illustrates the storage area included in RAM 206 (FIG. 1). As described in the present drawing, RAM 206 includes Communication Device Controlling Information Storage Area 20658*a* of which the data and the software programs stored therein are described in FIG. 294.

FIG. 294 illustrates the storage areas included in Communication Device Controlling Information Storage Area 20658*a* (FIG. 293). As described in the present drawing, Communication Device Controlling Information Storage Area 20658*a* includes Communication Device Controlling Data Storage Area 20658*b* and Communication Device Controlling Software Storage Area 20658*c*. Communication Device Controlling Data Storage Area 20658*b* stores the data necessary to implement the present function on the side of Communication Device 200, such as the ones described in FIG. 295 through FIG. 297. Communication Device Controlling Software Storage Area 20658*c* stores the software programs necessary to implement the present function on the side of Communication Device 200, such as the ones described in FIG. 298.

The data and/or the software programs stored in Communication Device Controlling Information Storage Area 20658*a* (FIG. 294) may be downloaded from Host H (FIG. 289) in the manner described in FIG. 104 through FIG. 110.

FIG. 295 illustrates the storage areas included in Communication Device Controlling Data Storage Area 20658*b* (FIG. 294). As described in the present drawing, Communication Device Controlling Data Storage Area 20658*b* includes Password Data Storage Area 20658*b*1 and Work Area 20658*b*4. Password Data Storage Area 20658*b*1 stores the data described in FIG. 296. Work Area 20658*b*4 is utilized as a work area to perform calculation and to temporarily store data.

FIG. 296 illustrates the data stored in Password Data Storage Area 20658*b*1 (FIG. 295). As described in the present drawing, Password Data Storage Area 20658*b*1 comprises two columns, i.e., 'User ID' and 'Password Data'. Column 'User ID' stores the user ID which represents the identification of the user of Communication Device 200. Column 'Password Data' stores the password data set by the user of Communication Device 200. Here, the password data is composed of alphanumeric data. Assuming that the user ID of Communication Device 200 is 'User #1'. In the example described in the present drawing, Password Data Storage Area H58*b*1 stores the following data: the user ID 'User #1' and the corresponding password data 'Password Data #1'.

FIG. 297 illustrates the data stored in Phone Number Data Storage Area 20658*b*2 (FIG. 295). As described in the present drawing, Phone Number Data Storage Area 20658*b*2 comprises two columns, i.e., 'User ID' and 'Phone Number Data'. Column 'User ID' stores the user ID of the user of Communication Device 200. Column 'Phone Number Data' stores the phone number data which represents the phone number of Communication Device 200. Here, the phone number data is composed of numeric data. In the example described in the present drawing, Phone Number Data Storage Area H58*b*2 stores the following data: the user ID 'User #1' and the corresponding phone number data 'Phone Number Data #1'.

FIG. 298 illustrates the software programs stored in Communication Device Controlling Software Storage Area 20658*c* (FIG. 294). As described in the present drawing, Communication Device Controlling Software Storage Area 20658*c* stores Line Connecting Software 20658*c*3, Manner Mode Deactivating Software 20658*c*4, Manner Mode Deactivating & Ringing Software 20658*c*5, Ringing Software 20658*c*6, Password Changing Software 20658*c*7, Device Locking Software 20658*c*8, and Power Off Software 20658*c*9. Line Connecting Software 20658*c*3 is the software program described in FIG. 301. Manner Mode Deactivating Software 20658*c*4 is the software program described in FIG. 302. Manner Mode Deactivating & Ringing Software 20658*c*5 is the software program described in FIG. 303. Ringing Software 20658*c*6 is the software program described in FIG. 304. Password Changing Software 20658*c*7 is the software program described in FIG. 305. Device Locking Software 20658*c*8 is the software program described in FIG. 306.

Power Off Software **20658*c*9 is the software program described in FIG. 307**.

FIG. 299 through FIG. 307 illustrate the software programs which enables the user of Communication Device 200 to remotely control Communication Device 200 by Personal Computer PC.

FIG. 299 illustrates User Authenticating Software H**58*c*1 (FIG. 292) stored in Communication Device Controlling Software Storage Area H58*c* of Host H (FIG. 289), which authenticates the user of Communication Device 200 to implement the present function via Personal Computer PC. As described in the present drawing, Personal Computer PC sends an access request to Host H via the Internet (S1). Upon receiving the request from Personal Computer PC (S2) and the line is connected therebetween (S3), the user, by utilizing Personal Computer PC, inputs both his/her password data (S4) and the phone number data of Communication Device 200 (S5). Host H initiates the authentication process by referring to Password Data Storage Area H58*b*1 (FIG. 288) and Phone Number Data Storage Area H58*b*2 (FIG. 289)) (S6). The authentication process is completed (and the sequences described hereafter are enabled thereafter) if the password data and the phone number data described in S4 and S5 match with the data stored in Password Data Storage Area H58*b*1 and Phone Number Data Storage Area H58*b*2**.

FIG. 300 illustrates Menu Introducing Software H**58*c*2 (FIG. 292) stored in Communication Device Controlling Software Storage Area H58*c* of Host H (FIG. 289), which introduces the menu on Personal Computer PC. As described in the present drawing, Host H retrieves Web Display Data #0 from Web Display Data Storage Area H58*b*3 (FIG. 290) (S1), and sends the data to Personal Computer PC (S2). Upon receiving Web Display Data #0 from Host H (S3), Personal Computer PC displays Web Display Data #0 on its display (S4). The user selects from one of the buttons of '1' through '6' wherein the sequences implemented thereafter are described in FIG. 301 through FIG. 307 (S5**).

FIG. 301 illustrates Line Connecting Software H**58*c*3 (FIG. 292) stored in Communication Device Controlling Software Storage Area H58*c* of Host H (FIG. 289) and Line Connecting Software 20658*c*3 (FIG. 298) stored in Communication Device Controlling Software Storage Area 20658*e* of Communication Device 200, which connect line between Host H and Communication Device 200. As described in the present drawing, Host H calls Communication Device 200 by retrieving the corresponding phone number data from Phone Number Data Storage Area H58*b*2 (FIG. 289) (S1). Upon Communication Device 200 receiving the call from Host H (S2), the line is connected therebetween (S3). For the avoidance of doubt, the line is connected between Host H and Communication Device 200** merely to implement the present function, and a voice communication between human beings is not enabled thereafter.

FIG. 302 illustrates Manner Mode Deactivating Software H**58*c*4 (FIG. 292) stored in Communication Device Controlling Software Storage Area H58*c* of Host H (FIG. 289) and Manner Mode Deactivating Software 20658*c*4 (FIG. 298) stored in Communication Device Controlling Software Storage Area 20658*e* of Communication Device 200, which deactivate the manner mode of Communication Device 200. Here, Communication Device 200 activates Vibrator 217 (FIG. 1) when Communication Device 200 is in the manner mode and outputs a ringing sound from Speaker 216 (FIG. 1) when Communication Device 200 is not in the manner mode, upon receiving an incoming call. Assume that the user selects button '1' displayed on Personal Computer PC (S1). In response, Personal Computer PC sends the corresponding signal to Host H via the Internet (S2). Host H, upon receiving the signal described in S2, sends a manner mode deactivating command to Communication Device 200 (S3). Upon receiving the manner mode deactivating command from Host H (S4), Communication Device 200 deactivates the manner mode (S5). Host H retrieves Web Display Data #1 from Web Display Data Storage Area H58*b*3 (FIG. 290) and sends the data to Personal Computer PC (S6). Upon receiving Web Display Data #1 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58*c*5 and Manner Mode Deactivating & Ringing Software 20658*c*5 is merely to let the user to identify the location of Communication Device 200**. Therefore, a voice communication between human beings is not enabled thereafter.

FIG. 303 illustrates Manner Mode Deactivating & Ringing Software H**58*c*5 (FIG. 292) stored in Communication Device Controlling Software Storage Area H58*c* of Host H (FIG. 289) and Manner Mode Deactivating & Ringing Software 20658*c*5 (FIG. 298) stored in Communication Device Controlling Software Storage Area 20658*c* of Communication Device 200, which deactivate the manner mode of Communication Device 200 and outputs a ringing sound thereafter. Assume that the user selects button '2' displayed on Personal Computer PC (S1). In response, Personal Computer PC sends the corresponding signal to Host H via the Internet (S2). Host H, upon receiving the signal described in S2, sends a manner mode deactivating & device ringing command to Communication Device 200 (S3). Upon receiving the manner mode deactivating & device ringing command from Host H (S4), Communication Device 200 deactivates the manner mode (S5) and outputs a ring data from Speaker 216 (S6). Host H retrieves Web Display Data #2 from Web Display Data Storage Area H58*b*3 (FIG. 290) and sends the data to Personal Computer PC (S7). Upon receiving Web Display Data #2 from Host H, Personal Computer PC displays the data (S8). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58*c*5 and Manner Mode Deactivating & Ringing Software 20658*c*5 is merely to let the user to identify the location of Communication Device 200**. Therefore, a voice communication between human beings is not enabled thereafter by implementing the present function.

FIG. 304 illustrates Ringing Software H**58*c*6 (FIG. 292) stored in Communication Device Controlling Software Storage Area H58*c* of Host H (FIG. 289) and Ringing Software 20658*c*6 (FIG. 298) stored in Communication Device Controlling Software Storage Area 20658*c* of Communication Device 200, which output a ringing sound from Speaker 216 (FIG. 1). Assume that the user selects button '3' displayed on Personal Computer PC (S1). In response, Personal Computer PC sends the corresponding signal to Host H via the Internet (S2). Host H, upon receiving the signal described in S2, sends a device ringing command to Communication Device 200 (S3). Upon receiving the device ringing command from Host H (S4), Communication Device 200 outputs a ring data from Speaker 216 (S5). Host H retrieves Web Display Data #3** from Web Display Data Storage Area H58*b*3 (FIG. 290) and sends the data to Personal Computer PC (S6). Upon receiving Web Display Data #3 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Ringing Software H58*c*6 and Ringing Software 20658*c*6 is merely to let the user to identify the location of Communication Device 200. Therefore, a voice communication between human beings is not enabled thereafter by implementing the present function.

FIG. 305 illustrates Password Changing Software H58*c*7 (FIG. 292) stored in Communication Device Controlling Software Storage Area H58*c* of Host H (FIG. 289) and Password Changing Software 20658*c*7 (FIG. 298) stored in Communication Device Controlling Software Storage Area 20658*c* of Communication Device 200, which change the password necessary to operate Communication Device 200. Assume that the user selects button '4' displayed on Personal Computer PC (S1). In response, Personal Computer PC sends the corresponding signal to Host H via the Internet (S2). The user then enters a new password data by utilizing Personal Computer PC (S3), which is sent to Communication Device 200 by Host H (S4). Upon receiving the new password data from Host H (S5), Communication Device 200 stores the new password data in Password Data Storage Area 20658*b*1 (FIG. 296) and the old password data is erased (S6). Host H retrieves Web Display Data #4 from Web Display Data Storage Area H58*b*3 (FIG. 290) and sends the data to Personal Computer PC (S7). Upon receiving Web Display Data #4 from Host H, Personal Computer PC displays the data (S8).

FIG. 306 illustrates Device Locking Software H58*c*8 (FIG. 292) stored in Communication Device Controlling Software Storage Area H58*c* of Host H (FIG. 289) and Device Locking Software 20658*c*8 (FIG. 298) stored in Communication Device Controlling Software Storage Area 20658*c* of Communication Device 200, which lock Communication Device 200, i.e., nullify any input signal input via Input Device 210 (FIG. 1). Assume that the user selects button '5' displayed on Personal Computer PC (S1). In response, Personal Computer PC sends the corresponding signal to Host H via the Internet (S2). Host H, upon receiving the signal described in S2, sends a device locking command to Communication Device 200 (S3). Upon receiving the device locking command from Host H (S4), Communication Device 200 is locked thereafter, i.e., any input via Input Device 210 is nullified unless a password data matching to the one stored in Password Data Storage Area 20658*b*1 (FIG. 296) is entered (S5). Host H retrieves Web Display Data #5 from Web Display Data Storage Area H58*b*3 (FIG. 290) and sends the data to Personal Computer PC (S6). Upon receiving Web Display Data #5 from Host H, Personal Computer PC displays the data (S7).

FIG. 307 illustrates Power Off Software H58*c*9 (FIG. 292) stored in Communication Device Controlling Software Storage Area H58*c* of Host H (FIG. 289) and Power Off Software 20658*c*9 (FIG. 298) stored in Communication Device Controlling Software Storage Area 20658*c* of Communication Device 200, which turn off the power of Communication Device 200. Assume that the user selects button '6' displayed on Personal Computer PC (S1). In response, Personal Computer PC sends the corresponding signal to Host H via the Internet (S2). Host H, upon receiving the signal described in S2, sends a power off command to Communication Device 200 (S3). Upon receiving the power off command from Host H (S4), Communication Device 200 turns off the power of itself (S5). Host H retrieves Web Display Data #6 from Web Display Data Storage Area H58*b*3 (FIG. 290) and sends the data to Personal Computer PC (S6). Upon receiving Web Display Data #6 from Host H, Personal Computer PC displays the data (S7).

<<Shortcut Icon Displaying Function>>

FIG. 308 through FIG. 325 illustrate the shortcut icon displaying function which displays one or more of shortcut icons on LCD 201 (FIG. 1) of Communication Device 200. The user of Communication Device 200 can execute the software programs in a convenient manner by selecting (e.g., clicking or double clicking) the shortcut icons. The foregoing software programs may be any software programs described in this specification.

FIG. 308 illustrates the shortcut icons displayed on LCD 201 (FIG. 1) of Communication Device 200 by implementing the present function. Referring to the present drawing, three shortcut icons are displayed on LCD 201 (FIG. 1), i.e., Shortcut Icon #1, Shortcut Icon #2, and Shortcut Icon #3. The user of Communication Device 200 can execute the software programs by selecting (e.g., clicking or double clicking) one of the shortcut icons. For example, assume that Shortcut Icon #1 represents MS Word 97. By selecting (e.g., clicking or double clicking) Shortcut Icon #1, the user can execute MS Word 97 installed in Communication Device 200 or Host H. Three shortcut icons are illustrated in the present drawing, however, only for purposes of simplifying the explanation of the present function. Therefore, as many shortcut icons equivalent to the number of the software programs described in this specification may be displayed on LCD 201, and the corresponding software programs may be executed by implementing the present function.

FIG. 309 illustrates the storage area included in RAM 206 (FIG. 1). As described in the present drawing, RAM 206 includes Shortcut Icon Displaying Information Storage Area 20659*a* of which the data and the software programs stored therein are described in FIG. 310.

FIG. 310 illustrates the storage areas included in Shortcut Icon Displaying Information Storage Area 20659*a* (FIG. 309). As described in the present drawing, Shortcut Icon Displaying Information Storage Area 20659*a* includes Shortcut Icon Displaying Data Storage Area 20659*b* and Shortcut Icon Displaying Software Storage Area 20659*c*. Shortcut Icon Displaying Data Storage Area 20659*b* stores the data necessary to implement the present function, such as the ones described in FIG. 311. Shortcut Icon Displaying Software Storage Area 20659*c* stores the software programs necessary to implement the present function, such as the ones described in FIG. 316.

The data and/or the software programs stored in Shortcut Icon Displaying Software Storage Area 20659*c* (FIG. 310) may be downloaded from Host H (FIG. 289) in the manner described in FIG. 104 through FIG. 110.

FIG. 311 illustrates the storage areas included in Shortcut Icon Displaying Data Storage Area 20659*b* (FIG. 310). As described in the present drawing, Shortcut Icon Displaying Data Storage Area 20659*b* includes Shortcut Icon Image Data Storage Area 20659*b*1, Shortcut Icon Location Data Storage Area 20659*b*2, Shortcut Icon Link Data Storage Area 20659*b*3, and Selected Shortcut Icon Data Storage Area 20659*b*4. Shortcut Icon Image Data Storage Area 20659*b*1 stores the data described in FIG. 312. Shortcut Icon Location Data Storage Area 20659*b*2 stores the data described in FIG. 313. Shortcut Icon Link Data Storage Area 20659*b*3 stores the data described in FIG. 314. Selected Shortcut Icon Data Storage Area 20659*b*4 stores the data described in FIG. 315.

FIG. 312 illustrates the data stored in Shortcut Icon Image Data Storage Area **20659*b*1 (FIG. 311). As described in the present drawing, Shortcut Icon Image Data Storage Area 20659*b*1 comprises two columns, i.e., 'Shortcut Icon ID' and 'Shortcut Icon Image Data'. Column 'Shortcut Icon ID' stores the shortcut icon IDs, and each shortcut icon ID is the identification of the corresponding shortcut icon image data stored in column 'Shortcut Icon Image Data'. Column 'Shortcut Icon Image Data' stores the shortcut icon image data, and each shortcut icon image data is the image data of the shortcut icon displayed on LCD 201 (FIG. 1) as described in FIG. 308. In the example described in the present drawing, Shortcut Icon Image Data Storage Area 20659*b* 1 stores the following data: the shortcut icon ID 'Shortcut Icon #1' and the corresponding shortcut icon image data 'Shortcut Icon Image Data #1'; the shortcut icon ID 'Shortcut Icon #2' and the corresponding shortcut icon image data 'Shortcut Icon Image Data #2'; the shortcut icon ID 'Shortcut Icon #3' and the corresponding shortcut icon image data 'Shortcut Icon Image Date #3'; and the shortcut icon ID 'Shortcut Icon #4' and the corresponding shortcut icon image data 'Shortcut Icon Image Data #4**'.

FIG. 313 illustrates the data stored in Shortcut Icon Location Data Storage Area **20659*b*2 (FIG. 311). As described in the present drawing, Shortcut Icon Location Data Storage Area 20659*b*2 comprises two columns, i.e., 'Shortcut Icon ID' and 'Shortcut Icon Location Data'. Column 'Shortcut Icon ID' stores the shortcut icon IDs described hereinbefore. Column 'Shortcut Icon Location Data' stores the shortcut icon location data, and each shortcut icon location data indicates the location displayed on LCD 201 (FIG. 1) in (x,y) format of the shortcut icon image data of the corresponding shortcut icon ID. In the example described in the present drawing, Shortcut Icon Location Data Storage Area 20659*b*2 stores the following data: the shortcut icon ID 'Shortcut Icon #1' and the corresponding shortcut icon location data 'Shortcut Icon Location Data #1'; the shortcut icon ID 'Shortcut Icon #2' and the corresponding shortcut icon location data 'Shortcut Icon Location Data #2'; the shortcut icon ID 'Shortcut Icon #3' and the corresponding shortcut icon location data 'Shortcut Icon Location Data #3'; and the shortcut icon ID 'Shortcut Icon #4' and the corresponding shortcut icon location data 'Shortcut Icon Location Data #4**'.

FIG. 314 illustrates the data stored in Shortcut Icon Link Data Storage Area **20659*b*3 (FIG. 311). As described in the present drawing, Shortcut Icon Link Data Storage Area 20659*b*3 comprises two columns, i.e., 'Shortcut Icon ID' and 'Shortcut Icon Link Data'. Column 'Shortcut Icon ID' stores the shortcut icon IDs described hereinbefore. Column 'Shortcut Icon Link Data' stores the shortcut icon link data, and each shortcut icon link data represents the location in Communication Device 200 of the software program stored therein represented by the shortcut icon of the corresponding shortcut icon ID. In the example described in the present drawing, Shortcut Icon Link Data Storage Area 20659*b*3 stores the following data: the shortcut icon ID 'Shortcut Icon #1' and the corresponding shortcut icon link data 'Shortcut Icon Link Data #1'; the shortcut icon ID 'Shortcut Icon #2' and the corresponding shortcut icon link data 'Shortcut Icon Link Data #2'; the shortcut icon ID 'Shortcut Icon #3' and the corresponding shortcut icon link data 'Shortcut Icon Link Data #3'; and the shortcut icon ID 'Shortcut Icon #4' and the corresponding shortcut icon link data 'Shortcut Icon Link Data #4**'. The foregoing software program may be any software program described in this specification.

FIG. 315 illustrates the data stored in Selected Shortcut Icon Data Storage Area **20659*b*4 (FIG. 311). As described in the present drawing, Selected Shortcut Icon Data Storage Area 20659*b*4 stores one or more of shortcut icon IDs. Only the shortcut icon image data of the shortcut icon IDs stored in Selected Shortcut Icon Data Storage Area 20659*b*4 are displayed on LCD 201 (FIG. 1). In the example described in the present drawing, Selected Shortcut Icon Data Storage Area 20659*b*4 stores the following data: the shortcut icon IDs 'Shortcut Icon #1', 'Shortcut Icon #2', and 'Shortcut Icon #3', which means that only the shortcut icon image data corresponding to 'Shortcut Icon #1', 'Shortcut Icon #2', and 'Shortcut Icon #3' are displayed on LCD 201**.

FIG. 316 illustrates the software programs stored in Shortcut Icon Displaying Software Storage Area **20659*c* (FIG. 310). As described in the present drawing, Shortcut Icon Displaying Software Storage Area 20659*c* stores Shortcut Icon Displaying Software 20659*c*1, Software Executing Software 20659*c*2, Shortcut Icon Location Data Changing Software 20659*c*3, and Software Executing Software 20659*c*4. Shortcut Icon Displaying Software 20659*c*1 is the software program described in FIG. 317. Software Executing Software 20659*c*2 is the software program described in FIG. 318. Shortcut Icon Location Data Changing Software 20659*c*3 is the software program described in FIG. 319. Software Executing Software 20659*c*4 is the software program described in FIG. 325**.

FIG. 317 illustrates Shortcut Icon Displaying Software **20659*c*1 stored in Shortcut Icon Displaying Software Storage Area 20659*c* of Communication Device 200, which displays the shortcut icon image data displayed on LCD 201 (FIG. 1) of Communication Device 200. Referring to the present drawing, CPU 211 (FIG. 1) refers to the shortcut icon IDs stored in Selected Shortcut Icon Data Storage Area 20659*b*4 (FIG. 315) to identify the shortcut icon image data to be displayed on LCD 201 (FIG. 1) (S1). CPU 211 then retrieves the shortcut icon image data of the corresponding shortcut icon IDs identified in S1 from Shortcut Icon Image Data Storage Area 20659*b*1 (FIG. 312) (S2). CPU 211 further retrieves the shortcut icon location data of the corresponding shortcut icon IDs identified in S1 from Shortcut Icon Location Data Storage Area 20659*b*2 (FIG. 313) (S3). CPU 211 displays on LCD 201 (FIG. 1) the shortcut icon image data thereafter (S4**).

FIG. 318 illustrates Software Executing Software **20659*c*2 stored in Shortcut Icon Displaying Software Storage Area 20659*c* of Communication Device 200, which executes the corresponding software program upon selecting the shortcut icon image data displayed on LCD 201 (FIG. 1) of Communication Device 200. Referring to the present drawing, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659*b*3 (FIG. 314) from the shortcut icon ID identified in S2 (S3), and executes the corresponding software program (S4**).

FIG. 319 illustrates Shortcut Icon Location Data Changing Software **20659*c*3 stored in Shortcut Icon Displaying Software Storage Area 20659*c* of Communication Device 200, which enables the user of Communication Device 200 to change the location of the shortcut icon image data displayed on LCD 201 (FIG. 1). Referring to the present drawing, the user of Communication Device 200 selects the shortcut icon image data displayed on LCD 201 (S1). CPU 211 (FIG. 1) then identifies the shortcut icon ID of the shortcut icon image data selected in S1 (S2). The user moves the shortcut icon selected in S1 by utilizing Input Device 210 (FIG. 1) or via voice recognition system (S3). CPU 211 then identifies the new location thereof (S4), and updates the shortcut icon location data stored in Shortcut Icon Location Data Storage Area 20659*b*2 (FIG. 313) (S5**).

<<Shortcut Icon Displaying Function—Executing Software in Host H>>

FIG. 320 through FIG. 325 illustrate the implementation of the present invention wherein the user of Communication Device 200 executes the software programs stored in Host H (FIG. 289) by selecting the shortcut icons displayed on LCD 201 (FIG. 1).

FIG. 320 illustrates the storage areas included in Host H (FIG. 289). As described in the present thawing, Host H includes Shortcut Icon Displaying Information Storage Area H**59*a* of which the data and the software programs stored therein are described in FIG. 321**.

FIG. 321 illustrates the storage areas included in Shortcut Icon Displaying Information Storage Area H**59*a* (FIG. 320). As described in the present drawing, Shortcut Icon Displaying Information Storage Area H59*a* includes Shortcut Icon Displaying Data Storage Area H59*b* and Shortcut Icon Displaying Software Storage Area H59*c*. Shortcut Icon Displaying Data Storage Area H59*b* stores the data necessary to implement the present function on the side of Host H, such as the ones described in FIG. 322 and FIG. 323. Shortcut Icon Displaying Software Storage Area H59*c* stores the software programs necessary to implement the present function on the side of Host H, such as the ones described in FIG. 324**.

FIG. 322 illustrates the storage area included in Shortcut Icon Displaying Data Storage Area H**59*b* (FIG. 321). As described in the present drawing, Shortcut Icon Displaying Data Storage Area H59*b* includes Software Programs Storage Area H59*b*1. Software Programs Storage Area H59*b*1 stores the data described in FIG. 323**.

FIG. 323 illustrates the data stored in Software Programs Storage Area H**59*b*1 (FIG. 322). As described in the present drawing, Software Programs Storage Area H59*b*1 comprises two columns, i.e., 'Software ID' and 'Software Program'. Column 'Software ID' stores the software IDs, and each software ID is an identification of the software program stored in column 'Software Program'. Column 'Software Program' stores the software programs. In the example described in the present drawing, Software Programs Storage Area H59*b*1 stores the following data: software ID 'Software #3' and the corresponding software program 'Software Program #3'; software ID 'Software #4' and the corresponding software program 'Software Program #4'; software ID 'Software #5' and the corresponding software program 'Software Program #5'; and software ID 'Software #6' and the corresponding software program 'Software Program #6'. Here, the software programs may be any software programs which are stored in Host H (FIG. 289) described in this specification. As another embodiment, the software programs may be any software programs stored in RAM 206 (FIG. 1) of Communication Device 200** described in this specification.

FIG. 324 illustrates the software program stored in Shortcut Icon Displaying Software Storage Area H**59*c* (FIG. 321). As described in the present drawing, Shortcut Icon Displaying Software Storage Area H59*c* stores Software Executing Software H59*c*4. Software Executing Software H59*c*4 is the software program described in FIG. 325**.

FIG. 325 illustrates Software Executing Software H**59*c*4 stored in Shortcut Icon Displaying Software Storage Area H59*c* (FIG. 324) of Host H (FIG. 289) and Software Executing Software 20659*c*4 stored in Shortcut Icon Displaying Software Storage Area 20659*c* (FIG. 316) of Communication Device 200, which execute the corresponding software program upon selecting the shortcut icon image data displayed on LCD 201 (FIG. 1) of Communication Device 200. Referring to the present drawing, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659*b*3 (FIG. 314) from the shortcut icon ID identified in S2 (S3), which is sent to Host H (S4). Upon receiving the shortcut icon link data from Communication Device 200 (S5), Host H executes the corresponding software program (S6) and produces the relevant display data, which are send to Communication Device 200 (S7). Upon receiving the relevant display data from Host H, Communication Device 200 displays the data on LCD 201 (S8**).

<<Multiple Channel Processing Function>>

FIG. 326 through FIG. 354 illustrates the multiple channel processing function which enables Communication Device 200 to send and receive a large amount of data in a short period of time by increasing the upload and download speed.

FIG. 326 illustrates the storage area included in Host H (FIG. 289). As described in the present drawing, Host H includes Multiple Channel Processing Information Storage Area H**61*a* of which the data and the software programs stored therein are described in FIG. 327. Here, Host H is a base station which communicates with Communication Device 200** in a wireless fashion.

FIG. 327 illustrates the storage areas included in Multiple Channel Processing Information Storage Area H**61*a* (FIG. 326). As described in the present drawing, Multiple Channel Processing Information Storage Area H61*a* includes Multiple Channel Processing Data Storage Area H61*b* and Multiple Channel Processing Software Storage Area H61*c*. Multiple Channel Processing Data Storage Area H61*b* stores the data necessary to implement the present function on the side of Host H (FIG. 289), such as the ones described in FIG. 328 through FIG. 333. Multiple Channel Processing Software Storage Area H61*c* stores the software programs necessary to implement the present function on the side of Host H, such as the ones described in FIG. 334**.

FIG. 328 illustrates the storage areas included in Multiple Channel Processing Data Storage Area H**61*b* (FIG. 327). As described in the present drawing, Multiple Channel Processing Data Storage Area H61*b* includes User Data Storage Area H61*b*1, Channel Number Storage Area H61*b*2, and Signal Type Data Storage Area H61*b*3. User Data Storage Area H61*b*1 stores the data described in FIG. 329. Channel Number Storage Area H61*b*2 stores the data described in FIG. 330 and FIG. 331. Signal Type Data Storage Area H61*b*3 stores the data described in FIG. 332 and FIG. 333**.

FIG. 329 illustrates the data stored in User Data Storage Area H**61*b*1 (FIG. 328). As described in the present drawing, User Data Storage Area H61*b*1 comprises two columns, i.e., 'User ID' and 'User Data'. Column 'User ID' stores the user IDs, and each user ID in an identification of the user of Communication Device 200. Column 'User Data' stores the user data, and each user data represents the personal data of the user of the corresponding user ID, such as name, home address, office address, phone number, email address, fax number, age, sex, credit card number of the user of the corresponding user ID. In the example described in the present drawing, User Data Storage Area H61*b*1 stores the following data: the user ID 'User #1' and the corresponding user data 'User Data #1'; the user ID 'User #2' and the corresponding user data 'User Data #2'; the user ID 'User #3' and the corresponding user data 'User Data #3'; and the user ID 'User #4' and the corresponding user data 'User Data #4**'.

FIG. 330 illustrates the data stored in Channel Number Storage Area H61*b*2 (FIG. 328). As described in the present drawing, Channel Number Storage Area H61*b*2 comprises two columns, i.e., 'Channel ID' and 'User ID'. Column 'Channel ID' stores the channel IDs, and each channel ID is an identification of the channel which is assigned to each Communication Device 200 and through which Host H (FIG. 289) and Communication Device 200 send and receive data. Normally one channel ID is assigned to one user ID. Column 'User ID' stores the user IDs described hereinbefore. In the example described in the present drawing, Channel Number Storage Area H61*b*2 stores the following data: the channel ID 'Channel #1' and the user ID 'User #1'; the channel ID 'Channel #2' with no corresponding user ID stored; the channel ID 'Channel #3' and the user ID 'User #3'; and the channel ID 'Channel #4' and the user ID 'User #4'. Here, the foregoing data indicates that, to communicate with Host H (FIG. 289), the channel ID 'Channel #1' is utilized by Communication Device 200 represented by the user ID 'User #1'; the channel ID 'Channel #2' is not utilized by any Communication Device 200 (i.e., vacant); the channel ID 'Channel #3' is utilized by Communication Device 200 represented by the user ID 'User #3'; and the channel ID 'Channel #4' is utilized by Communication Device 200 represented by the user ID 'User #4'.

FIG. 331 illustrates another example of the data stored in Channel Number Storage Area H61*b*2 (FIG. 330). As described in the present drawing, Channel Number Storage Area H61*b*2 comprises two columns, i.e., 'Channel ID' and 'User ID'. Column 'Channel ID' stores the channel IDs described hereinbefore. Column 'User ID' stores the user IDs described hereinbefore. In the example described in the present drawing, Channel Number Storage Area H61*b*2 stores the following data: the channel ID 'Channel #1' and the user ID 'User #1'; the channel ID 'Channel #2' and the user ID 'User #1'; the channel ID 'Channel #3' and the user ID 'User #3'; and the channel ID 'Channel #4' and the user ID 'User #4'. Here, the foregoing data indicates that, to communicate with Host H (FIG. 289), the channel ID 'Channel #1' is utilized by Communication Device 200 represented by the user ID 'User #1'; the channel ID 'Channel #2' is also utilized by Communication Device 200 represented by the user ID 'User #1'; the channel ID 'Channel #3' is utilized by Communication Device 200 represented by the user ID 'User #3'; and the channel ID 'Channel #4' is utilized by Communication Device 200 represented by the user ID 'User #4'. In sum, the foregoing data indicates that two channel IDs, i.e., 'Channel #1' and 'Channel #2' are utilized by one Communication Device 200 represented by the user ID 'User #1'.

FIG. 332 illustrates the data stored in Signal Type Data Storage Area H61*b*3 (FIG. 328). As described in the present drawing, Signal Type Data Storage Area H61*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area H61*b*3 stores the following data: the channel ID 'Channel #1' and the corresponding signal type data 'cdma2000'; the channel ID 'Channel #2' and the corresponding signal type data 'cdma2000'; the channel ID 'Channel #3' and the corresponding signal type data 'W-CDMA'; and the channel ID 'Channel #4' and the corresponding signal type data 'cdma2000'. The foregoing data indicates that the channel identified by the channel ID 'Channel #1' is assigned to the signal type data 'cdma2000'; the channel identified by the channel ID 'Channel #2' is assigned to the signal type data 'cdma2000'; the channel identified by the channel ID 'Channel #3' is assigned to the signal type data 'W-CDMA'; and the channel identified by the channel ID 'Channel #4' is assigned to the signal type data 'cdma2000'. Assuming that Communication Device 200 represented by the user ID 'User #1' utilizes the channels represented by the channel ID 'Channel #1' and 'Channel #2' as described in FIG. 331. In the example described in the present drawing, Communication Device 200 represented by the user ID 'User #1' utilizes the signal type data 'cdma2000' for the channels represented by the channel ID 'Channel #1' and 'Channel #2' for communicating with Host H (FIG. 289).

FIG. 333 illustrates another example of the data stored in Signal Type Data Storage Area H61*b*3 (FIG. 328). As described in the present drawing, Signal Type Data Storage Area H61*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area H61*b*3 stores the following data: the channel ID 'Channel #1' and the corresponding signal type data 'cdma2000'; the channel ID 'Channel #2' and the corresponding signal type data 'W-CDMA'; the channel ID 'Channel #3' and the corresponding signal type data 'W-CDMA'; and the channel ID 'Channel #4' and the corresponding signal type data 'cdma2000'. The foregoing data indicates that the channel identified by the channel ID 'Channel #1' is assigned to the signal type data 'cdma2000'; the channel identified by the channel ID 'Channel #2' is assigned to the signal type data 'W-CDMA'; the channel identified by the channel ID 'Channel #3' is assigned to the signal type data 'W-CDMA'; and the channel identified by the channel ID 'Channel #4' is assigned to the signal type data 'cdma2000'. Assuming that Communication Device 200 represented by the user ID 'User #1' utilizes the channels represented by the channel ID 'Channel #1' and 'Channel #2' as described in FIG. 331. In the example described in the present drawing, Communication Device 200 represented by the user ID 'User #1' utilizes the signal type data in a hybrid manner for communicating with Host H (FIG. 289), i.e., the signal type data 'cdma2000' for 'Channel #1' and the signal type data 'W-CDMA' for 'Channel #2'.

FIG. 334 illustrates the software programs stored in Multiple Channel Processing Software Storage Area H61*c* (FIG. 327). As described in the present drawing, Multiple Channel Processing Software Storage Area H61*c* stores Signal Type Data Detecting Software H61*c*1, User ID Identifying Software H61*c*2, Data Sending/Receiving Software H61*c*2*a*, Channel Number Adding Software H61*c*3, Data Sending/Receiving Software H61*c*3*a*, Signal Type Data Adding Software H61*c*4, and Data Sending/Receiving Software H61*c*4*a*. Signal Type Data Detecting Software H61*c*1 is the software program described in FIG. 344 and FIG. 345. User ID Identifying Software H61*c*2 is the software program described in FIG. 346. Data Sending/Receiving Software H61*c*2*a* is the software program described in FIG. 347 and FIG. 348. Channel Number Adding Software H61*c*3 is the software program described in FIG. 349. Data Sending/Receiving Software H61*c*3*a* is the software program described in FIG. 350 and FIG. 351. Signal Type Data Adding Software H61*c*4 is the software program described in FIG. 352. Data Sending/Receiving Software H61$c$4$a$ is the software program described in FIG. 353 and FIG. 354.

FIG. 335 illustrates the storage area included in RAM 206 (FIG. 1) of Communication Device 200. As described in the present drawing, RAM 206 includes Multiple Channel Processing Information Storage Area 20661$a$ of which the data and the software programs stored therein are described in FIG. 336.

FIG. 336 illustrates the storage areas included in Multiple Channel Processing Information Storage Area 20661$a$ (FIG. 335). As described in the present drawing, Multiple Channel Processing Information Storage Area 20661$a$ includes Multiple Channel Processing Data Storage Area 20661$b$ and Multiple Channel Processing Software Storage Area 20661$c$. Multiple Channel Processing Data Storage Area 20661$b$ stores the data necessary to implement the present function on the side of Communication Device 200 (FIG. 289), such as the ones described in FIG. 338 through FIG. 342. Multiple Channel Processing Software Storage Area 20661$c$ stores the software programs necessary to implement the present function on the side of Communication Device 200, such as the ones described in FIG. 343.

The data and/or the software programs stored in Multiple Channel Processing Software Storage Area 20661$c$ (FIG. 336) may be downloaded from Host H (FIG. 289) in the manner described in FIG. 104 through FIG. 110.

FIG. 337 illustrates the storage areas included in Multiple Channel Processing Data Storage Area 20661$b$ (FIG. 336). As described in the present drawing, Multiple Channel Processing Data Storage Area 20661$b$ includes User Data Storage Area 20661$b$1, Channel Number Storage Area 20661$b$2, and Signal Type Data Storage Area 20661$b$3. User Data Storage Area 20661$b$1 stores the data described in FIG. 338. Channel Number Storage Area 20661$b$2 stores the data described in FIG. 339 and FIG. 340. Signal Type Data Storage Area 20661$b$3 stores the data described in FIG. 341 and FIG. 342.

FIG. 338 illustrates the data stored in User Data Storage Area 20661$b$1 (FIG. 337). As described in the present drawing, User Data Storage Area 20661$b$1 comprises two columns, i.e., 'User ID' and 'User Data'. Column 'User ID' stores the user ID which is an identification of Communication Device 200. Column 'User Data' stores the user data represents the personal data of the user of Communication Device 200, such as name, home address, office address, phone number, email address, fax number, age, sex, credit card number of the user. In the example described in the present drawing, User Data Storage Area 20661$b$1 stores the following data: the user ID 'User #1' and the corresponding user data 'User Data #1'.

FIG. 339 illustrates the data stored in Channel Number Storage Area 20661$b$2 (FIG. 337). As described in the present drawing, Channel Number Storage Area 20661$b$2 comprises two columns, i.e., 'Channel ID' and 'User ID'. Column 'Channel ID' stores the channel ID which is an identification of the channel through which Host H (FIG. 289) and Communication Device 200 send and receive data. Column 'User ID' stores the user ID described hereinbefore. In the example described in the present drawing, Channel Number Storage Area 20661$b$2 stores the following data: the channel ID 'Channel #1' and the corresponding user ID 'User #1'. The foregoing data indicates that, to communicate with Host H (FIG. 289), the channel ID 'Channel #1' is utilized by Communication Device 200 represented by the user ID 'User #1'.

FIG. 340 illustrates another example of the data stored in Channel Number Storage Area 20661$b$2 (FIG. 337). As described in the present drawing, Channel Number Storage Area 20661$b$2 comprises two columns, i.e., 'Channel ID' and 'User ID'. Column 'Channel ID' stores the channel IDs, and each channel ID is an identification of the channel through which Host H (FIG. 289) and Communication Device 200 send and receive data. Column 'User ID' stores the user ID described hereinbefore. In the example described in the present drawing, Channel Number Storage Area 20661$b$2 stores the following data: the channel ID 'Channel #1' and the corresponding user ID 'User #1'; and the channel ID 'Channel #2' and the corresponding user ID 'User #2'. The foregoing data indicates that, to communicate with Host H (FIG. 289), the channel IDs of 'Channel #1' and 'Channel #2' are utilized by Communication Device 200 represented by the user ID 'User #1'.

FIG. 341 illustrates the data stored in Signal Type Data Storage Area 20661$b$3 (FIG. 337). As described in the present drawing, Signal Type Data Storage Area 20661$b$3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area 20661$b$3 stores the following data: the channel ID 'Channel #1' and the corresponding signal type data 'cdma2000'; and the channel ID 'Channel #2' and the corresponding signal type data 'cdma2000'. The foregoing data indicates that the channel identified by the channel ID 'Channel #1' is assigned to the signal type data 'cdma2000'; and the channel identified by the channel ID 'Channel #2' is assigned to the signal type data 'cdma2000'. In the example described in the present drawing, Communication Device 200 represented by the user ID 'User #1' utilizes the signal type data 'cdma2000' for the channels represented by the channel ID 'Channel #1' and 'Channel #2' for communicating with Host H (FIG. 289).

FIG. 342 illustrates another example of the data stored in Signal Type Data Storage Area 20661$b$3 (FIG. 337). As described in the present drawing, Signal Type Data Storage Area 20661$b$3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area 20661$b$3 stores the following data: the channel ID 'Channel #1' and the corresponding signal type data 'cdma2000'; and the channel ID 'Channel #2' and the corresponding signal type data 'W-CDMA'. The foregoing data indicates that the channel identified by the channel ID 'Channel #1' is assigned to the signal type data 'cdma2000'; and the channel identified by the channel ID 'Channel #2' is assigned to the signal type data 'W-CDMA'. In the example described in the present drawing, Communication Device 200 represented by the user ID 'User #1' utilizes the signal type data in a hybrid manner for communicating with Host H (FIG. 289), i.e., the signal type data 'cdma2000' for 'Channel #1' and the signal type data 'W-CDMA' for 'Channel #2'.

FIG. 343 illustrates the software programs stored in Multiple Channel Processing Software Storage Area 20661$c$ (FIG. 336). As described in the present drawing, Multiple Channel Processing Software Storage Area 20661$c$ stores Signal Type Data Detecting Software 20661$c$1, User ID Identifying Software 20661$c$2, Data Sending/Receiving Software 20661$c$2$a$, Channel Number Adding Software 20661$c$3, Data Sending/Receiving Software 20661$c$3$a$, Signal Type Data Adding Software 20661$c$4, and Data Sending/Receiving Software 20661$c$4$a$. Signal Type Data Detecting Software 20661$c$1 is the software program described in FIG. 344 and FIG. 345. User ID Identifying Software 20661$c$2 is the software program described in FIG. 346. Data Sending/Receiving Software 20661$c$2$a$ is the software program described in FIG. 347 and FIG. 348. Channel Number Adding Software 20661$c$3 is the software program described in FIG. 349. Data Sending/Receiving Software 20661$c$3$a$ is the software program described in FIG. 350 and FIG. 351. Signal Type Data Adding Software 20661$c$4 is the software program described in FIG. 352. Data Sending/Receiving Software 20661$c$4$a$ is the software program described in FIG. 353 and FIG. 354.

FIG. 344 illustrates Signal Type Data Detecting Software H61$c$1 (FIG. 334) of Host H (FIG. 289) and Signal Type Data Detecting Software 20661$c$1 (FIG. 343) of Communication Device 200, which detect the signal type utilized for the communication between Host H and Communication Device 200 from the ones described in FIG. 693$a$ through FIG. 715 and from any signal type categorized as 2G, 3G, and 4G. The detection of the signal type is implemented by Host H in the present embodiment. As described in the present drawing, Host H detects the signal type (S1), and stores the signal type data in Signal Type Data Storage Area H61$b$3 (FIG. 332) at the default channel number (in the present example, Channel #1) (S2). Host H then sends the signal type data to Communication Device 200 (S3). Upon receiving the signal type data from Host H (S4), Communication Device 200 stores the signal type data in Signal Type Data Storage Area 20661$b$3 (FIG. 341) at the default channel number (in the present example, Channel #1) (S5).

FIG. 345 illustrates another embodiment of Signal Type Data Detecting Software H61$c$1 (FIG. 334) of Host H (FIG. 289) and Signal Type Data Detecting Software 20661$e$1 (FIG. 343) of Communication Device 200, which detect the signal type utilized for the communication between Host H and Communication Device 200 from the ones described in FIG. 693$a$ through FIG. 715 and from any signal type categorized as 2G, 3G, and 4G. The detection of the signal type is implemented by Communication Device 200 in the present embodiment. As described in the present drawing, CPU 211 (FIG. 1) of Communication Device 200 detects the signal type (S1), and stores the signal type data in Signal Type Data Storage Area 20661$b$3 (FIG. 341) at the default channel number (in the present example, Channel #1) (S2). CPU 211 then sends the signal type data to Host H (S3). Upon receiving the signal type data from Communication Device 200 (S4), Host H stores the signal type data in Signal Type Data Storage Area H61$b$3 (FIG. 332) at the default channel number (in the present example, Channel #1) (S5).

FIG. 346 illustrates User ID Identifying Software H61$c$2 (FIG. 334) of Host H (FIG. 289) and User ID Identifying Software 20661$c$2 (FIG. 343) of Communication Device 200, which identify the user ID of the corresponding Communication Device 200. As described in the present drawing, Communication Device 200 sends the user ID to Host H (S1). Upon receiving the User ID from Communication Device 200 (S2), Host H identifies the default channel number (in the present example, Channel #1) for Communication Device 200 (S3), and stores the User ID in Channel Number Storage Area H61$b$2 (FIG. 330) at the channel number identified in S3 (S4).

FIG. 347 illustrates Data Sending/Receiving Software H61$c$2$a$ (FIG. 334) of Host H (FIG. 289) and Data Sending/Receiving Software 20661$c$2$a$ (FIG. 343) of Communication Device 200 by which Host H sends data to Communication Device 200. As described in the present drawing, Host H retrieves the default channel number (in the present example, Channel #1) from Channel Number Storage Area H61$b$2 (FIG. 330) (S1), and sends data (e.g., audiovisual data and alphanumeric data) to Communication Device 200 through the default channel number (in the present example, Channel #1) retrieved in S1 (S2). Communication Device 200 receives the data (e.g., audiovisual data and alphanumeric data) from Host H through the same channel number (S3).

FIG. 348 illustrates another embodiment of Data Sending/Receiving Software H61$c$2$a$ (FIG. 334) of Host H (FIG. 289) and Data Sending/Receiving Software 20661$c$2$a$ (FIG. 343) of Communication Device 200 by which Communication Device 200 sends data (e.g., audiovisual data and alphanumeric data) to Host H. As described in the present drawing, Communication Device 200 retrieves the default channel number (in the present example, Channel #1) from Channel Number Storage Area 20661$b$2 (FIG. 339) (S1), and sends data (e.g., audiovisual data and alphanumeric data) to Host H through the default channel number (in the present example, Channel #1) retrieved in S1 (S2). Host H receives the data (e.g., audiovisual data and alphanumeric data) from Communication Device 200 through the same channel number (S3).

FIG. 349 illustrates Channel Number Adding Software H61$c$3 (FIG. 334) of Host H (FIG. 289) and Channel Number Adding Software 20661$c$3 (FIG. 343) of Communication Device 200, which add another channel to increase the download and/or upload speed of Communication Device 200. As described in the present drawing, Communication Device 200 sends a channel number adding request to Host H (S1). Upon receiving the channel number adding request from Communication Device 200 (S2), Host H checks the availability in the same signal type data (S3). Assuming that vacancy is found in the same signal type data, Host H selects a new channel number (in the present example, Channel #2) from the available channel numbers for Communication Device 200 (S4). Host H stores the user ID of Communication Device 200 in Channel Number Storage Area H61$b$2 (FIG. 330) at new channel number (in the present example, Channel #2) selected in S4 (S5). Host H then sends the new channel number (in the present example, Channel #2) selected in S4 to Communication Device 200 (S6). Upon receiving the new channel number (in the present example, Channel #2) from Host H (S7), Communication Device 200 stores the new channel number (in the present example, Channel #2) in Channel Number Storage Area 20661$b$2 (FIG. 339) (S8). As another embodiment, instead of Host H adding a new channel number by receiving a channel number adding request from Communication Device 200, Host H may do so in its own initiative.

FIG. 350 illustrates Data Sending/Receiving Software H61$c$3$a$ (FIG. 334) of Host H (FIG. 289) and Data Sending/Receiving Software 20661$c$3$a$ (FIG. 343) of Communication Device 200 by which Host H sends data to Communication Device 200 by increasing the download speed. As described in the present drawing, Host H retrieves the channel numbers (in the present example, Channel #1 and #2) from Channel Number Storage Area H61$b$2 (FIG. 330) of the corresponding user ID (in the present example, User #1) (S1). Host H splits the data (e.g., audiovisual data and alphanumeric data) to be sent to Communication Device 200 to the First Data and the Second Data (S2). Host H sends the First Data to Communication Device 200 through Channel #1 (S3), and sends the Second Data to Communication Device 200 through Channel #2 (S4). Communication Device 200 receives the First Data from Host H through Channel #1 (S5), and receives the Second Data from Host H through Channel #2 (S6). Communication Device 200 merges the First Data and the Second Data thereafter (S7).

FIG. 351 illustrates Data Sending/Receiving Software H61c3a (FIG. 334) of Host H (FIG. 289) and Data Sending/Receiving Software 20661c3a (FIG. 343) of Communication Device 200 by which Communication Device 200 sends data to Host H by increasing the upload speed. As described in the present drawing, Communication Device 200 retrieves the channel numbers (in the present example, Channels #1 and #2) from Channel Number Storage Area 20661b2 (FIG. 339) (S1). Communication Device 200 splits the data (e.g., audiovisual data and alphanumeric data) to be sent to Host H to the Third Data and the Fourth Data (S2). Communication Device 200 sends the Third Data to Host H through Channel #1 (S3), and sends the Fourth Data to Host H through Channel #2 (S4). Host H receives the Third Data from Communication Device 200 through Channel #1 (S5), and receives the Fourth Data from Communication Device 200 through Channel #2 (S6). Host H merges the Third Data and the Fourth Data thereafter (S7).

FIG. 352 illustrates Signal Type Data Adding Software H61c4 (FIG. 334) of Host H (FIG. 289) and Signal Type Data Adding Software 20661c4 (FIG. 343) of Communication Device 200, which add new channel in different signal type if no available channel is found in the same signal type in S3 of FIG. 349. As described in the present drawing, Host H checks the availability in other signal type data (S1). Assuming that an available new channel is found in W-CDMA. Host H selects a new channel number (in the present example, Channel #2) In Signal Type Data Storage Area H61b3 (FIG. 333) for Communication Device 200 (S2). Host H stores the user ID (in the present example, User #1) in Channel Number Storage Area H61b2 (FIG. 331) at new channel number selected in S2 (in the present example, Channel #2) (S3). Host H stores the signal type data (in the present example, W-CDMA) in Signal Type Data Storage Area H61b3 (FIG. 333) at new channel number selected in S2 (in the present example, Channel #2) (S4). Host H sends the new channel number (in the present example, Channel #2) and the new signal type data (in the present example, W-CDMA) to Communication Device 200 (S5). Communication Device 200 receives the new channel number (in the present example, Channel #2) and the new signal type data (in the present example, W-CDMA) from Host H (S6). Communication Device 200 stores the new channel number (in the present example, Channel #2) in Channel Number Storage Area 20661b2 (FIG. 340) (S7). Communication Device 200 (in the present example, W-CDMA) in Signal Type Data Storage Area 20661b3 (FIG. 342) (S8).

FIG. 353 illustrates Data Sending/Receiving Software H61c4a (FIG. 334) of Host H (FIG. 289) and Data Sending/Receiving Software 20661c4a (FIG. 343) of Communication Device 200 by which Host H sends data to Communication Device 200 by increasing the download speed. As described in the present drawing, Host H retrieves the channel numbers (in the present example, Channel #1 and #2) from Channel Number Storage Area H61b2 (FIG. 331) of the corresponding user ID (in the present example, User #1) (S1). Host H splits the data (e.g., audiovisual data and alphanumeric data) to be sent to Communication Device 200 to the First Data and the Second Data (S2). Host H sends the First Data to Communication Device 200 through Channel #1 in cdma2000 (S3), and sends the Second Data to Communication Device 200 through Channel #2 in W-CDMA (S4). Communication Device 200 receives the First Data from Host H through Channel #1 in cdma2000 (S5), and receives the Second Data from Host H through Channel #2 in W-CDMA (S6). Communication Device 200 merges the First Data and the Second Data thereafter (S7).

FIG. 354 illustrates Data Sending/Receiving Software H61c4a (FIG. 334) of Host H (FIG. 289) and Data Sending/Receiving Software 20661c4a (FIG. 343) of Communication Device 200 by which Communication Device 200 sends data to Host H by increasing the upload speed. As described in the present drawing, Communication Device 200 retrieves the channel numbers (in the present example, Channel #1 and #2) from Channel Number Storage Area 20661b2 (FIG. 340) (S1). Communication Device 200 splits the data (e.g., audiovisual data and alphanumeric data) to be sent to Host H to the Third Data and the Fourth Data (S2). Communication Device 200 sends the Third Data to Host H through Channel #1 in cdma2000 (S3), and sends the Fourth Data to Host H through Channel #2 in W-CDMA (S4). Host H receives the Third Data from Communication Device 200 through Channel #1 in cdma2000 (S5), and receives the Fourth Data from Communication Device 200 through Channel #2 in W-CDMA (S6). Host H merges the Third Data and the Fourth Data thereafter (S7).

As another embodiment, the present function may be utilized for processing other sets of combination of the signals, such as the 2G signal and the 3G signal. In order to implement this embodiment, the term 'cdma2000' is substituted by '2G' and the term 'W-CDMA' is substituted by '3G' in the explanation set out hereinbefore for purposes of implementing the present embodiment. Here, the 2G signal may be of any type of signal categorized as 2G, including, but not limited to cdmaOne, GSM, and D-AMPS; the 3G signal may be of any type of signal categorized as 3G, including, but not limited to cdma2000, W-CDMA, and TDS-CDMA.

As another embodiment, the present function may be utilized for processing other sets of combination of the signals, such as the 3G signal and the 4G signal. In order to implement this embodiment, the term 'cdma2000' is substituted by '3G' and the term 'W-CDMA' is substituted by '4G' in the explanation set out hereinbefore for purposes of implementing the present embodiment. Here, the 3G signal may be of any type of signal categorized as 3G, including, but not limited to cdma2000, W-CDMA, and TDS-CDMA, and the 4G signal may be of any type of signal categorized as 4G.

As another embodiment, the present function may be utilized for processing the first type of 4G signal and the second type of 4G signal. In order to implement this embodiment, the term 'cdma2000' is substituted by 'the first type of 4G signal' and the term 'W-CDMA' is substituted by 'the second type of 4G signal' for purposes of implementing the present embodiment. Here, the first type of 4G signal and the second type of 4G signal may be of any type of signal categorized as 4G.

As another embodiment, the present function may be utilized for processing the 2G signal and the 3G signal. In order to implement this embodiment, the term 'cdma2000' is substituted by 'the 2G signal' and the term 'W-CDMA' is substituted by 'the 3G signal' for purposes of implementing the present embodiment. Here, the 2G signal may be of any type of signal categorized as 2G, including, but not limited to cdmaOne, GSM, and D-AMPS, and the 3G signal may be of any type of signal categorized as 3G, including, but not limited to cdma2000, W-CDMA, and TDS-CDMA.

As another embodiment, the present function may be utilized for processing the first type of 2G signal and the second type of 2G signal. In order to implement this embodiment, the term 'cdma2000' is substituted by 'the first type of 2G signal' and the term 'W-CDMA' is substituted by 'the second type of 2G signal' for purposes of implementing the present embodiment. Here, the first type of 2G signal and the second type of 2G signal may be of any type of signal categorized as 2G, including, but not limited to cdmaOne, GSM, and D-AMPS.

In sum, the present function described hereinbefore may be utilized for processing any combination of any type of signals.

For the avoidance of doubt, the multiple signal processing function (described in FIG. 693a through FIG. 715) may be utilized while implementing the present function.

For the avoidance of doubt, all software programs described hereinbefore to implement the present function may be executed solely by CPU 211 (FIG. 1) or by Signal Processor 208 (FIG. 1), or by both CPU 211 and Signal Processor 208.

<<Automobile Controlling Function>>

FIG. 355 through FIG. 394 illustrate the automobile controlling function which enables Communication Device 200 to remotely control an automobile in a wireless fashion via Antenna 218 (FIG. 1).

FIG. 355 illustrates the storage area included in Automobile 835, i.e., an automobile or a car. As described in the present drawing, Automobile 835 includes Automobile Controlling Information Storage Area 83565a of which the data and the software programs stored therein are described in FIG. 356.

The data and/or the software programs stored in Automobile Controlling Information Storage Area 83565a (FIG. 355) may be downloaded from Host H (FIG. 289) in the manner described in FIG. 104 through FIG. 110.

FIG. 356 illustrates the storage areas included in Automobile Controlling Information Storage Area 83565a (FIG. 355). As described in the present drawing, Automobile Controlling Information Storage Area 83565a includes Automobile Controlling Data Storage Area 83565b and Automobile Controlling Software Storage Area 83565c. Automobile Controlling Data Storage Area 83565b stores the data necessary to implement the present function on the side of Automobile 835 (FIG. 355), such as the ones described in FIG. 357 through FIG. 363. Automobile Controlling Software Storage Area 83565c stores the software programs necessary to implement the present function on the side of Automobile 835, such as the ones described in FIG. 364.

FIG. 357 illustrates the storage areas included in Automobile Controlling Data Storage Area 83565b (FIG. 356). As described in the present drawing, Automobile Controlling Data Storage Area 83565b includes User Access Data Storage Area 83565b1, Window Data Storage Area 83565b2, Door Data Storage Area 83565b3, Radio Channel Data Storage Area 83565b4, TV Channel Data Storage Area 83565b5, Blinker Data Storage Area 83565b6, and Work Area 83565b7. User Access Data Storage Area 83565b1 stores the data described in FIG. 358. Window Data Storage Area 83565b2 stores the data described in FIG. 359. Door Data Storage Area 83565b3 stores the data described in FIG. 360. Radio Channel Data Storage Area 83565b4 stores the data described in FIG. 361. TV Channel Data Storage Area 83565b5 stores the data described in FIG. 362. Blinker Data Storage Area 83565b6 stores the data described in FIG. 363. Work Area 83565b7 is utilized as a work area to perform calculation and temporarily store data. The data stored in Automobile Controlling Data Storage Area 83565b excluding the ones stored in User Access Data Storage Area 83565b1 and Work Area 83565b7 are primarily utilized for reinstallation, i.e., to reinstall the data to Communication Device 200 as described hereinafter in case the data stored in Communication Device 200 are corrupted or lost.

FIG. 358 illustrates the data stored in User Access Data Storage Area 83565b1 (FIG. 357). As described in the present drawing, User Access Data Storage Area 83565b1 comprises two columns, i.e., 'User ID' and 'Password Data'. Column 'User ID' stores the user IDs, and each user ID is an identification of the user of Communication Device 200 authorized to implement the present function. Column 'Password Data' stores the password data, and each password data represents the password set by the user of the corresponding user ID. The password data is composed of alphanumeric data. In the example described in the present drawing, User Access Data Storage Area 83565b1 stores the following data: the user ID 'User #1' and the corresponding password data 'Password Data #1'; the user ID 'User #2' and the corresponding password data 'Password Data #2'; the user ID 'User #3' and the corresponding password data 'Password Data #3'; and the user ID 'User #4' and the corresponding password data 'Password Data #4'. According to the present example, the users represented by User #1 through #4 are authorized to implement the present function.

FIG. 359 illustrates the data stored in Window Data Storage Area 83565b2 (FIG. 357). As described in the present drawing, Window Data Storage Area 83565b2 comprises two columns, i.e., 'Window ID' and 'Window Data'. Column 'Window ID' stores the window IDs, and each window ID is an identification of the window (not shown) of Automobile 835 (FIG. 355). Column 'Window Data' stores the window data, and each window data is the image data designed to be displayed on LCD 201 (FIG. 1) which represents the position of the window (not shown) of the corresponding window ID. In the example described in the present drawing, Window Data Storage Area 83565b2 stores the following data: the window ID 'Window #1' and the corresponding window data 'Window Data #1'; the window ID 'Window #2' and the corresponding window data 'Window Data #2'; the window ID 'Window #3' and the corresponding window data 'Window Data #3'; and the window ID 'Window #4' and the corresponding window data 'Window Data #4'. Four windows of Automobile 835 which are represented by the window IDs, 'Window #1' through 'Window #4', are remotely controllable by implementing the present function.

FIG. 360 illustrates the data stored in Door Data Storage Area 83565b3 (FIG. 357). As described in the present drawing, Door Data Storage Area 83565b3 comprises two columns, i.e., 'Door ID' and 'Door Data'. Column 'Door ID' stores the door IDs, and each door ID is an identification of the door (not shown) of Automobile 835 (FIG. 355). Column 'Door Data' stores the door data, and each door data is the image data designed to be displayed on LCD 201 (FIG. 1) which represents the position of the door (not shown) of the corresponding door ID. In the example described in the present drawing, Door Data Storage Area 83565b3 stores the following data: the door ID 'Door #1' and the corresponding door data 'Door Data #1'; the door ID 'Door #2' and the corresponding door data 'Door Data #2'; the door ID 'Door #3' and the corresponding door data 'Door Data #3'; and the door ID 'Door #4' and the corresponding door data 'Door Data #4'. Four doors of Automobile 835 which are represented by the door IDs, 'Door #1' through 'Door #4', are remotely controllable by implementing the present function.

FIG. 361 illustrates the data stored in Radio Channel Data Storage Area 83565b4 (FIG. 357). As described in the present drawing, Radio Channel Data Storage Area 83565b4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (FIG. 355). Column 'Radio Channel Data' stores the radio channel data, and each radio channel data is the image data designed to be displayed on LCD 201 (FIG. 1) which represents the radio channel (not shown) of the corresponding radio channel ID. In the example described in the present drawing, Radio Channel Data Storage Area **83565*b*4 stores the following data: the radio channel ID 'Radio Channel #1' and the corresponding radio channel data 'Radio Channel Data #1'; the radio channel ID 'Radio Channel #2' and the corresponding radio channel data 'Radio Channel Data #2'; the radio channel ID 'Radio Channel #3' and the corresponding radio channel data 'Radio Channel Data #3'; and the radio channel ID 'Radio Channel #4' and the corresponding radio channel data 'Radio Channel Data #4'. Four radio channels which are represented by the radio channel IDs, 'Radio Channel #1' through 'Radio Channel #4**', are remotely controllable by implementing the present invention.

FIG. 362 illustrates the data stored in TV Channel Data Storage Area **83565*b*5 (FIG. 357). As described in the present drawing, TV Channel Data Storage Area 83565*b*5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (FIG. 355). Column 'TV Channel Data' stores the TV channel data, and each TV channel data is the image data designed to be displayed on LCD 201 (FIG. 1) which represents the TV channel (not shown) of the corresponding TV channel ID. In the example described in the present drawing, TV Channel Data Storage Area 83565*b*5 stores the following data: the TV channel ID 'TV Channel #1' and the corresponding TV channel data 'TV Channel Data #1'; the TV channel ID 'TV Channel #2' and the corresponding TV channel data 'TV Channel Data #2'; the TV channel ID 'TV Channel #3' and the corresponding TV channel data 'TV Channel Data #3'; and the TV channel ID 'TV Channel #4' and the corresponding TV channel data 'TV Channel Data #4'. Four TV channels which are represented by the TV channel IDs, 'TV Channel #1' through 'TV Channel #4**', are remotely controllable by implementing the present invention.

FIG. 363 illustrates the data stored in Blinker Data Storage Area **83565*b*6 (FIG. 357). As described in the present drawing, Blinker Data Storage Area 83565*b*6 comprises two columns, i.e., 'Blinker ID' and 'Blinker Data'. Column 'Blinker ID' stores the blinker IDs, and each blinker ID is an identification of the blinker (not shown) of Automobile 835 (FIG. 355). Column 'Blinker Data' stores the blinker data, and each blinker data is the image data designed to be displayed on LCD 201 (FIG. 1) which represents the blinker (not shown) of the corresponding blinker ID. In the example described in the present drawing, Blinker Data Storage Area 83565*b*6 stores the following data: the blinker ID 'Blinker #1' and the corresponding blinker data 'Blinker Data #1'; and the blinker ID 'Blinker #2' and the corresponding blinker data 'Blinker Data #2'. Two blinkers which are represented by the blinker IDs, 'Blinker #1' and 'Blinker #2', are remotely controllable by implementing the present invention. Here, the blinker (not shown) represented by 'Blinker #1' is the right blinker and the blinker (not shown) represented by 'Blinker #2**' is the left blinker.

FIG. 364 illustrates the storage areas included in Automobile Controlling Software Storage Area **83565*c* (FIG. 356). As described in the present drawing, Automobile Controlling Software Storage Area 83565*c* includes Automobile Controller Storage Area 83565*c*1 and Remote Controlling Software Storage Area 83565*c*2. Automobile Controller Storage Area 83565*c*1 stores the controllers described in FIG. 365. Remote Controlling Software Storage Area 83565*c*2 stores the software programs described in FIG. 366**.

FIG. 365 illustrates the controllers stored in Automobile Controller Storage Area **83565*c*1 (FIG. 364). As described in the present drawing, Automobile Controller Storage Area 83565*c*1 stores Engine Controller 83565*c*1*a*, Direction Controller 83565*c*1*b*, Speed Controller 83565*c*1*c*, Window Controller 83565*c*1*d*, Door Controller 83565*c*1*e*, Radio Controller 83565*c*1*f*, TV Controller 83565*c*1*g*, Radio Channel Selector 83565*c*1*h*, TV Channel Selector 83565*c*1*i*, Blinker Controller 83565*c*1*j*, Emergency Lamp Controller 83565*c*1*k*, Cruise Control Controller 83565*c*1*l*, and Speaker Volume Controller 83565*c*1*m*. Engine Controller 83565*c*1*a* is the controller which controls the engine (not shown) of Automobile 835 (FIG. 355). Direction Controller 83565*c*1*b* is the controller which controls the steering wheel (not shown) of Automobile 835. Speed Controller 83565*c*1*c* is the controller which controls the accelerator (not shown) of Automobile 835. Window Controller 83565*c*1*d* is the controller which controls the windows (not shown) of Automobile 835. Door Controller 83565*c*1*e* is the controller which controls the doors (not shown) of Automobile 835. Radio Controller 83565*c*1*f* is the controller which controls the radio (not shown) of Automobile 835. TV Controller 83565*c*1*g* is the controller which controls the TV (not shown) of Automobile 835. Radio Channel Selector 83565*c*1*h* is the controller which controls the radio channels (not shown) of the radio (not shown) installed in Automobile 835. TV Channel Selector 83565*c*1*i* is the controller which controls the radio channels (not shown) of the radio (not shown) installed in Automobile 835. Blinker Controller 83565*c*1*j* is the controller which controls the blinkers (not shown) of Automobile 835. Emergency Lamp Controller 83565*c*1*k* is the controller which controls the emergency lamp (not shown) of Automobile 835. Cruise Control Controller 83565*c*1*l* is the controller which controls the cruise control (not shown) of Automobile 835. Speaker Volume Controller 83565*c*1*m* is the controller which controls the speaker (not shown) of Automobile 835**. As another embodiment, the foregoing controllers may be in the form of hardware instead of software.

FIG. 366 illustrates the software programs stored in Remote Controlling Software Storage Area **83565*c*2 (FIG. 364). As described in the present drawing, Remote Controlling Software Storage Area 83565*c*2 stores Engine Controlling Software 83565*c*2*a*, Direction Controlling Software 83565*c*2*b*, Speed Controlling Software 83565*c*2*c*, Window Controlling Software 83565*c*2*d*, Door Controlling Software 83565*c*2*e*, Radio Controlling Software 83565*c*2*f*, TV Controlling Software 83565*c*2*g*, Radio Channel Selecting Software 83565*c*2*h*, TV Channel Selecting Software 83565*c*2*i*, Blinker Controlling Software 83565*c*2*j*, Emergency Lamp Controlling Software 83565*c*2*k*, Cruise Control Controlling Software 83565*c*2*l*, Speaker Volume Controlling Software 83565*c*2*m*, Controller Reinstalling Software 83565*c*2*n*, Data Reinstalling Software 83565*c*2*o*, and User Access Authenticating Software 83565*c*2*p*. Engine Controlling Software 83565*c*2*a* is the software program described in FIG. 380. Direction Controlling Software 83565*c*2*b* is the software program described in FIG. 381. Speed Controlling Software 83565*c*2*c* is the software program described in FIG. 382. Window Controlling Software 83565*c*2*d* is the software program described in FIG. 383. Door Controlling Software 83565*c*2*e* is the software program described in FIG. 384. Radio Controlling Software 83565*c*2*f* is the software program described in FIG. 385. TV Controlling Software 83565*c*2*g* is the software program described in FIG. 386**.

Radio Channel Selecting Software **83565*c*2*h* is the software program described in FIG. 387. TV Channel Selecting Software 83565*c*2*i* is the software program described in FIG. 388. Blinker Controlling Software 83565*c*2*j* is the software program described in FIG. 389. Emergency Lamp Controlling Software 83565*c*2*k* is the software program described in FIG. 390. Cruise Control Controlling Software 83565*c*2*l* is the software program described in FIG. 391. Speaker Volume Controlling Software 83565*c*2*m* is the software program described in FIG. 392. Controller Reinstalling Software 83565*c*2*n* is the software program described in FIG. 393. Data Reinstalling Software 83565*c*2*o* is the software program described in FIG. 394. User Access Authenticating Software 83565*c*2*p* is the software program described in FIG. 379. The controllers stored in Automobile Controller Storage Area 83565*c*1 primarily functions as directly controlling Automobile 835 in the manner described in FIG. 365, and the software programs stored in Remote Controlling Software Storage Area 83565*c*2 controls the controllers stored in Automobile Controller Storage Area 83565*c*1, by cooperating with the software programs stored in Remote Controlling Software Storage Area 20665*c*2 (FIG. 378) of Communication Device 200, in a wireless fashion via Antenna 218 (FIG. 1**).

FIG. 367 illustrates the storage area included in RAM 206 (FIG. 1) of Communication Device 200. As described in the present drawing, RAM 206 includes Automobile Controlling Information Storage Area **20665*a* of which the data and the software programs stored therein are described in FIG. 368**.

The data and/or the software programs stored in Automobile Controlling Information Storage Area **20665*a* (FIG. 367) may be downloaded from Host H (FIG. 289) in the manner described in FIG. 104 through FIG. 110**.

FIG. 368 illustrates the storage areas included in Automobile Controlling Information Storage Area **20665*a* (FIG. 367). As described in the present drawing, Automobile Controlling Information Storage Area 20665*a* includes Automobile Controlling Data Storage Area 20665*b* and Automobile Controlling Software Storage Area 20665*c*. Automobile Controlling Data Storage Area 20665*b* stores the data necessary to implement the present function on the side of Communication Device 200, such as the ones described in FIG. 369 through FIG. 375. Automobile Controlling Software Storage Area 20665*c* stores the software programs necessary to implement the present function on the side of Communication Device 200, such as the ones described in FIG. 376**.

FIG. 369 illustrates the storage areas included in Automobile Controlling Data Storage Area **20665*b* (FIG. 368). As described in the present drawing, Automobile Controlling Data Storage Area 20665*b* includes User Access Data Storage Area 20665*b*1, Window Data Storage Area 20665*b*2, Door Data Storage Area 20665*b*3, Radio Channel Data Storage Area 20665*b*4, TV Channel Data Storage Area 20665*b*5, Blinker Data Storage Area 20665*b*6, and Work Area 20665*b*7. User Access Data Storage Area 20665*b*1 stores the data described in FIG. 370. Window Data Storage Area 20665*b*2 stores the data described in FIG. 371. Door Data Storage Area 20665*b*3 stores the data described in FIG. 372. Radio Channel Data Storage Area 20665*b*4 stores the data described in FIG. 373. TV Channel Data Storage Area 20665*b*5 stores the data described in FIG. 374. Blinker Data Storage Area 20665*b*6 stores the data described in FIG. 375. Work Area 20665*b*7** is utilized as a work area to perform calculation and temporarily store data.

FIG. 370 illustrates the data stored in User Access Data Storage Area **20665*b*1 (FIG. 369). As described in the present drawing, User Access Data Storage Area 20665*b*1 comprises two columns, i.e., 'User ID' and 'Password Data'. Column 'User ID' stores the user ID which is an identification of the user of Communication Device 200. Column 'Password Data' stores the password data which represents the password set by the user of Communication Device 200. The password data is composed of alphanumeric data. In the example described in the present drawing, User Access Data Storage Area 20665*b*1 stores the following data: the user ID 'User #1' and the corresponding password data 'Password Data #1**'.

FIG. 371 illustrates the data stored in Window Data Storage Area **20665*b*2 (FIG. 369). As described in the present drawing, Window Data Storage Area 20665*b*2 comprises two columns, i.e., 'Window ID' and 'Window Data'. Column 'Window ID' stores the window IDs, and each window ID is an identification of the window (not shown) of Automobile 835 (FIG. 355). Column 'Window Data' stores the window data, and each window data is the image data designed to be displayed on LCD 201 (FIG. 1) which represents the position of the window (not shown) of the corresponding window ID. In the example described in the present drawing, Window Data Storage Area 20665*b*2 stores the following data: the window ID 'Window #1' and the corresponding window data 'Window Data #1'; the window ID 'Window #2' and the corresponding window data 'Window Data #2'; the window ID 'Window #3' and the corresponding window data 'Window Data #3'; and the window ID 'Window #4' and the corresponding window data 'Window Data #4'. Four windows of Automobile 835 which are represented by the window IDs, 'Window #1' through 'Window #4**', are remotely controllable by implementing the present function.

FIG. 372 illustrates the data stored in Door Data Storage Area **20665*b*3 (FIG. 369). As described in the present drawing, Door Data Storage Area 20665*b*3 comprises two columns, i.e., 'Door ID' and 'Door Data'. Column 'Door Data' stores the door data, and each door data is the image data designed to be displayed on LCD 201 (FIG. 1) which represents the position of the door (not shown) of the corresponding door ID. In the example described in the present drawing, Door Data Storage Area 20665*b*3 stores the following data: the door ID 'Door #1' and the corresponding door data 'Door Data #1'; the door ID 'Door #2' and the corresponding door data 'Door Data #2'; the door ID 'Door #3' and the corresponding door data 'Door Data #3'; and the door ID 'Door #4' and the corresponding door data 'Door Data #4'. Four doors of Automobile 835 (FIG. 355) which are represented by the door IDs, 'Door #1' through 'Door #4**', are remotely controllable by implementing the present function.

FIG. 373 illustrates the data stored in Radio Channel Data Storage Area **20665*b*4 (FIG. 369). As described in the present drawing, Radio Channel Data Storage Area 20665*b*4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (FIG. 355). Column 'Radio Channel Data' stores the radio channel data, and each radio channel data is the image data designed to be displayed on LCD 201 (FIG. 1) which represents the radio channel (not shown) of the corresponding radio channel ID. In the example described in the present drawing, Radio Channel Data Storage Area 20665*b*4 stores the following data: the radio channel ID 'Radio Channel #1' and the corresponding radio channel data 'Radio Channel Data #1'; the radio channel ID 'Radio Channel #2' and the corresponding radio channel data 'Radio Channel Data #2'; the radio channel ID 'Radio Channel #3' and the corresponding radio channel data 'Radio Channel Data #3'; and the radio channel ID 'Radio Channel #4' and the corresponding radio channel data 'Radio Channel Data #4'. Four radio channels which are represented by the radio channel IDs, 'Radio Channel #1' through 'Radio Channel #4**', are remotely controllable by implementing the present invention.

FIG. 374 illustrates the data stored in TV Channel Data Storage Area **20665*b*5 (FIG. 369). As described in the present drawing, TV Channel Data Storage Area 20665*b*5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (FIG. 355). Column 'TV Channel Data' stores the TV channel data, and each TV channel data is the image data designed to be displayed on LCD 201 (FIG. 1) which represents the TV channel (not shown) of the corresponding TV channel ID. In the example described in the present drawing, TV Channel Data Storage Area 20665*b*5 stores the following data: the TV channel ID 'TV Channel #1' and the corresponding TV channel data 'TV Channel Data #1'; the TV channel ID 'TV Channel #2' and the corresponding TV channel data 'TV Channel Data #2'; the TV channel ID 'TV Channel #3' and the corresponding TV channel data 'TV Channel Data #3'; and the TV channel ID 'TV Channel #4' and the corresponding TV channel data 'TV Channel Data #4'. Four TV channels which are represented by the TV channel IDs, 'TV Channel #1' through 'TV Channel #4**', are remotely controllable by implementing the present invention.

FIG. 375 illustrates the data stored in Blinker Data Storage Area **20665*b*6 (FIG. 369). As described in the present drawing, Blinker Data Storage Area 20665*b*6 comprises two columns, i.e., 'Blinker ID' and 'Blinker Data'. Column 'Blinker ID' stores the blinker IDs, and each blinker ID is an identification of the blinker (not shown) of Automobile 835 (FIG. 355). Column 'Blinker Data' stores the blinker data, and each blinker data is the image data designed to be displayed on LCD 201 (FIG. 1) which represents the blinker (not shown) of the corresponding blinker ID. In the example described in the present drawing, Blinker Data Storage Area 20665*b*6 stores the following data: the blinker ID 'Blinker #1' and the corresponding blinker data 'Blinker Data #1'; and the blinker ID 'Blinker #2' and the corresponding blinker data 'Blinker Data #2'. Two blinkers which are represented by the blinker IDs, 'Blinker #1' and 'Blinker #2', are remotely controllable by implementing the present invention. Here, the blinker (not shown) represented by 'Blinker #1' is the right blinker and the blinker (not shown) represented by 'Blinker #2**' is the left blinker.

FIG. 376 illustrates the storage areas included in Automobile Controlling Software Storage Area **20665*c* (FIG. 368). As described in the present drawing, Automobile Controlling Software Storage Area 20665*c* includes Automobile Controller Storage Area 20665*c*1 and Remote Controlling Software Storage Area 20665*c*2. Automobile Controller Storage Area 20665*c*1 stores the controllers described in FIG. 377. Remote Controlling Software Storage Area 20665*c*2 stores the software programs described in FIG. 378**.

FIG. 377 illustrates the controllers stored in Automobile Controller Storage Area **20665*c*1 (FIG. 376). As described in the present drawing, Automobile Controller Storage Area 20665*c*1 stores Engine Controller 20665*c*1*a*, Direction Controller 20665*c*1*b*, Speed Controller 20665*c*1*c*, Window Controller 20665*c*1*d*, Door Controller 20665*c*1*e*, Radio Controller 20665*c*1*f*, TV Controller 20665*c*1*g*, Radio Channel Selector 20665*c*1*h*, TV Channel Selector 20665*c*1*i*, Blinker Controller 20665*c*1*j*, Emergency Lamp Controller 20665*c*1*k*, Cruise Control Controller 20665*c*1*l*, and Speaker Volume Controller 20665*c*1*m*. Engine Controller 20665*c*1*a* is the controller which controls the engine (not shown) of Automobile 206. Direction Controller 20665*c*1*b* is the controller which controls the steering wheel (not shown) of Automobile 206. Speed Controller 20665*c*1*c* is the controller which controls the accelerator (not shown) of Automobile 206. Window Controller 20665*c*1*d* is the controller which controls the windows (not shown) of Automobile 206. Door Controller 20665*c*1*e* is the controller which controls the doors (not shown) of Automobile 206. Radio Controller 20665*c*1*f* is the controller which controls the radio (not shown) of Automobile 206. TV Controller 20665*c*1*g* is the controller which controls the TV (not shown) of Automobile 206. Radio Channel Selector 20665*c*1*h* is the controller which controls the radio channels (not shown) of the radio (not shown) installed in Automobile 206. TV Channel Selector 20665*c*1*l* is the controller which controls the radio channels (not shown) of the radio (not shown) installed in Automobile 206. Blinker Controller 20665*c*1*j* is the controller which controls the blinkers (not shown) of Automobile 206. Emergency Lamp Controller 20665*c*1*k* is the controller which controls the emergency lamp (not shown) of Automobile 206. Cruise Control Controller 20665*c*1*l* is the controller which controls the cruise control (not shown) of Automobile 206. Speaker Volume Controller 20665*c*1*m* is the controller which controls the speaker (not shown) of Automobile 206. As another embodiment, the foregoing controllers may be in the form of hardware instead of software. The data stored in Automobile Controller Storage Area 20665*c*1 are primarily utilized for reinstallation, i.e., to reinstall the data to Automobile 835 (FIG. 355) as described hereinafter in case the data stored in Automobile 835** are corrupted or lost.

FIG. 378 illustrates the software programs stored in Remote Controlling Software Storage Area **20665*c*2 (FIG. 368). As described in the present drawing, Remote Controlling Software Storage Area 20665*c*2 stores Engine Controlling Software 20665*c*2*a*, Direction Controlling Software 20665*c*2*b*, Speed Controlling Software 20665*c*2*c*, Window Controlling Software 20665*c*2*d*, Door Controlling Software 20665*c*2*e*, Radio Controlling Software 20665*c*2*f*, TV Controlling Software 20665*c*2*g*, Radio Channel Selecting Software 20665*c*2*h*, TV Channel Selecting Software 20665*c*2*i*, Blinker Controlling Software 20665*c*2*j*, Emergency Lamp Controlling Software 20665*c*2*k*, Cruise Control Controlling Software 20665*c*2*l*, Speaker Volume Controlling Software 20665*c*2*m*, Controller Reinstalling Software 20665*c*2*n*, Data Reinstalling Software 20665*c*2*o*, and User Access Authenticating Software 20665*c*2*p*. Engine Controlling Software 20665*c*2*a* is the software program described in FIG. 380. Direction Controlling Software 20665*c*2*b* is the software program described in FIG. 381. Speed Controlling Software 20665*c*2*c* is the software program described in FIG. 382. Window Controlling Software 20665*c*2*d* is the software program described in FIG. 383. Door Controlling Software 20665*c*2*e* is the software program described in FIG. 384. Radio Controlling Software 20665*c*2*f* is the software program described in FIG. 385. TV Controlling Software 20665*c*2*g* is the software program described in FIG. 386. Radio Channel Selecting Software 20665*c*2*h* is the software program described in FIG. 387. TV Channel Selecting Software 20665*c*2*i* is the software program described in FIG. 388. Blinker Controlling Software 20665*c*2*j* is the software program described in FIG. 389. Emergency Lamp Controlling Software 20665*c*2*k* is the software program described in FIG. 390. Cruise Control Controlling Software 20665*c*2*l* is the software program described in FIG. 391. Speaker Volume Controlling Software 20665*c*2*m* is the software program described in FIG. 392. Controller Reinstalling Software 20665*c*2***n* is the software program described in FIG. 393. Data Reinstalling Software 20665*c*2*o* is the software program described in FIG. 394. User Access Authenticating Software 20665*c*2*p* is the software program described in FIG. 379. The controllers stored in Automobile Controller Storage Area 83565*c*1 primarily functions as directly controlling Automobile 835 in the manner described in FIG. 365, and the software programs stored in Remote Controlling Software Storage Area 83565*c*2 (FIG. 378) controls the controllers stored in Automobile Controller Storage Area 83565*c*1 (FIG. 365), by cooperating with the software programs stored in Remote Controlling Software Storage Area 83565*c*2 (FIG. 366) of Automobile 835, in a wireless fashion via Antenna 218 (FIG. 1).

FIG. 379 illustrates User Access Authenticating Software 83565*c*2*p* (FIG. 366) of Automobile 835 (FIG. 355) and User Access Authenticating Software 20665*c*2*p* (FIG. 378) of Communication Device 200, which determine whether Communication Device 200 in question is authorized to remotely control Automobile 835 by implementing the present function. As described in the present drawing, the user of Communication Device 200 inputs the user ID and the password data by utilizing Input Device 210 (FIG. 1) or via voice recognition system. The user ID and the password data are temporarily stored in User Access Data Storage Area 20665*b*1 (FIG. 370) from which the two data are sent to Automobile 835 (S1). Assume that the user input 'User #1' as the user ID and 'Password Data #1' as the password data. Upon receiving the user ID and the password data (in the present example, User #1 and Password Data #1) from Communication Device 200, Automobile 835 stores the two data in Work Area 83565*b*7 (FIG. 357) (S2). Automobile 835 then initiates the authentication process to determine whether Communication Device 200 in question is authorized to remotely control Automobile 835 by referring to the data stored in User Access Data Storage Area 83565*b*1 (FIG. 358) (S3). Assume that the authenticity of Communication Device 200 in question is cleared. Automobile 835 permits Communication Device 200 in question to remotely control Automobile 835 in the manner described hereinafter (S4).

FIG. 380 illustrates Engine Controlling Software 83565*c*2*a* (FIG. 366) of Automobile 835 (FIG. 355) and Engine Controlling Software 20665*c*2*a* (FIG. 378) of Communication Device 200, which ignite or turn off the engine (not shown) of Automobile 835. As described in the present drawing, the user of Communication Device 200 inputs an engine controlling signal by utilizing Input Device 210 (FIG. 1) or via voice recognition system. The signal is sent to Automobile 835 (S1). Here, the engine controlling signal indicates either to ignite the engine or turn off the engine. Upon receiving the engine controlling signal from Communication Device 200, Automobile 835 stores the signal in Work Area 83565*b*7 (FIG. 357) (S2). Automobile 835 controls the engine (not shown) via Engine Controller 83565*c*1*a* (FIG. 365) in accordance with the engine controlling signal (S3).

FIG. 381 illustrates Direction Controlling Software 83565*c*2*b* (FIG. 366) of Automobile 835 (FIG. 355) and Direction Controlling Software 20665*c*2*b* (FIG. 378) of Communication Device 200, which control the direction of Automobile 835. As described in the present drawing, the user of Communication Device 200 inputs a direction controlling signal by utilizing Input Device 210 (FIG. 1) or via voice recognition system. The signal is sent to Automobile 835 (S1). Here, the direction controlling signal indicates either to move forward, back, left, or right Automobile 835. Upon receiving the direction controlling signal from Communication Device 200, Automobile 835 stores the signal in Work Area 83565*b*7 (FIG. 357) (S2). Automobile 835 controls the direction via Direction Controller 83565*c*1*b* (FIG. 365) in accordance with the direction controlling signal (S3).

FIG. 382 illustrates Speed Controlling Software 83565*c*2*c* (FIG. 366) of Automobile 835 (FIG. 355) and Speed Controlling Software 20665*c*2*c* (FIG. 378) of Communication Device 200, which control the speed of Automobile 835. As described in the present drawing, the user of Communication Device 200 inputs a speed controlling signal by utilizing Input Device 210 (FIG. 1) or via voice recognition system. The signal is sent to Automobile 835 (S1). Here, the speed controlling signal indicates either to increase speed or decrease speed of Automobile 835. Upon receiving the speed controlling signal from Communication Device 200, Automobile 835 stores the signal in Work Area 83565*b*7 (FIG. 357) (S2). Automobile 835 controls the speed via Speed Controller 83565*c*1*c* (FIG. 365) In accordance the with speed controlling signal (S3).

FIG. 383 illustrates Window Controlling Software 83565*c*2*d* (FIG. 366) of Automobile 835 (FIG. 355) and Window Controlling Software 20665*c*2*d* (FIG. 378) of Communication Device 200, which control the window (not shown) of Automobile 835. As described in the present drawing, CPU 211 (FIG. 1) of Communication Device 200 retrieves all window data from Window Data Storage Area 20665*b*2 (FIG. 371) and displays the data on LCD 201 (FIG. 1) (S1). The user of Communication Device 200 selects one of the window data (for example, Window Data #1), and CPU 211 identifies the corresponding window ID (for example, Window #1) by referring to Window Data Storage Area 20665*b*2 (FIG. 371) (S2). The user further inputs a window controlling signal by utilizing Input Device 210 (FIG. 1) or via voice recognition system (S3). Here, the window controlling signal indicates either to open the window or to close the window. CPU 211 sends the window ID and the window controlling signal to Automobile 835 (S4). Upon receiving the window ID and the window controlling signal from Communication Device 200, Automobile 835 stores both data in Work Area 83565*b*7 (FIG. 357) (S5). Automobile 835 controls the window identified by the window ID via Window Controller 83565*c*1*d* (FIG. 365) in accordance with the window controlling signal (S6).

FIG. 384 illustrates Door Controlling Software 83565*c*2*e* (FIG. 366) of Automobile 835 (FIG. 355) and Door Controlling Software 20665*c*2*e* (FIG. 378) of Communication Device 200, which control the door (not shown) of Automobile 835. As described in the present drawing, CPU 211 (FIG. 1) of Communication Device 200 retrieves all door data from Door Data Storage Area 20665*b*3 (FIG. 372) and displays the data on LCD 201 (FIG. 1) (S1). The user of Communication Device 200 selects one of the door data (for example, Door Data #1), and CPU 211 identifies the corresponding door ID (for example, Door #1) by referring to Door Data Storage Area 20665*b*3 (FIG. 372) (S2). The user further inputs a door controlling signal by utilizing Input Device 210 (FIG. 1) or via voice recognition system. Here, the door controlling signal indicates either to open the door or to close the door (S3). CPU 211 sends the door ID and the door controlling signal to Automobile 835 (S4). Upon receiving the door ID and the door controlling signal from Communication Device 200, Automobile 835 stores both data in Work Area 83565*b*7 (FIG. 357) (S5). Automobile 835 controls the door identified by the door ID via Door Controller 83565*c*1*e* (FIG. 365) in accordance with the door controlling signal (S6).

FIG. 385 illustrates Radio Controlling Software 83565*c*2*f* (FIG. 366) of Automobile 835 (FIG. 355) and Radio Controlling Software 20665*c*2*f* (FIG. 378) of Communication Device 200, which turn on or turn off the radio (not shown) installed in Automobile 835. As described in the present drawing, the user of Communication Device 200 inputs a radio controlling signal, and CPU 211 sends the signal to Automobile 835 (S1). Here, the radio controlling signal indicates either to turn on the radio or to turn off the radio. Upon receiving the radio controlling signal from Communication Device 200, Automobile 835 stores the signal in Work Area 83565*b*7 (FIG. 357) (S2). Automobile 835 controls the radio via Radio Controller 83565*c*1*f* (FIG. 365) in accordance with the radio controlling signal (S3).

FIG. 386 illustrates TV Controlling Software 83565*c*2*g* (FIG. 366) of Automobile 835 (FIG. 355) and TV Controlling Software 20665*c*2*g* (FIG. 378) of Communication Device 200, which turn on or turn off the TV (not shown) installed in Automobile 835. As described in the present drawing, the user of Communication Device 200 inputs a TV controlling signal, and CPU 211 (FIG. 1) sends the signal to Automobile 835 (S1). Here, the TV controlling signal indicates either to turn on the TV or to turn off the TV. Upon receiving the TV controlling signal from Communication Device 200, Automobile 835 stores the signal in Work Area 83565*b*7 (FIG. 357) (S2). Automobile 835 controls the TV via TV Controller 83565*c*1*g* (FIG. 365) in accordance with the TV controlling signal (S3).

FIG. 387 illustrates Radio Channel Selecting Software 83565*c*2*h* (FIG. 366) of Automobile 835 (FIG. 355) and Radio Channel Selecting Software 20665*c*2*h* (FIG. 378) of Communication Device 200, which select the channel of the radio (not shown) installed in Automobile 835. As described in the present drawing, CPU 211 (FIG. 1) of Communication Device 200 retrieves all radio channel data from Radio Channel Data Storage Area 20665*b*4 (FIG. 373) and Displays the data on LCD 201 (FIG. 1) (S1). The user of Communication Device 200 selects one of the radio channel data (for example, Radio Channel Data #1), and CPU 211 identifies the corresponding radio channel ID (for example, Radio Channel #1) by referring to Radio Channel Data Storage Area 20665*b*4 (FIG. 373) (S2). CPU 211 sends the radio channel ID and the radio channel controlling signal to Automobile 835 (S3). Here, the radio channel controlling signal indicates to change the radio channel to the one identified by the radio channel ID. Upon receiving the radio channel ID and the radio channel controlling signal from Communication Device 200, Automobile 835 stores both data in Work Area 83565*b*7 (FIG. 357) (S4). Automobile 835 controls the radio channel of the radio via Radio Channel Selector 83565*c*1*h* (FIG. 365) in accordance with the Radio Channel Controlling Signal (S5).

FIG. 388 illustrates TV Channel Selecting Software 83565*c*2*i* (FIG. 366) of Automobile 835 (FIG. 355) and TV Channel Selecting Software 20665*c*2*i* (FIG. 378) of Communication Device 200, which select the channel of the TV (not shown) installed in Automobile 835. As described in the present drawing, CPU 211 (FIG. 1) of Communication Device 200 retrieves all TV channel data from TV Channel Data Storage Area 20665*b*5 (FIG. 374) and displays the data on LCD 201 (FIG. 1) (S1). The user of Communication Device 200 selects one of the TV channel data, and CPU 211 identifies the corresponding TV channel ID (for example, TV Channel #1) by referring to TV Channel Data Storage Area 20665*b*5 (FIG. 374) (S2). CPU 211 sends the TV channel ID and the TV channel controlling signal to Automobile 835 (S3). Here, the TV channel controlling signal indicates to change the TV channel to the one identified by the TV channel ID. Upon receiving the TV channel ID and the TV channel controlling signal from Communication Device 200, Automobile 835 stores both data in Work Area 83565*b*7 (FIG. 357) (S4). Automobile 835 controls the TV Channel via TV Channel Selector 83565*c*1*i* (FIG. 365) in accordance with the TV channel controlling signal (S5).

FIG. 389 illustrates Blinker Controlling Software 83565*c*2*j* (FIG. 366) of Automobile 835 (FIG. 355) and Blinker Controlling Software 20665*c*2*j* (FIG. 378) of Communication Device 200, which turn on or turn off the blinker (not shown) of Automobile 835. As described in the present drawing, CPU 211 (FIG. 1) of Communication Device 200 retrieves all blinker data from Blinker Data Storage Area 20665*b*6 (FIG. 375) and displays the data on LCD 201 (FIG. 1) (S1). The user of Communication Device 200 selects one of the blinker data, and CPU 211 identifies the corresponding blinker ID (for example Blinker #1) by referring to Blinker Data Storage Area 20665*b*6 (FIG. 375) (S2). CPU 211 sends the blinker ID and the blinker controlling signal to Automobile 835 (S3). Here, the blinker controlling signal indicates either to turn on or turn off the blinker identified by the blinker ID. Upon receiving the blinker ID and the blinker controlling signal from Communication Device 200, Automobile 835 stores both data in Work Area 83565*b*7 (FIG. 357) (S4). Automobile 835 controls the blinker via Blinker Controller 20665*c*1*j* in accordance with the blinker controlling signal (S5).

FIG. 390 illustrates Emergency Lamp Controlling Software 83565*c*2*k* (FIG. 366) of Automobile 835 (FIG. 355) and Emergency Lamp Controlling Software 20665*c*2*k* (FIG. 378) of Communication Device 200, which turn on or turn off the emergency lamp (not shown) installed in Automobile 835. As described in the present drawing, the user of Communication Device 200 inputs an emergency lamp controlling signal, and CPU 211 (FIG. 1) sends the signal to Automobile 835 (S1). Here, the emergency lamp controlling signal indicates either to turn on the emergency lamp or to turn off the emergency lamp. Upon receiving the emergency lamp controlling signal from Communication Device 200, Automobile 835 stores the signal in Work Area 83565*b*7 (FIG. 357) (S2). Automobile 835 controls the emergency lamp via Emergency Lamp Controller 83565*c*1*k* (FIG. 365) in accordance with the emergency lamp controlling signal (S3).

FIG. 391 illustrates Cruise Control Controlling Software 83565*c*2*l* (FIG. 366) of Automobile 835 (FIG. 355) and Cruise Control Controlling Software 20665*c*2*l* (FIG. 378) of Communication Device 200, which turn on or turn off the cruise control (not shown) of Automobile 835. As described in the present drawing, the user of Communication Device 200 inputs a cruise control controlling signal, and CPU 211 (FIG. 1) sends the signal to Automobile 835 (S1). Here, the cruise control controlling signal indicates either to turn on the cruise control or turn off the cruise control. Upon receiving the cruise control controlling signal from Communication Device 200, Automobile 835 stores the signal in Work Area 83565*b*7 (FIG. 357) (S2). Automobile 835 controls the cruise control via Cruise Control Controller 83565*c*1*l* (FIG. 365) in accordance with the cruise control controlling signal (S3).

FIG. 392 illustrates Speaker Volume Controlling Software 83565*c*2*m* (FIG. 366) of Automobile 835 (FIG. 355) and Speaker Volume Controlling Software 20665*c*2*m* (FIG. 378) of Communication Device 200, which raise or lower the volume of the speaker (not shown) of Automobile 835. As described in the present drawing, the user of Communication Device 200 inputs a speaker volume controlling signal, and CPU 211 (FIG. 1) sends the signal to Automobile 835 (S1).

Here, the speaker volume controlling signal indicates either to raise the volume or lower the volume of the speaker. Upon receiving the speaker volume controlling signal from Communication Device 200, Automobile 835 stores the signal in Work Area **83565*b*7 (FIG. 357) (S2). Automobile 835 controls the speaker volume of the speaker via Speaker Volume Controller 83565*c*1*m* (FIG. 365) in accordance with the speaker volume controlling signal (S3**).

FIG. 393 illustrates Controller Reinstalling Software **83565*c*2*n* (FIG. 366) of Automobile 835 (FIG. 355) and Controller Reinstalling Software 20665*c*2*n* (FIG. 378) of Communication Device 200, which reinstalls the controllers to Automobile Controller Storage Area 83565*c*1. As described in the present drawing, CPU 211 (FIG. 1) of Communication Device 200 retrieves all controllers from Automobile Controller Storage Area 20665*c*1, and sends the controllers to Automobile 835 (S1). Upon receiving the controllers from Communication Device 200, Automobile 835 stores the controllers in Work Area 83565*b*7 (FIG. 357) (S2). Automobile 835 then reinstalls the controllers in Automobile Controller Storage Area 83565*c*1 (S3**).

FIG. 394 illustrates Data Reinstalling Software **83565*c*2*o* (FIG. 366) of Automobile 835 (FIG. 355) and Data Reinstalling Software 20665*c*2*o* (FIG. 378) of Communication Device 200, which reinstall the data to Automobile Controlling Data Storage Area 20665*b*. As described in the present drawing, Automobile 835 retrieves all data from Automobile Controlling Data Storage Area 83565*b*, and sends the data to Communication Device 200 (S1). Upon receiving the data from Automobile 835, CPU 211 (FIG. 1) of Communication Device 200 stores the data in Work Area 20665*b*7 (S2). CPU 211 then reinstalls the data in Automobile Controlling Data Storage Area 20665*b* (S3**).

For the avoidance of doubt, Automobile 835 (FIG. 355) is not limited to an automobile or a car; the present function may be implemented with any type of carrier or vehicle, such as airplane, space ship, artificial satellite, space station, train, and motor cycle.

<<OCR Function>>

FIG. 395 illustrates the storage area included in RAM 206 (FIG. 1). As described in the present drawing, RAM 206 includes OCR Information Storage Area **20666*a* of which the data and the software programs stored therein are described in FIG. 396**.

The data and/or the software programs stored in OCR Information Storage Area **20666*a* (FIG. 395) may be downloaded from Host H (FIG. 289) in the manner described in FIG. 104 through FIG. 110**.

FIG. 396 illustrates the storage areas included in OCR Information Storage Area **20666*a* (FIG. 395). As described in the present drawing, OCR Information Storage Area 20666*a* includes OCR Data Storage Area 20666*b* and OCR Software Storage Area 20666*c*. OCR Data Storage Area 20666*b* stores the data necessary to implement the present function, such as the ones described in FIG. 397 through FIG. 402. OCR Software Storage Area 20666*c* stores the software programs necessary to implement the present function, such as the ones described in FIG. 403 and FIG. 404**.

FIG. 397 illustrates the storage areas included in OCR Data Storage Area **20666*b* (FIG. 396). As described in the present drawing, OCR Data Storage Area 20666*b* includes Web Address Data Storage Area 20666*b*1, Email Address Data Storage Area 20666*b*2, Phone Data Storage Area 20666*b*3, Alphanumeric Data Storage Area 20666*b*4, Image Data Storage Area 20666*b*5, and Work Area 20666*b*6. Web Address Data Storage Area 20666*b*1 stores the data described in FIG. 398. Email Address Data Storage Area 20666*b*2 stores the data described in FIG. 399. Phone Data Storage Area 20666*b*3 stores the data described in FIG. 400. Alphanumeric Data Storage Area 20666*b*4 stores the data described in FIG. 401. Image Data Storage Area 20666*b*5 stores the data described in FIG. 402. Work Area 20666*b*6** is utilized as a work area to perform calculation and temporarily store data.

FIG. 398 illustrates the data stored in Web Address Data Storage Area **20666*b*1 (FIG. 397). As described in the present drawing, Web Address Data Storage Area 20666*b*1 comprises two columns, i.e., 'Web Address ID' and 'Web Address Data'. Column 'Web Address ID' stores the web address IDs, and each web address ID is the title of the corresponding web address data stored in column 'Web Address Data' utilized for identification purposes. Column 'Web Address Data' stores the web address data, and each web address data represents a web address composed of alphanumeric data of which the first portion thereof is 'http://'. In the example described in the present drawing, Web Address Data Storage Area 20666*b*1 stores the following data: the web address ID 'Web Address#1' and the corresponding web address data 'Web Address Data #1'; the web address ID 'Web Address#2' and the corresponding web address data 'Web Address Data #2'; the web address ID 'Web Address#3' and the corresponding web address data 'Web Address Data #3'; and the web address ID 'Web Address#4' and the corresponding web address data 'Web Address Data #4**'.

FIG. 399 illustrates the data stored in Email Address Data Storage Area **20666*b*2 (FIG. 397). As described in the present drawing, Email Address Data Storage Area 20666*b*2 comprises two columns, i.e., 'Email Address ID' and 'Email Address Data'. Column 'Email Address ID' stores the email address IDs, and each email address ID is the title of the corresponding email address data stored in column 'Email Address Data' utilized for identification purposes. Column 'Email Address Data' stores the email address data, and each email address data represents an email address composed of alphanumeric data which includes '@' mark therein. In the example described in the present drawing, Email Address Data Storage Area 20666*b*2 stores the following data: the email address ID 'Email Address#1' and the corresponding email address data 'Email Address Data #1'; the email address ID 'Email Address#2' and the corresponding email address data 'Email Address Data #2'; the email address ID 'Email Address#3' and the corresponding email address data 'Email Address Data #3'; and the email address ID 'Email Address#4' and the corresponding email address data 'Email Address Data #4**'.

FIG. 400 illustrates the data stored in Phone Data Storage Area **20666*b*3 (FIG. 397). As described in the present drawing, Phone Data Storage Area 20666*b*3 comprises two columns, i.e., 'Phone ID' and 'Phone Data'. Column 'Phone ID' stores the phone IDs, and each phone ID is the title of the corresponding phone data stored in column 'Phone Data' utilized for identification purposes. Column 'Phone Data' stores the phone data, and each phone data represents a phone number composed of numeric figure of which the format is 'xxx-xxx-xxxx'. In the example described in the present drawing, Phone Data Storage Area 20666*b*3 stores the following data: the phone ID 'Phone #1' and the corresponding phone data 'Phone Data #1'; the phone ID 'Phone #2' and the corresponding phone data 'Phone Data #2'; the phone ID 'Phone #3' and the corresponding phone data 'Phone Data #3'; and the phone ID 'Phone #4' and the corresponding phone data 'Phone Data #4**'.

FIG. 401 illustrates the data stored in Alphanumeric Data Storage Area **20666*b*4 (FIG. 397). As described in the present drawing, Alphanumeric Data Storage Area 20666*b*4 comprises two columns, i.e., 'Alphanumeric ID' and 'Alphanumeric Data'. Column 'Alphanumeric ID' stores alphanumeric IDs, and each alphanumeric ID is the title of the corresponding alphanumeric data stored in column 'Alphanumeric Data' utilized for identification purposes. Column 'Alphanumeric Data' stores the alphanumeric data, and each alphanumeric data represents alphanumeric figure primarily composed of numbers, texts, words, and letters. In the example described in the present drawing, Alphanumeric Data Storage Area 20666*b*4 stores the following data: the alphanumeric ID 'Alphanumeric #1' and the corresponding alphanumeric data 'Alphanumeric Data #1'; the alphanumeric ID 'Alphanumeric #2' and the corresponding alphanumeric data 'Alphanumeric Data #2'; the alphanumeric ID 'Alphanumeric #3' and the corresponding alphanumeric data 'Alphanumeric Data #3'; and the alphanumeric ID 'Alphanumeric #4' and the corresponding alphanumeric data 'Alphanumeric Data #4**'.

FIG. 402 illustrates the data stored in Image Data Storage Area **20666*b*5 (FIG. 397). As described in the present drawing, Image Data Storage Area 20666*b*5 comprises two columns, i.e., 'Image ID' and 'Image Data'. Column 'Image ID' stores the image IDs, and each image ID is the title of the corresponding image data stored in column 'Image Data' utilized for identification purposes. Column 'Image Data' stores the image data, and each image data is a data composed of image such as the image input via CCD Unit 214 (FIG. 1). In the example described in the present drawing, Image Data Storage Area 20666*b*5 stores the following data: the Image ID 'Image #1' and the corresponding Image Data 'Image Data #1'; the Image ID 'Image #2' and the corresponding Image Data 'Image Data #2'; the Image ID 'Image #3' and the corresponding Image Data 'Image Data #3'; and the Image ID 'Image #4' and the corresponding Image Data 'Image Data #4**'.

FIG. 403 and FIG. 404 illustrate the software programs stored in OCR Software Storage Area **20666*c* (FIG. 396). As described in the present drawing, OCR Software Storage Area 20666*c* stores Image Data Scanning Software 20666*c*1, Image Data Storing Software 20666*c*2, OCR Software 20666*c*3, Alphanumeric Data Storing Software 20666*c*4, Web Address Data Identifying Software 20666*c*5*a*, Web Address Data Correcting Software 20666*c*5*b*, Web Address Data Storing Software 20666*c*5*c*, Address Accessing Software 20666*c*5*d*, Email Address Data Identifying Software 20666*c*6*a*, Email Address Data Correcting Software 20666*c*6*b*, Email Address Data Storing Software 20666*c*6*c*, Email Editing Software 20666*c*6*d*, Phone Data Identifying Software 20666*c*7*a*, Phone Data Correcting Software 20666*c*7*b*, Phone Data Storing Software 20666*c*7*c*, and Dialing Software 20666*c*7*d*. Image Data Scanning Software 20666*c*1 is the software program described in FIG. 405. Image Data Storing Software 20666*c*2 is the software program described in FIG. 406. OCR Software 20666*c*3 is the software program described in FIG. 407. Alphanumeric Data Storing Software 20666*c*4 is the software program described in FIG. 408. Web Address Data Identifying Software 20666*c*5*a* is the software program described in FIG. 409. Web Address Data Correcting Software 20666*c*5*b* is the software program described in FIG. 410. Web Address Data Storing Software 20666*c*5*c* is the software program described in FIG. 411. Web Address Accessing Software 20666*c*5*d* is the software program described in FIG. 412. Email Address Data Identifying Software 20666*c*6*a* is the software program described in FIG. 413. Email Address Data Correcting Software 20666*c*6*b* is the software program described in FIG. 414. Email Address Data Storing Software 20666*c*6*c* is the software program described in FIG. 415. Email Editing Software 20666*c*6*d* is the software program described in FIG. 416. Phone Data Identifying Software 20666*c*7*a* is the software program described in FIG. 417. Phone Data Correcting Software 20666*c*7*b* is the software program described in FIG. 418. Phone Data Storing Software 20666*c*7*c* is the software program described in FIG. 419. Dialing Software 20666*c*7*d* is the software program described in FIG. 420**.

FIG. 405 illustrates Image Data Scanning Software **20666*c*1 (FIG. 403) of Communication Device 200, which scans an image by utilizing CCD Unit (FIG. 1). Referring to the present drawing, CPU 211 (FIG. 1) scans an image by utilizing CCD Unit (FIG. 1) (S1), and stores the extracted image data in Work Area 20666*b*6 (FIG. 397) (S2). CPU 211 then retrieves the image data from Work Area 20666*b*6 (FIG. 397) and displays the data on LCD 201 (FIG. 1) (S3**).

FIG. 406 illustrates Image Data Storing Software **20666*c*2 (FIG. 403) of Communication Device 200, which stores the image data scanned by CCD Unit (FIG. 1). Referring to the present drawing, CPU 211 (FIG. 1) retrieves the image data from Work Area 20666*b*6 (FIG. 397) and displays the data On LCD 201 (FIG. 1) (S1). The user of Communication Device 200 inputs an image ID, i.e., a title of the image data by utilizing Input Device 210 (FIG. 1) or via voice recognition system (S2). CPU 211 then stores the image ID and the image data in Image Data Storage Area 20666*b*5 (FIG. 402) (S3**).

FIG. 407 illustrates OCR Software **20666*c*3 (FIG. 403) of Communication Device 200, which extracts alphanumeric data from image data by utilizing the method so-called 'optical character recognition' or 'OCR'. Referring to the present drawing, CPU 211 (FIG. 1) retrieves the image IDs from Image Data Storage Area 20666*b*5 (FIG. 402) and displays the data on LCD 201 (FIG. 1) (S1). The user of Communication Device 200 selects one of the image IDs by utilizing Input Device 210 (FIG. 1) or via voice recognition system (S2). CPU 211 then retrieves the image data of the image ID selected in S2 from Image Data Storage Area 20666*b*5 (FIG. 402) and displays the image data on LCD 201 (FIG. 1) (S3). CPU 211 executes the OCR process, i.e., extracts alphanumeric data from the image data (S4), and stores the extracted alphanumeric data in Work Area 20666*b*6 (FIG. 397) (S5**).

FIG. 408 illustrates Alphanumeric Data Storing Software **20666*c*4 (FIG. 403) of Communication Device 200, which stores the extracted alphanumeric data in Alphanumeric Data Storage Area 20666*b*4 (FIG. 401). Referring to the present drawing, the user of Communication Device 200 inputs an alphanumeric ID (i.e., the title of the alphanumeric data) (S1). CPU 211 (FIG. 1) then retrieves the alphanumeric data from Work Area 20666*b*6 (FIG. 397) (S2), and stores the data in Alphanumeric Data Storage Area 20666*b*4 (FIG. 401) with the Alphanumeric ID (S3**).

FIG. 409 illustrates Web Address Data Identifying Software **20666*c*5*a* (FIG. 403) of Communication Device 200, which identifies the web address data among the Alphanumeric Data. Referring to the present drawing, CPU 211 (FIG. 1) retrieves the alphanumeric IDs from Alphanumeric Data Storage Area 20666*b*4 (FIG. 401) and displays the alphanumeric IDs on LCD 201 (FIG. 1) (S1). The user of Communication Device 200 selects one of the Alphanumeric IDs by utilizing Input Device 210 (FIG. 1) or via voice recognition system (S2). CPU 211 retrieves the corresponding alphanumeric data from Alphanumeric Data Storage Area 20666*b*4 (FIG. 401) and displays the data on LCD 201 (FIG. 1) (S3). CPU 211 stores the alphanumeric data retrieved in S3 in Work Area 20666*b*6 (FIG. 397) for the web address data identification explained in the next step (S4). CPU 211 scans the alphanumeric data, i.e., applies the web address criteria (for example, 'http://', 'www.', '.com', '.org', '.edu') to each alphanumeric data, and identifies the web address data included therein (S5). CPU 211 emphasizes the identified web address data by changing the font color (for example, blue) and drawing underlines to the identified web address data (S6). CPU 211 displays the alphanumeric data with the identified web address data emphasized on LCD 201 (FIG. 1) thereafter (S7**).

FIG. 410 illustrates Web Address Data Correcting Software **20666*c*5*b* (FIG. 403) of Communication Device 200, which corrects the misidentified web address data by manually selecting the start point and the end point of the web address data. For example, if the web address data is misidentified as 'www.yahoo' and leaves out the remaining '.com', the user of Communication Device 200 may manually correct the web address data by selecting the start point and the end point of 'www.yahoo.com'. Referring to the present drawing, CPU 211 (FIG. 1) displays the alphanumeric data with web address data emphasized (S1). The user of Communication Device 200 selects the start point of the web address data (S2) and the end point of the web address data by utilizing Input Device 210 (FIG. 1) or via voice recognition system (S3). CPU 211 then identifies the alphanumeric data located between the start point and the end point as web address data (S4), and emphasizes the web address data by changing the font color (for example, blue) and drawing underlines thereto (S5). The alphanumeric data with the web address data emphasized are displayed on LCD 201 (FIG. 1) thereafter (S6**).

FIG. 411 illustrates Web Address Data Storing Software **20666*c*5*c* (FIG. 403) of Communication Device 200, which stores the web address data in Web Address Data Storage Area 20666*b*1 (FIG. 398). Referring to the present drawing, CPU 211 (FIG. 1) displays the alphanumeric data with web address data emphasized (S1). The user of Communication Device 200 selects one of the web address data by utilizing Input Device 210 (FIG. 1) or via voice recognition system, and CPU 211 emphasizes the data (for example, change to bold font) (S2). The user then inputs the web address ID (the title of the web address data) (S3). CPU 211 stores the web address ID and the web address data in Web Address Data Storage Area 20666*b*1 (FIG. 398) (S4**).

FIG. 412 illustrates Web Address Accessing Software **20666*c*5*d* (FIG. 403) of Communication Device 200, which accesses the web site represented by the web address data. Referring to the present drawing, CPU 211 (FIG. 1) displays the alphanumeric data with web address data emphasized (S1). The user of Communication Device 200 selects one of the web address data by utilizing Input Device 210 (FIG. 1) or via voice recognition system (for example, click one of the web address data) (S2). CPU 211 then opens an interne browser (for example, the Internet Explorer) and enters the web address data selected in S2 therein (S3). CPU 211 accesses the web site thereafter (S4**).

FIG. 413 illustrates Email Address Data Identifying Software **20666*c*6*a* (FIG. 404) of Communication Device 200, which identifies the email address data among the alphanumeric data. Referring to the present drawing, CPU 211 (FIG. 1) retrieves the alphanumeric IDs from Alphanumeric Data Storage Area 20666*b*4 (FIG. 401) and displays the alphanumeric IDs on LCD 201 (FIG. 1) (S1). The user of Communication Device 200 selects one of the alphanumeric IDs by utilizing Input Device 210 (FIG. 1) or via voice recognition system (S2). CPU 211 retrieves the corresponding alphanumeric data from Alphanumeric Data Storage Area 20666*b*4 (FIG. 401) and displays the data on LCD 201 (FIG. 1) (S3). CPU 211 stores the alphanumeric data retrieved in S3 in Work Area 20666*b*6 (FIG. 397) for the email address data identification explained in the next step (S4). CPU 211 scans the alphanumeric data, i.e., applies the email address criteria (for example, '@') to each alphanumeric data, and identifies the email address data included therein (S5). CPU 211 emphasizes the identified email address data by changing the font color (for example, green) and drawing underlines to the identified email address data (S6). CPU 211 displays the alphanumeric data with the identified email address data emphasized on LCD 201 (FIG. 1) thereafter (S7**).

FIG. 414 illustrates Email Address Data Correcting Software **20666*c*6*b* (FIG. 404) of Communication Device 200, which corrects the misidentified email address data by manually selecting the start point and the end point of the email address data. For example, if the email address data is misidentified as 'iwaofujisaki@yahoo' and leaves out the remaining '.com', the user of Communication Device 200 may manually correct the email address data by selecting the start point and the end point of 'iwaofujisaki@yahoo.com'. Referring to the present drawing, CPU 211 (FIG. 1) displays the alphanumeric data with email address data emphasized (S1). The user of Communication Device 200 selects the start point of the email address data (S2) and the end point of the email address data by utilizing Input Device 210 (FIG. 1) or via voice recognition system (S3). CPU 211 then identifies the alphanumeric data located between the start point and the end point as email address data (S4), and emphasizes the email address data by changing the font color (for example, green) and drawing underlines thereto (S5). The alphanumeric data with the email address data emphasized are displayed on LCD 201 (FIG. 1) thereafter (S6**).

FIG. 415 illustrates Email Address Data Storing Software **20666*c*6*c* (FIG. 404) of Communication Device 200, which stores the email address data to Email Address Data Storage Area 20666*b*2 (FIG. 399). Referring to the present drawing, CPU 211 (FIG. 1) displays the alphanumeric data with the email address data emphasized (S1). The user of Communication Device 200 selects one of the email address data, and CPU 211 emphasizes the data (for example, change to bold font) (S2). The user then inputs the email address ID (the title of the email address data) by utilizing Input Device 210 (FIG. 1) or via voice recognition system (S3). CPU 211 stores the email address ID and the email address data in Email Address Data Storage Area 20666*b*2 (FIG. 399) (S4**).

FIG. 416 illustrates Email Editing Software **20666*c*6*d* (FIG. 404) of Communication Device 200, which opens an email editor (for example, the Outlook Express) wherein the email address data is set as the receiver's address. Referring to the present drawing, CPU 211 (FIG. 1) displays the alphanumeric data with the email address data emphasized (S1). The user of Communication Device 200 selects one of the email address data (for example, click one of the email address data) by utilizing Input Device 210 (FIG. 1) or via voice recognition system (S2). CPU 211 then opens an email editor (for example, the Outlook Express) (S3), and sets the email address data selected in S2 as the receiver's address (S4**).

FIG. 417 illustrates Phone Data Identifying Software **20666*c*7*a* (FIG. 404) of Communication Device 200, which identifies the phone data among the alphanumeric data. Referring to the present drawing, CPU 211 (FIG. 1) retrieves the alphanumeric IDs from Alphanumeric Data Storage Area 20666*b*4 (FIG. 401) and displays the alphanumeric IDs on LCD 201 (FIG. 1) (S1). The user of Communication Device 200 selects one of the alphanumeric IDs (S2). CPU 211 retrieves the corresponding alphanumeric data from Alphanumeric Data Storage Area 20666*b*4 (FIG. 401) and displays the data on LCD 201 (FIG. 1) (S3). CPU 211 stores the alphanumeric data retrieved in S3 in Work Area 20666*b*6**

(FIG. 397) for the phone data identification explained in the next step (S4). CPU 211 scans the alphanumeric data, i.e., applies the phone criteria (for example, numeric data with 'xxx-xxx-xxxx' format) to each alphanumeric data, and identifies the phone data included therein (S5). CPU 211 emphasizes the identified phone data by changing the font color (for example, yellow) and drawing underlines to the identified phone data (S6). CPU 211 displays the alphanumeric data with the identified phone data emphasized on LCD 201 (FIG. 1) thereafter (S7).

FIG. 418 illustrates Phone Data Correcting Software 20666*c*7*b* (FIG. 404) of Communication Device 200, which corrects the misidentified phone data by manually selecting the start point and the end point of the phone data. For example, if the phone data is misidentified as '916-455-' and leaves out the remaining '1293', the user of Communication Device 200 may manually correct the phone data by selecting the start point and the end point of '916-455-1293'. Referring to the present drawing, CPU 211 (FIG. 1) displays the alphanumeric data with phone data emphasized (S1). The user of Communication Device 200 selects the start point of the phone data (S2) and the end point of the phone data by utilizing Input Device 210 (FIG. 1) or via voice recognition system (S3). CPU 211 then identifies the alphanumeric data located between the start point and the end point as phone data (S4), and emphasizes the phone data by changing the font color (for example, yellow) and drawing underlines thereto (S5). The alphanumeric data with the phone data emphasized are displayed on LCD 201 (FIG. 1) thereafter (S6).

FIG. 419 illustrates Phone Data Storing Software 20666*c*7*c* (FIG. 404) of Communication Device 200, which stores the phone data to Phone Data Storage Area 20666*b*3 (FIG. 400). Referring to the present drawing, CPU 211 (FIG. 1) displays the alphanumeric data with the phone data emphasized (S1). The user of Communication Device 200 selects one of the phone data, and CPU 211 emphasizes the data (for example, change to bold font) (S2). The user then inputs the phone ID (the title of the phone data) (S3). CPU 211 stores the phone ID and the phone data in Phone Data Storage Area 20666*b*3 (FIG. 400) (S4).

FIG. 420 illustrates Dialing Software 20666*c*7*d* (FIG. 404) of Communication Device 200, which opens a phone dialer and initiates a dialing process by utilizing the phone data. Referring to the present drawing, CPU 211 (FIG. 1) displays the alphanumeric data with the phone data emphasized (S1). The user of Communication Device 200 selects one of the phone data by utilizing Input Device 210 (FIG. 1) or via voice recognition system (for example, click one of the phone data) (S2). CPU 211 then opens a phone dialer (S3), and inputs the phone data selected in S2 (S4). A dialing process is initiated thereafter.

<<Multiple Mode Implementing Function>>

FIG. 98 through FIG. 103 illustrate the multiple mode implementing function of Communication Device 200 which enables to activate and implement a plurality of modes, functions, and/or systems described in this specification simultaneously.

Figure 98:
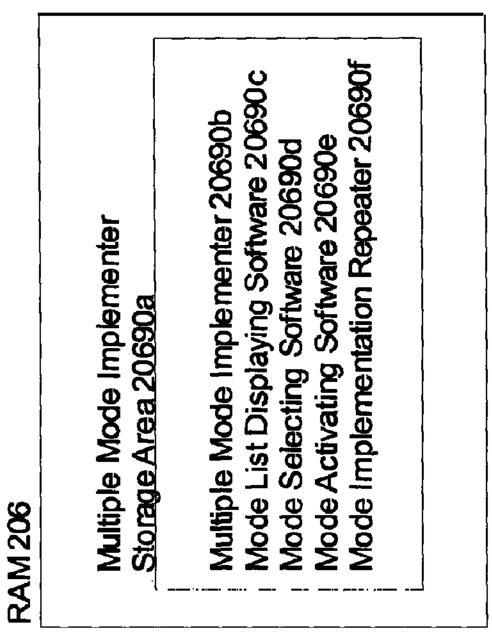
FIG. 98 is a block diagram illustrating an exemplary embodiment of the present invention.

FIG. 98 illustrates the software programs stored in RAM 206 (FIG. 1) to implement the multiple mode implementing function (FIG. 1). As described in FIG. 98, RAM 206 includes Multiple Mode Implementer Storage Area 20690*a*. Multiple Mode Implementer Storage Area 20690*a* stores Multiple Mode Implementer 20690*b*, Mode List Displaying Software 20690*c*, Mode Selecting Software 20690*d*, Mode Activating Software 20690*e*, and Mode Implementation Repeater 20690*f*, all of which are software programs. Multiple Mode Implementer 20690*b* administers the overall implementation of the present function. One of the major tasks of Multiple Mode Implementer 20690*b* is to administer and control the timing and sequence of Mode List Displaying Software 20690*c*, Mode Selecting Software 20690*d*, Mode Activating Software 20690*e*, and Mode Implementation Repeater 20690*f*. For example, Multiple Mode Implementer 20690*b* executes them in the following order: Mode List Displaying Software 20690*c*, Mode Selecting Software 20690*d*, Mode Activating Software 20690*e*, and Mode Implementation Repeater 20690*f*. Mode List Displaying Software 20690*c* displays on LCD 201 (FIG. 1) a list of a certain amount or all modes, functions, and/or systems explained in this specification of which the sequence is explained in FIG. 99. Mode Selecting Software 20690*d* selects a certain amount or all modes, functions, and/or systems explained in this specification of which the sequence is explained in FIG. 100. Mode Activating Software 20690*e* activates a certain amount or all modes, functions, and/or systems selected by the Mode Selecting Software 20690*d* of which the sequence is explained in FIG. 101. Mode Implementation Repeater 20690*f* executes Multiple Mode Implementer 20690*b* which reactivates Mode List Displaying Software 20690*c*, Mode Selecting Software 20690*d*, Mode Activating Software 20690*e* of which the sequence is explained in FIG. 102.

Figure 99:
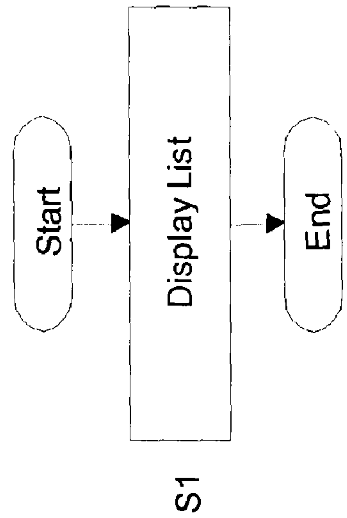
FIG. 99 is a flowchart illustrating an exemplary embodiment of the present invention.

FIG. 99 illustrates the sequence of Mode List Displaying Software 20690*c* (FIG. 98). Referring to FIG. 99, CPU 211 (FIG. 1), under the command of Mode List Displaying Software 20690*c*, displays a list of a certain amount or all modes, functions, and/or systems described in this specification on LCD 201 (FIG. 1).

Figure 100:
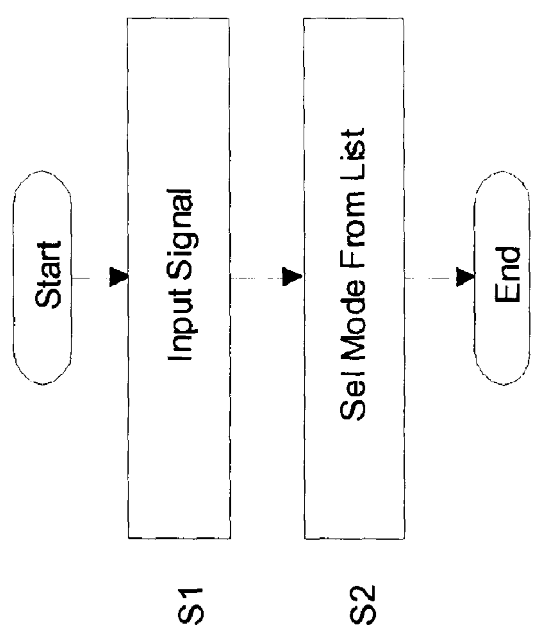
FIG. 100 is a flowchart illustrating an exemplary embodiment of the present invention.

FIG. 100 illustrates the sequence of Mode Selecting Software 20690*d* (FIG. 98). Referring to FIG. 100, the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690*d*, interprets the input signal and selects the corresponding mode, function, or system (S2).

Figure 101:
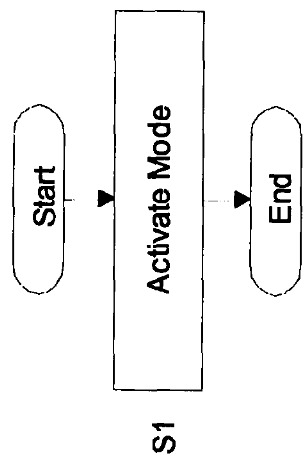
FIG. 101 is a flowchart illustrating an exemplary embodiment of the present invention.

FIG. 101 illustrates the sequence of Mode Activating Software 20690*e* (FIG. 98). Referring to FIG. 101, CPU 211 (FIG. 1), under the command of Mode Activating Software 20690*e*, activates the mode, function, or, system selected in S2 of FIG. 100. CPU 211 thereafter implements the activated mode, function, or system as described in the relevant drawings in this specification.

Figure 102:
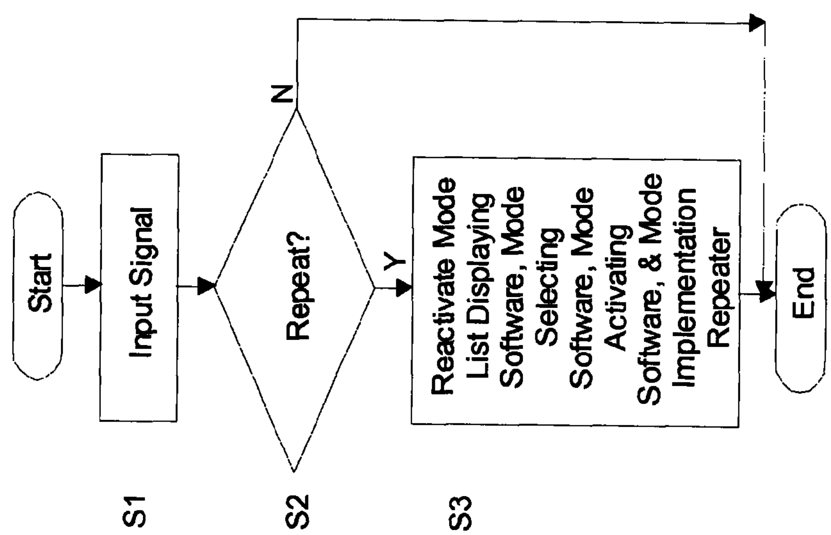
FIG. 102 is a flowchart illustrating an exemplary embodiment of the present invention.

FIG. 102 illustrates the sequence of Mode Implementation Repeater 20690*f* (FIG. 98). Referring to FIG. 102, the user of Communication Device 200 inputs an input signal by utilizing Input Device 210 (FIG. 1) or via voice recognition system (S1). Once the activation of the selected mode, function, or system described in FIG. 101 hereinbefore is completed, and if the input signal indicates to repeat the process to activate another mode, function, or system (S2), CPU 211 (FIG. 1), under the command of Mode Implementation Repeater 20690*f*, executes Multiple Mode Implementer 20690*b* (FIG. 98), which reactivates Mode List Displaying Software 20690*c* (FIG. 98), Mode Selecting Software 20690*d* (FIG. 98), and Mode Activating Software 20690*e* (FIG. 98) to activate the second mode, function, or system while the first mode, function, or system is implemented by utilizing the method of so-called 'time sharing' (S3). Mode List Displaying Software 20690*c*, Mode Selecting Software 20690*d*, and Mode Activating Software 20690*e* can be repeatedly executed until all modes, function, and systems displayed on LCD 201 (FIG. 1) are selected and activated. The activation of modes, functions, and/or systems is not repeated if the input signal explained in S2 so indicates.

Figure 103:
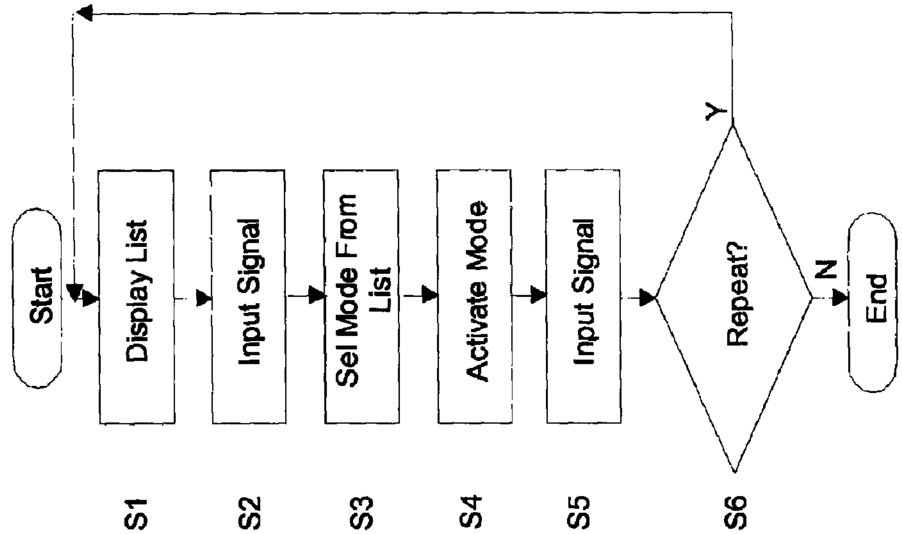
FIG. 103 is a flowchart illustrating an exemplary embodiment of the present invention.

As another embodiment, Multiple Mode Implementer 20690*b*, Mode List Displaying Software 20690*c*, Mode Selecting Software 20690*d*, Mode Activating Software 20690*e*, and Mode Implementation Repeater 20690*f* described in FIG. 98 may be integrated into one software program, Multiple Mode Implementer 20690*b*, as described in FIG. 103. Referring to FIG. 103, CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant drawings in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. The examples of Multiple Mode Implementer 20690*b* of the second embodiment are described in FIG. 167, FIG. 175, FIG. 196, FIG. 202, FIG. 171, FIG. 231*a*, FIG. 236, FIG. 514, FIG. 532, FIG. 55, FIG. 59, and FIG. 63. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

<<Multiple Software Download Function>>

FIG. 104 through FIG. 110 illustrate the multiple software download function which enables Communication Device 200 to download a plurality of software programs simultaneously. All software programs, data, any types of information to implement all modes, functions, and systems described in this specification are stored in a host or server from which Communication Device 200 can download.

Figure 104:
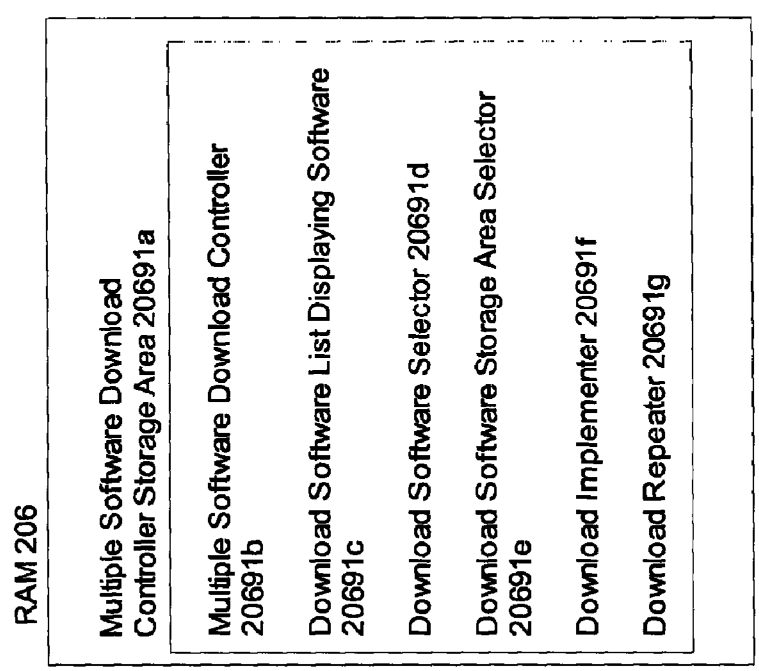
FIG. 104 is a block diagram illustrating an exemplary embodiment of the present invention.

FIG. 104 illustrates the software programs stored in RAM 206 (FIG. 1). As described in FIG. 104, RAM 206 includes Multiple Software Download Controller Storage Area 20691*a*. Multiple Software Download Controller Storage Area 20691*a* includes Multiple Software Download Controller 20691*b*, Download Software List Displaying Software 20691*c*, Download Software Selector 20691*d*, Download Software Storage Area Selector 20691*e*, Download Implementer 20691*f*, and Download Repeater 20691*g*. Multiple Software Download Controller 20691*b* administers the overall implementation of the present function. One of the major tasks of Multiple Software Download Controller 20691*b* is to administer and control the timing and sequence of Download Software List Displaying Software 20691*c*, Download Software Selector 20691*d*, Download Software Storage Area Selector 20691*e*, Download Implementer 20691*f*, and Download Repeater 20691*g*. For example, Multiple Software Download Controller 20691*b* executes them in the following order: Download Software List Displaying Software 20691*c*, Download Software Selector 20691*d*, Download Software Storage Area Selector 20691*e*, Download Implementer 20691*f*, and Download Repeater 20691*g*. Download Software List Displaying Software 20691*c* displays on LCD 201 (FIG. 1) a list of a certain amount or all software programs necessary to implement the modes, functions, and/or systems explained in this specification of which the sequence is explained in FIG. 105 hereinafter. Download Software Selector 20691*d* selects one of the software programs displayed on LCD 201 of which the sequence is explained in FIG. 106 hereinafter. Download Software Storage Area Selector 20691*e* selects the storage area in RAM 206 where the downloaded software program is stored of which the sequence is explained in FIG. 107 hereinafter. Download Implementer 20691*f* implements the download process of the software program selected by Download Software Selector 20691*d* hereinbefore and stores the software program in the storage area selected by Download Software Storage Area Selector 20691*e* hereinbefore of which the sequence is explained in FIG. 108 hereinafter. Download Repeater 20691*g* executes Multiple Software Download Controller 20691*b* which reactivates Download Software List Displaying Software 20691*c*, Download Software Selector 20691*d*, Download Software Storage Area Selector 20691*e*, and Download Implementer 20691*f* of which the sequence is explained in FIG. 108 hereinafter.

Figure 105:
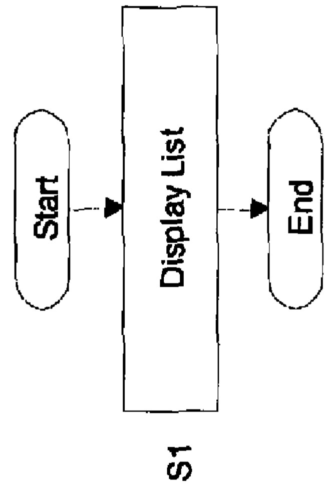
FIG. 105 is a flowchart illustrating an exemplary embodiment of the present invention.

FIG. 105 illustrates the sequence of Download Software List Displaying Software 20691*c* (FIG. 104). Referring to FIG. 105, CPU 211 (FIG. 1), under the command of Download Software List Displaying Software 20691*c*, displays a list of a certain amount or all software programs to implement all modes, functions, and systems described in this specification on LCD 201 (FIG. 1).

Figure 106:
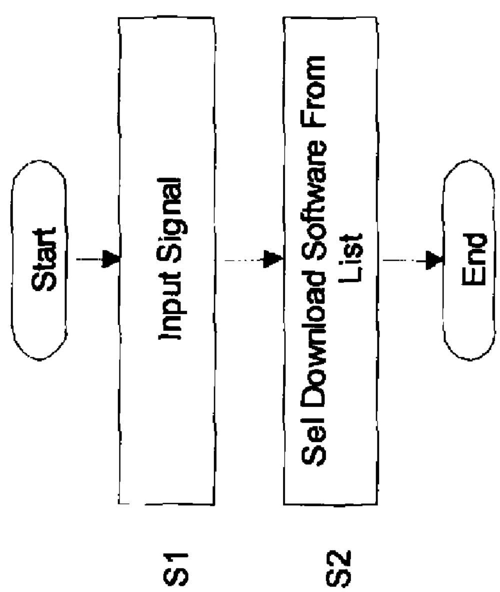
FIG. 106 is a flowchart illustrating an exemplary embodiment of the present invention.

FIG. 106 illustrates the sequence of Download Software Selector 20691*d* (FIG. 104). Referring to FIG. 106, the user of Communication Device 200 inputs an input signal by utilizing Input Device 210 (FIG. 1) or via voice recognition system identifying one of the software programs displayed on LCD 201 (FIG. 1) (S1), and CPU 211, under the command of Download Software Selector 20691*d*, interprets the input signal and selects the corresponding software program (S2).

Figure 107:
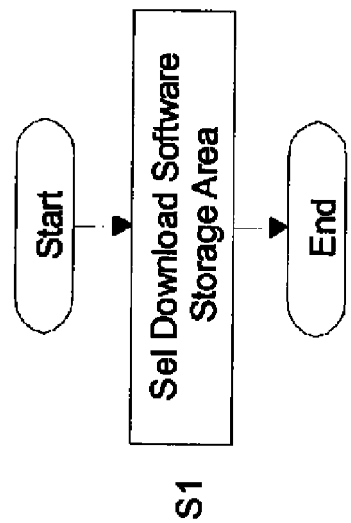
FIG. 107 is a flowchart illustrating an exemplary embodiment of the present invention.

FIG. 107 illustrates the sequence of Download Software Storage Area Selector 20691*e* (FIG. 104). Referring to FIG. 107, CPU 211 (FIG. 1), under the command of Download Software Storage Area Selector 20691*e*, selects a specific storage area in RAM 206 (FIG. 1) where the downloaded software program is to be stored. The selection of the specific storage area in RAM 206 may be done automatically by CPU 211 or manually by the user of Communication Device 200 by utilizing Input Device 210 (FIG. 1) or via voice recognition system.

Figure 108:
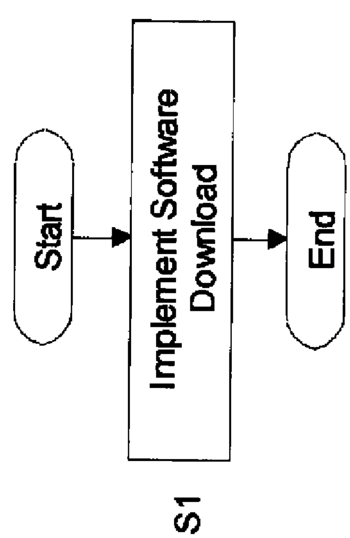
FIG. 108 is a flowchart illustrating an exemplary embodiment of the present invention.

FIG. 108 illustrates the sequence of Download Implementer 20691*f* (FIG. 104). Referring to FIG. 108, CPU 211

(FIG. 1), under the command of Download Implementer 20691*f*, implements the download process of the software program selected by Download Software Selector 20691*d* (FIG. 106) and stores the software program in the storage area selected by Download Software Storage Area Selector 20691*e* (FIG. 107).

Figure 109:
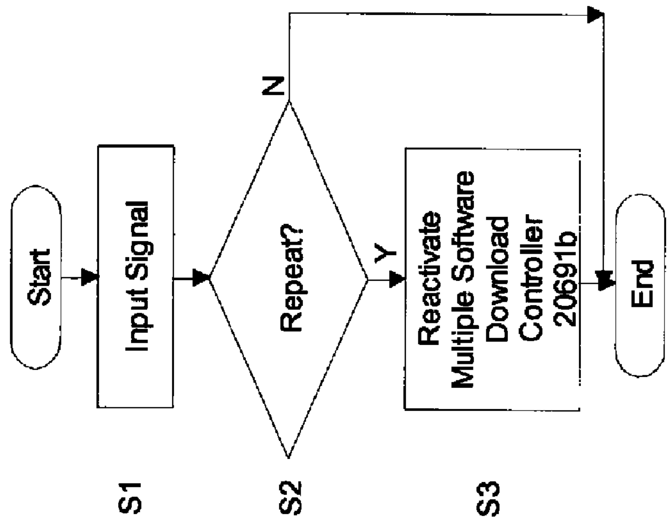
FIG. 109 is a flowchart illustrating an exemplary embodiment of the present invention.

FIG. 109 illustrates the sequence of Download Repeater 20691*g* (FIG. 104). Referring to FIG. 109, the user of Communication Device 200 inputs an input signal by utilizing Input Device 210 (FIG. 1) or via voice recognition system when the downloading process of the software program is completed (S1). If the input signal indicates to repeat the process to download another software program, CPU 211 (FIG. 1), under the command of Download Repeater 20691*g*, executes Multiple Software Download Controller 20691*b* (FIG. 104), which reactivates Download Software List Displaying Software 20691*c* (FIG. 104), Download Software Selector 20691*d* (FIG. 104), Download Software Storage Area Selector 20691*e* (FIG. 104), and Download Implementer 20691*f* (FIG. 104) to download the second software program while the downloading process of the first software program is still in progress by utilizing the method so-called 'time sharing' (S3). Download Software List Displaying Software 20691*c*, Download Software Selector 20691*d*, Download Software Storage Area Selector 20691*e*, and Download Implementer 20691*f* can be repeatedly executed until all software programs displayed on LCD 201 (FIG. 1) are selected and downloaded. The downloading process is not repeated if the input signal explained in S2 so indicates.

Figure 110:
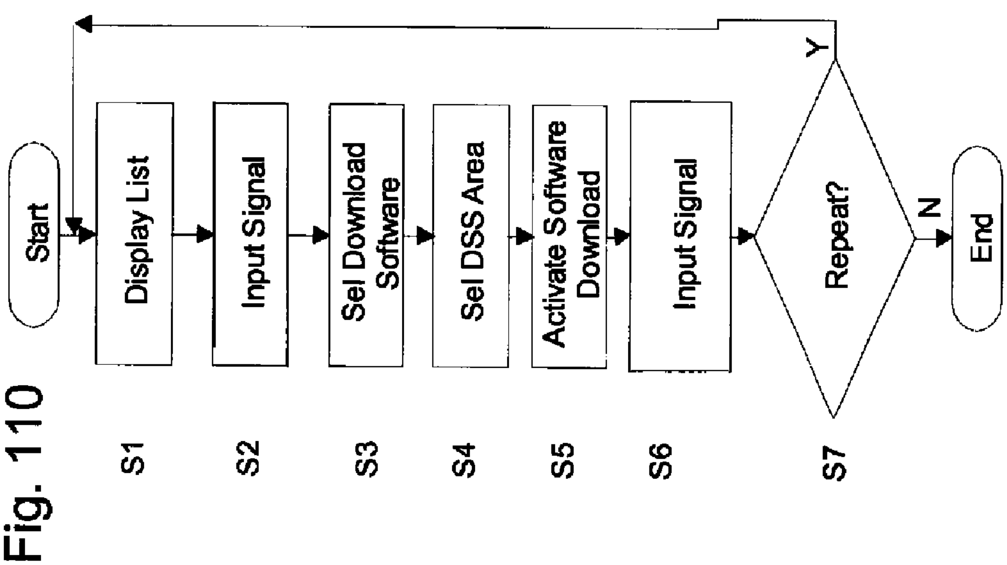
FIG. 110 is a flowchart illustrating an exemplary embodiment of the present invention.

As another embodiment, as described in FIG. 110, Multiple Software Download Controller 20691*b*, Download Software List Displaying Software 20691*c*, Download Software Selector 20691*d*, Download Software Storage Area Selector 20691*e*, Download Implementer 20691*f*, and Download Repeater 20691*g* may be integrated into a single software program, Multiple Software Download Controller 20691*b*. First of all, CPU 211 (FIG. 1) displays a list of all software programs downloadable from a host or server on LCD 201 (FIG. 1) (S1). The user of Communication Device 200 inputs an input signal by utilizing Input Device 210 (FIG. 1) or via voice recognition system identifying one of the software programs displayed on LCD 201 (S2), and CPU 211 interprets the input signal and selects the corresponding software program (S3) and selects the storage area in RAM 206 (FIG. 1) where the downloaded software program is to be stored (S4). The selection of the specific storage area in RAM 206 may be done automatically by CPU 211 or manually by the user of Communication Device 200 by utilizing Input Device 210 (FIG. 1) or via voice recognition system. CPU 211 then implements the download process of the software program selected in S3 and stores the software program in the storage area selected in S4 (S5). The user of Communication Device 200 inputs an input signal by utilizing Input Device 210 or via voice recognition system when the activation of downloading process of the software program described in S5 is completed (S6). If the input signal indicates to repeat the process to download another software program, CPU 211 repeats the steps of S1 through S5 to download the second software program while the downloading process of the first software program is still in progress by utilizing the method so-called 'time sharing' (S7). The steps of S1 through S5 can be repeated until all software programs displayed on LCD 201 are selected and downloaded. The downloading process is not repeated if the input signal explained in S6 so indicates.

For the avoidance of doubt, FIG. 104 through FIG. 110 are also applicable to download data and any types of information other than software programs.

INCORPORATION BY REFERENCE

The following paragraphs and drawings described in U.S. Ser. No. 10/710,600, filed 2004-07-23, are incorporated to this application by reference: the preamble described in paragraph [1806] (no drawings); Communication Device 200 (Voice Communication Mode) described in paragraphs [1807] through [1812] (FIGS. 1 through 2c); Voice Recognition System described in paragraphs [1813] through [1845] (FIGS. 3 through 19); Positioning System described in paragraphs [1846] through [1877] (FIGS. 20a through 32e); Auto Backup System described in paragraphs [1878] through [1887] (FIGS. 33 through 37); Signal Amplifier described in paragraphs [1888] through [1893] (FIG. 38); Audio/Video Data Capturing System described in paragraphs [1894] through [1906] (FIGS. 39 through 44b); Digital Mirror Function (1) described in paragraphs [1907] through [1915] (FIGS. 44c through 44e); Caller ID System described in paragraphs [1916] through [1923] (FIGS. 45 through 47); Stock Purchasing Function described in paragraphs [1924] through [1933] (FIGS. 48 through 52); Timer Email Function described in paragraphs [1934] through [1940] (FIGS. 53a and 53b); Call Blocking Function described in paragraphs [1941] through [1954] (FIGS. 54 through 59); Online Payment Function described in paragraphs [1955] through [1964] (FIGS. 60 through 64); Navigation System described in paragraphs [1965] through [1987] (FIGS. 65 through 74a); Remote Controlling System described in paragraphs [1988] through [2006] (FIGS. 75 through 85); Auto Emergency Calling System described in paragraphs [2007] through [2015] (FIGS. 86 and 87); Cellular TV Function described in paragraphs [2016] through [2100] (FIGS. 88 through 135); 3D Video Game Function described in paragraphs [2101] through [2113] (FIGS. 136 through 144); Digital Mirror Function (2) described in paragraphs [2114] through [2123] (FIGS. 145 through 155); Voice Recognition Sys—E-mail (2) described in paragraphs [2124] through [2132] (FIGS. 156 through 160); Positioning System—GPS Search Engine described in paragraphs [2133] through [2175] (FIGS. 161 through 182); Mobile Ignition Key Function described in paragraphs [2176] through [2198] (FIGS. 183 through 201); Voice Print Authentication System described in paragraphs [2199] through [2209] (FIGS. 202 through 211); Fingerprint Authentication System described in paragraphs [2210] through [2222] (FIGS. 212 through 221); Auto Time Adjust Function described in paragraphs [2223] through [2227] (FIGS. 222 through 224); Video/Photo Mode described in paragraphs [2228] through [2256] (FIGS. 225 through 242); Call Taxi Function described in paragraphs [2257] through [2297] (FIGS. 243 through 269); Shooting Video Game Function described in paragraphs [2298] through [2314] (FIGS. 270 through 283); Driving Video Game Function described in paragraphs [2315] through [2328] (FIGS. 284 through 294); Address Book Updating Function described in paragraphs [2329] through [2349] (FIGS. 295 through 312); Batch Address Book Updating Function—With Host described in paragraphs [2350] through [2371] (FIGS. 313 through 329); Batch Address Book Updating Function—Peer-To-Peer Connection described in paragraphs [2372] through [2376] (FIGS. 329a through 329c); Batch Scheduler Updating Function—With Host described in paragraphs [2377] through [2400] (FIGS. 330 through 350); Batch Scheduler Updating Function—Peer-To-Peer Connection described in paragraphs [2401] through [2405] (FIGS. 351 and 352); Calculator Function described in paragraphs [2406] through [2411] (FIGS. 353 through 356); Spreadsheet Function described in paragraphs [2412] through [2419] (FIGS. 357 through 360); Word Processing Function described in paragraphs [2420] through [2435] (FIGS. 361 through 373); TV Remote Controller Function described in paragraphs [2436] through [2458] (FIGS. 374 through 394); CD/PC Inter-communicating Function described in paragraphs [2459] through [2483] (FIGS. 413 through 427); PDWR Sound Selecting Function described in paragraphs [2484] through [2520] (FIGS. 428 through 456); Start Up Software Function described in paragraphs [2521] through [2537] (FIGS. 457 through 466); Another Embodiment Of Communication Device 200 described in paragraphs [2538] through [2542] (FIGS. 467a through 467d); Stereo Audio Data Output Function described in paragraphs [2543] through [2562] (FIGS. 468 through 479); Stereo Visual Data Output Function described in paragraphs [2563] through [2582] (FIGS. 480 through 491); Multiple Signal Processing Function described in paragraphs [2583] through [2655] (FIGS. 492 through 529); Positioning System—Pin-pointing Function described in paragraphs [2656] through [2689] (FIGS. 530 through 553); Artificial Satellite Host described in paragraphs [2690] through [2708] (FIGS. 554 through 567); CCD Bar Code Reader Function described in paragraphs [2709] through [2730] (FIGS. 568 through 579); Online Renting Function described in paragraphs [2731] through [2808] (FIGS. 580 through 633); SOS Calling Function described in paragraphs [2809] through [2829] (FIGS. 634 through 645); Input Device described in paragraphs [2830] through [2835] (FIGS. 646 through 650); PC Remote Controlling Function described in paragraphs [2836] through [2871] (FIGS. 651 through 670); PC Remote Downloading Function described in paragraphs [2872] through [2921] (FIGS. 671 through 701); Audiovisual Playback Function described in paragraphs [2922] through [2947] (FIGS. 702 through 716); Audio Playback Function described in paragraphs [2948] through [2972] (FIGS. 717 through 731); Ticket Purchasing Function described in paragraphs [2973] through [3002] (FIGS. 732 through 753); Remote Data Erasing Function described in paragraphs [3003] through [3032] (FIGS. 754 through 774); Business Card Function described in paragraphs [3033] through [3049] (FIGS. 775 through 783); Game Vibrating Function described in paragraphs [3050] through [3060] (FIGS. 784 through 786); Part-time Job Finding Function described in paragraphs [3061] through [3081] (FIGS. 787 through 801); Parking Lot Finding Function described in paragraphs [3082] through [3121] (FIGS. 802 through 832); Parts Upgradable Communication Device described in paragraphs [3122] through [3147] (FIGS. 833a through 833×); On Demand TV Function described in paragraphs [3148] through [3178] (FIGS. 834 through 855); Inter-communicating TV Function described in paragraphs [3179] through [3213] (FIGS. 856 through 882); Display Controlling Function described in paragraphs [3214] through [3231] (FIGS. 883 through 894); Multiple Party Communicating Function described in paragraphs [3232] through [3265] (FIGS. 894a through 917); Display Brightness Controlling Function described in paragraphs [3266] through [3275] (FIGS. 918 through 923); Multiple Party Pin-pointing Function described in paragraphs [3276] through [3323] (FIGS. 924 through 950f); Digital Camera Function described in paragraphs [3324] through [3351] (FIGS. 951 through 968); Phone Number Linking Function described in paragraphs [3352] through [3375] (FIGS. 968a through 983); Multiple Window Displaying Function described in paragraphs [3376] through [3394] (FIGS. 984 through 995); Mouse Pointer Displaying Function described in paragraphs [3395] through [3432] (FIGS. 996 through 1021); House Item Pin-pointing Function described in paragraphs [3433] through [3592] (FIGS. 1022 through 1152); Membership Administrating Function described in paragraphs [3593] through [3635] (FIGS. 1153 through 1188); Keyword Search Timer Recording Function described in paragraphs [3636] through [3727] (FIGS. 1189 through 1254); Weather Forecast Displaying Function described in paragraphs [3728] through [3769] (FIGS. 1255 through 1288); Multiple Language Displaying Function described in paragraphs [3770] through [3827] (FIGS. 1289 through 1331); Caller's Information Displaying Function described in paragraphs [3828] through [3880] (FIGS. 1332 through 1375); Communication Device Remote Controlling Function (By Phone) described in paragraphs [3881] through [3921] (FIGS. 1394 through 1415); Communication Device Remote Controlling Function (By Web) described in paragraphs [3922] through [3962] (FIGS. 1416 through 1437); Shortcut Icon Displaying Function described in paragraphs [3963] through [3990] (FIGS. 1438 through 1455); Task Tray Icon Displaying Function described in paragraphs [3991] through [4013] (FIGS. 1456 through 1470); Multiple Channel Processing Function described in paragraphs [4014] through [4061] (FIGS. 1471 through 1498); Solar Battery Charging Function described in paragraphs [4062] through [4075] (FIGS. 1499 through 1509); OS Updating Function described in paragraphs [4076] through [4143] (FIGS. 1510 through 1575); Device Managing Function described in paragraphs [4144] through [4161] (FIGS. 1576 through 1587); Automobile Controlling Function described in paragraphs [4162] through [4210] (FIGS. 1588 through 1627); OCR Function described in paragraphs [4211] through [4246] (FIGS. 1628 through 1652); Multiple Mode Implementing Function described in paragraphs [4248] through [4255] (FIGS. 395 through 400); Multiple Software Download Function described in paragraphs [4256] through [4265] (FIGS. 401 through 407); Selected Software Distributing Function described in paragraphs [4266] through [4285] (FIGS. 1376 through 1393d); Multiple Software Download And Mode Implementation Function described in paragraphs [4286] through [4293] (FIGS. 408 through 412); and the last sentence described in paragraph [4295] (no drawings).

<<Other Functions>>

Communication Device 200 is also capable to implement the following functions, modes, and systems: a voice communication function which transfers a 1st voice data input from the microphone via the wireless communication system and outputs a 2nd voice data received via the wireless communication system from the speaker; a voice recognition system which retrieves alphanumeric information from the user's voice input via the microphone; a voice recognition system which retrieves alphanumeric information from the user's voice input via the microphone, and a voice recognition refraining system which refrains from implementing the voice recognition system while a voice communication is implemented by the communication device; a tag function and a phone number data storage area, the phone number data storage area includes a plurality of phone numbers, a voice tag is linked to each of the plurality of phone number, when a voice tag is detected in the voice data retrieved via the microphone, the corresponding phone number is retrieved from the phone number data storage area; a voice recognition noise filtering mode, wherein a background noise is identified, a filtered voice data is produced by removing the background noise from the voice data input via the microphone, and the communication device is operated by the filtered voice data; a sound/beep auto off function wherein the communication device refrains from outputting a sound data stored in a sound data storage area while a voice recognition system is implemented; a voice recognition system auto off implementor, wherein the voice recognition system auto off implementor identifies the lapsed time since a voice recognition system is activated and deactivates the voice recognition system after a certain period of time has lapsed; a voice recognition email function which produces a voice produced email which is an email produced by alphanumeric information retrieved from the user's voice input via the microphone, and the voice produced email is stored in the data storage area; a voice communication text converting function, wherein a 1st voice data which indicates the voice data of the caller and a 2nd voice data which indicates the voice data of the callee are retrieved, and the 1st voice data and the 2nd voice data are converted to a 1st text data and a 2nd text data respectively, which are displayed on the display; a target device location indicating function, wherein a target device location data identifying request is transferred to a host computing system in a wireless fashion, a map data and a target device location data is received from the host computing system in a wireless fashion, and the map data with the location corresponding to the target device location data indicated thereon is displayed on the display; an auto backup function, wherein the data identified by the user is automatically retrieved from a data storage area and transferred to another computing system in a wireless fashion periodically for purposes of storing a backup data therein; an audio/video data capturing system which stores an audiovisual data retrieved via the microphone and a camera installed in the communication device in the data storage area, retrieves the audiovisual data from the data storage area, and sends the audiovisual data to another device in a wireless fashion; a digital mirror function which displays an inverted visual data of the visual data input via a camera of the communication device on the display; a caller ID function which retrieves a predetermined color data and/or sound data which is specific to the caller of the incoming call received by the communication device from the data storage area and outputs the predetermined color data and/or sound data from the communication device; a stock purchase function which outputs a notice signal from the communication device when the communication device receives a notice data wherein the notice data is produced by a computing system and sent to the communication device when a stock price of a predetermined stock brand meets a predetermined criteria; a timer email function which sends an email data stored in the data storage area to a predetermined email address at the time indicated by an email data sending time data stored in the data storage area; a call blocking function which blocks the incoming call if the identification thereof is included in a call blocking list; an online payment function which sends a payment data indicating a certain amount of currency to a certain computing system in a wireless fashion in order for the certain computing system to deduct the amount indicated by the payment data from a certain account stored in the certain computing system; a navigation system which produces a map indicating the shortest route from a first location to a second location by referring to an attribution data; a remote controlling system which sends a 1st remote control signal in a wireless fashion by which a 1st device is controlled via a network, a 2nd remote control signal in a wireless fashion by which a 2nd device is controlled via a network, and a 3rd remote control signal in a wireless fashion by which a 3rd device is controlled via a network; an auto emergency calling system wherein the communication device transfers an emergency signal to a certain computing system when an impact of a certain level is detected in a predetermined automobile; a cellular TV function which receives a TV data, which is a series of digital data indicating a TV program, via the wireless communication system in a wireless fashion and outputs the TV data from the communication device; a 3D video game function which retrieves a 3D video game object, which is controllable by a video game object controlling command input via the input device, from the data storage area and display the 3D video game object on the display; a GPS search engine function, wherein a specific criteria is selected by the input device and one or more of geographic locations corresponding to the specific criteria are indicated on the display; a mobile ignition key function which sends a mobile ignition key signal via the wireless communication system in a wireless fashion in order to ignite an engine of an automobile; a voice print authentication system which implements authentication process by utilizing voice data of the user of the communication device; a fingerprint authentication system which implements authentication process by utilizing fingerprint data of the user of the communication device; an auto time adjusting function which automatically adjusts the clock of the communication device by referring to a wireless signal received by the wireless communication system; a video/photo function which implements a video mode and a photo mode, wherein the video/photo function displays moving image data under the video mode and the video/photo function displays still image data under the photo mode on the display; a taxi calling function, wherein a 1st location which indicates the geographic location of the communication device is identified, a 2nd location which indicates the geographic location of the taxi closest to the 1st location is identified, and the 1st location and the 2nd location are indicated on the display; a 3D shooting video game function, wherein the input device utilized for purposes of implementing a voice communication mode is configured as an input means for performing a 3D shooting video game, a user controlled 3D game object which is the three-dimensional game object controlled by the user and a CPU controlled 3D game object which is the three-dimensional game object controlled by the CPU of the communication device are displayed on the display, the CPU controlled 3D game object is programmed to attack the user controlled 3D game object, and a user fired bullet object which indicates a bullet fired by the user controlled 3D game object is displayed on the display when a bullet firing command is input via the input device; a 3D driving video game function, wherein the input device utilized for purposes of implementing a voice communication mode is configured as an input means for performing a 3D driving video game, a user controlled 3D automobile which is the three-dimensional game object indicating an automobile controlled by the user and a CPU controlled 3D automobile which is the three-dimensional game object indicating another automobile controlled by the CPU of the communication device are displayed on the display, the CPU controlled 3D automobile is programmed to compete with the user controlled 3D automobile, and the user controlled 3D automobile is controlled by a user controlled 3D automobile controlling command input via the input device; an address book updating function which updates the address book stored in the communication device by personal computer via network; a batch address book updating function which updates all address books of a plurality of devices including the communication device in one action; a batch scheduler updating function which updates all schedulers of a plurality of devices including the communication device in one action; a calculating function which implements mathematical calculation by utilizing digits input via the input device; a spreadsheet function which displays a spreadsheet on the display, wherein the spreadsheet includes a plurality of cells which are aligned in a matrix fashion; a word processing function which implements a bold formatting function, an italic formatting function, and/or a font formatting function, wherein the bold formatting function changes alphanumeric data to bold, the italic formatting function changes alphanumeric data to italic, and the font formatting function changes alphanumeric data to a selected font; a TV remote controlling function wherein a TV control signal is transferred via the wireless communication system, the TV control signal is a wireless signal to control a TV tuner; a CD/PC inter-communicating function which retrieves the data stored in a data storage area and transfers the data directly to another computer by utilizing infra-red signal in a wireless fashion; a pre-dialing/dialing/waiting sound selecting function, wherein a selected pre-dialing sound which is one of the plurality of pre-dialing sound is registered, a selected dialing sound which is one of the plurality of dialing sound is registered, and a selected waiting sound which is one of the plurality of waiting sound is registered by the user of the communication device, and during the process of implementing a voice communication mode, the selected pre-dialing sound is output from the speaker before a dialing process is initiated, the selected dialing sound is output from the speaker during the dialing process is initiated, and the selected waiting sound is output from the speaker after the dialing process is completed; a startup software function, wherein a startup software identification data storage area stores a startup software identification data which is an identification of a certain software program selected by the user, when the power of the communication device is turned on, the startup software function retrieves the startup software identification data from the startup software identification data storage area and activates the certain software program; the display includes a 1st display and a 2nd display which display visual data in a stereo fashion, the microphone includes a 1st microphone and a 2nd microphone which input audio data in a stereo fashion, and the communication device further comprises a vibrator which vibrates the communication device, an infra-red transmitting device which transmits infra-red signals, a flash light unit which emits strobe light, a removable memory which stores a plurality of digital data and removable from the communication device, and a photometer which a sensor to detect light intensity; a stereo audio data output function which enables the communication device to output audio data in a stereo fashion; a stereo visual data output function, wherein a left visual data storage area stores a left visual data, a right visual data storage area stores a right visual data, stereo visual data output function retrieves the left visual data from the left visual data storage area and displays on a left display and retrieves the right visual data from the right visual data storage area and displays on a right display; a multiple signal processing function, wherein the communication implements wireless communication under a 1st mode and a 2nd mode, the wireless communication is implemented by utilizing cdma2000 signal under the 1st mode, and the wireless communication is implemented by utilizing W-CDMA signal under the 2nd mode; a pin-pointing function, wherein a plurality of in-door access points are installed in an artificial structure, a target device location data which indicates the current geographic location of another device is identified by the geographical relation between the plurality of in-door access points and the another device, and the target device location data is indicated on the display; a CCD bar code reader function, wherein a bar code data storage area stores a plurality of bar code data, each of the plurality of bar code data corresponds to a specific alphanumeric data, the CCD bar code reader function identifies the bar code data corresponding to a bar code retrieved via a camera and identifies and displays the alphanumeric data corresponding to the identified bar code data; an online renting function which enables the user of communication device to download from another computing system and rent digital information for a certain period of time; an SOS calling function, wherein when a specific call is made from the communication device, the SOS calling function retrieves a current geographic location data from a current geographic location data storage area and retrieves a personal information data from a personal information data storage area and transfers the current geographic location data and the personal information data to a specific device in a wireless fashion; a PC remote controlling function, wherein an image data is produced by a personal computer, the image data is displayed on the personal computer, the image data is transferred to the communication device, the image data is received via the wireless communication system in a wireless fashion and stored in a data storage area, the image data is retrieved from the data storage area and displayed on the display, a remote control signal input via the input device is transferred to the personal computer via the wireless communication system in a wireless fashion, and the personal computer is controlled in accordance with the remote control signal; a PC remote downloading function, wherein the communication device sends a data transferring instruction signal to a 1st computer via the wireless communication system in a wireless fashion, wherein the data transferring instruction signal indicates an instruction to the 1st computer to transfer a specific data stored therein to a 2nd computer; an audiovisual playback function, wherein an audiovisual data storage area stores a plurality of audiovisual data, an audiovisual data is selected from the audiovisual data storage area, the audiovisual playback function replays the audiovisual data if a replaying command is input via the input device, the audiovisual playback function pauses to replay the audiovisual data if a replay pausing command is input via the input device, the audiovisual playback function resumes to replay the audiovisual data if a replay resuming command is input via the input device, the audiovisual playback function terminates to replay the audiovisual data if a replay terminating command is input via the input device, the audiovisual playback function fast-forwards to replay the audiovisual data if a replay fast-forwarding command is input via the input device, and the audiovisual playback function fast-rewinds to replay the audiovisual data if a replay fast-rewinding command is input via the input device; an audio playback function which enables the communication device to playback audio data selected by the user of the communication device; a ticket purchasing function which enables the communication device to purchase tickets in a wireless fashion; a remote data erasing function, wherein a data storage area stores a plurality of data, the remote data erasing function deletes a portion or all data stored in the data storage area in accordance with a data erasing command received from another computer via the wireless communication system in a wireless fashion, the data erasing command identifies the data to be erased selected by the user; a business card function which retrieves a 1st business card data indicating the name, title, phone number, email address, and office address of the user of the communication device from the data storage area and sends via the wireless communication system in a wireless fashion and receives a 2nd business card data indicating the name, title, phone number, email address, and office address of the user of another device via the wireless communication system in a wireless fashion and stores the 2nd business card data in the data storage area; a game vibrating function which activates a vibrator of the communication device when a 1st game object contacts a 2nd game object displayed on the display; a part-timer finding function which enables the user of the communication device to find a part-time job in a specified manner by utilizing the communication device; a parking lot finding function which enables the communication device to display the closest parking lot with vacant spaces on the display with the best route thereto; an on demand TV function which enables the communication device to display TV program on the display in accordance with the user's demand; an inter-communicating TV function which enables the communication device to send answer data to host computing system at which the answer data from a plurality of communication devices including the communication device are counted and the counting data is produced; a display controlling function which enables the communication device to control the brightness and/or the contrast of the display per file opened or software program executed; a multiple party communicating function which enables the user of the communication device to voice communicate with more than one person via the communication device; a display brightness controlling function which controls the brightness of the display in accordance with the brightness detected by a photometer of the surrounding area of the user of the communication device; a multiple party pin-pointing function which enables the communication device to display the current locations of a plurality of devices in artificial structure; a digital camera function, wherein a photo quality identifying command is input via the input device, when a photo taking command is input via the input device, a photo data retrieved via a camera is stored in a photo data storage area with the quality indicated by the photo quality identifying command; a phone number linking function which displays a phone number link and dials a phone number indicated by the phone number link when the phone number link is selected; a multiple window displaying function which displays a plurality of windows simultaneously on the display; a mouse pointer displaying function which displays on the display a mouse pointer which is capable to be manipulated by the user of the communication device; a house item pin-pointing function which enables the user of the communication device to find the location of the house items for which the user is looking in a house, wherein the house items are the tangible objects placed in a house which are movable by human being; a membership administrating function in which host computing system allows only the users of the communication device who have paid the monthly fee to access host computing system to implement a certain function; a keyword search timer recording function which enables to timer record TV programs which meet a certain criteria set by the user of the communication device; a weather forecast displaying function which displays on the display the weather forecast of the current location of the communication device; a multiple language displaying function, wherein a selected language is selected from a plurality of languages, and the selected language is utilized to operate the communication device; and a caller's information displaying function which displays personal information regarding caller on the display when the communication device receives a phone call.

The invention claimed is:

1. A communication device comprising:

a microphone;

a speaker;

an input device;

a display;

a camera;

a wireless communicating system;

a voice communicating means to implement voice communication by utilizing said microphone and said speaker;

an automobile controlling means, by which said communication device remotely controls, in response to an automobile controlling command input via said input device, an automobile;

a caller ID means which retrieves a predetermined color data and/or sound data which is specific to the caller of the incoming call received by said communication device, and outputs the color and/or sound corresponding to said predetermined color data and/or sound data from said communication device;

a call blocking means which blocks the incoming call if the identification thereof is included in a call blocking list;

an auto time adjusting means which automatically adjusts the clock of said communication device in accordance with a wireless signal received by said wireless communication system;

a calculating means which implements mathematical calculation by utilizing digits input via said input device;

a word processing means which includes a bold formatting means, an italic formatting means, and/or a font formatting means, wherein said bold formatting means changes alphanumeric data to bold, said italic formatting means changes alphanumeric data to italic, and said font formatting means changes alphanumeric data to a selected font;

a startup software means, wherein a startup software identification data storage area stores a startup software identification data which is an identification of a certain software program selected by the user, when the power of said communication device is turned on, said startup software means retrieves said startup software identification data from said startup software identification data storage area and activates said certain software program;

a stereo audio data output means which enables said communication device to output audio data in a stereo fashion;

a digital camera means, wherein a photo quality identifying command is input via said input device, when a photo taking command is input via said input device, a photo data retrieved via said camera is stored in a photo data storage area with the quality indicated by said photo quality identifying command;

a multiple language displaying means, wherein a specific language is selected from a plurality of languages, where said specific language is utilized to operate said communication device;

a caller's information displaying means which displays a personal information regarding caller on said display when said communication device receives a phone call;

a communication device remote controlling means which enables said communication device to be remotely controlled by a computer via a network; and a shortcut icon displaying means, wherein a shortcut icon is displayed on said display, and a software program indicated by said shortcut icon is activated when said shortcut icon is selected.

2. A communication device comprising:

a microphone;

a speaker;

an input device;

a display;

a camera;

a wireless communicating system;

a voice communicating means to implement voice communication by utilizing said microphone and said speaker;

an OCR means, wherein an image data is input via said camera and alphanumeric data is extracted from said image data;

a caller ID means which retrieves a predetermined color data and/or sound data which is specific to the caller of the incoming call received by said communication device, and outputs the color and/or sound corresponding to said predetermined color data and/or sound data from said communication device;

a call blocking means which blocks the incoming call if the identification thereof is included in a call blocking list;

an auto time adjusting means which automatically adjusts the clock of said communication device in accordance with a wireless signal received by said wireless communication system;

a calculating means which implements mathematical calculation by utilizing digits input via said input device;

a word processing means which includes a bold formatting means, an italic formatting means, and/or a font formatting means, wherein said bold formatting means changes alphanumeric data to bold, said italic formatting means changes alphanumeric data to italic, and said font formatting means changes alphanumeric data to a selected font;

a startup software means, wherein a startup software identification data storage area stores a startup software identification data which is an identification of a certain software program selected by the user, when the power of said communication device is turned on, said startup software means retrieves said startup software identification data from said startup software identification data storage area and activates said certain software program;

a stereo audio data output means which enables said communication device to output audio data in a stereo fashion;

a digital camera means, wherein a photo quality identifying command is input via said input device, when a photo taking command is input via said input device, a photo data retrieved via said camera is stored in a photo data storage area with the quality indicated by said photo quality identifying command;

a multiple language displaying means, wherein a specific language is selected from a plurality of languages, where said specific language is utilized to operate said communication device;

a caller's information displaying means which displays a personal information regarding caller on said display when said communication device receives a phone call;

a communication device remote controlling means which enables said communication device to be remotely controlled by a computer via a network; and a shortcut icon displaying means, wherein a shortcut icon is displayed on said display, and a software program indicated by said shortcut icon is activated when said shortcut icon is selected.

3. A communication device comprising:

a microphone;

a speaker;

an input device;

a display;

a camera;

a wireless communicating system;

a voice communicating means to implement voice communication by utilizing said microphone and said speaker;

an automobile controlling means, by which said communication device remotely controls, in response to an automobile controlling command input via said input device, an automobile;

an OCR means, where an image data is input via said camera and alphanumeric data is extracted from said image data;

a caller ID means which retrieves a predetermined color data and/or sound data which is specific to the caller of the incoming call received by said communication device, and outputs the color and/or sound corresponding to said predetermined color data and/or sound data from said communication device;

a call blocking means which blocks the incoming call if the identification thereof is included in a call blocking list;

an auto time adjusting means which automatically adjusts the clock of said communication device in accordance with a wireless signal received by said wireless communication system;

a calculating means which implements mathematical calculation by utilizing digits input via said input device;

a word processing means which includes a bold formatting means, an italic formatting means, and/or a font formatting means, wherein said bold formatting means changes alphanumeric data to bold, said italic formatting means changes alphanumeric data to italic, and said font formatting means changes alphanumeric data to a selected font;

a startup software means, wherein a startup software identification data storage area stores a startup software identification data which is an identification of a certain software program selected by the user, when the power of said communication device is turned on, said startup software means retrieves said startup software identification data from said startup software identification data storage area and activates said certain software program;

a stereo audio data output means which enables said communication device to output audio data in a stereo fashion;

a digital camera means, wherein a photo quality identifying command is input via said input device, when a photo taking command is input via said input device, a photo data retrieved via said camera is stored in a photo data storage area with the quality indicated by said photo quality identifying command;

a multiple language displaying means, wherein a specific language is selected from a plurality of languages, where said specific language is utilized to operate said communication device;

a caller's information displaying means which displays a personal information regarding caller on said display when said communication device receives a phone call;

a communication device remote controlling means which enables said communication device to be remotely controlled by a computer via a network; and a shortcut icon displaying means, wherein a shortcut icon is displayed on said display, and a software program indicated by said shortcut icon is activated when said shortcut icon is selected.

* * * * *